US010607305B2

(12) United States Patent
Griebat

(10) Patent No.: US 10,607,305 B2
(45) Date of Patent: Mar. 31, 2020

(54) METHOD FOR QUESTIONING JURORS

(71) Applicant: Jeb C. Griebat, Chanute, KS (US)

(72) Inventor: Jeb C. Griebat, Chanute, KS (US)

(*) Notice: Subject to any disclaimer, the term of this patent is extended or adjusted under 35 U.S.C. 154(b) by 126 days.

(21) Appl. No.: 13/961,784

(22) Filed: Aug. 7, 2013

(65) Prior Publication Data

US 2015/0046347 A1 Feb. 12, 2015
US 2018/0285992 A9 Oct. 4, 2018

Related U.S. Application Data

(63) Continuation-in-part of application No. 11/367,872, filed on Mar. 3, 2006, now Pat. No. 8,515,790.

(60) Provisional application No. 61/766,381, filed on Feb. 19, 2013, provisional application No. 61/701,053, filed on Sep. 14, 2012, provisional application No. 60/658,949, filed on Mar. 5, 2005.

(51) Int. Cl.
G06Q 50/18 (2012.01)
G06Q 10/00 (2012.01)

(52) U.S. Cl.
CPC ............. G06Q 50/18 (2013.01); G06Q 10/00 (2013.01)

(58) Field of Classification Search
None
See application file for complete search history.

(56) References Cited

U.S. PATENT DOCUMENTS

| 4,188,644 A * | 2/1980 | Thiewes | H04N 7/18 348/E7.085 |
| 4,924,387 A * | 5/1990 | Jeppesen | G06Q 50/18 360/13 |
| 5,172,281 A * | 12/1992 | Ardis | G09B 5/065 360/72.2 |
| 5,392,428 A * | 2/1995 | Robins | G06F 17/30722 |
| 5,444,615 A * | 8/1995 | Bennett | G06F 17/24 348/E7.083 |
| 5,528,282 A * | 6/1996 | Voeten | H04L 29/06 348/E5.008 |
| 5,568,181 A * | 10/1996 | Greenwood | H04N 7/17336 348/E7.073 |
| 5,583,561 A * | 12/1996 | Baker | H04N 7/17336 348/E7.073 |
| 5,594,490 A * | 1/1997 | Dawson | H04B 7/18523 348/E7.073 |
| 5,594,491 A * | 1/1997 | Hodge | H04N 7/17336 348/E5.008 |

(Continued)

OTHER PUBLICATIONS

Bermant, Gordon, "Education and Training Series: Jury Selection Procedures in United States District Courts," Federal Judicial Center, Jun. 2982, available at http://www.fjc.gov/public/pdf.nsf/lookup/jurselpro.pdf/$file/jurselpro.pdf, (accessed Oct. 22, 2015).*

(Continued)

Primary Examiner — Jan P Mincarelli
(74) Attorney, Agent, or Firm — Eickson Kernell IP, LLC

(57) ABSTRACT

The disclosure details a computer program enabling parties to litigation to produce a questionnaire through an internet based website and enabling jurors to respond to the questionnaire through such website. The program comprises numerous code sequences that assist the court, a court reporter, the parties to litigation (and counsel), and the judge in the process of selecting and empaneling jurors from a plurality of candidates.

1 Claim, 52 Drawing Sheets

(56) References Cited

U.S. PATENT DOCUMENTS

| | | | | | |
|---|---|---|---|---|---|
| 5,640,453 | A | * | 6/1997 | Schuchman | H04N 5/765 348/E7.072 |
| 5,675,738 | A | * | 10/1997 | Suzuki | H04N 7/17318 348/E7.071 |
| 5,832,171 | A | * | 11/1998 | Heist | H04N 9/8233 386/241 |
| 5,835,667 | A | * | 11/1998 | Wactlar | G06F 17/30787 386/241 |
| 5,838,966 | A | * | 11/1998 | Harlan | G06F 17/30643 707/999.1 |
| 5,878,186 | A | * | 3/1999 | Bennett | G06F 17/20 348/E7.081 |
| 5,884,272 | A | * | 3/1999 | Walker | G06Q 30/0615 379/93.12 |
| 5,903,892 | A | * | 5/1999 | Hoffert | G06F 17/30017 |
| 5,950,194 | A | * | 9/1999 | Bennett | G06F 17/24 348/E7.083 |
| 6,047,292 | A | * | 4/2000 | Kelly | G06F 17/30017 707/999.01 |
| 6,091,408 | A | * | 7/2000 | Treibitz | G06F 3/033 715/753 |
| 6,125,340 | A | * | 9/2000 | Miles | G06N 7/005 702/181 |
| 6,173,259 | B1 | * | 1/2001 | Bijl | G06F 3/16 704/235 |
| 6,185,573 | B1 | * | 2/2001 | Angelucci | G06F 17/30017 705/1.1 |
| 6,205,323 | B1 | * | 3/2001 | Mayo, Jr. | G08B 27/006 340/7.2 |
| 6,374,260 | B1 | * | 4/2002 | Hoffert | G06F 17/30038 |
| 6,385,389 | B1 | * | 5/2002 | Maruyama | G11B 27/036 386/248 |
| 6,721,703 | B2 | * | 4/2004 | Jackson | H04L 12/1813 348/E7.078 |
| 6,859,799 | B1 | * | 2/2005 | Yuen | G06F 17/30265 |
| 6,871,107 | B1 | * | 3/2005 | Townsend | G11B 19/00 369/25.01 |
| 7,072,954 | B1 | * | 7/2006 | Ezaki | H04L 41/0896 370/230 |
| 7,617,445 | B1 | * | 11/2009 | Townsend | G06F 17/241 715/201 |
| 8,327,255 | B2 | * | 12/2012 | Koch | G11B 27/10 715/209 |
| 2001/0053967 | A1 | * | 12/2001 | Gordon | G06Q 10/10 703/22 |
| 2002/0029350 | A1 | * | 3/2002 | Cooper | G06Q 10/10 726/26 |
| 2002/0031262 | A1 | * | 3/2002 | Imagawa | G11B 27/28 382/190 |
| 2002/0087569 | A1 | * | 7/2002 | Fischer | H04N 21/235 |
| 2002/0107832 | A1 | * | 8/2002 | Shimizu | G06Q 30/0641 |
| 2002/0170062 | A1 | * | 11/2002 | Chen | G06F 17/30017 725/86 |
| 2003/0018520 | A1 | * | 1/2003 | Rosen | G06Q 30/02 705/12 |
| 2003/0112270 | A1 | * | 6/2003 | Newell | G06F 17/30873 715/738 |
| 2004/0260569 | A1 | * | 12/2004 | Bell | G06F 17/2785 705/7.27 |
| 2005/0086179 | A1 | * | 4/2005 | Mehmet | G06Q 10/087 705/80 |
| 2005/0187813 | A1 | * | 8/2005 | Genevie | G06Q 30/0202 705/7.31 |
| 2006/0064643 | A1 | * | 3/2006 | Hariton | G06F 17/30056 715/751 |
| 2006/0089868 | A1 | * | 4/2006 | Griller | G06Q 10/06 705/7.39 |
| 2006/0212341 | A1 | * | 9/2006 | Powers | G06Q 30/02 705/7.32 |
| 2007/0195159 | A1 | * | 8/2007 | Packer | H04N 7/147 348/14.12 |
| 2008/0040106 | A1 | * | 2/2008 | Nakatsuyama | G11C 7/16 704/221 |
| 2008/0201162 | A1 | * | 8/2008 | Hart | G06Q 10/00 705/1.1 |
| 2009/0055404 | A1 | * | 2/2009 | Heiden | G06Q 30/02 |
| 2010/0235217 | A1 | * | 9/2010 | Ehlert | G06Q 10/06 705/311 |
| 2011/0020777 | A1 | * | 1/2011 | Hughes | G06Q 30/02 434/235 |
| 2014/0192325 | A1 | * | 7/2014 | Klin | A61B 5/16 351/209 |

OTHER PUBLICATIONS

Federal Judicial Center, "Jury Selection Process," May 1995, available at http://www.fjc.gov/public/pdf.nsf/lookup/dpen0025.pdf/$file/dpen0025.pdf (accessed Oct. 22, 2015).*
Jury Instructions Committee of the Ninth Circuit, "A Manual on Jury Trial Procedures," 2004 ed., available at http://www.akd.uscourts.gov/docs/general/jury_manual.pdf (accessed Oct. 22, 2015).*
Paul, Douglas B., and Baker, Janet M., "The Design for the Wall Street Journal-based CSR Corpus," HLT 1991 Proceedings of the workshop on Speech and Natural Language, pp. 357-362. Accessible at http://anthology.aclweb.org/H/H92/H92-1073.pdf (retrieved Dec. 7, 2016).*
WSJ, "Wall Street Journal-based Continuous Speech Recognition (CSR) Corpus Phase II (WSJ1): Training and Development Test Texts and Documentation," Apr. 1994, accessible at https://catalog.ldc.upenn.edu/docs/LDC94S13A/wsj1.txt (retrieved Dec. 7, 2016).*
Allport, G.W. (1954), "The Nature of Prejudice," Cambridge, MA; Addison-Wesley, pp. 29-31.
*Batson v. Kentucky*, 476 U.S. 79 (1986).
Bodenhausen, G.V., Macrae, C.N., Sherman, J.W. (1999), "On the Dialectics of Discrimination: Dual Processes in Social Stereotyping." In S. Chaiken & Y. Trop (Eds.) "Dual Process Theories in Social Psychology." New York; Guilford Press; pp. 271-276.
Brewer, M.B. (1999), "The Psychology of Prejudice: Ingroup Love or Outgroup Hate?" *Journal of Social Issues*, 55, pp. 431-435.
Broda-Bahm, K. (2012). Don't be too sure about face reading your jury. *Persuasive Litigator*, Feb. 20, 2012; http:www.persuasivelitigator.com.
Burgoon, J. K., Buller, D. B., & Woodall, W. G. (1996). *Nonverbal communication: The unspoken dialogue* (2nd Ed.). New York; McGraw Hill; pp. 245-247.
Burgoon, J. K., & Hoobler, G. D. (2002). Nonverbal signals. In M. L. Knapp & J. A. Daly (Eds.), *Handbook of interpersonal communication* (3rd Ed., pp. 240-299). Thousand Oaks, CA; Sage; pp. 240-249, Only pp. 247-249 and large portions not legible.
Cleveland, J. N. Stockdale, M., & Murphy, K. R. (2000). *Women and men in organizations: Sex and gender issues at work*; Mahwah, NJ; Erbaum; pp. 67-75.
Fortenberry, J. H., Maclean, J., Morris, P., & O'Connell, M. (1978). Mode of dress as a personal cue to deference. *Journal of Social Psychology*, pp. 104, 139-140.
Frederick, J. T. (2015). Understanding jurors' nonverbal communication part 1. *GPSolo eReport*, Dec.; http:www.amicanbar.org.
Remland, M. (1993). The importance of nonverbal communication in the courtroom. Paper presented at the annual meeting of the Eastern Communication Association in New Haven, CT Apr. 29-May 2, 1993; p. 7.
Rosencranz, M.L. (1965). "Sociological and Psychological Approaches to Clothing Research," Journal of Home Economics.
Rubinowitz, Ben B. and Torgan, Evan. "Jury Selection-Time Constraints and Weaknesses in Cases," New York Law Journal, Aug. 29, 200.
*Snyder v. Louisiana*, 552 U.S. 472(2008).
*Strauder v. West Virginia*, 100 U.S. 303, 308-09 (1879).
Suler, J. R. (2004). The online disinhibition effect. *Cyber-Psychology and Behavior*, pp. 7, 321-326.
Tidwell, I. C., & Walther, J. B. (2002). Computer-mediated communication effects on disclosure, impressions, and interpersonal

(56) References Cited

OTHER PUBLICATIONS evaluations: Getting to know one another a bit at a time. Human Communication Research, 28, p. 342.
Ting-Toomey, S. (1999). *Communicating across cultures*. New York;Guilford Press; pp. 69-71.
Triandis, H. C. (1995). *Individualism and collectivism*. Boulder, CO; Westview Press; pp. 126-127.
Wargo, E. (2006), How many seconds to a first impression? *Observer*, 19.7. http://psychologicalscience.org.
Wilmot, W. W., & Hocker, J. L. (2001) *Interpersonal conflict* (6th Ed.). Boston; McGraw-Hill; pp. 107-110.
Smith, David and Dennehy, Rachel. *Controversey Over the Peremptory Challenge: Should Batson be Expanded?* 10 St. John's J. Legal Comment. 453, 582 (1995).
Goffman, E. (1959). *The presentation of self in everyday life*. Garden City, NY; Doubleday Anchor Books; pp. 17-31.
Goman, C. K. (2014). Fascinating facts about eye contact. *Forbes*, Aug. 21, 2015. http://forbes.com.
Hedges, Kristi. How important is your first impression really? *Forbes*, Sep. 5, 2015. http://forbes.com.
*J.E.B.* v. *State ex rel T.B.*, 114 S.Ct. 1419 (1994).
Kahneman, Daniel (2011). "Thinking Fast and Slow." Farrar, Straus, and Giroux, New York, Only the inside front dustjacket w/ author biography provided.
Lustig, M. W., & Koester, J. (2006). *Intercultural competence: Interpersonal communication across cultures*(5th Ed.). Boston; Allyn and Bacon; pp. 154-155.
McCornack, Steven. "Reflect & Relate: Introduction to Interpersonal Communication," Bedford/St. Martins, Boston, 2010; pp. 55, 56, 78, 79, 80-93, 95-100, 155, 156, 218, 219, 255, 256, 264, 269, 270, 292.
Mehrabian, Albert and Ferris, Susan R. "Inference of Attitudes from Nonverbal Communication in Two Channels," Journal of Consulting Psychology. 1967, vol. 31, No. 3, pp. 248-252.
*Miller-El* v. *Dretke*, 545 U.S. 231, 271 (2005).
Munro, K. (2002). Conflict in cyberspace: How to resolve conflict online. In J. Suler (Ed.), *The psychology of cyberspace*.
*State* v. *Thomas*, 20 P.3d 82 (Kan. Ct. App. 2001).
Ph.D., Dr. Prosise, Litigation News, "A Case for the Expanded Use of Supplemental Juror Questionnaires," vol. 23, No. 1—Winter 2010-2011.
*United States* v. *Lorenzo*, 995 F.2d 1448 (9th Cir. 1993).
*United States* v. *United States Dist. Ct.*, 464 F.3d 1065, 1071 (9th Cir. 2006).
*United States* v. *Uwaezhoke*, 995 F.2d 388 (3d Cir. 1993).
V. Hale Starr & Mark McCormick, Jury Selection, §22.01- §22.02.
www.hlntv.com, "How long does it typically take to choose a jury," Jun. 17, 2013.
Patricia J. Griffin, Jumping on the Ban Wagon: *Mintos* v. *City University of New York and the Future of the Peremptory Challenge*, 81 Minnesota Law Review 1237, 1261 (1997).
*People* v. *Tyburski*, 445 Mich. 606, 623; 518 N.W.2d 441 (1994).
*Powers* v. *Ohio*, 499 U.S. 400, 407 (1991).
Robert T. Prior (1993) "The Peremptory Challenge: A Lost Cause?," 44 Mercer Law Review, 587.
Robert W. Van Giezen, Beyond the Numbers, "Paid leave in private industry over the past 20 years;" Aug. 2013, vol. 2 /No. 18.
*State* v. *Arteaga*, 896 P.2d 1035, 1040 (Kan. 1995).
*State* v. *Betts*, 33 P.3d 575, 594 (2001).
*State* v. *Conley*, 11 P.3d 1147, 1154 (Kan. 2000).
*State* v. *Gadelkarim*, 887 P.2d 88, 103 (Kan. 1994).
*State* v. *Pink*, 20 P.3d 31, 31 (Kan. 2001).
California's Code of Civil Procedure Sec. 222.5.
California Courts, The Judicial Branch of California, http://www.courts.ca.gov/2113.htm.
Cynthia Richers-Rowland, (1987) *Batson* v. *Kentucky*: The New and Improved Peremptory Challenge, 38 Hastings Law Journal, 1195, 1201.
Dr. Andy Sheldon, "The Supplemental Juror Questionnaire".
Dr. Jeff Fredrick, GP Solo eReport, "Juror Questionnaires".
Fed. R. Civ. P. 47(a).
Fed. R. Crim. P. 24(a).
Findlaw.com, Jury Duty and an Employee's Right to Pay.
Jean Montoya, The Future of the Post-Batson Peremptory Challenge: Voir Dire by Questionnaire and the "Blind" Peremptory, 29 U. Mich. J. L. Reform 981, 985 n.20, 998 (1996).
J. Morehead—When a Peremptory Challenge is no Longer Peremptory: Batson's Unfortunate Failure to Eradicate Invidious Discrimination from Jury Selection, 43 DePaul L.Rev 625, 634 (1994).

\* cited by examiner

METHOD FOR QUESTIONING JURORS

CROSS REFERENCE TO RELATED APPLICATIONS

This application is a continuation-in-part of U.S. application Ser. No. 11/367,872, filed Mar. 3, 2006 (now U.S. Pat. No. 8,515,790), which claims the benefit of provisional application Ser. No. 61/766,381, filed Feb. 19, 2013; which claims the benefit of provisional application Ser. No. 61/701,053, filed Sep. 14, 2012; which claims the benefit of provisional application Ser. No. 60/658,949, filed Mar. 5, 2005.

FIELD OF THE INVENTION

The invention pertains to computer software tailored to streamline jury selection methods that are currently used by Courts worldwide, and in particular state and federal courts of the United States. The invention is also an improvement upon the current methods used by Courts for questioning jurors and selecting jurors from a jury pool.

SUMMARY OF THE INVENTION

The invention is a computer software program that facilitates jury questioning and jury selection through the internet with a website. The invention's internet based website has individual programs respectively designed for the Judge, the Plaintiff Attorney, the Defense Attorney, the Plaintiff, the Defendant, the Court Reporter, the Court Administrator, the Plaintiff Attorney's Professional Jury Consultant, the Defense Attorney's Professional Jury Consultant, and each Juror in the jury pool.

In summary, the process of jury questioning through the invention's internet website begins with the Judge typing his/her jury selection questions through the invention's internet website in his/her own respective program. When the Judge logs into his/her respective program on the invention's internet website to type his/her jury selection questions, the juror qualification questions for the Court's respective jurisdiction normally asked on a standard jury selection questionnaire in conventional jury selection will appear in a typed format on the Judge's personal computer screen or cellular phone screen. Some of such juror qualification questions typically asked in most jurisdictions are the following: 1) "Are you at least 18 years of age?," 2) "Are you a citizen of the United States?," 3) "Are you a resident of [particular state name appears here]?," 4) "Are you able to read, write and understand the English language?," 5) "Are you presently under an adjudication of incompetency?," 6) "Have you been convicted of a felony within the past 10 years?," 7) "Do you believe you should be excused from serving as a juror?," 8) "Have you ever served as a juror?," 9) "If yes, state whether the case was civil or criminal?," and 10) "Have you or any members of your immediate family been a party to any civil or criminal lawsuit?." The invention's internet website instructs the Judge to read each juror qualification question, and then type his/her own jury selection questions into the invention's internet website. The invention's internet website instructs the Judge to not duplicate any of the juror qualification questions when typing his/her own jury selection questions.

After the Judge types his/her jury selection questions into his/her respective program in the invention's internet website, the Judge then orally reads each of the juror qualification questions for the Court's respective jurisdiction and orally reads each of his/her typed jury selection questions in front of a webcam and into the invention's internet website on a personal computer or a cellular phone making an individual video recording of each of his/her respective jury selection questions. Thus, when the Judge orally reads each of the said typed juror qualification questions and his/her own typed jury selection questions in front of a webcam and into the invention's website, only one question will appear on the screen at a time for the Judge to orally read in front of a webcam. For example, when the Judge begins to orally read the said typed juror qualification questions into the website, only the first of the said typed juror qualification questions on the list will appear on the screen. The Judge then orally reads the question in front of a webcam and into the invention's website making an individual video recording of the Judge reading the first question. After the Judge finishes orally reading the first of the said juror qualification questions, the Judge selects Orally Read Next Question in the invention's website, and only the second typed question of the juror qualification questions appears on the screen. The Judge then orally reads the second typed question in front of a webcam and into the invention's website making an individual video recording of the Judge orally reading the second juror qualification question. The Judge continues this pattern until he/she has produced an individual video recording of each of the juror qualification questions and his/her own jury selection questions. Ultimately, the Judge makes an individual recording for each typed question the Judge orally reads in front of a webcam. When the Judge orally reads each question in front of a webcam, the Judge's video recording will appear and play on the Judge's screen on the invention's website at the same time the Judge orally reads each question so the Judge can monitor the quality of each of his/her video recordings.

Upon the Judge completing his/her above said tasks, the invention automatically sends email messages to the personal email accounts of the Judge, the Plaintiff Attorney, the Defense Attorney, the Plaintiff, and the Defendant that they may view the Judge's video recordings, the typed juror qualification questions for the Court's respective jurisdiction, and the Judge's typed jury selection questions through the invention's website in their respective programs, and they are instructed the Plaintiff Attorney must now log onto the invention's website and review the Judge's video recordings, the juror qualification questions for the Court's respective jurisdiction, and the Judge's jury selection questions and type his/her own jury selection questions into the invention's website and produce video recordings of him/her orally reading each of his/her jury selection questions in front of a webcam and into the invention's website on a personal computer or a cellular phone. If the case is civil, the email message further instructs the Plaintiff Attorney to make a video recording of the Plaintiff through the invention's website by having the Plaintiff sit in front of a webcam on a personal computer or a cellular phone blinking his/her eyes which will be viewed by the jurors through the invention's website when they respond to the Plaintiff Attorney's jury selection questions. The email message further instructs them that the Plaintiff may now submit perspective jury selection questions to the Plaintiff Attorney through the invention's website to be used as recommendations before the Plaintiff Attorney submits his/her jury selection questions through the invention's website. Also, upon the Judge completing his/her above said tasks, the invention automatically sends the Court Reporter an email message to his/her personal email account instructing him/her to print through the invention's website the typed juror qualification questions for the Court's respective jurisdiction and the Judge's typed jury selection questions and all email messages sent to all of the parties and place the printed copies in the Court's file for transcript purposes. Such email message further instructs the Court Reporter to log onto the invention's website to transcribe every word in each of the Judge's video recordings into a typed format and print such transcriptions and place them in the Court's file for transcript purposes. Additionally, upon the Judge completing his/her above said tasks, the invention sends text messages to the personal cellular phones of the Judge, the Plaintiff Attorney, the Defense Attorney, the Plaintiff, the Defendant, and the Court Reporter advising them that their participation is now required through the invention's website, and they must now check their personal email accounts for instructive email messages and complete their respective tasks through the invention's website.

The invention allows the Plaintiff Attorney and the Defense Attorney to hire their own respective Professional Jury Consultant through the invention's website to provide jury selection questions through the invention's website to their respective attorneys to be used as recommendations before their respective attorneys submit their jury selection questions through the invention's website. If the Plaintiff Attorney hired a Professional Jury Consultant through the invention's website to provide jury selection questions to the Plaintiff Attorney through the invention's website, the invention sends an email message to the personal email account of the Plaintiff Attorney's selected Professional Jury Consultant instructing him/her to provide the Plaintiff Attorney with jury selection questions through the invention's website upon the Judge completing his/her above said tasks. Additionally, if the Plaintiff Attorney hired a Professional Jury Consultant through the invention's website to provide jury selection questions to the Plaintiff Attorney through the invention's website, the invention sends a text message to the personal cellular phone of the Plaintiff Attorney's selected Professional Jury Consultant advising him/her that his/her participation is now required through the invention's website, and he/she must now check his/her personal email account for instructive email messages and complete his/her respective tasks through the invention's website.

Upon the Judge completing his/her above said tasks, the Plaintiff, if the case is civil, may log into his/her respective program in the invention's website and review the Judge's video recordings, the typed juror qualification questions for the Court's respective jurisdiction, and the Judge's typed jury selection questions and type jury selection questions through the invention's internet website and submit them to the Plaintiff Attorney's respective program in the invention's website to be used as recommendations by the Plaintiff Attorney. If the Plaintiff Attorney hired a Professional Jury Consultant through the invention's website for the purpose of obtaining recommended jury selection questions, the Plaintiff Attorney's selected Professional Jury Consultant may log into his/her respective program in the invention's website and review the Judge's video recordings, the typed juror qualification questions for the Court's respective jurisdiction, and the Judge's typed jury selection questions and type jury selection questions through the invention's website and submit them to the Plaintiff Attorney's respective program in the invention's website to be used as recommendations by the Plaintiff Attorney. The Court Reporter logs into his/her respective program through the invention's website and prints the typed juror qualification questions for the Court's respective jurisdiction and the Judge's typed jury selection questions and all email messages sent to all of the parties and is instructed by the invention's website to place the printed juror qualification questions for the Court's respective jurisdiction and the Judge's printed jury selection questions and all email messages sent to all of the parties in the Court's file for transcript purposes. Also, the Court Reporter logs into his/her respective program through the invention's website and transcribes every word in each of the Judge's video recordings into a typed format and prints such transcriptions and places them in the Court's file for transcript purposes.

If the Plaintiff and the Plaintiff Attorney's Professional Jury Consultant submit typed jury selection questions through the invention's website to the Plaintiff Attorney's respective program in the invention's website, the Plaintiff Attorney, through the invention's website, views the Plaintiff's and his/her Professional Jury Consultant's typed jury selection questions and may delete, edit, and keep any of such questions and type any of his/her own additional jury selection questions. The invention instructs the Plaintiff Attorney to review the Judge's video recordings, the typed juror qualification questions for the Court's respective jurisdiction, and the Judge's typed jury selection questions before submitting his/her own jury selection questions to prevent duplication of questions on the questionnaire.

After the Plaintiff Attorney types and/or edits his/her jury selection questions into his/her respective program in the invention's website, the Plaintiff Attorney then orally reads each of his/her typed jury selection questions in front of a webcam and into the invention's website on a personal computer or a cellular phone making an individual video recording of each of his/her respective jury selection questions. Thus, when the Plaintiff Attorney orally reads each of his/her own typed jury selection questions in front of a webcam and into the invention's website, only one typed question will appear on the screen at a time for the Plaintiff Attorney to orally read in front of a webcam. For example, when the Plaintiff Attorney begins to orally read his/her typed jury selection questions into the website, only the first of his/her typed jury selection questions on his/her list of questions will appear on the screen. The Plaintiff Attorney then orally reads the typed question in front of a webcam and into the invention's website making an individual video recording of the Plaintiff Attorney reading the first typed question. After the Plaintiff Attorney finishes orally reading the first of his/her jury selection questions, the Plaintiff Attorney selects Orally Read Next Question in the invention's website, and only the second typed question of his/her jury selection questions appears on the screen. The Plaintiff Attorney then orally reads the second typed question in front of a webcam and into the invention's website making an individual video recording of the Plaintiff Attorney orally reading his/her second jury selection question. The Plaintiff Attorney continues this pattern until he/she has produced an individual video recording of each of his/her jury selection questions. Ultimately, the Plaintiff Attorney makes an individual recording for each typed question the Plaintiff Attorney orally reads in front of a webcam. When the Plaintiff Attorney orally reads each typed question in front of a webcam, the Plaintiff Attorney's video recording will appear and play on the Plaintiff Attorney's screen on the invention's website at the same time the Plaintiff Attorney orally reads each question so the Plaintiff Attorney can monitor the quality of each of his/her video recordings.

Additionally, if the case is civil, the Plaintiff Attorney, in his/her respective program, makes a video recording of the Plaintiff through the invention's website by having the Plaintiff sit in front of a webcam on a personal computer or a cellular phone blinking his/her eyes.

After the Judge completes his/her above said tasks, the Judge, the Plaintiff Attorney, the Defense Attorney, the Plaintiff, and the Defendant may log into their respective programs in the invention's website and view the Judge's video recordings, the typed juror qualification questions for the Court's respective jurisdiction, and the Judge's typed jury selection questions.

Upon the Plaintiff Attorney completing such tasks, the invention automatically sends email messages to the personal email accounts of the Judge, the Plaintiff Attorney, the Defense Attorney, the Plaintiff, and the Defendant that they may view the Plaintiff Attorney's video recordings and typed jury selection questions and view the Plaintiff's video recording of the Plaintiff sitting and blinking his/her eyes through the invention's website in their respective programs, and they are instructed the Defense Attorney must now log onto the invention's website and review the Judge's video recordings, the Plaintiff Attorney's video recordings, the Plaintiff's video recording, the typed juror qualification questions for the Court's respective jurisdiction, the Judge's typed jury selection questions, and the Plaintiff Attorney's typed jury selection questions and type his/her own jury selection questions into the invention's website and produce video recordings of him/her orally reading each of his/her jury selection questions in front of a webcam and into the invention's website on a personal computer or a cellular phone. The email message further instructs the Defense Attorney to make a video recording of the Defendant through the invention's website by having the Defendant sit in front of a webcam on a personal computer or a cellular phone blinking his/her eyes which will be viewed by the jurors through the invention's website when they respond to the Defense Attorney's jury selection questions. The email message further instructs them that the Defendant may now submit perspective jury selection questions to the Defense Attorney's respective program through the invention's website to be used as recommendations before the Defense Attorney submits his/her jury selection questions through the invention's website. Upon the Plaintiff Attorney completing the above said tasks, the invention automatically sends the Court Reporter an email message to his/her personal email account instructing him/her to print through the invention's website the Plaintiff Attorney's typed jury selection questions and all email messages sent to all of the parties and place the printed copies in the Court's file for transcript purposes. Such email message further instructs the Court Reporter to log onto the invention's website to transcribe every word in each of the Plaintiff Attorney's video recordings into a typed format and print such transcriptions and place them in the Court's file for transcript purposes. Additionally, upon the Plaintiff Attorney completing the above said tasks, the invention sends text messages to the personal cellular phones of the Judge, the Plaintiff Attorney, the Defense Attorney, the Plaintiff, the Defendant, and the Court Reporter advising them that their participation is now required through the invention's website, and they must now check their personal email accounts for instructive email messages and complete their respective tasks through the invention's website.

If the Defense Attorney hired a Professional Jury Consultant through the invention's website to provide jury selection questions to him/her through the invention's website, the invention sends an email message to the personal email account of the Defense Attorney's selected Professional Jury Consultant instructing him/her to provide the Defense Attorney with jury selection questions through the invention's website upon the Plaintiff Attorney completing his/her above said tasks. Additionally, if the Defense Attorney hired a Professional Jury Consultant through the invention's website to provide jury selection questions to the Defense Attorney through the invention's website, the invention sends a text message to the personal cellular phone of the Defense Attorney's selected Professional Jury Consultant advising him/her that his/her participation is now required through the invention's website, and he/she must now check his/her personal email account for instructive email messages and complete his/her respective tasks through the invention's website.

Upon the Plaintiff Attorney completing his/her above said tasks, the Defendant may log into his/her respective program in the invention's website and review the Judge's video recordings, the Plaintiff Attorney's video recordings, the Plaintiff's video recording, the typed juror qualification questions for the Court's respective jurisdiction, the Judge's typed jury selection questions, and the Plaintiff Attorney's typed jury selection questions and type jury selection questions through the invention's website and submit them to the Defense Attorney's respective program in the invention's website to be used as recommendations by the Defense Attorney.

If the Defense Attorney hired a Professional Jury Consultant through the invention's website for the purpose of obtaining recommended jury selection questions, the Defense Attorney's selected Professional Jury Consultant may log into his/her respective program in the invention's website and review the Judge's video recordings, the Plaintiff Attorney's video recordings, the Plaintiff's video recording, the typed juror qualification questions for the Court's respective jurisdiction, the Judge's typed jury selection questions, and the Plaintiff Attorney's typed jury selection questions and type jury selection questions through the invention's website and submit them to the Defense Attorney's respective program in the invention's website to be used as recommendations by the Defense Attorney.

If the Defendant and the Defense Attorney's Professional Jury Consultant submit typed jury selection questions through the invention's website to the Defense Attorney's respective program in the invention's website, the Defense Attorney, through the invention's website, views such typed jury selection questions and may delete, edit, and keep any of such questions and type any of his/her own additional jury selection questions. The invention instructs the Defense Attorney to review the Judge's video recordings, the Plaintiff Attorney's video recordings, the Plaintiff's video recording, the typed juror qualification questions for the Court's respective jurisdiction, the Judge's typed jury selection questions, and the Plaintiff Attorney's typed jury selection questions before submitting his/her own jury selection questions to prevent duplication of questions on the questionnaire.

After the Defense Attorney types and/or edits his/her jury selection questions into his/her respective program in the invention's website, the Defense Attorney then orally reads each of his/her typed jury selection questions in front of a webcam and into the invention's internet website on a personal computer or a cellular phone making an individual video recording of each of his/her respective jury selection questions. Thus, when the Defense Attorney orally reads each of his/her own typed jury selection questions in front of a webcam and into the invention's website, only one typed question will appear on the screen at a time for the Defense Attorney to orally read in front of a webcam. For example, when the Defense Attorney begins to orally read his/her typed jury selection questions into the invention's website, only the first of his/her typed jury selection questions on his/her list of questions will appear on the screen. The Defense Attorney then orally reads the typed question in front of a webcam and into the invention's website making an individual video recording of the Defense Attorney reading the first question. After the Defense Attorney finishes orally reading the first of his/her jury selection questions, the Defense Attorney selects Orally Read Next Question in the invention's website, and only the second typed question of his/her jury selection questions appears on the screen. The Defense Attorney then orally reads the second typed question in front of a webcam and into the invention's website making an individual video recording of the Defense Attorney orally reading his/her second jury selection question. The Defense Attorney continues this pattern until he/she has produced an individual video recording of each of his/her jury selection questions. Ultimately, the Defense Attorney makes an individual recording for each typed question the Defense Attorney orally reads in front of a webcam. When the Defense Attorney orally reads each typed question in front of a webcam, the Defense Attorney's video recording will appear and play on the Defense Attorney's screen on the invention's website at the same time the Defense Attorney orally reads each typed question so the Defense Attorney can monitor the quality of each of his/her video recordings.

Additionally, the Defense Attorney, in his/her respective program, makes a video recording of the Defendant through the invention's website by having the Defendant sit in front of a webcam on a personal computer or a cellular phone blinking his/her eyes.

Upon the Plaintiff Attorney completing his/her above said tasks, the Judge, the Plaintiff Attorney, the Defense Attorney, the Plaintiff, and the Defendant may view the Plaintiff Attorney's video recordings and typed jury selection questions and view the Plaintiff's video recording of the Plaintiff sitting and blinking his/her eyes through the invention's website in their respective programs. The Court Reporter logs into his/her respective program through the invention's website and prints the Plaintiff Attorney's typed jury selection questions and all email messages sent to all of the parties and is instructed by the invention's website to place the Plaintiff Attorney's printed jury selection questions and all email messages sent to all of the parties in the Court's file for transcript purposes. Also, upon the Plaintiff Attorney completing his/her above said tasks, the Court Reporter logs into his/her respective program through the invention's website and transcribes every word in each of the Plaintiff Attorney's video recordings into a typed format and prints such transcriptions and places them in the Court's file for transcript purposes.

Upon the Defense Attorney completing his/her above said tasks, the invention automatically sends email messages to the personal email accounts of the Judge, the Plaintiff Attorney, the Defense Attorney, the Plaintiff, and the Defendant that they may view the Defense Attorney's video recordings and typed jury selection questions and view the Defendant's video recording of the Defendant sitting and blinking his/her eyes through the invention's website in their respective programs. The email messages also instruct them that the Judge may now log onto the invention's website and review the typed juror qualification questions for the Court's respective jurisdiction, the Judge's jury selection questions, the Plaintiff Attorney's jury selection questions, and the Defense Attorney's jury selection questions and delete any of such jury selection questions. The email messages also instruct them that the Judge may make the Judge's video recordings, the Plaintiff Attorney's video recordings, the Plaintiff's video recording, the Defense Attorney's video recordings, the Defendant's video recording, and the entire jury selection questionnaire consisting of the respective jurisdiction's statutory qualification questions, the Judge's questions, the Plaintiff Attorney's questions, and the Defense Attorney's questions available to all of the jurors in the jury pool for responding to the jury selection questionnaire in front of a webcam through the invention's website. The invention sends an email message to the personal email account of the Court Reporter to print through the invention's website the Defense Attorney's typed jury selection questions and all email messages sent to all of the parties and place the printed copies in the Court's file for transcript purposes. Such email message further instructs the Court Reporter to log onto the invention's website to transcribe every word in each of the Defense Attorney's video recordings into a typed format and print such transcriptions and place them in the Court's file for transcript purposes. Additionally, upon the Defense Attorney completing the above said tasks, the invention sends text messages to the personal cellular phones of the Judge, the Plaintiff Attorney, the Defense Attorney, the Plaintiff, the Defendant, and the Court Reporter advising them that their participation is now required through the invention's website, and they must now check their personal email accounts for instructive email messages and complete their respective tasks through the invention's website.

After the Defense Attorney completes his/her above said tasks, the Judge, the Plaintiff Attorney, the Defense Attorney, the Plaintiff, and the Defendant may view the Defense Attorney's video recordings and typed jury selection questions and view the Defendant's video recording of the Defendant sitting and blinking his/her eyes through the invention's website in their respective programs.

After the Defense Attorney completes his/her above said tasks, the Judge, in the Judge's respective program in the invention's website, may delete any of the typed juror qualification questions for the Court's respective jurisdiction, the Judge's typed jury selection questions, the Plaintiff Attorney's typed jury selection questions, and the Defense Attorney's typed jury selection questions on the jury selection questionnaire. Thus, if the Judge allows the attorneys to object to any of the questions on the questionnaire in court or outside of the invention's website, and if the Judge chooses to strike any of the questions based on attorney objections, the Judge may delete any of the questions on the jury selection questionnaire before it is submitted to the Jurors. For every typed question the Judge deletes on the questionnaire in the invention's website, the respective video footage of either the Judge or an attorney reading the particular typed question is also deleted. Also, upon the Defense Attorney submitting video recordings and typed jury selection questions, the Judge, in his/her respective program in the invention's website, may make the Judge's video recordings, the Plaintiff Attorney's video recordings, the Plaintiff's video recording, the Defense Attorney's video recordings, the Defendant's video recording, and the entire jury selection questionnaire consisting of the respective jurisdiction's statutory qualification questions, the Judge's questions, the Plaintiff Attorney's questions, and the Defense Attorney's questions available to all of the jurors in the jury pool for responding to the jury selection questionnaire in front of a webcam and through the invention's website. After the Defense Attorney completes his/her above said tasks, the Court Reporter logs into his/her respective program through the invention's website and prints the Defense Attorney's typed jury selection questions and all email messages sent to all of the parties and is instructed by the invention's website to place the Defense Attorney's printed jury selection questions and all printed email messages to all of the parties in the Court's file for transcript purposes. Also, upon the Defense Attorney completing his/her above said tasks, the Court Reporter logs into his/her respective program through the invention's website and transcribes every word in each of the Defense Attorney's video recordings into a typed format and prints such transcriptions and places them in the Court's file for transcript purposes.

After the Judge makes the jury selection questionnaire available to the jurors through the invention's website for responding, the invention automatically sends email messages to the personal email accounts of the Judge, the Plaintiff Attorney, the Defense Attorney, the Plaintiff, and the Defendant that instruct them that they may view the final jury selection questionnaire in their respective programs through the invention's website. Also, after the Judge makes the jury selection questionnaire available to the jurors through the invention's website for responding, the invention automatically sends an email message to the personal email account of the Court Administrator instructing the Court Administrator to make a summons for each juror in the jury pool through the invention's website and mail each summons to its respective juror's residence. After the Judge makes the jury selection questionnaire available to the jurors through the invention's website for responding, the invention automatically sends an email message to the personal email account of the Court Reporter instructing the Court Reporter to print through the invention's designated website the final jury selection questionnaire that was made available to the jurors through the invention's website after the Judge was given an opportunity to delete any of the questions on the jury selection questionnaire and print all email messages sent to all of the parties and is instructed to place the print of the final jury selection questionnaire and the prints of all email messages sent to all of the parties in the Court's file for transcript purposes. Additionally, after the Judge makes the jury selection questionnaire available to the jurors through the invention's website for responding, the invention sends text messages to the personal cellular phones of the Judge, the Plaintiff Attorney, the Defense Attorney, the Plaintiff, the Defendant, the Court Reporter, and the Court Administrator advising them that their participation is now required through the invention's website, and they must now check their personal email accounts for instructive email messages and complete their respective tasks through the invention's website.

After the Judge makes the jury selection questionnaire available to the jurors through the invention's website for responding, the Judge, the Plaintiff Attorney, the Defense Attorney, the Plaintiff, and the Defendant may view the final jury selection questionnaire in their respective programs through the invention's website.

After the Judge makes the jury selection questionnaire available to the jurors through the invention's website for responding, the Court Administrator makes a summons for each juror in the jury pool through his/her respective program in the invention's website, and the Court Administrator's program in the invention's website instructs the Court Administrator to mail each summons to its respective juror's residence. After the Judge makes the jury selection questionnaire available to the jurors through the invention's website for responding, the Court Reporter prints through the invention's website the final jury selection questionnaire that was made available to the jurors through the invention's website after the Judge had an opportunity to delete any of the questions on the jury selection questionnaire and prints all email messages sent to all of the parties, and the Court Reporter's program in the invention's website instructs the Court Reporter to place the print of the final jury selection questionnaire and prints of all of the email messages sent to all of the parties in the Court's file for transcript purposes.

Once each juror receives their respective summons, they log onto the invention's website on a personal computer equipped with a webcam or a cellular phone equipped with a webcam, and they orally respond to each question on the jury selection questionnaire in front of their respective webcam. Ultimately, each juror makes a video recording of him/her orally responding to each question on the jury selection questionnaire into the invention's website.

When each juror logs onto the invention's website to orally respond to the questionnaire in front of a webcam on a personal computer or a webcam on a cellular phone, the juror first makes a picture of his/her driver's license or photo identification card with the webcam and into the invention's website which will be viewed by the Judge, Plaintiff Attorney, Defense Attorney, Plaintiff, Defendant, Plaintiff Attorney's Professional Juror Consultant, Defense Attorney's Professional Juror Consultant, Court Administrator, and Court Reporter to authenticate the identification of the juror. Through the invention's website, each juror then orally responds to each question on the jury selection questionnaire one question at a time in front of a webcam on a personal computer or a webcam on a cellular phone in their own respective program making a video recording of each one of their responses. Thus, in the invention's website, only the one typed question that the juror attempts to answer will appear on the right side of the screen. Once the juror finishes orally responding to such question on the questionnaire in front of a webcam, the juror then selects next question on the screen of the invention's website, and the next typed question on the questionnaire appears on the juror's screen for the juror's oral response. At the bottom of the screen will appear the juror's video recording of him/her responding to the questionnaire in front of a webcam so the juror can monitor that the invention's website is making a valid video recording of the juror. Also, at the bottom of the screen will appear the picture of the juror's respective driver's license or photo identification card. However, when the juror's respective driver's license or photo identification card appears at the bottom of the screen, the juror's driver's license number or identification number will appear blacked out.

When each juror orally responds to the juror qualification questions for the Court's respective jurisdiction and the Judge's questions on the questionnaire in front of a webcam on a personal computer or a webcam on a cellular phone in the invention's website, only the Judge's video recording for the particular typed question that appears on the screen that the juror attempts to answer will appear on the left side of the juror's screen in his/her respective program in the invention's website, and the single typed question of the juror qualification questions or of the Judge's jury selection questions that the juror is attempting to answer will appear on the right side of the screen. When each typed question of the juror qualification questions or of the Judge's jury selection questions first appears on the right side of the screen, the Judge's respective video recording of the Judge orally reading the particular question appearing on the screen immediately begins to play depicting the Judge orally reading the question to the juror, and the juror can view the Judge orally asking the respective question in the Judge's video recording.

When each juror begins to orally respond to the first of the Plaintiff Attorney's jury selection questions on the questionnaire through the invention's website in front of a webcam on a personal computer or in front of a webcam on a cellular phone, the Judge's video recording will disappear, and only the Plaintiff Attorney's respective video recording for the first of the Plaintiff Attorney's typed jury selection questions will appear on the left side of the juror's screen in the juror's respective program in the invention's website. Only the first typed question of the Plaintiff Attorney's typed jury selection questions will appear on the right side of the Juror's screen. The Juror will only be allowed to answer one question of the Plaintiff Attorney's jury selection questions at a time through the invention's website. Thus, when the Juror attempts to answer any of the Plaintiff Attorney's jury selection questions through the invention's website, only the one typed question of the Plaintiff Attorney's jury selection questions that the juror attempts to answer will appear on the right side of the screen on the invention's website. When each of the first half of the Plaintiff Attorney's typed jury selection questions first appear on the right side of the screen, only the Plaintiff Attorney's respective video recording of the Plaintiff Attorney orally reading the particular typed question appearing on the screen appears on the left side of the juror's screen and immediately begins to play depicting the Plaintiff Attorney orally reading the typed question to the juror, and the juror can view and hear the Plaintiff Attorney orally reading the respective typed question in the Plaintiff Attorney's video recording.

When each of the second half of the typed jury selection questions of the Plaintiff Attorney first appear on the right side of each juror's screen on the invention's website, the Plaintiff Attorney's video recording does not appear, and the Plaintiff's video recording of the Plaintiff sitting and blinking his/her eyes only appears on the left side of each juror's screen. Thus, each juror can view the Plaintiff's video recording while each juror orally responds to each of the second half of the Plaintiff Attorney's jury selection questions. However, even though the Plaintiff Attorney's video recording does not appear on each juror's screen when each juror orally responds to each of the second half of the Plaintiff Attorney's jury selection questions and the Plaintiff's video recording does appear when each of the second half of the Plaintiff Attorney's typed jury selection questions appear on each juror's screen, the sound recordings of the Plaintiff Attorney's video recordings for their respective typed jury selection questions still play on each juror's screen, and they orally read their respective questions making up the second half of the Plaintiff Attorney's jury selection questions to each juror. Thus, when each juror responds to the second half of the Plaintiff Attorney's jury selection questions through the invention's website, they see the Plaintiff's video recording on the screen, but they hear the sound of the Plaintiff Attorney's video recording orally read the typed question appearing on the juror's screen.

When each juror begins to orally respond to the first of the Defense Attorney's jury selection questions on the questionnaire on the invention's website in front of a webcam on a personal computer or in front of a webcam on a cellular phone, the Plaintiff's video recording will disappear, and only the Defense Attorney's respective video recording for the first of the Defense Attorney's typed jury selection questions will appear on the left side of the juror's screen in the juror's respective program in the invention's website. Only the first typed question of the Defense Attorney's typed jury selection questions will appear on the right side of the juror's screen. The Juror will only be allowed to answer one question of the Defense Attorney's jury selection questions at a time through the invention's website. Thus, when the juror attempts to answer any of the Defense Attorney's jury selection questions through the invention's website, only the one typed question of the Defense Attorney's jury selection questions that the juror attempts to answer will appear on the right side of the screen on the invention's website. When each of the first half of the Defense Attorney's typed jury selection questions first appear on the right side of the screen, the Defense Attorney's respective video recording of the Defense Attorney orally reading the particular typed question appearing on the screen appears on the left side of the juror's screen and immediately begins to play depicting the Defense Attorney orally reading the typed question to the juror, and the juror can view and hear the Defense Attorney orally reading the respective typed question in the Defense Attorney's video recording.

When each of the second half of the typed jury selection questions of the Defense Attorney first appear on the right side of each juror's screen on the invention's website, the Defense Attorney's video recording does not appear, and the Defendant's video recording of the Defendant sitting and blinking his/her eyes only appears on the left side of each juror's screen. Thus, each juror can view the Defendant's video recording while each juror orally responds to each of the second half of the Defense Attorney's jury selection questions. However, even though the Defense Attorney's video recording does not appear on each juror's screen when each juror orally responds to each of the second half of the Defense Attorney's jury selection questions and the Defendant's video recording does appear when each of the second half of the Defense Attorney's typed jury selection questions appear on each juror's screen, the sound recordings of the Defense Attorney's video recordings for their respective typed jury selection questions still play on each juror's screen, and they orally read their respective questions making up the second half of the Defense Attorney's jury selection questions to each juror. Thus, when each juror responds to the second half of the Defense Attorney's jury selection questions through the invention's website, they see the Defendant's video recording on the screen, but they hear the sound of the Defense Attorney's video recording orally read the typed question appearing on the juror's screen.

Once the deadline for all of the jurors to respond to the jury selection questionnaire through the invention's website expires, the invention automatically sends email messages to the personal email accounts of the Judge, the Plaintiff Attorney, the Defense Attorney, the Plaintiff, the Defendant, and the Court Reporter that informs them that the deadline for the jurors to respond to the questionnaire through the invention's website has expired, and the Court Reporter must now log onto the invention's website and view and listen to each juror's oral response to each question on the questionnaire from the juror's respective video recording and transcribe each juror's response into a typed format under each question on each juror's respective jury selection questionnaire into the invention's website. Additionally, once the deadline for all of the jurors to respond to the jury selection questionnaire through the invention's website expires, the invention sends text messages to the personal cellular phones of the Judge, the Plaintiff Attorney, the Defense Attorney, the Plaintiff, the Defendant, and the Court Reporter advising them that their participation is now required through the invention's website, and they must now check their personal email accounts for instructive email messages and complete their respective tasks through the invention's website.

Once the deadline for all of the jurors to respond to the jury selection questionnaire through the invention's website expires, the Court Reporter logs onto the invention's website and views and listens to each juror's oral response to each question on the questionnaire from the juror's respective video recording and transcribes each juror's response into a typed format under each question on each juror's respective jury selection questionnaire into the invention's website.

Once the Court Reporter transcribes each juror's response into a typed format under each question on each juror's respective jury selection questionnaire through the invention's website, the invention automatically sends email messages to the personal email accounts of the Judge, the Plaintiff Attorney, the Defense Attorney, the Plaintiff, and the Defendant that they may view, through their respective programs in the invention's website, each juror's video recordings of each juror's responses to each respective question on the questionnaire and view each juror's transcribed typed response to each respective question on each juror's respective jury selection questionnaire and may make typed notes and analyze each juror's video recordings and typed responses through their respective programs in the invention's website. The email message further instructs them that the Plaintiff may now submit a confidential typed analysis of each juror's video recordings and typed responses to the Plaintiff Attorney's respective program through the invention's website to be used as recommendations by the Plaintiff Attorney when the Plaintiff Attorney determines which jurors to strike with a challenge for cause or a peremptory challenge. The email message further instructs them that the Defendant may now submit a confidential typed analysis of each juror's video recordings and typed responses to the Defense Attorney's respective program through the invention's website to be used as recommendations by the Defense Attorney when the Defense Attorney determines which jurors to strike with a challenge for cause or a peremptory challenge. The invention sends an email message to the personal email account of the Court Reporter to print through the invention's website each juror's transcribed typed responses under their respective typed questions on each juror's respective jury selection questionnaire and print all email messages sent to all of the parties, and the Court Reporter is instructed to place each juror's printed jury selection questionnaire and each printed email message sent to each party in the Court's file for transcript purposes. Additionally, once the Court Reporter transcribes each juror's response into a typed format under each question on each juror's respective jury selection questionnaire through the invention's website, the invention sends text messages to the personal cellular phones of the Judge, the Plaintiff Attorney, the Defense Attorney, the Plaintiff, the Defendant, and the Court Reporter advising them that their participation is now required through the invention's website, and they must now check their personal email accounts for instructive email messages and complete their respective tasks through the invention's website.

The invention allows the Plaintiff Attorney and the Defense Attorney to hire their own respective Professional Jury Consultant through the invention's website to provide a confidential typed analysis of each juror's video recordings of the juror's responses to the jury selection questionnaire and each juror's transcribed typed responses to the juror's respective jury selection questionnaire to their respective attorneys through the invention's website. A Professional Jury Consultant's analysis of each juror can advise the consultant's respective attorney on which potential jurors to exclude with either a challenge for cause or a peremptory challenge through the website. If the Plaintiff Attorney hired a Professional Jury Consultant through the website to provide a confidential analysis of each juror's video recordings and typed responses to the Plaintiff Attorney's respective program in the invention's website, the invention sends an email message to the personal email account of the Plaintiff Attorney's selected Professional Jury Consultant instructing him/her to provide the Plaintiff Attorney with a confidential typed analysis of each juror's video recordings of the juror's responses to the jury selection questionnaire and each juror's transcribed typed responses to the juror's respective jury selection questionnaire through the invention's website and into the Plaintiff Attorney's respective program. Additionally, if the Plaintiff Attorney hired a Professional Jury Consultant through the invention's website to provide a confidential analysis of each juror's video recordings and typed responses to the Plaintiff Attorney's respective program in the invention's website, the invention sends text messages to the personal cellular phone of the Plaintiff Attorney's selected Professional Jury Consultant advising him/her that his/her participation is now required through the invention's website, and he/she must now check his/her personal email account for instructive email messages and complete his/her respective tasks through the invention's website.

If the Defense Attorney hired a Professional Jury Consultant through the invention's website to provide a confidential typed analysis of each juror's video recordings and typed responses to the Defense Attorney's respective program in the invention's website, the invention sends an email message to the personal email account of the Defense Attorney's selected Professional Jury Consultant instructing him/her to provide the Defense Attorney with a confidential typed analysis of each juror's video recordings of the juror's responses to the jury selection questionnaire and each juror's transcribed typed responses to the juror's respective jury selection questionnaire through the invention's website and into the Defense Attorney's respective program. Additionally, if the Defense Attorney hired a Professional Jury Consultant through the invention's website to provide a confidential analysis of each juror's video recordings and typed responses to the Defense Attorney's respective program in the invention's website, the invention sends text messages to the personal cellular phone of the Defense Attorney's selected Professional Jury Consultant advising him/her that his/her participation is now required through the invention's website, and he/she must now check his/her personal email account for instructive email messages and complete his/her respective tasks through the invention's website.

Once the Court Reporter transcribes each juror's responses into the invention's website, the Judge, Plaintiff Attorney, Defense Attorney, Plaintiff, Defendant, any selected Plaintiff Attorney's Professional Jury Consultant, and any selected Defense Attorney's Professional Jury Consultant, in their respective programs, then view and listen to each juror's video recorded responses through the invention's website on the left half of their respective screens. Directly below each juror's video recorded responses on the screens of the Judge, Plaintiff Attorney, Defense Attorney, Plaintiff, Defendant, Plaintiff Attorney's Professional Jury Consultant, and Defense Attorney's Professional Jury Consultant appears the respective juror's picture of his/her driver's license or photo identification card with the driver's license number or identification number blocked out. On the right half of the screen, they also view the respective transcribed typed responses under each typed question on the jury selection questionnaire of the juror's video recording that appears on the left side of the screen. Also, to the left of each typed question on each juror's transcribed jury selection questionnaire that appears on the right side of the screen on the invention's website will appear the photo of the person whose video recording was appearing on the juror's screen when the juror responded to the particular question. For example, if the Judge's video recording appeared on each juror's screen for questions 1 through 20 on the jury selection questionnaire, the Judge's photo derived from the Judge's video recording that appeared to the jurors will appear to the left of each of the typed juror qualification questions and the Judge's typed questions numbered 1 through 20 on each juror's transcribed questionnaire that is viewed by the Judge, the Plaintiff Attorney, the Defense Attorney, the Plaintiff, the Defendant, the Plaintiff Attorney's Professional Jury Consultant, and the Defense Attorney's Professional Jury Consultant on the right half of their respective screens.

Likewise, if the Plaintiff Attorney's video recording appeared on each juror's screen for questions 21 through 30 on the jury selection questionnaire, the Plaintiff Attorney's photo derived from the Plaintiff Attorney's video recording that appeared to the jurors will appear to the left of each of the Plaintiff Attorney's typed questions numbered 21 through 30 on each juror's transcribed questionnaire that is viewed by the Judge, the Plaintiff Attorney, the Defense Attorney, the Plaintiff, the Defendant, the Plaintiff Attorney's Professional Jury Consultant, and the Defense Attorney's Professional Jury Consultant on the right half of their respective screens.

Also, if the Plaintiff's video recording appeared on each juror's screen for questions 31 through 40 on the jury selection questionnaire, the Plaintiff's photo derived from the Plaintiff's video recording that appeared to the jurors will appear to the left of each of the Plaintiff Attorney's typed questions numbered 31 through 40 on each juror's transcribed questionnaire that is viewed by the Judge, the Plaintiff Attorney, the Defense Attorney, the Plaintiff, the Defendant, the Plaintiff Attorney's Professional Jury Consultant, and the Defense Attorney's Professional Jury Consultant on the right half of their respective screens.

Additionally, if the Defense Attorney's video recording appeared on each juror's screen for questions 41 through 50 on the jury selection questionnaire, the Defense Attorney's photo derived from the Defense Attorney's video recording that appeared to the jurors will appear to the left of each of the Defense Attorney's typed questions numbered 41 through 50 on each juror's transcribed questionnaire that is viewed by the Judge, the Plaintiff Attorney, the Defense Attorney, the Plaintiff, the Defendant, the Plaintiff Attorney's Professional Jury Consultant, and the Defense Attorney's Professional Jury Consultant on the right half of their respective screens.

Also, if the Defendant's video recording appeared on each juror's screen for questions 51 through 60 on the jury selection questionnaire, the Defendant's photo derived from the Defendant's video recording that appeared to the jurors will appear to the left of each of the Defense Attorney's typed questions numbered 51 through 60 on each juror's transcribed questionnaire that is viewed by the Judge, the Plaintiff Attorney, the Defense Attorney, the Plaintiff, the Defendant, the Plaintiff Attorney's Professional Jury Consultant, and the Defense Attorney's Professional Jury Consultant on the right half of their respective screens.

The photos next to their respective typed questions on the transcribed jury selection questionnaires for each juror which symbolizes which person's video recording was appearing on each juror's screen when each juror responded to the questionnaire provides the Judge, the Plaintiff Attorney, the Defense Attorney, the Plaintiff, the Defendant, the Plaintiff Attorney's Professional Jury Consultant, and the Defense Attorney's Professional Jury Consultant with an opportunity to see how each juror responds to the individual video profiles of the Judge, the Plaintiff Attorney, the Defense Attorney, the Plaintiff, and the Defendant. For example, if the Defense Attorney wanted to know how each juror will respond to the Defendant's physical appearance, and if the Defendant's video recording appeared to the juror's on questions 51 through 60, the Defense Attorney could watch each juror's video recorded responses for questions 51 through 60 through the invention's website, and the Defense Attorney can see how each juror reacts to seeing the Defendant's video recording. Thus, by knowing whose specific video recording was playing on the jurors' screens when the jurors responded to the jury selection questions, the Judge, the Plaintiff Attorney, the Defense Attorney, the Plaintiff, the Defendant, the Plaintiff Attorney's Professional Jury Consultant, and the Defense Attorney's Professional Jury Consultant can see nonverbal clues as to how each juror responds to the video recordings of the Judge, the Plaintiff Attorney, the Defense Attorney, the Plaintiff, and the Defendant.

Furthermore, in the invention's website, the Judge, the Plaintiff Attorney, the Defense Attorney, the Plaintiff, the Defendant, the Plaintiff Attorney's Professional Jury Consultant, and the Defense Attorney's Professional Jury Consultant can type a confidential analysis of each juror's video recorded responses and respective typed responses to the jury selection questionnaire into their own respective programs on the same screen they view each juror's respective video recorded responses and respective typed responses. Also, the invention's website instructs the Plaintiff Attorney, the Defense Attorney, the Plaintiff, the Defendant, the Plaintiff Attorney's Professional Jury Consultant, and the Defense Attorney's Professional Jury Consultant, in their respective programs, to type a confidential number from 1 through 10 based on the strength of their desire to exclude the juror with a challenge for cause or a peremptory challenge into their own respective programs in the designated space provided underneath their analysis of each juror's video recording which is on the same screen they view each juror's respective video recorded responses and respective typed responses. The invention's website instructs them that a confidential number of 10 represents the strongest desire to exclude a juror, and a confidential number of 1 represents the least desire to exclude a juror.

Once the Plaintiff Attorney, the Defense Attorney, the Plaintiff, the Defendant, the Plaintiff Attorney's Professional Jury Consultant, and the Defense Attorney's Professional Jury Consultant have viewed each juror's respective video recorded responses and respective typed responses and typed a confidential analysis of each juror and typed a confidential number from 1 through 10 of each juror in the respective programs in the invention's website, they may then view each of their own respective analysis and number from 1 through 10 for each juror on the same screen. When either the Plaintiff Attorney, the Defense Attorney, the Plaintiff, the Defendant, the Plaintiff Attorney's Professional Jury Consultant, or the Defense Attorney's Professional Jury Consultant view his/her own respective analysis and assigned number for each juror on the same screen in his/her respective program in the invention's website, each juror's typed name in the jury pool will appear on the screen. To the left of each juror's respective typed name will appear the respective picture of the juror derived from the juror's respective video recording. To the left of each juror's respective picture will appear his/her respective confidential typed number from 1 through 10. Below the juror's respective name, picture, and confidential number will appear his/her respective typed analysis of the respective juror appearing directly below the juror's name. On the screen, the jurors will be placed in order based on their respective confidential number. The jurors' names will appear in order from the highest confidential numbers to the lowest confidential numbers. For example, all jurors assigned a confidential number of 10 will appear in alphabetical order at the top of the screen. All jurors assigned a confidential number of 9 will appear in alphabetical order below the last juror assigned a number 10 on the screen etc.

Additionally, the Plaintiff and the Defendant can send their confidential analysis and confidential number of each juror to their respective attorney's program through the invention's website. Also, the Plaintiff Attorney's Professional jury consultant and the Defense Attorney's Professional Jury Consultant can send their confidential analysis and confidential number of each juror to their respective attorney's program through the invention's website.

If the Plaintiff sends his/her confidential analysis and confidential number of each juror to the Plaintiff Attorney's respective program in the invention's website, the invention sends an email message to the personal email account of the Plaintiff Attorney advising that the Plaintiff has submitted his/her confidential analysis and confidential number of each juror to the Plaintiff Attorney, and the Plaintiff Attorney may now log into his/her respective program in the invention's website and view the Plaintiff's analysis and number of each juror. Additionally, if the Plaintiff sends his/her confidential analysis and confidential number of each juror to the Plaintiff Attorney's respective program in the invention's website, the invention sends a text message to the personal cellular phone of the Plaintiff Attorney advising him/her that his/her participation is now required through the invention's website, and he/she must now check his/her personal email account for instructive email messages and complete his/her respective tasks through the invention's website.

Likewise, if the Defendant sends his/her confidential analysis and confidential number of each juror to the Defense Attorney's respective program in the invention's website, the invention sends an email message to the personal email account of the Defense Attorney advising that the Defendant has submitted his/her confidential analysis and confidential number of each juror to the Defense Attorney, and the Defense Attorney may now log into his/her respective program in the invention's website and view the Defendant's analysis and number of each juror. Additionally, if the Defendant sends his/her confidential analysis and confidential number of each juror to the Defense Attorney's respective program in the invention's website, the invention sends a text message to the personal cellular phone of the Defense Attorney advising him/her that his/her participation is now required through the invention's website, and he/she must now check his/her personal email account for instructive email messages and complete his/her respective tasks through the invention's website.

Additionally, if the Plaintiff Attorney hired a Professional Jury Consultant to provide an analysis and number for each juror to the Plaintiff Attorney, and the Plaintiff Attorney's Professional Jury Consultant sends his/her confidential professional analysis and number of each juror to the Plaintiff Attorney's respective program in the invention's website, the invention sends an email message to the personal email account of the Plaintiff Attorney advising that the Plaintiff Attorney's Professional Jury Consultant has submitted his/her confidential analysis and number of each juror to the Plaintiff Attorney's respective program in the invention's website, and the Plaintiff Attorney may now log into his/her respective program in the invention's website and view the Plaintiff Attorney's Professional Jury Consultant's analysis and number of each juror. Additionally, if the Plaintiff Attorney hired a Professional Jury Consultant to provide an analysis and number for each juror to the Plaintiff Attorney, the invention sends a text message to the personal cellular phone of the Plaintiff Attorney advising him/her that his/her participation is now required through the invention's website, and he/she must now check his/her personal email account for instructive email messages and complete his/her respective tasks through the invention's website.

Likewise, if the Defense Attorney hired a Professional Jury Consultant to provide an analysis and number for each juror to the Defense Attorney, and the Defense Attorney's Professional Jury Consultant sends his/her confidential professional analysis and number of each juror to the Defense Attorney's respective program in the invention's website, the invention sends an email message to the personal email account of the Defense Attorney advising that the Defense Attorney's Professional Jury Consultant has submitted his/her confidential analysis of each juror to the Defense Attorney's respective program in the invention's website, and the Defense Attorney may now log into his/her respective program in the invention's website and view the Defense Attorney's Professional Jury Consultant's analysis and number of each juror. Additionally, if the Defense Attorney hired a Professional Jury Consultant to provide an analysis and number for each juror to the Defense Attorney's respective program in the invention's website, the invention sends a text message to the personal cellular phone of the Defense Attorney advising him/her that his/her participation is now required through the invention's website, and he/she must now check his/her personal email account for instructive email messages and complete his/her respective tasks through the invention's website.

If the Plaintiff and the Defendant send their confidential analysis and number of each juror to their respective attorney's program through the invention's website, the attorneys may then view their respective client's analysis and number for each juror along with each of their own respective analysis and number for each juror on the same screen. When the Plaintiff Attorney views each of his/her own analysis and number of each juror and the Plaintiff's analysis and number of each juror on the same screen in the invention's website, the Plaintiff Attorney is shown each juror's name in the jury pool, and, to the left of each juror's name, the respective picture of the juror derived from the juror's video recording appears. To the left of each juror's respective picture will appear the Plaintiff Attorney's respective confidential typed number from 1 through 10. Below the juror's respective name, picture, and confidential number will appear the Plaintiff Attorney's respective typed analysis of the respective juror appearing directly below the juror's name. Directly below the Plaintiff Attorney's individual analysis of the respective juror, the Plaintiff's respective analysis and number of the respective juror appears. On the screen, the juror names will be placed in the same order as detailed above based on the Plaintiff Attorney's confidential numbers.

Likewise, when the Defense Attorney views each of his/her own analysis and number of each juror and the Defendant's analysis and number of each juror on the same screen in the invention's website, the Defense Attorney is shown each juror's name in the jury pool, and, to the left of each juror's name, the respective picture of the juror derived from the juror's video recording appears. To the left of each juror's respective picture will appear the Defense Attorney's respective confidential typed number from 1 through 10. Below the juror's respective name, picture, and confidential number will appear the Defense Attorney's respective typed analysis of the respective juror appearing directly below the juror's name. Directly below the Defense Attorney's individual analysis of the respective juror, the Defendant's respective analysis and number of the respective juror appears. On the screen, the juror names will be placed in the same order as detailed above based on the Defense Attorney's confidential numbers.

If the Plaintiff Attorney's Professional Jury Consultant sent his/her confidential professional analysis and number of each juror to the Plaintiff Attorney's respective program through the invention's website, the Plaintiff Attorney may then view each of his/her own respective analysis and number for each juror on the same screen with his/her professional jury consultant's analysis and number of each juror and with the Plaintiff's analysis and number of each juror. When the Plaintiff Attorney views each of his/her own analysis and number of each juror and views the Plaintiff Attorney's Professional Jury Consultant's analysis and number of each juror and views the Plaintiff's analysis and number of each juror all on the same screen in the invention's website, the Plaintiff Attorney is shown each juror's name in the jury pool, and, to the left of each juror's name, the respective picture of the juror derived from the juror's video recording appears. To the left of each juror's respective picture will appear the Plaintiff Attorney's Professional Jury Consultant's confidential typed number from 1 through 10. Below the juror's respective name, picture, and Plaintiff Attorney's Professional Jury Consultant's confidential number will appear the Plaintiff Attorney's Professional Jury Consultant's respective typed analysis of the respective juror appearing directly below the juror's name. Directly below the Plaintiff Attorney's Professional Jury Consultant's individual analysis of the respective juror, the Plaintiff Attorney's respective analysis and number of the respective juror appears. Directly below the Plaintiff Attorney's individual analysis of the respective juror, the Plaintiff's respective analysis and number of the respective juror appears. On the screen, the juror names will be placed in the same order as detailed above based on the Plaintiff Attorney's Professional Jury Consultant's confidential numbers.

Likewise, if the Defense Attorney's Professional Jury Consultant sent his/her confidential professional analysis and number of each juror to the Defense Attorney's respective program through the invention's website, the Defense Attorney may then view each of his/her own respective analysis and number for each juror on the same screen with his/her Professional Jury Consultant's analysis and number of each juror and with the Defendant's analysis and number of each juror. When the Defense Attorney views each of his/her own analysis and number of each juror and views the Defense Attorney's Professional Jury Consultant's analysis and number of each juror and views the Defendant's analysis and number of each juror all on the same screen in the invention's website, the Defense Attorney is shown each juror's name in the jury pool, and, to the left of each juror's name, the respective picture of the juror derived from the juror's video recording appears. To the left of each juror's respective picture will appear the Defense Attorney's Professional Jury Consultant's confidential typed number from 1 through 10. Below the juror's respective name, picture, and Defense Attorney's Professional Jury Consultant's confidential number will appear the Defense Attorney's Professional Jury Consultant's respective typed analysis of the respective juror appearing directly below the juror's name. Directly below the Defense Attorney's Professional Jury Consultant's individual analysis of the respective juror, the Defense Attorney's respective analysis and number of the respective juror appears. Directly below the Defense Attorney's individual analysis of the respective juror, the Defendant's respective analysis and number of the respective juror appears. On the screen, the juror names will be placed in the same order as detailed above based on the Defense Attorney's Professional Jury Consultant's confidential numbers.

Once the Court Reporter transcribes each juror's response into a typed format under each question on each juror's respective jury selection questionnaire through the invention's website, the Court Reporter, in his/her respective program, prints through the invention's website each juror's transcribed typed responses under their respective typed questions on each juror's respective jury selection questionnaire and prints all email messages sent to all of the parties, and the invention's website instructs the Court Reporter to place each juror's printed jury selection questionnaire and each printed email message sent to each party in the Court's file for transcript purposes.

The invention's website instructs each attorney in their respective programs to print each analysis and number of each juror and bring them with them to the in court jury selection process. The invention's website also suggests to each attorney in their respective programs to perhaps strike the jurors with the highest assigned numbers between 1 and 10 when exercising their peremptory challenges in the in-court jury selection process.

The invention also has optional features that the Judge may select to allow attorneys to make objections to their counterpart's jury selection questions through the invention's website, and the Judge can issue rulings on such objections through the invention's website. The invention also has optional features that the Judge may select to allow attorneys to make challenges for cause through the invention's website, and the Judge can issue rulings on such challenges for cause through the invention's website. The invention also has optional features that the Judge may select to allow attorneys to make peremptory challenges in an alternating fashion through the invention's website. The invention also has optional features that the Judge may select to allow attorneys to make objections to their counterpart's peremptory challenges based on unconstitutional race and gender discrimination, and the Judge can issue rulings on such objections through the invention's website.

SPECIFIC DESCRIPTION OF THE INVENTION

A Court Administrator has his/her own program in the invention's website. He/she logs into his/her own program in the invention's website by entering his/her first name, last name, case number, and confidential code. Once in the Court Administrator program, the Court Administrator types and submits the case caption and case number. Once the case caption and case number is submitted, a new screen is presented to the Court Administrator with the case caption and case number at the top of the screen. Below the case caption and case number, the Court Administrator types the first names, last names, personal email addresses, cellular phone numbers, and assigns a confidential code for the Judge, Plaintiff Attorney, Defense Attorney, Plaintiff, if the case is civil, the Defendant, the Court Reporter, the Court Administrator, and every Professional Jury Consultant who could potentially be selected for assistance by either the Plaintiff Attorney or the Defense Attorney.

Once such information is submitted, the invention automatically processes the information submitted by the Court Administrator and sends text messages to the personal cellular phone numbers for the Judge, Plaintiff Attorney, Defense Attorney, Plaintiff, Defendant, Court Reporter, and Court Administrator. Each text message to each party says the following: "Your participation is now required through [the invention's website address appears here]. Please check your email account for an instructive email message of the task you are to complete and log onto [the invention's website address appears here] to complete your task."

Also, once such information is submitted, the invention processes the information submitted by the Court Administrator and sends email messages through the internet to the personal email addresses of the Judge, Plaintiff Attorney, Defense Attorney, Plaintiff, if the case is civil, the Defendant, the Court Reporter, and the Court Administrator. The email message sent to the Judge's personal email address contains the Judge's name, the case caption and case number, the confidential password the Court Administrator assigned for the Judge, and the invention's website address to be accessed which is an interactive link appearing at the bottom of the email message. The email message informs the Judge that he/she will need to enter such information each time he/she logs into his/her respective program on the invention's website. The email message also instructs the Judge to log into his/her individual program in the invention's website and set up the custom jury selection process that is to be used for the case. The email message also informs the Judge that each time his/her participation is required for the internet based jury selection process of the invention he/she will be notified by an email message to his/her personal email address instructing him/her of the task he/she is to complete and how he/she is to complete it. The email message also instructs the Judge to check his/her email each day for email messages from the internet based jury selection process of the invention that will instruct the Judge of his/her required participation. Also, each time the Judge's participation is required through the invention's website, the invention sends a text message to the personal cellular phone of the Judge alerting him/her that his/her participation is required and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email account for an instructive message of the task you are to complete and log onto [the invention's website address appears here] to complete your task."

The email message sent to the Plaintiff Attorney's personal email address contains the Plaintiff Attorney's name, the case caption and case number, the confidential password the Court Administrator assigned for the Plaintiff Attorney, and the invention's website address for the particular courthouse which appears as an interactive link at the bottom of the email message. The email message informs the Plaintiff Attorney that he/she will need to enter such information each time he/she logs into his/her respective program on the website. The email message also informs the Plaintiff Attorney that each time his/her participation is required through the invention's website address he/she will be notified by an email message to his/her personal email address instructing him/her of the task he/she is to complete and how he/she is to complete it. The email message also instructs the Plaintiff Attorney to check his/her email each day for email messages from the invention's website that will instruct the Plaintiff Attorney of his/her required participation. The email message also instructs the Plaintiff Attorney that the Judge has been instructed to setup the custom jury selection process that is to be used for the case. Also, each time the Plaintiff Attorney's participation is required, the invention sends a text message to the personal cellular phone of the Plaintiff Attorney alerting him/her that his/her participation is required through the invention's website and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email for an instructive message of the task you are to complete and log onto [the invention's website address appears here] to complete your task."

The email message sent to the Defense Attorney's personal email address contains the Defense Attorney's name, the case caption and case number, the confidential password the Court Administrator assigned for the Defense Attorney, and the invention's website address for the particular courthouse appears as an interactive link at the bottom of the email message. The email message informs the Defense Attorney that he/she will need to enter such information each time he/she logs into his/her respective program in the invention's website. The email message also informs the Defense Attorney that each time his/her participation is required through the invention's website he/she will be notified by an email message to his/her personal email address instructing him/her of the task he/she is to complete and how he/she is to complete it. The email message also instructs the Defense Attorney to check his/her email each day for email messages from the invention's website that will instruct the Defense Attorney of his/her required participation. The email message also instructs the Defense Attorney that the Judge has been instructed to setup the custom jury selection process that is to be used for the case. Also, each time the Defense Attorney's participation is required, the invention sends a text message to the personal cellular phone of the Defense Attorney alerting him/her that his/her participation is required and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email for an instructive message of the task you are to complete and log onto [the invention's website address appears here] to complete your task."

If the case is civil, an email message will be sent from the invention to the Plaintiff's personal email address containing the Plaintiff's name, the case caption and case number, the confidential password the Court Administrator assigned for the Plaintiff, and the invention's website address for the particular courthouse appears as an interactive link at the bottom of the email message. The email message informs the Plaintiff that he/she will need to enter such information each time he/she logs into his/her respective program on the website. The email message also informs the Plaintiff that each time he/she may participate through the invention's website he/she will be notified by an email message to his/her personal email address instructing him/her of the task he/she may complete and how he/she may complete it. The email message also instructs the Plaintiff to check his/her email each day for email messages from the invention's website that will instruct the Plaintiff of his/her optional participation. The email message also instructs the Plaintiff that the Judge has been instructed to setup the custom jury selection process that is to be used for the case. Also, each time the Plaintiff's participation is required, he/she will be notified by a text message from the invention to his/her cellular phone alerting him/her that his/her participation is required and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email for an instructive message of the task you are to complete and log onto [the invention's website address appears here] to complete your task."

The email message sent from the invention to the Defendant's personal email address contains the Defendant's name, the case caption and case number, the confidential password the Court Administrator assigned for the Defendant, and the invention's website address for the particular courthouse appears as an interactive link at the bottom of the email message. The email message informs the Defendant that he/she will need to enter such information each time he/she logs into his/her respective program in the invention's website. The email message also informs the Defendant that each time he/she may participate through the invention's website he/she will be notified by an email message from the invention to his/her personal email address instructing him/her of the task he/she may complete and how he/she may complete it. The email message also instructs the Defendant to check his/her email each day for email messages from the invention's website that will instruct the Defendant of his/her optional participation. The email message also instructs the Defendant that the Judge has been instructed to setup the custom jury selection process that is to be used for the case. Also, each time the Defendant's participation is required, he/she will be notified by a text message from the invention to his/her cellular phone alerting him/her that his/her participation is required and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email for an instructive message of the task you are to complete and log onto [the invention's website address appears here] to complete your task."

The email message sent from the invention to the Court Reporter's personal email address contains the Court Reporter's name, the case caption and case number, the confidential password the Court Administrator assigned for the Court Reporter, and the invention's website address for the particular courthouse appears as an interactive link at the bottom of the email message. The email message informs the Court Reporter that he/she will need to enter such information each time he/she logs into his/her respective program in the invention's website. The email message also informs the Court Reporter that each time his/her participation is required through the invention's website he/she will be notified by an email message from the invention to his/her personal email address instructing him/her of the task he/she is to complete and how he/she is to complete it. The email message also instructs the Court Reporter to check his/her email each day for email messages from the invention's website that will instruct the Court Reporter of his/her required participation. The email message also instructs the Court Reporter that the Judge has been instructed to setup the custom jury selection process that is to be used for the case. Also, each time the Court Reporter's participation is required, he/she will be notified by a text message from the invention to his/her cellular phone alerting him/her that his/her participation is required and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email for an instructive message of the task you are to complete and log [the invention's website address appears here] to complete your task."

The email message sent to the Court Administrator's personal email address contains the Court Administrator's name, the case caption and case number, the confidential password the Court Administrator assigned for the Court Administrator, and the invention's website address for the particular courthouse appears as an interactive link at the bottom of the email message. The email message informs the Court Administrator that he/she will need to enter such information each time he/she logs into his/her respective program in the invention's website. The email message also informs the Court Administrator that each time his/her participation is required through the invention's website he/she will be notified by an email message from the invention to his/her personal email address instructing him/her of the task he/she is to complete and how he/she is to complete it. The email message also instructs the Court Administrator to check his/her personal email account each day for email messages from the invention's website that will instruct the Court Administrator of his/her required participation. The email message also instructs the Court Administrator that the Judge has been instructed to setup the custom jury selection process that is to be used for the case. Also, each time the Court Administrator's participation is required, he/she will be notified by a text message from the invention to his/her cellular phone alerting him/her that his/her participation is required and that he/she is advised to check his/her email for an instructive message of the task he/she is to complete. Thus, each text message sent to each party will always be the same no matter what task each party is required to complete, and the text message will always say the following: "Your participation is now required through [the invention's website address appears here]. Please check your email for an instructive message of the task you are to complete and log onto [the invention's website address appears here] to complete your task."

Once the Judge receives the email message to log onto the invention's website to set up the custom jury selection process, the Judge logs into the invention's website by entering his/her first name, last name, case number, and password, the Judge is shown a Judge's Main Menu of Functions. The Judge selects "Setup of Custom Jury Selection Process" from the main menu. The Setup of Custom Jury Selection Process is divided into two sections: 1) Required Information for Setup of Custom Process, and 2) Optional Features. The Judge must complete the required information. Under the required information, the Judge first selects the jurisdiction of his/her Court which will be either federal or a particular state. The Judge then selects whether the case is civil or criminal. The Judge then enters the number of jurors to be impaneled. The Judge then enters the number of alternate jurors to be selected. The Judge then enters the number of Jurors that are to be included in the jury pool. The Judge then sets a deadline for the Plaintiff Attorney to submit jury selection questions. To prevent the unnecessary duplication of questions on the questionnaire, the Judge is instructed to set the Defense Attorney's deadline at a later date than that of the Plaintiff Attorney to allow the Defense Attorney to review the Judge's questions and the Plaintiff Attorney's questions before submitting his/her own questions. The Judge further is advised that the attorneys are allowed to have professional jury consultants and their clients send them recommended jury selection questions through the internet to their respective programs in the invention's website before they submit their jury selection questions. The Judge, therefore, is advised to give each attorney ample time to submit their jury selection questions through the invention's website so they may have adequate time to obtain recommended jury selection questions from a professional jury consultant and their clients through the invention's website. The Judge then sets the deadline for the Jurors to respond to the questionnaire through the invention's website in front of a webcam.

Under the Optional Features section, the Judge can pick and choose which features he/she would like to incorporate in his/her custom jury selection process. The features under this section are not required. The Judge can choose to allow the attorneys to object to their counterpart's jury selection questions through the invention's website. If the Judge selects this feature, the Judge would set a deadline that would be the same for the attorneys to submit their objections to their counterpart's jury selection questions through the invention's website. Also, if the Judge allows attorneys to submit such objections to their counterpart's jury selection questions through the invention's website, the Judge would be advised to set the deadline for such objections to be before the deadline for jurors to respond to the questionnaire through the invention's website in front of a webcam.

If the Judge allows attorney's to object to each other's questions through the invention's website, the Judge also has the option of allowing the attorneys to submit rebuttals to their counterpart's objections through the invention's website. If the Judge allows attorneys to submit such rebuttals through the invention's website, the Judge would then set a deadline that would be the same for both attorneys to submit rebuttals to their counterpart's objections through the invention's website. Thus, the Judge would be advised to set the deadline to submit rebuttals through the invention's website to be later than the deadline to submit objections through the invention's website and before the deadline for jurors to respond to the questionnaire through the website in front of a webcam.

Also, under "Optional Features," the Judge can choose to have both attorneys exercise their challenges for cause through the invention's website. If the Judge selects this feature, he would then set a deadline for both attorneys to submit their challenges for cause through the invention's website by the same deadline. Additionally, if the Judge chooses to allow attorneys to submit their challenges for cause through the invention's website, the Judge may also allow the attorneys to submit rebuttals to their counterpart's challenges for cause through the invention's website. If the Judge chooses to allow attorneys to submit rebuttals to challenges for cause through the invention's website, the Judge would then set a deadline for both attorneys to submit such rebuttals by the same deadline. The Judge would be advised to set the deadline for challenges for cause through the invention's website to be sometime after the deadline for the jurors to respond to the questionnaire through the invention's website to adequately allow the attorneys to review all of the juror video answered questionnaires and make informed challenges for cause through the invention's website. Also, if the Judge allows attorneys to submit rebuttals to their counterpart's challenges for cause through the invention's website, the Judge will be advised to set the deadline for rebuttals through the invention's website to be sometime after the attorneys exercise their challenges for cause through the invention's website.

Furthermore, under "Optional Features," the Judge may choose to allow attorneys to "Exercise Peremptory Challenges in an Alternating Fashion through the Website." If the Judge selects this feature, both attorneys log onto the website at the same specific date and time, and they exercise their peremptory challenges through the invention's website in an alternating fashion with the Plaintiff Attorney exercising one peremptory challenge first followed by the Defense Attorney exercising one peremptory challenge. Both attorneys alternate exercising peremptory challenges back and forth until both attorneys have exercised all of their allotted peremptory challenges through the invention's website. Additionally, if the Judge selects this feature, the Plaintiff, the Defendant, and the Judge will be allowed to log onto the website at the same date and time that the attorneys are to exercise their peremptory challenges through the invention's website and view each peremptory challenge exercise of each attorney as the attorneys exercise their peremptory challenges through the invention's website.

Thus, if the Judge selects this feature, the Judge would enter the number of peremptory challenges each attorney is allowed to exercise. The Judge would then set a specific date and time that both attorneys are to log onto the website and alternate back and forth exercising their peremptory challenges. Additionally, the Judge is advised to set the specific date and time the attorneys are to log onto the invention's website and alternate back and forth exercising their peremptory challenges at a later date than the deadline for attorneys to exercise challenges for cause through the invention's website if the Judge does not allow attorneys to submit rebuttals to challenges for cause. If the Judge allows attorneys to submit rebuttals to their counterpart's challenges for cause through the invention's website, the Judge is advised to set the specific date and time the attorneys are to log onto the invention's website and alternate back and forth exercising their peremptory challenges to be later than the deadline for attorneys to submit rebuttals to challenges for cause. The Judge would then set the amount of time each attorney will be allotted to exercise each peremptory challenge as they alternate back and forth exercising their peremptory challenges through the invention's website.

If the Judge chooses to allow attorneys to exercise their peremptory challenges through the invention's website, the Judge may also allow the attorneys to make a prima facie case of discrimination based on race and/or gender against their counterpart's peremptory challenge exercises. If the Judge selects this option, the Judge is advised to set the same deadline for both attorneys to submit such a prima facie case through the invention's website at a date sometime after the specific date and time both attorneys are to log onto the invention's website and exercise their peremptory challenges in an alternating fashion.

Once the Judge enters all required information and selects and enters any of the optional features or does not select any optional features, the setup of the custom jury selection process is complete, and the Judge selects submit to finish the process.

Immediately after the Judge completes the set up of the custom jury selection process through the invention's website, the invention sends an email message to the personal email account of the Court administrator instructing him/her that he/she must now log onto the invention's website and enter the first names, last names, and addresses of each juror who is to be in the jury pool. The Court Administrator also is instructed to assign a confidential code for each juror in the jury pool.

Also, immediately after the Judge completes the set up of the custom jury selection process through the invention's website, the invention sends a text message to the cellular phone of the Court Administrator that states as follows: "Your participation is now required through [the invention's website address appears here]. Please check your email for an instructive message of the task you are to complete and log onto [the invention's website address appears here] to complete your task."

When the Court Administrator logs onto the invention's website to enter the first names, last names, and addresses of each juror who is to be in the jury pool and to assign each juror in the jury pool a confidential code, the Court Administrator is shown a screen that contains individual spaces for the first name, last name, and address for each juror who makes up the total number of jurors the Judge ordered to be included in the jury pool in the Set up of the Custom Jury Selection Process. Below the space for the address of each juror appears a space for a confidential code. To the left of the space for a confidential code appears a button that states "Assign Confidential Code." The Court Administrator is instructed to click the "Assign Confidential Code" button with his/her mouse. Once the "Assign Confidential Code" button is clicked a confidential code appears in the space designated for a confidential code. Each confidential code that is assigned to a juror is different from all other jurors' confidential codes.

In the top margin of the screen is the number of jurors that the Judge ordered to be included in the jury pool in the Set up of the Custom Jury Selection Process. Thus, the Court Administrator is instructed to enter the first name, last name, and address and assign a confidential code for the number of jurors the Judge ordered to be included in the jury pool. In the bottom margin of the screen is a submit button. Once the Court Administrator enters the necessary information for a number of jurors that equals the total number of jurors that are to be included in the jury pool the Court Administrator selects the submit button. Once the Court Administrator selects the submit button, letter templates for each juror are automatically produced by the invention's website as described in detail below.

Also, once the Judge selects submit to finish the custom setup of the jury selection process through the invention's website, the inventions sends an email message to the personal email account of the Judge. The email message instructs the Judge to log onto the invention's designated website and produce a video message for the Jurors to view and listen to before they respond to the questionnaire.

Also, upon finishing the custom setup of the jury selection process through the invention's website, the invention sends a text message to the Judge's cellular phone alerting him/her that his/her participation is required through the invention's website and that he/she is advised to check his/her email for an instructive message of the task he/she is to complete. Such text message is the same as the quoted text message stated above.

The Judge then logs onto the invention's website and produces a video message for the Jurors to view and listen to before they respond to the questionnaire through the invention's website. Since the potential jurors will respond to the questionnaire outside of the presence of the Court, some may not take the process seriously or may say anything so as to be excused from service. Therefore, producing a video message may be desirable to establish the presence of the Court and impress a tone upon the potential jurors that not taking the process seriously or not answering the questionnaire truthfully will not be tolerated, and/or may subject potential jurors to criminal penalty under the law. Thus, before producing the video recording, the Judge will be advised to convey a message that impresses a tone upon the potential jurors of the seriousness of the online juror questioning process and to answer each question truthfully.

To produce a video message, the Judge logs onto the invention's website and selects Video Record Message to Jurors from the Judge's Main Menu of Functions. The Judge then will be shown a space designated for his/her image with a record button and a stop button directly below. The Judge simply sits in front of the webcam and clicks the "Record" button, and then begins speaking his/her message. When the Judge is finished recording his/her message, he/she then selects the "Stop" button. The Judge will be given the options of replaying his/her video message to the right of the designated space for his image. Thus, he/she will be presented with the standard options of "Stop," "Pause," "Rewind," "Play," and "Fast Forward." The Judge will also be presented with an "Erase" option. By selecting the "Erase" option, the video message of the Judge will be erased. Once it is erased, the Judge may make a new video message.

After the Judge sets up the custom jury selection process through the invention's website and makes a video message for the jurors, the invention sends an email message to the personal email account of the Judge instructing him/her to log onto the invention's website and type his/her own jury selection questions into the invention's website and produce video recordings of him/her orally reading each of the juror qualification questions of the Court's respective jurisdiction and each of his/her own jury selection questions in front of a webcam and into the invention's internet website on a personal computer or a cellular phone. The email message further instructs the Judge that the video recordings that he/she produces of his/her typed jury selection questions will be viewed by the jurors when the juror's respond to the jury selection questionnaire. The Defense Attorney, Defendant, Plaintiff Attorney, and Plaintiff will also be sent this same email message that was sent to the Judge.

Also, after making the video footage of himself/herself for the jurors through the website, the invention sends a text message to the Judge's cellular phone alerting him/her that his/her participation is required through the invention's website and that he/she is advised to check his/her email for an instructive message of the task he/she is to complete. Such text message is the same as the quoted text message stated above.

Thus, after the Judge sets up the custom jury selection process through the invention's website and makes a video message for the jurors, the Judge then types his/her own jury selection questions through the invention's website, and the Judge then orally reads each of the typed juror qualification questions for the Court's respective jurisdiction and orally reads each of his/her typed jury selection questions in front of a webcam and into the invention's internet website on a personal computer or a cellular phone making an individual video recording of each of his/her respective jury selection questions. Thus, the Judge logs onto the invention's website and selects "Submit Typed and Video Recorded Jury Selection Questions" from the Judge's Main Menu of Functions. Upon making such a selection, the Judge first types his/her jury selection questions in the invention's website. Toward the top of the screen, the Judge is shown the oath the jurors are to respond to before answering jury selection questions through the invention's website. Below the oath appear the juror qualification questions of the Court's specific jurisdiction.

In almost every federal and state jurisdiction, there are designated juror qualification questions that typically ask the following questions:

"Are you at least 18 years of age?
Are you a citizen of the United States?
Are you a resident of [particular state name appears here]?
Are you able to read, write and understand the English language?
Are you presently under an adjudication of incompetency?
Have you been convicted of a felony within the past 10 years?
Do you believe you should be excused from serving as a juror? If yes, please give reason.
Have you ever served as a juror? If yes, state whether the case was civil or criminal?
Have you or any members of your immediate family been a party to any civil or criminal lawsuit? If so, what type of lawsuit was it?"

Not all jurisdictions have the exact same juror qualification questions mentioned above. When the Judge selects the jurisdiction of his/her Court in the setup of the custom jury selection process, the exact juror qualification questions of the particular jurisdiction he/she selected will appear directly above the designated space the Judge is to type his/her jury selection questions. Only the Judge will be allowed to edit any of the Juror Qualification Questions as he/she desires.

Directly below the Juror Qualification Questions is stated "Judge's Jury Selection Questions." Directly below is the first consecutive number after the last numbered juror qualification question with a flashing cursor next to the number. The Judge then reviews and/or edit's the juror qualification questions, and then types his/her own jury selection questions. After each time the Judge finishes typing a question and presses enter, a new consecutive number automatically appears for the next question. The Judge may type as many questions as he/she sees fit. A scroll bar appears to the far right on the screen. In the bottom margin of the screen appears a spell check button and a save button. Also, in the bottom margin of the screen, a button labeled "Make Video Recordings of Jury Selection Questions" appears. The invention's website instructs the Judge that after the Judge corrects any typographical and/or spelling errors and is finished typing questions, the Judge must then select "Make Video Recordings of Jury Selection Questions" and then orally read the oath and each of the juror qualification questions for the Court's respective jurisdiction and orally read each of his/her own typed jury selection questions in front of a webcam and into the invention's website on a personal computer or a cellular phone making an individual video recording of each of his/her respective jury selection questions.

Thus, upon selecting "Make Video Recordings of Jury Selection Questions" in the bottom margin of the screen, the Judge is shown a new screen with a window on the right side of the screen. Inside the window will appear only the typed oath. Directly below the window containing the typed oath will appear a button labeled "Record." To the left of the "Record" button will appear a button labeled "Stop Recording." To the left of the button labeled "Stop Recording" will appear a button labeled "Orally Read Next Question." To the left of the window containing the typed oath will appear a window which will show the Judge's video recording as he/she records him/her orally reading the typed oath in the window in front of a webcam so the Judge can monitor the quality of each of his/her video recordings. Directly below the window that allows the Judge to monitor each of his/her video recordings will appear the options of "Pause," "Play," "Play Next Question," and "Play Previous Question." Directly below such options will appear volume control buttons to allow the Judge to raise or lower the volume of his/her recording.

The invention's website instructs the Judge that he/she must make a separate individual video recording for the oath and each of the typed juror qualification questions for the Court's respective jurisdiction and for each of his/her own typed jury selection questions with a webcam and into the invention's website. Thus, the invention's website instructs the Judge that he/she must orally read the oath and each question in front of a webcam on a personal computer or on a cellular phone into the invention's website and make a separate video recording for each question. The invention's website instructs the Judge that the judge's video recordings will read their respective questions to the jurors when the jurors respond to the juror qualification questions and the Judge's jury selection questions through the invention's website.

The invention's website instructs the Judge that to make a valid video recording for the typed oath and each typed question the Judge must sit in front of a webcam on a personal computer or a cellular phone and select the "Record" option under the window containing the typed oath. Once the Judge selects the "Record" option, the Judge's live video recording will immediately appear in the window on the left side of the screen. The Judge then orally reads only the typed oath in the window on the right side of the screen in front of the webcam. When the Judge finishes orally reading the typed oath in the window, the Judge selects the "Stop Recording" option. When the Judge selects "Stop recording," the webcam stops producing a video recording of the Judge. When the Judge selects "Orally Read Next Question," the typed oath appearing in the window on the right side of the screen that the Judge just orally read in front of a webcam disappears, and the first typed juror qualification question appears in the window. In the window containing the Judge's video recording for the typed oath, the Judge's video recording for the typed oath disappears, and the window becomes blank. Once the Judge selects the "Record" button again sitting in front of a webcam, the Judge's live video recording appears in the window on the left side of the screen. The Judge then orally reads the first typed juror qualification question in the window on the right side of the screen in front of a webcam producing a video recording of him/her orally reading the first typed juror qualification question. When the Judge finishes orally reading the first typed juror qualification question appearing in the window on the right side of the screen, the Judge selects "Orally Read Next Question" and repeats the process for the next typed question appearing in the window. The invention's website instructs the Judge to continue this pattern until he/she has produced an individual video recording for each of the typed juror qualification questions and his/her own typed jury selection questions. The invention's website captures each video recording produced by the Judge.

When the Judge finishes producing a video recording of him/her orally reading the typed oath and each typed juror qualification question and each of his/her typed jury selection questions, the invention's website instructs the Judge to check the quality of each video recording for sound and video imagery. Thus, the invention's website instructs the Judge to ensure that each of his/her video recordings clearly show him/her orally reading their respective questions, and the invention's website instructs the Judge to ensure that his/her voice can easily be heard in each video recording. The invention's website instructs the Judge that to monitor the quality of his/her video recordings he/she can play each video recording with the options appearing directly below the window that allows the Judge to monitor each of his/her video recordings which include "Pause," "Play," "Play Next Question," "Play Previous Question." Directly below such options will appear volume control buttons to allow the Judge to raise or lower the volume of his/her recording. When the Judge selects "Play," only the Judge's video recording appearing in the window will play with its respective typed question appearing in the window on the right side of the screen. When the Judge selects "Play Next Question," the video recording of the Judge orally reading the next typed question in numerical order appears in the window on the left side of the screen, and its respective typed question appears in the window on the right side of the screen. When the Judge selects "Play Previous Question," the video recording of the Judge orally reading the previous typed question in numerical order appears in the window on the left side of the screen, and its respective typed question appears in the window on the right side of the screen. The invention's website instructs the Judge that if the Judge desires to replace any of his/her video recordings for any of the typed juror qualification questions or his/her typed jury selection questions the Judge may re-record any question. To re-record a video recording for a typed question, the invention's website instructs the Judge to use the options of "Pause," "Play," "Play Next Question," "Play Previous Question" to call up the respective video recording the Judge would like to re-record in the window appearing on the left side of the screen. Once the respective video recording starts to play, the invention's website instructs the Judge to select "Pause." Upon selecting "Pause," the video recording pauses. Once the video recording pauses, the Judge selects the "Record" option under the window containing the respective typed question the Judge would like to produce a new video recording for. Once the Judge selects the "Record" option, the old video recording appearing in the window on the left side of the screen disappears, and the Judge's live video recording appears in the window on the left side of the screen. The Judge then orally reads the typed question appearing in the window on the right side of the screen. When the Judge finishes orally reading the typed question in the window, the Judge selects the "Stop Recording" option, and the new video recording replaces the old video recording.

In the top margin of the screen will appear the current date and time. In the bottom margin of the screen where the Judge produces video recordings will appear an option labeled "Authenticate and Submit." When the Judge has checked each of his/her video recordings and is satisfied with the quality of all of his/her video recordings, the website instructs the Judge to select "Authenticate and Submit." Upon the Judge selecting "Authenticate and Submit," a window appears on the Judge's screen. Below the window appears a button labeled "Take Picture and Submit." When such window appears on the screen and the Judge sits in front of a webcam, the Judge's live video recording appears in the window. When the Judge clicks "Take Picture and Submit," the invention's website captures a picture of the Judge on the Judge's screen. When the Judge's picture is taken, the Judge's video recordings, the typed juror qualification questions, and the Judge's typed jury selection questions immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the Judge's video recordings, the typed juror qualification questions, and the Judge's typed jury selection questions in their respective programs through the invention's website, the Judge's picture appears at the top of the screen. The purpose of the Judge taking his/her picture in front of a webcam before he/she submits his/her video recordings and typed questions is to prove that the Judge submitted such recordings and questions through the invention's website.

Immediately after the Judge submits his/her typed and video recorded jury selection questions through the invention's website, the invention sends email messages to the personal email accounts of the Plaintiff Attorney, Plaintiff, if the case is civil, Defense Attorney, Defendant, and Court Reporter. If the Judge selected the case is criminal in the Custom Setup of the Jury Selection Process, the Plaintiff will not be sent any email messages as the Plaintiff Attorney solely represents the State in a criminal case.

The email message to the Plaintiff Attorney will instruct the Plaintiff Attorney that he/she must log onto the invention's website and review the Judge's video recordings, the typed juror qualification questions for the Court's respective jurisdiction, and the Judge's typed jury selection questions and type his/her own jury selection questions into the invention's website and produce video recordings of him/her orally reading each of his/her jury selection questions in front of a webcam and into the invention's internet website on a personal computer or a cellular phone before the Plaintiff Attorney's deadline for the Plaintiff Attorney to submit typed and video recorded jury selection questions through the invention's website expires. The email message further instructs the Plaintiff Attorney that when he/she completes such tasks, he/she must submit his/her video recordings to the Judge, Defense Attorney, Plaintiff, and the Defendant. The email message further instructs the Plaintiff Attorney that the video recordings that he/she produces of his/her typed jury selection questions will be viewed by the jurors when the juror's respond to the jury selection questionnaire. If the case is civil, the email message further instructs the Plaintiff Attorney to make a video recording of the Plaintiff through the invention's website by having the Plaintiff sit in front of a webcam on a personal computer or a cellular phone blinking his/her eyes which will be viewed by the jurors through the invention's website when they respond to the Plaintiff Attorney's jury selection questions. The email message further advises the Plaintiff Attorney that he/she must submit such a video recording of the Plaintiff into the invention's website before the Plaintiff Attorney's deadline for the Plaintiff Attorney to submit typed and video recorded jury selection questions through the invention's website expires.

The email message to the Plaintiff Attorney will advise the Plaintiff Attorney that he/she can select and hire a professional jury consultant in his/her Plaintiff Attorney program on the invention's website to submit jury selection question recommendations to the Plaintiff Attorney through the invention's website before the Plaintiff Attorney submits his/her jury selection questions. The email message further advises the Plaintiff Attorney that if he/she hires a professional jury consultant through the invention's website to submit jury selection question recommendations to the Plaintiff Attorney through the invention's website, the Plaintiff Attorney should wait for his/her professional jury consultant to submit his/her jury selection questions to the Plaintiff Attorney before the Plaintiff Attorney submits his/her jury selection questions to the Judge, Defense Attorney, Defendant, and Plaintiff. The Plaintiff Attorney is further advised that if he/she hires a Professional Jury Consultant through the invention's website, the Plaintiff Attorney should submit his/her video recording of the Plaintiff sitting and blinking his/her eyes through the invention's website immediately before hiring a professional jury consultant through the invention's website as the Plaintiff Attorney's Professional Jury Consultant will need to view the video recording of the Plaintiff before submitting jury selection questions or an analysis of each juror to the Plaintiff Attorney's program.

If the case is civil, the email message to the Plaintiff Attorney also will advise the Plaintiff Attorney that the Plaintiff will be allowed to send the Plaintiff Attorney his/her own recommended jury selection questions through the invention's website and therefore advises the Plaintiff Attorney that he/she may want to wait until he/she receives such recommended questions before submitting his/her own questions.

The email message also advises the Plaintiff Attorney of the deadline for the Plaintiff Attorney to submit his/her video recordings and typed jury selection questions through the invention's website. The invention sends this same email message that is sent to the Plaintiff Attorney to the personal email accounts of the Judge, Defense Attorney, Defendant, and Plaintiff.

Also, after the Judge submits his/her typed and video recorded jury selection questions through the invention's website, the invention sends a text message to the Plaintiff Attorney's cellular phone alerting him/her that his/her participation is required and that he/she is advised to check his/her email for an instructive message of the task he/she is to complete. Such text message is the same as the quoted text message stated above.

Also, if the case is civil, the invention sends an email message to the personal email account of the Plaintiff which informs him/her that the Judge has submitted his/her jury selection questions and that he/she may now log onto the invention's website and review the Judge's video recordings, the typed juror qualification questions for the Court's respective jurisdiction, and the Judge's typed jury selection questions and type his/her own jury selection questions into the invention's website and submit his/her typed jury selection questions to the Plaintiff Attorney's program through the invention's website to be used by the Plaintiff Attorney as recommendations. The email message also advises the Plaintiff of the deadline for the Plaintiff Attorney to submit his/her jury selection questions through the invention's website, and it further advises that the Plaintiff must submit any recommended jury selection questions to the Plaintiff Attorney before the deadline expires.

The email message further instructs the Plaintiff that he/she must make a video recording of himself/herself through the Plaintiff Attorney's program in the invention's website by having the Plaintiff sit in front of a webcam on a personal computer or a cellular phone in the Plaintiff Attorney's respective program blinking his/her eyes which will be viewed by the jurors through the invention's website when they respond to the Plaintiff Attorney's jury selection questions. The email message further instructs the Plaintiff that he/she should schedule a time with the Plaintiff Attorney for the Plaintiff Attorney to log into his/her respective program in the invention's website to make a video recording of the Plaintiff sitting and blinking his/her eyes in front of a webcam.

The Plaintiff also will be advised that the Plaintiff Attorney can select and hire a professional jury consultant in the Plaintiff Attorney program through the invention's website to submit jury selection question recommendations to the Plaintiff Attorney through the invention's website before the Plaintiff Attorney submits his/her jury selection questions. The Judge, Defense Attorney, Defendant, and Plaintiff Attorney will also be sent the same email message from the invention that was sent to the Plaintiff.

Also, after the Judge submits his/her typed and video recorded jury selection questions through the website, the invention sends a text message to the Plaintiff's cellular phone alerting him/her that his/her participation is required and that he/she is advised to check his/her email account for an instructive message of the task he/she is to complete. Such text message is the same as the quoted text message stated above.

The invention sends email messages to the personal email accounts of the Defense Attorney and the Defendant informing them that they may now log onto the invention's website and review the Judge's video recordings, the typed juror qualification questions for the Court's respective jurisdiction, and the Judge's typed jury selection questions. The email messages also advises them that the Defense Attorney will not be allowed to submit any jury selection questions until the Plaintiff Attorney submits his/her video recordings and typed jury selection questions through the invention's website to prevent the unnecessary duplication of jury selection questions. They will also be advised in the email message of the deadline for the Plaintiff Attorney to submit his/her video recordings and typed jury selection questions through the invention's website. The Defense Attorney and the Defendant will also be advised in the email message that the Defense Attorney, in his/her Defense Attorney program in the invention's website, can select and hire a professional jury consultant to submit jury selection questions as recommendations to the Defense Attorney's program through the invention's website, at this time, and before the Defense Attorney submits his/her jury selection questions through the invention's website. The email message also advises the Defense Attorney and the Defendant of the deadline for the Defense Attorney to submit his/her jury selection questions through the invention's website.

The email messages further instruct the Defense Attorney and the Defendant that the Defense Attorney must make a video recording of the Defendant in the Defense Attorney's program through the invention's website, at this time, by having the Defendant sit in front of a webcam on a personal computer or a cellular phone blinking his/her eyes which will be viewed by the jurors through the invention's website when they respond to the Defense Attorney's jury selection questions. The email message further advises them that the Defense Attorney must submit such a video recording of the Defendant into the invention's website before the Defense Attorney's deadline for the Defense Attorney to submit typed and video recorded jury selection questions through the invention's website expires.

The email message further instructs them that if the Defense Attorney hires a Professional Jury Consultant through the invention's website, the Defense Attorney should submit his/her video recording of the Defendant sitting and blinking his/her eyes through the invention's website immediately before hiring a professional jury consultant through the invention's website as the Defense Attorney's Professional Jury Consultant will need to view the video recording of the Defendant before submitting jury selection questions or an analysis of each juror to the Defense Attorney's program through the invention's website. The Judge, Plaintiff Attorney, and the Plaintiff will also be sent the same email messages from the invention that were sent to the Defense Attorney and the Defendant.

Also, after the Judge submits his/her typed and video recorded jury selection questions through the invention's website, the invention sends a text message to the Defense Attorney's cellular phone alerting him/her that his/her participation is required and that he/she is advised to check his/her email for an instructive message of the task he/she is to complete. Such text message is the same as the quoted text message stated above.

Also, after the Judge submits his/her typed and video recorded jury selection questions through the invention's website, the invention sends a text message to the Defendant's cellular phone alerting him/her that his/her participation is required and that he/she is advised to check his/her email for an instructive message of the task he/she is to complete. Such text message is the same as the quoted text message stated above.

Also, after the Judge submits his/her typed and video recorded jury selection questions through the invention's website, the invention sends an email message to the personal email account of the Court Reporter instructing him/her to log into his/her respective program in the invention's website and print the Judge's typed jury selection questions and the date they were submitted and print all email messages that were sent to the Judge, Plaintiff Attorney, Defense Attorney, Plaintiff, and the Defendant and the dates such emails were submitted through the invention's website and place them in the Court's file for transcript purposes. The email message further advises the Court Reporter to type and transcribe all of the Judge's oral communications in each of the Judge's video recordings through the invention's website and place such transcriptions in the Court's file.

Also, after the Judge submits his/her typed and video recorded jury selection questions through the invention's website, the invention sends a text message to the Court Reporter's cellular phone alerting him/her that his/her participation is required and that he/she is advised to check his/her email for an instructive message of the task he/she is to complete. Such text message is the same as the quoted text message stated above.

Upon receiving the email message to submit a video recording of the Plaintiff sitting and blinking his/her eyes through the invention's website, the Plaintiff Attorney logs into his/her program in the invention's website and submits a video recording of the Plaintiff sitting and blinking his/her eyes through a webcam and into the invention's website. Such a video recording of the Plaintiff will appear on each juror's screen through the invention's website when each juror responds to the jury selection questionnaire through the website.

To submit such a video recording of the Plaintiff through the invention's website, the Plaintiff Attorney logs into his/her program in the invention's website and selects "Submit Video Recording of the Plaintiff" in the Plaintiff Attorney's Main Menu of Functions. Upon selecting "Submit Video Recording of the Plaintiff," the Plaintiff Attorney will be shown a space designated for the Plaintiffs video recording with a "Record" button and a "Stop" button directly below. The Plaintiff Attorney has the Plaintiff only sit in front of a webcam and selects the "Record" button. Upon selecting the "Record" button, the Plaintiff looks into the webcam for approximately 20 seconds. While the Plaintiff looks into the webcam, the Plaintiffs live video recording appears in the space designated for the Plaintiffs video recording on the screen for the Plaintiff Attorney and the Plaintiff to monitor the quality of the Plaintiffs video recording. The Plaintiff Attorney then selects the "Stop" button after the Plaintiff has been recorded for approximately 20 seconds. The Plaintiff Attorney will be given the options of replaying the Plaintiffs video recording to the right of the designated space for the Plaintiff's video recording on the screen. Thus, the Plaintiff Attorney will be presented with the standard options of "Stop," "Pause," "Rewind," "Play," and "Fast Forward." The Plaintiff Attorney will also be presented with an "Erase" option. By selecting the "Erase" option, the Plaintiff's video recording will be erased. Once it is erased, the Plaintiff Attorney may make a new video recording of the Plaintiff in the same manner as detailed above. In the bottom margin of the screen will appear a "Submit" option. Once the Plaintiff Attorney is satisfied with the Plaintiff's video recording, the invention's website instructs the Plaintiff Attorney to select "Submit." Upon selecting "Submit," the Judge, Plaintiff Attorney, Plaintiff, Defense Attorney, Defendant, Plaintiff Attorney's Professional Jury Consultant, and the Defense Attorney's Professional Jury Consultant will be able to view the Plaintiff's video recording in their respective programs.

Likewise, upon receiving the email message to submit a video recording of the Defendant sitting and blinking his/her eyes through the invention's website, the Defense Attorney logs into his/her program in the invention's website and submits a video recording of the Defendant sitting and blinking his/her eyes through a webcam and into the invention's website. Such a video recording of the Defendant will appear on each juror's screen through the invention's website when each juror responds to the jury selection questionnaire through the invention's website.

To submit such a video recording of the Defendant through the invention's website, the Defense Attorney logs into his/her program in the invention's website and selects "Submit Video Recording of the Defendant" in the Defense Attorney's Main Menu of Functions. Upon selecting "Submit Video Recording of the Defendant," the Defense Attorney will be shown a space designated for the Defendant's video recording with a "Record" button and a "Stop" button directly below. The Defense Attorney has the Defendant only sit in front of a webcam and selects the "Record" button. Upon selecting the "Record" button, the Defendant looks into the webcam for approximately 20 seconds. While the Defendant looks into the webcam, the Defendant's live video recording appears in the space designated for the Defendant's video recording on the screen for the Defense Attorney and the Defendant to monitor the quality of the Defendant's video recording. The Defense Attorney then selects the "Stop" button after the Defendant has been recorded for approximately 20 seconds. The Defense Attorney will be given the options of replaying the Defendant's video recording to the right of the designated space for the Defendant's video recording on the screen. Thus, the Defense Attorney will be presented with the standard options of "Stop," "Pause," "Rewind," "Play," and "Fast Forward." The Defense Attorney will also be presented with an "Erase" option. By selecting the "Erase" option, the Defendant's video recording will be erased. Once it is erased, the Defense Attorney may make a new video recording of the Defendant in the same manner as detailed above. In the bottom margin of the screen will appear a "Submit" option. Once the Defense Attorney is satisfied with the Defendant's video recording, the invention's website instructs the Defense Attorney to select "Submit." Upon selecting "Submit," the Judge, Plaintiff Attorney, Plaintiff, Defense Attorney, Defendant, Plaintiff Attorney's Professional Jury Consultant, and the Defense Attorney's Professional Jury Consultant will be able to view the Defendant's video recording in their respective programs.

The Court Reporter also prints all email messages the invention sent to the Defense Attorney, Defendant, and the Defense Attorney's Professional Jury Consultant and the dates such emails were submitted through the website and places them in the Court's file for transcript purposes.

The Plaintiff Attorney and the Defense Attorney may seek confidential assistance from a professional jury consultant of their choice through the invention's website who can provide them with jury selection questions through the invention's website and/or provide them, through the invention's website, with an analysis of each juror as to whether the attorney should keep or exclude the juror. Neither attorney is required to obtain any assistance from a Professional Jury Consultant through the invention's website. Seeking a Professional Jury Consultant through the invention's website is merely an optional feature of the invention's website for each attorney. Thus, when the Plaintiff Attorney and Defense Attorney log into their respective programs in the invention's website, they each will be provided with a "Seek Assistance from Professional Jury Consultants" option in their respective Main Menu of Functions in their respective programs. When they select "Seek Assistance from Professional Jury Consultants," the attorneys are shown a list of individual professional jury consultants and professional jury consultant firms throughout the world. Under the names of the consultants are their credentials such as years of experience and major achievements. Under their credentials, their price or rate per hour for providing jury selection questions to an attorney and their price or rate per hour for providing an analysis of each juror as to whether to keep the juror or exclude the juror are shown. Thus, the attorney can choose the scope of the consultant's assistance in that the attorney can receive jury selection questions from the consultant and/or receive an analysis of each juror as to whether the attorney should keep or exclude the juror all through the invention's website. The names of the consultants are interactive. When an attorney clicks on the name of a consultant, he/she is shown the website of the consultant to further research the consultant.

After the attorney has selected a consultant and has selected the scope of the consultant's assistance through the invention's website, the attorney is shown a screen to make the payment for the consultant's services. Thus, the attorney would be allowed to pay for the consultant's services with a credit or debit card.

After the attorney has completed the payment for the consultant's services through the invention's website, the attorney is shown a screen on the invention's designated website that asks him a battery of questions that the consultant needs answered by the attorney to provide the best possible product for the attorney. For example, the attorney is asked about the nature of the case such as whether the case is criminal or civil and the issues of the case and the facts and evidence supporting or negating the issues. The attorney will then be asked if he is representing the state, plaintiff, or defendant. The attorney then will be asked about the details of his client such as the client's race, gender, socio-economic status, sexual orientation, age, hygiene, clothes, hair style, facial hair, tattoos and their locations, attitudes, behavior patterns, demeanor etc. If the case is criminal, the attorney will be asked about the nature of the victim. If the case is civil, the attorney will be asked about the nature of the other party. The attorney then types his/her responses and selects submit to complete the process.

Also, after the Judge submits his/her typed and video recorded jury selection questions through the invention's website, the Court Reporter logs into his/her respective program in the invention's website and selects "Type and Transcribe Judge's Video Recordings." Upon selecting "Type and Transcribe Judge's Video Recordings," the Court Reporter is shown the list of typed juror qualification questions and the Judge's typed jury selection questions. To the left of the typed juror qualification questions and the Judge's typed jury selection questions will appear a picture of the Judge derived from the Judge's respective video recording orally reading the particular question. When the Court Reporter clicks on anyone of the Judge's pictures, the respective video recording of the Judge begins to play on the Court Reporter's screen. Directly below each typed juror qualification question and each Judge's typed jury selection question will appear the words "Transcription of Video Recording." Thus, the Court Reporter is instructed to play each video recording for each respective typed question and type all oral communications of the Judge in each video recording next to the words "Transcription of Video Recording" under the video recording's respective typed question.

In the bottom margin of the screen will appear an option labeled "Authenticate and Submit." After the Court Reporter finishes transcribing each of the Judge's video recordings, the Court Reporter is instructed by the invention's website to select "Authenticate and Submit."

When the Court Reporter selects "Authenticate and Submit," a window appears on the Court Reporter's screen. Below the window appears a button labeled "Take Picture and Submit." When such window appears on the screen and the Court Reporter sits in front of a webcam, the Court Reporter's live video recording appears in the window. When the Court Reporter clicks "Take Picture and Submit," the invention's website captures a picture of the Court Reporter on the Court Reporter's screen. When the Court Reporter's picture is taken, the transcription of the Judge's video recordings immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the transcription of the Judge's video recordings in their respective programs through the invention's website, the Court Reporter's picture appears at the top of the screen. The purpose of the Court Reporter taking his/her picture in front of a webcam before he/she submits his/her transcriptions of the Judge's video recordings is to prove that the Court Reporter submitted such transcriptions through the invention's website.

The Court Reporter is further instructed through the invention's website to print the transcriptions of the Judge's video recordings and the typed juror qualification questions and the Judge's typed jury selection questions and the date they were submitted and print all email messages sent to the Judge, the Plaintiff Attorney, Plaintiff, Defense Attorney, and Defendant and the dates they were submitted and place them in the Court's file for transcript purposes. When the Court Reporter prints the juror qualification questions and the Judge's typed jury selection questions, each of the typed juror qualification questions and the Judge's typed jury selection questions will have a picture of the Judge derived from the Judge's video recording orally reading the respective question appearing to the left of each question to show that a video recording was made for each respective question.

Also, when the transcriptions of the Judge's video recordings are printed and the typed juror qualification questions and the Judge's typed jury selection questions are printed, the Court Reporter's picture will appear at the top of the prints to authenticate that the Court Reporter printed such documents.

If the Plaintiff Attorney chooses to select and hire a Professional Jury Consultant to provide typed jury selection questions to the Plaintiff Attorney's program through the invention's website and submits answers to the Professional Jury Consultant's general questions through the invention's website, the invention sends an email message to the personal email account of the consultant notifying the consultant that he/she has been selected to provide the Plaintiff Attorney's program in the invention's website with jury selection questions through the invention's website and that the consultant needs to log onto the invention's website and begin providing such jury selection questions. The email message sent to the consultant's personal email address contains the consultant's name, the case caption and case number, the confidential password the Court Administrator assigned for the Consultant, and the website address for the invention's website which is an interactive link appearing at the bottom of the email message for the consultant to instantaneously log onto the website. Also, in the email message, the consultant will be advised of the deadline for the Plaintiff Attorney to submit the jury selection questions and the consultant will be instructed to submit the jury selection questions to the Plaintiff Attorney's program in the invention's website at least a couple days in advance of the deadline expiring for the Plaintiff Attorney to have an adequate chance to review such questions. The invention sends this same email message that was sent to the personal email account of the Plaintiff Attorney's Professional Jury Consultant to the personal email accounts of the Plaintiff Attorney and the Plaintiff with the Plaintiff Attorney's Professional Jury Consultant's confidential password blocked out.

Also, if the Plaintiff Attorney selects and hires a Professional Jury Consultant through the invention's website to provide jury selection questions to the Plaintiff Attorney's program through the invention's website, the invention sends a text message to such consultant's cellular phone alerting him/her that his/her participation is required and that he/she is advised to check his/her email for an instructive message of the task he/she is to complete. Such text message is the same as the quoted text message stated above.

Also, if the Plaintiff Attorney selects and hires a Professional Jury Consultant through the invention's website to provide jury selection questions to the Plaintiff Attorney's program through the invention's website, the invention sends a text message to the Plaintiff Attorney's cellular phone alerting him/her that his/her participation is required and that he/she is advised to check his/her email for an instructive message of the task he/she is to complete. Such text message is the same as the quoted text message stated above.

Also, if the Plaintiff Attorney selects and hires a Professional Jury Consultant through the invention's website to provide jury selection questions to the Plaintiff Attorney's program through the invention's website, the invention sends a text message to the Plaintiff's cellular phone alerting him/her that his/her participation is required and that he/she is advised to check his/her email for an instructive message of the task he/she is to complete. Such text message is the same as the quoted text message stated above.

If the Defense Attorney chooses to select and hire a Professional Jury Consultant to provide typed jury selection questions to the Defense Attorney's program through the invention's website and submits answers to the Professional Jury Consultant's general questions through the invention's website, the invention sends an email message to the personal email account of the consultant notifying the consultant that he/she has been selected to provide the Defense Attorney's program in the invention's designated website with jury selection questions through the invention's website. The email message advises the Defense Attorney's Professional Jury Consultant that he/she should not submit recommended jury selection questions to the Defense Attorney's program through the invention's website until the Plaintiff Attorney submits his/her jury selection questions through the invention's website and the Defense Attorney's Professional Jury Consultant has reviewed the Plaintiff Attorney's jury selection questions to prevent duplication of questions. The email message advises the Defense Attorney's Professional Jury Consultant of the Plaintiff Attorney's deadline to submit jury selection questions through the invention's website and the Defense Attorney's deadline to submit jury selection questions through the website. Also, in the email message, the consultant will be instructed to submit the jury selection questions to the Defense Attorney's program in the invention's website at least a couple days in advance of the deadline expiring for the Defense Attorney to have an adequate chance to review such questions. The email message sent to the consultant's personal email address contains the consultant's name, the case caption and case number, the confidential password the Court Administrator assigned for the Consultant, and the website address for the invention's designated website which is an interactive link appearing at the bottom of the email message for the consultant to instantaneously log onto the website. The invention sends this same email message that was sent to the personal email account of the Defense Attorney's Professional Jury Consultant to the personal email accounts of the Defense Attorney and the Defendant with the Defense Attorney's Professional Jury Consultant's confidential password blocked out.

Also, if the Defense Attorney selects and hires a Professional Jury Consultant through the invention's website to provide jury selection questions to the Defense Attorney's program through the invention's website, the invention sends a text message to such consultant's cellular phone alerting him/her that his/her participation is required and that he/she is advised to check his/her email for an instructive message of the task he/she is to complete. Such text message is the same as the quoted text message stated above.

Also, if the Defense Attorney selects and hires a Professional Jury Consultant through the website to provide jury selection questions to the Defense Attorney's program through the website, the invention sends a text message to the Defense Attorney's cellular phone alerting him/her that his/her participation is required and that he/she is advised to check his/her email for an instructive message of the task he/she is to complete. Such text message is the same as the quoted text message stated above.

Also, if the Defense Attorney selects and hires a Professional Jury Consultant through the website to provide jury selection questions to the Defense Attorney's program through the website, the invention sends a text message to the Defendant's cellular phone alerting him/her that his/her participation is required and that he/she is advised to check his/her email for an instructive message of the task he/she is to complete. Such text message is the same as the quoted text message stated above.

If the Judge submits his/her typed and video recorded jury selection questions through the invention's website, and only if the Plaintiff Attorney hired a Professional Jury Consultant through the invention's website, such Professional Jury Consultant may submit jury selection recommendation questions to the Plaintiff Attorney's respective program through the invention's website. The Plaintiff Attorney's selected Professional Jury Consultant has his/her own program in the invention's website and he/she logs onto the invention's website in the same fashion as the Plaintiff Attorney, Plaintiff, Defense Attorney, Defendant, Judge, Court Reporter, and Court Administrator. Thus, the Plaintiff Attorney's Professional Jury Consultant enters his/her last name, first name, and confidential code and selects professional jury consultant and selects submit in the invention's website. Upon selecting submit, the consultant is shown the "Professional Jury Consultant's Main Menu of Functions" in the invention's website. The functions shown in the consultant's main menu is dependent upon the scope of assistance the attorney selected. For example, if the attorney only selected assistance for the consultant to produce jury selection questions and nothing else, then the only function that would appear would be "Provide Jury Selection Questions." However, if the attorney selected assistance for the consultant to produce jury selection questions and an analysis of each juror as to whether to keep a juror or exclude a juror, then the functions "Provide Jury Selection Questions" and "Provide Jury Selection Analysis" will appear.

If the Plaintiff Attorney requested the consultant produce jury selection questions to the Plaintiff Attorney's program through the invention's website, the consultant would select "Provide Jury Selection Questions." The consultant would then be shown a screen where the top right two-thirds of the screen will show the battery of questions and responses of the Plaintiff Attorney about his/her case and the Plaintiff as stated above which may be viewed in full by the consultant as a scroll bar appears on the right side. On the top left one-third of the screen, the Plaintiff's video recording of the Plaintiff sitting and blinking will appear. Below these questions and responses and video recording is space for the professional jury consultant to type the jury selection questions for the Plaintiff Attorney. Also, within the space for the consultant to type jury selection questions, the above said typed juror qualification questions will appear along with the Judge's typed jury selection questions. To the left of each of such typed questions will appear a picture of the Judge derived from the Judge's video recording for the respective question. By clicking on any of the pictures next to its respective question, the video recording of the Judge orally reading the respective questions will begin to play on the Plaintiff Attorney's Professional Jury Consultant's screen for his/her review. The consultant will be allowed to review the juror qualification questions and the Judge's jury selection questions to prevent the consultant from typing the same or similar questions. At the very top of the screen will appear the deadline for the Plaintiff Attorney to submit jury selection questions along with a warning that the consultant must submit the jury selection questions to the Plaintiff Attorney at least two days before the deadline to allow the Plaintiff Attorney to review the jury selection questions. The consultant may view all of the jury selection questions he/she types and may type as many questions as he/she desires in this designated space as a scroll bar appears to the right side. Thus, the consultant may view the responses about the case and the Plaintiff's video recording on the same screen as he/she types the jury selection questions so the consultant can tailor the jury selection questions to meet the needs of the attorney seeking the consultation. The professional jury consultant then types his/her jury selection questions and selects "Authenticate and Submit" in the bottom margin of the screen. Upon the Plaintiff Attorney's Professional Jury Consultant selecting "Authenticate and Submit," a window appears on the consultant's screen. Below the window appears a button labeled "Take Picture and Submit." When such window appears on the screen and the consultant sits in front of a webcam, the consultant's live video recording appears in the window. When the consultant clicks "Take Picture and Submit," the invention's website captures a picture of the consultant on the consultant's screen. When the Plaintiff Attorney's Professional Jury Consultant's picture is taken, the Plaintiff Attorney's Professional Jury Consultant's typed jury selection questions are made viewable and accessible to the Plaintiff Attorney in the Plaintiff Attorney's respective program through the invention's website. When the Plaintiff Attorney views the Plaintiff Attorney's Professional Jury Consultant's typed jury selection questions in the Plaintiff Attorney's respective program through the invention's website, the Plaintiff Attorney's Professional Jury Consultant's picture appears at the top of the list of the consultant's questions. The purpose of the Plaintiff Attorney's Professional Jury Consultant taking his/her picture in front of a webcam before he/she submits his/her typed questions is to prove that the Plaintiff Attorney's Professional Jury Consultant submitted such questions through the invention's website.

The Court Reporter logs onto the website and prints all email messages sent to the Plaintiff Attorney, Plaintiff, and the Plaintiff Attorney's Professional Jury Consultant and the dates such emails were submitted through the website.

If the Judge submits his/her jury selection questions through the invention's website, the Plaintiff may submit jury selection recommendation questions through the invention's website to the Plaintiff Attorney's program in the invention's website. To submit recommended jury selection questions to the Plaintiff Attorney's program through the invention's website, the Plaintiff logs onto the invention's website and selects "Submit Jury Selection Question Recommendations to Plaintiff Attorney" from the Plaintiff's Main Menu of Functions. At the top of the screen will appear the deadline for the Plaintiff Attorney to submit jury selection questions. An advisement will also appear on the screen informing the Plaintiff that the Plaintiff Attorney is not required to accept and submit any of the Plaintiff's recommended questions and that such questions are mere recommendations. Also, a warning in conspicuous red bold-faced type will appear warning the Plaintiff that such recommended questions must be submitted at least two days before the Plaintiff Attorney's deadline to submit jury selection questions expires. The warning will also advise the Plaintiff to review the Judge's video recordings, the typed Juror Qualification Questions and the Judge's typed Jury Selection Questions before submitting any jury selection questions and is advised not to unnecessarily duplicate any of such questions. Below the deadline will appear space taking up almost three-fourths of the screen where the typed Juror Qualification Questions will appear with the Judge's typed Jury Selection Questions appearing directly below the typed Juror Qualification Questions. To the left of each of such typed questions will appear a picture of the Judge derived from the Judge's video recording for the respective question. By clicking on any of the pictures next to its respective question, the video recording of the Judge orally reading the respective questions will begin to play on the Plaintiff's screen for his/her review. All typed Juror Qualification Questions and the Judge's typed Jury Selection Questions will be allowed to be viewed within the designated space as a scroll bar appears to the far right side of such space. On the bottom one-fourth of the screen will appear space designated for the Plaintiff to submit his/her recommended questions to the Plaintiff Attorney. In the left most margin in the said designated space will appear the number one with a flashing curser next to it. After each time the Plaintiff finishes typing a question and presses enter, a new consecutive number automatically appears for the next question. The Plaintiff may type as many questions as he/she sees fit. A scroll bar appears to the far right on the screen. In the bottom margin of the screen appears a spell check button and a save button. Also appearing is an option labeled "Authenticate and Submit." After the Plaintiff corrects any typographical and/or spelling errors and is finished typing questions, the Plaintiff selects the "Authenticate and Submit" button. Upon the Plaintiff selecting "Authenticate and Submit," a window appears on the Plaintiff's screen. Below the window appears a button labeled "Take Picture and Submit." When such window appears on the screen and the Plaintiff sits in front of a webcam, the Plaintiff's live video recording appears in the window. When the Plaintiff clicks "Take Picture and Submit," the invention's website captures a picture of the Plaintiff on the Plaintiff's screen. When the Plaintiff's picture is taken, the Plaintiff's typed jury selection questions are made viewable and accessible to the Plaintiff Attorney in the Plaintiff Attorney's respective program through the invention's website. When the Plaintiff Attorney views the Plaintiff's typed jury selection questions in the Plaintiff Attorney's respective program through the invention's website, the Plaintiff's picture appears at the top of the Plaintiff's list of questions. The purpose of the Plaintiff taking his/her picture in front of a webcam before he/she submits his/her typed questions is to prove that the Plaintiff submitted such questions through the invention's website.

If the Judge submits his/her typed and video recorded jury selection questions through the invention's website, and if the Plaintiff Attorney selected a Professional Jury Consultant through the invention's website, and if the Plaintiff Attorney's Professional Jury Consultant submits typed jury selection questions to the Plaintiff Attorney's program through the invention's website, the invention sends an email message to the personal email account of the Plaintiff Attorney. The email message advises the Plaintiff Attorney that his/her Professional Jury Consultant has provided him/her with professional jury selection questions, and he/she may now log onto the invention's website and view the Judge's video recordings, the typed juror qualification questions, the Judge's typed jury selection questions, the Plaintiff Attorney's Professional Jury Consultant's recommended jury selection questions, and type his/her own jury selection questions into the invention's designated website and produce video recordings of him/her orally reading each of his/her jury selection questions in front of a webcam and into the invention's designated internet website on a personal computer or a cellular phone. The invention also sends this same email message to the personal email accounts to the Judge, Defense Attorney, Defendant, and Plaintiff. If the Plaintiff Attorney did not select a Professional Jury Consultant through the invention's website, the Plaintiff Attorney will not receive this particular email message.

Also, once the Plaintiff Attorney's Professional Jury Consultant submits jury selection questions through the invention's website to the Plaintiff Attorney's program, the invention sends a text message to the Plaintiff Attorney's cellular phone alerting him/her that his/her participation is required and that he/she is advised to check his/her email for an instructive message of the task he/she is to complete. Such text message is the same as the quoted text message stated above. If the Plaintiff Attorney did not select a Professional Jury Consultant through the invention's website, the Plaintiff Attorney will not receive this particular text message.

Once the Plaintiff, if the case is civil, submits his/her jury selection questions to the Plaintiff Attorney's program in the invention's website to be used by the Plaintiff Attorney as recommendations, the invention sends an email message to the personal email account of the Plaintiff Attorney. The email message advises the Plaintiff Attorney that the Plaintiff has provided him/her with jury selection questions as recommendations in the Plaintiff Attorney's program in the invention's website, and the Plaintiff Attorney may now log onto the invention's website and view the Judge's video recordings, the typed juror qualification questions, the Judge's typed jury selection questions, the Plaintiff's recommended jury selection questions, and type his/her own jury selection questions into the invention's designated website and produce video recordings of him/her orally reading each of his/her jury selection questions in front of a webcam and into the invention's designated internet website on a personal computer or a cellular phone. The Judge, Defense Attorney, Defendant, and Plaintiff will also be sent this same email message that was sent to the Plaintiff Attorney. If the Plaintiff did not submit jury selection question recommendations to the Plaintiff Attorney through the website, the Plaintiff Attorney will not receive this particular email message.

Also, once the Plaintiff, if the case is civil, submits his/her typed jury selection questions through the invention's website to the Plaintiff Attorney's program to be used as recommendations for the Plaintiff Attorney, the invention sends a text message to the Plaintiff Attorney's cellular phone alerting him/her that his/her participation is required and that he/she is advised to check his/her email for an instructive message of the task he/she is to complete. Such text message is the same as the quoted text message stated above. If the Plaintiff did not submit jury selection question recommendations to the Plaintiff Attorney's program through the invention's website, the Plaintiff Attorney will not receive this particular text message.

If the Judge submits his/her jury selection questions through the invention's website, and if the Plaintiff Attorney selected a Professional Jury Consultant through the website, and if the Plaintiff Attorney's Professional Jury Consultant submits jury selection questions through the invention's website to the Plaintiff Attorney's program, the invention sends an email message to the personal email account of the Court Reporter instructing him/her to log onto the invention's website and print all email messages to the Judge, Plaintiff Attorney, Defense Attorney, Defendant, and Plaintiff and the dates such emails were submitted through the invention's website. Also, the invention sends a text message to the Court Reporter's cellular phone alerting him/her that his/her participation is required and that he/she is advised to check his/her email for an instructive message of the task he/she is to complete. Such text message is the same as the quoted text message stated above.

After the Judge submits his/her typed and video recorded jury selection questions through the invention's designated website, and after the Plaintiff Attorney's Professional Jury Consultant submits typed jury selection questions to the Plaintiff Attorney's program through the invention's website, and after the Plaintiff submits typed jury selection questions to the Plaintiff Attorney's program through the invention's website, the Plaintiff Attorney then types his/her own jury selection questions through the invention's designated website, and the Plaintiff Attorney then orally reads each of his/her typed jury selection questions in front of a webcam and into the invention's designated internet website on a personal computer or a cellular phone making an individual video recording of each of his/her respective jury selection questions. Thus, the Plaintiff Attorney logs onto the invention's designated website and selects "Submit Typed and Video Recorded Jury Selection Questions" from the Plaintiff Attorney's Main Menu of Functions. Upon making such a selection, the Plaintiff Attorney first types his/her jury selection questions in the invention's designated website. Toward the top of the screen, the Plaintiff Attorney is shown the typed juror qualification questions of his/her jurisdiction. Below the typed juror qualification questions will appear the Judge's typed jury selection questions if the Judge submitted his/her typed jury selection questions. To the left of each of the typed juror qualification questions and the Judge's typed questions will appear a picture of the Judge derived from the Judge's video recording for the respective question. By clicking on any of the pictures next to its respective question, the video recording of the Judge orally reading the respective question will begin to play on the Plaintiff Attorney's screen for his/her review. Only if the Plaintiff Attorney hired a Professional Jury Consultant through the invention's website to submit jury selection questions to the Plaintiff Attorney's program through the invention's website, the Professional Jury Consultant's typed jury selection questions will appear below the Judge's typed jury selection questions if the Professional Jury Consultant submitted typed jury selection questions to the Plaintiff Attorney's program through the invention's website. Directly below the Professional Jury Consultant's questions will appear the Plaintiff's recommended typed jury selection questions if the case is civil. The Professional Jury Consultant's jury selection questions will appear in green text to the Plaintiff Attorney and the Plaintiff's recommended jury selection questions will appear in red text to the Plaintiff Attorney so the Plaintiff Attorney can easily distinguish the Professional Jury Consultant's questions from the Plaintiff's jury selection questions. After the last numbered question of the Plaintiff will appear the next consecutive number with a flashing cursor next to it for the Plaintiff Attorney to draft his/her jury selection questions. After each time the Plaintiff Attorney finishes typing a question and presses enter, a new consecutive number automatically appears for the next question with a flashing cursor next to it. The invention's website instructs the Plaintiff Attorney to review each of the Juror Qualification Questions and the Judge's Jury Selection Questions before typing any jury selection questions to prevent the duplication of questions.

The Plaintiff Attorney may type as many questions as he/she sees fit. The Plaintiff Attorney may edit, delete, and/or add to the questions submitted by the Professional Jury Consultant and the Plaintiff through the invention's website. Thus, any questions the Plaintiff Attorney's Professional Jury Consultant submitted to the Plaintiff Attorney's program through the invention's website as recommendations become the Plaintiff Attorney's questions, and the Plaintiff Attorney may delete, edit, or use as his/her own any of the Plaintiff Attorney's Professional Jury Consultant's questions. Likewise, any questions the Plaintiff submitted to the Plaintiff Attorney's program through the invention's website as recommendations become the Plaintiff Attorney's questions, and the Plaintiff Attorney may delete, edit, or use as his/her own any of the Plaintiff's questions.

If the Plaintiff Attorney did not select a Professional Jury Consultant through the invention's website, the Professional Jury Consultant's questions will not appear below the Judge's questions. Instead, if the case is civil, the Plaintiff's recommended jury selection questions will appear below the Judge's jury selection questions, and the Plaintiff Attorney may modify, delete, and/or add to the questions submitted by the Plaintiff. If the case is criminal, and the Plaintiff Attorney did not select a Professional Jury Consultant through the website, the Plaintiff Attorney would draft his/her jury selection questions after the last numbered jury selection question submitted by the Judge.

A scroll bar will appear to the right, and the Plaintiff Attorney will be able to type as many questions as he/she desires. In the top margin of the screen will appear the current date and the deadline for the Plaintiff Attorney to submit his/her typed and video recorded jury selection questions. In the bottom margin, will appear a spell check option and a save option. The Plaintiff Attorney may then select spell check to correct any spelling errors in the questions. Also, in the bottom margin will appear a save option to allow the Plaintiff Attorney to save his/her questions. Also, in the bottom margin of the screen, a button labeled "Make Video Recordings of Jury Selection Questions" appears. The invention's designated website instructs the Plaintiff Attorney that after the Plaintiff Attorney corrects any typographical and/or spelling errors and is finished typing questions, the Plaintiff Attorney must then select "Make Video Recordings of Jury Selection Questions" and then orally read each of his/her own typed jury selection questions in front of a webcam and into the invention's designated internet website on a personal computer or a cellular phone making an individual video recording of each of his/her respective jury selection questions.

Thus, upon selecting "Make Video Recordings of Jury Selection Questions" in the bottom margin of the screen, the Plaintiff Attorney is shown a new screen with a window on the right side of the screen. Inside the window will appear only the first of the Plaintiff Attorney's typed jury selection questions on the list. Directly below the window containing the typed question will appear a button labeled "Record." To the left of the "Record" button will appear a button labeled "Stop Recording." To the left of the button labeled "Stop Recording" will appear a button labeled "Orally Read Next Question." To the left of the window containing the typed question will appear a window which will show the Plaintiff Attorney's video recording as he/she records him/her orally reading the typed question in the window in front of a webcam so the Plaintiff Attorney can monitor the quality of each of his/her video recordings. Directly below the window that allows the Plaintiff Attorney to monitor each of his/her video recordings will appear the options of "Pause," "Play," "Play Next Question," and "Play Previous Question." Directly below such options will appear volume control buttons to allow the Plaintiff Attorney to raise or lower the volume of his/her recording.

The invention's designated website instructs the Plaintiff Attorney that he/she must make a separate individual video recording for each of his/her own typed jury selection questions with a webcam and into the invention's designated internet website. Thus, the invention's designated website instructs the Plaintiff Attorney that he/she must orally read each question in front of a webcam on a personal computer or on a cellular phone into the invention's designated website and make a separate video recording for each question. The invention's designated website instructs the Plaintiff Attorney that the Plaintiff Attorney's video recordings will read their respective questions to the jurors when the jurors respond to Plaintiff Attorney's jury selection questions through the invention's website.

The invention's designated website instructs the Plaintiff Attorney that to make a valid video recording for each typed question the Plaintiff Attorney must sit in front of a webcam on a personal computer or a cellular phone and select the "Record" option under the window containing the first typed Plaintiff Attorney question. Once the Plaintiff Attorney selects the "Record" option, the Plaintiff Attorney's live video recording will immediately appear in the window on the left side of the screen. The Plaintiff Attorney then orally reads only the typed question in the window on the right side of the screen in front of the webcam. When the Plaintiff Attorney finishes orally reading the typed question in the window, the Plaintiff Attorney selects the "Stop Recording" option. When the Plaintiff Attorney selects "Stop recording," the webcam stops producing a video recording of the Plaintiff Attorney. When the Plaintiff Attorney selects "Orally Read Next Question," the first typed Plaintiff Attorney question appearing in the window on the right side of the screen that the Plaintiff Attorney just orally read in front of a webcam disappears, and the second typed Plaintiff Attorney question appears in the window. In the window containing the Plaintiff Attorney's video recording for the first typed Plaintiff Attorney jury selection question, the Plaintiff Attorney's video recording for the first typed question disappears, and the window becomes blank. Once the Plaintiff Attorney selects the "Record" button again sitting in front of a webcam, the Plaintiff Attorney's live video recording appears in the window on the left side of the screen. The Plaintiff Attorney then orally reads the second typed Plaintiff Attorney question in the window on the right side of the screen in front of a webcam producing a video recording of himself/herself orally reading the second typed Plaintiff Attorney question. When the Plaintiff Attorney finishes orally reading the second typed Plaintiff Attorney question appearing in the window on the right side of the screen, the Plaintiff Attorney selects "Orally Read Next Question" and repeats the process for the next typed question appearing in the window. The invention's designated website instructs the Plaintiff Attorney to continue this pattern until he/she has produced an individual video recording for each of his/her own typed jury selection questions. The invention's designated website captures each video recording produced by the Plaintiff Attorney.

When the Plaintiff Attorney finishes producing a video recording of him/her orally reading each of his/her typed jury selection questions, the invention's designated website instructs the Plaintiff Attorney to check the quality of each video recording for sound and video imagery. Thus, the invention's designated website instructs the Plaintiff Attorney to ensure that each of his/her video recordings clearly show him/her orally reading their respective questions, and the website instructs the Plaintiff Attorney to ensure that his/her voice can easily be heard in each video recording. The invention's designated website instructs the Plaintiff Attorney that to monitor the quality of his/her video recordings he/she can play each video recording with the options appearing directly below the window that allows the Plaintiff Attorney to monitor each of his/her video recordings which include "Pause," "Play," "Play Next Question," "Play Previous Question." Directly below such options will appear volume control buttons to allow the Plaintiff Attorney to raise or lower the volume of his/her recording. When the Plaintiff Attorney selects "Play," only the Plaintiff Attorney's video recording appearing in the window will play with its respective typed question appearing in the window on the right side of the screen. When the Plaintiff Attorney selects "Play Next Question," the video recording of the Plaintiff Attorney orally reading the next typed question in numerical order appears in the window on the left side of the screen, and its respective typed question appears in the window on the right side of the screen. When the Plaintiff Attorney selects "Play Previous Question," the video recording of the Plaintiff Attorney orally reading the previous typed question in numerical order appears in the window on the left side of the screen, and its respective typed question appears in the window on the right side of the screen. The invention's designated website instructs the Plaintiff Attorney that if the Plaintiff Attorney desires to replace any of his/her video recordings for any of his/her typed jury selection questions the Plaintiff Attorney may re-record any question. To re-record a video recording for a typed question, the invention's designated website instructs the Plaintiff Attorney to use the options of "Pause," "Play," "Play Next Question," "Play Previous Question" to call up the respective video recording the Plaintiff Attorney would like to re-record in the window appearing on the left side of the screen. Once the respective video recording starts to play, the website instructs the Plaintiff Attorney to select "Pause." Upon selecting "Pause," the video recording pauses. Once the video recording pauses, the Plaintiff Attorney selects the "Record" option under the window containing the respective typed question the Plaintiff Attorney would like to produce a new video recording for. Once the Plaintiff Attorney selects the "Record" option, the old video recording appearing in the window on the left side of the screen disappears, and the Plaintiff Attorney's live video recording appears in the window on the left side of the screen. The Plaintiff Attorney then orally reads the typed question appearing in the window on the right side of the screen. When the Plaintiff Attorney finishes orally reading the typed question in the window, the Plaintiff Attorney selects the "Stop Recording" option, and the new video recording replaces the old video recording.

In the top margin of the screen will appear the current date and time, and next to the current date and time will appear the deadline for the Plaintiff Attorney to submit his/her typed and video recorded jury selection questions through the invention's website. In the bottom margin of the screen where the Plaintiff Attorney produces video recordings will appear an option labeled "Authenticate and Submit" option. When the Plaintiff Attorney has checked each of his/her video recordings and is satisfied with the quality of all of his/her video recordings, the website instructs the Plaintiff Attorney to select "Authenticate and Submit." Upon the Plaintiff Attorney selecting "Authenticate and Submit," a window appears on the Plaintiff Attorney's screen. Below the window appears a button labeled "Take Picture and Submit." When such window appears on the screen and the Plaintiff Attorney sits in front of a webcam, the Plaintiff Attorney's live video recording appears in the window. When the Plaintiff Attorney clicks "Take Picture and Submit," the invention's website captures a picture of the Plaintiff Attorney on the Plaintiff Attorney's screen. When the Plaintiff Attorney's picture is taken, the Plaintiff Attorney's video recordings, and the Plaintiff Attorney's typed jury selection questions immediately become viewable and accessible to the Judge, the Plaintiff Attorney, the Defense Attorney, the Plaintiff, the Defendant, the Plaintiff Attorney's Professional Jury Consultant, the Defense Attorney's Professional Jury Consultant, and the Court Reporter in their respective programs through the invention's website. When the Judge, the Plaintiff Attorney, the Defense Attorney, the Plaintiff, the Defendant, the Plaintiff Attorney's Professional Jury Consultant, the Defense Attorney's Professional Jury Consultant, and the Court Reporter view the Plaintiff Attorney's video recordings, and the Plaintiff Attorney's typed jury selection questions in their respective programs through the invention's website, the Plaintiff Attorney's picture appears at the top of the screen. The purpose of the Plaintiff Attorney taking his/her picture in front of a webcam before he/she submits his/her video recordings and typed questions is to prove that the Plaintiff Attorney submitted such recordings and questions through the invention's website.

If the Plaintiff Attorney has submitted his/her typed and video recorded jury selection questions through the invention's website, and only if the Defense Attorney selects and hires a Professional Jury Consultant through the invention's website to provide jury selection questions to the Defense Attorney's program through the invention's website, the invention sends an email message to the personal email account of the Defense Attorney's Professional Jury Consultant notifying the consultant that he/she has been selected to provide the Defense Attorney with typed jury selection questions to the Defense Attorney's program through the invention's website and that the consultant needs to log onto the invention's website and submit such jury selection questions through the invention's website to the Defense Attorney's program. The email message sent to the consultant's personal email account further contains the invention's website address which is an interactive link appearing at the bottom of the email message for the consultant to instantaneously log onto the website. Also, in the email message, the consultant will be advised of the deadline for the Defense Attorney to submit the jury selection questions and the consultant will be instructed to submit the jury selection questions to the Defense Attorney's program at least a couple days in advance of the deadline expiring for the Defense Attorney to have an adequate chance to review such questions. The invention sends the same email message that was sent to the Defense Attorney's Professional Jury Consultant to the personal email accounts of the Judge, Defense Attorney, Defendant, Plaintiff Attorney, and Plaintiff. If the Defense Attorney did not select a Professional Jury Consultant to provide jury selection questions through the invention's website, the invention will not send such an email message to any consultant.

Also, if the Plaintiff Attorney submits his/her typed and video recorded jury selection questions through the invention's website, and only if the Defense Attorney selects and hires a Professional Jury Consultant to provide typed jury selection questions to the Defense Attorney's program through the invention's website, the invention sends a text message to the consultant's cellular phone alerting him/her that his/her participation is required and that he/she is advised to check his/her email for an instructive message of the task he/she is to complete. Such text message is the same as the quoted text message stated above. If the Defense Attorney did not select a Professional Jury Consultant to provide jury selection questions through the website, such consultant will not be sent such a text message.

Also, the invention sends an email message to the personal email account of the Defendant which informs him/her that the Plaintiff Attorney has submitted his/her typed and video recorded jury selection questions and that he/she may now log onto the invention's designated website and review the Judge's video recordings, the Plaintiff Attorney's video recordings, the typed juror qualification questions for the Court's respective jurisdiction, the Judge's typed jury selection questions, the Plaintiff Attorney's typed jury selection questions and type his/her own jury selection questions into the invention's designated website and submit his/her typed jury selection questions to the Defense Attorney's program through the invention's designated website to be used by the Defense Attorney as recommendations. The email message also advises the Defendant of the deadline for the Defense Attorney to submit his/her jury selection questions through the invention's website, and it further advises the Defendant must submit any recommended jury selection questions to the Defense Attorney at least a couple of days before the deadline expires. In the email message, an interactive link for the invention's website address is provided for the Defendant to instantaneously log onto the website.

Additionally, only if the Defense Attorney selected and hired a professional jury consultant for assistance, the email message informs the Defendant of the name of the professional jury consultant the Defense Attorney selected and hired. The invention sends this same email message that was sent to the Defendant to the personal email accounts of the Judge, Plaintiff Attorney, Defense Attorney, and the Plaintiff, if the case is civil.

Also, if the Plaintiff Attorney submits his/her typed and video recorded jury selection questions through the invention's website, the invention sends a text message to Defendant's cellular phone alerting him/her that his/her participation is required and that he/she is advised to check his/her email account for an instructive message of the task he/she is to complete. Such text message is the same as the quoted text message stated above.

If the Plaintiff Attorney submits his/her typed and video recorded jury selection questions through the invention's website, the invention sends an email message to the personal email account of the Defense Attorney instructing him/her that he/she may now submit his/her typed and video recorded jury selection questions through the invention's website. The email message to the Defense Attorney will instruct the Defense Attorney that he/she must log onto the invention's designated website and review the Judge's video recordings, the Plaintiff Attorney's video recordings, the typed juror qualification questions for the Court's respective jurisdiction, the Judge's typed jury selection questions, the Plaintiff Attorney's typed jury selection questions, and type his/her own jury selection questions into the invention's designated website and produce video recordings of him/her orally reading each of his/her jury selection questions in front of a webcam and into the invention's designated internet website on a personal computer or a cellular phone before the Defense Attorney's deadline for the Defense Attorney to submit typed and video recorded jury selection questions through the invention's website expires. The email message further instructs the Defense Attorney that when he/she completes such tasks, he/she must submit his/her video recordings to the Judge, Plaintiff Attorney, Plaintiff, and the Defendant through the invention's website. The email message further instructs the Defense Attorney that the video recordings that he/she produces of his/her typed jury selection questions will be viewed by the jurors when the juror's respond to the jury selection questionnaire. The email message further instructs the Defense Attorney that the Defendant's video recording of the Defendant sitting and blinking his/her eyes will be viewed by the jurors through the invention's designated website when they respond to the Defense Attorney's jury selection questions.

The email message further advises the Defense Attorney that if he/she hired a professional jury consultant through the invention's designated website to submit jury selection question recommendations to the Defense Attorney's program through the invention's website, the Defense Attorney should wait for his/her professional jury consultant to submit his/her jury selection questions to the Defense Attorney's program through the invention's website before the Defense Attorney submits his/her typed and video recorded jury selection questions to the Judge, Plaintiff Attorney, Defendant, and Plaintiff through the invention's website.

The email message to the Defense Attorney also will advise the Defense Attorney that the Defendant will be allowed to send the Defense Attorney his/her own recommended jury selection questions through the invention's website and therefore advises the Defense Attorney that he/she may want to wait until he/she receives such recommended questions before submitting his/her own questions.

The email message also advises the Defense Attorney of the deadline for the Defense Attorney to submit his/her video recordings and typed jury selection questions through the invention's website. Only if the Defense Attorney selected a Professional Jury Consultant through the website, the email message will also advise the Defense Attorney that email messages have been sent to the Defense Attorney's selected Professional Jury Consultant and informs him/her of the Defense Attorney's deadline to submit jury selection questions to the Defense Attorney's program through the invention's website and instructs the Professional Jury Consultant that he/she must submit his/her jury selection questions to the Defense Attorney's program through the invention's website at least two days before the Defense Attorney's deadline expires. The Defense Attorney is further advised that the Defendant has also been sent an email message informing him/her of the Defense Attorney's deadline and informing him/her that he/she may submit recommended jury selection questions to the Defense Attorney's program through the invention's website and is advised to do so at least two days before the Defense Attorney's deadline expires. The invention sends this same email message that is sent to the Defense Attorney to the personal email accounts of the Judge, Plaintiff Attorney, Defendant, and Plaintiff.

Also, after the Plaintiff Attorney submits his/her typed and video recorded jury selection questions through the invention's website, the invention sends a text message to the Defense Attorney's cellular phone alerting him/her that his/her participation is required and that he/she is advised to check his/her email for an instructive message of the task he/she is to complete. Such text message is the same as the quoted text message stated above.

If the Plaintiff Attorney submits his/her jury selection questions through the website, the invention sends an email message to the personal email account of the Court Reporter to print the Plaintiff Attorney's jury selection questions through the invention's website and place them in the Court's file for transcript purposes. The email message further advises the Court Reporter to type and transcribe all of the Plaintiff Attorney's oral communications in each of the Plaintiff Attorney's video recordings and print such transcriptions through the invention's website and place them in the Court's file for transcript purposes. Also, in the same email message, the Court Reporter is instructed to print all email messages to the Defense Attorney, Defendant, and the Defense Attorney's Professional Jury Consultant and the dates such emails were submitted through the website.

Also, if the Plaintiff Attorney submits his/her jury selection questions through the invention's website, the invention sends a text message to the Court Reporter's cellular phone alerting him/her that his/her participation is required and that he/she is advised to check his/her email for an instructive message of the task he/she is to complete. Such text message is the same as the quoted text message stated above.

If the Plaintiff Attorney submits his/her typed and video recorded jury selection questions through the invention's website, and only if the Defense Attorney hired a Professional Jury Consultant through the invention's website, such Professional Jury Consultant may submit jury selection recommendation questions to the Defense Attorney's respective program through the invention's website. The Defense Attorney's selected Professional Jury Consultant has his/her own program in the invention's website and he/she logs onto the invention's website in the same fashion as the Plaintiff Attorney, Plaintiff, Defense Attorney, Defendant, Judge, Court Reporter, and Court Administrator. Thus, the Defense Attorney's Professional Jury Consultant enters his/her last name, first name, and confidential code and selects professional jury consultant and selects submit in the invention's website. Upon selecting submit, the consultant is shown the "Professional Jury Consultant's Main Menu of Functions" in the invention's website. The functions shown in the consultant's main menu is dependent upon the scope of assistance the attorney selected. For example, if the attorney only selected assistance for the consultant to produce jury selection questions and nothing else, then the only function that would appear would be "Provide Jury Selection Questions." However, if the attorney selected assistance for the consultant to produce jury selection questions and an analysis of each juror as to whether to keep a juror or exclude a juror, then the functions "Provide Jury Selection Questions" and "Provide Jury Selection Analysis" will appear.

If the Defense Attorney requested the consultant produce jury selection questions to the Defense Attorney's program through the invention's website, the consultant would select "Provide Jury Selection Questions." The consultant would then be shown a screen where the top right two-thirds of the screen will show the battery of questions and responses of the Defense Attorney about his/her case and the Defendant as stated above which may be viewed in full by the consultant as a scroll bar appears on the right side. On the top left one-third of the screen, the Defendant's video recording of the Defendant sitting and blinking will appear. Below these questions and responses and video recording is space for the professional jury consultant to type the jury selection questions for the Defense Attorney. Also, within the space for the consultant to type jury selection questions, the above said typed juror qualification questions will appear. Below the typed juror qualification questions will appear the Judge's typed jury selection questions. Below the Judge's typed jury selection questions will appear the Plaintiff Attorney's typed jury selection questions. To the left of each of the typed juror qualification questions and each of the Judge's typed questions will appear a picture of the Judge derived from the Judge's video recording for the respective question. By clicking on any of the Judge's pictures next to its respective question, the video recording of the Judge orally reading the respective questions will begin to play on the Defense Attorney's Professional Jury Consultant's screen for his/her review. To the left of each of the Plaintiff Attorney's typed jury selection questions will appear a picture of the Plaintiff Attorney derived from the Plaintiff Attorney's video recording for the respective question. By clicking on any of the Plaintiff Attorney's pictures next to its respective question, the video recording of the Plaintiff Attorney orally reading the respective questions will begin to play on the Defense Attorney's Professional Jury Consultant's screen for his/her review. The Plaintiff's video recording of the Plaintiff sitting and blinking his/her eyes will also appear on the Defense Attorney's Professional Jury Consultant's screen for his/her review.

The consultant will be allowed to review the juror qualification questions, the Judge's jury selection questions, and the Plaintiff Attorney's jury selection questions to prevent the consultant from typing the same or similar questions. At the very top of the screen will appear the deadline for the Defense Attorney to submit jury selection questions along with a warning that the consultant must submit the jury selection questions to the Defense Attorney at least two days before the deadline to allow the Defense Attorney to review the jury selection questions. The consultant may view all of the jury selection questions he/she types and may type as many questions as he/she desires in this designated space as a scroll bar appears to the right side. Thus, the consultant may view the responses about the case, and the Defendant's video recording on the same screen as he/she types the jury selection questions so the consultant can tailor the jury selection questions to meet the needs of the attorney seeking the consultation. The professional jury consultant then types his/her jury selection questions and selects "Authenticate and Submit" in the bottom margin of the screen. Upon the Defense Attorney's Professional Jury Consultant selecting "Authenticate and Submit," a window appears on the consultant's screen. Below the window appears a button labeled "Take Picture and Submit." When such window appears on the screen and the consultant sits in front of a webcam, the consultant's live video recording appears in the window. When the consultant clicks "Take Picture and Submit," the invention's website captures a picture of the consultant on the consultant's screen. When the Defense Attorney's Professional Jury Consultant's picture is taken, the Defense Attorney's Professional Jury Consultant's typed jury selection questions are made viewable and accessible to the Defense Attorney in the Defense Attorney's respective program through the invention's website. When the Defense Attorney views the Defense Attorney's Professional Jury Consultant's typed jury selection questions in the Defense Attorney's respective program through the invention's website, the Defense Attorney's Professional Jury Consultant's picture appears at the top of the list of the consultant's questions. The purpose of the Defense Attorney's Professional Jury Consultant taking his/her picture in front of a webcam before he/she submits his/her typed questions is to prove that the Defense Attorney's Professional Jury Consultant submitted such questions through the invention's website.

Also, after the Plaintiff Attorney submits his/her typed and video recorded jury selection questions through the invention's website, the Court Reporter logs into his/her respective program in the invention's website and selects "Type and Transcribe Plaintiff Recordings," the Court Reporter is shown the list of the Plaintiff Attorney's typed jury selection questions. To the left of the Plaintiff Attorney's typed jury selection questions will appear a picture of the Plaintiff Attorney derived from the Plaintiff Attorney's respective video recording orally reading the particular question. When the Court Reporter clicks on anyone of the Plaintiff Attorney's pictures, the respective video recording of the Plaintiff Attorney begins to play on the Court Reporter's screen. Directly below each typed Plaintiff Attorney jury selection question will appear the words "Transcription of Video Recording." Thus, the Court Reporter is instructed to play each video recording for each respective typed question and type all oral communications of the Plaintiff Attorney in each video recording next to the words "Transcription of Video Recording" under the video recording's respective typed question.

In the bottom margin of the screen will appear an option labeled "Authenticate and Submit." After the Court Reporter finishes transcribing each of the Plaintiff Attorney's video recordings, the Court Reporter is instructed by the invention's website to select "Authenticate and Submit." When the Court Reporter selects "Authenticate and Submit," a window appears on the Court Reporter's screen. Below the window appears a button labeled "Take Picture and Submit." When such window appears on the screen and the Court Reporter sits in front of a webcam, the Court Reporter's live video recording appears in the window. When the Court Reporter clicks "Take Picture and Submit," the invention's website captures a picture of the Court Reporter on the Court Reporter's screen. When the Court Reporter's picture is taken, the transcription of the Plaintiff Attorney's video recordings immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the transcription of the Plaintiff Attorney's video recordings in their respective programs through the invention's website, the Court Reporter's picture appears at the top of the screen. The purpose of the Court Reporter taking his/her picture in front of a webcam before he/she submits his/her transcriptions of the Plaintiff Attorney's video recordings is to prove that the Court Reporter submitted such transcriptions through the invention's website. The Court Reporter is further instructed through the invention's website to print the transcriptions of the Plaintiff Attorney's video recordings and the Plaintiff Attorney's typed jury selection questions and place them in the Court's file for transcript purposes. When the transcriptions of the Plaintiff Attorney's video recordings are printed and the Plaintiff Attorney's typed jury selection questions are printed the Court Reporter's picture will appear at the top of the prints to authenticate that the Court Reporter transcribed such video recordings.

The Court Reporter also prints the Plaintiff Attorney's typed jury selection questions through the invention's website and places them in the Court's file for transcript purposes. The Court Reporter also prints all email messages the invention sent to the Defense Attorney, Defendant, and the Defense Attorney's Professional Jury Consultant and the dates such emails were submitted through the website and places them in the Court's file for transcript purposes.

If the Plaintiff Attorney submits his/her jury selection questions through the invention's website, the Defendant may submit jury selection recommendation questions through the invention's website to the Defense Attorney's program in the invention's website. To submit recommended jury selection questions to the Defense Attorney's program through the invention's website, the Defendant logs onto the invention's website and selects "Submit Jury Selection Question Recommendations to Defense Attorney" from the Defendant's Main Menu of Functions. At the top of the screen will appear the deadline for the Defense Attorney to submit jury selection questions. An advisement will also appear on the screen informing the Defendant that the Defense Attorney is not required to accept and submit any of the Defendant's recommended questions and that such questions are mere recommendations. Also, a warning in conspicuous red bold-faced type will appear warning the Defendant that such recommended questions must be submitted at least two days before the Defense Attorney's deadline to submit jury selection questions expires. The warning will also advise the Defendant to review the Judge's video recordings, the Plaintiff Attorney's video recordings, the typed Juror Qualification Questions, the Judge's typed Jury Selection Questions, and the Plaintiff Attorney's typed Jury Selection Questions before submitting any jury selection questions to the Defense Attorney's program through the invention's website and is advised not to unnecessarily duplicate any of such questions. Below the deadline will appear space taking up almost three-fourths of the screen where the typed Juror Qualification Questions will appear. Below the Juror Qualification Questions will appear the Judge's typed Jury Selection Questions. Below the Judge's typed Jury Selection Questions will appear the Plaintiff Attorney's typed Jury Selection Questions. To the left of each of the typed juror qualification questions and each of the Judge's typed questions will appear a picture of the Judge derived from the Judge's video recording for the respective question. By clicking on any of the Judge's pictures next to its respective question, the video recording of the Judge orally reading the respective questions will begin to play on the Defendant's screen for his/her review. To the left of each of the Plaintiff Attorney's typed jury selection questions will appear a picture of the Plaintiff Attorney derived from the Plaintiff Attorney's video recording for the respective question. By clicking on any of the Plaintiff Attorney's pictures next to its respective question, the video recording of the Plaintiff Attorney orally reading the respective questions will begin to play on the Defendant's screen for his/her review. The Plaintiff's video recording of the Plaintiff sitting and blinking his/her eyes will also appear on the Defendant's screen for his/her review.

All typed Juror Qualification Questions, the Judge's typed Jury Selection Questions, and the Plaintiff Attorney's typed Jury Selection Questions will be allowed to be viewed within the designated space as a scroll bar appears to the far right side of such space. On the bottom one-fourth of the screen will appear space designated for the Defendant to submit his/her recommended questions to the Defense Attorney. In the left most margin in the said designated space will appear the number one with a flashing curser next to it. After each time the Defendant finishes typing a question and presses enter, a new consecutive number automatically appears for the next question. The Defendant may type as many questions as he/she sees fit. A scroll bar appears to the far right on the screen. In the bottom margin of the screen appears a spell check button and a save button. Also appearing is an option labeled "Authenticate and Submit." After the Defendant corrects any typographical and/or spelling errors and is finished typing questions, the Defendant selects the "Authenticate and Submit" button. Upon the Defendant selecting "Authenticate and Submit," a window appears on the Defendant's screen. Below the window appears a button labeled "Take Picture and Submit." When such window appears on the screen and the Defendant sits in front of a webcam, the Defendant's live video recording appears in the window. When the Defendant clicks "Take Picture and Submit," the invention's website captures a picture of the Defendant on the Defendant's screen. When the Defendant's picture is taken, the Defendant's typed jury selection questions are made viewable and accessible to the Defense Attorney in the Defense Attorney's respective program through the invention's website. When the Defense Attorney views the Defendant's typed jury selection questions in the Defense Attorney's respective program through the invention's website, the Defendant's picture appears at the top of the Defendant's list of questions. The purpose of the Defendant taking his/her picture in front of a webcam before he/she submits his/her typed questions is to prove that the Defendant submitted such questions through the invention's website.

If the Plaintiff Attorney submits his/her typed and video recorded jury selection questions through the invention's website, and if the Defense Attorney selected a Professional Jury Consultant through the invention's website, and if the Defense Attorney's Professional Jury Consultant submits typed jury selection questions to the Defense Attorney's program through the invention's website, the invention sends an email message to the personal email account of the Defense Attorney. The email message advises the Defense Attorney that his/her Professional Jury Consultant has provided him/her with professional jury selection questions, and he/she may now log onto the invention's website and view the Judge's video recordings, the Plaintiff Attorney's video recording, the Plaintiffs video recording, the typed juror qualification questions, the Judge's typed jury selection questions, the Defense Attorney's Professional Jury Consultant's recommended jury selection questions, and type his/her own jury selection questions into the invention's designated website and produce video recordings of him/her orally reading each of his/her jury selection questions in front of a webcam and into the invention's designated internet website on a personal computer or a cellular phone. The invention also sends this same email message to the personal email accounts to the Judge, Plaintiff Attorney, Defendant, and Plaintiff. If the Defense Attorney did not select a Professional Jury Consultant through the invention's website, the Defense Attorney will not receive this particular email message.

Also, once the Defense Attorney's Professional Jury Consultant submits jury selection questions through the invention's website to the Defense Attorney's program, the invention sends a text message to the Defense Attorney's cellular phone alerting him/her that his/her participation is required and that he/she is advised to check his/her email for an instructive message of the task he/she is to complete. Such text message is the same as the quoted text message stated above. If the Defense Attorney did not select a Professional Jury Consultant through the invention's website, the Defense Attorney will not receive this particular text message.

Once the Defendant submits his/her jury selection questions to the Defense Attorney's program in the invention's website to be used by the Defense Attorney as recommendations, the invention sends an email message to the personal email account of the Defense Attorney. The email message advises the Defense Attorney that the Defendant has provided him/her with jury selection questions as recommendations in the Defense Attorney's program in the invention's website, and the Defense Attorney may now log onto the invention's website and view the Judge's video recordings, the Plaintiff Attorney's video recordings, the Plaintiff's video recording, the typed juror qualification questions, the Judge's typed jury selection questions, the Plaintiff Attorney's typed jury selection questions, the Defendant's recommended jury selection questions, and type his/her own jury selection questions into the invention's designated website and produce video recordings of him/her orally reading each of his/her jury selection questions in front of a webcam and into the invention's designated internet website on a personal computer or a cellular phone. The Judge, Plaintiff Attorney, Defendant, and Plaintiff will also be sent this same email message that was sent to the Defense Attorney. If the Defendant did not submit jury selection question recommendations to the Defense Attorney through the website, the Defense Attorney will not receive this particular email message.

Also, once the Defendant submits his/her typed jury selection questions through the invention's website to the Defense Attorney's program to be used as recommendations for the Defense Attorney, the invention sends a text message to the Defense Attorney's cellular phone alerting him/her that his/her participation is required and that he/she is advised to check his/her email for an instructive message of the task he/she is to complete. Such text message is the same as the quoted text message stated above. If the Defendant did not submit jury selection question recommendations to the Defense Attorney's program through the invention's website, the Defense Attorney will not receive this particular text message.

If the Plaintiff Attorney submits his/her jury selection questions through the invention's website, and if the Defense Attorney selected a Professional Jury Consultant through the invention's website, and if the Defense Attorney's Professional Jury Consultant submits jury selection questions through the invention's website to the Defense Attorney's program, the invention sends an email message to the personal email account of the Court Reporter instructing him/her to log onto the invention's website and print all email messages to the Judge, Plaintiff Attorney, Defense Attorney, Defendant, and Plaintiff and the dates such emails were submitted through the invention's website. Also, the invention sends a text message to the Court Reporter's cellular phone alerting him/her that his/her participation is required and that he/she is advised to check his/her email for an instructive message of the task he/she is to complete. Such text message is the same as the quoted text message stated above.

After the Plaintiff Attorney submits his/her typed and video recorded jury selection questions through the invention's designated website, and after the Defense Attorney's Professional Jury Consultant submits typed jury selection questions to the Defense Attorney's program through the invention's website, and after the Defendant submits typed jury selection questions to the Defense Attorney's program through the invention's website, the Defense Attorney then types his/her own jury selection questions through the invention's designated website, and the Defense Attorney then orally reads each of his/her typed jury selection questions in front of a webcam and into the invention's designated internet website on a personal computer or a cellular phone making an individual video recording of each of his/her respective jury selection questions. Thus, the Defense Attorney logs onto the invention's designated website and selects "Submit Typed and Video Recorded Jury Selection Questions" from the Defense Attorney's Main Menu of Functions. Upon making such a selection, the Defense Attorney first types his/her jury selection questions in the invention's designated website. Toward the top of the screen, the Defense Attorney is shown the typed juror qualification questions of his/her jurisdiction. Below the typed juror qualification questions will appear the Judge's typed jury selection questions if the Judge submitted his/her typed jury selection questions. Below the Judge's typed Jury Selection Questions will appear the Plaintiff Attorney's typed Jury Selection Questions. To the left of each of the typed juror qualification questions and each of the Judge's typed questions will appear a picture of the Judge derived from the Judge's video recording for the respective question. By clicking on any of the Judge's pictures next to its respective question, the video recording of the Judge orally reading the respective questions will begin to play on the Defense Attorney's screen for his/her review. To the left of each of the Plaintiff Attorney's typed jury selection questions will appear a picture of the Plaintiff Attorney derived from the Plaintiff Attorney's video recording for the respective question. By clicking on any of the Plaintiff Attorney's pictures next to its respective question, the video recording of the Plaintiff Attorney orally reading the respective questions will begin to play on the Defense Attorney's screen for his/her review. The Plaintiff's video recording of the Plaintiff sitting and blinking his/her eyes will also appear on the Defense Attorney's screen for his/her review.

Only if the Defense Attorney hired a Professional Jury Consultant through the invention's website to submit jury selection questions to the Defense Attorney's program through the invention's website, the Defense Attorney's Professional Jury Consultant's typed jury selection questions will appear below the Plaintiff Attorney's typed jury selection questions if the Defense Attorney's Professional Jury Consultant submitted typed jury selection questions to the Defense Attorney's program through the invention's website. Directly below the Defense Attorney's Professional Jury Consultant's questions will appear the Defendant's recommended typed jury selection questions. The Defense Attorney's Professional Jury Consultant's jury selection questions will appear in green text on the Defense Attorney's screen and the Defendant's recommended jury selection questions will appear in red text on the Defense Attorney's screen so the Defense Attorney can easily distinguish the Defense Attorney's Professional Jury Consultant's questions from the Defendant's jury selection questions. After the last numbered question of the Defendant will appear the next consecutive number with a flashing cursor next to it for the Defense Attorney to draft his/her jury selection questions. After each time the Defense Attorney finishes typing a question and presses enter, a new consecutive number automatically appears for the next question with a flashing cursor next to it. The invention's website instructs the Defense Attorney to review each of the Juror Qualification Questions, the Judge's Jury Selection Questions, and the Plaintiff Attorney's jury selection questions before typing any jury selection questions to prevent the duplication of questions.

The Defense Attorney may type as many questions as he/she sees fit. The Defense Attorney may edit, delete, and/or add to the questions submitted by the Defense Attorney's Professional Jury Consultant and the Defendant through the invention's website. Thus, any questions the Defense Attorney's Professional Jury Consultant submitted to the Defense Attorney's program through the invention's website as recommendations become the Defense Attorney's questions, and the Defense Attorney may delete, edit, or use as his/her own any of the Defense Attorney's Professional Jury Consultant's questions. Likewise, any questions the Defendant submitted to the Defense Attorney's program through the invention's website as recommendations become the Defense Attorney's questions, and the Defense Attorney may delete, edit, or use as his/her own any of the Defendant's questions.

If the Defense Attorney did not select a Professional Jury Consultant through the invention's website, the Defense Attorney's Professional Jury Consultant's questions will not appear below the Plaintiff Attorney's questions. Instead, the Defendant's recommended jury selection questions will appear below the Plaintiff Attorney's jury selection questions, and the Defense Attorney may modify, delete, and/or add to the questions submitted by the Defendant.

A scroll bar will appear to the right, and the Defense Attorney will be able to type as many questions as he/she desires. In the top margin of the screen will appear the current date and the deadline for the Defense Attorney to submit his/her typed and video recorded jury selection questions. In the bottom margin, will appear a spell check option and a save option. The Defense Attorney may then select spell check to correct any spelling errors in the questions. Also, in the bottom margin will appear a save option to allow the Defense Attorney to save his/her questions. Also, in the bottom margin of the screen, a button labeled "Make Video Recordings of Jury Selection Questions" appears. The invention's designated website instructs the Defense Attorney that after the Defense Attorney corrects any typographical and/or spelling errors and is finished typing questions, the Defense Attorney must then select "Make Video Recordings of Jury Selection Questions" and then orally read each of his/her own typed jury selection questions in front of a webcam and into the invention's designated internet website on a personal computer or a cellular phone making an individual video recording of each of his/her respective jury selection questions.

Thus, upon selecting "Make Video Recordings of Jury Selection Questions" in the bottom margin of the screen, the Defense Attorney is shown a new screen with a window on the right side of the screen. Inside the window will appear only the first of the Defense Attorney's typed jury selection questions on the list. Directly below the window containing the typed question will appear a button labeled "Record." To the left of the "Record" button will appear a button labeled "Stop Recording." To the left of the button labeled "Stop Recording" will appear a button labeled "Orally Read Next Question." To the left of the window containing the typed question will appear a window which will show the Defense Attorney's video recording as he/she records him/her orally reading the typed question in the window in front of a webcam so the Defense Attorney can monitor the quality of each of his/her video recordings. Directly below the window that allows the Defense Attorney to monitor each of his/her video recordings will appear the options of "Pause," "Play," "Play Next Question," and "Play Previous Question." Directly below such options will appear volume control buttons to allow the Defense Attorney to raise or lower the volume of his/her recording.

The invention's designated website instructs the Defense Attorney that he/she must make a separate individual video recording for each of his/her own typed jury selection questions with a webcam and into the invention's designated internet website. Thus, the invention's designated website instructs the Defense Attorney that he/she must orally read each question in front of a webcam on a personal computer or on a cellular phone into the invention's designated website and make a separate video recording for each question. The invention's designated website instructs the Defense Attorney that the Defense Attorney's video recordings will read their respective questions to the jurors when the jurors respond to Defense Attorney's jury selection questions through the invention's website.

The invention's designated website instructs the Defense Attorney that to make a valid video recording for each typed question the Defense Attorney must sit in front of a webcam on a personal computer or a cellular phone and select the "Record" option under the window containing the first typed Defense Attorney question. Once the Defense Attorney selects the "Record" option, the Defense Attorney's live video recording will immediately appear in the window on the left side of the screen. The Defense Attorney then orally reads only the typed question in the window on the right side of the screen in front of the webcam. When the Defense Attorney finishes orally reading the typed question in the window, the Defense Attorney selects the "Stop Recording" option. When the Defense Attorney selects "Stop recording," the webcam stops producing a video recording of the Defense Attorney. When the Defense Attorney selects "Orally Read Next Question," the first typed Defense Attorney question appearing in the window on the right side of the screen that the Defense Attorney just orally read in front of a webcam disappears, and the second typed Defense Attorney question appears in the window. In the window containing the Defense Attorney's video recording for the first typed Defense Attorney jury selection question, the Defense Attorney's video recording for the first typed question disappears, and the window becomes blank. Once the Defense Attorney selects the "Record" button again sitting in front of a webcam, the Defense Attorney's live video recording appears in the window on the left side of the screen. The Defense Attorney then orally reads the second typed Defense Attorney question in the window on the right side of the screen in front of a webcam producing a video recording of himself/herself orally reading the second typed Defense Attorney question. When the Defense Attorney finishes orally reading the second typed Defense Attorney question appearing in the window on the right side of the screen, the Defense Attorney selects "Orally Read Next Question" and repeats the process for the next typed question appearing in the window. The invention's designated website instructs the Defense Attorney to continue this pattern until he/she has produced an individual video recording for each of his/her own typed jury selection questions. The invention's designated website captures each video recording produced by the Defense Attorney.

When the Defense Attorney finishes producing a video recording of him/her orally reading each of his/her typed jury selection questions, the invention's designated website instructs the Defense Attorney to check the quality of each video recording for sound and video imagery. Thus, the invention's designated website instructs the Defense Attorney to ensure that each of his/her video recordings clearly show him/her orally reading their respective questions, and the website instructs the Defense Attorney to ensure that his/her voice can easily be heard in each video recording. The invention's designated website instructs the Defense Attorney that to monitor the quality of his/her video recordings he/she can play each video recording with the options appearing directly below the window that allows the Defense Attorney to monitor each of his/her video recordings which include "Pause," "Play," "Play Next Question," "Play Previous Question." Directly below such options will appear volume control buttons to allow the Defense Attorney to raise or lower the volume of his/her recording. When the Defense Attorney selects "Play," only the Defense Attorney's video recording appearing in the window will play with its respective typed question appearing in the window on the right side of the screen. When the Defense Attorney selects "Play Next Question," the video recording of the Defense Attorney orally reading the next typed question in numerical order appears in the window on the left side of the screen, and its respective typed question appears in the window on the right side of the screen. When the Defense Attorney selects "Play Previous Question," the video recording of the Defense Attorney orally reading the previous typed question in numerical order appears in the window on the left side of the screen, and its respective typed question appears in the window on the right side of the screen. The invention's designated website instructs the Defense Attorney that if the Defense Attorney desires to replace any of his/her video recordings for any of his/her typed jury selection questions the Defense Attorney may re-record any question. To re-record a video recording for a typed question, the invention's designated website instructs the Defense Attorney to use the options of "Pause," "Play," "Play Next Question," "Play Previous Question" to call up the respective video recording the Defense Attorney would like to re-record in the window appearing on the left side of the screen. Once the respective video recording starts to play, the website instructs the Defense Attorney to select "Pause." Upon selecting "Pause," the video recording pauses. Once the video recording pauses, the Defense Attorney selects the "Record" option under the window containing the respective typed question the Defense Attorney would like to produce a new video recording for. Once the Defense Attorney selects the "Record" option, the old video recording appearing in the window on the left side of the screen disappears, and the Defense Attorney's live video recording appears in the window on the left side of the screen. The Defense Attorney then orally reads the typed question appearing in the window on the right side of the screen. When the Defense Attorney finishes orally reading the typed question in the window, the Defense Attorney selects the "Stop Recording" option, and the new video recording replaces the old video recording.

In the top margin of the screen will appear the current date and time, and next to the current date and time will appear the deadline for the Defense Attorney to submit his/her typed and video recorded jury selection questions through the invention's website. In the bottom margin of the screen where the Defense Attorney produces video recordings will appear an option labeled "Authenticate and Submit." When the Defense Attorney has checked each of his/her video recordings and is satisfied with the quality of all of his/her video recordings, the website instructs the Defense Attorney to select "Authenticate and Submit." Upon the Defense Attorney selecting "Authenticate and Submit," a window appears on the Defense Attorney's screen. Below the window appears a button labeled "Take Picture and Submit." When such window appears on the screen and the Defense Attorney sits in front of a webcam, the Defense Attorney's live video recording appears in the window. When the Defense Attorney clicks "Take Picture and Submit," the invention's website captures a picture of the Defense Attorney on the Defense Attorney's screen. When the Defense Attorney's picture is taken, the Defense Attorney's video recordings, and the Defense Attorney's typed jury selection questions immediately become viewable and accessible to the Judge, the Plaintiff Attorney, the Defense Attorney, the Plaintiff, the Defendant, the Plaintiff Attorney's Professional Jury Consultant, the Defense Attorney's Professional Jury Consultant, and the Court Reporter in their respective programs through the invention's website. When the Judge, the Plaintiff Attorney, the Defense Attorney, the Plaintiff, the Defendant, the Plaintiff Attorney's Professional Jury Consultant, the Defense Attorney's Professional Jury Consultant, and the Court Reporter view the Defense Attorney's video recordings, and the Defense Attorney's typed jury selection questions in their respective programs through the invention's website, the Defense Attorney's picture appears at the top of the screen. The purpose of the Defense Attorney taking his/her picture in front of a webcam before he/she submits his/her video recordings and typed questions is to prove that the Defense Attorney submitted such recordings and questions through the invention's website.

If the Defense Attorney submitted his/her typed and video recorded jury selection questions through the invention's website, and if the Judge did not allow the attorneys to submit objections to jury selection questions through the invention's website in the Setup of the Custom Jury Selection Process, the invention sends an email message to the personal email account of the Judge instructing him/her that he/she may delete any of the jury selection questions and their respective video recordings on the jury selection questionnaire through the invention's website. The email message also instructs the Judge that when he/she becomes satisfied with all of the jury selection questions and their respective video recordings on the jury selection questionnaire he/she must make the jury selection questions and their respective video recordings available to the jurors through the invention's website for the jurors to orally respond to the questions in front of a webcam on a personal computer or in front of a webcam on a cellular phone. This email message sent to the Judge is also sent to the Defense Attorney, the Defendant, the Plaintiff Attorney, and the Plaintiff.

Also, if the Defense Attorney submitted his/her typed and video recorded jury selection questions through the invention's website, the inventions sends a text message to the Judge's cellular phone alerting him/her that his/her participation is required through the invention's website and that he/she is advised to check his/her email account for an instructive message of the task he/she is to complete. Such text message is the same as the quoted text message stated above.

If the Defense Attorney submitted his/her typed and video recorded jury selection questions through the invention's website, and only if the Judge elected to allow the attorneys to submit objections to jury selection questions through the invention's website in the Setup of Custom Jury Selection Process, and only if both the Plaintiff Attorney and the Defense Attorney submitted their typed and video recorded jury selection questions through the invention's website, the invention sends email messages to the personal email accounts of both the Plaintiff Attorney and the Defense Attorney after the Defense Attorney submits his/her typed and video recorded jury selection questions through the invention's website informing them that they may now log onto the invention's website and submit objections to the typed and video recorded jury selection questions through the invention's website.

The email messages sent to the attorneys states the deadline for the attorneys to submit their objections to typed and video recorded jury selection questions through the invention's website. Also the email message contains an interactive link to the invention's website address so the attorneys can instantaneously log onto the invention's website. The email message sent to the Plaintiff Attorney is also sent to the Judge, Defense Attorney, the Defendant, and the Plaintiff, if the case is civil, from the invention. Likewise, the email message sent to the Defense Attorney is also sent to the Judge, Plaintiff Attorney, the Defendant, and the Plaintiff, if the case is civil, from the invention. If the Judge did not elect to allow the attorneys to submit objections to jury selection questions through the invention's website in the Setup of Custom Jury Selection Process, the attorneys would not receive the email messages to submit such objections through the invention's website. Rather, the Plaintiff Attorney and the Defense Attorney would be sent email messages advising that the Judge may now delete any questions and their respective video recordings on the questionnaire and make it available to the jurors for responding in front of a webcam.

If the Defense Attorney submitted his/her typed and video recorded jury selection questions through the invention's website, and only if the Judge elected to allow the attorneys to submit objections to jury selection questions through the invention's website in the Setup of Custom Jury Selection Process, the invention sends text messages to the cellular phones of the Plaintiff Attorney and the Defense Attorney alerting them that their participation is required through the invention's website and that they are advised to check their email accounts for instructive messages of the tasks they are to complete. Such text messages are the same as the quoted text message stated above.

If the Defense Attorney submitted his/her typed and video recorded jury selection questions through the invention's website, the invention sends email messages to the personal email accounts of the Plaintiff and the Defendant informing them that they may now log onto the invention's website and view the Defense Attorney's typed and video recorded jury selection questions through the invention's website. Only if the Judge elected to allow the attorneys to submit objections to the typed and video recorded jury selection questions through the invention's website in the Setup of Custom Jury Selection Process, the email messages also inform the Plaintiff and the Defendant that their respective attorneys may now submit objections to the typed and video recorded jury selection questions through the invention's website, and the messages provide the deadline for when their respective attorneys are to submit their objections through the invention's website. Also the email message contains an interactive link to the invention's website address so the Plaintiff and the Defendant can instantaneously log onto the invention's website. The email message sent to the Plaintiff is also sent to the Judge, Defense Attorney, the Defendant, and the Plaintiff Attorney from the invention. Likewise, the email message sent to the Defendant is also sent to the Judge, Defense Attorney, the Plaintiff Attorney, and the Plaintiff, if the case is civil, from the invention.

If the Defense Attorney submitted his/her typed and video recorded jury selection questions through the invention's website, the invention sends text messages to the cellular phones of the Plaintiff, if the case is civil, and the Defendant alerting them that their participation is required through the invention's website and that they are advised to check their email account for an instructive message of the task they are to complete. Such text messages are the same as the quoted text message stated above.

If the Defense Attorney submitted his/her typed and video recorded jury selection questions through the invention's website, the invention sends an email message to the personal email account of the Court Reporter instructing the Court Reporter to log onto the invention's website and print the Defense Attorney's typed and video recorded jury selection questions and the date they were submitted and place them in the Court's file for transcript purposes. The email message further advises the Court Reporter to type and transcribe all of the Defense Attorney's oral communications in each of the Defense Attorney's video recordings and place such transcriptions in the Court's file for transcript purposes. Also, the email message instructs the Court Reporter to print all email messages that the invention sent to the Judge, Plaintiff Attorney, Defense Attorney, the Defendant, and the Plaintiff, if the case is civil, and the dates such emails were submitted through the website and place them in the Court's file for transcript purposes. The email message contains an interactive link to the invention's website address so the Court Reporter can instantaneously log onto the invention's website.

If the Defense Attorney submitted his/her typed and video recorded jury selection questions through the invention's website, the invention sends a text message to the cellular phone of the Court Reporter alerting him/her that his/her participation is required through the invention's website and that he/she is advised to check his/her email account for an instructive message of the task he/she is to complete. Such text message is the same as the quoted text message stated above.

If the Defense Attorney submitted his/her typed and video recorded jury selection questions through the invention's website, and if the Judge did not allow the attorneys to submit objections to jury selection questions through the invention's website, the Judge may delete any typed questions and their respective video recordings from the jury selection questionnaire in his/her respective program through the invention's website. Thus, if the Judge allows the attorneys to object to any of the questions on the questionnaire in court or outside of the invention's designated website, and if the Judge chooses to strike any of the questions based on attorney objections, the Judge may delete any of the questions on the jury selection questionnaire before it is submitted to the Jurors. For every typed question the Judge deletes on the questionnaire in the invention's internet website, the respective video recording of either the Judge or an attorney reading the particular typed question is also deleted. Also, upon the Defense Attorney submitting video recordings and typed jury selection questions, the Judge, in his/her respective program in the invention's designated website, makes the Judge's video recordings, the Plaintiff Attorney's video recordings, the Plaintiff's video recording, the Defense Attorney's video recordings, the Defendant's video recording, and the entire jury selection questionnaire consisting of the juror qualification questions, the Judge's questions, the Plaintiff Attorney's questions, and the Defense Attorney's questions available to all of the jurors in the jury pool for responding to the jury selection questionnaire in front of a webcam and through the invention's website once the Judge is satisfied with all of the typed jury selection questions and their respective video recordings. Before the Judge makes the questionnaire available to the Jurors for their responses through the invention's website, the Judge authenticates and submits the questionnaire in the same manner as detailed above.

If the Defense Attorney submitted his/her typed and video recorded jury selection questions through the invention's website, the Judge, Plaintiff Attorney, Plaintiff, Defense Attorney, and Defendant may log into their respective programs in the invention's website and view the Judge's video recordings, the Plaintiff Attorney's video recordings, the Plaintiff's video recording, the Defense Attorney's video recordings, the Defendant's video recording, and the entire jury selection questionnaire consisting of the juror qualification questions, the Judge's questions, the Plaintiff Attorney's questions, and the Defense Attorney's questions.

Only if the Judge elected to allow attorneys to object to jury selection questions through the invention's website in the Setup of Custom Jury Selection Process, and only if both the Plaintiff Attorney and the Defense Attorney submitted jury selection questions through the invention's website, both the Plaintiff Attorney and Defense Attorney log into their respective programs in the invention's website and submit objections to jury selection questions through the invention's website. The Plaintiff Attorney would select "Object to Jury Selection Questions" in the Plaintiff Attorney's Main Menu of Functions through the invention's website. Likewise, the Defense Attorney would select "Object to Jury Selection Questions" in the Defense Attorney's Main Menu of Functions through the invention's website.

Upon selecting the Object to Jury Selection Questions option, the invention shows the Plaintiff Attorney all of the typed jury selection questions on the jury selection questionnaire. To the left of each of the typed juror qualification questions and the Judge's typed questions will appear a picture of the Judge derived from the Judge's respective video recording orally reading the particular question. When the Plaintiff Attorney click's on anyone of the Judge's pictures, the respective video recording of the Judge begins to play on the Plaintiff Attorney's screen. To the left of each of the Plaintiff Attorney's typed questions will appear a picture of the Plaintiff Attorney derived from the Plaintiff Attorney's respective video recording orally reading the particular question. When the Plaintiff Attorney click's on anyone of the Plaintiff Attorney's pictures, the respective video recording of the Plaintiff Attorney begins to play on the Plaintiff Attorney's screen. To the left of each of the Defense Attorney's typed questions will appear a picture of the Defense Attorney derived from the Defense Attorney's respective video recording orally reading the particular question. When the Plaintiff Attorney click's on anyone of the Defense Attorney's pictures, the respective video recording of the Defense Attorney begins to play on the Plaintiff Attorney's screen.

Directly below each typed question, the prompt word "Objection" appears in bold red type. A flashing cursor will appear to the right of the prompt "Objection" under the first typed juror qualification question. To submit an objection, the Plaintiff Attorney simply types his/her grounds for an objection under each typed question the Plaintiff Attorney seeks to make an objection. The Plaintiff Attorney can type the objection as long as necessary as space is automatically generated between his/her typed objection and the next jury selection questions. The Plaintiff Attorney's typed objection will appear in red text so the Plaintiff Attorney can easily distinguish between his/her objection and the next typed jury selection question. A scroll bar appears to the right of the screen which allows the Plaintiff Attorney to view the entire screen. Within the bottom margin is a "spell check" option which allows the Plaintiff Attorney to check the spelling and grammar of his/her typed objections. At the top of the screen appears the deadline for the attorneys to submit their objections to jury selection questions through the invention's website and the current date.

When the Plaintiff Attorney is finished typing his/her objections, an option labeled "Authenticate and Submit" appears in the bottom margin. When the Plaintiff Attorney selects "Authenticate and Submit," a window appears on the Plaintiff Attorney's screen. Below the window appears a button labeled "Take Picture and Submit." When such window appears on the screen and the Plaintiff Attorney sits in front of a webcam, the Plaintiff Attorney's live video recording appears in the window. When the Plaintiff Attorney clicks "Take Picture and Submit," the invention's website captures a picture of the Plaintiff Attorney on the Plaintiff Attorney's screen. When the Plaintiff Attorney's picture is taken, the objections immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the Plaintiff Attorney's objections to jury selection questions in their respective programs through the invention's website, the Plaintiff Attorney's picture appears at the top of the screen. The purpose of the Plaintiff Attorney taking his/her picture in front of a webcam before he/she submits his/her objections is to prove that the Plaintiff Attorney submitted such objections through the invention's website.

Likewise, upon selecting the Object to Jury Selection Questions option, the invention shows the Defense Attorney all of the typed jury selection questions on the jury selection questionnaire. To the left of each of the typed juror qualification questions and the Judge's typed questions will appear a picture of the Judge derived from the Judge's respective video recording orally reading the particular question. When the Defense Judge begins to play on the Defense Attorney's screen. To the left of each of the Plaintiff Attorney's typed questions will appear a picture of the Plaintiff Attorney derived from the Plaintiff Attorney's respective video recording orally reading the particular question. When the Defense Attorney click's on anyone of the Plaintiff Attorney's pictures, the respective video recording of the Plaintiff Attorney begins to play on the Defense Attorney's screen. To the left of each of the Defense Attorney's typed questions will appear a picture of the Defense Attorney derived from the Defense Attorney's respective video recording orally reading the particular question. When the Defense Attorney click's on anyone of the Defense Attorney's pictures, the respective video recording of the Defense Attorney begins to play on the Defense Attorney's screen.

Directly below each typed question, the prompt word "Objection" appears in bold red type. A flashing cursor will appear to the right of the prompt "Objection" under the first typed juror qualification question. To submit an objection, the Defense Attorney simply types his/her grounds for an objection under each typed question the Defense Attorney seeks to make an objection. The Defense Attorney can type the objection as long as necessary as space is automatically generated between his/her typed objection and the next jury selection questions. The Defense Attorney's typed objection will appear in red text so the Defense Attorney can easily distinguish between his/her objection and the next typed jury selection question. A scroll bar appears to the right of the screen which allows the Defense Attorney to view the entire screen. Within the bottom margin is a "spell check" option which allows the Defense Attorney to check the spelling and grammar of his/her typed objections. At the top of the screen appears the deadline for the attorneys to submit their objections to jury selection questions through the invention's website and the current date.

When the Defense Attorney is finished typing his/her objections, an option labeled "Authenticate and Submit" appears in the bottom margin. When the Defense Attorney selects "Authenticate and Submit," a window appears on the Defense Attorney's screen. Below the window appears a button labeled "Take Picture and Submit." When such window appears on the screen and the Defense Attorney sits in front of a webcam, the Defense Attorney's live video recording appears in the window. When the Defense Attorney clicks "Take Picture and Submit," the invention's website captures a picture of the Defense Attorney on the Defense Attorney's screen. When the Defense Attorney's picture is taken, the objections immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the Defense Attorney's objections to jury selection questions in their respective programs through the invention's website, the Defense Attorney's picture appears at the top of the screen. The purpose of the Defense Attorney taking his/her picture in front of a webcam before he/she submits his/her objections is to prove that the Defense Attorney submitted such objections through the invention's website.

Also, after the Defense Attorney submits his/her typed and video recorded jury selection questions through the invention's website, the Court Reporter logs into his/her respective program in the invention's website and selects "Type and Transcribe Defense Attorney's Video Recordings." Upon selecting "Type and Transcribe Defense Attorney's Video Recordings," the Court Reporter is shown the list of the Defense Attorney's typed jury selection questions. To the left of the Defense Attorney's typed jury selection questions will appear a picture of the Defense Attorney derived from the Defense Attorney's respective video recording orally reading the particular question. When the Court Reporter clicks on anyone of the Defense Attorney's pictures, the respective video recording of the Defense Attorney begins to play on the Court Reporter's screen. Directly below each typed Defense Attorney jury selection question will appear the words "Transcription of Video Recording." Thus, the Court Reporter is instructed to play each video recording for each respective typed question and type all oral communications of the Defense Attorney in each video recording next to the words "Transcription of Video Recording" under the video recording's respective typed question.

In the bottom margin of the screen will appear an option labeled "Authenticate and Submit." After the Court Reporter finishes transcribing each of the Defense Attorney's video recordings, the Court Reporter is instructed by the invention's website to select "Authenticate and Submit." When the Court Reporter selects "Authenticate and Submit," a window appears on the Court Reporter's screen. Below the window appears a button labeled "Take Picture and Submit." When such window appears on the screen and the Court Reporter sits in front of a webcam, the Court Reporter's live video recording appears in the window. When the Court Reporter clicks "Take Picture and Submit," the invention's website captures a picture of the Court Reporter on the Court Reporter's screen. When the Court Reporter's picture is taken, the transcription of the Defense Attorney's video recordings immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the transcription of the Defense Attorney's video recordings in their respective programs through the invention's website, the Court Reporter's picture appears at the top of the screen. The purpose of the Court Reporter taking his/her picture in front of a webcam before he/she submits his/her transcriptions of the Defense Attorney's video recordings is to prove that the Court Reporter submitted such transcriptions through the invention's website. The Court Reporter is further instructed through the invention's website to print the transcriptions of the Defense Attorney's video recordings and the Defense Attorney's typed jury selection questions and place them in the Court's file for transcript purposes. When the transcriptions of the Defense Attorney's video recordings are printed and the Defense Attorney's typed jury selection questions are printed the Court Reporter's picture will appear at the top of the prints to authenticate that the Court Reporter transcribed such video recordings.

The Court Reporter also prints the Defense Attorney's typed jury selection questions and the date they were submitted through the invention's website and places them in the Court's file for transcript purposes. The Court Reporter also prints all email messages the invention sent to the Defense Attorney, Defendant, and the Defense Attorney's Professional Jury Consultant and the dates such emails were submitted through the website and places them in the Court's file for transcript purposes.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website as described in detail below, the invention sends an email message to the personal email account of the Court Administrator instructing him/her to draft a summons for each juror in the jury pool through the Court Administrator's program in the invention's website and mail them to the respective jurors as described in detail below. Thus, the contents of such an email message sent to the Court Administrator is described in detail below.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website, the invention sends a text message to the cellular phone of the Court Administrator alerting him/her that his/her participation is required through the invention's website and that he/she is advised to check his/her email account for an instructive message of the task he/she is to complete. Such text message is the same as the quoted text message stated above.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website as described in detail below, the invention sends an email message to the personal email account of the Court Reporter instructing him/her to print through the invention's website the final jury selection questionnaire made available to the jurors for their responses and place the print in the Court's file for transcript purposes.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website, the invention sends a text message to the cellular phone of the Court Reporter alerting him/her that his/her participation is required through the invention's website and that he/she is advised to check his/her email account for an instructive message of the task he/she is to complete. Such text message is the same as the quoted text message stated above.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website as described in detail below, the invention sends email messages to the personal email accounts of the Judge, the Plaintiff Attorney, the Defense Attorney, the Plaintiff, and the Defendant to log into their respective programs and view the final jury selection questionnaire through the invention's website.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website, the invention sends text messages to the cellular phones of the Judge, the Plaintiff Attorney, the Defense Attorney, the Plaintiff, and the Defendant alerting them that their participation is required through the invention's website, and they are advised to check their email accounts for an instructive message of the tasks they are to complete. Such text message is the same as the quoted text message stated above.

Only if the Judge allowed the attorneys to submit objections to jury selection questions through the invention's website, and only if the attorneys submitted their objections to jury selection questions through the invention's website, the invention sends an email message to the personal email account of the Court Reporter instructing him/her to print the objections of the attorneys through the invention's website and place them in the Court's file for transcript purposes. Also, the invention sends an email message to the personal email account of the Court Reporter instructing him/her to log onto the invention's website and print all email messages the invention sent to the Judge, Plaintiff Attorney, Defense Attorney, the Defendant, and the Plaintiff, if the case is civil, and the dates such emails were submitted through the invention's website and place them in the Court's file for transcript purposes. The email messages contain an interactive link to the invention's website address so the Court Reporter can instantaneously log onto the invention's website.

Only if the Judge allowed the attorneys to submit objections to jury selection questions through the invention's website, and only if the attorneys submit their objections to jury selection questions through the invention's website, the invention sends a text message to the Court Reporter's cellular phone alerting him/her that his/her participation is required through the invention's website and that he/she is advised to check his/her email account for an instructive message of the task he/she is to complete. Such text message is the same as the quoted text message stated above.

If the Judge allowed the attorneys to submit objections to jury selection questions through the invention's website, and if the attorneys submit their objections to jury selection questions through the invention's website, the invention sends email messages to the personal email accounts of the Judge, the Plaintiff Attorney, the Defense Attorney, the Plaintiff, and the Defendant informing them that they may now log into their respective programs and view both attorneys' objections to jury selection questions through the invention's website.

If the Judge allowed the attorneys to submit objections to jury selection questions through the invention's website, and if both attorneys submitted their objections to jury selection questions through the invention's website, and if the Judge elected to allow the attorneys to submit rebuttals to their counterpart's objections to jury selection questions through the website in the Setup of Custom Jury Selection Process, the invention sends email messages to the personal email accounts of both the Plaintiff Attorney and the Defense Attorney informing them that they may now log onto the invention's website and submit rebuttals to their counterpart's objections to jury selection questions through the invention's website. The email messages sent to the attorneys post the deadline for the attorneys to submit their rebuttals through the invention's website. Also, the email message contains an interactive link to the invention's website address so the attorneys can instantaneously log onto the invention's website. The same email messages sent to the personal email accounts of both the Plaintiff Attorney and the Defense Attorney are also sent, from the invention, to the personal email accounts of the Judge, Defendant, and the Plaintiff, if the case is civil.

If the Judge allowed the attorneys to submit objections to their counterpart's jury selection questions through the invention's website, and if both attorneys submitted objections to their counterpart's jury selection questions through the invention's website, and if the Judge did not elect to allow the attorneys to submit rebuttals to their counterpart's objections to jury selection questions through the invention's website in the Setup of Custom Jury Selection Process, the invention sends an email message to the personal email account of the Judge instructing him/her to log onto the invention's website and issue rulings on the attorneys' objections through the invention's website. The same email messages sent to the Judge is sent to the Plaintiff Attorney, the Defense Attorney, the Defendant, and the Plaintiff, if the case is civil, from the invention.

If the Judge allowed the attorneys to submit objections to their counterpart's jury selection questions through the invention's website, and if both attorneys submitted objections to their counterpart's jury selection questions through the invention's website, and if the Judge did not elect to allow the attorneys to submit rebuttals to their counterpart's objections to jury selection questions through the website in the Setup of Custom Jury Selection Process, the invention sends email messages to the personal email accounts of the Plaintiff Attorney, the Defense Attorney, the Plaintiff, and the Defendant instructing them that the Judge will rule on the attorneys' objections to jury selection questions through the invention's designated website. Also, each email message contains an interactive link to the invention's website address so they can instantaneously log onto the invention's website.

If the Judge allowed the attorneys to submit objections to jury selection questions through the invention's website, and if both attorneys submitted their objections to jury selection questions through the invention's website, the invention sends text messages to the cellular phones of the Judge, the Plaintiff Attorney, the Defense Attorney, the Defendant, and the Plaintiff, if the case is civil, alerting them that their participation is required through the invention's website and that they are advised to check their email for an instructive message of the task they are to complete. Such text message is the same as the quoted text message stated above.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website as described in detail below, the Court Administrator drafts a summons for each juror in the jury pool in the Court Administrator's program through the invention's website and is instructed to mail the summons to their respective jurors as described in detail below.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website as described in detail below, the Court Reporter prints through the invention's website the final jury selection questionnaire made available to the jurors for their responses, and the invention's website instructs the Court Reporter to place the print in the Court's file for transcript purposes.

If the Judge did not allow the attorneys to submit objections to jury selection questions through the invention's website, and if the Judge had the opportunity to delete any of the jury selection questions and their respective video recordings through the invention's website, and if the Judge made the final jury selection questionnaire available to the Jurors for their oral responses to the final jury selection questionnaire through the invention's website as described in detail below, the Judge, the Plaintiff Attorney, the Defense Attorney, the Plaintiff, and the Defendant log into their respective programs through the invention's website and view the final jury selection questionnaire that was made available to the jurors through the invention's website.

If both attorneys submitted their jury selection questions through the invention's website, and if the Judge allowed the attorneys to submit objections to jury selection questions through the website, and if both attorneys submitted objections to jury selection questions through the invention's website, the Court Reporter logs onto the website and prints the Plaintiff Attorney's and Defense Attorney's objections to their counterpart's jury selection questions. The date the Defense Attorney submitted the Objections to the Plaintiff Attorney's Jury Selection Questions will appear with the deadline next to it at the top of the screen. Likewise, the date the Plaintiff Attorney submitted the Objections to the Defense Attorney's Jury Selection Questions will appear with the deadline next to it at the top of the screen. The invention's website instructs the Court Reporter to place the printed objections of both attorneys in the Court's file for transcript purposes.

If both attorneys submitted their jury selection questions through the invention's website, and if the Judge allowed the attorneys to submit objections to jury selection questions through the invention's website, and if both attorneys submitted objections to jury selection questions through the invention's website, the Judge, the Plaintiff Attorney, the Defense Attorney, the Plaintiff, and the Defendant log into their respective programs through the invention's website and view the Plaintiff Attorney's and Defense Attorney's objections to jury selection questions.

If the Judge allowed the attorneys to submit objections to jury selection questions through the invention's website, and if both attorneys submitted objections to jury selection questions through the invention's website, and if the Judge elected to allow attorneys to submit rebuttals to their counterpart's objections to jury selection questions through the invention's website in the Setup of Custom Jury Selection Process, both the Plaintiff Attorney and Defense Attorney log into their respective programs through the invention's website to submit rebuttals to their counterpart's objections to jury selection questions. To submit a rebuttal through the invention's website, the Plaintiff Attorney selects "Rebut Defense Attorney's Objections to Jury Selection Questions" in the Plaintiff Attorney's Main Menu of Functions. Likewise, to submit a rebuttal through the invention's website, the Defense Attorney selects "Rebut Plaintiff Attorney's Objections to Jury Selection Questions" in the Defense Attorney's Main Menu of Functions.

Upon selecting the said rebut option, only the objected typed questions from the questionnaire initially appear in black text. To the left of any typed juror qualification questions and the Judge's typed questions that may appear as objected to by an attorney will appear a picture of the Judge derived from the Judge's respective video recording orally reading the particular question. When an attorney click's on anyone of the Judge's pictures, the respective video recording of the Judge begins to play on the attorney's screen. To the left of any Plaintiff Attorney's typed questions that may appear objected to by an attorney will appear a picture of the Plaintiff Attorney derived from the Plaintiff Attorney's respective video recording orally reading the particular question. When an attorney click's on anyone of the Plaintiff Attorney's pictures, the respective video recording of the Plaintiff Attorney begins to play on the attorney's screen. To the left any Defense Attorney's typed questions that may appear objected to by an attorney will appear a picture of the Defense Attorney derived from the Defense Attorney's respective video recording orally reading the particular question. When an attorney click's on anyone of the Defense Attorney's pictures, the respective video recording of the Defense Attorney begins to play on the attorney's screen.

Below each question, the objection explanation of the opposing attorney initially appears in red text. Below each opposing attorney's objection explanation, the words "Plaintiff Attorney Rebuttal" or "Defense Attorney Rebuttal" appear depending on which attorney is making the rebuttals which initially appear in green text. Attorneys are instructed to type their rebuttal next to their respective prompt. When an attorney types their rebuttal, the words will appear in green text. The reason the objections are in red and the rebuttals are in green is so they can be easily distinguished. Thus, the attorneys are provided with an option that allows them to change the font size and color of the questions, objections, and rebuttals to where they are different colors and sizes to make them easier to view. If there is more than one objection, the attorneys are instructed to type a rebuttal below each objection at the respective prompt. Thus, submitting one rebuttal under one objection will not be presumed to be a blanket rebuttal for all objections. Also, attorneys are instructed that they must submit all of their rebuttals at the same time. Therefore, before they submit they must make a rebuttal for each objection they desire.

In the bottom margin of the screen, a button labeled "Authenticate and Submit" appears. Once an attorney has finished typing all his/her rebuttals and is satisfied with them, he/she is instructed to select "Authenticate and Submit." When an attorney selects "Authenticate and Submit," a window appears on the attorney's screen. Below the window appears a button labeled "Take Picture and Submit." When such window appears on the screen and the attorney sits in front of a webcam, the attorney's live video recording appears in the window. When the attorney clicks "Take Picture and Submit," the invention's website captures a picture of the attorney on the attorney's screen. When the attorney's picture is taken, the attorney's rebuttals immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the attorney's rebuttals in their respective programs through the invention's website, the attorney's picture appears at the top of the screen. The purpose of the attorney taking his/her picture in front of a webcam before he/she submits his/her rebuttals is to prove that the attorney submitted such rebuttals through the invention's website.

If the Judge allowed the attorneys to submit objections to their counterpart's jury selection questions through the invention's website, and if both attorneys submitted objections to jury selection questions through the invention's website, and if the Judge did not elect to allow the attorneys to submit rebuttals to their counterpart's objections to jury selection questions through the invention's website in the Setup of Custom Jury Selection Process, the Judge logs onto the invention's website and submits rulings on the attorneys' objections to jury selection questions as described in detail below.

If the Judge did not allow the attorneys to submit objections to jury selection questions through the invention's website, and if the Judge made the final jury selection questionnaire available to the Jurors for their oral responses to the final jury selection questionnaire through the invention's website as described in detail below, and if the Court Administrator mailed a summons to each juror in the jury pool as described in detail below, each juror logs into the Juror's program through the invention's website and they orally respond to each question on the final jury selection questionnaire in front of a webcam on a personal computer or a cellular phone as described in detail below.

If both attorneys submitted their jury selection questions through the invention's website, and if the Judge allowed the attorneys to submit objections to jury selection questions through the invention's website, and if both attorneys submitted objections to jury selection questions through the invention's website, and if both attorneys submitted rebuttals to their counterpart's objections through the invention's website, the invention sends an email message to the personal email account of the Court Reporter instructing him/her to print the rebuttals of the attorneys through the invention's website and place them in the Court's file for transcript purposes. The email message contains an interactive link to the invention's website address so the Court Reporter can instantaneously log onto the website. Also, the invention sends a text message to the Court Reporter's cellular phone alerting him/her that his/her participation is required through the invention's website and that he/she is advised to check his/her email for an instructive message of the task he/she is to complete. Such text message is the same as the quoted text message stated above.

If both attorneys submitted their jury selection questions through the invention's website, and if the Judge allowed the attorneys to submit objections to jury selection questions through the invention's website, and if both attorneys submitted objections to jury selection questions through the invention's website, and if both attorneys submitted rebuttals to their counterpart's objections through the invention's website, the invention sends email messages to the personal email accounts of the Plaintiff Attorney, the Defense Attorney, the Plaintiff and the Defendant informing them that they may now log onto the invention's website and view both attorneys' rebuttals to their counterpart's objections to jury selection questions. The messages also inform them that the Judge will now rule on the attorney objections and rebuttals through the invention's website, and they will be notified by an email message after the judge issues rulings on the objections and rebuttals. Also, the email messages contain an interactive link to the invention's website address so they can instantaneously log onto the invention's website. All email messages sent to the Plaintiff Attorney, the Defense Attorney, the Defendant, and the Plaintiff will all be sent to the personal email accounts of the Plaintiff Attorney, the Defense Attorney, the Defendant, the Plaintiff, and the Judge from the invention. Also, the invention sends text messages to the cellular phones of the Plaintiff Attorney, Defense Attorney, Plaintiff, and the Defendant alerting them that their participation is required and that they are advised to check their email accounts for an instructive message of the task they are to complete. Such text messages are the same as the quoted text message stated above.

If both attorneys submitted their jury selection questions through the invention's website, and if the Judge allowed the attorneys to submit objections to their counterpart's jury selection questions through the invention's website, and if both attorneys submitted objections to jury selection questions through the invention's website, and if both attorneys submitted rebuttals to their counterpart's objections through the invention's website, the invention sends an email message to the personal email account of the Judge instructing him/her to log onto the invention's website and issue rulings on the attorneys' objections and rebuttals. The same email messages sent to the Judge is sent to the Plaintiff Attorney, the Defense Attorney, the Defendant, and the Plaintiff, if the case is civil, from the invention. Additionally, the invention sends a text message to the cellular phone of the Judge alerting him/her that his/her participation is required through the invention's website and that he/she is advised to check his/her email for an instructive message of the task he/she is to complete. Such text message is the same as the quoted text message stated above.

If both attorneys submitted their typed and video recorded jury selection questions through the invention's website, and if the Judge allowed the attorneys to submit objections to jury selection questions through the invention's website, and if both attorneys submitted objections to jury selection questions through the invention's website, and if the Judge elected to allow the attorneys to submit rebuttals to their counterpart's objections through the invention's website, and if both attorneys submitted rebuttals to their counterpart's objections through the invention's website, the Judge logs onto the invention's website to rule on attorney objections and rebuttals. When the Judge logs onto the invention's website to rule on attorney objections and/or rebuttals, he/she will be presented with two options: 1) Rule on Plaintiff Attorney Objections to jury selection questions; and 2) Rule on Defense Attorney Objections to jury selection questions. Upon selecting one of these options, the Judge will be shown each question that the respective attorney has objected to which will initially appear in black text. To the left of any typed juror qualification questions and the Judge's typed questions that may appear as objected to by an attorney will appear a picture of the Judge derived from the Judge's respective video recording orally reading the particular question. When the Judge click's on anyone of the Judge's pictures, the respective video recording of the Judge begins to play on the Judge's screen. To the left of any Plaintiff Attorney's typed questions that may appear objected to by an attorney will appear a picture of the Plaintiff Attorney derived from the Plaintiff Attorney's respective video recording orally reading the particular question. When the Judge click's on anyone of the Plaintiff Attorney's pictures, the respective video recording of the Plaintiff Attorney begins to play on the Judge's screen. To the left any Defense Attorney's typed questions that may appear objected to by an attorney will appear a picture of the Defense Attorney derived from the Defense Attorney's respective video recording orally reading the particular question. When the Judge clicks on anyone of the Defense Attorney's pictures, the respective video recording of the Defense Attorney begins to play on the Judge's screen.

Directly below each objected question will be the attorney's grounds for each objection initially appearing in red text. Directly below these grounds will appear the opposing attorney's respective rebuttal initially appearing in green text if the judge elected to allow the lawyers to submit rebuttals to their counterpart's objections to jury selection questions in the set up of the custom jury selection process. A scroll bar will appear to the right of the screen to allow the judge to view and rule on all of the objected to questions.

A box labeled "Sustained" and a box labeled "Overruled" will appear to the left of each picture that appears to the left of each objected question. To make a ruling on an objected question, the Judge is instructed to read the objection explanation and its respective rebuttal and click his/her cursor in the box labeled "Sustained" or "Overruled." Upon clicking a box, a check mark will appear. The judge is instructed that he/she must submit his/her rulings all at once. Therefore, he/she must rule on each objection and respective rebuttal before submitting. After making such check marks in the boxes by every question being objected to, the Judge is instructed to select "Authenticate and Submit" within the bottom margin of the screen.

When the Judge selects "Authenticate and Submit," a window appears on the Judge's screen. Below the window appears a button labeled "Take Picture and Submit." When such window appears on the screen and the Judge sits in front of a webcam, the Judge's live video recording appears in the window. When the Judge clicks "Take Picture and Submit," the invention's website captures a picture of the Judge on the Judge's screen. When the Judge's picture is taken, the Judge's rulings on attorney objections and rebuttals to jury selection questions immediately become viewable and accessible to the Judge, the Plaintiff Attorney, the Defense Attorney, the Plaintiff, and the Defendant in their respective programs through the invention's website. When the Judge, the Plaintiff Attorney, the Defense Attorney, the Plaintiff, and the Defendant view the Judge's rulings on attorney objections and rebuttals to jury selection questions in their respective programs through the invention's website, the Judge's picture appears at the top of the screen. The purpose of the Judge taking his/her picture in front of a webcam before he/she submits his/her rulings on objections and rebuttals is to prove that the Judge submitted such rulings on objections and rebuttals through the invention's website.

If a check mark appearing in the "Sustained" box is submitted, this program will automatically exclude its respective typed question and video recording from the final questionnaire, and, in turn, the jurors will not be asked such a question. Additionally, a strike through line will appear through the question indicating that the question has been stricken. If a check mark appearing in the "Overruled" box is submitted, the typed question and its respective video recording will remain included on the questionnaire or will remain to be included as a recommendation to the Judge. If the Judge sustains any of the objections through the invention's website, the typed questions objected to and their respective video recordings will automatically be stricken and the remaining questions on the questionnaire will be renumbered to where they are in sequential order.

If a Judge wishes to include explanations for each of his/her rulings on objections before he/she submits his/her rulings on objections through the invention's website, there is a prompt labeled "Explanation of Judicial Ruling on Objection" directly below each rebuttal to an objected question if rebuttals are allowed. When the judge types an explanation next to this prompt, the text initially appears in blue. The judge will be presented with an option to change the font color and size of the objections, rebuttals, and any explanations for rulings he may type to where they are all different colors and sizes. Ultimately, the Judge is not required to type an explanation to properly submit his/her rulings through the invention's website. If the judge types an explanation for a ruling, the invention's website will automatically make space between the judge's explanation and the following objected to question to allow the judge to type his/her explanation as long as necessary. In the top margin of the screen where the Judge submits his/her rulings on attorney objections, the deadline for the jurors to respond to the jury selection questionnaire through the invention's website will appear.

If both attorneys submitted their typed and video recorded jury selection questions through the invention's website, and if the Judge allowed the attorneys to submit objections to jury selection questions through the invention's website, and if both attorneys submitted objections to jury selection questions through the invention's website, and if the Judge did not elect to allow the attorneys to submit rebuttals to their counterpart's objections through the invention's website, the Judge logs onto the invention's website to rule on attorney objections in the exact same manner as described above except no attorney rebuttals will appear below the attorney objections. Instead, the "Explanation of Judicial Ruling on Objection" will appear directly below each attorney objection.

If both attorneys submitted their typed and video recorded jury selection questions through the invention's website, and if the Judge allowed the attorneys to submit objections to jury selection questions through the invention's website, and if both attorneys submitted objections to jury selection questions through the invention's website, and if the Judge elected to allow the attorneys to submit rebuttals to their counterpart's objections through the invention's website, and if both attorneys submitted rebuttals to their counterpart's objections through the invention's website, the Court Reporter logs onto the invention's website and prints the Plaintiff Attorney's and Defense Attorney's rebuttals to their counterpart's objections to their Jury Selection Questions. The date the Defense Attorney submitted rebuttals to the Plaintiff Attorney's Objections will appear with the deadline next to it at the top of the screen. Likewise, the date the Plaintiff Attorney submitted rebuttals to the Defense Attorney's Objections will appear with the deadline next to it at the top of the screen. The invention's website instructs the Court Reporter to place the printed rebuttals in the Court's file.

If both attorneys submitted their typed and video recorded jury selection questions through the invention's website, and if the Judge allowed the attorneys to submit objections to jury selection questions through the invention's website, and if both attorneys submitted objections to jury selection questions through the invention's website, and if the Judge elected to allow the attorneys to submit rebuttals to their counterpart's objections through the invention's website, and if both attorneys submitted rebuttals to their counterpart's objections through the invention's website, the Plaintiff Attorney, Plaintiff, Defense Attorney, and Defendant may log onto the invention's website and view the Plaintiff Attorney's and Defense Attorney's rebuttals to their counterpart's objections to jury selection questions.

If both attorneys submitted their typed and video recorded jury selection questions through the invention's website, and if the Judge allowed the attorneys to submit objections to jury selection questions through the invention's website, and if both attorneys submitted objections to jury selection questions through the invention's website, and if the Judge elected to allow the attorneys to submit rebuttals to their counterpart's objections through the invention's website, and if both attorneys submitted rebuttals to their counterpart's objections through the invention's website, and if the judge submitted his/her rulings and any explanations on objections to jury selection questions through the invention's website, the invention sends email messages to the personal email accounts of the Judge, Plaintiff Attorney, Defense Attorney, Plaintiff, and Defendant informing them that they may now log onto the invention's website and view the judge's rulings and explanations on their objections and rebuttals. The email messages also advise them that the judge has been sent an email message advising him/her to log on to the invention's website and submit the questionnaire to the jurors for responding through the invention's website. The email messages also advise them that the Judge may delete any typed jury selection questions and their respective video recordings based on any attorney objections before submitting the questionnaire to the jurors for responding through the invention's website. If the judge elected to allow attorneys to submit objections to jury selections questions through the invention's website, and if the judge did not elect to allow attorneys to submit rebuttals to their counterpart's objections to jury selection questions, this same email message will be sent to the Judge, Plaintiff Attorney, Defense Attorney, Plaintiff, and Defendant immediately upon the Judge submitting his/her rulings and any explanations on objections to jury selection questions through the invention's website. Also, the invention sends text messages to the cellular phones of the Judge, Plaintiff Attorney, Defense Attorney, Plaintiff, and the Defendant alerting them that their participation is required through the invention's website and that they are advised to check their email accounts for an instructive message of the task they are to complete. Such text messages are the same as the quoted text message stated above.

Also, the invention sends an email message to the personal email account of the Court Reporter instructing him/her that he/she must now print, through the invention's website, the Judicial Rulings to attorney objections as well as any judicial explanations of those rulings and the date the rulings were submitted and place them in the Court's file for transcript purposes. Also, the invention sends a text message to the Court Reporter's cellular phone alerting him/her that his/her participation is required through the invention's website and that he/she is advised to check his/her email for an instructive message of the task he/she is to complete. Such text message is the same as the quoted text message stated above.

If both attorneys submitted their jury selection questions through the invention's website, and if the Judge allowed the attorneys to submit objections to their counterpart's jury selection questions through the invention's website, and if both attorneys submitted objections to their counterpart's jury selection questions through the invention's website, and if the Judge elected to allow the attorneys to submit rebuttals to their counterpart's objections to their counterpart's jury selection questions through the invention's website, and if both attorneys submitted rebuttals to their counterpart's objections through the invention's website, and if the judge submitted his/her rulings and any explanations on objections to jury selection questions through the invention's website, the invention sends an email message to the personal email account of the Judge instructing him/her that he/she may review and delete any questions on the questionnaire. The email message also instructs the Judge that after he/she has reviewed the questionnaire and is satisfied with the questionnaire, he/she must make the jury selection questionnaire available to the jurors for their responses through the invention's website. The email message will also inform the Judge of the deadline for the jurors to respond to the jury selection questionnaire through the invention's website. The Judge will also be informed that he/she may extend the deadline for jurors to respond to the questionnaire through the invention's website if there was any delay caused by the Judge in making rulings or the attorneys causing delay in submitting objections and/or rebuttals through the invention's website. The invention sends this same email message that was sent to the Judge to the personal email accounts of the Plaintiff Attorney, Defense Attorney, Plaintiff, and Defendant. If the judge elected to allow attorneys to submit objections to jury selections questions through the invention's website, and if the judge did not elect to allow attorneys to submit rebuttals to their counterpart's objections to jury selection questions through the invention's website, this same email message will be sent from the invention to the personal email account of the Judge immediately upon the Judge submitting his/her rulings and any explanations on objections to jury selection questions through the invention's website. Also, the invention sends a text message to the Judge's cellular phone alerting him/her that his/her participation is required through the invention's website and that he/she is advised to check his/her email for an instructive message of the task he/she is to complete. Such text message is the same as the quoted text message stated above.

If the judge did not elect to allow attorneys to submit objections to jury selections questions through the invention's website, and if the judge did not elect to allow attorneys to submit rebuttals to their counterpart's objections to jury selection questions through the invention's website, this same email message will be sent from the invention to the personal email account of the Judge immediately upon the Defense Attorney submitting his/her jury selection questions through the invention's website. Also, the invention sends a text message to the Judge's cellular phone alerting him/her that his/her participation is required through the invention's website and that he/she is advised to check his/her email for an instructive message of the task he/she is to complete. Such text message is the same as the quoted text message stated above.

If the judge elected to allow attorneys to submit objections to jury selections questions through the invention's website, and if the judge elected to allow attorneys to submit rebuttals to their counterpart's objections to jury selection questions through the invention's website, and if the Judge issued rulings on attorney objections and rebuttals, the Judge will be allowed log onto the invention's website and review the jury selection questionnaire. The Judge may also delete any questions and their respective video recordings from the jury selection questionnaire through the invention's website. Once the Judge is satisfied with the questionnaire, the Judge, in his/her respective program, makes the questionnaire available to the Jurors for their responses through the invention's website.

If the judge elected to allow attorneys to submit objections to their counterpart's jury selections questions through the website, and if the judge did not elect to allow attorneys to submit rebuttals to their counterpart's objections to jury selection questions through the website, and if the Judge issued rulings on attorney objections, the Judge will be allowed log onto the invention's website and review the jury selection questionnaire. The Judge may also delete any questions and their respective video recordings from the jury selection questionnaire through the invention's website. Once the Judge is satisfied with the questionnaire, the Judge, in his/her respective program, makes the questionnaire available to the Jurors for their responses through the invention's website.

If the judge did not elect to allow attorneys to submit objections to jury selections questions through the invention's website, and if the judge did not elect to allow attorneys to submit rebuttals to their counterpart's objections to jury selection questions through the invention's website, and if the Defense Attorney submitted his/her typed and video recorded jury selection questions through the invention's website, the Judge will be allowed log onto the invention's website and review the jury selection questionnaire. The Judge may also delete any questions and their respective video recordings from the jury selection questionnaire through the invention's website. Once the Judge is satisfied with the questionnaire, the Judge, in his/her respective program, makes the questionnaire available to the Jurors for their responses through the invention's website.

To review and delete any questions on the jury selection questionnaire and to submit the jury selection questionnaire to the jurors through the invention's website, the Judge logs onto the invention's website and selects "Review, Edit, and Submit Jury Selection Questionnaire to Jurors" from the Judge's Main Menu of Functions. Toward the top of the screen, the Judge is shown his/her jurisdiction's juror qualification questions, below the juror qualification questions appears the Judge's submitted questions. Below the Judge's jury selection questions appears the Plaintiff Attorney's submitted jury selection questions. Finally, below the Plaintiff Attorney's jury selection questions appears the Defense Attorney's submitted jury selection questions. To the left of the typed juror qualification questions and the Judge's typed questions will appear a picture of the Judge derived from the Judge's respective video recording orally reading the particular question. When the Judge click's on anyone of the Judge's pictures, the respective video recording of the Judge begins to play on the Judge's screen. To the left of the Plaintiff Attorney's typed questions will appear a picture of the Plaintiff Attorney derived from the Plaintiff Attorney's respective video recording orally reading the particular question. When the Judge click's on anyone of the Plaintiff Attorney's pictures, the respective video recording of the Plaintiff Attorney begins to play on the Judge's screen. To the left of the Defense Attorney's typed questions will appear a picture of the Defense Attorney derived from the Defense Attorney's respective video recording orally reading the particular question. When the Judge click's on anyone of the Defense Attorney's pictures, the respective video recording of the Defense Attorney begins to play on the Judge's screen.

Typed questions and their respective video recordings that the judge struck due to sustaining an attorney's objection will not appear on the final questionnaire that will be submitted to the jurors. To the right of the screen will be a scroll bar to allow the Judge to view all of the questions. A flashing cursor will appear next to the first question on the questionnaire. The Judge is advised that he/she may delete any of the questions and their respective video recordings on the questionnaire. The Judge is further advised that he/she may now make the questionnaire available to the Jurors through the invention's website for their responses. In the bottom margin of the screen will appear a spell check option for the Judge to correct any spelling errors. To the right of the spell check option will appear a button labeled "Authenticate and Submit."

When the Judge is satisfied with the jury selection questionnaire, the Judge is instructed to select "Authenticate and Submit." When the Judge selects "Authenticate and Submit," a window appears on the Judge's screen. Below the window appears a button labeled "Take Picture and Submit." When such window appears on the screen and the Judge sits in front of a webcam, the Judge's live video recording appears in the window. When the Judge clicks "Take Picture and Submit," the invention's website captures a picture of the Judge on the Judge's screen. When the Judge's picture is taken, the jury selection questionnaire immediately becomes viewable and accessible to the Judge, the Plaintiff Attorney, the Defense Attorney, the Plaintiff, the Defendant, and all of the Jurors in the jury pool in their respective programs through the invention's website. When the Judge, the Plaintiff Attorney, the Defense Attorney, the Plaintiff, the Defendant, and all of the Jurors view the final jury selection questionnaire in their respective programs through the invention's website, the Judge's picture appears at the top of the screen on the final jury selection questionnaire. The purpose of the Judge taking his/her picture in front of a webcam before he/she submits the final jury selection questionnaire is to prove that the Judge submitted the final jury selection questionnaire through the invention's website. Thus, when the Judge clicks "Take Picture and Submit," the final jury selection questionnaire is instantly made available to the jurors for responding in front of a webcam through the invention's website.

Once the Judge makes the jury selection questionnaire available to the jurors for their responses through the invention's website, the invention sends an email message to the personal email account of the Court Administrator instructing him/her to send out letters and juror summons to all jurors summoned for jury duty for the case. If the Judge elected to allow attorneys to exercise challenges for cause and peremptory challenges through the invention's website, the email message instructs the Court Administrator to include the following information in the letter to each juror: 1) the juror must respond to a jury selection questionnaire online in front of a webcam; 2) the juror must be informed that they may respond to the questionnaire through any computer with internet access and that is equipped with a working webcam; 3) the juror must be informed of the website address to log onto and answer the jury selection questionnaire; 4) the letter must include the juror's respective confidential password, and the juror must be informed that he/she must use the password to enter the juror's program each time the juror logs onto the website to respond to the questionnaire, and the juror must also be advised to keep his/her password confidential and not to reveal it to anyone; 5) the juror must be advised of exact addresses of public places such as libraries and courthouses that have computers with internet access and webcams and will allow jurors to respond to the questionnaires if the jurors do not have access to a computer with internet access and a webcam; 6) the juror must have a photo identification card or driver's license with them when they respond to the questionnaire in front of a webcam; 7) the juror must be informed of the deadline to have finished responding to the questionnaire; 8) the juror must be informed that they are not required to answer all of the questions in one sitting, and the juror must be informed that he/she may log onto the website as many times as necessary at any time of day or night to answer each question; however, all of the questions on the questionnaire must be answered before the deadline; and 9) the juror must also be informed that if he/she does not respond to the questionnaire through the website in front of a webcam before the expiration of the deadline the juror will be deemed to have not participated in the jury selection process and will be subject to criminal penalty under the law.

The email message also instructs the Court Administrator to log into the Court Administrator program in the invention's website and select the Draft Letter to Jurors function to draft the letter that is to be sent to each juror. The email message informs the Court Administrator that a template containing the above required information that is to be included in the letter to the jurors is in the Draft Letter to Jurors function in the Court Administrator Main Menu of Functions. The email message informs the Court Administrator to edit the template and fill in the blanks. The email message also informs the Court Administrator that the invention's website automatically customizes and drafts a letter for each juror that includes the juror's respective personal address and confidential code in the letter.

If the Judge elected to not allow attorneys to exercise challenges for cause and peremptory challenges through the invention's website, the email message instructs the Court Administrator to include all of the above stated criteria plus a date for the jurors to appear for the conventional in-court jury selection, and the address of the courthouse where the jurors are to report for jury duty. Thus, the letter must tell the jurors to report to the given courthouse address on the given date for jury duty. Also, the inventions sends a text message to the Court Administrator's cellular phone alerting him/her that his/her participation is required through the invention's website and that he/she is advised to check his/her email for an instructive message of the task he/she is to complete. Such text message is the same as the quoted text message stated above.

Once the Judge makes the jury selection questionnaire available to the jurors for their responses through the invention's website, the invention sends an email message to the personal email account of the Court Reporter instructing him/her that he/she must now print, through the invention's website, the final jury selection questionnaire and the date it was submitted to the jurors by the judge and place it in the Court's file. Also, the Court Reporter is sent a text message to his/her cellular phone alerting him/her that his/her participation is required and that he/she is advised to check his/her email for an instructive message of the task he/she is to complete. Such text message is the same as the quoted text message stated above.

Immediately after the judge makes the final jury selection questionnaire available to the jurors for their responses through the invention's website, the invention sends email messages to the personal email accounts of the Judge, Plaintiff Attorney, Defense Attorney, Plaintiff, and Defendant that inform them that they may now log onto the invention's website and view the final jury selection questionnaire. The email message also informs them that the jury selection questionnaire has been made available through the invention's website to the jurors for their responses. The email message also informs them of the deadline for the jurors to have finished responding to the questionnaire. Also, invention sends text messages to the cellular phones of the Judge, Plaintiff Attorney, Defense Attorney, Plaintiff, and the Defendant alerting them that their participation is required through the invention's website and that they are advised to check their email accounts for an instructive message of the task they are to complete. Such text messages are the same as the quoted text message stated above.

Once the Judge makes the jury selection questionnaire available to the jurors for their responses through the invention's website, the Court Administrator logs into his/her program in the invention's website and selects "Draft Letter to Jurors" function in the Court Administrator's Main Menu of Functions to draft a letter that is to be sent to the jurors instructing them to respond to the jury selection questionnaire. When the Court Administrator selects the "Draft Letters to Jurors" function, a template of the letter to be sent to the jurors appears on the screen. The letter template includes the above stated requirements.

If the Judge elected to not allow attorneys to exercise challenges for cause and peremptory challenges through the invention's website, the letter template will include all of the above stated criteria plus blanks for the date and time the jurors are to appear for the conventional in-court jury selection, and the address of the courthouse where the jurors are to report for jury duty. Thus, it also will contain an instruction for jurors to report to the given courthouse address on the given date for jury duty.

The letter template is also addressed to the name and address of the juror who is first in alphabetical order in the jury pool. The letter template also includes the confidential code of the juror who is first in alphabetical order in the jury pool. In the bottom margin of the screen will appear a "Next Juror" option. When the Court Administrator selects "Next Juror," the letter template then shows the name, address, and individual confidential code of the juror who is second in alphabetical order in the jury pool. Thus, each time the Court Administrator selects "Next Juror" the name, address, and individual confidential code of the next juror in alphabetical order in the jury pool appears on the letter template. Thus, the invention's website automatically generates a letter template for the name, address, and individual confidential code for each juror in the jury pool once such information is entered into the program by the Court Administrator as stated above. The Court Administrator is instructed to fill in the blanks on the template and/or make any additional edits to the template. Any information typed into the blanks and/or any edits made by the Court Administrator on any given juror's letter template will appear on every juror's letter template to prevent the Court Administrator from having to reproduce the same letter for each juror.

In the top margin of the screen will appear the deadline for the jurors to have finished responding to the jury selection questionnaire. In the bottom margin will appear a spell check option, save option, back option, next juror option, and print option. If the Court Administrator selects the back option, the letter of the juror previously shown on the screen will reappear. When the Court Administrator is satisfied with the letters to each juror, the Court Administrator is instructed to print all of the letters and mail them to their respective jurors.

Once the Judge makes the jury selection questionnaire available to the jurors for their responses through the invention's website, the Judge, Plaintiff Attorney, Defense Attorney, Plaintiff, and Defendant may log into their respective program in the invention's website and view the final jury selection questionnaire that was made available to the jurors for their responses.

Also, once the Judge makes the jury selection questionnaire available to the jurors for their responses through the invention's website, the Court Reporter logs into his/her respective program in the invention's website and prints the final jury selection questionnaire and the date it was submitted to the jurors by the judge, and the invention's website instructs the Court Reporter to place it in the Court's file for transcript purposes.

Upon receiving the Court Administrator's letter and juror summons, the jurors individually log into the invention's website to orally respond to the jury selection questionnaire in front of a webcam on a personal computer or in front of a webcam on a cellular phone. Each juror logs into his/her own program in the invention's website to respond to the questionnaire by entering his/her first name, last name, case number, and confidential code. Upon logging into the invention's website, the juror is instructed that he/she must orally respond to each question on the questionnaire in front of a webcam on a personal computer or in front of a webcam on a cellular phone and must make a video recording of each of his/her responses into the invention's website. The juror is further instructed that he/she must speak up and speak clearly and articulately when responding to the questionnaire.

Additionally, upon logging into the program, the juror is shown the video recording produced by the Judge. In the bottom left half of the screen will appear the judge's video recording. To the right of the judge's video recording will appear the standard options of "Stop," "Pause," "Rewind," and "Play." At the top of the screen will appear the deadline for the jurors to respond to the jury selection questionnaire. Below the deadline, the juror will be instructed that before he/she will be allowed to respond to the jury selection questionnaire he/she must view and listen to the judge's video recorded message.

The juror further will be advised that the judge's message contains important instructions that the juror will need to successfully respond to the questionnaire. The juror further will be advised that he/she can play the message by clicking the "Play" button. Upon selecting "Play," the judge's video message will play. The judge's video message will establish the presence of the Court and impress a tone upon the potential jurors that not taking the process seriously or not answering the questionnaire truthfully will not be tolerated, and/or may subject potential jurors to criminal penalty under the law. Additionally, the message will instruct the juror on how to take a picture of his/her driver's license or photo identification card with his/her webcam and how to respond to the questionnaire.

Only after the judge's message is done playing will the juror be presented with an option to proceed to the next screen to take a picture of his/her driver's license or photo identification card with his/her webcam and into the invention's website. Thus, each juror must make a picture of his/her driver's license or photo identification card with a webcam and into the invention's website which will be made viewable to the Judge, Plaintiff Attorney, Defense Attorney, Plaintiff, Defendant, Plaintiff Attorney's Professional Juror Consultant, Defense Attorney's Professional Juror Consultant, Court Administrator, and Court Reporter in their respective programs in the invention's website to authenticate the identification of the juror.

Thus, after the juror finishes viewing and listening to the judge's video recording and proceeds to the next screen, the invention's website instructs the juror at the top of the screen that he/she must take a picture of the front of his/her driver's license or photo identification card with his/her webcam on a personal computer or a cellular phone. The juror will also be advised that he/she must take an acceptable picture before he/she will be allowed to respond to the questionnaire.

Below such instructions will be red dashed lines outlining a rectangular space on the screen of the invention's website. Below such space will appear a "Take Picture" option. For a juror to make an acceptable picture of his/her driver's license or photo identification card with his/her webcam and into the invention's website he/she will be instructed that each outer edge of the four sides of his/her driver's license card or photo identification card must abut a red dashed boundary line. With one hand, the juror is instructed to hold his/her driver's license or photo identification in front of his/her webcam at a distance where each outer edge of the four sides of his/her driver's license card or photo identification card abuts a red dashed boundary line on the monitor's screen. With the other hand, the juror will be instructed to click on the "Take Picture" button appearing below the rectangular space outlined with red dashed boundary lines. The juror further will be instructed that no driver's license picture or photo identification picture will be accepted if any of the outer edges of the four sides of his/her driver's license card or photo identification card does not abut a red dashed boundary line or exceeds any of the red dashed boundary lines. Only after the juror takes an acceptable picture of the front of his/her driver's license card or photo identification card with his/her webcam will the juror be presented with an option to proceed to the next screen to begin responding to the questionnaire in front of his/her webcam. The Juror will be instructed that his/her driver's license number or identification number will be blocked and will not be viewable to the judge, the attorneys, the plaintiff, or the defendant or any other party through the invention's website.

When the juror proceeds to the next screen to begin responding to the questionnaire, each juror then orally responds to each question on the jury selection questionnaire one question at a time in front of a webcam on a personal computer or a webcam on a cellular phone in their own respective program making a video recording of each one of their responses into the invention's website.

Before the juror is presented with the first juror qualification question on the questionnaire, the typed oath of the juror appears in a window on the right side of the screen. When the typed oath appears on the right side of the screen, the Judge's respective video recording of the Judge orally reading the oath appears in a window on the left side of the screen, and it immediately begins to play depicting the Judge orally reading the oath. Below the window containing the typed oath will appear a button labeled "Repeat Question" and to the right of such button will appear a button labeled "Play Next Question." While the Judge's video recording reads the oath to the juror, the webcam makes a continuous video recording of the juror into the invention's website. When the video recording finishes reading the question, the video recording pauses, and the Juror then orally responds to the oath in front of a webcam making a video recording of his/her response into the invention's website. When the Judge's video recording pauses upon reading the oath to the juror, it will not play again on the invention's website unless the Juror selects "Repeat Question." If the Juror selects "Repeat Question," the Judge's video recording for the oath will play again.

When the Juror finishes responding to the oath, he/she selects "Play Next Question" to have the first question on the questionnaire read to him/her by the Judge's respective video recording. In the window on the right side of the screen, the typed oath disappears, and the first question on the questionnaire will appear in a typed format when the Juror selects "Play Next Question." The Judge's respective video recording for the particular typed question appearing on the right side of the screen will appear in the window on the left side of the screen, and it will immediately begin to play depicting the Judge orally reading the question to the juror when the Juror selects "Play Next Question." While the Judge's video recording reads the question to the juror, the webcam makes a continuous video recording of the juror into the invention's website. When the video recording finishes reading the question, the video recording pauses, and the Juror then orally responds to the question in front of a webcam making a video recording of his/her response into the invention's website. When the Judge's video recording pauses upon reading the question to the juror, it will not play again on the invention's website unless the Juror selects "Repeat Question." If the Juror selects "Repeat Question," the Judge's video recording for the particular question appearing on the right side of the screen will play again. The Juror repeats this process of orally responding to each video recording of each typed question and selecting "Play Next Question" until the Juror has orally responded to each question in front of a webcam and has made a valid video recording for all of his/her responses into the invention's website. When the juror sits in front of a webcam while each question is asked of the juror, the invention's website makes one continuous recording of the juror until the juror logs out of the invention's website.

Below the window containing the typed question the juror attempts to answer will appear a window that will display the juror's live video recording of himself/herself as he/she views each video recording and orally responds to each question so the juror can monitor that the invention's website is making a valid video recording of the juror. Directly below the juror's live video recording will appear the picture of the juror's driver's license card or photo identification card with the driver's license number or identification number blocked out. To the immediate right of the Juror's live video recording and picture of driver's license or photo identification will appear the standard options of "Stop," "Pause," "Rewind," "Play," and "Fast Forward." The juror may use such options if he/she desires to replay all or any portion of his/her responses to the jury selection questionnaire after he/she has responded to the questionnaire. Directly below such options will appear volume control buttons to allow the Juror to raise or lower the volume of his/her recording. In the top margin of the screen, the current date and the deadline for jurors to have finished responding to the questionnaire through the invention's website will appear.

Ultimately, when each juror orally responds to the juror qualification questions and the Judge's questions on the questionnaire in front of a webcam on a personal computer or a webcam on a cellular phone in the invention's website, only the Judge's video recording for the particular typed question that appears on the screen that the juror attempts to answer will appear on the left side of the juror's screen in his/her respective program in the invention's website, and the single typed question of the juror qualification questions or of the Judge's jury selection questions that the juror is attempting to answer will appear on the right side of the screen. As stated above, when each typed question of the juror qualification questions or of the Judge's jury selection questions first appears on the right side of the screen, the Judge's respective video recording of the Judge orally reading the particular question appearing on the screen immediately begins to play depicting the Judge orally reading the question to the juror, and the juror can view the Judge orally asking the respective question in the Judge's video recording.

When each juror begins to orally respond to the first of the Plaintiff Attorney's jury selection questions on the questionnaire through the invention's website in front of a webcam on a personal computer or in front of a webcam on a cellular phone, the Judge's video recording will disappear, and only the Plaintiff Attorney's respective video recording for the first of the Plaintiff Attorney's typed jury selection questions will appear on the left side of the juror's screen in the juror's respective program in the invention's website. Only the first typed question of the Plaintiff Attorney's typed jury selection questions will appear on the right side of the Juror's screen. The Juror will only be allowed to answer one question of the Plaintiff Attorney's jury selection questions at a time through the invention's website. Thus, when the Juror attempts to answer any of the Plaintiff Attorney's jury selection questions through the invention's website, only the one typed question of the Plaintiff Attorney's jury selection questions that the juror attempts to answer will appear on the right side of the screen on the invention's website. When each of the first half of the Plaintiff Attorney's typed jury selection questions first appear on the right side of the screen, only the Plaintiff Attorney's respective video recording of the Plaintiff Attorney orally reading the particular typed question appearing on the screen appears on the left side of the juror's screen and immediately begins to play depicting the Plaintiff Attorney orally reading the typed question to the juror, and the juror can view and hear the Plaintiff Attorney orally reading the respective typed question in the Plaintiff Attorney's video recording.

When each of the second half of the typed jury selection questions of the Plaintiff Attorney first appear on the right side of each juror's screen on the invention's website, the Plaintiff Attorney's video recording does not appear, and the Plaintiff's video recording of the Plaintiff sitting and blinking his/her eyes only appears on the left side of each juror's screen. Thus, each juror can view the Plaintiff's video recording while each juror orally responds to each of the second half of the Plaintiff Attorney's jury selection questions. However, even though the Plaintiff Attorney's video recording does not appear on each juror's screen when each juror orally responds to each of the second half of the Plaintiff Attorney's jury selection questions and the Plaintiff's video recording does appear when each of the second half of the Plaintiff Attorney's typed jury selection questions appear on each juror's screen, the sound recordings of the Plaintiff Attorney's video recordings for their respective typed jury selection questions still play on each juror's screen, and they orally read their respective questions making up the second half of the Plaintiff Attorney's jury selection questions to each juror. Thus, when each juror responds to the second half of the Plaintiff Attorney's jury selection questions through the invention's website, they see the Plaintiff's video recording on the screen, but they hear the sound of the Plaintiff Attorney's video recording orally read the typed question appearing on the juror's screen.

When each juror begins to orally respond to the first of the Defense Attorney's jury selection questions on the questionnaire on the invention's website in front of a webcam on a personal computer or in front of a webcam on a cellular phone, the Plaintiff's video recording will disappear, and only the Defense Attorney's respective video recording for the first of the Defense Attorney's typed jury selection questions will appear on the left side of the juror's screen in the juror's respective program in the invention's website. Only the first typed question of the Defense Attorney's typed jury selection questions will appear on the right side of the juror's screen. The Juror will only be allowed to answer one question of the Defense Attorney's jury selection questions at a time through the invention's designated website. Thus, when the juror attempts to answer any of the Defense Attorney's jury selection questions through the invention's website, only the one typed question of the Defense Attorney's jury selection questions that the juror attempts to answer will appear on the right side of the screen on the invention's website. When each of the first half of the Defense Attorney's typed jury selection questions first appear on the right side of the screen, the Defense Attorney's respective video recording of the Defense Attorney orally reading the particular typed question appearing on the screen appears on the left side of the juror's screen and immediately begins to play depicting the Defense Attorney orally reading the typed question to the juror, and the juror can view and hear the Defense Attorney orally reading the respective typed question in the Defense Attorney's video recording.

When each of the second half of the typed jury selection questions of the Defense website, the Defense Attorney's video recording does not appear, and the Defendant's video recording of the Defendant sitting and blinking his/her eyes only appears on the left side of each juror's screen. Thus, each juror can view the Defendant's video recording while each juror orally responds to each of the second half of the Defense Attorney's jury selection questions. However, even though the Defense Attorney's video recording does not appear on each juror's screen when each juror orally responds to each of the second half of the Defense Attorney's jury selection questions and the Defendant's video recording does appear when each of the second half of the Defense Attorney's typed jury selection questions appear on each juror's screen, the sound recordings of the Defense Attorney's video recordings for their respective typed jury selection questions still play on each juror's screen, and they orally read their respective questions making up the second half of the Defense Attorney's jury selection questions to each juror. Thus, when each juror responds to the second half of the Defense Attorney's jury selection questions through the designated website, they see the Defendant's video recording on the screen, but they hear the sound of the Defense Attorney's video recording orally read the typed question appearing on the juror's screen.

The video recordings of the Judge, the Plaintiff Attorney, the Defense Attorney, the Plaintiff, and the Defendant will impress upon the Jurors that the Judge, the Plaintiff Attorney, the Defense Attorney, the Plaintiff, and the Defendant are watching and listening to the Jurors respond which will assist in helping Jurors provide sincere responses and will assist the attorneys and their clients in how the Jurors will react to their appearances.

Also, directly above the space where the typed oath or a typed question appears, the Juror will be shown the total number of questions on the questionnaire and the number of questions the Juror has answered. Directly below the window where the Judge's or an attorney's video recording appears to read its respective typed question are volume control buttons to allow the Juror to raise or lower the volume of the Judge's or attorney's video recording. In the bottom margin of the Juror's screen in the invention's website is a button labeled "Log out."

The Juror is not required to answer all of the questions in one sitting. The juror can simply select "Log out" after answering a question and log out of the invention's website. The Juror then can log in to the invention's website as many times as needed to finish responding to each question on the questionnaire at anytime day or night, 24 hours a day, and 7 days a week. If a Juror chooses not to answer the entire questionnaire in one sitting and decides to log off after answering a portion of the questionnaire, the next question that will be read to the Juror by either a Judge's or attorney's video recording when the Juror logs back into the website will be the next consecutive question following the last question answered by the Juror.

The Juror must respond to all of the questions on the questionnaire in front of a webcam. If the Juror's live video recording does not appear in the designated window at the bottom of the screen while the Juror responds in front of a webcam, the Juror will not be allowed to proceed to the next question, and a message will appear on the screen that states that the webcam is not working properly or the juror is not responding to the questions in front of the webcam. The message will further advise that to finish responding to the questionnaire the juror will need to respond in front of the webcam, or if the webcam is not working, the Juror should use a different webcam or a different computer equipped with a webcam.

The invention's website further instructs the Jurors to not answer their questions within the presence of other jurors, or attorneys. One objective of the invention is to prevent jurors from conforming their responses with other jurors or having their responses influenced by the Attorneys involved in the case. Ultimately, such a way of responding will provide attorneys with more credible juror responses. Thus, a main advantage of the invention is that it prevents conformity of answers.

When Jurors orally respond to the questions that are read to them by video recordings in front of a webcam, the invention's website records their oral responses in audio format and the invention's website video records the Jurors responding to all of the questions.

When the juror finishes orally responding to the last question on the questionnaire in front of a webcam through the invention's website, a message will appear on the screen. The message informs the juror that the juror has successfully answered all of the questions on the questionnaire. The message then thanks the juror for his/her participation.

After the deadline for jurors to have finished responding to the questionnaire in front of a webcam through the invention's website expires, the invention sends an email message to the personal email account of the Court Reporter instructing the Court Reporter to transcribe the video recorded juror responses into a typed format onto their respective questionnaires through the invention's website. The invention sends this same email that was sent to the Court Reporter to the personal email accounts of the Judge, the Plaintiff Attorney, the Defense Attorney, the Plaintiff, and the Defendant.

Additionally, after the deadline for jurors to have finished responding to the questionnaire in front of a webcam through the invention's website expires, the invention sends text messages to the cellular phones of the Court Reporter, the Judge, the Plaintiff Attorney, the Defense Attorney, the Plaintiff, and the Defendant alerting them that their participation is required through the invention's website and that they are advised to check their email for an instructive message of the tasks they are to complete. Such text message is the same as the quoted text message stated above.

After the deadline for jurors to have finished responding to the questionnaire in front of a webcam through the invention's website expires, the Court Reporter transcribes the video recorded juror responses into a typed format onto their respective questionnaires through the invention's website. To transcribe the video recorded juror responses, the Court Reporter logs into the Court Reporter program in the invention's website and selects "Type and Transcribe Video Recorded Juror Responses on Questionnaires" from the Court Reporter's Main Menu of Functions. Upon making such a selection, the Court Reporter is shown a list of the names of each juror in the jury pool. The names on the list are interactive. When the Court Reporter selects a name, the video recording of the juror appears on the left half of the screen and the questionnaire appears on the right half of the screen. Directly below the juror's video recording are a play button, stop button, fast-forward button, and rewind button for the Court Reporter to view and listen to the juror respond to the questionnaire.

On the right half of the screen with the questionnaire will appear the typed juror qualification questions. Below the typed juror qualification questions will appear the Judge's typed jury selection questions. Below the Judge's typed jury selection questions will appear the Plaintiff Attorney's typed jury selection questions. Below the Plaintiff Attorney's typed jury selection questions will appear the Defense Attorney's jury selection questions. To the left of each typed question on each juror's transcribed jury selection questionnaire that appears on the right side of the screen on the invention's website will appear the photo of the person whose video recording was appearing on the juror's screen when the juror responded to the particular question. For example, if the Judge's video recording appeared on each juror's screen for questions 1 through 20 on the jury selection questionnaire, the Judge's photo derived from the Judge's video recording that appeared to the jurors will appear to the left of each of the typed juror qualification questions and the Judge's typed questions numbered 1 through 20 on each juror's transcribed questionnaire.

Likewise, if the Plaintiff Attorney's video recording appeared on each juror's screen for questions 21 through 30 on the jury selection questionnaire, the Plaintiff Attorney's photo derived from the Plaintiff Attorney's video recording that appeared to the jurors will appear to the left of each of the Plaintiff Attorney's typed questions numbered 21 through 30 on each juror's transcribed questionnaire.

Also, if the Plaintiff's video recording appeared on each juror's screen for questions 31 through 40 on the jury selection questionnaire, the Plaintiffs photo derived from the Plaintiff's video recording that appeared to the jurors will appear to the left of each of the Plaintiff Attorney's typed questions numbered 31 through 40 on each juror's transcribed questionnaire.

Additionally, if the Defense Attorney's video recording appeared on each juror's screen for questions 41 through 50 on the jury selection questionnaire, the Defense Attorney's photo derived from the Defense Attorney's video recording that appeared to the jurors will appear to the left of each of the Defense Attorney's typed questions numbered 41 through 50 on each juror's transcribed questionnaire.

Also, if the Defendant's video recording appeared on each juror's screen for questions 51 through 60 on the jury selection questionnaire, the Defendant's photo derived from the Defendant's video recording that appeared to the jurors will appear to the left of each of the Defense Attorney's typed questions numbered 51 through 60 on each juror's transcribed questionnaire.

Directly below each typed question on the jury selection questionnaire of each juror will appear the words "Transcription of Video Recording." To the right of the words "Transcription of Video Recording" under each typed question will appear the transcription of the typed question's respective video recording.

Directly below each typed questions' respective video recording transcription will appear a prompt labeled "Juror's Response." The Court Reporter is instructed to play the juror's video recording and type each response next to the prompt labeled "Juror's Response" below its respective question. The invention may also utilize voice recognition software to assist the Court Reporter in the task of transcribing the juror's responses. If the invention utilizes voice recognition software, the software automatically transcribes each juror's video recorded response into a typed format next to the prompt labeled "Juror's Response" below its respective question. If the invention utilizes such voice recognition software to assist the Court Reporter in the task of typing each Juror's response to each respective question, the Court Reporter is instructed to play each juror's video recording and check the voice recognition software's transcriptions for accuracy and edit any of such transcriptions of each Juror's responses. At the bottom of the screen, there is a button labeled "Next Juror." When the Court Reporter finishes typing and/or editing the responses for a juror, the Court Reporter selects "Next Juror" and is then shown a new screen with the video recording of the next juror listed in alphabetical order. The Court Reporter repeats this process until he/she has typed all of the responses for all of the jurors. Once the Court Reporter has finished typing all of the responses for all of the jurors, the Court Reporter selects the "Authenticate and Submit" button which will appear at the bottom right hand corner of the screen. When the Court Reporter selects "Authenticate and Submit," the Court Reporter authenticates the transcriptions in the same manner as detailed above, and each juror's transcribed questionnaire becomes viewable to the Judge, the Plaintiff Attorney, the Defense Attorney, the Plaintiff, the Defendant, the Plaintiff Attorney's Professional Jury Consultant, and the Defense Attorney's Professional Jury Consultant in their respective programs through the invention's website.

Immediately after the jurors' video recorded oral responses are transcribed into a typed format, and the Court Reporter authenticates them and submits them through the invention's website, the invention sends an email message to the personal email account of the Court Reporter instructing him/her that he/she must now print each juror's transcribed questionnaire, and the date each juror finished responding to the questionnaire through the invention's website and place each transcribed questionnaire in the Court's file for transcript purposes. Also, the Court Reporter is sent an email message instructing him/her to log into the invention's website and print all email messages to the Judge, Plaintiff Attorney, Defense Attorney, the Defendant, and the Plaintiff, if the case is civil, and the dates such emails were submitted through the invention's website and place them in the Court's file for transcript purposes. The email messages contain an interactive link to the invention's website so the Court Reporter can instantaneously log onto the website.

Immediately after the jurors' video recorded oral responses are transcribed into a typed format, and the Court Reporter authenticates them and submits them through the invention's website, and if the Judge did not elect to allow attorneys to exercise challenges for cause or peremptory challenges through the invention's website in the Custom Setup of the Jury Selection Process, and if the Judge elected to use the invention's website as a means of questioning jurors before the in-court jury selection process begins, the invention sends email messages to the personal email accounts of both attorneys instructing them that they may now log into their respective programs in the invention's website and view all of the juror video recordings and typed questionnaires, take confidential notes of the jurors, and print the juror questionnaires. Additionally, the email messages to the attorneys advises them to first view the video recordings of the jurors and take notes on the jurors and rank the jurors on a scale of 1-10 based on the strength of their desire to exclude the juror with a challenge for cause or a peremptory challenge before the in-court jury selection process begins. Additionally, the email messages to both attorneys advises them that if they sought the assistance of a professional jury consultant their consultants have been notified that they must log onto the invention's website and provide their respective attorneys a professional analysis of each juror through the invention's website. Furthermore, the email messages to both attorneys advises them that their respective professional jury consultants have been advised of the date the in-court jury selection process begins and have been advised to submit their analysis of each juror to their respective attorney's program in the invention's website at least one week before the in-court jury selection process begins. Additionally, both attorneys are advised that their clients have also been advised to submit an analysis of each juror and submit them to their respective attorney's program through the invention's website. The email messages to both attorneys also advise them that their clients have been advised of the date the in-court jury selection process begins and have been advised to submit their analysis of each juror to their respective attorney's program in the invention's website at least one week before the in-court jury selection process begins. Both attorneys will also be advised that they will be able to compare their analysis of each juror with their respective professional jury consultant's analysis of each juror and their respective client's analysis of each juror in their respective programs in the invention's website before the conventional in-court jury selection process begins. Also, the email messages advise both attorneys to wait for their respective professional jury consultant and their respective client to submit their analysis of each juror through the invention's website so the attorneys can compare their analysis with their professional jury consultant's analysis and their client's analysis so they will have more confidence in their in-court juror selections. Such email message sent to the Plaintiff Attorney is also sent to the Judge, the Defense Attorney, the Defendant, and the Plaintiff. Likewise, such email message sent to the Defense Attorney is also sent to the Judge, the Plaintiff Attorney, the Plaintiff, and the Defendant.

Immediately after the jurors' video recorded oral responses are transcribed into a typed format, and the Court Reporter authenticates them and submits them through the invention's website, and if the Judge did not elect to allow attorneys to exercise challenges for cause or peremptory challenges through the invention's website in the Custom Setup of the Jury Selection Process, and if the Judge elected to use the invention's website as a means of questioning jurors before the in-court jury selection process begins, the invention sends email messages to the personal email accounts of the plaintiff and the defendant that instruct them that they may now log onto the invention's website and view all of the juror video recordings, take confidential notes of the jurors, and print the juror questionnaires. The email messages sent to the plaintiff and the defendant advise them that they may log into the invention's website and submit, to their respective attorney's program in the invention's website, an analysis of each juror and rank of each juror on a scale of 1-10 based on the strength of their desire to exclude the juror from the jury pool through the invention's website. Such email messages sent to the plaintiff and the defendant advise them of the date the in-court jury selection process begins and advise them to submit their analysis of each juror to their respective attorney through the invention's website at least one week before the in-court jury selection process begins. Such email message sent to the Plaintiff also will be sent to the personal email accounts of the Judge, the Plaintiff Attorney, the Defense Attorney, and the Defendant from the invention. Likewise, such email message sent to the Defendant will also be sent to the personal email accounts of the Judge, the Plaintiff Attorney, the Defense Attorney, and the Plaintiff from the invention.

Likewise, immediately after the jurors' video recorded oral responses are transcribed into a typed format, and the Court Reporter authenticates them and submits them through the invention's website, and if the Judge did not elect to allow attorneys to exercise challenges for cause or peremptory challenges through the invention's website in the Custom Setup of the Jury Selection Process, and if the Judge elected to use the invention's website as a means of questioning jurors before the in-court jury selection process begins, the invention sends email messages to the personal email accounts of all Professional Jury Consultants selected by either or both parties which instruct them that they may now log onto the invention's website and submit an analysis of each juror to their respective attorney's program through the invention's website. The email message sent to the professional jury consultants advises them that they must log onto the invention's website and provide a professional analysis of each juror and rank each juror on a scale of 1-10 based on the strength of their desire to exclude the juror from the jury pool. Such email messages sent to the professional jury consultants advises them of the date of the in-court jury selection process and advises them to submit their analysis of each juror at least one week before the in-court jury selection process. Such email message sent to the professional jury consultant hired by the Plaintiff Attorney also will be sent to the personal email account of the Plaintiff Attorney from the invention. Likewise, such email message sent to the professional jury consultant hired by the Defense Attorney also will be sent to the personal email account of the Defense Attorney from the invention.

Additionally, immediately after the jurors' video recorded oral responses are transcribed into a typed format, and the Court Reporter authenticates them and submits them through the invention's website, the invention sends text messages to the cellular phones of the Judge, Plaintiff Attorney, Plaintiff, Defense Attorney, Defendant, and the Court Reporter alerting them that their participation is required through the invention's website and that they are advised to check their email for an instructive message of the tasks they are to complete. Such text message is the same as the quoted text message stated above.

If the Judge did not elect to allow attorneys to submit Challenges for Cause and/or Peremptory Challenges through the invention's website and limited the invention's website's use to merely obtaining video recordings of jurors and transcriptions of their responses before the in-court jury selection process begins, and if the jurors' video recorded oral responses are transcribed into a typed format, and if the Court Reporter authenticates them and submits them through the invention's website, any Professional Jury Consultants retained by an attorney through the website may now log onto the website and view all of the juror video recordings, type a confidential professional analysis of each juror, rate each juror on a scale of 1-10 based on the strength of their desire to exclude the juror in the in-court jury selection process, and submit their professional analysis and assigned numbers for each juror to their respective attorney's program through the invention's website. Likewise, the Plaintiff, if the case is civil, and the Defendant may now log into their respective programs in the invention's website and view all of the juror video recordings, take confidential notes of the jurors, rate each juror on a scale of 1-10 based on the strength of their desire to exclude the juror in the in-court jury selection process and submit their confidential notes and assigned numbers for each juror to their respective attorney's program in the invention's website. The Plaintiff Attorney and Defense Attorney may now log into their respective programs in the invention's website and view all of the juror video recordings, take confidential notes of the jurors, rate each juror on a scale of 1-10 based on the strength of their desire to exclude the juror in the in-court jury selection process. The Plaintiff Attorney and the Defense Attorney may also compare their analysis and assigned number with the analysis and assigned numbers of their respective professional jury consultant and their respective client through the invention's website. The Plaintiff Attorney and the Defense Attorney may also print the juror questionnaires and the analysis and assigned number for each juror from their respective professional jury consultant and print the analysis and assigned number for each juror from their respective client and print their own analysis and assigned number for each juror from the website to prepare for the in-court jury selection process. Additionally, the Judge may now log into his/her respective program in the invention's website and view all of the juror video recordings, take confidential notes of the jurors. Likely, the Judge's confidential notes will pertain to whether or not a juror should be excused from jury duty.

If the judge did not elect to allow attorneys to submit Challenges for Cause and/or Peremptory Challenges through the invention's website and limited the invention's website's use to merely obtaining video recordings of jurors and transcription of their responses before the in-court jury selection process begins, the judge would not be given the option of excusing jurors before they appear in court for in-court jury selection through the invention's website as the judge would excuse any jurors when they appear in court for the in-court jury selection process.

When the judge, attorneys, plaintiff, defendant, and professional jury consultants enter their respective programs in the invention's website to complete the above said tasks, they select "View Video Recordings of Jurors Responding to Questionnaire." They are then shown a list of the names of each juror in the jury pool. The names on the list are interactive. When the judge, attorneys, plaintiff, defendant, and professional jury consultants select a name, the video recording of the juror appears on the left half of the screen and the typed questionnaire appears on the right half of the screen. For Professional Jury Consultants, they will have an additional option on the left side of the screen that allows them to either view the Juror's typed questionnaire or view their client's information. Directly below the juror's video recording appears the picture of the juror's driver's license or picture identification card with the juror's driver's license number or identification number appearing blocked out. The juror's driver's license or picture identification card is interactive. By clicking anywhere on such driver's license or picture identification card, the license or card enlarges so the picture on the license or card can be compared more easily with the Juror's video recording. Directly below the juror's driver's license or picture identification card are a play button, stop button, fast-forward button, and rewind button for the attorneys, judge, plaintiff, defendant, and professional jury consultants to view and listen to the juror respond to the questionnaire in their respective programs through the invention's website. Directly below these buttons are the words "Play particular question(s):" followed by space designated for the numbers of the questions on the questionnaire. Thus, the judge, attorneys, plaintiff, defendant, and professional jury consultants can play any single question and answer or any group of questions and answers on the questionnaire by typing the number or number range in this space.

On the right half of the screen with the questionnaire will appear the typed juror qualification questions. Below the typed juror qualification questions will appear the Judge's typed jury selection questions. Below the Judge's typed jury selection questions will appear the Plaintiff Attorney's typed jury selection questions. Below the Plaintiff Attorney's typed jury selection questions will appear the Defense Attorney's jury selection questions. Thus, each question on the questionnaire appears in a typed format. To the left of each typed question on each juror's transcribed jury selection questionnaire that appears on the right side of the screen on the invention's website will appear the photo of the person whose video recording was appearing on the juror's screen when the juror responded to the particular question. For example, if the Judge's video recording appeared on each juror's screen for questions 1 through 20 on the jury selection questionnaire, the Judge's photo derived from the Judge's video recording that appeared to the jurors will appear to the left of each of the typed juror qualification questions and the Judge's typed questions numbered 1 through 20 on each juror's transcribed questionnaire.

Likewise, if the Plaintiff Attorney's video recording appeared on each juror's screen for questions 21 through 30 on the jury selection questionnaire, the Plaintiff Attorney's photo derived from the Plaintiff Attorney's video recording that appeared to the jurors will appear to the left of each of the Plaintiff Attorney's typed questions numbered 21 through 30 on each juror's transcribed questionnaire.

Also, if the Plaintiff's video recording appeared on each juror's screen for questions 31 through 40 on the jury selection questionnaire, the Plaintiff's photo derived from the Plaintiff's video recording that appeared to the jurors will appear to the left of each of the Plaintiff Attorney's typed questions numbered 31 through 40 on each juror's transcribed questionnaire.

Additionally, if the Defense Attorney's video recording appeared on each juror's screen for questions 41 through 50 on the jury selection questionnaire, the Defense Attorney's photo derived from the Defense Attorney's video recording that appeared to the jurors will appear to the left of each of the Defense Attorney's typed questions numbered 41 through 50 on each juror's transcribed questionnaire.

Also, if the Defendant's video recording appeared on each juror's screen for questions 51 through 60 on the jury selection questionnaire, the Defendant's photo derived from the Defendant's video recording that appeared to the jurors will appear to the left of each of the Defense Attorney's typed questions numbered 51 through 60 on each juror's transcribed questionnaire.

The photos next to their respective typed questions on the transcribed jury selection questionnaires for each juror which symbolizes which person's video recording was appearing on each juror's screen when each juror responded to the questionnaire provides the Judge, the Plaintiff Attorney, the Defense Attorney, the Plaintiff, the Defendant, the Plaintiff Attorney's Professional Jury Consultant, and the Defense Attorney's Professional Jury Consultant with an opportunity to see how each juror responds to the individual video profiles of the Judge, the Plaintiff Attorney, the Defense Attorney, the Plaintiff, and the Defendant. For example, if the Defense Attorney wanted to know how each juror will respond to the Defendant's physical appearance, and if the Defendant's video recording appeared to the juror's on questions 51 through 60, the Defense Attorney could watch each juror's video recorded responses for questions 51 through 60 through the invention's designated website, and the Defense Attorney can see how each juror reacts to seeing the Defendant's video recording. Thus, by knowing whose specific video recording was playing on the jurors' screens when the jurors responded to the jury selection questions, the Judge, the Plaintiff Attorney, the Defense Attorney, the Plaintiff, the Defendant, the Plaintiff Attorney's Professional Jury Consultant, and the Defense Attorney's Professional Jury Consultant can see nonverbal clues as to how each juror responds to the video recordings of the Judge, the Plaintiff Attorney, the Defense Attorney, the Plaintiff, and the Defendant.

Directly below each typed question on the jury selection questionnaire of each juror will appear the words "Transcription of Video Recording." To the right of the words "Transcription of Video Recording" under each typed question will appear the transcription of the typed question's respective video recording.

Directly below each typed questions' respective video recording transcription will appear the words "Juror's Response." To the right of the words "Juror's Response" will appear the typed transcription of the Juror's video recorded response to the respective typed question on the questionnaire.

The typed questionnaire and typed corresponding answers of each juror appears in a window equipped with a scroll bar on the right side so the attorneys, plaintiff, defendant, and professional jury consultants may view the entire questionnaire on the screen. At the top of the screen will appear the date that the in-court jury selection process begins.

In the respective programs of each attorney, the plaintiff, the defendant, and the judge a window will appear at the bottom of the screen as space for the attorneys, the plaintiff, the defendant, and the judge to type confidential notes on the juror to help them remember the juror. Thus, in this space, the heading "Confidential Notes on [the juror's name will appear here]" will appear. The attorneys, plaintiff, and defendant are advised by the invention's website to type notes that will help them make a decision as to whether to keep or exclude the juror with a peremptory challenge in the in-court jury selection process and type notes that meet any ground for excluding a juror with a challenge for cause in the in-court jury selection process. The judge is advised by the invention's website to type notes about whether or not to excuse a jury from jury duty in the in-court jury selection process. In the programs of the Professional Jury Consultants, this space will also appear except the heading will say: "Professional Analysis of [the Juror's name will appear here]." Thus, the Professional Jury Consultant will type his/her analysis of each juror. Below the space for the attorneys, plaintiff, defendant, and judge to type confidential notes in their respective programs and below the space for professional jury consultants to type a professional analysis of the juror in their respective programs is space for the attorneys, plaintiff, defendant and professional jury consultants to type a number between 1 and 10 based on the strength of their desire to exclude the juror from the jury pool in the in-court jury selection process. Such number will help them make decisions on which jurors to keep and which jurors to exclude in light of viewing a list of all the jurors before the in-court jury selection begins. Thus, the attorneys, plaintiff, and defendant are instructed by the invention's website to type confidential notes on each juror they view and/or listen to respond to the questionnaire and assign a number between 1 and 10 based on the strength of their desire to exclude the juror from the jury pool. Thus, the invention's website instructs them that a number 10 represents the strongest desire to exclude a juror with the number 1 representing the least desire to exclude a juror. Likewise, the professional jury consultants are instructed by the invention's website to type a professional analysis of each juror they view and/or listen to respond to the questionnaire and assign a number between 1 and 10 based on the strength of their desire to exclude the juror from the jury pool. Thus, the invention's website instructs them that a number 10 represents the strongest desire to exclude a juror with the number 1 representing the least desire to exclude a juror. In this note making and number assigning phase, the notes that the attorneys, plaintiff, defendant, judge, and professional jury consultants type are confidential and cannot be viewed by anyone in the invention's website.

When a Professional Jury Consultant for either the Plaintiff Attorney or the Defense Attorney has finished typing a professional analysis of each juror and assigns a number between 1 and 10 to each juror through the invention's website in his/her respective program, he/she is instructed to select a button labeled "View Professional Analysis of All Jurors."

Upon selecting this button, the Professional Jury Consultant will be shown a list of every juror's name in the jury pool placed in order from the highest assigned numbers to the lowest assigned numbers based on the strength of the Professional Jury Consultant's desire to exclude the jurors from the jury pool in the in-court jury selection process. For example, any jurors with an assigned number of 10 will appear at the top of the list and any jurors with an assigned number of 9 will appear directly below the group of jurors with the assigned number of 10. The reason for this order is to make the in-court jury selection for the attorney easier. Thus, they can easily view the jurors they desire to exclude the most by being grouped in the same numbered category. Thus, in the in-court jury selection process, the attorneys will naturally exclude all jurors assigned a number 10 first with a peremptory challenge and then proceed to exclude all jurors assigned a number 9 with a peremptory challenges etc.

Thus, the assigned number of the juror from 1 to 10 based on the professional jury consultant's strength of desire to exclude the juror appears to the far left of the juror's name. The juror's name is interactive. By clicking on the juror's name, the professional jury consultant can view and listen to the juror's video recording and view the juror's typed questionnaire or view their client's information. To the immediate right of the juror's assigned number and to the left of the juror's interactive name is a 1½ inch picture of the juror to help the consultant remember the juror. Directly below the juror's assigned number, picture, and interactive name is the professional analysis of the particular juror. The invention's website allows the professional jury consultant to edit or add to any analysis he/she has typed for any juror and may change the assigned number for any juror. In the top margin of the screen appears the date that the in-court jury selection process is to take place. Also, when the professional jury consultants log into their respective programs in the invention's website to type an analysis for each juror and assign each juror a number from 1 to 10, they are advised through the invention's website of the date of the in-court jury selection process and are advised that they must submit their analysis of each juror and assigned number of each juror to their respective attorney at least one week before the in-court jury selection process begins unless advised otherwise by their respective attorney. When the professional jury consultant has typed an analysis for each juror, the consultant, at the bottom of the list of jurors, may type a summary or include any other information the consultant wishes to convey to his/her client to help his/her client make sound jury selections. After the consultant has finished typing an analysis for each juror and has assigned a number from 1 to 10 for each juror, the consultant is instructed to select the "Authenticate and Submit" option that appears in the bottom margin of the screen.

Upon the Professional Jury Consultant selecting "Authenticate and Submit," a window appears on the consultant's screen. Below the window appears a button labeled "Take Picture and Submit." When such window appears on the screen and the consultant sits in front of a webcam, the consultant's live video recording appears in the window. When the consultant clicks "Take Picture and Submit," the invention's website captures a picture of the consultant on the consultant's screen. When the Professional Jury Consultant's picture is taken, the Professional Jury Consultant's professional analysis of each juror, the assigned number of each juror from 1-10, and any included summary are made viewable and accessible through his/her respective attorney's program through the invention's website. When the Professional Jury Consultant's respective attorney views the Professional Jury Consultant's analysis of each juror and assigned number of each juror from 1-10 in the attorney's respective program through the invention's website, the attorney's respective Professional Jury Consultant's picture appears at the top of the screen. The purpose of the Professional Jury Consultant taking his/her picture in front of a webcam before he/she submits his/her analysis of each juror and assigned number of each juror from 1-10 is to prove that the Professional Jury Consultant submitted them through the invention's website.

When the consultant authenticates and submits his/her professional analysis of each juror and assigned number of each juror from 1-10 and any included summary to his/her respective attorney, the invention sends an email message to the personal email account of consultant's respective attorney instructing the respective attorney that he/she may log into his/her respective program in the invention's website and view the professional analysis and assigned number of each juror and any summary. Also, the invention sends a text message to the cellular phone of respective attorney alerting him/her that his/her participation is required through the invention's website and that he/she is advised to check his/her email for an instructive message of the tasks he/she is to complete. Such text message is the same as the quoted text message stated above.

Likewise, when the plaintiff and defendant finish typing confidential notes on each juror and assign a number between 1 and 10 for each juror in their respective programs through the invention's website, they may review all of their notes and assigned numbers for all jurors by selecting an option in the bottom margin of the screen labeled "View Notes for all Jurors." To clarify, the plaintiff will be the only one that can view his/her notes, and the defendant will be the only one that can view his/her notes. Thus, the plaintiff will not be allowed to view the notes of the defendant or the defense attorney, and the defendant will not be allowed to view the notes of the plaintiff or the plaintiff attorney.

Upon selecting the "View Notes for all Jurors" option, the plaintiff will be shown a list of every juror's name in the jury pool placed in order from the highest assigned numbers to the lowest assigned numbers based on the strength of his/her desire to exclude the jurors from the jury pool. For example, any jurors with an assigned number of 10 will appear at the top of the list and any jurors with an assigned number of 9 will appear directly below the group of jurors with the assigned number of 10. The reason for this order is to make the in-court jury selection process for the attorney easier. Thus, they can easily view the jurors they desire to exclude the most by being grouped in the same numbered category. The invention's website allows the plaintiff to edit or add to any analysis he/she has typed for any juror and may change the assigned number for any juror. In the top margin of the screen appears the date that the in-court jury selection process is to take place.

Likewise, upon selecting the "View Notes for all Jurors" option, the defendant will be shown a list of every juror's name in the jury pool placed in order from the highest assigned numbers to the lowest assigned numbers based on the strength of his/her desire to exclude the jurors from the jury pool in the in-court jury selection process. For example, any jurors with an assigned number of 10 will appear at the top of the list and any jurors with an assigned number of 9 will appear directly below the group of jurors with the assigned number of 10. The reason for this order is to make the in-court jury selection for the attorney easier. Thus, they can easily view the jurors they desire to exclude the most by being grouped in the same numbered category. The invention's website allows the defendant to edit or add to any analysis he/she has typed for any juror and may change the assigned number for any juror. In the top margin of the screen appears the date that the in-court jury selection process is to take place.

Thus, in the Plaintiff's program, the assigned number of the juror from 1 to 10 based on the plaintiff's respective desire to exclude the juror appears to the far left of the juror's name. The juror's name is interactive. By clicking on the juror's name, the plaintiff can view and listen to the juror's video recording and view the juror's typed questionnaire. To the immediate right of the juror's assigned number and to the left of the juror's interactive name is a 1½ inch picture of the juror to help the plaintiff remember the juror. Directly below the juror's assigned number, picture, and interactive name is the plaintiff's confidential notes of the particular juror.

Likewise, in the Defendant's program, the assigned number of the juror from 1 to 10 based on the Defendant's respective desire to exclude the juror appears to the far left of the juror's name. The juror's name is interactive. By clicking on the juror's name, the Defendant can view and listen to the juror's video recording and view the juror's typed questionnaire. To the immediate right of the juror's assigned number and to the left of the juror's interactive name is a 1½ inch picture of the juror to help the Defendant remember the juror. Directly below the juror's assigned number, picture, and interactive name is the Defendant's confidential notes of the particular juror.

Upon reviewing the confidential notes and assigned numbers, the Plaintiff and Defendant are advised in their respective programs that they may submit their confidential notes and assigned numbers to their respective attorneys so they may consider such notes and assigned numbers as recommendations before the in-court jury selection process begins. Also, the Plaintiff and Defendant are advised in their respective programs of the date of the in-court jury selection process and are advised that they must submit their analysis of each juror and assigned number of each juror to their respective attorney at least one week before the in-court jury selection process begins unless advised otherwise by their respective attorney.

In the Plaintiff's program, the Plaintiff submits his/her confidential notes and assigned numbers for each juror to the Plaintiff Attorney for his/her review by selecting an option labeled "Authenticate and Submit." When the Plaintiff selects this option and takes an authenticating picture of himself/herself with a webcam and into the invention's website as detailed above, the Plaintiff's juror notes and assigned numbers will only be made viewable and accessible to the Plaintiff Attorney for viewing in the Plaintiff Attorney's program through the invention's website and the Plaintiff's authenticating picture will appear at the top of the Plaintiff's notes on each juror. Thus, when the Plaintiff selects this option, the Plaintiff's juror notes will only be made accessible to the Plaintiff Attorney for viewing.

When the Plaintiff authenticates and submits his/her confidential analysis of each juror and assigned number of each juror from 1-10, the invention sends an email message to the personal email account of the Plaintiff Attorney instructing the Plaintiff Attorney that he/she may log into his/her respective program in the invention's website and view the Plaintiff's analysis and assigned number of each juror. Also, the invention sends a text message to the cellular phone of the Plaintiff Attorney alerting him/her that his/her participation is required through the invention's website and that he/she is advised to check his/her email for an instructive message of the tasks he/she is to complete. Such text message is the same as the quoted text message stated above.

Likewise, in the Defendant's program, the Defendant submits his/her confidential notes and assigned numbers for each juror to the Defense Attorney for his/her review by selecting an option labeled "Authenticate and Submit." When the Defendant selects this option and takes an authenticating picture of himself/herself with a webcam and into the invention's website as detailed above, the Defendant's juror notes and assigned numbers will only be made viewable and accessible to the Defense Attorney for viewing in the Defense Attorney's program through the invention's website and the Defendant's authenticating picture will appear at the top of the Defendant's notes on each juror. Thus, when the Defendant selects this option, the Defendant's juror notes will only be made accessible to the Defense Attorney for viewing.

When the Defendant authenticates and submits his/her confidential analysis of each juror and assigned number of each juror from 1-10, the invention sends an email message to the personal email account of the Defense Attorney instructing the Defense Attorney that he/she may log into his/her respective program in the invention's website and view the Defendant's analysis and assigned number of each juror. Also, the invention sends a text message to the cellular phone of the Defense Attorney alerting him/her that his/her participation is required through the invention's website and that he/she is advised to check his/her email for an instructive message of the tasks he/she is to complete. Such text message is the same as the quoted text message stated above.

If the Judge did not elect to allow attorney's to exercise challenges for cause or peremptory challenges in the setup of the custom jury selection process, and either the Plaintiff Attorney and the Defense Attorney has finished typing confidential notes on each juror and has finished assigning a number between 1-10 for each juror, he/she is instructed to select a button labeled "View Professional Analysis and Confidential Notes for All Jurors" in their respective programs through the invention's website. Upon selecting this button, at the very top of the screen will appear the date for the in-court jury selection process to begin. Directly below this date will appear a list of every juror's name in the jury pool. The jurors' names are interactive. By clicking on a name the attorney will be shown the selected juror's video recording and full questionnaire which was provided on the previous screen. To the immediate left of each juror's interactive name is a 1½ inch picture of the juror to help the attorney remember the juror. If the attorney selected the use of a professional jury consultant, directly below the juror's interactive name and picture will appear the professional analysis of the respective juror provided by the professional jury consultant. To the left of the professional jury consultant's analysis of the respective juror is the number the professional jury consultant assigned to the respective juror based on the strength of desire of the consultant to exclude the juror from the jury pool.

If the professional consultant had not submitted an analysis of the juror, the word "Pending" will appear next to the prompt that states: "Professional Analysis of [Name of Juror appears here]." If the respective attorney did not hire a professional jury consultant to submit an analysis of each juror through the invention's website, the words "No professional analysis will be submitted" will appear next to the prompt that states: "Professional Analysis of [Name of Juror appears here]."

Below the professional analysis of each respective juror in the Plaintiff Attorney's program will appear the Plaintiff's own confidential notes and opinions of each respective juror if the case is civil. To the immediate left of the Plaintiff's opinions will appear a number from 1-10 the Plaintiff assigned to the juror which represents the strength of his/her desire to exclude the juror. If the Plaintiff had not submitted an analysis of the juror, the word "Pending" will appear next to the prompt that states: "Plaintiff's Confidential Notes of [Name of Juror appears here]."

Likewise, below the professional analysis of each respective juror in the Defense Attorney's program will appear the Defendant's own confidential notes and opinions of the juror. To the immediate left of the Defendant's opinions will appear a number from 1-10 the Defendant assigned to the juror which represents the strength of his/her desire to exclude the juror. If the Defendant had not submitted an analysis of the juror, the word "Pending" will appear next to the prompt that states: "Defendant's Confidential Notes of [Name of Juror appears here]."

In the Plaintiff Attorney's program through the invention's website, directly below the Plaintiff's opinions for each juror will appear the Plaintiff Attorney's own confidential notes and opinions of the juror. To the immediate left of the Plaintiff Attorney's confidential notes will appear a number from 1-10 the Plaintiff Attorney assigned to the juror which represents the strength of his/her desire to exclude the juror.

Likewise, in the Defense Attorney's program through the invention's website, directly below the Defendant's opinions for each juror will appear the Defense Attorney's own confidential notes and opinions of the juror. To the immediate left of the Defense Attorney's confidential notes will appear a number from 1-10 the Defense Attorney assigned to the juror which represents the strength of his/her desire to exclude the juror.

To recap, in the Plaintiff Attorney's program, under the interactive name and picture of each juror will appear the professional analysis provided by the Plaintiff Attorney's Professional Jury Consultant and the consultant's assigned number from 1-10, and under the consultant's analysis and assigned number will appear the Plaintiff's confidential opinion and the Plaintiff's assigned number from 1-10, and under the Plaintiff's analysis and assigned number will appear the Plaintiff Attorney's confidential notes of the juror and the Plaintiff Attorney's assigned number from 1-10.

Likewise, in the Defense Attorney's program, under the interactive name and picture of each juror will appear the professional analysis provided by the Defense Attorney's Professional Jury Consultant and the consultant's assigned number from 1-10, and under the consultant's analysis and assigned number will appear the Defendant's confidential opinion and the Defendant's assigned number from 1-10, and under the Defendant's opinion and assigned number will appear the Defense Attorney's confidential notes of the juror and the Defense Attorney's assigned number from 1-10.

Additionally, when the attorneys select "View Professional Analysis and Confidential Notes for All Jurors" they are shown every juror's name in the jury pool placed in order based on the numbers their respective professional jury consultant assigned to the juror based on his/her desire to exclude the juror. Thus, the jurors appear from the highest assigned numbers to the lowest assigned numbers based on the strength of their respective Professional Jury Consultant's desire to exclude the jurors from the jury pool. For example, any jurors assigned the number 10 by the consultant will appear at the top of the list and any jurors assigned the number 9 by the consultant will appear directly below the group of jurors with the assigned number of 10. Thus, the attorney can easily view the jurors they desire to exclude the most by being grouped in the same numbered category.

If the Plaintiff Attorney's respective professional jury consultant has not yet submitted his/her professional analysis of each juror to the Plaintiff Attorney's program through the invention's website, or if no professional jury consultant was hired by the Plaintiff Attorney to provide an analysis of each juror through the invention's website, then the Plaintiff Attorney is shown every juror's name in the jury pool placed in order based on the numbers the Plaintiff Attorney assigned to the jurors based on his/her desire to exclude the jurors. Thus, in the Plaintiff Attorney's program, the jurors appear from the highest assigned numbers to the lowest assigned numbers based on the strength of the Plaintiff Attorney's desire to exclude the jurors from the jury pool. However, once the Plaintiff Attorney's respective professional jury consultant submits his/her analysis of each juror, every juror's name in the jury pool will be rearranged and placed in order based on the numbers the professional jury consultant assigned to the juror based on his/her desire to exclude the juror. Thus, the jurors appear from the highest assigned numbers to the lowest assigned numbers based on the strength of the Plaintiff Attorney's respective professional jury consultant's desire to exclude the jurors from the jury pool.

Likewise, if the Defense Attorney's respective professional jury consultant has not yet submitted his/her professional analysis of each juror to the Defense Attorney's program through the invention's website, or if no professional jury consultant was hired by the Defense Attorney to provide an analysis of each juror through the invention's website, then the Defense Attorney is shown every juror's name in the jury pool placed in order based on the numbers the Defense Attorney assigned to the jurors based on his/her desire to exclude the jurors. Thus, in the Defense Attorney's program, the jurors appear from the highest assigned numbers to the lowest assigned numbers based on the strength of the Defense Attorney's desire to exclude the jurors from the jury pool. However, once the Defense Attorney's respective professional jury consultant submits his/her analysis of each juror through the invention's website, every juror's name in the jury pool will be rearranged and placed in order based on the numbers the professional jury consultant assigned to the juror based on his/her desire to exclude the juror. Thus, the jurors appear from the highest assigned numbers to the lowest assigned numbers based on the strength of the Defense Attorney's respective professional jury consultant's desire to exclude the jurors from the jury pool.

The attorneys each will further be advised that he/she will be sent an email message notifying him/her when his/her respective professional jury consultant has submitted an analysis for each juror and when his/her respective client has submitted his/her opinions of each juror.

Furthermore, if the Judge did not elect to allow attorney's to exercise challenges for cause or peremptory challenges and elected to use the invention's website as a forum for questioning jurors before the in-court jury selection takes place, the invention's website will advise the Plaintiff Attorney and the Defense Attorney in their respective programs to print the juror questionnaires and the analysis and assigned number for each juror from their respective professional jury consultant and print the analysis and assigned number for each juror from their respective client and print their own analysis and assigned number for each juror from the invention's website to prepare for the in-court jury selection process. By the attorneys using such information in the in-court jury selection process, the in-court jury selection process will be substantially quicker in that the attorneys will already know exactly which jurors to exclude and will already know exactly what questions to ask each juror.

Likewise, when the Judge finishes typing confidential notes on each juror in his/her respective program through the invention's website, he/she may review all of his/her notes by selecting an option in the bottom margin of the screen labeled "View Notes for all Jurors." Upon selecting the "View Notes for all Jurors" option, the Judge will be shown a list of every juror's name in the jury pool placed in alphabetical order since the Judge likely would not assign any jurors a number from 1-10 as the Judge does not exercise challenges for cause or peremptory challenges in the in-court jury selection process. The invention's website allows the Judge to edit or add to any analysis he/she has typed for any juror. In the top margin of the screen appears the date that the in-court jury selection process is to take place.

If the jurors' video recorded oral responses are transcribed into a typed format, and if the Court Reporter authenticates them and submits them through the invention's website, the Court Reporter logs into his/her program in the invention's website and prints each juror's answered questionnaire, and the date each juror finished responding to the questionnaire and the respective deadline for all jurors to have finished responding to the questionnaire, and the invention's website instructs the Court Reporter to place such prints in the Court's file for transcript purposes. Also, the Court Reporter prints all email messages the invention sent to the Judge, Plaintiff Attorney, Defense Attorney, the Defendant, the Plaintiff, if the case is civil, the Plaintiff Attorney's Professional Jury Consultant, and the Defense Attorney's Professional Jury Consultant and the dates such emails were submitted through the invention's website, and the invention's website instructs the Court Reporter to place such prints in the Court's file for transcript purposes. If the Judge did not elect to allow attorneys to submit Challenges for Cause and/or Peremptory Challenges through the invention's website and limited the invention's website's use to merely obtaining video recordings of jurors and transcriptions of their responses before the in-court jury selection process begins, and if the attorneys review and print each confidential analysis of each of the jurors and all juror questionnaires and the Court Reporter prints all of the juror questionnaires and places them into the Court's file, the process of the invention's website is complete and finished.

Every email message that is described in this application as being sent to the Judge, the Plaintiff Attorney, the Defense Attorney, the Plaintiff, the Defendant, the Plaintiff Attorney's Professional Jury Consultant, the Defense Attorney's Professional Jury Consultant, the Court Reporter, and the Court Administrator is sent from the invention to their personal email accounts. Every text message that is described in this application as being sent to the Judge, the Plaintiff Attorney, the Defense Attorney, the Plaintiff, the Defendant, the Plaintiff Attorney's Professional Jury Consultant, the Defense Attorney's Professional Jury Consultant, the Court Reporter, and the Court Administrator is sent from the invention to their personal cellular phones. Additionally, the word "website" appearing everywhere in this application is short for "the invention's website." "Website" means "the invention's website" in this application. Thus, everywhere in this application where the Judge, the Plaintiff Attorney, the Defense Attorney, the Plaintiff, the Defendant, the Plaintiff Attorney's Professional Jury Consultant, the Defense Attorney's Professional Jury Consultant, the Court Reporter, and/or the Court Administrator is described as completing a function through the "website" means that they complete their functions through "the invention's website."

Every time the Judge, the Plaintiff Attorney, the Defense Attorney, the Plaintiff, the Defendant, the Plaintiff Attorney's Professional Jury Consultant, the Defense Attorney's Professional Jury Consultant, the Court Reporter, and the Court Administrator are described as selecting "Authenticate and Submit" or described as selecting "submit" in their respective programs in this application after completing a function through the invention's website, "Authenticate and Submit" and "submit" means, in this application, that a window appears on their respective screens, and below the window appears a button labeled "Take Picture and Submit." When such window appears on their respective screens and they individually sit in front of a webcam on a personal computer or a cellular phone, their respective live video recording appears in the window. When they select "Take Picture and Submit," the invention's website captures a picture of them on their respective screens. When their picture is taken, the product of the function they completed becomes viewable and accessible to the party or parties that are specified in this application to review such a product through their respective program. When the party or parties that are specified in this application to review such a product through their respective program reviews the product in their respective program, the said picture of the person who authenticated and submitted the product through the invention's website appears at the top of the product which provides proof as to who submitted the product through the invention's website.

Additionally, everywhere in this application where the Court Reporter "prints" anything through the invention's website or everywhere in this application where the Court Reporter is described as printing anything described herein through the invention's website, the word "prints" means that the Court Reporter selects an option in the bottom margin of the screen in the invention's website labeled "Authenticate and Print." Upon the Court Reporter selecting "Authenticate and Print," a window appears on the Court Reporter's screen. Below the window appears a button labeled "Take Picture and Print." When such window appears on the screen and the Court Reporter sits in front of a webcam, the Court Reporter's live video recording appears in the window. When the Court Reporter clicks "Take Picture and Print," the invention's website captures a picture of the Court Reporter on the Court Reporter's screen. When the Court Reporter's picture is taken, the invention places such picture of the Court Reporter at the top of the document appearing on the invention's website that the Court Reporter seeks to print through the invention's website. Immediately after the invention places such picture of the Court Reporter at the top of such document appearing on the invention's website, the invention's website allows such document to be printed through the Court Reporter's printer. Such picture of the Court Reporter will appear in the print at the top of such document when it is printed. The purpose of the Court Reporter taking his/her picture in front of a webcam before he/she prints any document through the invention's website is to prove that the Court Reporter printed the document and to prove that the document is a true and correct copy from the invention's website. Thus, the Judge's jury selection questions, the Plaintiff Attorney's jury selection questions, the Defense Attorney's jury selection questions, all objections to jury selection questions, all peremptory challenge exercises, all rebuttals, all judicial rulings, all email messages, and all other documents the Court Reporter prints through the invention's website will contain a picture of the Court Reporter.

If the Judge did elect to allow attorneys to exercise challenges for cause and peremptory challenges through the invention's website in the Custom Setup of the Jury Selection Process in the Judge's program in the invention's website, and if the jurors' video recorded oral responses are transcribed into a typed format, and if the Court Reporter authenticates them and submits them through the invention's website, the invention sends an email message to the personal email account of the Judge instructing him/her to log onto the invention's website and review each juror's questionnaire and rule upon which jurors may be excused from jury duty before the parties are allowed to submit challenges for cause and peremptory challenges through the invention's website. The invention sends this same email message that was sent to the Judge to the personal email accounts of the Plaintiff Attorney, Plaintiff, Defense Attorney, and the Defendant.

Additionally, if the Judge did elect to allow attorneys to exercise challenges for cause and peremptory challenges through the invention's website in the Custom Setup of the Jury Selection Process, the invention sends email messages to the personal email accounts of the Judge, Plaintiff Attorney, Plaintiff, Defense Attorney, and the Defendant instructing them that they may now log into their respective programs and view each juror's video recording and typed questionnaire. The email message also will advise that the Plaintiff Attorney and the Defense Attorney will not be allowed to submit any challenges for cause or peremptory challenges until the Judge rules upon which jurors may be excused from jury duty. The email message also will advise that the Judge will now be making rulings on which jurors may be excused from jury duty, and the email message also will advise the attorneys that they will be sent an email message when they will be allowed to submit their challenges for cause through the invention's website.

Additionally, the invention sends text messages to the cellular phones of the Judge, Plaintiff Attorney, Plaintiff, Defense Attorney, Defendant, and the Court Reporter alerting them that their participation is required through the invention's website and that they are advised to check their email accounts for an instructive message of the task they are to complete. Such text message is the same as the quoted text message stated above.

If the Judge did elect to allow attorneys to exercise challenges for cause and peremptory challenges through the invention's website in the Custom Setup of the Jury Selection Process in the Judge's program in the invention's website, and if the jurors' video recorded oral responses are transcribed into a typed format, and if the Court Reporter authenticates them and submits them through the invention's website, the Judge may log onto the invention's website and excuse any of the jurors from jury duty through the invention's website before the attorneys exercise any challenges for cause and peremptory challenges through the invention's website. Thus, if the judge did not elect to allow attorneys to submit Challenges for Cause and/or Peremptory Challenges through the invention's website and limited the invention's website's use to merely obtaining video recordings of jurors and transcription of their responses before the in-court jury selection process begins, the judge would not be given the option of excusing jurors before they appear in court for in-court jury selection as the judge would excuse any jurors when they appear in court for the in-court jury selection process.

To excuse any of the jurors for jury duty through the invention's website, the Judge may log onto the invention's website and select "Rule upon which Jurors may be Excused from Jury Duty" from the Judge's Main Menu of Functions only if the Judge elected to allow attorneys to submit Challenges for Cause and/or Peremptory Challenges through the invention's website. Upon selecting such option, he/she is first shown a screen that allows him/her to easily detect which jurors did not completely answer the questionnaire. He/she is shown an interactive list of all the juror names who were ordered to respond to the questionnaire. Small red cautionary flags will appear next to the names of any jurors who did not complete the questionnaire to its entirety. Upon examining the red flags next to juror names, the Judge may contact the Court Administrator with the names of the jurors who did not complete the questionnaire and have the Court Administrator issue such jurors new summons to appear at the Courthouse to answer the questionnaire through the invention's website with a webcam under supervision. In the alternative, the Judge may contact the Court Administrator with the names of the jurors who did not complete the questionnaire and have the Court Administrator enforce some type of sanction against such jurors for a failure to comply with jury duty.

After the Judge addresses the issue of certain jurors not responding to the questionnaire, the Judge proceeds to the next screen by selecting "Rule upon which Jurors may be Excused from Jury Duty" option in the bottom margin of the screen. Upon selecting such option, the Judge will be shown a screen that shows two inch squares of the video recordings of each juror in the jury pool in alphabetical order from the top of the screen to the bottom of the screen. The two inch video recording squares are interactive. When the Judge clicks his/her mouse on a two inch square video recording, the Juror's video recording enlarges and starts to play. When the video recording enlarges, a "stop" button, "play" button, "fast forward" button, and "rewind" button will appear. To the right of each juror's two inch video recording will appear the Juror's respective name which is interactive. Thus, when the Judge clicks on the Juror's name, the Juror's transcribed questionnaire, with all of the features detailed above, will appear on the right side of the screen and the Juror's video recording enlarges with the above said buttons and occupies the left side of the screen. To the left of each juror's two inch video recording will appear a small square box with the word "Keep" directly above it. To the immediate left of the small square box with the word "Keep" will appear another equally portioned size box with the word "Excuse" directly above it. Directly below the "Excuse" box, the "Keep" box, the two inch video recording, and the jurors name, will appear a two inch window equipped with a scroll bar on the right side. In the two inch window will appear the Juror's transcribed typed answers to the Juror Statutory Qualification Questions of his/her respective questionnaire. To the far right of the entire screen will appear a scroll bar for the Judge to issue rulings on all of the jurors and view all of the jurors' names, video recordings, and juror qualification questions.

To excuse or keep the jurors, the Judge must review the transcribed typed juror responses to the Juror Qualification Questions and examine the juror's reason for requesting to be excused from jury duty. The Judge may then review the juror's video recording of the juror answering the particular question as to why the juror is requesting to be excused and determine if the request is sincere or valid. Upon viewing and listening to a juror's video recording and determining the juror is not sincere, the Judge is instructed to click the "Keep" box, and a check mark will appear in the box. A check mark in the "Keep" box will require the juror to participate in the jury selection process. Upon viewing and listening to a juror's video recording and determining the juror is sincere and the juror's request to be excused is valid, the Judge may select the "Excuse" box, and a check mark will appear in the box. The Judge is instructed to place a check mark in either the "Keep" box or the "Excuse" box for each juror and then select submit in the bottom margin of the screen. Upon selecting "Authenticate and Submit," the excused juror questionnaires and video recordings will not be presented to the attorneys or their professional jury consultants or the plaintiff or the defendant when they log onto the invention's website to view the juror video recordings and questionnaires. Such excused names will be placed on a separate list, and the Court Reporter will be instructed to print such a list and place it in the Court's file. Thus, upon the Judge selecting "Authenticate and Submit," the video recordings and questionnaires and juror names of the jurors the Judge kept will be made available and will be presented to the attorneys and their professional jury consultants and the plaintiff and the defendant when they log onto the invention's website to view the jurors.

The Court Reporter logs into his/her program in the invention's website and prints all of the jurors' answered questionnaires and the date each juror finished responding to the questionnaire. Also, the Court Reporter prints all email messages to the Judge, Plaintiff Attorney, Defense Attorney, the Defendant, and the Plaintiff, if the case is civil, and the dates such emails were submitted through the invention's website.

Additionally, the Plaintiff Attorney, Plaintiff, Defense Attorney, and the Defendant may log onto the invention's website and view the same screen containing the juror video recordings etc. that the Judge rules upon which jurors may be excused from jury duty. However, the website will not allow them to "Excuse" or "Keep" any of the jurors.

If the judge elected to allow attorneys to exercise challenges for cause and peremptory challenges through the invention's website in the setup of the Custom Jury Selection Process, and if the judge excuses any jurors from the jury pool through the invention's website, the invention sends an email message to the personal email account of the Court Reporter instructing him/her that he/she must now print, through the invention's website, the list of juror names who were excused from the jury pool by the Judge and the dates they were excused. The email message also instructs the Court Reporter to log onto the invention's website and print all email messages to the Judge, Plaintiff Attorney, Defense Attorney, the Defendant, and the Plaintiff, if the case is civil, and the dates such emails were submitted through the invention's website and place them in the Court's file for transcript purposes. The email messages contain an interactive link to the main website so the Court Reporter can instantaneously log onto the website.

Also, if the judge elected to allow attorneys to exercise challenges for cause and peremptory challenges through the invention's website in the setup of the Custom Jury Selection Process, and if either or both attorneys hired a professional jury consultant through the invention's website to provide them with a professional analysis of each juror through the invention's website, the invention sends email messages to the personal email accounts of the professional jury consultants immediately after the judge excuses any jurors from the jury pool through the invention's website. The email message sent to the professional jury consultants advises them that they must log onto the invention's website and make a professional analysis of each juror and rank each juror on a scale of 1-10 based on the strength of their desire to exclude the juror from the jury pool and submit such analysis of each juror and assigned number of each juror to their respective attorney's program through the invention's website. Such email messages sent to the professional jury consultants advises them of the attorneys' deadline to submit challenges for cause through the invention's website and advises them to submit their analysis of each juror and assigned number of each juror at least one week before the attorneys' deadline for exercising challenges for cause through the invention's website expires. Such email message sent to the professional jury consultant hired by the Plaintiff Attorney will also be sent to the personal email account of the Plaintiff Attorney from the invention. Likewise, such email message sent to the professional jury consultant hired by the Defense Attorney will also be sent to the personal email account of the Defense Attorney from the invention.

Additionally, if the judge elected to allow attorneys to exercise challenges for cause and peremptory challenges through the invention's website in the setup of the Custom Jury Selection Process, and if the judge excuses any jurors from the jury pool through the invention's website, the invention sends an email message to the personal email account of the Judge. The email message advises the Judge that he/she may log onto the invention's website and view and listen to the jurors' video recordings and take notes on the jurors. Such email message sent to the Judge is also sent to the Plaintiff Attorney, Plaintiff, Defense Attorney, and the Defendant.

Additionally, if the judge elected to allow attorneys to exercise challenges for cause and peremptory challenges through the invention's website in the setup of the Custom Jury Selection Process, and if the judge excuses any jurors from the jury pool through the invention's website, the invention sends email messages to the personal email accounts of the both attorneys advising them to log onto the invention's website and exercise their challenges for cause through the invention's website. Additionally, the email messages to the attorneys advises them to first view the video recordings of the jurors and take notes on the jurors and rank the jurors on a scale of 1-10 based on the strength of their desire to exclude the juror with a challenge for cause or a peremptory challenge before they exercise their challenges for cause through the invention's website. Additionally, the email messages to both attorneys advises them that if they sought the assistance of a professional jury consultant their consultants have been notified that they must log onto the invention's website and provide their respective attorneys a professional analysis of each juror. Furthermore, the email messages to both attorneys advises them that their respective professional jury consultants have been advised of the deadline for the attorneys to submit their challenges for cause and have been advised to submit their analysis of each juror to their respective attorney at least one week before the attorneys' deadline to exercise challenges for cause. Additionally, both attorneys are advised that their clients have also been advised to submit an analysis of each juror and submit them to their respective attorneys. The email messages to both attorneys also advise them that their clients have been advised of the deadline for the attorneys to submit their challenges for cause and have been advised to submit their analysis of each juror to their respective attorney at least one week before the attorneys' deadline to exercise challenges for cause. Both attorneys will also be advised that they will be able to compare their analysis of each juror with their respective professional jury consultant's analysis of each juror and their respective client's analysis of each juror before the attorney's submit their challenges for cause and their peremptory challenges through the invention's website. Also, the email messages advise both attorneys to wait for their respective professional jury consultant and their respective client to submit their analysis of each juror before they submit their challenges for cause and their peremptory challenges through the invention's website so the attorneys can compare their analysis with their professional jury consultant's analysis and their client's analysis so they will have more confidence in their challenge for cause and peremptory challenge decisions. Such email message sent to the Plaintiff Attorney is also sent to the Judge, the Defense Attorney, the Defendant, and the Plaintiff. Likewise, such email message sent to the Defense Attorney is also sent to the Judge, the Plaintiff Attorney, the Plaintiff, and the Defendant.

Also, if the judge elected to allow attorneys to exercise challenges for cause and peremptory challenges through the invention's website in the setup of the Custom Jury Selection Process, and if the judge excuses any jurors from the jury pool through the invention's website, the invention sends email messages to the personal email accounts of the plaintiff and the defendant. The email messages sent to the plaintiff and the defendant advises them that their attorneys have been instructed to submit challenges for cause through the invention's website. The email messages sent to the plaintiff and the defendant advise them that they may log onto the invention's website and submit to their respective attorneys through the invention's website an analysis of each juror and rank each juror on a scale of 1-10 based on the strength of their desire to exclude the juror from the jury pool. Such email messages sent to the plaintiff and the defendant advises them of the attorneys' deadline to submit challenges for cause through the invention's website and advises them to submit their analysis of each juror at least one week before the attorneys' deadline for exercising challenges for cause through the invention's website expires. Such email message sent to the Plaintiff will also be sent to the Judge, the Plaintiff Attorney, the Defense Attorney, and the Defendant. Likewise, such email message sent to the Defendant will also be sent to the Judge, the Plaintiff Attorney, the Defense Attorney, and the Plaintiff.

Additionally, if the judge elected to allow attorneys to exercise challenges for cause and peremptory challenges through the invention's website in the setup of the Custom Jury Selection Process, and if the judge excuses any jurors from the jury pool through the invention's website, the invention sends text messages to the personal cellular phones of the Judge, Plaintiff Attorney, Plaintiff, Defense Attorney, Defendant, and the Court Reporter alerting them that their participation is required through the invention's website and that they are advised to check their email for an instructive message of the tasks they are to complete. Such text message is the same as the quoted text message stated above.

If the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, any Professional Jury Consultants retained by an attorney through the invention's website may now log onto the invention's website and view all of the juror video recordings and transcribed typed questionnaires as described above, type a confidential professional analysis of each juror, rate each juror on a scale of 1-10 based on the strength of their desire to exclude the juror in the in-court jury selection process, and "Authenticate and Submit" their professional analysis and assigned numbers for each juror to their respective attorney's program through the invention's website before the attorneys' deadline for exercising challenges for cause through the invention's website expires. Likewise, the Plaintiff, if the case is civil, and the Defendant may now log onto the invention's website and view all of the juror video recordings and transcribed typed questionnaires as described above, take confidential notes of the jurors, rate each juror on a scale of 1-10 based on the strength of their desire to exclude the juror in the in-court jury selection process and "Authenticate and Submit" their confidential notes and assigned numbers for each juror to their respective attorney's program through the invention's website before the attorneys' deadline for exercising challenges for cause through the invention's website expires. The Plaintiff Attorney and Defense Attorney may now log onto the website and view all of the juror video recordings and transcribed typed questionnaires as described above, take confidential notes of the jurors, rate each juror on a scale of 1-10 based on the strength of their desire to exclude the juror in the in-court jury selection process, and exercise their challenges for cause through the invention's website. The Plaintiff Attorney and the Defense Attorney may also compare their analysis and assigned number with the analysis and assigned numbers of their respective professional jury consultant and their respective client through the invention's website before they exercise their challenges for cause through the invention's website.

When the attorneys, plaintiff, defendant, and professional jury consultants enter their respective programs in the invention's website, they select "View Video Recordings of Jurors Responding to Questionnaire." They are then shown a list of the names of each juror in the jury pool. The names on the list are interactive. When the attorneys, plaintiff, defendant, and professional jury consultants select a name, the video recording of the juror appears on the left half of the screen and the typed questionnaire appears on the right half of the screen. For Professional Jury Consultants, they will have an additional option on the left side of the screen that allows them to either view the Juror's typed questionnaire or view their client's information. Directly below the juror's video recording appears the picture of the juror's driver's license or picture identification card. The juror's driver's license or picture identification card is interactive. By clicking anywhere on such driver's license or picture identification card, the license or card enlarges so the picture on the license or card can be compared more easily with the Juror's video footage. Directly below the juror's driver's license or picture identification card are a play button, stop button, fast-forward button, and rewind button for the attorneys, judge, and professional jury consultants to view and listen to the juror respond to the questionnaire. Directly below these buttons are the words "Play particular question(s):" followed by space designated for the numbers of the questions on the questionnaire. Thus, the attorneys, plaintiff, defendant, and professional jury consultants can play any single question and answer or any group of questions and answers on the questionnaire by typing the number or number range in this space.

On the right half of the screen with the questionnaire will appear the typed juror qualification questions. Below the typed juror qualification questions will appear the Judge's typed jury selection questions. Below the Judge's typed jury selection questions will appear the Plaintiff Attorney's typed jury selection questions. Below the Plaintiff Attorney's typed jury selection questions will appear the Defense Attorney's jury selection questions. Thus, each question on the questionnaire appears in a typed format. To the left of each typed question on each juror's transcribed jury selection questionnaire that appears on the right side of the screen on the invention's website will appear the photo of the person whose video recording was appearing on the juror's screen when the juror responded to the particular question. For example, if the Judge's video recording appeared on each juror's screen for questions 1 through 20 on the jury selection questionnaire, the Judge's photo derived from the Judge's video recording that appeared to the jurors will appear to the left of each of the typed juror qualification questions and the Judge's typed questions numbered 1 through 20 on each juror's transcribed questionnaire.

Likewise, if the Plaintiff Attorney's video recording appeared on each juror's screen for questions 21 through 30 on the jury selection questionnaire, the Plaintiff Attorney's photo derived from the Plaintiff Attorney's video recording that appeared to the jurors will appear to the left of each of the Plaintiff Attorney's typed questions numbered 21 through 30 on each juror's transcribed questionnaire.

Also, if the Plaintiff's video recording appeared on each juror's screen for questions 31 through 40 on the jury selection questionnaire, the Plaintiff's photo derived from the Plaintiff's video recording that appeared to the jurors will appear to the left of each of the Plaintiff Attorney's typed questions numbered 31 through 40 on each juror's transcribed questionnaire.

Additionally, if the Defense Attorney's video recording appeared on each juror's screen for questions 41 through 50 on the jury selection questionnaire, the Defense Attorney's photo derived from the Defense Attorney's video recording that appeared to the jurors will appear to the left of each of the Defense Attorney's typed questions numbered 41 through 50 on each juror's transcribed questionnaire.

Also, if the Defendant's video recording appeared on each juror's screen for questions 51 through 60 on the jury selection questionnaire, the Defendant's photo derived from the Defendant's video recording that appeared to the jurors will appear to the left of each of the Defense Attorney's typed questions numbered 51 through 60 on each juror's transcribed questionnaire.

The photos next to their respective typed questions on the transcribed jury selection questionnaires for each juror which symbolizes which person's video recording was appearing on each juror's screen when each juror responded to the questionnaire provides the Judge, the Plaintiff Attorney, the Defense Attorney, the Plaintiff, the Defendant, the Plaintiff Attorney's Professional Jury Consultant, and the Defense Attorney's Professional Jury Consultant with an opportunity to see how each juror responds to the individual video profiles of the Judge, the Plaintiff Attorney, the Defense Attorney, the Plaintiff, and the Defendant. For example, if the Defense Attorney wanted to know how each juror will respond to the Defendant's physical appearance, and if the Defendant's video recording appeared to the juror's on questions 51 through 60, the Defense Attorney could watch each juror's video recorded responses for questions 51 through 60 through the invention's designated website, and the Defense Attorney can see how each juror reacts to seeing the Defendant's video recording. Thus, by knowing whose specific video recording was playing on the jurors' screens when the jurors responded to the jury selection questions, the Judge, the Plaintiff Attorney, the Defense Attorney, the Plaintiff, the Defendant, the Plaintiff Attorney's Professional Jury Consultant, and the Defense Attorney's Professional Jury Consultant can see nonverbal clues as to how each juror responds to the video recordings of the Judge, the Plaintiff Attorney, the Defense Attorney, the Plaintiff, and the Defendant.

Directly below each typed question on the jury selection questionnaire of each juror will appear the words "Transcription of Video Recording." To the right of the words "Transcription of Video Recording" under each typed question will appear the transcription of the typed question's respective video recording.

Directly below each typed questions' respective video recording transcription will appear the words "Juror's Response." To the right of the words "Juror's Response" will appear the typed transcription of the Juror's video recorded response to the respective typed question on the questionnaire.

The typed questionnaire and typed corresponding answers of each juror appears in a window equipped with a scroll bar on the right side so the attorneys, plaintiff, defendant, and professional jury consultants may view the entire questionnaire on the screen. In the top margin of the screen will appear the attorneys' deadline for exercising challenges for cause.

Only if the Judge elected to allow attorneys to submit challenges for cause in the custom set up of the jury selection process, below the juror's video recording and questionnaire will appear designated space for the respective jurisdiction's statute that states the grounds for excusing a juror with a challenge for cause. Within such space containing the said statute, attorneys, plaintiff, defendant, and professional jury consultants may view the entire statute within the designated space as a scroll bar appears on the far right side of the space.

At the bottom of the screen appears space for the attorneys, plaintiff, and defendant to type confidential notes on the juror to help them remember the juror. Thus, in this space, the heading "Confidential Notes on [the juror's name will appear here]" will appear. The attorneys, plaintiff, and defendant are advised to type notes that will help them make a decision as to whether to keep or exclude the juror with a peremptory challenge and type notes that meet any ground for excluding a juror with a challenge for cause as stated in the statute. For Professional Jury Consultants, this space will also appear except the heading will say: "Professional Analysis of [the Juror's name will appear here]." Thus, the Professional Jury Consultant will type his/her analysis of each juror. They all are also advised to review their jurisdiction's statutory grounds for challenges for cause featured on the screen and type confidential notes on jurors who should be excluded with a challenge for cause. Below the space for the attorneys, plaintiff, and defendant to type confidential notes and below the space for professional jury consultants to type a professional analysis of the juror is space for the attorneys, plaintiff, defendant and professional jury consultants to type a number between 1 and 10 based on the strength of their desire to exclude the juror from the jury pool. Such number will help them make decisions on which jurors to keep and which jurors to exclude in light of viewing a list of all the jurors. Thus, the attorneys, plaintiff, and defendant are instructed to type confidential notes on each juror they view and/or listen to respond to the questionnaire and assign a number between 1 and 10 based on the strength of their desire to exclude the juror from the jury pool. They are advised that the number 10 represents the strongest desire to exclude a juror while the number 1 represents the least desire to exclude a juror. Likewise, the professional jury consultants are instructed to type a professional analysis of each juror they view and/or listen to respond to the questionnaire and assign a number between 1 and 10 based on the strength of their desire to exclude the juror from the jury pool. They are advised that the number 10 represents the strongest desire to exclude a juror while the number 1 represents the least desire to exclude a juror. In this note making and number assigning phase, the notes that the attorneys, plaintiff, defendant, and professional jury consultants type are confidential and cannot be viewed by anyone.

When the Professional Jury Consultant has finished typing a professional analysis of each juror and assigns a number between 1 and 10 to each juror in his/her respective program through the website, he/she is instructed to select a button labeled "View Professional Analysis of All Jurors."

Upon selecting this button, the Professional Jury Consultant will be shown a list of every juror's name in the jury pool placed in order from the highest assigned numbers to the lowest assigned numbers based on the strength of the Professional Jury Consultant's desire to exclude the jurors from the jury pool. For example, any jurors with an assigned number of 10 will appear at the top of the list and any jurors with an assigned number of 9 will appear directly below the group of jurors with the assigned number of 10. The reason for this order is to make the online jury selection for the attorney easier. Thus, they can easily view the jurors they desire to exclude the most by being grouped in the same numbered category.

Thus, the assigned number of the juror from 1 to 10 based on the professional jury consultant's strength of desire to exclude the juror appears to the far left of the juror's name. The juror's name is interactive. By clicking on the juror's name, the professional jury consultant can view and listen to the juror's video recording and view the juror's typed questionnaire or view their client's information. To the immediate right of the juror's assigned number and to the left of the juror's interactive name is a 1½ inch picture of the juror to help the consultant remember the juror. Directly below the juror's assigned number, picture, and interactive name is the professional analysis of the particular juror. On this screen, the professional jury consultant may edit his/her analysis of any juror and may edit his/her assigned numbers from 1 through 10 for any juror. In the top margin of the screen will appear the attorneys' deadline for exercising challenges for cause through the invention's website. The professional jury consultants are advised to submit their analysis of each juror to their respective attorney through the website at least one week before the attorneys' deadline for exercising challenges for cause through the website expires unless told otherwise by their respective attorney. Directly below the deadline will appear designated space for the respective jurisdiction's statute that states the grounds for excusing a juror with a challenge for cause. When the professional jury consultant has reviewed and/or edited an analysis and assigned a number from 1 through 10 for each juror, the consultant, at the bottom of the list of jurors, may type a summary or include any other information the consultant wishes to convey to his/her client to help his/her client make sound jury selections. After the consultant has finished typing an analysis for each juror and has assigned a number from 1 to 10 for each juror, the consultant is instructed to select the "Authenticate and Submit" option that appears in the bottom margin of the screen.

Upon the Professional Jury Consultant selecting "Authenticate and Submit," a window appears on the consultant's screen. Below the window appears a button labeled "Take Picture and Submit." When such window appears on the screen and the consultant sits in front of a webcam, the consultant's live video recording appears in the window. When the consultant clicks "Take Picture and Submit," the invention's website captures a picture of the consultant on the consultant's screen. When the Professional Jury Consultant's picture is taken, the Professional Jury Consultant's professional analysis of each juror, the assigned number of each juror from 1-10, and any included summary are made viewable and accessible through his/her respective attorney's program through the invention's website. When the Professional Jury Consultant's respective attorney views the Professional Jury Consultant's analysis of each juror and assigned number of each juror from 1-10 in the attorney's respective program through the invention's website, the attorney's respective Professional Jury Consultant's picture appears at the top of the screen. The purpose of the Professional Jury Consultant taking his/her picture in front of a webcam before he/she submits his/her analysis of each juror and assigned number of each juror from 1-10 is to prove that the Professional Jury Consultant submitted them through the invention's website.

When the consultant authenticates and submits his/her professional analysis of each juror and assigned number of each juror from 1-10 and any included summary to his/her respective attorney, the invention sends an email message to the personal email account of consultant's respective attorney instructing the respective attorney that he/she may log into his/her respective program in the invention's website and view the professional analysis and assigned number of each juror and any summary. Also, the invention sends a text message to the cellular phone of respective attorney alerting him/her that his/her participation is required through the invention's website and that he/she is advised to check his/her email for an instructive message of the tasks he/she is to complete. Such text message is the same as the quoted text message stated above.

Likewise, when the plaintiff and defendant finish typing confidential notes on each juror and assign a number between 1 and 10 for each juror through the invention's website, they may review and edit all of their notes and assigned numbers for all jurors by selecting an option in the bottom margin of the screen labeled "View Notes for all Jurors." To clarify, the plaintiff will be the only one that can view his/her notes through the invention's website, and the defendant will be the only one that can view his/her notes through the invention's website. Thus, the plaintiff will not be allowed to view the notes of the defendant or the defense attorney, and the defendant will not be allowed to view the notes of the plaintiff or the plaintiff attorney.

Upon selecting the "View Notes for all Jurors" option, the plaintiff will be shown a list of every juror's name in the jury pool placed in order from the highest assigned numbers to the lowest assigned numbers based on the strength of his/her desire to exclude the jurors from the jury pool. For example, any jurors with an assigned number of 10 will appear at the top of the list and any jurors with an assigned number of 9 will appear directly below the group of jurors with the assigned number of 10. The reason for this order is to make the online jury selection for the attorney easier. Thus, they can easily view the jurors they desire to exclude the most by being grouped in the same numbered category.

Likewise, upon selecting the "View Notes for all Jurors" option, the defendant will be shown a list of every juror's name in the jury pool placed in order from the highest assigned numbers to the lowest assigned numbers based on the strength of his/her desire to exclude the jurors from the jury pool. For example, any jurors with an assigned number of 10 will appear at the top of the list and any jurors with an assigned number of 9 will appear directly below the group of jurors with the assigned number of 10. The reason for this order is to make the in court jury selection for the attorney easier, or make the online jury selection for the attorney easier. Thus, they can easily view the jurors they desire to exclude the most by being grouped in the same numbered category.

Thus, in the Plaintiff's program, the assigned number of the juror from 1 to 10 based on the plaintiff's respective desire to exclude the juror appears to the far left of the juror's name. The juror's name is interactive. By clicking on the juror's name, the plaintiff can view and listen to the juror's video recording and view the juror's typed questionnaire. To the immediate right of the juror's assigned number and to the left of the juror's interactive name is a 1½ inch picture of the juror to help the plaintiff remember the juror. Directly below the juror's assigned number, picture, and interactive name is the plaintiff's confidential notes of the particular juror. On this screen, the Plaintiff may edit any of his/her confidential notes and/or assigned numbers from 1 through 10. In the top margin of the screen will appear the attorneys' deadline for exercising challenges for cause through the invention's website. Directly below the deadline will appear designated space for the respective jurisdiction's statute that states the grounds for excusing a juror with a challenge for cause.

Likewise, in the Defendant's program, the assigned number of the juror from 1 to 10 based on the Defendant's respective desire to exclude the juror appears to the far left of the juror's name. The juror's name is interactive. By clicking on the juror's name, the Defendant can view and listen to the juror's video recording and view the juror's typed questionnaire. To the immediate right of the juror's assigned number and to the left of the juror's interactive name is a 1½ inch picture of the juror to help the Defendant remember the juror. Directly below the juror's assigned number, picture, and interactive name is the Defendant's confidential notes of the particular juror. On this screen, the Defendant may edit any of his/her confidential notes and/or assigned numbers from 1 through 10. In the top margin of the screen will appear the attorneys' deadline for exercising challenges for cause through the invention's website. Directly below the deadline will appear designated space for the respective jurisdiction's statute that states the grounds for excusing a juror with a challenge for cause.

Upon reviewing and/or editing the confidential notes and assigned numbers, the Plaintiff and Defendant are advised in their respective programs that they may submit their confidential notes and assigned numbers to their respective attorney's program in the invention's website so they may consider such notes and assigned numbers as recommendations before their respective attorney submits their challenges for cause and peremptory challenges through the invention's website.

In the Plaintiff's program, the Plaintiff submits his/her confidential notes and assigned numbers for each juror to the Plaintiff Attorney for his/her review by selecting an option labeled "Authenticate and Submit." When the Plaintiff selects this option and takes an authenticating picture of himself/herself with a webcam and into the invention's website as detailed above, the Plaintiff's juror notes and assigned numbers will only be made viewable and accessible to the Plaintiff Attorney for viewing in the Plaintiff Attorney's program through the invention's website and the Plaintiff's authenticating picture will appear at the top of the Plaintiff's notes on each juror. Thus, when the Plaintiff selects this option, the Plaintiff's juror notes will only be made accessible to the Plaintiff Attorney for viewing.

When the Plaintiff authenticates and submits his/her confidential analysis of each juror and assigned number of each juror from 1-10, the invention sends an email message to the personal email account of the Plaintiff Attorney instructing the Plaintiff Attorney that he/she may log into his/her respective program in the invention's website and view the Plaintiff's analysis and assigned number of each juror. Also, the invention sends a text message to the cellular phone of the Plaintiff Attorney alerting him/her that his/her participation is required through the invention's website and that he/she is advised to check his/her email for an instructive message of the tasks he/she is to complete. Such text message is the same as the quoted text message stated above.

Likewise, in the Defendant's program, the Defendant submits his/her confidential notes and assigned numbers for each juror to the Defense Attorney for his/her review by selecting an option labeled "Authenticate and Submit." When the Defendant selects this option and takes an authenticating picture of himself/herself with a webcam and into the invention's website as detailed above, the Defendant's juror notes and assigned numbers will only be made viewable and accessible to the Defense Attorney for viewing in the Defense Attorney's program through the invention's website and the Defendant's authenticating picture will appear at the top of the Defendant's notes on each juror. Thus, when the Defendant selects this option, the Defendant's juror notes will only be made accessible to the Defense Attorney for viewing.

When the Defendant authenticates and submits his/her confidential analysis of each juror and assigned number of each juror from 1-10, the invention sends an email message to the personal email account of the Defense Attorney instructing the Defense Attorney that he/she may log into his/her respective program in the invention's website and view the Defendant's analysis and assigned number of each juror. Also, the invention sends a text message to the cellular phone of the Defense Attorney alerting him/her that his/her participation is required through the invention's website and that he/she is advised to check his/her email for an instructive message of the tasks he/she is to complete. Such text message is the same as the quoted text message stated above.

If the Judge elected to allow attorneys to exercise challenges for cause through the invention's website in the Custom Setup of the Jury Selection Process, and the attorney has finished typing confidential notes on each juror through the invention's website, the invention's website instructs the attorneys to select a button labeled "Exercise Challenges for Cause" in the attorney's respective main menu of functions. Upon selecting this button, at the very top of the screen will appear the deadline for the attorneys to submit their challenges for cause. Directly below the deadline will appear designated space for the respective jurisdiction's statute that states the grounds for excusing a juror with a challenge for cause. Within such space containing the said statute, the attorneys may view the entire statute within the designated space as a scroll bar appears on the far right side of the space.

Below the statute stating the grounds for challenges for cause, the attorney will be shown a list of every juror's name in the jury pool. The jurors' names are interactive. By clicking on a name the attorney will be shown the selected juror's video recording and full questionnaire which was provided on the previous screen. To the immediate left of each juror's interactive name is a 1½ inch picture of the juror to help the attorney remember the juror. If the Judge elected to allow attorneys to exercise challenges for cause through the invention's website in the Custom Setup of the Jury Selection Process, a square box will appear to the immediate left of the juror's picture. Above the square box will appear the following words: "Select here to exclude this juror with a challenge for cause." Thus, by clicking in the box, a check mark will appear in the box which indicates the attorney's desire to exclude the juror with a challenge for cause. Directly below the juror's interactive name and picture will appear the professional analysis of the respective juror provided by the professional jury consultant. To the left of the professional jury consultant's analysis of the respective juror is the number from 1-10 the professional jury consultant assigned to the respective juror based on the strength of desire of the consultant to exclude the juror from the jury pool.

If the professional consultant had not submitted an analysis of the juror, the word "Pending" will appear next to the prompt that states: "Professional Analysis of [Name of Juror appears here]." If the respective attorney did not hire a professional jury consultant to submit an analysis of each juror through the invention's website, the words "No professional analysis will be submitted" will appear next to the prompt that states: "Professional Analysis of [Name of Juror appears here]."

Below the professional analysis of each respective juror in the Plaintiff Attorney's program will appear the Plaintiff's own confidential notes and opinions of each respective juror if the case is civil. To the immediate left of the Plaintiff's opinions will appear a number from 1-10 the Plaintiff assigned to the juror which represents the strength of his/her desire to exclude the juror. If the Plaintiff had not submitted an analysis of the juror, the word "Pending" will appear next to the prompt that states: "Plaintiff's Confidential Notes of [Name of Juror appears here]."

Likewise, below the professional analysis of each respective juror in the Defense Attorney's program will appear the Defendant's own confidential notes and opinions of the juror. To the immediate left of the Defendant's opinions will appear a number from 1-10 the Defendant assigned to the juror which represents the strength of his/her desire to exclude the juror. If the Defendant had not submitted an analysis of the juror, the word "Pending" will appear next to the prompt that states: "Defendant's Confidential Notes of [Name of Juror appears here]."

In the Plaintiff Attorney's program, directly below the Plaintiff's opinions for each juror will appear the Plaintiff Attorney's own confidential notes and opinions of the juror. To the immediate left of the Plaintiff Attorney's confidential notes will appear a number from 1-10 the Plaintiff Attorney assigned to the juror which represents the strength of his/her desire to exclude the juror.

Likewise, in the Defense Attorney's program, directly below the Defendant's opinions for each juror will appear the Defense Attorney's own confidential notes and opinions of the juror. To the immediate left of the Defense Attorney's confidential notes will appear a number from 1-10 the Defense Attorney assigned to the juror which represents the strength of his/her desire to exclude the juror.

In the Plaintiff Attorney's program, directly below the Plaintiff Attorney's Confidential notes on each juror will appear a rectangular space for the Plaintiff Attorney to type grounds or reasons for excluding the juror with a challenge for cause. To the far right of the rectangular space will appear a scroll bar so the attorney can type his/her reasons and grounds as long as necessary. Inside the rectangular space at the top will appear a prompt that states "Challenge for Cause Grounds to Strike [Juror's Name Appears Here]."

Likewise, in the Defense Attorney's program, directly below the Defense Attorney's Confidential notes on each juror will appear a rectangular space for the Defense Attorney to type grounds or reasons for excluding the juror with a challenge for cause. To the far right of the rectangular space will appear a scroll bar so the attorney can type his/her reasons and grounds as long as necessary. Inside the rectangular space at the top will appear a prompt that states "Challenge for Cause Grounds to Strike [Juror's Name Appears Here]."

To properly exclude a Juror with a challenge for cause through the invention's website, attorneys must click on the box to the left of the juror's picture which will make a check mark appear in the box, and attorney's must type grounds to exclude the juror with a challenge for cause that are consistent with their respective jurisdiction's statute for excluding a juror with a challenge for cause in the designated rectangular space. Once the attorney has check marked each juror he/she would like to exclude and typed grounds in each designated space under each juror's name he/she would like to exclude, the attorney selects the "Authenticate and Submit" button in the bottom margin of the screen. When the attorney selects this option and takes an authenticating picture of himself/herself with a webcam and into the invention's website as detailed above, the attorney's challenges for cause will be made viewable and accessible to the Judge, the opposing attorney, the Plaintiff, the Defendant, and the Court Reporter through the invention's website and the attorney's authenticating picture will appear at the top of his/her challenges for cause.

To recap, in the Plaintiff Attorney's program, under the interactive name and picture of each juror will appear the professional analysis provided by the professional jury consultant and the consultant's assigned number from 1-10, and under the consultant's analysis will appear the Plaintiff's confidential opinion and the Plaintiff's assigned number from 1-10, and under the Plaintiff's analysis will appear the Plaintiff Attorney's confidential notes of the juror and the Plaintiff Attorney's assigned number from 1-10. Directly below the Plaintiff Attorney's confidential notes and assigned number will appear a rectangular space equipped with a scroll bar on the right for the Plaintiff Attorney to type his/her grounds for excluding a juror with a challenge for cause.

Likewise, in the Defense Attorney's program, under the interactive name and picture of each juror will appear the professional analysis provided by the professional jury consultant and the consultant's assigned number from 1-10, and under the consultant's analysis will appear the Defendant's confidential opinion and the Defendant's assigned number from 1-10, and under the Defendant's opinion will appear the Defense Attorney's confidential notes of the juror and the Defense Attorney's assigned number from 1-10. Directly below the Defense Attorney's confidential notes and assigned number will appear a rectangular space equipped with a scroll bar on the right for the Defense Attorney to type his/her grounds for excluding a juror with a challenge for cause.

Additionally, when the attorneys select "Exercise Challenges for Cause" they are shown every juror's name in the jury pool placed in order based on the numbers their respective professional jury consultant assigned to the juror based on his/her desire to exclude the juror. Thus, the jurors appear from the highest assigned numbers to the lowest assigned numbers based on the strength of their respective Professional Jury Consultant's desire to exclude the jurors from the jury pool. For example, any jurors assigned the number 10 by the consultant will appear at the top of the list and any jurors assigned the number 9 by the consultant will appear directly below the group of jurors with the assigned number of 10. Thus, the attorney can easily view the jurors they desire to exclude the most by being grouped in the same numbered category.

If the Plaintiff Attorney's respective professional jury consultant has not yet submitted his/her professional analysis of each juror to his/her respective attorney, or if no professional jury consultant was hired by the Plaintiff Attorney to provide an analysis of each juror through the invention's website, then the Plaintiff Attorney is shown every juror's name in the jury pool placed in order based on the numbers the Plaintiff Attorney assigned to the jurors based on his/her desire to exclude the jurors. Thus, in the Plaintiff Attorney's program, the jurors appear from the highest assigned numbers to the lowest assigned numbers based on the strength of the Plaintiff Attorney's desire to exclude the jurors from the jury pool. However, once the Plaintiff Attorney's respective professional jury consultant submits his/her analysis of each juror, every juror's name in the jury pool will be rearranged and placed in order based on the numbers the professional jury consultant assigned to the juror based on his/her desire to exclude the juror. Thus, the jurors appear from the highest assigned numbers to the lowest assigned numbers based on the strength of the Plaintiff Attorney's respective professional jury consultant's desire to exclude the jurors from the jury pool.

Likewise, if the Defense Attorney's respective professional jury consultant has not yet submitted his/her professional analysis of each juror to his/her respective attorney, or if no professional jury consultant was hired by the Defense Attorney to provide an analysis of each juror through the invention's website, then the Defense Attorney is shown every juror's name in the jury pool placed in order based on the numbers the Defense Attorney assigned to the jurors based on his/her desire to exclude the jurors. Thus, in the Defense Attorney's program, the jurors appear from the highest assigned numbers to the lowest assigned numbers based on the strength of the Defense Attorney's desire to exclude the jurors from the jury pool. However, once the Defense Attorney's respective professional jury consultant submits his/her analysis of each juror, every juror's name in the jury pool will be rearranged and placed in order based on the numbers the professional jury consultant assigned to the juror based on his/her desire to exclude the juror. Thus, the jurors appear from the highest assigned numbers to the lowest assigned numbers based on the strength of the Defense Attorney's respective professional jury consultant's desire to exclude the jurors from the jury pool.

If the attorney's deadline for submitting challenges for cause is more than 7 days or 1 week away from lapsing and the an attorney's respective professional jury consultant and/or the attorney's respective client have not yet submitted their analysis and/or opinions of each juror to the attorney, the attorney is advised to wait for his/her respective professional jury consultant and/or respective client to submit his/her analysis and/or opinions of each juror before submitting his/her challenges for cause through the invention's website. The attorney will further be advised that he/she will be sent an email message notifying him/her when his/her respective professional jury consultant has submitted an analysis for each juror and when his/her respective client has submitted his/her opinions of each juror. The attorney also will be advised to submit his/her challenges for cause through the invention's website if the deadline for exercising challenges for cause is within 7 days or 1 week from lapsing and the attorney's respective professional jury consultant has not submitted his/her professional analysis for each juror and/or his/her respective client has not yet submitted his/her opinions of each juror.

If the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, the Court Reporter logs into his/her program in the invention's website and prints the list of juror names that were excused by the Judge from jury duty and the date the jurors were excused by the Judge and places them in the Court's file. The list of juror names includes the jurors' respective addresses below the names. Also, the Court Reporter prints all email messages sent to the Judge, Plaintiff Attorney, Defense Attorney, the Defendant, the Plaintiff, if the case is civil, and the Professional Jury Consultants from the invention and the dates such emails were submitted to them through the invention's website.

If the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, and if the Plaintiff Attorney selected a professional jury consultant to provide a professional analysis of each juror to the Plaintiff Attorney's program through the invention's website, and the respective professional jury consultant submits a professional analysis of each juror as stated above to the Plaintiff Attorney's program through the invention's website, the Plaintiff Attorney is instantly sent an email message immediately after the consultant submits the analysis of each juror. The email message to the Plaintiff Attorney informs the Plaintiff Attorney that his/her professional jury consultant has submitted a professional analysis of each juror, and he/she may now log onto the website and view each analysis. Only if the Judge elected to allow attorneys to exercise challenges for cause through the invention's website in the Custom Setup of the Jury Selection Process, the Plaintiff Attorney also will be informed that he/she may now exercise his/her challenges for cause through the invention's website, and the email message will inform the Plaintiff Attorney of his/her deadline to exercise his/her challenges for cause through the invention's website. The email message sent to the Plaintiff Attorney will also be sent to the Judge, the Plaintiff, the Defense Attorney, and the Defendant.

If the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, and if the Plaintiff submits his/her confidential analysis of each juror to the Plaintiff Attorney through the invention's website, the Plaintiff Attorney immediately is sent an email message that informs him/her that the Plaintiff has submitted a confidential analysis of each juror to the Plaintiff Attorney's program through the invention's website, and the Plaintiff Attorney may now log onto the website and view each confidential analysis through his/her respective program. The email message sent to the Plaintiff Attorney also will be sent to the Judge, the Plaintiff, the Defense Attorney, and the Defendant.

Likewise, if the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, and if the Defense Attorney selected a professional jury consultant to provide a professional analysis of each juror to the Defense Attorney's program through the invention's website, and the respective professional jury consultant submits a professional analysis of each juror to the Defense Attorney's program through the invention's website, the Defense Attorney is instantly sent an email message immediately after the consultant submits the analysis of each juror to the Defense Attorney's program through the invention's website. The email message to the Defense Attorney informs the Defense Attorney that his/her professional jury consultant has submitted a professional analysis of each juror to the Defense Attorney's program through the invention's website, and he/she may now log onto the website and view each analysis in his/her respective program. Only if the Judge elected to allow attorneys to exercise challenges for cause through the invention's website in the Custom Setup of the Jury Selection Process, the Defense Attorney also will be informed that he/she may now exercise his/her challenges for cause through the invention's website, and the email message also will inform the Defense Attorney of his/her deadline to exercise his/her challenges for cause through the invention's website. The email message sent to the Defense Attorney will also be sent to the Judge, the Plaintiff Attorney, the Plaintiff, and the Defendant.

If the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, and if the Defendant submits his/her confidential analysis of each juror to the Defense Attorney's program through the invention's website, the Defense Attorney immediately is sent an email message that informs him/her that the Defendant has submitted a confidential analysis of each juror to the Defense Attorney's program through the invention's website, and the Defense Attorney may now log onto the website and view each confidential analysis through his/her respective program. The email message sent to the Defense Attorney also will be sent to the Judge, the Plaintiff Attorney, the Plaintiff, and the Defendant.

Also, the Court Reporter is sent an email message instructing him/her to log onto the invention's website and print all email messages to the Plaintiff Attorney, Defense Attorney, the Defendant, and the Plaintiff, if the case is civil, and the dates such emails were submitted through the website and place them in the Court's file for transcript purposes. The email messages contain an interactive link to the main website so the Court Reporter can instantaneously log onto the website.

Additionally, the Judge, Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, and if the Plaintiff Attorney selected a professional jury consultant to provide a professional analysis of each juror to the Plaintiff Attorney's program through the invention's website, and the Plaintiff Attorney's Professional Jury Consultant submits a professional analysis of each juror and the Plaintiff sends an analysis of each juror as stated above to the Plaintiff Attorney's program through the invention's website, the Plaintiff Attorney may log onto the website and compare the Professional Jury Consultant's confidential analysis of each juror and assigned number from 1-10 with the Plaintiffs confidential notes and assigned number from 1-10 along with the Plaintiff Attorney's own confidential notes and assigned number from 1-10 before making juror selections through the invention's website as described above. If the Judge elected to allow attorneys to exercise challenges for cause through the invention's website, the Plaintiff Attorney, after making the above stated comparisons, may review the statute for striking a juror with a challenge for cause as provided through the website as stated above and then submits challenges for cause through the website in the same manner as stated above.

Likewise, if the Judge elected to allow attorneys to exercise challenges for cause and peremptory challenges through the invention's website in the Custom Setup of the Jury Selection process, and if the Judge completed the step of excusing jurors from the jury pool and/or keeping jurors in the jury pool through the invention's website, and if the Defense Attorney selected a professional jury consultant to provide a professional analysis of each juror to the Defense Attorney's program through the invention's website, and the Defense Attorney's Professional Jury Consultant submits a professional analysis of each juror and the Defendant sends an analysis of each juror as stated above to the Defense Attorney's program through the invention's website, the Defense Attorney may log onto the website and compare the Professional Jury Consultant's confidential analysis of each juror and assigned number from 1-10 with the Defendant's confidential notes and assigned number from 1-10 along with the Defense Attorney's own confidential notes and assigned number from 1-10 before making juror selections through the invention's website as described above. If the Judge elected to allow attorneys to exercise challenges for cause through the website, the Defense Attorney, after making the above stated comparisons, may review the statute for striking a juror with a challenge for cause as provided through the website as stated above and then submits challenges for cause through the website in the same manner stated above.

In their respective programs in the invention's website, the attorneys will be advised that it is advantageous for the attorneys to wait until their professional jury consultants submit a professional confidential analysis of each juror through the invention's website and to wait for their client to submit confidential notes on each juror through the invention's website before making juror selections through the invention's website. Thus, they will be advised that by comparing the professional consultant's analysis of each juror with the client's analysis of each juror and the attorney's own analysis of each juror, the attorney will feel more confident in making juror selections either in court or through the invention's website.

Neither the Judge, Plaintiff, Plaintiff Attorney, Court Reporter, or Court Administrator will be allowed to view the Defendant's Professional Jury Consultant's analysis of each juror through the invention's website or the Defendant's analysis of each juror through the invention's website. Likewise, neither the Judge, Defendant, Defense Attorney, Court Reporter, or Court Administrator will be allowed to view the Defendant's Professional Jury Consultant's analysis of each juror through the invention's website.

Also, the Court Reporter prints all email messages sent to the Plaintiff Attorney, and the Defense Attorney and the dates such emails were submitted to them from the invention and the invention's website instructs the Court Reporter to place them in the Court's file for transcript purposes.

Only if the Judge elected to allow attorneys to submit challenges for cause through the website in the Custom Setup of the Jury Selection Process, and if the Plaintiff Attorney and Defense Attorney submit challenges for cause through the website, the Court Reporter is sent an email message instructing him/her to log onto the website and print the Plaintiff Attorney's and Defense Attorney's challenges for cause and the dates they were submitted and place them in the Court's file. Also, the Court Reporter is sent an email message instructing him/her to log onto the invention's website and print all email messages to the Judge, Plaintiff Attorney, Defense Attorney, the Defendant, and the Plaintiff, if the case is civil, and the dates such emails were submitted through the website. The email messages contain an interactive link to the main website so the Court Reporter can instantaneously log onto the website.

Only if the Judge elected to allow attorneys to submit challenges for cause through the website and elected to allow attorneys to submit rebuttals to their counterpart's challenges for cause through the website in the Custom Setup of the Jury Selection Process, and if the Defense Attorney submits challenges for cause through the website, an email message is sent to the Plaintiff Attorney instructing him/her that he/she may now log onto the website and view the Defense Attorney's submitted challenges for cause and submit rebuttals to the Defense Attorney's challenges for cause through the website. Such email message sent to the Plaintiff Attorney advises of the attorneys' deadline for submitting rebuttals through the website. The email message also includes an interactive link to the invention's website so the Plaintiff Attorney can instantly log onto the main website. The email message sent to the Plaintiff Attorney will also be sent to the Judge, the Plaintiff, the Defense Attorney, and the Defendant.

Likewise, only if the Judge elected to allow attorneys to submit challenges for cause through the website and elected to allow attorneys to submit rebuttals to their counterpart's challenges for cause through the website in the Custom Setup of the Jury Selection Process, and if the Plaintiff Attorney submits challenges for cause through the website, an email message is also sent to the Defense Attorney instructing him/her that he/she may now log onto the website and view the Plaintiff Attorney's submitted challenges for cause and submit rebuttals to the Plaintiff Attorney's challenges for cause through the website. Such email message sent to the Defense Attorney advises of the attorneys' deadline for submitting rebuttals through the website. The email message also includes an interactive link to the main website so the Defense Attorney can instantly log onto the main website. The email message sent to the Defense Attorney will also be sent to the Judge, the Plaintiff Attorney, the Plaintiff, and the Defendant.

Only if the Judge elected to allow attorneys to submit challenges for cause through the website and elected to allow attorneys to submit rebuttals to their counterpart's challenges for cause through the website in the Custom Setup of the Jury Selection Process, and if the Plaintiff Attorney and/or the Defense Attorney submits challenges for cause through the website, email messages are sent to the Plaintiff and the Defendant that they may now log onto the website and view the challenges for cause submitted by either or both attorneys. Such email message further advises them that their respective attorneys have each been advised to submit rebuttals to their counterparts challenges for cause.

If the Judge elected to allow attorneys to submit challenges for cause through the website in the Custom Setup of the Jury Selection Process, and if the Judge did not elect to allow the attorneys to submit rebuttals to their counterpart's challenges for cause through the website in the Custom Setup of the Jury Selection Process, and if either or both attorneys submitted challenges for cause through the website, an email message is sent to the Judge instructing him/her that he/she may now log onto the website and issue rulings on the attorney's challenges for cause through the website. The email message includes an interactive link to the invention's website address so he/she can instantly log onto the invention's website. The email message sent to the Judge will also be sent to the Plaintiff Attorney, the Plaintiff, the Defense Attorney, and the Defendant.

If the Judge elected to allow attorneys to submit challenges for cause through the website in the Custom Setup of the Jury Selection Process, and if the Judge did not elect to allow the attorneys to submit rebuttals to their counterpart's challenges for cause through the website in the Custom Setup of the Jury Selection Process, and if either or both attorneys submitted challenges for cause through the website, the Plaintiff Attorney, the Plaintiff, the Defense Attorney, and the Defendant will be sent email messages stating they may now log onto the website and view all challenges for cause submitted by the attorneys. Such email messages further advise that the Judge has been notified to submit rulings on the challenges for cause through the website. They will further be advised that they will not be allowed to submit their peremptory challenges through the invention's website until the Judge submits rulings on the challenges for cause through the website. They will further be advised that they will be sent another email message when the Judge submits rulings on challenges for cause through the website and when they will be allowed to submit their peremptory challenges through the website.

Additionally, the Judge, Plaintiff Attorney, Plaintiff, Defense Attorney, Defendant, and the Court Reporter each will be sent text messages to their cellular phones alerting them that participation is required through the invention's website and that they are advised to check his/her email for an instructive message of the task they are to complete. Such text message is the same as the quoted text message stated above.

Only if the Judge elected to allow attorneys to submit challenges for cause through the website in the Custom Setup of the Jury Selection Process, and if the Plaintiff Attorney and Defense Attorney submit challenges for cause through the website, the Court Reporter logs onto the website and prints the Plaintiff Attorney's and Defense Attorney's challenges for cause. The date the Defense Attorney submitted his/her challenges for cause will appear with the deadline next to it directly above the Defense Attorney's challenges for cause in the print and on the screen displayed by the invention's website. Also, the Defense Attorney's photo that he/she took with his/her webcam upon authenticating and submitting his/her challenges for cause through the website appears at the top of the print and at the top of screen displayed by the invention's website. Likewise, the date the Plaintiff Attorney submitted his/her challenges for cause will appear with the deadline next to it directly above the Plaintiff Attorney's challenges for cause in the print and on the screen displayed by the invention's website. Also, the Plaintiff Attorney's photo that he/she took with his/her webcam upon authenticating and submitting his/her challenges for cause through the website appears at the top of the print and at the top of screen displayed by the invention's website. The prints of the challenges for cause will appear as described on the attorneys' screen for exercising challenges for cause at the times the attorneys select the submit button. Also, the Court Reporter prints all email messages sent to the Judge, the Plaintiff Attorney, the Defense Attorney, the Defendant, the Plaintiff, if the case is civil, and the dates such emails were submitted to them through the website.

Only if the Judge elected to allow attorneys to submit challenges for cause through the website and elected to allow attorneys to submit rebuttals to their counterpart's challenges for cause through the website in the Custom Setup of the Jury Selection Process, and if the attorneys submit challenges for cause through the website, the attorneys log onto the website and view their counterpart's challenges for cause and submit rebuttals to them through the website. When either attorney logs onto the website to rebut their counterpart's challenges for cause, he/she is shown the respective statute that specifies the grounds for exercising challenges for cause at the top of the screen in a narrow rectangular box with a scroll bar affixed to the right to allow him/her to view the entire statute. The text of this statute initially appears in blue text. Directly above this statute appears the judicial deadline for the attorney to submit his/her rebuttals. To the immediate right of this deadline appears the current date. He/she is also shown the names of the jurors his/her counterpart has challenged for cause in a list in the middle portion of the screen. The names on the list are interactive. If an attorney clicks on a name, the respective juror's typed oath and typed questionnaire responses appear on the screen. To the left of each juror's name on the list will appear the jurors' respective picture. The jurors' pictures are interactive. If an attorney clicks on the juror's picture, the juror's respective video recording starts playing which shows the juror orally responding to the questionnaire. Below the juror's picture, the attorneys will be presented with the options of pause, rewind, fast forward, play, and stop. When the juror's video starts playing, the juror's typed questionnaire will appear to the right of the juror's video recording with all of the above described features. The attorney will be presented with the option of viewing and listening to the juror respond to the oath and the whole questionnaire or any particular question by making a check mark in a small box that will appear to the right of each question on the typed questionnaire and selecting "play."

To the left of each juror's picture on the list appears a sequential number to indicate how many challenges for cause their counterpart exercised. Directly below each Juror's name and picture appears the counterpart's respective explanation for striking the juror with a challenge for cause which initially appears in red text. Directly below this explanation is designated space labeled "Rebuttal."

To submit a rebuttal, the attorney simply views the statute for challenges for cause, reads their counterpart's explanation, types a rebuttal in the designated space, and after he/she has done this for all his/her counterpart's challenges for cause explanations, he/she selects "Authenticate and Submit" in the bottom margin of the screen. When the attorney selects this option and takes an authenticating picture of himself/herself with a webcam and into the invention's website as detailed above, the attorney's rebuttals to challenges for cause will be made viewable and accessible to the Judge, the opposing attorney, the Plaintiff, the Defendant, and the Court Reporter through the invention's website and the attorney's authenticating picture will appear at the top of his/her rebuttals to challenges for cause.

When the attorney types a rebuttal in the space, the text initially appears in green. To allow the attorney to view all of their counterpart's challenge for cause explanations, a scroll bar is affixed to the right of the screen. The attorney is instructed to type a rebuttal for each challenge for cause explanation before he/she selects the "Authenticate and Submit" button. Thus, all rebuttals must be submitted at once. The attorney is also presented with the option of changing the color and size of the font of his counterpart's explanations, his respective rebuttals, and the statute specifying the grounds for challenges for cause to where they are all different colors and sizes. Additionally, the attorney is presented with a spelling option that allows him/her to correct any spelling errors in his/her rebuttals before he/she submits them.

Only if the Judge elected to allow attorneys to submit challenges for cause through the website and did not elect to allow attorneys to submit rebuttals to their counterpart's challenges for cause through the website in the Custom Setup of the Jury Selection Process, and if the attorneys submit challenges for cause through the website, the Judge logs onto the website and submits rulings on attorney challenges for cause as described in detail below except no rebuttals from the attorneys will appear on the screen that the Judge submits rulings on the challenges for cause.

Also, only if the Judge elected to allow attorneys to submit challenges for cause through the website and did not elect to allow attorneys to submit rebuttals to their counterpart's challenges for cause through the website in the Custom Setup of the Jury Selection Process, and if the attorneys submit challenges for cause through the website, the Plaintiff Attorney, the Plaintiff, the Defense Attorney, and the Defendant may log onto the website and enter their respective program to view all challenges for cause submitted by the attorneys through the website. When they log into their respective programs, they will each be advised that the Judge has been notified to issue rulings on the challenges for cause through the website.

If the Judge elected to allow attorneys to submit challenges for cause through the website, and if the Judge elected to allow attorneys to submit rebuttals to their counterpart's challenges for cause through the website in the Custom Setup of the Jury Selection Process, and if the attorneys submitted rebuttals to their counterpart's challenges for cause through the website, the Court Reporter is automatically sent an email message after each attorney submits their respective rebuttals through the website. The email message instructs the Court Reporter to log onto the website and print the attorney rebuttals and place the copies of the rebuttals in the Court's file for transcript purposes. Also, the Court Reporter is sent an email message instructing him/her to log onto the invention's website and print all email messages to the Judge, Plaintiff Attorney, Defense Attorney, the Defendant, and the Plaintiff, if the case is civil, and the dates such emails were submitted through the website. The email messages to the Court Reporter contain an interactive link to the invention's website so the Court Reporter can instantaneously log onto the website.

Also, if the Judge elected to allow attorneys to submit challenges for cause through the website, and if the Judge elected to allow attorneys to submit rebuttals to their counterpart's challenges for cause through the website in the Custom Setup of the Jury Selection Process, and if the attorneys submitted rebuttals to their counterpart's challenges for cause through the website, the Judge is automatically sent an email message instructing him/her to log onto the website and rule on the attorneys submitted challenges for cause and their respective rebuttals. The email message contains an interactive link to the main website. The email message sent to the Judge will also be sent to the Plaintiff Attorney, the Plaintiff, the Defense Attorney, and the Defendant.

Also, if the Judge elected to allow attorneys to submit challenges for cause through the website, and if the Judge elected to allow attorneys to submit rebuttals to their counterpart's challenges for cause through the website in the Custom Setup of the Jury Selection Process, and if the attorneys submitted rebuttals to their counterpart's challenges for cause through the website, each attorney and the Plaintiff and the Defendant are automatically sent the same email messages instructing them that they may log onto the website and review their counterpart's rebuttals to their challenges for cause. The email message also notifies them that the Judge has been sent an email message notifying him/her to submit rulings on attorneys' challenges for cause through the website. The email message contains an interactive link to the main website.

Additionally, the Judge, Plaintiff Attorney, Plaintiff, Defense Attorney, Defendant, and the Court Reporter each will be sent text messages to their cellular phones alerting them that their participation is required through the invention's website and that they are advised to check their email for an instructive message of the task they are to complete. Such text message is the same as the quoted text message stated above.

If the Judge elected to allow attorneys to submit challenges for cause through the website, and if the Judge elected to allow attorneys to submit rebuttals to their counterpart's challenges for cause through the website in the Custom Setup of the Jury Selection Process, and if the attorneys submitted rebuttals to their counterpart's challenges for cause through the website, the Court Reporter logs onto the website and prints the Plaintiff Attorney's and Defense Attorney's rebuttals to challenges for cause. The date the Defense Attorney submitted his/her rebuttals to challenges for cause will appear with the deadline next to it at the top of the screen. Also, the Defense Attorney's photo that he/she took with his/her webcam upon authenticating and submitting his/her rebuttals to challenges for cause through the website appears at the top of the print and at the top of screen displayed by the invention's website. Likewise, the date the Plaintiff Attorney submitted his/her rebuttals to challenges for cause will appear with the deadline next to it at the top of the screen. Also, the Plaintiff Attorney's photo that he/she took with his/her webcam upon authenticating and submitting his/her rebuttals to challenges for cause through the website appears at the top of the print and at the top of screen displayed by the invention's website. Also, the Court Reporter prints all email messages sent to the Judge, the Plaintiff Attorney, the Defense Attorney, the Defendant, the Plaintiff, if the case is civil, and the dates such emails were submitted to them through the website.

If the Judge elected to allow attorneys to submit challenges for cause through the website, and if the Judge elected to allow attorneys to submit rebuttals to their counterpart's challenges for cause through the website in the Custom Setup of the Jury Selection Process, and if the attorneys submitted rebuttals to their counterpart's challenges for cause through the website, the Judge then logs onto the website and rules on the challenges for cause and their respective rebuttals. When the Judge logs onto the website, the judge is shown the judicial deadline for when the attorney was to have submitted his/her challenges for cause. The Judge is also shown the date the attorney submitted his/her challenges for cause. Also, the judge is shown the judicial deadline for when the opposing attorney was to have submitted his/her rebuttals. The Judge is also shown the date the attorney actually submitted his rebuttals. However, if the Judge did not elect to allow attorneys to submit rebuttals to their counterpart's challenges for cause through the website in the Custom Setup of the Jury Selection Process, no judicial deadline for when the opposing attorney was to have submitted his/her rebuttals will appear, and no date will appear for when the attorney actually submitted his rebuttals.

On the next screen, the jurisdiction's statute specifying grounds for challenges for cause appears in the top ¼ of the screen in a narrow rectangular box with a scroll bar affixed to the right side to allow the judge to view the entire statute inside this box. The text of this statute initially appears in blue text. The juror's name that is being challenged for cause appears and is interactive. To the immediate left of the interactive name appears a picture of the juror. By clicking on the juror's picture or interactive name, the juror's video recording will appear on the left ½ of the screen with the juror's driver's license or photo identification card appearing below the juror's respective video recording with the juror's driver's license number or identification number blocked out. Below the driver's license or photo identification card will appear volume control options and pause, fast forward, rewind, and stop options. On the right ½ of the screen will appear the juror's transcribed questionnaire as described above.

To the left of the Juror's name appears a box labeled "sustained" and a box labeled "overruled." Below these boxes and the Juror's name appears the Challenge for Cause explanation or grounds in red text. Below these grounds is the opposing attorney's rebuttal which initially appears in green text. However, if the Judge did not elect to allow attorneys to submit rebuttals to their counterpart's challenges for cause through the website in the Custom Setup of the Jury Selection Process, no attorney rebuttal will appear under the explanation or grounds for a challenge for cause.

Below any rebuttal is space labeled Explanation of Judicial ruling. To make a ruling the Judge simply clicks in either the box labeled "sustained" or the box labeled "overruled." When the judge clicks in one of these boxes a check mark appears. If the judge makes a check mark in the sustained box, a strike through line will appear through the respective juror's name to indicate that the juror and his/her questionnaire will be stricken from the venire upon the judge selecting submit. The Judge has the option of typing an explanation for his/her ruling. If the judge types an explanation, the text will initially appear in blue text. The judge must check either the "sustained" box or the "overruled" box for each challenge for cause presented to him/her on the screen before he/she submits his/her rulings to the attorneys and court reporter. To make such rulings on each challenge for cause, there is a scroll bar affixed to the right side of the screen to allow him/her to view all challenges for cause and any respective rebuttals. The judge is presented with an option that allows him/her to change the font size and color for the statute specifying the grounds for challenges for cause, the attorney's explanations for challenges for cause, the opposing attorney's rebuttals, and any explanations that he/she may type to where they are all different sizes and colors to make viewing and ruling easier for him/her. The judge is also presented with a spelling option that allows him/her to correct any spelling errors in any explanations he/she may type before submitting his/her rulings to the attorneys and court reporter.

After checking either the "sustained" box or the "overruled" box and/or typing an explanation for each challenge for cause, the Judge simply selects "Authenticate and Submit" button in the bottom margin of the screen. When the Judge selects this option and takes an authenticating picture of himself/herself with a webcam and into the invention's website as detailed above, the Judge's rulings on attorney challenges for cause will be made viewable and accessible to the Judge, the Plaintiff Attorney, the Defense Attorney, the Plaintiff, the Defendant, and the Court Reporter through the invention's website and the Judge's authenticating picture will appear at the top of the Judge's rulings on attorneys' challenges for cause on their respective screens.

If the Judge selected "sustained" for a challenge for cause and authenticates and submits the rulings, that respective Juror's name, video recording, and transcribed questionnaire is stricken from the list of jurors that the attorneys may view and consider excluding with a peremptory challenge or keeping as a juror. If the Judge selected "overruled" for a challenge for cause and authenticates and submits the rulings, that respective Juror's name, video recording, and transcribed questionnaire remains on the list of jurors that the attorneys may view and consider excluding with a peremptory challenge or keeping as a juror. The Judge repeats this process for each juror being challenged.

If the Judge elected to allow attorneys to submit challenges for cause through the website, and if the Judge elected to allow attorneys to submit rebuttals to their counterpart's challenges for cause through the website in the Custom Setup of the Jury Selection Process, and if the attorneys submitted rebuttals to their counterpart's challenges for cause through the website, the Plaintiff, Defendant, Plaintiffs Attorney, and Defense Attorney log into their respective programs on the website to view the rebuttals of both attorneys. They are shown a list of the interactive names and video pictures of each juror who has been challenged for cause by an attorney through the website. Below the interactive name and picture of each challenged juror is the attorney's challenge for cause grounds. Below the challenge for cause grounds appears the counterpart's rebuttal. Thus, the screen appears exactly how it will appear to the Judge when he/she issues rulings on challenges for cause. They are also shown the deadlines for submitting challenges for cause and rebuttals and the dates the challenges for cause and rebuttals were actually submitted.

If the Judge elected to allow attorneys to exercise challenges for cause through the website, and if the Judge elected to allow attorneys to exercise peremptory challenges through the website in the Custom Setup of the Jury Selection Process, and if the judge submits rulings on the attorneys' challenges for cause through the website, an email message is sent to the judge to log onto the website and excuse any additional jurors through the website to ensure that the combined total number of both attorneys' allotted peremptory challenges combined with the total number jurors to be impaneled combined with the total number of alternate juror positions is equal to the total number of jurors remaining in the jury pool before the attorneys are allowed to submit their peremptory challenges through the invention's website. The email message contains an interactive link to the invention's website so the Judge can instantaneously log onto the website.

If the Judge elected to allow attorneys to exercise challenges for cause through the website in the Custom Setup of the Jury Selection Process, and if the judge submits rulings on the attorneys' challenges for cause through the website, the Court Reporter is then sent an email message that he/she must print through the website the judicial rulings on challenges for cause and the date they were submitted and place the copies of the rulings in the Court's file for transcript purposes. The email message contains an interactive link to the main website so the Court Reporter can instantaneously log onto the website. Also, the Court Reporter is sent an email message instructing him/her to log into the invention's website and print all email messages to the Judge, Plaintiff Attorney, Defense Attorney, the Defendant, and the Plaintiff, if the case is civil, and the dates such emails were submitted through the website. The email messages to the Court Reporter contain an interactive link to the invention's website so the Court Reporter can instantaneously log onto the website.

If the Judge elected to allow attorneys to exercise challenges for cause through the website in the Custom Setup of the Jury Selection Process, and if the judge submits rulings on the attorneys' challenges for cause through the website, email messages are sent to the Plaintiff Attorney, the Defense Attorney, the Plaintiff, and the Defendant that they may now log into their respective programs on the website and view the Judge's rulings on the attorneys' challenges for cause.

Additionally, the Judge, Plaintiff Attorney, Plaintiff, Defense Attorney, Defendant, and the Court Reporter each will be sent text messages to their cellular phones alerting them that their participation is required through the invention's website and that they are advised to check their email for an instructive message of the task they are to complete. Such text message is the same as the quoted text message stated above.

If the Judge elected to allow attorneys to exercise challenges for cause through the website, and if the Judge elected to allow attorneys to exercise peremptory challenges through the website in the Custom Setup of the Jury Selection Process, and if the judge submits rulings on the attorneys' challenges for cause through the website, the judge logs onto the website and excuses any additional jurors through the website to ensure that the combined total number of both attorneys' allotted peremptory challenges combined with the total number jurors to be impaneled combined with the total number of alternate juror positions is equal to the total number of jurors remaining in the jury pool before the attorneys are allowed to submit their peremptory challenges through the invention's website.

To excuse any of the jurors from jury duty through the invention's website to ensure that the combined total number of both attorneys' allotted peremptory challenges combined with the total number jurors to be impaneled combined with the total number of alternate juror positions is equal to the total number of jurors remaining in the jury pool, the Judge may log onto the invention's website and select "Excuse Additional Jurors from Jury Duty" from the Judge's Main Menu of Functions only if the Judge elected to allow attorneys to submit Challenges for Cause and Peremptory Challenges through the invention's website. The Judge is then shown a list of all the juror names who were ordered to respond to the questionnaire. To the left of each juror's name will appear a small square box with the word "Excuse" directly above it.

To excuse any of the jurors, the Judge can manually select each Juror's name he/she would like to excuse, or the Judge may have the invention randomly select which jurors to excuse. Typically, in conventional jury selection, after challenges for cause are submitted by attorneys, the judge randomly draws names written on pieces of paper out of a hat or a cup to decide which jurors should be excused to ensure that the combined total number of both attorneys' allotted peremptory challenges combined with the total number of jurors to be impaneled combined with the total number of alternate juror positions is equal to the total number of jurors remaining in the jury pool. If the Judge employs such a method to determine which jurors to excuse, the Judge may manually select the "Excuse" box next to each juror's name the Judge decides to excuse, and a check mark will appear in the box. Upon selecting "Authenticate and Submit," the excused juror questionnaires and video recordings will not be presented to the attorneys or their professional jury consultants or the plaintiff or the defendant when the attorneys log onto the invention's website to exercise their peremptory challenges through the invention's website. Such excused names will be placed on a separate list, and the Court Reporter will be instructed to print such a list and place it in the Court's file.

When the Judge selects "Authenticate and Submit" and takes an authenticating picture of himself/herself with a webcam and into the invention's website as detailed above, the list of jurors excused by the Judge will be made viewable and accessible to the Judge, the Plaintiff Attorney, the Defense Attorney, the Plaintiff, the Defendant, and the Court Reporter through the invention's website, and the Judge's authenticating picture will appear at the top of the list of jurors excused by the Judge.

In the bottom margin of the screen will appear an option labeled "Randomly Select Jurors." If the Judge decides to have the invention randomly select which jurors to excuse, the Judge selects "Randomly Select Jurors." Upon selecting "Randomly Select Jurors," the invention processes the information the Judge entered into the Custom Setup of the Jury Selection Process by adding the number of peremptory challenges the Judge allotted the Plaintiff Attorney to exercise through the invention's website with the number of peremptory challenges the Judge allotted the Defense Attorney to exercise through the invention's website with the total number of jurors to be impaneled and with the total number of alternate juror positions entered. The invention then subtracts the total number of jurors remaining in the jury pool after the judge issued rulings on challenges for cause through the invention's website from the combined total number of the following: 1) the total number peremptory challenges the Judge allotted the Plaintiff Attorney to exercise through the invention's website, 2) the total number of peremptory challenges the Judge allotted the Defense Attorney to exercise through the invention's website, 3) the total number of jurors to be impaneled, and 4) the total number of alternate juror positions. Once the invention calculates the remaining number of jurors that remain, the invention randomly puts check marks in the "Excuse" boxes next to the names of jurors in a number equal to the number of jurors that remained from the above said calculation. Once such check marks are made, the Judge selects "Authenticate and Submit." Upon selecting "Authenticate and Submit," the excused juror questionnaires and video recordings will not be presented to the attorneys or their professional jury consultants or the plaintiff or the defendant when the attorneys log onto the invention's website to exercise their peremptory challenges through the invention's website. Such excused names will be placed on a separate list, and the Court Reporter will be instructed to print such a list and place it in the Court's file.

When the Judge selects "Authenticate and Submit" and takes an authenticating picture of himself/herself with a webcam and into the invention's website as detailed above, the list of jurors randomly excused by the invention through the Judge will be made viewable and accessible to the Judge, the Plaintiff Attorney, the Defense Attorney, the Plaintiff, the Defendant, and the Court Reporter through the invention's website, and the Judge's authenticating picture will appear at the top of the list of jurors excused by the Judge.

The Court Reporter logs into his/her program in the invention's website and prints all of the Judge's rulings on the attorney's challenges for cause and places them in the Court's file. Also, the Court Reporter prints all email messages to the Judge, Plaintiff Attorney, Defense Attorney, the Defendant, and the Plaintiff, if the case is civil, and the dates such emails were submitted through the invention's website.

Additionally, the Plaintiff Attorney, Plaintiff, Defense Attorney, and the Defendant may log onto the invention's website and view the Judge's rulings on the attorney's challenges for cause. When the Plaintiff Attorney, Defense Attorney, Plaintiff, and Defendant log onto the website in their respective programs to review the Judge's rulings on the attorney's challenges for cause, they are all shown the interactive name and interactive picture of each juror challenged in a vertical list on the screen. By clicking on any juror's interactive name or picture, the juror's video recording will appear on one side of the screen and the juror's transcribed questionnaire will appear on the other side of the screen with all of the options as detailed above. The Judge's ruling of either sustained or overruled will appear to the left of each juror's interactive picture. Below each juror's interactive name, picture, and judicial ruling will appear the respective attorney's grounds supporting the challenge for cause and below such grounds will appear the counterpart's respective rebuttal. Below the rebuttal will appear any explanation for the Judge's ruling that the Judge may have made. A scroll bar to the far right of the screen will appear to allow for viewing of all judicial rulings. Toward the top of the screen will appear the date each attorney submitted his/her challenges for cause and the deadline for when the challenges for cause were to be submitted.

If the Judge elected to allow attorneys to exercise challenges for cause through the website, and if the Judge elected to allow attorneys to exercise peremptory challenges through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, the Court Reporter is then sent an email message that he/she must print through the website the list of any juror names who were excused by the judge through the invention's website and the date the Judge excused such jurors through the invention's website and place the copies of the rulings in the Court's file for transcript purposes. The email message contains an interactive link to the main website so the Court Reporter can instantaneously log onto the website. Also, the Court Reporter is sent an email message instructing him/her to log onto the invention's website and print all email messages to the Judge, the Plaintiff Attorney, the Defense Attorney, the Defendant, and the Plaintiff, if the case is civil, and the dates such emails were submitted through the website. The email messages to the Court Reporter contain an interactive link to the main website so the Court Reporter can instantaneously log onto the website.

If the Judge elected to allow attorneys to exercise challenges for cause through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, email messages are sent to the Plaintiff Attorney and the Defense Attorney that they may now log into their respective programs in the website and view the names of the jurors the Judge excused through the website. The email message also will specifically inform them that the Plaintiff Attorney and the Defense Attorney are to log onto the website at the same date and time to submit their peremptory challenges in an alternating fashion through the website with the Plaintiff Attorney submitting one peremptory challenge first followed by the Defense Attorney submitting one peremptory challenge. The email message also will notify them of the specific date and time the Plaintiff Attorney and the Defense Attorney are to log onto the website to submit their peremptory challenges in an alternating fashion. The email message also will inform them that both attorneys alternate submitting peremptory challenges back and forth until both attorneys have exercised all of their allotted peremptory challenges through the website. The email message also will inform them of the amount of time the Judge allotted each attorney to submit each of their peremptory challenges as they alternate submitting peremptory challenges back and forth through the website. The email message also will inform them that before the specified date and time for the Plaintiff Attorney and the Defense Attorney to log onto the website to submit their peremptory challenges in an alternating fashion, they should review their respective professional jury consultant's analysis and assigned number of each juror, their own respective analysis and assigned number of each juror, their respective client's analysis and assigned number of each juror, the questionnaires, and/or the videos of each juror and then decide which jurors to keep or exclude with a peremptory challenge to prepare them for the alternating peremptory challenge process. Thus, the email message also will advise both the Plaintiff Attorney and the Defense Attorney to ensure that they have assigned a number for each juror on a scale of 1 to 10 through the website expressing the strength of their desire to exclude the juror before the specified date and time for the Plaintiff Attorney and the Defense Attorney to log onto the website to submit their peremptory challenges in an alternating fashion which will make the alternating peremptory challenge process easier and faster for both attorneys given the limited amount of time each attorney will have to submit each peremptory challenge in an alternating fashion. Thus, the attorneys are advised to assign a number between 1 and 10 with 10 representing the strongest desire to exclude a juror. The email message also will inform them that each attorney's respective assigned number of each juror and analysis of each juror typed through the website along with their respective professional jury consultant's analysis and assigned number of each juror and their respective client's analysis and assigned number of each juror through the website will be completely confidential to the attorney and will not be disclosed to the opposing attorney, the judge, the opposing party or anyone else. Additionally, the email message will inform them that the Plaintiff, the Defendant, and the Judge will be allowed to log onto the website at the same date and time that the attorneys are to submit their peremptory challenges through the website and view each peremptory challenge exercise of each attorney as the attorneys exercise their peremptory challenges through the website. The email message contains an interactive link to the main website for the attorneys to instantly log onto the website. Such email messages sent to the Plaintiff Attorney and the Defense Attorney will also be sent to the Judge, the Plaintiff Attorney, the Defense Attorney, the Plaintiff, and the Defendant.

If the Judge elected to allow attorneys to exercise challenges for cause through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, email messages are sent to the Plaintiff and the Defendant that they may now log into their respective programs in the website and view the names of the jurors the Judge excused through the website. The email message also will specifically inform them that the Plaintiff Attorney and the Defense Attorney are to log onto the website at the same date and time to submit their peremptory challenges in an alternating fashion through the website with the Plaintiff Attorney submitting one peremptory challenge first followed by the Defense Attorney submitting one peremptory challenge. The email message also will notify them of the specific date and time the Plaintiff Attorney and the Defense Attorney are to log onto the website to submit their peremptory challenges in an alternating fashion. The email message also will inform them that both attorneys alternate submitting peremptory challenges back and forth until both attorneys have exercised all of their allotted peremptory challenges through the website. The email message also will inform them of the amount of time the Judge allotted each attorney to submit each of their peremptory challenges as they alternate submitting peremptory challenges back and forth through the website. Additionally, the email message will inform them that they will be allowed to log onto the website at the same date and time that the attorneys are to submit their peremptory challenges through the website and view each peremptory challenge exercise of each attorney as the attorneys exercise their peremptory challenges through the website. The email message also will inform them that before the specified date and time for the Plaintiff Attorney and the Defense Attorney to log onto the website to submit their peremptory challenges in an alternating fashion, they may review their own respective analysis and assigned number of each juror, the questionnaires, and/or the videos of each juror. The email message contains an interactive link to the main website for the parties to instantly log onto the website. Such email messages sent to the Plaintiff and the Defendant will also be sent to the Judge, the Plaintiff Attorney, the Defense Attorney, the Plaintiff, and the Defendant.

If the Judge elected to allow attorneys to exercise challenges for cause through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, an email message is sent to the Judge informing him/her that the Plaintiff Attorney and the Defense Attorney are to log onto the website at the same date and time to submit their peremptory challenges in an alternating fashion through the website with the Plaintiff Attorney submitting one peremptory challenge first followed by the Defense Attorney submitting one peremptory challenge. The email message also will notify the Judge of the specific date and time the Plaintiff Attorney and the Defense Attorney are to log onto the website to submit their peremptory challenges in an alternating fashion. The email message also will inform the Judge that both attorneys alternate submitting peremptory challenges back and forth until both attorneys have exercised all of their allotted peremptory challenges through the website. The email message also will inform the Judge of the amount of time the Judge allotted each attorney to submit each of their peremptory challenges as they alternate submitting peremptory challenges back and forth through the website. Additionally, the email message will inform the Judge that he/she will be allowed to log onto the website at the same date and time that the attorneys are to submit their peremptory challenges through the website and view each peremptory challenge exercise of each attorney as the attorneys exercise their peremptory challenges through the website. The email message also will inform the Judge that before the specified date and time for the Plaintiff Attorney and the Defense Attorney to log onto the website to submit their peremptory challenges in an alternating fashion, he/she may review the questionnaires and/or the videos of each juror. The email message contains an interactive link to the main website for the Judge to instantly log onto the website. Such email message sent to the Judge will also be sent to the Plaintiff Attorney, the Defense Attorney, the Plaintiff, and the Defendant.

If the Judge elected to allow attorneys to exercise challenges for cause through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, the Court Administrator is then sent an email message containing a list of all jurors who have been stricken either with a challenges for cause or by the Judge, and he/she is also notified that he/she must submit a letter or call each juror on the list informing them that they will not need to appear in court for jury duty on the respective case. Also, included with each juror's name that had been excluded with a challenge for cause or by the Judge is the juror's address so the court administrator can conveniently send them notices that they are no longer needed for jury duty on this case.

Additionally, the Judge, the Plaintiff Attorney, the Plaintiff, the Defense Attorney, the Defendant, the Court Reporter, and the Court Administrator each will be sent text messages to their cellular phones alerting them that their participation is required through the invention's website and that they are advised to check their email for an instructive message of the tasks they are to complete. Such text message is the same as the quoted text message stated above.

If the Judge elected to allow attorneys to exercise challenges for cause through the website, and if the Judge elected to allow attorneys to exercise peremptory challenges through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, the Court Reporter logs onto the website and is instructed to print the list of any juror names who were excused by the judge through the invention's website and the date the Judge excused such jurors through the invention's website and is instructed to place them in the Court's file for transcript purposes. The date the Judge excused the jurors through the invention's website will appear at the top of the print and at the top of the screen. Also, the Judge's photo that he/she took with his/her webcam upon authenticating and submitting the names of the jurors he/she excused through the website appears at the top of the print and at the top of screen displayed by the invention's website. Also, the Court Reporter prints all email messages sent to the Plaintiff Attorney, the Defense Attorney, the Defendant, the Plaintiff, if the case is civil, and the Court Administrator and the dates such emails were submitted to them through the website.

If the Judge elected to allow attorneys to exercise challenges for cause through the website in the Custom Setup of the Jury Selection Process, and if the judge submits rulings on the attorneys' challenges for cause through the website, and if the judge excused any additional jurors through the website to ensure that the combined total number of both attorneys' allotted peremptory challenges combined with the total number jurors to be impaneled combined with the total number of alternate juror positions is equal to the total number of jurors remaining in the jury pool, the Plaintiff Attorney, Defense Attorney, Plaintiff, and Defendant log onto the website in their respective programs to review the list of any juror names who were excused by the judge through the invention's website.

If the Judge elected to allow attorneys to exercise challenges for cause through the website in the Custom Setup of the Jury Selection Process, and if the judge submits rulings on the attorneys' challenges for cause through the website, and if the judge excused any additional jurors through the website as detailed above, and if the judge elected to allow the attorneys to submit peremptory challenges in an alternating fashion through the website on a specified date and time, the Plaintiff Attorney and the Defense Attorney log into their respective programs on the website on the same specified date and time set by the judge in the Custom Setup of the Jury Selection Process, and they submit their peremptory challenges in an alternating fashion through the website as detailed below. To begin the alternating peremptory challenge process, the Plaintiff Attorney must first submit a peremptory challenge through the website. During this process of attorneys submitting their peremptory challenges through the website in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge through the website, the Plaintiff Attorney will not be allowed to submit a subsequent peremptory challenge until the Defense Attorney submits a peremptory challenge through the website first. Likewise, after the Defense Attorney submits a peremptory challenge through the website, the Defense Attorney will not be allowed to submit a subsequent peremptory challenge through the website until the Plaintiff Attorney submits a peremptory challenge first. Thus, neither attorney will be allowed to submit more than one peremptory challenge through the website before his/her counterpart submits a peremptory challenge through the website. Each attorney will be allowed a limited number of minutes to submit each peremptory challenge as set by the Judge through the website in the Custom Setup of the Jury Selection Process.

When the Plaintiff Attorney and the Defense Attorney log into their respective programs on the website on the same specified date and time to submit their peremptory challenges in an alternating fashion, they each select "Submit Peremptory Challenge Exercises in Alternating Fashion" from his/her respective Main Menu of Functions. When the Plaintiff Attorney selects "Submit Peremptory Challenge Exercises in Alternating Fashion" from his/her respective Main Menu of Functions at the specified date and time set by the Judge for attorneys to submit peremptory challenges in an alternating fashion, the Plaintiff Attorney is initially shown a large light green window on his/her screen that states as follows:

The Plaintiff Attorney and the Defense Attorney exercise peremptory challenges through this website by alternating back and forth with the Plaintiff Attorney submitting one peremptory challenge and then the Defense Attorney submitting a peremptory challenge until both attorneys have submitted all of their allotted peremptory challenges.

To begin the alternating peremptory challenge process, the Plaintiff Attorney must first submit a peremptory challenge. To successfully submit a peremptory challenge, the Plaintiff Attorney must click a check mark in one box next to the interactive name and picture of one particular juror and click "Authenticate and Submit One Peremptory Challenge" in the bottom margin of the screen. The Plaintiff Attorney then makes a picture of himself/herself with a webcam and through the website. Upon makings such a picture, the Judge, Plaintiff Attorney, Defense Attorney, Plaintiff, and Defendant will be able to view the name of the juror the Plaintiff Attorney excluded with a peremptory challenge and view the Plaintiff Attorney's authenticating picture in their respective programs.

Each attorney will be allowed (the number of minutes the Judge allotted each attorney to submit each peremptory challenge through the website in the Custom Setup of the Jury Selection Process appears here) minutes to submit each peremptory challenge. During this process of attorneys submitting their peremptory challenges in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge, the Plaintiff Attorney will not be allowed to submit a subsequent peremptory challenge until the Defense Attorney submits a peremptory challenge first. Likewise, after the Defense Attorney submits a peremptory challenge, the Defense Attorney will not be allowed to submit a subsequent peremptory challenge until the Plaintiff Attorney submits a peremptory challenge first. Thus, neither attorney will be allowed to submit more than one peremptory challenge through the website before his/her counterpart submits a peremptory challenge through the website.

If you do not submit a peremptory challenge within the designated time limit, you are still required to submit a peremptory challenge through the website regardless if the time limit expires.

You are to stay logged into this website and submit peremptory challenges in an alternating fashion with the Defense Attorney until you have submitted all of your peremptory challenges through this website.

The Plaintiff Attorney will not be allowed to begin the alternating peremptory challenge process with the Defense Attorney by submitting the first peremptory challenge until (the date and time the judge specified for attorneys to submit their peremptory challenges in an alternating fashion in the Setup of the Custom Jury Selection Process appears here). Once you click the "OK" button on or after the specified time on the specified date, this message will disappear, and your (the number of minutes the Judge allotted each attorney to submit each peremptory challenge through the website in the Custom Setup of the Jury Selection Process appears here) minutes to submit a peremptory challenge will begin.

You may minimize this message into the bottom margin of your screen to allow you to review your professional jury consultant's notes, your notes, the Plaintiff's notes, questionnaires, and/or videos of the jurors at any time before the specified date and time both attorneys are to submit their peremptory challenges through the website in an alternating fashion. Thus, you are encouraged to review your professional jury consultant's notes, your notes, the Plaintiff's notes, questionnaires, and/or videos of the jurors as much as you desire to prepare yourself for the peremptory challenge submission process before the specified date and time both attorneys are to submit their peremptory challenges through the website in an alternating fashion.

However, you will not be allowed to begin the alternating peremptory challenge process with the Defense Attorney by submitting the first peremptory challenge until the date and time the judge specified for attorneys to submit their peremptory challenges.

Below the above said message in the window will appear a button that says "OK." When the Plaintiff Attorney clicks the "OK" button on or after the specified date and time both attorneys are to submit their peremptory challenges through the website in an alternating fashion, the large light green window with the above said message disappears to allow the Plaintiff Attorney to submit a peremptory challenge through the website as detailed below. Thus, the large light green window with the above said message will not disappear by clicking the "OK" button at any time before the specified date and time both attorneys are to submit their peremptory challenges through the website in an alternating fashion. However, the Plaintiff Attorney will be allowed to minimize the above said light green message into the bottom margin of his/her screen to allow him/her to review his/her professional jury consultant's notes, his/her own notes, the Plaintiff's notes, questionnaires, and/or videos of the jurors at any time before the specified date and time both attorneys are to submit their peremptory challenges through the website in an alternating fashion. Thus, the Plaintiff Attorney is instructed to review his/her professional jury consultant's notes, his/her notes, the Plaintiff's notes, questionnaires, and/or videos of the jurors as much as he/she desires to prepare him/her for the peremptory challenge submission process before the specified date and time both attorneys are to submit their peremptory challenges through the website in an alternating fashion. The above said light green message will always appear on the Plaintiff Attorney's screen each time he/she selects "Submit Peremptory Challenge Exercises in Alternating Fashion" from his/her respective Main Menu of Functions in the website.

Once the above said message disappears or the Plaintiff Attorney minimizes the said message within the bottom margin of the screen, the Plaintiff Attorney is shown, in the middle of the screen, the interactive names and interactive pictures of only the remaining jurors who were not excluded with a challenge for cause or excused by the Judge through the website. Thus, the website automatically excludes the juror names and videos of jurors who were excluded with a challenge for cause or excused by the Judge through the website from the "Submit Peremptory Challenge Exercises in Alternating Fashion" screen of the Plaintiff Attorney to make peremptory challenge exercises through the website easier for the Plaintiff Attorney.

On the Plaintiff Attorney's screen, by clicking on any juror's interactive name or interactive picture, the juror's transcribed questionnaire and all of the features detailed above will appear on the right of the screen and the juror's video recording and all viewing and listening options will appear on the left side of the screen as detailed above. To the left of each juror's interactive name and picture will appear a box to be checked. Directly above each box is the instruction "Select hear to exclude this juror with a peremptory challenge." By clicking inside of the box, a check mark will appear indicating the attorney's desire to exclude the juror with a peremptory challenge.

On the Plaintiff Attorney's screen, directly below each juror's interactive name, interactive picture, and box, will appear the Plaintiff Attorney's Professional Jury Consultant's analysis of the particular juror if the Plaintiff Attorney selected a professional jury consultant. To the immediate left of the Plaintiff Attorney's Professional Jury Consultant's analysis will appear the number between 1-10 that the consultant assigned to the respective juror to express the strength of the consultant's desire to exclude the juror. The higher the number the stronger the desire of the professional jury consultant to exclude the juror with a peremptory challenge.

Also, on the Plaintiff Attorney's screen, directly below the Plaintiff Attorney's Professional Jury Consultant's analysis will appear the Plaintiff Attorney's confidential notes of the respective juror. To the immediate left of the Plaintiff Attorney's confidential notes will appear the number between 1-10 that the Plaintiff Attorney assigned to the respective juror to express the strength of the desire to exclude the juror. The higher the number the stronger the desire of the Plaintiff Attorney to exclude the juror with a peremptory challenge. On the Plaintiff Attorney's screen, a flashing cursor will appear next to the Plaintiff Attorney's assigned number to the immediate left of the Plaintiff Attorney's analysis of the juror appearing at the top of the list of juror interactive names. Thus, the Plaintiff Attorney is allowed to add an assigned number or change his/her existing assigned number of any juror and is allowed to add an analysis of any juror or change and/or add to his/her existing analysis of any juror on the list on the Plaintiff Attorney's screen. The website will advise the Plaintiff Attorney that he/she may add an assigned number under the interactive name of each juror or may change his/her existing assigned number to the immediate left of the Plaintiff Attorney's analysis of any juror and may add an analysis under the interactive name of any juror or change or add to any existing analysis under the interactive name of any juror on the "Submit Peremptory Challenge Exercises in Alternating Fashion" screen before or during the specified date and time the attorneys are to log onto the website and submit their peremptory challenges in an alternating fashion through the website to prepare for the peremptory challenge process.

Also, on the Plaintiff Attorney's screen, directly below the Plaintiff Attorney's confidential notes will appear the Plaintiff's own personal analysis, if the case is civil, and if the Plaintiff chooses to submit an analysis of each juror through the website. To the immediate left of any Plaintiff's analysis will appear the number between 1-10 that the Plaintiff assigned to the respective juror to express the strength of the Plaintiff's desire to exclude the juror. The higher the number the stronger the desire of the Plaintiff to exclude the juror with a peremptory challenge.

Also, on the Plaintiff Attorney's screen, the interactive juror names and pictures are placed in order based on the Plaintiff Attorney's Professional Jury Consultant's assigned number between 1 and 10. If no professional jury consultant was hired or retained to provide an analysis of each juror through the website, the interactive juror names and pictures are placed in order based on the Plaintiff Attorney's assigned number between 1 and 10. The higher the assigned number for a juror the higher the juror will appear on the list. For example, all jurors assigned the number 10 will appear first on the list. If more than one juror is assigned the same number, all jurors with the same number are placed in alphabetical order. All jurors assigned the number 9 will appear after the last juror in alphabetical order assigned the number 10 etc.

Also, on the Plaintiff Attorney's screen, in the far right edge of the screen will appear a scroll bar which will allow the Plaintiff Attorney to view, on the same screen, each of the remaining juror interactive names and interactive pictures and their respective Plaintiff Attorney's Professional Jury Consultant's analysis and assigned number, their respective Plaintiff Attorney's analysis and assigned number, and their respective Plaintiff's analysis and assigned number.

Also, on the Plaintiff Attorney's screen, in the top margin of the screen will appear the current date and time. Directly below the current date and time will appear the specified date and time for both attorneys to submit their peremptory challenges in an alternating fashion through the website as set by the Judge in the Custom Setup of the Jury Selection Process. On the Plaintiff Attorney's screen, directly below the specified date and time for both attorneys to submit their peremptory challenges in an alternating fashion will appear a window on the left side of the screen. In the top of this said window will appear the label "Plaintiff Attorney's Submitted Peremptory Challenges." Directly below this said label and within the said window will appear consecutive numbers from 1 to the total number of peremptory challenges the Judge allotted each attorney to submit through the website in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Plaintiff Attorney successfully submits his/her first peremptory challenge, the name of the juror the Plaintiff Attorney selected to exclude with a peremptory challenge will appear next to the number one in the window labeled "Plaintiff Attorney's Submitted Peremptory Challenges." When the Plaintiff Attorney successfully submits his/her second peremptory challenge, the name of the juror the Plaintiff Attorney selected to exclude with a peremptory challenge immediately will appear next to the number two in the window labeled "Plaintiff Attorney's Submitted Peremptory Challenges." Thus, the name of each juror excluded with a Plaintiff Attorney's peremptory challenge through the website will appear next to the number that corresponds with the order the juror was excluded with a peremptory challenge through the website by the Plaintiff Attorney in the window labeled "Plaintiff Attorney's Submitted Peremptory Challenges." Thus, the website instructs the Plaintiff Attorney to continue submitting peremptory challenges in alternating fashion with the Defense Attorney until there is a name next to every designated number in the window labeled "Plaintiff Attorney's Submitted Peremptory Challenges." To the right of each juror's name on the list in the window labeled "Plaintiff Attorney's Submitted Peremptory Challenges" will appear the juror's respective picture, and to the right of the juror's respective picture will be the exact date and time the Plaintiff Attorney excluded the respective juror with a peremptory challenge and the total amount of time the Plaintiff Attorney took to exclude the juror with a peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Plaintiff Attorney submitted the peremptory challenge through the website.

Also, on the Plaintiff Attorney's screen, directly below the specified date and time for both attorneys to submit their peremptory challenges in an alternating fashion and to the right of the window containing the "Plaintiff Attorney's Submitted Peremptory Challenges" will appear a window on the right side of the screen. In the top of this said window will appear the label "Defense Attorney's Submitted Peremptory Challenges." Directly below this said label and within the said window will appear consecutive numbers from 1 to the total number of peremptory challenges the Judge allotted each attorney to exercise in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Defense Attorney successfully submits his/her first peremptory challenge, the name of the juror the Defense Attorney selected to exclude with a peremptory challenge immediately will appear next to the number one in the window labeled "Defense Attorney's Submitted Peremptory Challenges." When the Defense Attorney successfully submits his/her second peremptory challenge, the name of the juror the Defense Attorney selected to exclude with a peremptory challenge immediately will appear next to the number two in the window labeled "Defense Attorney's Submitted Peremptory Challenges." Thus, the name of each juror excluded with a Defense Attorney's peremptory challenge through the website will appear next to the number that corresponds with the order the juror was excluded with a peremptory challenge through the website by the Defense Attorney in the window labeled "Defense Attorney's Submitted Peremptory Challenges." To the right of each juror's name on the list in the window labeled "Defense Attorney's Submitted Peremptory Challenges" will appear the juror's respective picture, and to the right of the juror's respective picture will be the exact date and time the Defense Attorney excluded the respective juror with a peremptory challenge and the total amount of time the Defense Attorney took to exclude the juror with a peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Ultimately, the window labeled "Defense Attorney's Submitted Peremptory Challenges" on the Plaintiff Attorney's screen allows the Plaintiff Attorney to monitor the Defense Attorney's peremptory challenge exercises. Thus, the website instructs the Plaintiff Attorney that the Defense Attorney has been instructed through the website to continue submitting peremptory challenges in alternating fashion with the Plaintiff Attorney until there is a name next to every designated number in the window labeled "Defense Attorney's Submitted Peremptory Challenges."

Also, on the Plaintiff Attorney's screen, directly below the window labeled "Plaintiff Attorney's Submitted Peremptory Challenges" and the window labeled "Defense Attorney's Submitted Peremptory Challenges," and directly above the window containing the juror interactive names and pictures is the time remaining for the Plaintiff Attorney to submit a peremptory challenge through the website. Thus, the amount of time the Judge allotted for each attorney to submit a peremptory challenge through the website in the Custom Setup of the Jury Selection Process will appear in the said area. Once the Plaintiff Attorney clicks "OK" on the above described message in the light green window, and the light green window disappears, and the Plaintiff Attorney is shown the entire screen to submit a peremptory challenge through the website on the specified date and time for attorneys to submit their peremptory challenges in an alternating fashion, the time the Judge allotted for each attorney to submit a peremptory challenge immediately will begin to count down so the Plaintiff Attorney can monitor how much time he/she has to submit a peremptory challenge through the website.

On the Plaintiff Attorney's screen, in the bottom margin on the far right side of the screen will appear a rectangular light green window that will state "Authenticate and Submit One Peremptory Challenge." When the Plaintiff Attorney selects "Authenticate and Submit One Peremptory Challenge," a window appears on the Plaintiff Attorney's screen. Below the window appears a button labeled "Take Picture and Submit." When such window appears on the screen and the Plaintiff Attorney sits in front of a webcam, the Plaintiff Attorney's live video recording appears in the window. When the Plaintiff Attorney clicks "Take Picture and Submit," the invention's website captures a picture of the Plaintiff Attorney on the Plaintiff Attorney's screen. When the Plaintiff Attorney's picture is taken, the Plaintiff Attorney's peremptory challenge exercise of a juror becomes viewable to the Defense Attorney, the Judge, the Defendant, and the Plaintiff as detailed below. When the Judge, the Plaintiff Attorney, the Defense Attorney, the Plaintiff, and the Defendant view the Plaintiff Attorney's peremptory challenge exercise of a juror, in their respective programs, the Plaintiff Attorney's authenticating picture appears with the name of such juror through the website as detailed below. The purpose of the Plaintiff Attorney taking his/her picture in front of a webcam before he/she submits his/her peremptory challenge of a juror is to prove that the Plaintiff Attorney submitted such peremptory challenge of the particular juror through the invention's website.

In the bottom margin of the left side of the screen will appear a rectangular gray window that will state "Previous." By selecting "Previous," the Plaintiff Attorney is shown the previous screen where he/she may view the instructions to submit peremptory challenges in an alternating fashion with the Defense Attorney.

To successfully submit a peremptory challenge, the Plaintiff Attorney is instructed on the preceding screen that he/she must click a check mark in one box next to the interactive name and picture of one particular juror and click "Authenticate and Submit One Peremptory Challenge." The Plaintiff Attorney is further instructed that before clicking "Authenticate and Submit One Peremptory Challenge" the website will not allow the Plaintiff Attorney to click a check mark in more than one box when it is the Plaintiff Attorney's turn to submit a peremptory challenge. For example, if the Plaintiff Attorney clicks a check mark in the box next to John Doe's interactive name and picture and then the Plaintiff Attorney clicks a check mark in the box next to Jane Doe's interactive name and picture, the check mark in the box next to John Doe's interactive name and picture immediately will disappear upon clicking a check mark in the box next to Jane Doe's interactive name and picture.

The Plaintiff Attorney is further advised that before clicking a check mark in one box next to the interactive name and picture, the Plaintiff Attorney should compare his/her professional consultant's analysis and assigned number as well as any Plaintiff's analysis and assigned number as well as his/her own confidential notes and assigned number and then decide which juror to keep or exclude with a peremptory challenge. The website advises the Plaintiff the Plaintiff Attorney is advised to exclude all jurors assigned a number 10, and if the Plaintiff Attorney has any peremptory challenge exercises remaining after excluding all jurors assigned a number 10, the Plaintiff Attorney is advised to exclude all jurors assigned a number 9 etc. The website advises that if the Plaintiff Attorney assigns each juror a number between 1 and 10 with 10 representing the strongest desire to exclude a juror, the Plaintiff Attorney will be able to submit his/her peremptory challenges fast and within the time limit to submit a peremptory challenge through the website as all he/she needs to do is exclude the jurors with the highest assigned numbers.

If the Plaintiff Attorney does not submit one peremptory challenge within the number of minutes the Judge allotted each attorney to submit each peremptory challenge through the website in the Custom Setup of the Jury Selection Process, the Plaintiff Attorney is still allowed to submit one peremptory challenge in the same manner detailed above. Thus, there are no consequences for either the Plaintiff Attorney or the Defense Attorney submitting one peremptory challenge after the number of minutes the Judge allotted each attorney to submit each peremptory challenge through the website has expired.

Every time the Plaintiff Attorney exercises a peremptory challenge by clicking the "Authenticate and Submit One Peremptory Challenge" button in his/her program after clicking a check mark in the box next to one particular juror's interactive name and picture, the selected juror's name, on the screen, will become highlighted in light red and a single strike through line will appear through the juror's name. Also, the Juror's name will appear next to the corresponding number the juror was excluded with the Plaintiff Attorney's peremptory challenge in the window labeled "Plaintiff Attorney's Submitted Peremptory Challenges" at the top of the screen. The check mark the Plaintiff Attorney clicked in the box next to the Juror's interactive name and picture to exclude the Juror with a peremptory challenge will remain in the box. Also, every time the Plaintiff Attorney successfully submits a peremptory challenge through the website in the manner detailed above except for the final peremptory challenge the Plaintiff Attorney is required to submit, a light red window will then appear in the bottom right corner of the Plaintiff Attorney's screen that covers the "Submit One Peremptory Challenge" button. The light red window states as follows:

> Your peremptory challenge was successfully submitted. The Defense Attorney is now submitting a peremptory challenge. You will not be allowed to submit another peremptory challenge until the Defense Attorney submits a peremptory challenge through the website. After the Defense Attorney submits a peremptory challenge, you must submit another peremptory challenge through this website within the amount of time the Judge allotted for each attorney to submit a peremptory challenge. The time remaining for the Defense Attorney to submit a peremptory challenge: (The amount of time the Judge allotted for each attorney to submit a peremptory challenge through the website in the Custom Setup of the Jury Selection Process will appear here and will begin to count down immediately upon the Defense Attorney clicking on the OK button on the light green message in his/her own program to begin the process of exercising a peremptory challenge as detailed below.)

While the above said light red window with the above said message appears in the bottom corner of the screen, the Plaintiff Attorney is allowed to review all notes on the interactive jurors and review the questionnaires and videos of the jurors while the Plaintiff Attorney waits for the Defense Attorney to submit a peremptory challenge.

As stated, the above said light red window with the above said message that appears in the bottom corner of the screen will appear on the screen in the Plaintiff Attorney's program every time the Plaintiff Attorney successfully submits a peremptory challenge through the website in the manner detailed above except for the final peremptory challenge the Plaintiff Attorney is required to submit. Immediately after the Plaintiff Attorney submits his/her final required peremptory challenge a light red window with a different message will appear as detailed below.

Once the Defense Attorney submits a peremptory challenge through the website and the Plaintiff Attorney is required to submit at least one more peremptory challenge through the website, the above said light red message and window on the Plaintiff Attorney's screen will disappear and the "Authenticate and Submit One Peremptory Challenge" button will reappear in the right side of the bottom margin of the screen. Also, every time the Defense Attorney submits a peremptory challenge through the website, the name of the juror the Defense Attorney selected to exclude with a peremptory challenge immediately will appear next to the corresponding number the Defense Attorney excluded the juror with a peremptory challenge in the window labeled "Defense Attorney's Submitted Peremptory Challenges" on the Plaintiff Attorney's screen. Additionally, every time the Defense Attorney submits a peremptory challenge through the website, the name of the juror the Defense Attorney is selected to exclude with a peremptory challenge will become highlighted in light red and a single strike through line will appear through the juror's name on the Plaintiff Attorney's screen. Also, every time the Defense Attorney submits a peremptory challenge through the website, a check mark will appear in the box next to the interactive picture and name of the juror the Defense Attorney selected to exclude with a peremptory challenge on the Plaintiff Attorney's screen. Also, once the Defense Attorney submits a peremptory challenge through the website and the Plaintiff Attorney is required to submit at least one more peremptory challenge through the website, a large light green window will then appear in the middle of the Plaintiff Attorney's screen. Such light green window states as follows:

> The Defense Attorney has submitted a peremptory challenge. You now have (the amount of time the Judge allotted for each attorney to submit a peremptory challenge through the website in the Custom Setup of the Jury Selection Process will appear here) to exercise another peremptory challenge. Once you click the OK button, your (the amount of time the Judge allotted for each attorney to submit a peremptory challenge through the website in the Custom Setup of the Jury Selection Process will appear here) to exercise a peremptory challenge will begin.

Below this message will appear a button labeled "OK." By the Plaintiff Attorney clicking on the OK button, the light green window with this message disappears to allow the Plaintiff Attorney to exercise another peremptory challenge through the website in the same manner as stated above. Once the Defense Attorney submits his/her final required peremptory challenge through the website and the Plaintiff Attorney has already submitted his/her final required peremptory challenge through the website, the above said large light green window will no longer appear.

Also, once the Defense Attorney submits a peremptory challenge through the website and the Plaintiff Attorney is required to submit at least one more peremptory challenge through the website, and once the above said light green message disappears by the Plaintiff Attorney clicking the "OK" button on the light green message, and once the Plaintiff Attorney is shown the entire screen to submit a peremptory challenge, the time the Judge allotted for each attorney to submit a peremptory challenge appears on the Plaintiff Attorney's screen in the same place as stated above and it will immediately begin to count down so the Plaintiff Attorney can monitor how much time he/she has to submit another peremptory challenge through the website. The Plaintiff Attorney then submits all of the rest of his/her peremptory challenges through the website in the same manner as stated above by clicking a check mark in one box next to the interactive name and picture of one juror and clicking on "Authenticate and Submit One Peremptory Challenge."

After the Plaintiff Attorney has submitted his/her last required peremptory challenge through the website, and while the Defense Attorney submits his/her final required peremptory challenge through the website, a new light red window will then appear in the bottom right corner of the screen that covers the "Authenticate and Submit One Peremptory Challenge" button. The light red window states as follows:

> Your peremptory challenge was successfully submitted. You have successfully submitted all of your required peremptory challenges through the website, and you are not allowed to submit anymore peremptory challenges through the website. The Defense Attorney is now submitting his/her final required peremptory challenge through the website. You may log off the website at this time or you may stay logged in your program to view the Defense Attorney's final peremptory challenge through your program. The time remaining for the Defense Attorney to submit his/her final peremptory challenge: (The amount of time the Judge allotted for each attorney to submit a peremptory challenge through the website in the Custom Setup of the Jury Selection Process will appear here and will begin to count down immediately upon the Defense Attorney clicking on the OK button on the light green message in his/her own program to begin the process of exercising a peremptory challenge as detailed below.)

Once the Defense Attorney submits his/her final required peremptory challenge through the website, the name of the juror the Defense Attorney selected to exclude with a peremptory challenge immediately will appear next to the corresponding number the Defense Attorney excluded the juror with a peremptory challenge in the window labeled "Defense Attorney's Submitted Peremptory Challenges" on the Plaintiff Attorney's screen to enable the Plaintiff Attorney to view the final required peremptory challenge of the Defense Attorney. Additionally, once the Defense Attorney submits his/her final required peremptory challenge through the website, the name of the juror the Defense Attorney selected to exclude with a peremptory challenge will become highlighted in light red and a single strike through line will appear through the juror's name on the Plaintiff Attorney's screen. Also, once the Defense Attorney submits his/her final required peremptory challenge through the website, a check mark will appear in the box next to the interactive picture and name of the juror the Defense Attorney selected to exclude with his/her final required peremptory challenge on the Plaintiff Attorney's screen. Once the Defense Attorney submits his/her final required peremptory challenge through the website, the time the Judge allotted for each attorney to submit a peremptory challenge will no longer appear on the Plaintiff Attorney's screen as both attorneys have exercised all of their allotted peremptory challenges through the website and will not be allowed to submit anymore peremptory challenges.

Also, once the Defense Attorney submits his/her final required peremptory challenge through the website, the above said light red message on the Plaintiff Attorney's screen that states that the Defense Attorney is now submitting his/her final required peremptory challenge disappears, and a new light red window appears on the Plaintiff Attorney's screen that states as follows:

> The Defense Attorney has submitted his/her final required peremptory challenge through the website. The alternating peremptory challenge process through the website is now complete. You are not allowed to submit anymore peremptory challenges through the website. You may now log off the website, or you may review all of the peremptory challenge exercises or review the remaining juror pictures, videos, questionnaires, and confidential notes. Only if the Judge elected to allow attorneys to contest their counterpart's peremptory challenges based on unconstitutional race and/or gender discrimination through the website, both the Plaintiff Attorney and the Defense Attorney may now make such contests to their counterpart's peremptory challenges through the website.

Below this message will appear a button labeled "OK." By the Plaintiff Attorney clicking on the OK button, the said light red window with this message disappears. Once the said message disappears, the Plaintiff Attorney may review all of the peremptory challenge exercises or review the remaining juror names, pictures, videos, questionnaires, and confidential notes. Also, once the said message disappears, a window containing an interactive list of all of the remaining jurors who were not excluded with an attorney peremptory challenge will appear above the bottom margin of the Plaintiff Attorney's screen. Inside of the top of such window will appear the label "Jury Panel and Alternate Jurors." The Plaintiff Attorney may also log off of the website. Only if the Judge elected to allow attorneys to contest their counterpart's peremptory challenges based on unconstitutional race and/or gender discrimination through the website, both the Plaintiff Attorney and the Defense Attorney may make such contests to their counterpart's peremptory challenges through the website as detailed below.

Every time the Plaintiff Attorney selects "Submit Peremptory Challenge Exercises in Alternating Fashion" from his/her respective Main Menu of Functions, the Plaintiff Attorney is advised to review his/her professional jury consultant's analysis and assigned number of each juror, his/her own analysis and assigned number of each juror, the Plaintiffs analysis and assigned number of each juror, questionnaires, and/or videos of each juror and then decide which jurors to keep or exclude with a peremptory challenge before the specified date and time the alternating peremptory challenge process begins to prepare him/her for the alternating peremptory challenge process.

The Plaintiff Attorney is further advised to ensure that he/she has assigned a number for each juror on a scale of 1 to 10 through the website expressing the strength of his/her desire to exclude the juror before the specified date and time for the Plaintiff Attorney and the Defense Attorney to log onto the website to submit their peremptory challenges in an alternating fashion which will make the alternating peremptory challenge process easier and faster for the Plaintiff Attorney given the limited amount of time each attorney will have to submit each peremptory challenge in an alternating fashion. Thus, the Plaintiff Attorney is advised to assign a number between 1 and 10 with 10 representing the strongest desire to exclude a juror. The website advises the Plaintiff Attorney to exclude the jurors with the highest assigned number between 1 and 10. For example, the Plaintiff Attorney is advised to exclude all jurors assigned a number 10, and if the Plaintiff Attorney has any peremptory challenge exercises remaining after excluding all jurors assigned a number 10, the Plaintiff Attorney is advised to exclude all jurors assigned a number 9 etc. The website advises that if the Plaintiff Attorney assigns each juror a number between 1 and 10 with 10 representing the strongest desire to exclude a juror, the Plaintiff Attorney will be able to submit his/her peremptory challenges fast and within the time limit to submit a peremptory challenge through the website as all he/she needs to do is exclude the jurors with the highest assigned numbers.

The website will advise the Plaintiff Attorney that he/she may add an assigned number under the interactive name of each juror or may change his/her existing assigned number to the immediate left of the Plaintiff Attorney's analysis of any juror and may add an analysis under the interactive name of any juror or change or add to any existing analysis under the interactive name of any juror on the "Submit Peremptory Challenge Exercises in Alternating Fashion" screen before or during the specified date and time the attorneys are to log onto the website and submit their peremptory challenges in an alternating fashion through the website to prepare for the peremptory challenge process.

The website also will inform the Plaintiff Attorney that his/her respective assigned number of each juror and analysis of each juror typed through the website along with his/her respective professional jury consultant's analysis and assigned number of each juror and his/her respective client's analysis and assigned number of each juror through the website will be completely confidential to the Plaintiff Attorney and will not be disclosed to the opposing attorney, the judge, the opposing party or anyone else.

Thus, when the Plaintiff Attorney logs into his/her respective program on the website and selects "Submit Peremptory Challenge Exercises in Alternating Fashion" from his/her respective Main Menu of Functions at any time before the specified date and time for attorneys to submit their peremptory challenges in an alternating fashion to prepare for the alternating peremptory challenge process, the Plaintiff Attorney is initially shown the above said large light green window on his/her screen. When the Plaintiff Attorney minimizes the above said light green message into the bottom margin of his/her screen, he/she is shown all of the above features that are detailed above. Thus, the Plaintiff Attorney is shown the following: 1) interactive names and interactive pictures of only the remaining jurors who were not excluded with a challenge for cause or excused by the Judge through the website, 2) the Plaintiff Attorney's Professional Jury Consultant's analysis and assigned number of each particular juror if the Plaintiff Attorney selected a professional jury consultant, 3) the Plaintiff Attorney's confidential analysis and assigned number of each respective juror, 4) the Plaintiffs own personal analysis and assigned number of each particular juror, 5) a scroll bar in the in the far right edge of the screen will appear to view all of the above stated features, 6) the current date and time will appear in the top margin of the screen, 7) the specified date and time for both attorneys to submit their peremptory challenges in an alternating fashion through the website will appear directly below the current date and time, 8) the window for the "Plaintiff Attorney's Submitted Peremptory Challenges," 9) the window for the "Defense Attorney's Submitted Peremptory Challenges," 10) the amount of time the Judge allotted for each attorney to submit a peremptory challenge through the website in the Custom Setup of the Jury Selection Process will appear, 11) a box will appear to the left of each juror's interactive name and picture with the instruction above each box that states "Select hear to exclude this juror with a peremptory challenge," 12) a button labeled "Previous" will appear in the bottom margin of the screen, and 13) a rectangular light green window that states "Authenticate and Submit One Peremptory Challenge" will appear in the bottom margin of the screen.

However, if the Plaintiff Attorney selects "Authenticate and Submit One Peremptory Challenge" before the specified date and time both attorneys are to submit their peremptory challenges through the website in an alternating fashion, a light red window will appear on the screen with a message that states as follows:

You are not allowed to begin the alternating peremptory challenge process with the Defense Attorney by submitting the first peremptory challenge until (the date and time the judge specified for attorneys to submit their peremptory challenges in an alternating fashion will appear here.)

Below this message will appear a button labeled "OK." By the Plaintiff Attorney clicking on the OK button, the light red window with this message disappears to allow the Plaintiff Attorney to continue reviewing information.

When the Defense Attorney selects "Submit Peremptory Challenge Exercises in Alternating Fashion" from his/her respective Main Menu of Functions at the specified date and time set by the Judge for attorneys to submit peremptory challenges in an alternating fashion, the Defense Attorney is initially shown a large light red window on his/her screen that states as follows:

The Plaintiff Attorney and the Defense Attorney exercise peremptory challenges through this website by alternating back and forth with the Plaintiff Attorney submitting one peremptory challenge and then the Defense Attorney submitting a peremptory challenge until both attorneys have submitted all of their allotted peremptory challenges.

To begin the alternating peremptory challenge process, the Plaintiff Attorney must first submit one peremptory challenge through the website. After the Plaintiff Attorney submits one peremptory challenge, the Defense Attorney must submit one peremptory challenge through the website. To successfully submit a peremptory challenge through the website, the Defense Attorney must click a check mark in one box next to the interactive name and picture of one particular juror and click "Authenticate and Submit One Peremptory Challenge" in the bottom margin of the screen. The Defense Attorney then makes a picture of himself/herself with a webcam and through the website. Upon making such a picture, the Judge, Plaintiff Attorney, Defense Attorney, Plaintiff, and Defendant will be able to view the name of the juror the Defense Attorney excluded with a peremptory challenge and view the Defense Attorney's authenticating picture in their respective programs.

Each attorney will be allowed (the number of minutes the Judge allotted each attorney to submit each peremptory challenge through the website in the Custom Setup of the Jury Selection Process appears here) minutes to submit each peremptory challenge. During this process of attorneys submitting their peremptory challenges in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge, the Plaintiff Attorney will not be allowed to submit a subsequent peremptory challenge until the Defense Attorney submits a peremptory challenge first. Likewise, after the Defense Attorney submits a peremptory challenge, the Defense Attorney will not be allowed to submit a subsequent peremptory challenge until the Plaintiff Attorney submits a peremptory challenge first. Thus, neither attorney will be allowed to submit more than one peremptory challenge through the website before his/her counterpart submits a peremptory challenge through the website.

If you do not submit a peremptory challenge within the designated time limit, you are still required to submit a peremptory challenge through the website regardless if the time limit expires.

You are to stay logged into this website and submit peremptory challenges in an alternating fashion with the Plaintiff Attorney until you have submitted all of your peremptory challenges through this website.

The Plaintiff Attorney will not be allowed to begin the alternating peremptory challenge process with the Defense Attorney by submitting the first peremptory challenge until (the date and time the judge specified for attorneys to submit their peremptory challenges in an alternating fashion in the Setup of the Custom Jury Selection Process appears here).

The Plaintiff Attorney has not yet submitted his/her first peremptory challenge. Once the Plaintiff Attorney submits his/her first peremptory challenge, this message will disappear, and a new message will appear on your screen instructing you to submit your first peremptory challenge.

You may minimize this message into the bottom margin of your screen to allow you to review your professional jury consultant's notes, your notes, the Defendant's notes, questionnaires, and/or videos of the jurors at any time before the specified date and time both attorneys are to submit their peremptory challenges through the website in an alternating fashion. Thus, you are encouraged to review your professional jury consultant's notes, your notes, the Defendant's notes, questionnaires, and/or videos of the jurors as much as you desire to prepare yourself for the peremptory challenge submission process before the specified date and time both attorneys are to submit their peremptory challenges through the website in an alternating fashion.

However, you will not be allowed to begin the alternating peremptory challenge process with the Plaintiff Attorney until the Plaintiff Attorney submits the first peremptory challenge on the date and after the time the judge specified for attorneys to submit their peremptory challenges.

The above said message will appear on the Defense Attorney's screen until the Plaintiff Attorney submits his/her first peremptory challenge through the website. Once the Plaintiff Attorney submits his/her first peremptory challenge through the website, the above said message will disappear. However, the Defense Attorney will be allowed to minimize the above said light red message into the bottom margin of his/her screen to allow him/her to review his/her professional jury consultant's notes, his/her own notes, the Defendant's notes, questionnaires, and/or videos of the jurors at any time before the Plaintiff Attorney submits his/her first peremptory challenge through the website. Thus, the Defense Attorney is instructed to review his/her professional jury consultant's notes, his/her notes, the Defendant's notes, questionnaires, and/or videos of the jurors as much as he/she desires to prepare him/her for the peremptory challenge submission process before the specified date and time both attorneys are to submit their peremptory challenges through the website in an alternating fashion. The above said light red message will always appear on the Defense Attorney's screen each time he/she selects "Submit Peremptory Challenge Exercises in Alternating Fashion" from his/her respective Main Menu of Functions in the website.

Once the Plaintiff Attorney submits a peremptory challenge through the website, and the above said message disappears, a large light green window will appear on the Defense Attorney's screen that states as follows:

The Plaintiff Attorney has submitted his/her first peremptory challenge. You must now submit one peremptory challenge through the website. You have (the number of minutes the Judge allotted each attorney to submit each peremptory challenge through the website in the Custom Setup of the Jury Selection Process appears here) minutes to submit your peremptory challenge. To successfully submit a peremptory challenge through the website, the Defense Attorney must click a check mark in one box next to the interactive name and picture of one particular juror and click "Authenticate and Submit One Peremptory Challenge" in the bottom margin of the screen. The Defense Attorney then makes a picture of himself/herself with a webcam and through the website. Upon making such a picture, the Judge, Plaintiff Attorney, Defense Attorney, Plaintiff, and Defendant will be able to view the name of the juror the Defense Attorney excluded with a peremptory challenge and view the Defense Attorney's authenticating picture in their respective programs.

If you do not submit a peremptory challenge within the designated time limit, you are still required to submit a peremptory challenge through the website regardless if the time limit expires.

You are to stay logged into this website and submit peremptory challenges in an alternating fashion with the Plaintiff Attorney until you have submitted all of your peremptory challenges through this website.

Thus, the Plaintiff Attorney and the Defense Attorney exercise peremptory challenges through this website by alternating back and forth with the Plaintiff Attorney submitting one peremptory challenge and then the Defense Attorney submitting a peremptory challenge until both attorneys have submitted all of their allotted peremptory challenges.

To begin the alternating peremptory challenge process, the Plaintiff Attorney must first submit one peremptory challenge through the website. After the Plaintiff Attorney submits one peremptory challenge, the Defense Attorney must submit one peremptory challenge through the website.

Each attorney will be allowed (the number of minutes the Judge allotted each attorney to submit each peremptory challenge through the website in the Custom Setup of the Jury Selection Process appears here) minutes to submit each peremptory challenge. During this process of attorneys submitting their peremptory challenges in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge, the Plaintiff Attorney will not be allowed to submit a subsequent peremptory challenge until the Defense Attorney submits a peremptory challenge first. Likewise, after the Defense Attorney submits a peremptory challenge, the Defense Attorney will not be allowed to submit a subsequent peremptory challenge until the Plaintiff Attorney submits a peremptory challenge first. Thus, neither attorney will be allowed to submit more than one peremptory challenge through the website before his/her counterpart submits a peremptory challenge through the website.

Below the above said message in the window will appear a button that says "OK." When the Defense Attorney clicks the "OK" button, the large light green window with the above said message disappears to allow the Defense Attorney to submit a peremptory challenge through the website as detailed below.

Once the above said message disappears, the Defense Attorney is shown, in the middle of the screen, the interactive names and interactive pictures of only the remaining jurors who were not excluded with a challenge for cause or excused by the Judge through the website. Thus, the website automatically excludes the juror names and videos of jurors who were excluded with a challenge for cause or excused by the Judge through the website from the "Submit Peremptory Challenge Exercises in Alternating Fashion" screen of the Defense Attorney to make peremptory challenge exercises through the website easier for the Defense Attorney.

On the Defense Attorney's screen, by clicking on any juror's interactive name or interactive picture, the juror's transcribed questionnaire and all of its features detailed above will appear on the right of the screen and the juror's video recording and all viewing and listening options will appear on the left side of the screen as detailed above. To the left of each juror's interactive name and picture will appear a box to be checked. Directly above each box is the instruction "Select hear to exclude this juror with a peremptory challenge." By clicking inside of the box, a check mark will appear indicating the attorney's desire to exclude the juror with a peremptory challenge.

On the Defense Attorney's screen, directly below each juror's interactive name, interactive picture, and box, will appear the Defense Attorney's Professional Jury Consultant's analysis of the particular juror if the Defense Attorney selected a professional jury consultant. To the immediate left of the Defense Attorney's Professional Jury Consultant's analysis will appear the number between 1-10 that the consultant assigned to the respective juror to express the strength of the consultant's desire to exclude the juror. The higher the number the stronger the desire of the professional jury consultant to exclude the juror with a peremptory challenge.

Also, on the Defense Attorney's screen, directly below the Defense Attorney's Professional Jury Consultant's analysis will appear the Defense Attorney's confidential notes of the respective juror. To the immediate left of the Defense Attorney's confidential notes will appear the number between 1-10 that the Defense Attorney assigned to the respective juror to express the strength of the desire to exclude the juror. The higher the number the stronger the desire of the Defense Attorney to exclude the juror with a peremptory challenge. On the Defense Attorney's screen, a flashing cursor will appear next to the Defense Attorney's assigned number to the immediate left of the Defense Attorney's analysis of the juror appearing at the top of the list of juror interactive names. Thus, the Defense Attorney is allowed to add an assigned number or change his/her existing assigned number of any juror and is allowed to add an analysis of any juror or change and/or add to his/her existing analysis of any juror on the list on the Defense Attorney's screen. The website will advise the Defense Attorney that he/she may add an assigned number under the interactive name of each juror or may change his/her existing assigned number to the immediate left of the Defense Attorney's analysis of any juror and may add an analysis under the interactive name of any juror or change or add to any existing analysis under the interactive name of any juror on the "Submit Peremptory Challenge Exercises in Alternating Fashion" screen before or during the specified date and time the attorneys are to log onto the website and submit their peremptory challenges in an alternating fashion through the website to prepare for the peremptory challenge process.

Also, on the Defense Attorney's screen, directly below the Defense Attorney's confidential notes will appear the Defendant's own personal analysis if the Defendant chose to submit an analysis of each juror to the Defense Attorney's program through the website. To the immediate left of any Defendant's analysis will appear the number between 1-10 that the Defendant assigned to the respective juror to express the strength of the Defendant's desire to exclude the juror. The higher the number the stronger the desire of the Defendant to exclude the juror with a peremptory challenge.

Also, on the Defense Attorney's screen, the interactive juror names and pictures are placed in order based on the Defense Attorney's Professional Jury Consultant's assigned number between 1 and 10. If no professional jury consultant was hired or retained to provide an analysis of each juror through the website, the interactive juror names and pictures are placed in order based on the Defense Attorney's assigned number between 1 and 10. The higher the assigned number for a juror the higher the juror will appear on the list. For example, all jurors assigned the number 10 will appear first on the list. If more than one juror is assigned the same number, all jurors with the same number are placed in alphabetical order. All jurors assigned the number 9 will appear after the last juror in alphabetical order assigned the number 10 etc.

Also, on the Defense Attorney's screen, in the far right edge of the screen will appear a scroll bar which will allow the Defense Attorney to view, on the same screen, each of the remaining juror interactive names and interactive pictures and their respective Defense Attorney's Professional Jury Consultant's analysis and assigned number, their respective Defense Attorney's analysis and assigned number, and their respective Defendant's analysis and assigned number.

Also, on the Defense Attorney's screen, in the top margin of the screen will appear the current date and time. Directly below the current date and time will appear the specified date and time for both attorneys to submit their peremptory challenges in an alternating fashion through the website as set by the Judge in the Custom Setup of the Jury Selection Process.

On the Defense Attorney's screen, directly below the specified date and time for both attorneys to submit their peremptory challenges in an alternating fashion will appear a window on the left side of the screen. In the top of this said window will appear the label "Plaintiff Attorney's Submitted Peremptory Challenges." Directly below this said label and within the said window will appear consecutive numbers from 1 to the total number of peremptory challenges the Judge allotted each attorney to submit through the website in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Plaintiff Attorney successfully submits his/her first peremptory challenge, the name of the juror the Plaintiff Attorney selected to exclude with a peremptory challenge will appear next to the number one in the window labeled "Plaintiff Attorney's Submitted Peremptory Challenges." When the Plaintiff Attorney successfully submits his/her second peremptory challenge, the name of the juror the Plaintiff Attorney selected to exclude with a peremptory challenge immediately will appear next to the number two in the window labeled "Plaintiff Attorney's Submitted Peremptory Challenges." Thus, the name of each juror excluded with a Plaintiff Attorney's peremptory challenge through the website will appear next to the number that corresponds with the order the juror was excluded with a peremptory challenge through the website by the Plaintiff Attorney in the window labeled "Plaintiff Attorney's Submitted Peremptory Challenges." To the right of each juror's name on the list in the window labeled "Plaintiff Attorney's Submitted Peremptory Challenges" will appear the juror's respective picture, and to the right of the juror's respective picture will be the exact date and time the Plaintiff Attorney excluded the respective juror with a peremptory challenge and the total amount of time the Plaintiff Attorney took to exclude the juror with a peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Plaintiff Attorney submitted the peremptory challenge through the website.

The website instructs the Defense Attorney that the Plaintiff Attorney has been instructed to continue submitting peremptory challenges in alternating fashion with the Defense Attorney until there is a name next to every designated number in the window labeled "Plaintiff Attorney's Submitted Peremptory Challenges." Ultimately, the window labeled "Plaintiff Attorney's Submitted Peremptory Challenges" on the Defense Attorney's screen allows the Defense Attorney to monitor the Plaintiff Attorney's peremptory challenge exercises. Thus, when the Defense Attorney begins the process of submitting his/her first peremptory challenge through the website which is after the Plaintiff Attorney submitted his/her first peremptory challenge through the website, the name of the juror the Plaintiff Attorney selected to exclude with a peremptory challenge will appear next to the number one in the window labeled "Plaintiff Attorney's Submitted Peremptory Challenges" on the Defense Attorney's screen.

Also, on the Defense Attorney's screen, directly below the specified date and time for both attorneys to submit their peremptory challenges in an alternating fashion and to the right of the window containing the "Plaintiff Attorney's Submitted Peremptory Challenges" will appear a window on the right side of the screen. In the top of this said window will appear the label "Defense Attorney's Submitted Peremptory Challenges." Directly below this said label and within the said window will appear consecutive numbers from 1 to the total number of peremptory challenges the Judge allotted each attorney to exercise in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Defense Attorney successfully submits his/her first peremptory challenge through the website, the name of the juror the Defense Attorney selected to exclude with a peremptory challenge immediately will appear next to the number one in the window labeled "Defense Attorney's Submitted Peremptory Challenges." When the Defense Attorney successfully submits his/her second peremptory challenge through the website, the name of the juror the Defense Attorney selected to exclude with a peremptory challenge immediately will appear next to the number two in the window labeled "Defense Attorney's Submitted Peremptory Challenges." Thus, the name of each juror excluded with a Defense Attorney's peremptory challenge through the website will appear next to the number that corresponds with the order the juror was excluded with a peremptory challenge through the website by the Defense Attorney in the window labeled "Defense Attorney's Submitted Peremptory Challenges." To the right of each juror's name on the list in the window labeled "Defense Attorney's Submitted Peremptory Challenges" will appear the juror's respective picture, and to the right of the juror's respective picture will be the exact date and time the Defense Attorney excluded the respective juror with a peremptory challenge and the total amount of time the Defense Attorney took to exclude the juror with a peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Ultimately, the window labeled "Defense Attorney's Submitted Peremptory Challenges" on the Defense Attorney's screen allows the Defense Attorney to monitor his/her peremptory challenge exercises. Thus, the website instructs the Defense Attorney to continue submitting peremptory challenges in alternating fashion with the Plaintiff Attorney through the website until there is a name next to every designated number in the window labeled "Defense Attorney's Submitted Peremptory Challenges."

Also, on the Defense Attorney's screen, directly below the window labeled "Plaintiff Attorney's Submitted Peremptory Challenges" and the window labeled "Defense Attorney's Submitted Peremptory Challenges," and directly above the window containing the juror interactive names and pictures is the time remaining for the Defense Attorney to submit a peremptory challenge through the website. Thus, the amount of time the Judge allotted for each attorney to submit a peremptory challenge through the website in the Custom Setup of the Jury Selection Process will appear in the said area. Once the Defense Attorney clicks "OK" on the above described message in the light green window, and the light green window disappears, and the Defense Attorney is shown the entire screen to submit a peremptory challenge through the website, the time the Judge allotted for each attorney to submit a peremptory challenge immediately will begin to count down so the Defense Attorney can monitor how much time he/she has to submit a peremptory challenge through the website.

On the Defense Attorney's screen, in the bottom margin on the far right side of the screen will appear a rectangular light green window that will state "Authenticate and Submit One Peremptory Challenge." When the Defense Attorney selects "Authenticate and Submit One Peremptory Challenge," a window appears on the Defense Attorney's screen. Below the window appears a button labeled "Take Picture and Submit." When such window appears on the screen and the Defense Attorney sits in front of a webcam, the Defense Attorney's live video recording appears in the window. When the Defense Attorney clicks "Take Picture and Submit," the invention's website captures a picture of the Defense Attorney on the Defense Attorney's screen. When the Defense Attorney's picture is taken, the Defense Attorney's peremptory challenge exercise of a juror becomes viewable to the Plaintiff Attorney, the Judge, the Defendant, and the Plaintiff in their respective programs as detailed below. When the Judge, the Plaintiff Attorney, the Defense Attorney, the Plaintiff, and the Defendant view the Defense Attorney's peremptory challenge exercise of a juror, in their respective programs, the Defense Attorney's authenticating picture appears with the name of such juror through the website as detailed below. The purpose of the Defense Attorney taking his/her picture in front of a webcam before he/she submits his/her peremptory challenge of a juror is to prove that the Defense Attorney submitted such peremptory challenge of the particular juror through the invention's website.

In the bottom margin of the left side of the screen will appear a rectangular gray window that will state "Previous." By selecting "Previous," the Defense Attorney is shown the previous screen where he/she may view the instructions to submit peremptory challenges in an alternating fashion with the Plaintiff Attorney.

To successfully submit a peremptory challenge, the Defense Attorney is instructed on the preceding screen that he/she must click a check mark in one box next to the interactive name and picture of one particular juror and click "Authenticate and Submit One Peremptory Challenge." The Defense Attorney is further instructed that before clicking "Authenticate and Submit One Peremptory Challenge" the website will not allow the Defense Attorney to click a check mark in more than one box when it is the Defense Attorney's turn to submit a peremptory challenge through the website. For example, if the Defense Attorney clicks a check mark in the box next to John Doe's interactive name and picture and then the Defense Attorney clicks a check mark in the box next to Jane Doe's interactive name and picture, the check mark in the box next to John Doe's interactive name and picture immediately will disappear upon clicking a check mark in the box next to Jane Doe's interactive name and picture.

The Defense Attorney is further advised that before clicking a check mark in one box next to the interactive name and picture, the Defense Attorney should compare his/her professional consultant's analysis and assigned number as well as any Defendant's analysis and assigned number as well as his/her own confidential notes and assigned number and then decide which juror to keep or exclude with a peremptory challenge. The website advises the Defense Attorney to exclude the jurors with the highest assigned number between 1 and 10. For example, the Defense Attorney is advised to exclude all jurors assigned a number 10, and if the Defense Attorney has any peremptory challenge exercises remaining after excluding all jurors assigned a number 10, the Defense Attorney is advised to exclude all jurors assigned a number 9 etc. The website advises that if the Defense Attorney assigns each juror a number between 1 and 10 with 10 representing the strongest desire to exclude a juror, the Defense Attorney will be able to submit his/her peremptory challenges fast and within the time limit to submit a peremptory challenge through the website as all he/she needs to do is exclude the jurors with the highest assigned numbers.

If the Defense Attorney does not submit one peremptory challenge within the number of minutes the Judge allotted each attorney to submit each peremptory challenge through the website in the Custom Setup of the Jury Selection Process, the Defense Attorney is still allowed to submit one peremptory challenge in the same manner detailed above. Thus, there are no consequences for either the Plaintiff Attorney or the Defense Attorney submitting one peremptory challenge after the number of minutes the Judge allotted each attorney to submit each peremptory challenge through the website has expired.

Every time the Defense Attorney exercises a peremptory challenge by clicking the "Authenticate and Submit One Peremptory Challenge" button in his/her program after clicking a check mark in the box next to one particular juror's interactive name and picture, the selected juror's name, on the screen, will become highlighted in light red and a single strike through line will appear through the juror's name. Also, the Juror's name will appear next to the corresponding number the juror was excluded with the Defense Attorney's peremptory challenge in the window labeled "Defense Attorney's Submitted Peremptory Challenges" at the top of the screen. The check mark the Defense Attorney clicked in the box next to the Juror's interactive name and picture to exclude the Juror with a peremptory challenge will remain in the box.

Also, every time the Defense Attorney successfully submits a peremptory challenge through the website in the manner detailed above except for the final peremptory challenge the Defense Attorney is required to submit, a light red window will then appear in the bottom right corner of the Defense Attorney's screen that covers the "Authenticate and Submit One Peremptory Challenge" button. The light red window states as follows:

Your peremptory challenge was successfully submitted. The Plaintiff Attorney is now submitting a peremptory challenge. You will not be allowed to submit another peremptory challenge until the Plaintiff Attorney submits a peremptory challenge through the website. After the Plaintiff Attorney submits a peremptory challenge, you must submit another peremptory challenge through this website within the amount of time the Judge allotted for each attorney to submit a peremptory challenge. The time remaining for the Plaintiff Attorney to submit a peremptory challenge: (The amount of time the Judge allotted for each attorney to submit a peremptory challenge through the website in the Custom Setup of the Jury Selection Process will appear here and will begin to count down immediately upon the Plaintiff Attorney clicking on the OK button on the light green message in his/her own program to begin the process of exercising a peremptory challenge as detailed below.)

While the above said light red window with the above said message appears in the bottom corner of the screen, the Defense Attorney is allowed to review all notes on the interactive jurors and review the questionnaires and videos of the jurors while the Defense Attorney waits for the Plaintiff Attorney to submit a peremptory challenge.

As stated, the above said light red window with the above said message that appears in the bottom corner of the screen will appear on the screen in the Defense Attorney's program every time the Defense Attorney successfully submits a peremptory challenge through the website in the manner detailed above except for the final peremptory challenge the Defense Attorney is required to submit. Immediately after the Defense Attorney submits his/her final required peremptory challenge a light red window with a different message will appear as detailed below.

Once the Plaintiff Attorney submits a second or subsequent peremptory challenge through the website and the Defense Attorney is required to submit at least one more peremptory challenge through the website, the above said light red message and window on the Defense Attorney's screen will disappear and the "Authenticate and Submit One Peremptory Challenge" button will reappear in the right side of the bottom margin of the screen. Also, every time the Plaintiff Attorney submits a peremptory challenge through the website, the name of the juror the Plaintiff Attorney selected to exclude with a peremptory challenge immediately will appear next to the corresponding number the Plaintiff Attorney excluded the juror with a peremptory challenge in the window labeled "Plaintiff Attorney's Submitted Peremptory Challenges" on the Defense Attorney's screen. Additionally, every time the Plaintiff Attorney submits a peremptory challenge through the website, the name of the juror the Plaintiff Attorney selected to exclude with a peremptory challenge will become highlighted in light red and a single strike through line will appear through the juror's name on the Defense Attorney's screen. Also, every time the Plaintiff Attorney submits a peremptory challenge through the website, a check mark will appear in the box next to the interactive picture and name of the juror the Plaintiff Attorney selected to exclude with a peremptory challenge on the Defense Attorney's screen. Also, once the Plaintiff Attorney submits a peremptory challenge through the website and the Defense Attorney is required to submit at least one more peremptory challenge through the website, a large light green window will then appear in the middle of the Defense Attorney's screen. Such light green window states as follows:

The Plaintiff Attorney has submitted a peremptory challenge. You now have (the amount of time the Judge allotted for each attorney to submit a peremptory challenge through the website in the Custom Setup of the Jury Selection Process will appear here) to exercise another peremptory challenge. Once you click the OK button, your (the amount of time the Judge allotted for each attorney to submit a peremptory challenge through the website in the Custom Setup of the Jury Selection Process will appear here) to exercise a peremptory challenge will begin.

Below this message will appear a button labeled "OK." By the Defense Attorney clicking on the OK button, the light green window with this message disappears to allow the Defense Attorney to exercise another peremptory challenge through the website in the same manner as stated above. Once the Plaintiff Attorney submits his/her final required peremptory challenge through the website and the Defense Attorney has submitted his/her final required peremptory challenge through the website, the above said large light green window will no longer appear.

Also, every time the Defense Attorney is required to submit at least one more peremptory challenge through the website after the Plaintiff Attorney submits a peremptory challenge through the website, and once the above said light green message disappears by the Defense Attorney clicking the "OK" button on the light green message, and once the Defense Attorney is shown the entire screen to submit a peremptory challenge, the time the Judge allotted for each attorney to submit a peremptory challenge appears on the Defense Attorney's screen in the same place as stated above and it will immediately begin to count down so the Defense Attorney can monitor how much time he/she has to submit another peremptory challenge through the website. The Defense Attorney then submits all of the rest of his/her peremptory challenges through the website in the same manner as stated above by clicking a check mark in one box next to the interactive name and picture of one juror and clicking on "Authenticate and Submit One Peremptory Challenge."

After the Defense Attorney has submitted his/her last required peremptory challenge through the website, a new light red window will then appear in the bottom right corner of the screen that covers the "Authenticate and Submit One Peremptory Challenge" button. The light red window states as follows:

Your peremptory challenge was successfully submitted. You have successfully submitted all of your required peremptory challenges through the website, and you are not allowed to submit anymore peremptory challenges through the website. The alternating peremptory challenge process through the website is now complete.

You are not allowed to submit anymore peremptory challenges through the website. You may now log off the website, or you may review all of the peremptory challenge exercises or review the remaining juror pictures, videos, questionnaires, and confidential notes. Only if the Judge elected to allow attorneys to contest their counterpart's peremptory challenges based on unconstitutional race and/or gender discrimination through the website, both the Plaintiff Attorney and the Defense Attorney may now make such contests to their counterpart's peremptory challenges through the website.

Below this message will appear a button labeled "OK." By the Defense Attorney clicking on the OK button, the said light red window with this message disappears. Once the said message disappears, the Defense Attorney may review all of the peremptory challenge exercises or review the remaining juror pictures, videos, questionnaires, and confidential notes. Also, once the said message disappears, a window containing an interactive list of all of the remaining jurors who were not excluded with an attorney peremptory challenge will appear above the bottom margin of the Defense Attorney's screen. Inside of the top of such window will appear the label "Jury Panel and Alternate Jurors." The Defense Attorney may also log off of the website. Only if the Judge elected to allow attorneys to contest their counterpart's peremptory challenges based on unconstitutional race and/or gender discrimination through the website, both the Plaintiff Attorney and the Defense Attorney may make such contests to their counterpart's peremptory challenges through the website as detailed below.

Additionally, once the Defense Attorney submits his/her final required peremptory challenge through the website, the name of the juror the Defense Attorney selected to exclude with a peremptory challenge immediately will appear next to the corresponding number the Defense Attorney excluded the juror with a peremptory challenge in the window labeled "Defense Attorney's Submitted Peremptory Challenges" on the Defense Attorney's screen. Additionally, once the Defense Attorney submits his/her final required peremptory challenge through the website, the name of the juror the Defense Attorney selected to exclude with a peremptory challenge will become highlighted in light red and a single strike through line will appear through the juror's name on the Defense Attorney's screen. Also, once the Defense Attorney submits his/her final required peremptory challenge through the website, a check mark will appear in the box next to the interactive picture and name of the juror the Defense Attorney selected to exclude with his/her final required peremptory challenge on the Defense Attorney's screen. Once the Defense Attorney submits his/her final required peremptory challenge through the website, the time the Judge allotted for each attorney to submit a peremptory challenge will no longer appear on the Defense Attorney's screen as both attorneys have exercised all of their allotted peremptory challenges through the website and will not be allowed to submit anymore peremptory challenges.

Every time the Defense Attorney selects "Submit Peremptory Challenge Exercises in Alternating Fashion" from his/her respective Main Menu of Functions, the Defense Attorney is advised to review his/her professional jury consultant's analysis and assigned number of each juror, his/her own analysis and assigned number of each juror, the Defendant's analysis and assigned number of each juror, questionnaires, and/or videos of each juror and then decide which jurors to keep or exclude with a peremptory challenge before the specified date and time the alternating peremptory challenge process begins to prepare him/her for the alternating peremptory challenge process.

The Defense Attorney is further advised to ensure that he/she has assigned a number for each juror on a scale of 1 to 10 through the website expressing the strength of his/her desire to exclude the juror before the specified date and time for the Plaintiff Attorney and the Defense Attorney to log onto the website to submit their peremptory challenges in an alternating fashion which will make the alternating peremptory challenge process easier and faster for the Defense Attorney given the limited amount of time each attorney will have to submit each peremptory challenge in an alternating fashion. Thus, the Defense Attorney is advised to assign a number between 1 and 10 with 10 representing the strongest desire to exclude a juror. The website advises the Defense Attorney to exclude the jurors with the highest assigned number between 1 and 10. For example, the Defense Attorney is advised to exclude all jurors assigned a number 10, and if the Defense Attorney has any peremptory challenge exercises remaining after excluding all jurors assigned a number 10, the Defense Attorney is advised to exclude all jurors assigned a number 9 etc. The website advises that if the Defense Attorney assigns each juror a number between 1 and 10 with 10 representing the strongest desire to exclude a juror, the Defense Attorney will be able to submit his/her peremptory challenges fast and within the time limit to submit a peremptory challenge through the website as all he/she needs to do is exclude the jurors with the highest assigned numbers.

The website will advise the Defense Attorney that he/she may add an assigned number under the interactive name of each juror or may change his/her existing assigned number to the immediate left of the Defense Attorney's analysis of any juror and may add an analysis under the interactive name of any juror or change or add to any existing analysis under the interactive name of any juror on the "Submit Peremptory Challenge Exercises in Alternating Fashion" screen before or during the specified date and time the attorneys are to log onto the website and submit their peremptory challenges in an alternating fashion through the website to prepare for the peremptory challenge process.

The website also will inform the Defense Attorney that his/her respective assigned number of each juror and analysis of each juror typed through the website along with his/her respective professional jury consultant's analysis and assigned number of each juror and his/her respective client's analysis and assigned number of each juror through the website will be completely confidential to the Defense Attorney and will not be disclosed to the opposing attorney, the judge, the opposing party or anyone else.

Thus, when the Defense Attorney logs into his/her respective program on the website and selects "Submit Peremptory Challenge Exercises in Alternating Fashion" from his/her respective Main Menu of Functions at any time before the specified date and time for attorneys to submit their peremptory challenges in an alternating fashion to prepare for the alternating peremptory challenge process, the Defense Attorney is shown the initial above said large light red window on his/her screen. When the Defense Attorney minimizes the above said light red message into the bottom margin of his/her screen, he/she is shown all of the above features that are detailed above. Thus, the Defense Attorney is shown the following: 1) interactive names and interactive pictures of only the remaining jurors who were not excluded with a challenge for cause or excused by the Judge through the website, 2) the Defense Attorney's Professional Jury Consultant's analysis and assigned number of each particular juror if the Defense Attorney selected a professional jury consultant, 3) the Defense Attorney's confidential analysis and assigned number of each respective juror, 4) the Defendant's own personal analysis and assigned number of each particular juror, 5) a scroll bar in the in the far right edge of the screen will appear to view all of the above stated features, 6) the current date and time will appear in the top margin of the screen, 7) the specified date and time for both attorneys to submit their peremptory challenges in an alternating fashion through the website will appear directly below the current date and time, 8) the window for the "Plaintiff Attorney's Submitted Peremptory Challenges," 9) the window for the "Defense Attorney's Submitted Peremptory Challenges," 10) the amount of time the Judge allotted for each attorney to submit a peremptory challenge through the website in the Custom Setup of the Jury Selection Process will appear, 11) a box will appear to the left of each juror's interactive name and picture with the instruction above each box that states "Select hear to exclude this juror with a peremptory challenge," 12) a button labeled "Previous" will appear in the bottom margin of the screen, and 13) a rectangular light green window that states "Authenticate and Submit One Peremptory Challenge" will appear in the bottom margin of the screen.

However, if the Defense Attorney selects "Authenticate and Submit One Peremptory Challenge" before the Plaintiff Attorney submits a peremptory challenge through the website on the specified date and time both attorneys are to submit their peremptory challenges through the website in an alternating fashion, a light red window will appear on the screen with a message that states as follows:

You are not allowed to submit a peremptory challenge through this website until after the Plaintiff Attorney submits a peremptory challenge through this website on the (the date and time the judge specified for attorneys to submit their peremptory challenges in an alternating fashion will appear here.)

Below this message will appear a button labeled "OK." By the Defense Attorney clicking on the OK button, the light red window with this message disappears to allow the Defense Attorney to continue reviewing information.

If the Judge elected to allow attorneys to exercise challenges for cause through the website and elected to allow attorneys to exercise peremptory challenges through the website in the Custom Setup of the Jury Selection Process, and if the judge submits rulings on the attorneys' challenges for cause through the website, and if the judge excused any additional jurors, and if the judge elected to allow the attorneys to submit peremptory challenges in an alternating fashion through the website on a specified date and time, the Plaintiff, if the case is civil, and the Defendant log into their respective programs on the website on the same specified date and time set by the judge in the Custom Setup of the Jury Selection Process for both attorneys to submit their peremptory challenges through the website in an alternating fashion, and they view the Plaintiff Attorney's and the Defense Attorney's submitted peremptory challenges through the website. Thus, the Plaintiff and the Defendant are allowed to view the peremptory challenges submitted by both attorneys at the same time both attorneys submit their peremptory challenges through the website.

When the Plaintiff and the Defendant log into their respective programs on the website on the same specified date and time that both attorneys are scheduled to submit their peremptory challenges in an alternating fashion to view the submitted peremptory challenges of both attorneys who submit their peremptory challenges in an alternating fashion, they each select "View All Peremptory Challenge Exercises" from his/her respective Main Menu of Functions. When the Plaintiff selects "View All Peremptory Challenge Exercises" from his/her respective Main Menu of Functions at the specified date and time set by the Judge for both attorneys to submit peremptory challenges in an alternating fashion, the Plaintiff is initially shown a large light green window on his/her screen that states as follows:

The Plaintiff Attorney and the Defense Attorney exercise peremptory challenges through this website by alternating back and forth with the Plaintiff Attorney submitting one peremptory challenge and then the Defense Attorney submitting a peremptory challenge until both attorneys have submitted all of their allotted peremptory challenges.

To begin the alternating peremptory challenge process, the Plaintiff Attorney must first submit a peremptory challenge. During this process of attorneys submitting their peremptory challenges in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge, the Plaintiff Attorney will not be allowed to submit a subsequent peremptory challenge until the Defense Attorney submits a peremptory challenge first. Likewise, after the Defense Attorney submits a peremptory challenge, the Defense Attorney will not be allowed to submit a subsequent peremptory challenge until the Plaintiff Attorney submits a peremptory challenge first. Thus, neither attorney will be allowed to submit more than one peremptory challenge through the website before his/her counterpart submits a peremptory challenge through the website.

Each attorney will be allowed (the number of minutes the Judge allotted each attorney to submit each peremptory challenge through the website in the Custom Setup of the Jury Selection Process appears here) minutes to submit each peremptory challenge. If an attorney does not submit a peremptory challenge within the designated time limit, he/she still is required to submit a peremptory challenge through the website regardless if the time limit expires. You will be allowed to view a countdown of the allotted number of minutes each attorney is allowed to submit a peremptory challenge through the website on your screen while you wait for each attorney to submit a peremptory challenge.

On the (the date and time the judge specified for attorneys to submit their peremptory challenges in an alternating fashion in the Setup of the Custom Jury Selection Process appears here), you will be allowed to view the name of each juror the Plaintiff Attorney excludes with a peremptory challenge on a list on your screen immediately after the Plaintiff Attorney submits each peremptory challenge through the website. Likewise, you will be allowed to view the name of each juror the Defense Attorney excludes with a peremptory challenge on a list on your screen immediately after the Defense Attorney submits each peremptory challenge.

You may stay logged into this website until both attorneys have submitted all of their peremptory challenges through the website in an alternating fashion.

The Plaintiff Attorney will not be allowed to begin the alternating peremptory challenge process with the Defense Attorney by submitting the first peremptory challenge until (the date and time the judge specified for attorneys to submit their peremptory challenges in an alternating fashion in the Setup of the Custom Jury Selection Process appears here).

Once you click the "OK" button on or after the specified time on the specified date, this message will disappear. You may minimize this message into the bottom margin of your screen to allow you to review your notes, questionnaires, and/or videos of the jurors at any time before the specified date and time both attorneys are to submit their peremptory challenges through the website in an alternating fashion.

Below the above said message in the window will appear a button that says "OK." When the Plaintiff clicks the "OK" button on or after the specified time on the specified date, the large light green window with the above said message disappears to allow the Plaintiff to view each peremptory challenge submitted by the Plaintiff Attorney and the Defense Attorney through the website. Thus, the large light green window with the above said message will not disappear by clicking the "OK" button at any time before the specified time on the specified date. However, the Plaintiff will be allowed to minimize the above said light green message into the bottom margin of his/her screen to allow him/her to review his/her notes, questionnaires, and/or videos of the jurors at any time before the specified date and time both attorneys are to submit their peremptory challenges through the website in an alternating fashion. Thus, the Plaintiff is instructed to review his/her notes, questionnaires, and/or videos of the jurors as much as he/she desires before the specified date and time both attorneys are to submit their peremptory challenges through the website in an alternating fashion. The above said light green message will always appear on the Plaintiff's screen each time he/she selects "View All Peremptory Challenge Exercises" from his/her respective Main Menu of Functions in the website.

Once the above said message disappears or the Plaintiff minimizes the above said message into the bottom margin of his/her screen, the Plaintiff is shown, in the middle of the screen, the interactive names and interactive pictures of only the remaining jurors who were not excluded with a challenge for cause or excused by the Judge through the website. Thus, the website automatically excludes the juror names and videos of jurors who were excluded with a challenge for cause or excused by the Judge through the website from the "View All Peremptory Challenge Exercises" screen of the Plaintiff to make viewing peremptory challenge exercises through the website easier for the Plaintiff.

On the Plaintiff's screen, by clicking on any juror's interactive name or interactive picture, the juror's transcribed questionnaire and all its features detailed above will appear on the right of the screen and the juror's video recording and all viewing and listening options will appear on the left side of the screen as detailed above. Also, on the Plaintiff's screen, directly below each juror's interactive name and interactive picture, will appear the Plaintiff's analysis of the particular juror if the Plaintiff submitted an analysis of each juror to the Plaintiff Attorney through the website. To the immediate left of the Plaintiff's analysis will appear the number between 1-10 that the Plaintiff assigned to the respective juror to express the strength of the Plaintiff's desire to exclude the juror. The higher the number the stronger the desire of the Plaintiff to exclude the juror with a peremptory challenge.

Also, on the Plaintiff's screen, the interactive juror names and pictures are placed in order based on the Plaintiff's assigned number between 1 and 10. For example, all jurors assigned the number 10 will appear first on the list. If more than one juror is assigned the same number, all jurors with the same number are placed in alphabetical order. All jurors assigned the number 9 will appear after the last juror in alphabetical order assigned the number 10 etc.

Also, on the Plaintiff's screen, in the far right edge of the screen will appear a scroll bar which will allow the Plaintiff to view, on the same screen, each of the remaining juror interactive names and interactive pictures and their respective Plaintiff's analysis and assigned number.

Also, on the Plaintiff's screen, in the top margin of the screen will appear the current date and time. Directly below the current date and time will appear the specified date and time for both attorneys to submit their peremptory challenges in an alternating fashion through the website as set by the Judge in the Custom Setup of the Jury Selection Process.

On the Plaintiff's screen, directly below the specified date and time for both attorneys to submit their peremptory challenges in an alternating fashion will appear a window on the left side of the screen. In the top of this said window will appear the label "Plaintiff Attorney's Submitted Peremptory Challenges." Directly below this said label and within the said window will appear consecutive numbers from 1 to the total number of peremptory challenges the Judge allotted each attorney to submit through the website in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Plaintiff Attorney successfully submits his/her first peremptory challenge, the name of the juror the Plaintiff Attorney selected to exclude with a peremptory challenge will appear next to the number one in the window labeled "Plaintiff Attorney's Submitted Peremptory Challenges" on the Plaintiff's screen. When the Plaintiff Attorney successfully submits his/her second peremptory challenge, the name of the juror the Plaintiff Attorney selected to exclude with a peremptory challenge immediately will appear next to the number two in the window labeled "Plaintiff Attorney's Submitted Peremptory Challenges" on the Plaintiffs screen. Thus, the name of each juror excluded with a Plaintiff Attorney's peremptory challenge through the website will appear next to the number that corresponds with the order the juror was excluded with a peremptory challenge through the website by the Plaintiff Attorney in the window labeled "Plaintiff Attorney's Submitted Peremptory Challenges" on the Plaintiff's screen. To the right of each juror's name on the list in the window labeled "Plaintiff Attorney's Submitted Peremptory Challenges" will appear the juror's respective picture, and to the right of the juror's respective picture will be the exact date and time the Plaintiff Attorney excluded the respective juror with a peremptory challenge and the total amount of time the Plaintiff Attorney took to exclude the juror with a peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Plaintiff Attorney submitted the peremptory challenge through the website.

Ultimately, the window labeled "Plaintiff Attorney's Submitted Peremptory Challenges" on the Plaintiff's screen allows the Plaintiff to monitor the Plaintiff Attorney's peremptory challenge exercises. Thus, the website instructs the Plaintiff that the Plaintiff Attorney has been instructed to continue submitting peremptory challenges in alternating fashion with the Defense Attorney until there is a name next to every designated number in the window labeled "Plaintiff Attorney's Submitted Peremptory Challenges."

Also, on the Plaintiff's screen, directly below the specified date and time for both attorneys to submit their peremptory challenges in an alternating fashion and to the right of the window containing the "Plaintiff Attorney's Submitted Peremptory Challenges" will appear a window on the right side of the screen. In the top of this said window will appear the label "Defense Attorney's Submitted Peremptory Challenges." Directly below this said label and within the said window will appear consecutive numbers from 1 to the total number of peremptory challenges the Judge allotted each attorney to exercise in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Defense Attorney successfully submits his/her first peremptory challenge, the name of the juror the Defense Attorney selected to exclude with a peremptory challenge immediately will appear next to the number one in the window labeled "Defense Attorney's Submitted Peremptory Challenges" on the Plaintiff's screen. When the Defense Attorney successfully submits his/her second peremptory challenge, the name of the juror the Defense Attorney selected to exclude with a peremptory challenge immediately will appear next to the number two in the window labeled "Defense Attorney's Submitted Peremptory Challenges" on the Plaintiff's screen. Thus, the name of each juror excluded with a Defense Attorney's peremptory challenge through the website will appear next to the number that corresponds with the order the juror was excluded with a peremptory challenge through the website by the Defense Attorney in the window labeled "Defense Attorney's Submitted Peremptory Challenges" on the Plaintiff's screen. To the right of each juror's name on the list in the window labeled "Defense Attorney's Submitted Peremptory Challenges" will appear the juror's respective picture, and to the right of the juror's respective picture will be the exact date and time the Defense Attorney excluded the respective juror with a peremptory challenge and the total amount of time the Defense Attorney took to exclude the juror with a peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Ultimately, the window labeled "Defense Attorney's Submitted Peremptory Challenges" on the Plaintiff's screen allows the Plaintiff to monitor the Defense Attorney's peremptory challenge exercises. Thus, the website instructs the Plaintiff that the Defense Attorney has been instructed through the website to continue submitting peremptory challenges in alternating fashion with the Plaintiff Attorney until there is a name next to every designated number in the window labeled "Defense Attorney's Submitted Peremptory Challenges."

Additionally, every time the Plaintiff Attorney successfully submits a peremptory challenge through the website, the juror's name excluded with the Plaintiff Attorney's peremptory challenge through the website will become highlighted in light red and a single strike through line will appear through the juror's name on the Plaintiff's screen. Likewise, every time the Defense Attorney successfully submits a peremptory challenge through the website, the juror's name excluded with the Defense Attorney's peremptory challenge through the website will become highlighted in light red and a single strike through line will appear through the juror's name on the Plaintiff's screen.

Also, on the Plaintiff's screen, directly below the window labeled "Plaintiff Attorney's Submitted Peremptory Challenges" and the window labeled "Defense Attorney's Submitted Peremptory Challenges," and directly above the window containing the jurors' interactive names and pictures is the time remaining for either the Plaintiff Attorney or the Defense Attorney to submit a peremptory challenge through the website depending on which attorney is taking their turn to exercise a peremptory challenge through the website. Thus, the amount of time the Judge allotted for each attorney to submit a peremptory challenge through the website in the Custom Setup of the Jury Selection Process will appear in the said area on the Plaintiff's screen. When the Plaintiff Attorney begins taking his/her turn to exercise a peremptory challenge through the website, the time the Judge allotted for each attorney to submit a peremptory challenge immediately will begin to count down so the Plaintiff can monitor how much time the Plaintiff Attorney has to submit a peremptory challenge through the website. Each time the Plaintiff Attorney submits a peremptory challenge through the website, the total number of minutes each attorney is allowed to submit a peremptory challenge reappears on the Plaintiff's screen indicating the total number of minutes the Defense Attorney is allowed to submit a peremptory challenge. Thus, when the Defense Attorney begins taking his/her turn to exercise a peremptory challenge through the website, the time the Judge allotted for each attorney to submit a peremptory challenge immediately will begin to count down so the Plaintiff can monitor how much time the Defense Attorney has to submit a peremptory challenge through the website. Each time the Defense Attorney submits a peremptory challenge through the website, the total number of minutes each attorney is allowed to submit a peremptory challenge reappears on the Plaintiff's screen indicating the total number of minutes the Plaintiff Attorney is allowed to submit a peremptory challenge. However, when the Plaintiff Attorney has submitted his/her final required peremptory challenge, and the Defense Attorney has submitted his/her final required peremptory challenge, the time allowed for each attorney to submit a peremptory challenge will show 0:00 on the Plaintiff's screen indicating that neither attorney will be allowed to submit another peremptory challenge. The Plaintiff is instructed that if either attorney does not submit a peremptory challenge through the website within the said time limit, there are no consequences.

On the Plaintiff's screen, in the bottom margin of the left side of the screen will appear a rectangular gray window that will state "Previous." By selecting "Previous," the Plaintiff is shown the previous screen where he/she may view the instructions to view each attorney's peremptory challenge exercises through the website.

On the Plaintiff's screen, in the bottom right corner of the screen will appear a rectangular light green window that will state which attorney is submitting a peremptory challenge. For example, each time it is the Plaintiff Attorney's turn to submit a peremptory challenge through the website, the said rectangular light green window on the Plaintiff's screen will state "The Plaintiff Attorney is now submitting a peremptory challenge." Likewise, each time it is the Defense Attorney's turn to submit a peremptory challenge through the website, the said rectangular light green window on the Plaintiff's screen will state "The Defense Attorney is now submitting a peremptory challenge."

After the Defense Attorney has submitted his/her last required peremptory challenge, the said light green window on the Plaintiff's screen will state the following: "Each attorney has successfully submitted all of their required peremptory challenges." Additionally, after the Defense Attorney has submitted his/her last required peremptory challenge through the website, a new light red window will then appear in the middle of the Plaintiff's screen that states as follows:

Both attorneys have successfully submitted all of their required peremptory challenges, and neither attorney is allowed to submit anymore peremptory challenges through the website. The alternating peremptory challenge process through the website is now complete. You may now log off the website, or you may review all of the peremptory challenge exercises or review the remaining juror pictures, videos, questionnaires, and confidential notes. Only if the Judge elected to allow attorneys to contest their counterpart's peremptory challenges based on unconstitutional race and/or gender discrimination through the website, both the Plaintiff Attorney and the Defense Attorney may now make such contests to their counterpart's peremptory challenges through the website.

Below this message will appear a button labeled "OK." By the Plaintiff clicking on the OK button, the said light red window with this message disappears. Once the said message disappears, the Plaintiff may review all of the peremptory challenge exercises or review the remaining juror pictures, videos, questionnaires, and confidential notes. Also, once the said message disappears, a window containing an interactive list of all of the remaining jurors who were not excluded with an attorney peremptory challenge will appear above the bottom margin of the Plaintiff's screen. Inside of the top of such window will appear the label "Jury Panel and Alternate Jurors." The Plaintiff may also log off of the website.

Every time the Plaintiff selects "View All Peremptory Challenge Exercises" from his/her respective Main Menu of Functions, the Plaintiff is instructed to review his/her analysis and number, questionnaire, and/or video of each juror as much as he/she desires before the specified date and time both attorneys are to submit their peremptory challenges through the website in an alternating fashion. Thus, when the Plaintiff logs into his/her respective program on the website and selects "View All Peremptory Challenge Exercises" from his/her respective Main Menu of Functions at any time before the specified date and time for attorneys to submit their peremptory challenges in an alternating fashion to review the said information on each juror, the Plaintiff is initially shown the above said large light green window on his/her screen. When the Plaintiff minimizes the above said light green message into the bottom margin of his/her screen, he/she is shown all of the above features that are detailed above. Thus, the Plaintiff is shown the following: 1) interactive names and interactive pictures of only the remaining jurors who were not excluded with a challenge for cause through the website, 2) the Plaintiff's own personal analysis and assigned number of each particular juror, 3) a scroll bar in the in the far right edge of the screen will appear to view all of the above stated features, 4) the current date and time will appear in the top margin of the screen, 5) the specified date and time for both attorneys to submit their peremptory challenges in an alternating fashion through the website will appear directly below the current date and time, 6) the window for the "Plaintiff Attorney's Submitted Peremptory Challenges," 7) the window for the "Defense Attorney's Submitted Peremptory Challenges," 8) the amount of time the Judge allotted for each attorney to submit a peremptory challenge through the website in the Custom Setup of the Jury Selection Process will appear, and 9) a button labeled "Previous" will appear in the bottom margin of the screen.

When the Defendant selects "View All Peremptory Challenge Exercises" from his/her respective Main Menu of Functions at the specified date and time set by the Judge for both attorneys to submit peremptory challenges in an alternating fashion, the Defendant is initially shown a large light green window on his/her screen that states as follows:

The Plaintiff Attorney and the Defense Attorney exercise peremptory challenges through this website by alternating back and forth with the Plaintiff Attorney submitting one peremptory challenge and then the Defense Attorney submitting a peremptory challenge until both attorneys have submitted all of their allotted peremptory challenges.

To begin the alternating peremptory challenge process, the Plaintiff Attorney must first submit a peremptory challenge. During this process of attorneys submitting their peremptory challenges in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge, the Plaintiff Attorney will not be allowed to submit a subsequent peremptory challenge until the Defense Attorney submits a peremptory challenge first. Likewise, after the Defense Attorney submits a peremptory challenge, the Defense Attorney will not be allowed to submit a subsequent peremptory challenge until the Plaintiff Attorney submits a peremptory challenge first. Thus, neither attorney will be allowed to submit more than one peremptory challenge through the website before his/her counterpart submits a peremptory challenge through the website.

Each attorney will be allowed (the number of minutes the Judge allotted each attorney to submit each peremptory challenge through the website in the Custom Setup of the Jury Selection Process appears here) minutes to submit each peremptory challenge. If an attorney does not submit a peremptory challenge within the designated time limit, he/she still is required to submit a peremptory challenge through the website regardless if the time limit expires. You will be allowed to view a countdown of the allotted number of minutes each attorney is allowed to submit a peremptory challenge through the website on your screen while you wait for each attorney to submit a peremptory challenge.

On the (the date and time the judge specified for attorneys to submit their peremptory challenges in an alternating fashion in the Setup of the Custom Jury Selection Process appears here), you will be allowed to view the name of each juror the Plaintiff Attorney excludes with a peremptory challenge on a list on your screen immediately after the Plaintiff Attorney submits each peremptory challenge through the website. Likewise, you will be allowed to view the name of each juror the Defense Attorney excludes with a peremptory challenge on a list on your screen immediately after the Defense Attorney submits each peremptory challenge.

You may stay logged into this website until both attorneys have submitted all of their peremptory challenges through the website in an alternating fashion.

The Plaintiff Attorney will not be allowed to begin the alternating peremptory challenge process with the Defense Attorney by submitting the first peremptory challenge until (the date and time the judge specified for attorneys to submit their peremptory challenges in an alternating fashion in the Setup of the Custom Jury Selection Process appears here).

Once you click the "OK" button on or after the specified time on the specified date, this message will disappear.

You may minimize this message into the bottom margin of your screen to allow you to review your notes, questionnaires, and/or videos of the jurors at any time before the specified date and time both attorneys are to submit their peremptory challenges through the website in an alternating fashion.

Below the above said message in the window will appear a button that says "OK." When the Defendant clicks the "OK" button on or after the specified time on the specified date, the large light green window with the above said message disappears to allow the Defendant to view each peremptory challenge submitted by the Plaintiff Attorney and the Defense Attorney through the website. Thus, the large light green window with the above said message will not disappear by clicking the "OK" button at any time before the specified time on the specified date. However, the Defendant will be allowed to minimize the above said light green message into the bottom margin of his/her screen to allow him/her to review his/her notes, questionnaires, and/or videos of the jurors at any time before the specified date and time both attorneys are to submit their peremptory challenges through the website in an alternating fashion. Thus, the Defendant is instructed to review his/her notes, questionnaires, and/or videos of the jurors as much as he/she desires before the specified date and time both attorneys are to submit their peremptory challenges through the website in an alternating fashion. The above said light green message will always appear on the Defendant's screen each time he/she selects "View All Peremptory Challenge Exercises" from his/her respective Main Menu of Functions in the website.

Once the above said message disappears or the Defendant minimizes the above said message into the bottom margin of his/her screen, the Defendant is shown, in the middle of the screen, the interactive names and interactive pictures of only the remaining jurors who were not excluded with a challenge for cause or excused by the Judge through the website. Thus, the website automatically excludes the juror names and videos of jurors who were excluded with a challenge for cause or excused by the Judge through the website from the "View All Peremptory Challenge Exercises" screen of the Defendant to make viewing peremptory challenge exercises through the website easier for the Defendant.

On the Defendant's screen, by clicking on any juror's interactive name or interactive picture, the juror's transcribed questionnaire with all its features detailed above will appear on the right of the screen and the juror's video recording and all viewing and listening options will appear on the left side of the screen as detailed above. Also, on the Defendant's screen, directly below each juror's interactive name and interactive picture, will appear the Defendant's analysis of the particular juror if the Defendant submitted an analysis of each juror to the Defense Attorney through the website. To the immediate left of the Defendant's analysis will appear the number between 1-10 that the Defendant assigned to the respective juror to express the strength of the Defendant's desire to exclude the juror. The higher the number the stronger the desire of the Defendant to exclude the juror with a peremptory challenge.

Also, on the Defendant's screen, the interactive juror names and pictures are placed in order based on the Defendant's assigned number between 1 and 10. For example, all jurors assigned the number 10 will appear first on the list. If more than one juror is assigned the same number, all jurors with the same number are placed in alphabetical order. All jurors assigned the number 9 will appear after the last juror in alphabetical order assigned the number 10 etc.

Also, on the Defendant's screen, in the far right edge of the screen will appear a scroll bar which will allow the Defendant to view, on the same screen, each of the remaining juror interactive names and interactive pictures and their respective Defendant's analysis and assigned number.

Also, on the Defendant's screen, in the top margin of the screen will appear the current date and time. Directly below the current date and time will appear the specified date and time for both attorneys to submit their peremptory challenges in an alternating fashion through the website as set by the Judge in the Custom Setup of the Jury Selection Process.

On the Defendant's screen, directly below the specified date and time for both attorneys to submit their peremptory challenges in an alternating fashion will appear a window on the left side of the screen. In the top of this said window will appear the label "Plaintiff Attorney's Submitted Peremptory Challenges." Directly below this said label and within the said window will appear consecutive numbers from 1 to the total number of peremptory challenges the Judge allotted each attorney to submit through the website in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Plaintiff Attorney successfully submits his/her first peremptory challenge, the name of the juror the Plaintiff Attorney selected to exclude with a peremptory challenge will appear next to the number one in the window labeled "Plaintiff Attorney's Submitted Peremptory Challenges" on the Defendant's screen. When the Plaintiff Attorney successfully submits his/her second peremptory challenge, the name of the juror the Plaintiff Attorney selected to exclude with a peremptory challenge immediately will appear next to the number two in the window labeled "Plaintiff Attorney's Submitted Peremptory Challenges" on the Defendant's screen. Thus, the name of each juror excluded with a Plaintiff Attorney's peremptory challenge through the website will appear next to the number that corresponds with the order the juror was excluded with a peremptory challenge through the website by the Plaintiff Attorney in the window labeled "Plaintiff Attorney's Submitted Peremptory Challenges" on the Defendant's screen. To the right of each juror's name on the list in the window labeled "Plaintiff Attorney's Submitted Peremptory Challenges" will appear the juror's respective picture, and to the right of the juror's respective picture will be the exact date and time the Plaintiff Attorney excluded the respective juror with a peremptory challenge and the total amount of time the Plaintiff Attorney took to exclude the juror with a peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Plaintiff Attorney submitted the peremptory challenge through the website.

Ultimately, the window labeled "Plaintiff Attorney's Submitted Peremptory Challenges" on the Defendant's screen allows the Defendant to monitor the Plaintiff Attorney's peremptory challenge exercises. Thus, the website instructs the Defendant that the Plaintiff Attorney has been instructed to continue submitting peremptory challenges in alternating fashion with the Defense Attorney until there is a name next to every designated number in the window labeled "Plaintiff Attorney's Submitted Peremptory Challenges."

Also, on the Defendant's screen, directly below the specified date and time for both attorneys to submit their peremptory challenges in an alternating fashion and to the right of the window containing the "Plaintiff Attorney's Submitted Peremptory Challenges" will appear a window on the right side of the screen. In the top of this said window will appear the label "Defense Attorney's Submitted Peremptory Challenges." Directly below this said label and within the said window will appear consecutive numbers from 1 to the total number of peremptory challenges the Judge allotted each attorney to exercise in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Defense Attorney successfully submits his/her first peremptory challenge, the name of the juror the Defense Attorney selected to exclude with a peremptory challenge immediately will appear next to the number one in the window labeled "Defense Attorney's Submitted Peremptory Challenges" on the Defendant's screen. When the Defense Attorney successfully submits his/her second peremptory challenge, the name of the juror the Defense Attorney selected to exclude with a peremptory challenge immediately will appear next to the number two in the window labeled "Defense Attorney's Submitted Peremptory Challenges" on the Defendant's screen. Thus, the name of each juror excluded with a Defense Attorney's peremptory challenge through the website will appear next to the number that corresponds with the order the juror was excluded with a peremptory challenge through the website by the Defense Attorney in the window labeled "Defense Attorney's Submitted Peremptory Challenges" on the Defendant's screen. To the right of each juror's name on the list in the window labeled "Defense Attorney's Submitted Peremptory Challenges" will appear the juror's respective picture, and to the right of the juror's respective picture will be the exact date and time the Defense Attorney excluded the respective juror with a peremptory challenge and the total amount of time the Defense Attorney took to exclude the juror with a peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Ultimately, the window labeled "Defense Attorney's Submitted Peremptory Challenges" on the Defendant's screen allows the Defendant to monitor the Defense Attorney's peremptory challenge exercises. Thus, the website instructs the Defendant that the Defense Attorney has been instructed through the website to continue submitting peremptory challenges in alternating fashion with the Plaintiff Attorney until there is a name next to every designated number in the window labeled "Defense Attorney's Submitted Peremptory Challenges."

Additionally, every time the Plaintiff Attorney successfully submits a peremptory challenge through the website, the juror's name excluded with the Plaintiff Attorney's peremptory challenge through the website will become highlighted in light red and a single strike through line will appear through the juror's name on the Defendant's screen. Likewise, every time the Defense Attorney successfully submits a peremptory challenge through the website, the juror's name excluded with the Defense Attorney's peremptory challenge through the website will become highlighted in light red and a single strike through line will appear through the juror's name on the Defendant's screen.

Also, on the Defendant's screen, directly below the window labeled "Plaintiff Attorney's Submitted Peremptory Challenges" and the window labeled "Defense Attorney's Submitted Peremptory Challenges," and directly above the window containing the jurors' interactive names and pictures is the time remaining for either the Plaintiff Attorney or the Defense Attorney to submit a peremptory challenge through the website depending on which attorney is taking their turn to exercise a peremptory challenge through the website. Thus, the amount of time the Judge allotted for each attorney to submit a peremptory challenge through the website in the Custom Setup of the Jury Selection Process will appear in the said area on the Defendant's screen. When the Plaintiff Attorney begins taking his/her turn to exercise a peremptory challenge through the website, the time the Judge allotted for each attorney to submit a peremptory challenge immediately will begin to count down so the Defendant can monitor how much time the Plaintiff Attorney has to submit a peremptory challenge through the website. Each time the Plaintiff Attorney submits a peremptory challenge through the website, the total number of minutes each attorney is allowed to submit a peremptory challenge reappears on the Defendant's screen indicating the total number of minutes the Defense Attorney is allowed to submit a peremptory challenge. Thus, when the Defense Attorney begins taking his/her turn to exercise a peremptory challenge through the website, the time the Judge allotted for each attorney to submit a peremptory challenge immediately will begin to count down so the Defendant can monitor how much time the Defense Attorney has to submit a peremptory challenge through the website. Each time the Defense Attorney submits a peremptory challenge through the website, the total number of minutes each attorney is allowed to submit a peremptory challenge reappears on the Defendant's screen indicating the total number of minutes the Plaintiff Attorney is allowed to submit a peremptory challenge. However, when the Plaintiff Attorney has submitted his/her final required peremptory challenge, and the Defense Attorney has submitted his/her final required peremptory challenge, the time allowed for each attorney to submit a peremptory challenge will show 0:00 on the Defendant's screen indicating that neither attorney will be allowed to submit another peremptory challenge. The Defendant is instructed that if either attorney does not submit a peremptory challenge through the website within the said time limit, there are no consequences.

On the Defendant's screen, in the bottom margin of the left side of the screen will appear a rectangular gray window that will state "Previous." By selecting "Previous," the Defendant is shown the previous screen where he/she may view the instructions to view each attorney's peremptory challenge exercises through the website.

On the Defendant's screen, in the bottom right corner of the screen will appear a rectangular light green window that will state which attorney is submitting a peremptory challenge. For example, each time it is the Plaintiff Attorney's turn to submit a peremptory challenge through the website, the said rectangular light green window on the Defendant's screen will state "The Plaintiff Attorney is now submitting a peremptory challenge." Likewise, each time it is the Defense Attorney's turn to submit a peremptory challenge through the website, the said rectangular light green window on the Defendant's screen will state "The Defense Attorney is now submitting a peremptory challenge."

After the Defense Attorney has submitted his/her last required peremptory challenge, the said light green window on the Defendant's screen will state the following: "Each attorney has successfully submitted all of their required peremptory challenges."

Additionally, after the Defense Attorney has submitted his/her last required peremptory challenge through the website, a new light red window will then appear in the middle of the Defendant's screen that states as follows:

Both attorneys have successfully submitted all of their required peremptory challenges, and neither attorney is allowed to submit anymore peremptory challenges through the website. The alternating peremptory challenge process through the website is now complete. You may now log off the website, or you may review all of the peremptory challenge exercises or review the remaining juror pictures, videos, questionnaires, and confidential notes. Only if the Judge elected to allow attorneys to contest their counterpart's peremptory challenges based on unconstitutional race and/or gender discrimination through the website, both the Plaintiff Attorney and the Defense Attorney may now make such contests to their counterpart's peremptory challenges through the website.

Below this message will appear a button labeled "OK." By the Defendant clicking on the OK button, the said light red window with this message disappears. Once the said message disappears, the Defendant may review all of the peremptory challenge exercises or review the remaining juror pictures, videos, questionnaires, and confidential notes. Also, once the said message disappears, a window containing an interactive list of all of the remaining jurors who were not excluded with an attorney peremptory challenge will appear above the bottom margin of the Defendant's screen. Inside of the top of such window will appear the label "Jury Panel and Alternate Jurors." The Defendant may also log off of the website.

Every time the Defendant selects "View All Peremptory Challenge Exercises" from his/her respective Main Menu of Functions, the Defendant is instructed to review his/her analysis and number, questionnaire, and/or video of each juror as much as he/she desires before the specified date and time both attorneys are to submit their peremptory challenges through the website in an alternating fashion. Thus, when the Defendant logs into his/her respective program on the website and selects "View All Peremptory Challenge Exercises" from his/her respective Main Menu of Functions at any time before the specified date and time for attorneys to submit their peremptory challenges in an alternating fashion to review the said information on each juror, the Defendant is initially shown the above said large light green window on his/her screen. When the Defendant minimizes the above said light green message into the bottom margin of his/her screen, he/she is shown all of the above features that are detailed above. Thus, the Defendant is shown the following: 1) interactive names and interactive pictures of only the remaining jurors who were not excluded with a challenge for cause through the website, 2) the Defendant's own personal analysis and assigned number of each particular juror, 3) a scroll bar in the in the far right edge of the screen will appear to view all of the above stated features, 4) the current date and time will appear in the top margin of the screen, 5) the specified date and time for both attorneys to submit their peremptory challenges in an alternating fashion through the website will appear directly below the current date and time, 6) the window for the "Plaintiff Attorney's Submitted Peremptory Challenges," 7) the window for the "Defense Attorney's Submitted Peremptory Challenges," 8) the amount of time the Judge allotted for each attorney to submit a peremptory challenge through the website in the Custom Setup of the Jury Selection Process will appear, and 9) a button labeled "Previous" will appear in the bottom margin of the screen.

If the Judge elected to allow attorneys to exercise challenges for cause through the website and elected to allow attorneys to exercise peremptory challenges through the website in the Custom Setup of the Jury Selection Process, and if the judge submits rulings on the attorneys' challenges for cause through the website, and if the judge excused any additional jurors, and if the judge elected to allow the attorneys to submit peremptory challenges in an alternating fashion through the website on a specified date and time, the Judge may log into his/her respective program on the website on the same specified date and time set by the judge in the Custom Setup of the Jury Selection Process for both attorneys to submit their peremptory challenges through the website in an alternating fashion, and he/she may view the Plaintiff Attorney's and the Defense Attorney's submitted peremptory challenges through the website. Thus, the Judge may view the peremptory challenges submitted by both attorneys at the same time both attorneys submit their peremptory challenges through the website.

When the Judge logs into his/her respective program on the website on the same specified date and time that both attorneys are scheduled to submit their peremptory challenges in an alternating fashion to view the submitted peremptory challenges of both attorneys who submit their peremptory challenges in an alternating fashion, he/she selects "View All Peremptory Challenge Exercises" from his/her respective Main Menu of Functions. When the Judge selects "View All Peremptory Challenge Exercises" from his/her respective Main Menu of Functions at the specified date and time set by the Judge for both attorneys to submit peremptory challenges in an alternating fashion, the Judge is initially shown a large light green window on his/her screen that states as follows:

The Plaintiff Attorney and the Defense Attorney exercise peremptory challenges through this website by alternating back and forth with the Plaintiff Attorney submitting one peremptory challenge and then the Defense Attorney submitting a peremptory challenge until both attorneys have submitted all of their allotted peremptory challenges.

To begin the alternating peremptory challenge process, the Plaintiff Attorney must first submit a peremptory challenge. During this process of attorneys submitting their peremptory challenges in an alternating fashion, the Defense Attorney will not be allowed to submit a peremptory challenge through the website until the Plaintiff Attorney submits his/her first peremptory challenge through the website. Once the Plaintiff Attorney submits his/her first peremptory challenge, the Plaintiff Attorney will not be allowed to submit a subsequent peremptory challenge until the Defense Attorney submits a peremptory challenge first. Likewise, after the Defense Attorney submits a peremptory challenge, the Defense Attorney will not be allowed to submit a subsequent peremptory challenge until the Plaintiff Attorney submits a peremptory challenge first. Thus, neither attorney will be allowed to submit more than one peremptory challenge through the website before his/her counterpart submits a peremptory challenge through the website.

Each attorney will be allowed (the number of minutes the Judge allotted each attorney to submit each peremptory challenge through the website in the Custom Setup of the Jury Selection Process appears here) minutes to submit each peremptory challenge. If an attorney does not submit a peremptory challenge within the designated time limit, he/she still is required to submit a peremptory challenge through the website regardless if the time limit expires. You will be allowed to view a countdown of the allotted number of minutes each attorney is allowed to submit a peremptory challenge through the website on your screen while you wait for each attorney to submit a peremptory challenge.

On the (the date and time the judge specified for attorneys to submit their peremptory challenges in an alternating fashion in the Setup of the Custom Jury Selection Process appears here), you will be allowed to view the name of each juror the Plaintiff Attorney excludes with a peremptory challenge on a list on your screen immediately after the Plaintiff Attorney submits each peremptory challenge through the website. Likewise, you will be allowed to view the name of each juror the Defense Attorney excludes with a peremptory challenge on a list on your screen immediately after the Defense Attorney submits each peremptory challenge.

You may stay logged into this website until both attorneys have submitted all of their peremptory challenges through the website in an alternating fashion.

The Plaintiff Attorney will not be allowed to begin the alternating peremptory challenge process with the Defense Attorney by submitting the first peremptory challenge until (the date and time the judge specified for attorneys to submit their peremptory challenges in an alternating fashion in the Setup of the Custom Jury Selection Process appears here).

Once you click the "OK" button on or after the specified time on the specified date, this message will disappear.

You may minimize this message into the bottom margin of your screen to allow you to review the questionnaires, and/or videos of the jurors at any time before the specified date and time both attorneys are to submit their peremptory challenges through the website in an alternating fashion.

Below the above said message in the window will appear a button that says "OK." When the Judge clicks the "OK" button on or after the specified time on the specified date, the large light green window with the above said message disappears to allow the Judge to view each peremptory challenge submitted by the Plaintiff Attorney and the Defense Attorney through the website. Thus, the large light green window with the above said message will not disappear by clicking the "OK" button at any time before the specified time on the specified date. However, the Judge will be allowed to minimize the above said light green message into the bottom margin of his/her screen to allow him/her to review the questionnaires, and/or videos of the jurors at any time before the specified date and time both attorneys are to submit their peremptory challenges through the website in an alternating fashion. Thus, the Judge is advised that he/she may review the questionnaires, and/or videos of the jurors as much as he/she desires before the specified date and time both attorneys are to submit their peremptory challenges through the website in an alternating fashion. The above said light green message will always appear on the Judge's screen each time he/she selects "View All Peremptory Challenge Exercises" from his/her respective Main Menu of Functions in the website.

Once the above said message disappears or the Judge minimizes the above said message into the bottom margin of his/her screen, the Judge is shown, in the middle of the screen, the interactive names and interactive pictures of only the remaining jurors who were not excluded with a challenge for cause or excused by the Judge through the website. Thus, the website automatically excludes the juror names and videos of jurors who were excluded with a challenge for cause through the website from the "View All Peremptory Challenge Exercises" screen of the Judge to make viewing peremptory challenge exercises through the website easier for the Judge. Also, on the Judge's screen, the interactive juror names are placed in alphabetical order.

On the Judge's screen, by clicking on any juror's interactive name or interactive picture, the juror's transcribed questionnaire will appear on the right of the screen and the juror's video recording and all viewing and listening options will appear on the left side of the screen as detailed above. Also, on the Judge's screen, in the far right edge of the screen will appear a scroll bar which will allow the Judge to view, on the same screen, each of the remaining juror interactive names and interactive pictures.

Also, on the Judge's screen, in the top margin of the screen will appear the current date and time. Directly below the current date and time will appear the specified date and time for both attorneys to submit their peremptory challenges in an alternating fashion through the website as set by the Judge in the Custom Setup of the Jury Selection Process.

On the Judge's screen, directly below the specified date and time for both attorneys to submit their peremptory challenges in an alternating fashion will appear a window on the left side of the screen. In the top of this said window will appear the label "Plaintiff Attorney's Submitted Peremptory Challenges." Directly below this said label and within the said window will appear consecutive numbers from 1 to the total number of peremptory challenges the Judge allotted each attorney to submit through the website in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Plaintiff Attorney successfully submits his/her first peremptory challenge, the name of the juror the Plaintiff Attorney selected to exclude with a peremptory challenge will appear next to the number one in the window labeled "Plaintiff Attorney's Submitted Peremptory Challenges" on the Judge's screen. When the Plaintiff Attorney successfully submits his/her second peremptory challenge, the name of the juror the Plaintiff Attorney selected to exclude with a peremptory challenge immediately will appear next to the number two in the window labeled "Plaintiff Attorney's Submitted Peremptory Challenges" on the Judge's screen. Thus, the name of each juror excluded with a Plaintiff Attorney's peremptory challenge through the website will appear next to the number that corresponds with the order the juror was excluded with a peremptory challenge through the website by the Plaintiff Attorney in the window labeled "Plaintiff Attorney's Submitted Peremptory Challenges" on the Judge's screen. To the right of each juror's name on the list in the window labeled "Plaintiff Attorney's Submitted Peremptory Challenges" will appear the juror's respective picture, and to the right of the juror's respective picture will be the exact date and time the Plaintiff Attorney excluded the respective juror with a peremptory challenge and the total amount of time the Plaintiff Attorney took to exclude the juror with a peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Plaintiff Attorney submitted the peremptory challenge through the website.

Ultimately, the window labeled "Plaintiff Attorney's Submitted Peremptory Challenges" on the Judge's screen allows the Judge to monitor the Plaintiff Attorney's peremptory challenge exercises. Thus, the website advises the Judge that the Plaintiff Attorney has been instructed to continue submitting peremptory challenges in alternating fashion with the Defense Attorney until there is a name next to every designated number in the window labeled "Plaintiff Attorney's Submitted Peremptory Challenges."

Also, on the Judge's screen, directly below the specified date and time for both attorneys to submit their peremptory challenges in an alternating fashion and to the right of the window containing the "Plaintiff Attorney's Submitted Peremptory Challenges" will appear a window on the right side of the screen. In the top of this said window will appear the label "Defense Attorney's Submitted Peremptory Challenges." Directly below this said label and within the said window will appear consecutive numbers from 1 to the total number of peremptory challenges the Judge allotted each attorney to exercise in the Custom Setup of the Jury Selection Process. For example, if the Judge allowed each attorney to exercise 12 peremptory challenges through the website in the Custom Setup of the Jury Selection Process, the inside of the window will contain consecutive numbers from 1 to 12. When the Defense Attorney successfully submits his/her first peremptory challenge, the name of the juror the Defense Attorney selected to exclude with a peremptory challenge immediately will appear next to the number one in the window labeled "Defense Attorney's Submitted Peremptory Challenges" on the Judge's screen. When the Defense Attorney successfully submits his/her second peremptory challenge, the name of the juror the Defense Attorney selected to exclude with a peremptory challenge immediately will appear next to the number two in the window labeled "Defense Attorney's Submitted Peremptory Challenges" on the Judge's screen. Thus, the name of each juror excluded with a Defense Attorney's peremptory challenge through the website will appear next to the number that corresponds with the order the juror was excluded with a peremptory challenge through the website by the Defense Attorney in the window labeled "Defense Attorney's Submitted Peremptory Challenges" on the Judge's screen. To the right of each juror's name on the list in the window labeled "Defense Attorney's Submitted Peremptory Challenges" will appear the juror's respective picture, and to the right of the juror's respective picture will be the exact date and time the Defense Attorney excluded the respective juror with a peremptory challenge and the total amount of time the Defense Attorney took to exclude the juror with a peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Ultimately, the window labeled "Defense Attorney's Submitted Peremptory Challenges" on the Judge's screen allows the Judge to monitor the Defense Attorney's peremptory challenge exercises. Thus, the website instructs the Judge that the Defense Attorney has been instructed through the website to continue submitting peremptory challenges in alternating fashion with the Plaintiff Attorney until there is a name next to every designated number in the window labeled "Defense Attorney's Submitted Peremptory Challenges."

Additionally, every time the Plaintiff Attorney successfully submits a peremptory challenge through the website, the juror's name excluded with the Plaintiff Attorney's peremptory challenge through the website will become highlighted in light red and a single strike through line will appear through the juror's name on the Judge's screen. Likewise, every time the Defense Attorney successfully submits a peremptory challenge through the website, the juror's name excluded with the Defense Attorney's peremptory challenge through the website will become highlighted in light red and a single strike through line will appear through the juror's name on the Judge's screen.

Also, on the Judge's screen, directly below the window labeled "Plaintiff Attorney's Submitted Peremptory Challenges" and the window labeled "Defense Attorney's Submitted Peremptory Challenges," and directly above the window containing the jurors' interactive names and pictures is the time remaining for either the Plaintiff Attorney or the Defense Attorney to submit a peremptory challenge through the website depending on which attorney is taking their turn to exercise a peremptory challenge through the website. Thus, the amount of time the Judge allotted for each attorney to submit a peremptory challenge through the website in the Custom Setup of the Jury Selection Process will appear in the said area on the Judge's screen. When the Plaintiff Attorney begins taking his/her turn to exercise a peremptory challenge through the website, the time the Judge allotted for each attorney to submit a peremptory challenge immediately will begin to count down so the Judge can monitor how much time the Plaintiff Attorney has to submit a peremptory challenge through the website. Each time the Plaintiff Attorney submits a peremptory challenge through the website, the total number of minutes each attorney is allowed to submit a peremptory challenge reappears on the Judge's screen indicating the total number of minutes the Defense Attorney is allowed to submit a peremptory challenge. Thus, when the Defense Attorney begins taking his/her turn to exercise a peremptory challenge through the website, the time the Judge allotted for each attorney to submit a peremptory challenge immediately will begin to count down so the Judge can monitor how much time the Defense Attorney has to submit a peremptory challenge through the website. Each time the Defense Attorney submits a peremptory challenge through the website, the total number of minutes each attorney is allowed to submit a peremptory challenge reappears on the Judge's screen indicating the total number of minutes the Plaintiff Attorney is allowed to submit a peremptory challenge. However, when the Plaintiff Attorney has submitted his/her final required peremptory challenge, and the Defense Attorney has submitted his/her final required peremptory challenge, the time allowed for each attorney to submit a peremptory challenge will show 0:00 on the Judge's screen indicating that neither attorney will be allowed to submit another peremptory challenge. The Judge is instructed that if either attorney does not submit a peremptory challenge through the website within the said time limit, there are no consequences.

On the Judge's screen, in the bottom margin of the left side of the screen will appear a rectangular gray window that will state "Previous." By selecting "Previous," the Judge is shown the previous screen where he/she may view the instructions to view each attorney's peremptory challenge exercises through the website.

On the Judge's screen, in the bottom right corner of the screen will appear a rectangular light green window that will state which attorney is submitting a peremptory challenge. For example, each time the Plaintiff Attorney takes his/her turn to submit a peremptory challenge through the website, the said rectangular light green window on the Judge's screen will state "The Plaintiff Attorney is now submitting a peremptory challenge." Likewise, each time the Defense Attorney takes his/her turn to submit a peremptory challenge through the website, the said rectangular light green window on the Judge's screen will state "The Defense Attorney is now submitting a peremptory challenge."

After the Defense Attorney has submitted his/her last required peremptory challenge through the website, the said light green window on the Judge's screen will state the following: "Each attorney has successfully submitted all of their required peremptory challenges."

Additionally, after the Defense Attorney has submitted his/her last required peremptory challenge through the website, a new light red window will then appear in the middle of the Judge's screen that states as follows:

Both attorneys have successfully submitted all of their required peremptory challenges, and neither attorney is allowed to submit anymore peremptory challenges through the website. The alternating peremptory challenge process through the website is now complete. You may now log off the website, or you may review all of the peremptory challenge exercises or review the remaining juror pictures, videos, and questionnaires. Only if the Judge elected to allow attorneys to contest their counterpart's peremptory challenges based on unconstitutional race and/or gender discrimination through the website, both the Plaintiff Attorney and the Defense Attorney may now make such contests to their counterpart's peremptory challenges through the website.

Below this message will appear a button labeled "OK." By the Judge clicking on the OK button, the said light red window with this message disappears. Once the said message disappears, the Judge may review all of the peremptory challenge exercises or review the remaining juror pictures, videos, and questionnaires. Also, once the said message disappears, a window containing an interactive list of all of the remaining jurors who were not excluded with an attorney peremptory challenge will appear above the bottom margin of the Judge's screen. Inside of the top of such window will appear the label "Jury Panel and Alternate Jurors." The Judge may also log off of the website.

Every time the Judge selects "View All Peremptory Challenge Exercises" from his/her respective Main Menu of Functions, the Judge is advised that he/she may review the questionnaires and/or videos of the jurors as much as he/she desires before the specified date and time both attorneys are to submit their peremptory challenges through the website in an alternating fashion. Thus, when the Judge logs into his/her respective program on the website and selects "View All Peremptory Challenge Exercises" from his/her respective Main Menu of Functions at any time before the specified date and time for attorneys to submit their peremptory challenges in an alternating fashion to review the said information on each juror, the Judge is initially shown the above said large light green window on his/her screen. When the Judge minimizes the above said light green message into the bottom margin of his/her screen, he/she is shown all of the above features that are detailed above. Thus, the Judge is shown the following: 1) interactive names and interactive pictures of only the remaining jurors who were not excluded with a challenge for cause through the website, 2) a scroll bar in the in the far right edge of the screen will appear to view all of the above stated features, 3) the current date and time will appear in the top margin of the screen, 4) the specified date and time for both attorneys to submit their peremptory challenges in an alternating fashion through the website will appear directly below the current date and time, 5) the window for the "Plaintiff Attorney's Submitted Peremptory Challenges," 6) the window for the "Defense Attorney's Submitted Peremptory Challenges," 7) the amount of time the Judge allotted for each attorney to submit a peremptory challenge through the website in the Custom Setup of the Jury Selection Process will appear, and 8) a button labeled "Previous" will appear in the bottom margin of the screen.

If the Judge elected to allow attorneys to exercise challenges for cause through the website in the Custom Setup of the Jury Selection Process, and if the judge submits rulings on the attorneys' challenges for cause through the website, the Court Administrator may log onto the website into his/her own respective program and view a list of all jurors who have been stricken with a challenge for cause and were excused by the Judge, and he/she is instructed through the website that he/she must submit a letter or call each juror informing him/her that he/she will not need to appear in court for jury duty on the respective case. Also, included with each juror's name that had been excluded with a challenge for cause is the juror's address so the court administrator can conveniently send them notices that they are no longer needed for jury duty on this case.

If the Judge elected to allow attorneys to exercise challenges for cause through the website and elected to allow attorneys to exercise peremptory challenges in an alternating fashion through the website on a specified date and time, and if the Plaintiff Attorney and the Defense Attorney submit their peremptory challenges in an alternating fashion through the website on a specified date and time, the Court Reporter is then sent an email message that he/she must print through the website the juror names that were excluded with the Plaintiff Attorney's and the Defense Attorney's peremptory challenges and the date such peremptory challenges were submitted and print the names of the remaining jurors and the names of the remaining alternate jurors and place the copies in the Court's file for transcript purposes. Also, the Court Reporter is sent an email message instructing him/her to log onto the invention's website and print all email messages to the Judge, the Plaintiff Attorney, the Defense Attorney, the Defendant, and the Plaintiff, if the case is civil, and the dates such emails were submitted through the website. The email message to the Court Reporter contains an interactive link to the main website so the Court Reporter can instantaneously log onto the website.

If the Judge elected to allow attorneys to exercise challenges for cause through the website and elected to allow attorneys to exercise peremptory challenges in an alternating fashion through the website on a specified date and time and elected to allow the attorneys to contest their counterpart's peremptory challenges through the website in the Custom Setup of the Jury Selection Process, and if the Plaintiff Attorney and the Defense Attorney submit their peremptory challenges in an alternating fashion through the website on a specified date and time, the Plaintiff Attorney is sent an email message that he/she may now log onto the website and view the Defense Attorney's peremptory challenges and contest or object to any of the Defense Attorney's peremptory challenges based on unconstitutional racial and/or gender discrimination by submitting a prima facie case of racial and/or gender discrimination through the website. The email message contains an interactive link to the invention's website and includes the current date and the deadline for the Plaintiff Attorney to submit his/her prima facie case of discrimination against any of the Defense Attorney's peremptory challenges. This same email message sent to the Plaintiff Attorney will also be sent to the Judge, the Plaintiff, the Defense Attorney, and the Defendant.

Likewise, if the Judge elected to allow attorneys to exercise challenges for cause through the website and elected to allow attorneys to exercise peremptory challenges in an alternating fashion through the website on a specified date and time and elected to allow the attorneys to contest their counterpart's peremptory challenges through the website in the Custom Setup of the Jury Selection Process, and if the Plaintiff Attorney and the Defense Attorney submit their peremptory challenges in an alternating fashion through the website on a specified date and time, the Defense Attorney is sent an email message that he/she may now log onto the website and view the Plaintiff Attorney's peremptory challenges and contest or object to any of the Plaintiff Attorney's peremptory challenges based on unconstitutional racial and/or gender discrimination by submitting a prima facie case of racial and/or gender discrimination through the website. The email message contains an interactive link to the invention's website and includes the current date and the deadline for the Defense Attorney to submit his/her prima facie case of discrimination against any of the Plaintiff Attorney's peremptory challenges. This same email message sent to the Defense Attorney will also be sent to the Judge, the Plaintiff, the Plaintiff Attorney, and the Defendant.

If the Judge elected to allow attorneys to exercise challenges for cause through the website and elected to allow attorneys to exercise peremptory challenges in an alternating fashion through the website on a specified date and time, and if the Plaintiff Attorney and the Defense Attorney submit their peremptory challenges in an alternating fashion through the website on a specified date and time, the Judge, the Plaintiff Attorney, the Defense Attorney, the Plaintiff, and the Defendant are all sent email messages that they may now review the Plaintiff Attorney's and the Defense Attorney's peremptory challenges submitted through the website and review the interactive names and pictures of the remaining jurors and alternate jurors. The email message contains an interactive link to the invention's website.

If the Judge elected to allow attorneys to exercise challenges for cause through the website and elected to allow attorneys to exercise peremptory challenges in an alternating fashion through the website on a specified date and time, and if the Judge did not elect to allow the attorneys to contest their counterpart's peremptory challenges through the website in the Custom Setup of the Jury Selection Process, and if the Plaintiff Attorney and the Defense Attorney submit their peremptory challenges in an alternating fashion through the website on a specified date and time, the Judge, the Plaintiff Attorney, the Defense Attorney, the Plaintiff, and the Defendant will all be sent an email message informing them that the Plaintiff Attorney and/or the Defense Attorney will need to set a hearing date with the Judge to make objections and/or discrimination contests to their counterpart's peremptory challenges and for the Judge to issue final rulings on peremptory challenges.

Additionally, if the Judge elected to allow attorneys to exercise challenges for cause through the website and elected to allow attorneys to exercise peremptory challenges in an alternating fashion through the website on a specified date and time, and if the Plaintiff Attorney and the Defense Attorney submit their peremptory challenges in an alternating fashion through the website on a specified date and time, the Judge, Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause through the website and elected to allow attorneys to exercise peremptory challenges in an alternating fashion on a specified date and time through the website in the Custom Setup of the Jury Selection Process, and if the Plaintiff Attorney and the Defense Attorney submit their peremptory challenges in an alternating fashion through the website on a specified date and time, the Court Reporter logs onto the website and prints the names of the jurors excluded by the Plaintiff Attorney's and the Defense Attorney's peremptory challenges submitted through the website and prints the names of the remaining jurors and alternate jurors and places them in the Court's file for transcript purposes. The specified date and time the attorneys were required to exercise their peremptory challenges in an alternating fashion through the website will appear in the top left margin of the print. Next to the specific date and time the attorneys were required to exercise their peremptory challenges in an alternating fashion through the website will appear the total amount of time each attorney was allotted to submit each peremptory challenge through the website.

Also in the print, the names of the jurors excluded with a Plaintiff Attorney's peremptory challenge will appear in a separate list under a heading entitled "Plaintiff Attorney's Submitted Peremptory Challenges." The names of such jurors will appear in the order they were excluded with a peremptory challenge on the list. Also the picture of each juror excluded with a Plaintiff Attorney's peremptory challenge will appear to the right of the respective juror's name on the list. To the right of each juror's respective picture on the list will appear the exact date and time the Plaintiff Attorney exercised a peremptory challenge on the respective juror and the total number of minutes the Plaintiff Attorney took to submit a peremptory challenge through the website on the respective juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Defense Attorney submitted the peremptory challenge through the website.

Also in the print, the names of the jurors excluded with a Defense Attorney's peremptory challenge will appear in a separate list under a heading entitled "Defense Attorney's Submitted Peremptory Challenges." The names of such jurors will appear in the order they were excluded with a peremptory challenge on the list. Also the picture of each juror excluded with a Defense Attorney's peremptory challenge will appear to the right of the respective juror's name on the list. To the right of each juror's respective picture on the list will appear the exact date and time the Defense Attorney exercised a peremptory challenge on the respective juror and the total number of minutes the Defense Attorney took to submit a peremptory challenge through the website on the respective juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Also in the print, the names and respective pictures of the remaining jurors and alternate jurors will appear in a separate list under a heading entitled "Jury Panel and Alternate Jurors."

Also, the Court Reporter prints all email messages sent to the Judge, the Plaintiff Attorney, the Defense Attorney, the Defendant, the Plaintiff, if the case is civil and the dates such emails were submitted to them through the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney and the Defense Attorney submit their peremptory challenges in an alternating fashion through the website on the specified date and time, the Plaintiff Attorney may log onto the website and contest the Defense Attorney's peremptory challenges through the website. To submit such a contest, the Plaintiff Attorney would select Contest Defense Attorney's Peremptory Challenges in his/her Main Menu of Functions in his/her respective program after the Plaintiff Attorney and the Defense Attorney submit their peremptory challenges in an alternating fashion through the website on a specified date and time. Upon making such a selection, the Plaintiff Attorney is shown a large window containing the interactive name and interactive picture of each juror the Defense Attorney excluded with a peremptory challenge. By clicking on any juror's interactive name or interactive picture, the juror's transcribed questionnaire with all of its above detailed features will appear on the right of the screen and the juror's video recording and all options will appear on the left side of the screen as detailed above. To the far right of the window will appear a scroll bar so the Plaintiff Attorney can view all of the jurors excluded by the Defense Attorney's peremptory challenges.

Below this window containing the interactive names and pictures of the jurors excluded by the Defense Attorney's peremptory challenges will appear a window containing the following prompt: "Prima Facie Case of Race and/or Gender Discrimination." The Plaintiff Attorney is instructed to view the video recordings of the jurors excluded by the Defense Attorney's peremptory challenges and type a prima facie case next to the prompt by citing the names of the jurors who may have been excluded based on their race and/or gender and explaining why they were excluded based on their race and/or gender. To the far right of the window will appear a scroll bar so the Plaintiff Attorney can type his/her prima facie case as long as necessary.

In the top left margin of the screen will appear the current date. To the right of the current date in the top margin will appear the deadline for the Plaintiff Attorney to contest peremptory challenges.

In the bottom margin of the screen will appear a spell check button which will allow the Plaintiff Attorney to correct any spelling errors in his/her prima facie case. Also in the bottom margin will appear a save button to allow the Plaintiff Attorney to save his/her prima facie case before submitting it so the Plaintiff Attorney can submit the case whenever he/she desires. In the far right of the bottom margin will appear an "Authenticate and Submit" button. To submit a prima facie case through the website, the Plaintiff Attorney types his/her prima facie case as explained above and simply selects the "Authenticate and Submit" option. When the Plaintiff Attorney selects this option and takes an authenticating picture of himself/herself with a webcam and into the invention's website as detailed above, the Plaintiff Attorney's prima facie case will be made viewable and accessible to the Judge, the Defense Attorney, the Plaintiff, the Defendant, and the Court Reporter through the invention's website and the Plaintiff Attorney's authenticating picture will appear at the top of his/her prima facie case.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney and the Defense Attorney submit their peremptory challenges in an alternating fashion through the website on the specified date and time, the Defense Attorney may log onto the website and contest the Plaintiff Attorney's peremptory challenges through the website. The Defense Attorney contests the Plaintiff Attorney's peremptory challenges in the same way as the Plaintiff Attorney after the Plaintiff Attorney submits his/her peremptory challenges. Thus, the Defense Attorney selects Contest Plaintiff Attorney's Peremptory Challenges in his/her Main Menu of Functions in his/her respective program. Upon making such a selection, the Defense Attorney is shown a large window containing the interactive name and interactive picture of each juror the Plaintiff Attorney excluded with a peremptory challenge. By clicking on any juror's interactive name or interactive picture, the juror's transcribed questionnaire will appear on the right of the screen and the juror's video recording and all options will appear on the left side of the screen as detailed above. To the far right of the window will appear a scroll bar so the Defense Attorney can view all of the names and pictures of the jurors excluded by the Plaintiff Attorney's peremptory challenges.

Below this window containing the interactive names and pictures of the jurors will appear a window containing the following prompt: "Prima Facie Case of Race and/or Gender Discrimination." The Defense Attorney is instructed to view the video recordings of the jurors excluded by the Plaintiff Attorney's peremptory challenges and type a prima facie case next to the prompt by citing the names of the jurors who may have been excluded based on their race and/or gender and explaining why they were excluded based on their race and/or gender. To the far right of the window will appear a scroll bar so the Defense Attorney can type his/her prima facie case as long as necessary.

In the top left margin of the screen will appear the current date. To the right of the current date in the top margin will appear the deadline for the Defense Attorney to contest peremptory challenges.

In the bottom margin of the screen will appear a spell check button which will allow the Defense Attorney to correct any spelling errors in his/her prima facie case. Also in the bottom margin will appear a save button to allow the Defense Attorney to save his/her prima facie case before submitting it so the Defense Attorney can submit the case whenever he/she desires. In the far right of the bottom margin will appear an "Authenticate and Submit" button. To submit a prima facie case through the website, the Defense Attorney types his/her prima facie case as explained above and simply selects the "Authenticate and Submit" option. When the Defense Attorney selects this option and takes an authenticating picture of himself/herself with a webcam and into the invention's website as detailed above, the Defense Attorney's prima facie case will be made viewable and accessible to the Judge, the Plaintiff Attorney, the Plaintiff, the Defendant, and the Court Reporter through the invention's website and the Defense Attorney's authenticating picture will appear at the top of his/her challenges for cause.

If the Judge elected to allow attorneys to exercise challenges for cause through the website and elected to allow attorneys to exercise peremptory challenges in an alternating fashion on a specified date and time through the website in the Custom Setup of the Jury Selection Process, and if the Plaintiff Attorney and the Defense Attorney submit their peremptory challenges in an alternating fashion through the website on the specified date and time, the Judge, the Plaintiff Attorney, the Defense Attorney, the Plaintiff, and the Defendant log onto the website in their respective programs to review the Plaintiff Attorney's and the Defense Attorney's peremptory challenges submitted through the website and review the interactive names and pictures of the remaining jurors and alternate jurors.

When the Judge, the Plaintiff Attorney, the Defense Attorney, the Plaintiff, and the Defendant log onto the website in their respective programs to review such information, the specified date and time the attorneys were required to exercise their peremptory challenges in an alternating fashion will appear in the top left margin on their respective screens.

Also on their respective screens, the interactive names of the jurors excluded with a Plaintiff Attorney's peremptory challenge will appear in a separate list under a heading entitled "Plaintiff Attorney's Submitted Peremptory Challenges." The interactive names of such jurors will appear in the order they were excluded with a peremptory challenge on the list. Also the interactive picture of each juror excluded with a Plaintiff Attorney's peremptory challenge will appear to the right of the respective juror's interactive name on the list. To the right of each juror's respective interactive picture on the list will appear the exact date and time the Plaintiff Attorney exercised a peremptory challenge on the respective juror and the total number of minutes the Plaintiff Attorney took to submit a peremptory challenge through the website on the respective juror and, to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit" just before the Plaintiff Attorney submitted the peremptory challenge through the website.

Also on their respective screens, the interactive names of the jurors excluded with a Defense Attorney's peremptory challenge will appear in a separate list under a heading entitled "Defense Attorney's Submitted Peremptory Challenges." The interactive names of such jurors will appear in the order they were excluded with a peremptory challenge on the list. Also the interactive picture of each juror excluded with a Defense Attorney's peremptory challenge will appear to the right of the respective juror's interactive name on the list. To the right of each juror's respective interactive picture on the list will appear the exact date and time the Defense Attorney exercised a peremptory challenge on the respective juror and the total number of minutes the Defense Attorney took to submit a peremptory challenge through the website on the respective juror and, to the right of the total amount of time the Defense Attorney took to exclude the juror with a peremptory challenge will appear the authenticating picture of the Defense Attorney that the Defense Attorney made through a webcam and into the website upon selecting "Authenticate and Submit" just before the Defense Attorney submitted the peremptory challenge through the website.

Also on their respective screens, the interactive names and pictures of the remaining jurors and alternate jurors will appear in a separate list under a heading entitled "Jury Panel and Alternate Jurors."

By clicking on any juror's interactive name or picture on any of the separate lists, the juror's video recording will appear on one side of the screen and the juror's transcribed questionnaire and all of its above described features will appear on the other side of the screen with all of the options as mentioned above. A scroll bar to the far right of the screen will appear to allow for viewing of each separate list of interactive juror names and pictures.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her prima facie case of discrimination to contest the Defense Attorney's peremptory challenges through the website, the Court Reporter is sent an email message that he/she must print through the website the Plaintiff Attorney's prima facie case of discrimination and the date it was submitted and place the copy in the Court's file for transcript purposes. The email message contains an interactive link to the invention's website.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her prima facie case of discrimination to contest the Plaintiff Attorney's peremptory challenges through the website, the Court Reporter is then sent an email message that he/she must print through the website the Defense Attorney's prima facie case of discrimination and the date it was submitted and place the copy in the Court's file for transcript purposes. The email message contains an interactive link to the invention's website.

Also, the Court Reporter is sent an email message instructing him/her to log onto the website and print all email messages to the Judge, the Plaintiff Attorney, the Defense Attorney, the Defendant, and the Plaintiff, if the case is civil, and the dates such emails were submitted through the website. The email messages to the Court Reporter contain an interactive link to the main website so the Court Reporter can instantaneously log onto the invention's website.

Also, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her prima facie case of discrimination to contest the Defense Attorney's peremptory challenges through the website, the Judge is automatically sent an email message instructing him/her to log onto the website and rule on the Plaintiff Attorney's prima facie case of discrimination. The email message contains an interactive link to the invention's website. This same email message sent to the Judge will also be sent to the Plaintiff Attorney, the Defense Attorney, the Plaintiff, and the Defendant.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her prima facie case of discrimination to contest the Plaintiff Attorney's peremptory challenges through the website, the Judge is automatically sent an email message instructing him/her to log onto the website and rule on the Defense Attorney's prima facie case of discrimination. The email message contains an interactive link to the invention's website. This same email message sent to the Judge will also be sent to the Plaintiff Attorney, the Defense Attorney, the Plaintiff, and the Defendant.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her prima facie case of discrimination to contest the Defense Attorney's peremptory challenges through the website, the Plaintiff Attorney, the Defense Attorney, the Plaintiff, and the Defendant are all sent email messages that they may now log onto the website and view the Plaintiff Attorney's submitted prima facie case of discrimination. The email message contains an interactive link to the invention's website.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her prima facie case of discrimination to contest the Plaintiff Attorney's peremptory challenges through the website, the Plaintiff Attorney, the Defense Attorney, the Plaintiff, and the Defendant are all sent email messages that they may now log onto the website and view the Defense Attorney's submitted prima facie case of discrimination. The email message contains an interactive link to the invention's website.

Additionally, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her prima facie case of discrimination to contest the Defense Attorney's peremptory challenges through the website, the Judge, Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her prima facie case of discrimination to contest the Plaintiff Attorney's peremptory challenges through the website, the Judge, Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her prima facie case of discrimination to contest the Defense Attorney's peremptory challenges through the website, the Court Reporter logs onto the website and prints the Plaintiff Attorney's prima facie case of discrimination and places it in the Court's file for transcript purposes. The deadline for the Plaintiff Attorney to submit the prima facie case of discrimination will appear in the top left margin of the print. To the right of the deadline in the top margin of the print will appear the date the Plaintiff Attorney submitted his/her prima facie case of discrimination.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her prima facie case of discrimination to contest the Plaintiff Attorney's peremptory challenges through the website, the Court Reporter logs onto the website and prints the Defense Attorney's prima facie case of discrimination and places it in the Court's file for transcript purposes. The deadline for the Defense Attorney to submit the prima facie case of discrimination will appear in the top left margin of the print. To the right of the deadline in the top margin of the print will appear the date the Defense Attorney submitted his/her prima facie case of discrimination.

Also, the Court Reporter prints all email messages sent to the Judge, the Plaintiff Attorney, the Defense Attorney, the Defendant, the Plaintiff, if the case is civil, and the dates such emails were submitted to them through the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her prima facie case of discrimination to contest the Defense Attorney's peremptory challenges through the website, the judge logs into his/her respective program in the website and rules on the Plaintiff Attorney's prima facie case of discrimination against the Defense Attorney's peremptory challenges through the website. To submit such a ruling through the website, the Judge selects "Rule on Plaintiff Attorney's contest to Defense Attorney's Peremptory Challenges" from the Judge's Main Menu of Functions in his/her respective program. Upon making such a selection, the Judge is shown a large window containing the interactive name and interactive picture of each juror the Defense Attorney excluded with a peremptory challenge. By clicking on any juror's interactive name or interactive picture, the juror's transcribed questionnaire will appear on the right of the screen and the juror's video recording and all options will appear on the left side of the screen as detailed above. To the far right of the window will appear a scroll bar so the Judge can view all of the juror interactive names and pictures excluded by the Defense Attorney's peremptory challenges.

Below this window containing the interactive names and interactive pictures of the jurors excluded by the Defense Attorney's peremptory challenges will appear a window containing the following prompt: "Plaintiff Attorney's Prima Facie Case of Race and/or Gender Discrimination." Inside the window will appear the Plaintiff Attorney's prima facie case of race and/or gender discrimination which should include the names of the jurors the Plaintiff Attorney claims to have been excluded by the Defense Attorney based on their race and/or gender and the Plaintiff Attorney's explanation of discrimination. To the far right of the window will appear a scroll bar so the Judge can view the entire prima facie case of the Plaintiff Attorney.

Directly below the Plaintiff Attorney's prima facie case will appear the prompt: "Judicial Ruling on Plaintiff Attorney's Prima Facie Case." Under the prompt will appear a box labeled "Sustained" and a box labeled "Overruled." Directly below such boxes will appear a small window with a prompt that says "Explanation for Ruling on Plaintiff Attorney's Prima Facie Case."

To make a ruling on the Plaintiff Attorney's prima facie case, the Judge is instructed to review the Plaintiff Attorney's prima facie case and review the video recordings of the jurors listed in the Plaintiff Attorney's prima facie case and click a check mark in either the "Sustained" box or the "Overruled" box. The Judge then has the option of typing an explanation of his/her ruling in the window that allows for an explanation.

The Judge is further instructed that if he/she sustains the Plaintiff Attorney's prima facie case the Defense Attorney shall be given a chance to proffer non-discriminatory reasons for his/her contested peremptory challenges through the website. Thus, below the explanation window will appear a box for the Judge to insert a deadline for the Defense Attorney to submit non-discriminatory reasons for his/her contested peremptory challenges through the website. If the Judge sustains the Plaintiff Attorney's prima facie case, he/she is instructed to place a deadline in the box for the Defense Attorney to submit non-discriminatory reasons for his/her contested peremptory challenges through the website.

In the bottom margin of the screen will appear a spell check button which will allow the Judge to correct any spelling errors in his/her ruling on the prima facie case. Also in the bottom margin will appear a save button to allow the Judge to save his/her ruling on the prima facie case before submitting it so the Judge can submit the ruling whenever he/she desires. In the far right of the bottom margin will appear an "Authenticate and Submit" button. To submit a ruling on a prima facie case, the Judge clicks a check mark in either the sustained box or the overruled box and may type an explanation for his/her ruling and simply selects the "Authenticate and Submit" option. However, if the Judge elects to sustain a prima facie case, the Judge is instructed to insert a deadline for the opposing attorney to submit non-discriminatory reasons to preserve his/her peremptory challenges and then select the "Authenticate and Submit" option. Upon selecting "Authenticate and Submit," the Judge selects this option and takes an authenticating picture of himself/herself with a webcam and into the invention's website as detailed above, the Judge's ruling on the Plaintiff Attorney's prima facie case will be made viewable and accessible to the Defense Attorney, the Plaintiff Attorney, the Plaintiff, the Defendant, and the Court Reporter through the invention's website and the Judge's authenticating picture will appear at the top of his/her challenges for cause.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her prima facie case of discrimination to contest the Plaintiff Attorney's peremptory challenges through the website, the judge logs into his/her respective program in the website and rules upon the Defense Attorney's prima facie case of discrimination against the Plaintiff Attorney's peremptory challenges through the website. To submit such a ruling through the website, the Judge would select "Rule on Defense Attorney's contest to Plaintiff Attorney's Peremptory Challenges" from the Judge's Main Menu of Functions in his/her respective program. Upon making such a selection, the Judge is shown a large window containing the interactive name and interactive picture of each juror the Plaintiff Attorney excluded with a peremptory challenge. By clicking on any juror's interactive name or interactive picture, the juror's transcribed questionnaire will appear on the right of the screen and the juror's video recording and all options will appear on the left side of the screen as detailed above. To the far right of the window will appear a scroll bar so the Judge can view all of the juror interactive names and pictures excluded by the Plaintiff Attorney's peremptory challenges.

Below this window containing the interactive names and interactive pictures of the jurors excluded by the Plaintiff Attorney's peremptory challenges will appear a window containing the following prompt: "Defense Attorney's Prima Facie Case of Race and/or Gender Discrimination." Inside the window will appear the Defense Attorney's prima facie case of race and/or gender discrimination which should include the names of the jurors the Defense Attorney claims have been excluded by the Plaintiff Attorney based on their race and/or gender and the Defense Attorney's explanation of discrimination. To the far right of the window will appear a scroll bar so the Judge can view the entire prima facie case of the Defense Attorney.

Directly below the Defense Attorney's prima facie case will appear the prompt: "Judicial Ruling on Defense Attorney's Prima Facie Case." Under the prompt will appear a box labeled "Sustained" and a box labeled "Overruled." Directly below such prompt will appear a small window with a prompt that says "Explanation for Ruling on Defense Attorney's Prima Facie Case."

To make a ruling on the Defense Attorney's prima facie case, the Judge is instructed to review the Defense Attorney's prima facie case and review the video recordings of the jurors listed in the Defense Attorney's prima facie case and click a check mark in either the "Sustained" box or the "Overruled" box. The Judge then has the option of typing an explanation of his/her ruling in the window that allows for an explanation.

The Judge is further instructed that if he/she sustains the Defense Attorney's prima facie case the Plaintiff Attorney shall be given a chance to proffer non-discriminatory reasons for his/her contested peremptory challenges through the website. Thus, below the explanation window will appear a box for the Judge to insert a deadline for the Plaintiff Attorney to submit non-discriminatory reasons for his/her contested peremptory challenges through the website. If the Judge sustains the Defense Attorney's prima facie case, he/she is instructed to place a deadline in the box for the Plaintiff Attorney to submit non-discriminatory reasons for his/her contested peremptory challenges through the website.

In the bottom margin of the screen will appear a spell check button which will allow the Judge to correct any spelling errors in his/her ruling on the prima facie case. Also in the bottom margin will appear a save button to allow the Judge to save his/her ruling on the prima facie case before submitting it so the Judge can submit the ruling whenever he/she desires. In the far right of the bottom margin will appear an "Authenticate and Submit" button. To submit a ruling on a prima facie case, the Judge clicks a check mark in either the "Sustained" box or the "Overruled" box and may type an explanation for his/her ruling and simply selects the "Authenticate and Submit" option. However, if the Judge elects to sustain a prima facie case, the Judge is instructed to insert a deadline for the opposing attorney to submit non-discriminatory reasons to preserve his/her peremptory challenges and then select the "Authenticate and Submit" option. Upon selecting "Authenticate and Submit," the Judge selects this option and takes an authenticating picture of himself/herself with a webcam and into the invention's website as detailed above, the Judge's ruling on the Defense Attorney's prima facie case will be made viewable and accessible to the Defense Attorney, the Plaintiff Attorney, the Plaintiff, the Defendant, and the Court Reporter through the invention's website and the Judge's authenticating picture will appear at the top of his/her challenges for cause.

The Plaintiff, Defendant, Plaintiff Attorney, and Defense Attorney may log in to their respective programs on the website to view the prima facie cases of discrimination of both attorneys. They are also shown the deadlines for each attorney to submit a prima facie case of discrimination and the dates the prima facie cases of discrimination were actually submitted by each attorney.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Plaintiff Attorney's prima facie case of discrimination through the website, the Court Reporter is then sent an email message that he/she must print through the website the Judge's ruling on the Plaintiff Attorney's prima facie case of discrimination and the date it was submitted and place the copy in the Court's file for transcript purposes. The email message contains an interactive link to the invention's website address.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Defense Attorney's prima facie case of discrimination through the website, the Court Reporter is then notified with an email message that he/she must print through the website the Judge's ruling on the Defense Attorney's prima facie case of discrimination and the date it was submitted and place the copy in the Court's file for transcript purposes. The email message contains an interactive link to the invention's website address.

Also, the Court Reporter is sent an email message instructing him/her to log onto the invention's website and print all email messages to the Judge, the Plaintiff Attorney, the Defense Attorney, the Defendant, and the Plaintiff, if the case is civil, and the dates such emails were submitted through the website. The email messages to the Court Reporter contain an interactive link to the invention's website so the Court Reporter can instantaneously log onto the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained the prima facie case of the Defense Attorney through the website, the Judge, Plaintiff Attorney, Defense Attorney, Plaintiff, and Defendant are sent email messages to their personal email accounts informing them that the Defense Attorney's prima facie case has been sustained and the Plaintiff Attorney may now log onto the website and submit a rebuttal of non-discriminatory reasons to preserve his/her peremptory challenges. The email message includes the deadline for the Plaintiff Attorney to submit his/her rebuttal of non-discriminatory reasons. The email message also informs them that they may now log onto the website and view the Judge's ruling on the Defense Attorney's prima facie case. The email message contains an interactive link to the invention's website.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained the prima facie case of the Plaintiff Attorney through the website, the Judge, Plaintiff Attorney, Defense Attorney, Plaintiff, and Defendant are sent email messages to their personal email accounts informing them that the Plaintiff Attorney's prima facie case has been sustained and the Defense Attorney may now log onto the website and submit a rebuttal of non-discriminatory reasons to preserve his/her peremptory challenges. The email message includes the deadline for the Defense Attorney to submit his/her rebuttal of non-discriminatory reasons. The email message also informs them that they may now log onto the website and view the Judge's ruling on the Plaintiff Attorney's prima facie case. The email message contains an interactive link to the invention's website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overruled the prima facie case of the Defense Attorney through the website, the Judge, Plaintiff Attorney, Defense Attorney, Plaintiff, and Defendant are sent email messages to their personal email accounts informing them that the Defense Attorney's prima facie case has been overruled and the Plaintiff Attorney's peremptory challenges are preserved and the Plaintiff Attorney does not need to submit a rebuttal of non-discriminatory reasons through the website. The email message also informs them that they may now log onto the website and view the Judge's ruling on the Defense Attorney's prima facie case. The email message contains an interactive link to the invention's website.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overruled the prima facie case of the Plaintiff Attorney through the website, the Judge, Plaintiff Attorney, Defense Attorney, Plaintiff, and Defendant are sent email messages to their personal email accounts informing them that the Plaintiff Attorney's prima facie case has been overruled and the Defense Attorney's peremptory challenges are preserved and the Defense Attorney does not need to submit a rebuttal of non-discriminatory reasons through the website. The email message also informs them that they may now log onto the website and view the Judge's ruling on the Plaintiff Attorney's prima facie case. The email message contains an interactive link to the invention's website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules through the website both the Plaintiff Attorney's and Defense Attorney's prima facie cases of discrimination or if the Judge overrules through the website one attorney's prima facie case of discrimination while such attorney's peremptory challenges were uncontested by the opposing attorney and otherwise preserved, the Court Administrator is sent an email message that he/she may now log onto the website and draft a summons for jury duty for each juror making up the jury panel and the alternate jurors and is instructed to mail such jurors the summons for jury duty which will order them to appear on the date the jury trial is to begin. Additionally, the email message instructs the Court Administrator to send a letter to each juror that was excluded with a peremptory challenge through the invention's website that they are excused from jury duty. The email message includes the names and addresses of the jurors who were excluded with a peremptory challenge. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules through the website both the Plaintiff Attorney's and Defense Attorney's prima facie cases of discrimination or if the Judge overrules through the website one attorney's prima facie case of discrimination while such attorney's peremptory challenges were uncontested by the opposing attorney and otherwise preserved, an email message is sent to the Court Reporter to log onto the website and print the list of juror names making up the jury panel and alternate juror positions and place such list in the Court's file for transcript purposes. The email message contains an interactive link to the invention's website address.

Additionally, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Plaintiff Attorney's prima facie case of discrimination through the website, the Judge, Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Defense Attorney's prima facie case of discrimination through the website, the Judge, Plaintiff Attorney, Plaintiff, Defense Attorney, Defendant, the Court Reporter, and the Court Administrator each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits rulings on the Plaintiff Attorney's and/or the Defense Attorney's prima facie cases of discrimination through the website, the Court Reporter logs onto the website and prints the Judge's rulings on both attorneys' prima facie cases of discrimination and places them in the Court's file for transcript purposes. The date the Judge issued rulings on each of the attorney's prima facie cases of discrimination will appear at the top of the screen and at the top of the print.

Also, the Court Reporter prints all email messages sent to the Judge, the Plaintiff Attorney, the Defense Attorney, the Defendant, the Plaintiff, if the case is civil, and the dates such emails were submitted to them through the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained the Defense Attorney's prima facie case of discrimination through the website, the Plaintiff Attorney submits a rebuttal of non-discriminatory reasons through the website to preserve his/her peremptory challenges. To submit such a rebuttal, the Plaintiff Attorney would select Rebut Defense Attorney's Contest to Peremptory Challenges in his/her Main Menu of Functions in his/her respective program. Upon making such a selection, the Plaintiff Attorney is shown a horizontal window containing the interactive name and interactive picture of each juror the Plaintiff Attorney excluded with a peremptory challenge that the Defense Attorney included in his/her prima facie case of discrimination. The depicted jurors will appear in alphabetical order from left to right in the horizontal window. By clicking on any juror's interactive name or interactive picture, the juror's transcribed questionnaire will appear on the right of the screen and the juror's video recording and all options will appear on the left side of the screen as detailed above. Aligning the bottom of the window will appear a scroll bar so the Plaintiff Attorney can view all of the jurors the Plaintiff Attorney excluded with a peremptory challenge who were contested by the Defense Attorney in the Defense Attorney's prima facie case of discrimination.

Below this window containing the interactive names and interactive pictures of the jurors will appear a window containing the following prompt: "Defense Attorney's Prima Facie Case of Race and/or Gender Discrimination." Next to the prompt will appear the Defense Attorney's prima facie case of race and/or gender discrimination. To the far right of the window will appear a scroll bar so the Plaintiff Attorney can view the Defense Attorney's entire prima facie case of discrimination.

Directly below the Defense Attorney's prima facie case of discrimination will appear a window containing the following prompt: "Plaintiff Attorney's Rebuttal of Non-discriminatory Reasons." The Plaintiff Attorney is instructed to view the recordings of the jurors included in the Defense Attorney's prima facie case of discrimination and review the Defense Attorney's prima facie case of discrimination and type a rebuttal consisting of non-discriminatory reasons to preserve his/her contested peremptory challenges next to the prompt. Thus, the Plaintiff Attorney is instructed to type reasons for excluding the contested jurors with peremptory challenges for reasons other than race and/or gender discrimination to justify his/her peremptory challenges.

In the top left margin of the screen will appear the current date. To the right of the current date in the top margin will appear the deadline for the Plaintiff Attorney to rebut the Defense Attorney's contest to peremptory challenges.

In the bottom margin of the screen will appear a spell check button which will allow the Plaintiff Attorney to correct any spelling errors in his/her rebuttal. Also, in the bottom margin will appear a save button to allow the Plaintiff Attorney to save his/her rebuttal before submitting it so the Plaintiff Attorney can submit the rebuttal whenever he/she desires. In the far right of the bottom margin will appear an "Authenticate and Submit" button. To submit a rebuttal, the Plaintiff Attorney types his/her rebuttal of non-discriminatory reasons as explained above and simply selects the "Authenticate and Submit" option. When the Plaintiff Attorney selects "Authenticate and Submit" and takes an authenticating picture of himself/herself with a webcam and into the invention's website as detailed above, the Plaintiff Attorney's rebuttal of non-discriminatory reasons will be made viewable and accessible to the Judge, the Defense Attorney, the Plaintiff, the Defendant, and the Court Reporter through the invention's website and the Plaintiff Attorney's authenticating picture will appear at the top of his/her rebuttal of non-discriminatory reasons.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained the Plaintiff Attorney's prima facie case of discrimination through the website, the Defense Attorney submits a rebuttal of non-discriminatory reasons through the website to preserve his/her peremptory challenges. To submit such a rebuttal, the Defense Attorney would select Rebut Plaintiff Attorney's Contest to Peremptory Challenges in his/her Main Menu of Functions in his/her respective program. Upon making such a selection, the Defense Attorney is shown a horizontal window containing the interactive name and interactive picture of each juror the Defense Attorney excluded with a peremptory challenge that the Plaintiff Attorney included in his/her prima facie case of discrimination. The depicted jurors will appear in alphabetical order from left to right in the horizontal window. By clicking on any juror's interactive name or interactive picture, the juror's transcribed questionnaire will appear on the right of the screen and the juror's video recording and all options will appear on the left side of the screen as detailed above. Aligning the bottom of the window will appear a scroll bar so the Defense Attorney can view all of the jurors the Defense Attorney excluded with a peremptory challenge who were contested by the Plaintiff Attorney in the Plaintiff Attorney's prima facie case of discrimination.

Below this window containing the interactive names and interactive pictures of the jurors will appear a window containing the following prompt: "Plaintiff Attorney's Prima Facie Case of Race and/or Gender Discrimination." Next to the prompt will appear the Plaintiff Attorney's prima facie case of race and/or gender discrimination. To the far right of the window will appear a scroll bar so the Defense Attorney can view the Plaintiff Attorney's entire prima facie case of discrimination.

Directly below the Plaintiff Attorney's prima facie case of discrimination will appear a window containing the following prompt: "Defense Attorney's Rebuttal of Non-discriminatory Reasons." The Defense Attorney is instructed to view the recordings of the jurors included in the Plaintiff Attorney's prima facie case of discrimination and review the Plaintiff Attorney's prima facie case of discrimination and type a rebuttal consisting of non-discriminatory reasons to preserve his/her contested peremptory challenges. Thus, the Defense Attorney is instructed to type reasons for excluding the contested jurors with peremptory challenges for reasons other than race and/or gender discrimination to justify his/her peremptory challenges.

In the top left margin of the screen will appear the current date. To the right of the current date in the top margin will appear the deadline for the Defense Attorney to rebut the Plaintiff Attorney's contest to peremptory challenges.

In the bottom margin of the screen will appear a spell check button which will allow the Defense Attorney to correct any spelling errors in his/her rebuttal. Also in the bottom margin will appear a save button to allow the Defense Attorney to save his/her rebuttal before submitting it so the Defense Attorney can submit the rebuttal whenever he/she desires. In the far right of the bottom margin will appear an "Authenticate and Submit" button. To submit a rebuttal, the Defense Attorney types his/her rebuttal of non-discriminatory reasons as explained above and simply selects the "Authenticate and Submit" option. When the Defense Attorney selects "Authenticate and Submit" and takes an authenticating picture of himself/herself with a webcam and into the invention's website as detailed above, the Defense Attorney's rebuttal of non-discriminatory reasons will be made viewable and accessible to the Judge, the Plaintiff Attorney, the Plaintiff, the Defendant, and the Court Reporter through the invention's website and the Defense Attorney's authenticating picture will appear at the top of his/her rebuttal of non-discriminatory reasons.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overruled the Defense Attorney's prima facie case of discrimination through the website, the Plaintiff Attorney would not be required to rebut the Defense Attorney's contest to peremptory challenges through the website, and the Plaintiff Attorney's peremptory challenges would be preserved.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overruled the Plaintiff Attorney's prima facie case of discrimination through the website, the Defense Attorney would not be required to rebut the Plaintiff Attorney's contest to peremptory challenges through the website, and the Defense Attorney's peremptory challenges would be preserved.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits rulings on the Plaintiff Attorney's and/or the Defense Attorney's prima facie cases of discrimination through the website, the Plaintiff, Defendant, Plaintiff's Attorney, and Defense Attorney may log in to their respective programs on the website to view the Judge's rulings on the prima facie cases of discrimination of both attorneys. They are also shown the date the Judge submitted the rulings on each attorney's prima facie case of discrimination. If the Judge sustained either or both attorney's prima facie case the deadline the Judge set for the opposing attorney to submit a rebuttal of non-discriminatory reasons is also shown.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules through the website both the Plaintiff Attorney's and Defense Attorney's prima facie cases of discrimination or if the Judge overrules through the website one attorney's prima facie case of discrimination while such attorney's peremptory challenges were uncontested by the opposing attorney and otherwise preserved, the Court Administrator logs into the his/her respective program in the website and drafts a summons for each juror who made the jury panel and who made an alternate juror position as described in detail below. Additionally, the Court Administrator sends a letter to each juror that was excluded with a peremptory challenge through the invention's website informing them that they are excused from jury duty.

Also, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules through the website both the Plaintiff Attorney's and Defense Attorney's prima facie cases of discrimination or if the Judge overrules through the website one attorney's prima facie case of discrimination while such attorney's peremptory challenges were uncontested by the opposing attorney and otherwise preserved, the Court Reporter logs onto the website and prints the list of juror names making up the jury panel and alternate juror positions, and the website instructs the Court Reporter to place such list in the Court's file for transcript purposes. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her rebuttal of non-discriminatory reasons to preserve his/her contested peremptory challenges through the website, the Court Reporter is then notified with an email message that he/she must print through the website the Plaintiff Attorney's rebuttal of non-discriminatory reasons and the date it was submitted and place the copy in the Court's file for transcript purposes. The email message contains an interactive link to the invention's website.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her rebuttal of non-discriminatory reasons to preserve his/her contested peremptory challenges through the website, the Court Reporter is then notified with an email message that he/she must print through the website the Defense Attorney's rebuttal of non-discriminatory reasons and the date it was submitted and place the copy in the Court's file for transcript purposes. The email message contains an interactive link to the invention's website.

Also, the Court Reporter is sent an email message instructing him/her to log onto the invention's website and print all email messages to the Judge, the Plaintiff Attorney, the Defense Attorney, the Defendant, and the Plaintiff, if the case is civil, and the dates such emails were submitted through the website. The email messages to the Court Reporter contain an interactive link to the invention's website address so the Court Reporter can instantaneously log onto the website.

Also, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her rebuttal of non-discriminatory reasons to preserve his/her contested peremptory challenges through the website, the Judge is automatically sent an email message instructing him/her to log onto the website and rule on the Plaintiff Attorney's rebuttal of non-discriminatory reasons. The email message contains an interactive link to the invention's website. This same email message that is sent of the Judge is also sent to the email addresses of the Plaintiff Attorney, Defense Attorney, Plaintiff, and Defendant.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her rebuttal of non-discriminatory reasons to preserve his/her contested peremptory challenges through the website, the Judge is automatically sent an email message instructing him/her to log onto the website and rule on the Defense Attorney's rebuttal of non-discriminatory reasons. The email message contains an interactive link to the invention's website. This same email message that is sent of the Judge is also sent to the email addresses of the Plaintiff Attorney, Defense Attorney, Plaintiff, and Defendant.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her rebuttal of non-discriminatory reasons to preserve his/her contested peremptory challenges through the website, the Judge, the Plaintiff Attorney, the Defense Attorney, the Plaintiff, and the Defendant are all sent the same email message that they may now log onto the website and view the Plaintiff Attorney's submitted rebuttal of non-discriminatory reasons. The email message contains an interactive link to the invention's website.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her rebuttal of non-discriminatory reasons to preserve his/her contested peremptory challenges through the website, the Judge, the Plaintiff Attorney, the Plaintiff, the Defense Attorney, and the Defendant are all sent the same email message that they may now log onto the website and view the Defense Attorney's submitted rebuttal of non-discriminatory reasons. The email message contains an interactive link to the invention's website.

Also, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her rebuttal of non-discriminatory reasons to preserve his/her contested peremptory challenges through the website, the Judge, the Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her rebuttal of non-discriminatory reasons to preserve his/her contested peremptory challenges through the website, the Judge, the Plaintiff Attorney, Plaintiff, Defense Attorney, Defendant, and the Court Reporter each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her rebuttal of non-discriminatory reasons to preserve his/her contested peremptory challenges through the website, the Court Reporter logs onto the website and prints the Plaintiff Attorney's rebuttal of non-discriminatory reasons and places it in the Court's file for transcript purposes. The deadline for the Plaintiff Attorney to submit the rebuttal of non-discriminatory reasons will appear in the top left margin of the print. To the right of the deadline in the top margin of the print will appear the date the Plaintiff Attorney submitted his/her rebuttal of non-discriminatory reasons.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her rebuttal of non-discriminatory reasons to preserve his/her contested peremptory challenges through the website, the Court Reporter logs onto the website and prints the Defense Attorney's rebuttal of non-discriminatory reasons and places it in the Court's file for transcript purposes. The deadline for the Defense Attorney to submit the rebuttal of non-discriminatory reasons will appear in the top left margin of the print. To the right of the deadline in the top margin of the print will appear the date the Defense Attorney submitted his/her rebuttal of non-discriminatory reasons.

Also, the Court Reporter prints all email messages sent to the Judge, the Plaintiff Attorney, the Defense Attorney, the Defendant, the Plaintiff, if the case is civil, and the dates such emails were submitted to them through the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submits his/her rebuttal of non-discriminatory reasons to preserve his/her contested peremptory challenges through the website, the Judge would select Rule on Plaintiff Attorney's Rebuttal to Defense Attorney's Contest of Peremptory Challenges from the Judge's Main Menu of Functions in his/her respective program. Upon making such a selection, the Judge is shown a window at the top of the screen containing the prompt "Defense Attorney's Prima Facie Case of Race and/or Gender Discrimination." Inside the window will appear the Defense Attorney's prima facie case of race and/or gender discrimination which should include the names of the jurors the Defense Attorney claims have been excluded by the Plaintiff Attorney based on their race and/or gender and the Defense Attorney's explanation of discrimination. To the far right of the window will appear a scroll bar so the Judge can view the entire prima facie case of the Defense Attorney.

Directly below the Defense Attorney's Prima Facie Case of Discrimination appears the Judge's ruling on the Defense Attorney's Prima Facie Case of Discrimination which will either say "Sustained" or "Overruled." The ruling likely will be "Sustained" if the Plaintiff Attorney is submitting a rebuttal of non-discriminatory reasons as the Plaintiff Attorney would not be required to submit non-discriminatory reasons to preserve his/her peremptory challenges if the Defense Attorney's prima facie case was overruled.

Directly below the Judge's ruling on the Defense Attorney's prima facie case of discrimination will appear a window containing the prompt "Plaintiff Attorney's Rebuttal of Non-Discriminatory Reasons." Inside the window will appear the Plaintiff Attorney's rebuttal of non-discriminatory reasons to preserve his/her contested peremptory challenges. To the far right of the window will appear a scroll bar so the Judge can view the entire rebuttal of non-discriminatory reasons of the Plaintiff Attorney.

Directly below the Plaintiff Attorney's Rebuttal of Non-Discriminatory Reasons will appear a large window containing the interactive name and interactive picture of each juror the Plaintiff Attorney excluded with a peremptory challenge who was named in the Defense Attorney's prima facie case of discrimination appearing vertically in alphabetical order beginning at the top inside the window. By clicking on any juror's interactive name or interactive picture, the juror's transcribed questionnaire will appear on the right of the screen and the juror's video recording and all options will appear on the left side of the screen as detailed above. To the left of each juror's interactive picture and name will appear a box labeled "Strike" and a box labeled "Keep." To the far right of the window will appear a scroll bar so the Judge can view all of the jurors named in the Defense Attorney's prima facie case of discrimination inside the window.

Directly below the window containing the interactive names and pictures of the jurors named in the Defense Attorney's prima facie case will appear a window containing the prompt "Explanation for Rulings on Defense Attorney's Contest of Plaintiffs Peremptory challenges." Next to the prompt the Judge has the option of typing and submitting an explanation for his/her rulings on the Plaintiff Attorney's peremptory challenges that were contested by the Defense Attorney.

Directly below the window containing the Judge's explanation for his/her rulings will appear a prompt that states "Specific date and time for the Plaintiff Attorney and the Defense Attorney to submit additional peremptory challenges in an alternating fashion through the website." At this prompt, the Judge is advised that if he/she keeps any of the contested jurors in the panel thereby overruling the Plaintiff Attorney's non-discriminatory reasons, he/she must allow the Plaintiff Attorney to strike a number of jurors with peremptory challenges through the website that is equal to the number of contested jurors the Judge decided to keep in the panel and, therefore, the Judge must submit a new specific date and time for the Plaintiff Attorney and the Defense Attorney to submit additional peremptory challenges in an alternating fashion through the website. Thus, the Judge is instructed that even if the Defense Attorney's peremptory challenges are preserved and the Defense Attorney is not required to submit any additional peremptory challenges through the website, the Judge is still required to submit a new specific date and time for the Plaintiff Attorney to submit additional peremptory challenges through the website. The Judge is further instructed that even if the Defense Attorney is not required to submit any additional peremptory challenges through the website, the Plaintiff Attorney is still required to log onto the website on the specified date and time and submit the required additional peremptory challenges that are equal to the number of contested jurors the Judge decided to keep in the panel. The Judge is further instructed that if the Defense Attorney is required to submit additional peremptory challenges through the website along with the Plaintiff Attorney, the Judge must set the same specific date and time for both attorneys to submit their additional peremptory challenges through the website in an alternating fashion. However, the Judge is further advised that if he/she decides to strike all of the jurors contested by the Defense Attorney thereby sustaining and upholding the Plaintiff Attorney's non-discriminatory reasons and affirming the Plaintiff Attorney's contested peremptory challenges, the Plaintiff Attorney will not be allowed to exercise any additional peremptory challenges through the website.

In the bottom margin of the screen will appear a spell check button which will allow the Judge to correct any spelling errors in his/her explanation of ruling on the Plaintiff Attorney's rebuttal of non-discriminatory reasons. Also, in the bottom margin will appear a save button to allow the Judge to save his/her ruling on the Plaintiff Attorney's rebuttal of non-discriminatory reasons before submitting it so the Judge can submit the ruling whenever he/she desires. In the far right of the bottom margin will appear an "Authenticate and Submit" button.

To make a ruling on the Plaintiff Attorney's rebuttal of non-discriminatory reasons, the Judge is instructed to review the Defense Attorney's prima facie case, to review the Plaintiff Attorney's rebuttal of non-discriminatory reasons, and to review the video recordings of the jurors listed in the Defense Attorney's prima facie case and click a check mark in either the "Strike" box or the "Keep" box next to each juror's interactive name and picture listed inside the window. The Judge then has the option of typing an explanation of his/her ruling in the window that allows for an explanation. If the Judge keeps any of the jurors listed, the Judge must then set a new specific date and time for both the Plaintiff Attorney and the Defense Attorney to submit additional peremptory challenges in an alternating fashion through the website. The Judge then selects "Authenticate and Submit" in the bottom margin. When the Judge selects "Authenticate and Submit" and takes an authenticating picture of himself/herself with a webcam and into the invention's website as detailed above, the Judge's ruling on the Plaintiff Attorney's rebuttal of non-discriminatory reasons will be made viewable and accessible to the Plaintiff Attorney, the Defense Attorney, the Plaintiff, the Defendant, and the Court Reporter through the invention's website and the Judge's authenticating picture will appear at the top of his/her ruling on the Plaintiff Attorney's rebuttal of non-discriminatory reasons.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submits his/her rebuttal of non-discriminatory reasons to preserve his/her contested peremptory challenges through the website, the Judge would select Rule on Defense Attorney's Rebuttal to Plaintiff Attorney's Contest of Peremptory Challenges from the Judge's Main Menu of Functions in his/her respective program. Upon making such a selection, the Judge is shown a window at the top of the screen containing the prompt "Plaintiff Attorney's Prima Facie Case of Race and/or Gender Discrimination." Inside the window will appear the Plaintiff Attorney's prima facie case of race and/or gender discrimination which should include the names of the jurors the Plaintiff Attorney claims have been excluded by the Defense Attorney based on their race and/or gender and the Plaintiff Attorney's explanation of discrimination. To the far right of the window will appear a scroll bar so the Judge can view the entire prima facie case of the Plaintiff Attorney.

Directly below the Plaintiff Attorney's Prima Facie Case of Discrimination appears the Judge's ruling on the Plaintiff Attorney's Prima Facie Case of Discrimination which will either say "Sustained" or "Overruled." The ruling likely will be "Sustained" if the Defense Attorney is submitting a rebuttal of non-discriminatory reasons as the Defense Attorney would not be required to submit non-discriminatory reasons to preserve his/her peremptory challenges if the Plaintiff Attorney's prima facie case was overruled.

Directly below the Judge's ruling on the Plaintiff Attorney's prima facie case of discrimination will appear a window containing the prompt "Defense Attorney's Rebuttal of Non-Discriminatory Reasons." Inside the window will appear the Defense Attorney's rebuttal of non-discriminatory reasons to preserve his/her contested peremptory challenges. To the far right of the window will appear a scroll bar so the Judge can view the entire rebuttal of non-discriminatory reasons of the Defense Attorney.

Directly below the Defense Attorney's Rebuttal of Non-Discriminatory Reasons will appear a large window containing the interactive name and interactive picture of each juror the Defense Attorney excluded with a peremptory challenge who was named in the Plaintiff Attorney's prima facie case of discrimination appearing vertically in alphabetical order beginning at the top inside the window. By clicking on any juror's interactive name or interactive picture, the juror's transcribed questionnaire will appear on the right of the screen and the juror's video recording and all options will appear on the left side of the screen as detailed above. To the left of each juror's interactive picture and name will appear a box labeled "Strike" and a box labeled "Keep." To the far right of the window will appear a scroll bar so the Judge can view all of the jurors named in the Plaintiff Attorney's prima facie case of discrimination inside the window.

Directly below the window containing the interactive names and pictures of the jurors named in the Plaintiff Attorney's prima facie case will appear a window containing the prompt "Explanation for Rulings on Defendant's Peremptory challenges." Next to the prompt the Judge has the option of typing and submitting an explanation for his/her rulings on the Defense Attorney's peremptory challenges that were contested by the Plaintiff Attorney through the website.

Directly below the window containing the Judge's explanation for his/her rulings will appear a prompt that states "Specific date and time for the Plaintiff Attorney and the Defense Attorney to submit additional peremptory challenges in an alternating fashion through the website." At this prompt, the Judge is advised that if he/she keeps any of the contested jurors in the panel thereby overruling the Defense Attorney's non-discriminatory reasons, he/she must allow the Defense Attorney to strike a number of jurors with peremptory challenges that is equal to the number of contested jurors the Judge decided to keep in the panel, and, therefore, the Judge must submit a new specific date and time for the Plaintiff Attorney and the Defense Attorney to submit additional peremptory challenges in an alternating fashion through the website. Thus, the Judge is instructed that even if the Plaintiff Attorney's peremptory challenges are preserved and the Plaintiff Attorney is not required to submit any additional peremptory challenges through the website, the Judge is still required to submit a new specific date and time for the Defense Attorney to submit additional peremptory challenges through the website. The Judge is further instructed that even if the Plaintiff Attorney is not required to submit any additional peremptory challenges through the website, the Defense Attorney is still required to log onto the website on the specified date and time and submit the required additional peremptory challenges that are equal to the number of contested jurors the Judge decided to keep in the panel. The Judge is further instructed that if the Plaintiff Attorney is required to submit additional peremptory challenges through the website along with the Defense Attorney, the Judge must set the same specific date and time for both attorneys to submit their additional peremptory challenges through the website in an alternating fashion. However, the Judge is further advised that if he/she decides to strike all of the jurors contested by the Plaintiff Attorney thereby sustaining and upholding the Defense Attorney's non-discriminatory reasons and affirming the Defense Attorney's contested peremptory challenges, the Defense Attorney will not be allowed to exercise any additional peremptory challenges through the website.

In the bottom margin of the screen will appear a spell check button which will allow the Judge to correct any spelling errors in his/her ruling on the Defense Attorney's rebuttal of non-discriminatory reasons. Also, in the bottom margin will appear a save button to allow the Judge to save his/her ruling on the Defense Attorney's rebuttal of non-discriminatory reasons before submitting it so the Judge can submit the ruling whenever he/she desires. In the far right of the bottom margin will appear an "Authenticate and Submit" button.

To make a ruling on the Defense Attorney's rebuttal of non-discriminatory reasons through the website, the Judge is instructed to review the Plaintiff Attorney's prima facie case, to review the Defense Attorney's rebuttal of non-discriminatory reasons, and to review the video recordings of the jurors listed in the Plaintiff Attorney's prima facie case and click a check mark in either the "Strike" box or the "Keep" box next to each juror's interactive name and picture listed inside the window. The Judge then has the option of typing an explanation of his/her ruling in the window that allows for an explanation. If the Judge keeps any of the jurors listed, the Judge must then set a new specific date and time for both the Plaintiff Attorney and the Defense Attorney to submit additional peremptory challenges in an alternating fashion through the website. The Judge then selects "Authenticate and Submit" in the bottom margin. When the Judge selects "Authenticate and Submit" and takes an authenticating picture of himself/herself with a webcam and into the invention's website as detailed above, the Judge's ruling on the Defense Attorney's rebuttal of non-discriminatory reasons will be made viewable and accessible to the Plaintiff Attorney, the Defense Attorney, the Plaintiff, the Defendant, and the Court Reporter through the invention's website and the Judge's authenticating picture will appear at the top of his/her ruling on the Defense Attorney's rebuttal of non-discriminatory reasons.

The Plaintiff, Defendant, Plaintiffs Attorney, and Defense Attorney may log in to their respective programs on the website to view the rebuttals of non-discriminatory reasons of both attorneys. They are also shown the deadlines for each attorney to submit rebuttals of non-discriminatory reasons and the dates the rebuttals were actually submitted by each attorney.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Plaintiff Attorney's rebuttal of non-discriminatory reasons through the website, the Court Reporter is then notified with an email message that he/she must print through the website the Judge's ruling on the Plaintiff Attorney's rebuttal of non-discriminatory reasons and the date it was submitted and place the copy in the Court's file for transcript purposes. Also, the email message also instructs the Court Reporter to print all email messages sent to the Judge, the Plaintiff Attorney, the Defense Attorney, the Defendant, the Plaintiff, if the case is civil, and the dates such emails were submitted to them through the website and place them in the Court's file for transcript purposes. The email message contains an interactive link to the invention's website address.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Defense Attorney's rebuttal of non-discriminatory reasons through the website, the Court Reporter is then notified with an email message that he/she must print through the website the Judge's ruling on the Defense Attorney's rebuttal of non-discriminatory reasons and the date it was submitted and place the copy in the Court's file for transcript purposes. Also, the email message also instructs the Court Reporter to print all email messages sent to the Judge, the Plaintiff Attorney, the Defense Attorney, the Defendant, the Plaintiff, if the case is civil, and the dates such emails were submitted to them through the website and place them in the Court's file for transcript purposes. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained both of the Plaintiff Attorney's and Defense Attorney's rebuttals of non-discriminatory reasons through the website or sustained one attorney's rebuttal of non-discriminatory reasons while the opposing attorney's peremptory challenges were not contested through the website meaning the Plaintiff Attorney and the Defense Attorney are not required to submit any additional peremptory challenges as their contested peremptory challenges have been preserved, the Court Reporter is then notified with an additional email message that he/she must print through the website the names and corresponding photos of the jurors who made the jury panel and alternate juror positions and the date such jurors were impaneled and made alternate juror positions and place the copy in the Court's file for transcript purposes. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules both the Plaintiff Attorney's and the Defense Attorney's respective rebuttals of non-discriminatory reasons through the website, the Plaintiff Attorney is notified with an email message that his/her rebuttal of non-discriminatory reasons was overruled and the Defense Attorney's rebuttal of non-discriminatory reasons was overruled. The email message also advises the Plaintiff Attorney that he/she may now log onto the website and view the judicial rulings on both attorneys' non-discriminatory reasons. The email message instructs the Plaintiff Attorney that he/she must log onto the website on the specific date and time designated by the Judge and submit additional peremptory challenges in an alternating fashion with the Defense Attorney. The email message also includes the specific date and time the Plaintiff Attorney and the Defense Attorney are to log onto the website to submit their required additional peremptory challenges in an alternating fashion. Thus, the email message will notify the Plaintiff Attorney of the exact number of additional peremptory challenges the Plaintiff Attorney is required to exercise through the website. Also, the email message will notify the Plaintiff Attorney of the exact number of additional peremptory challenges the Defense Attorney is required to exercise through the website. The email message further advises the Plaintiff Attorney that the number of additional peremptory challenges that the attorneys are required to exercise is equal to the number of peremptory challenges the judge overruled for each attorney. Thus, the email message advises the Plaintiff Attorney that one attorney may be required to exercise more additional peremptory challenges than his/her counterpart. The email message further advises the Plaintiff Attorney that the attorney who is required to exercise the most additional peremptory challenges will exercise the first additional peremptory challenge through the website to begin the alternating peremptory challenge process on the specific date and time designated by the Judge. Thus, if the Defense Attorney was required to exercise more additional peremptory challenges than the Plaintiff Attorney, the Defense Attorney would be required to exercise the first additional peremptory challenge through the website on the specific date and time designated by the Judge. The email message also advises the Plaintiff Attorney that the Judge, the Plaintiff, and the Defendant will be allowed to log onto the website on the specific date and time the Plaintiff Attorney and the Defense Attorney are to exercise their additional peremptory challenges in an alternating fashion through the website and view all of the additional peremptory challenge submissions of the Plaintiff Attorney and the Defense Attorney as they are submitted through the website. The email message also contains an interactive link to the invention's website address. This same email message sent to the Plaintiff Attorney also is sent to the personal email accounts of the Judge, Defense Attorney, Defendant, and Plaintiff.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules both the Plaintiff Attorney's and the Defense Attorney's respective rebuttals of non-discriminatory reasons through the website, the Defense Attorney is notified with an email message that his/her rebuttal of non-discriminatory reasons was overruled and the Plaintiff Attorney's rebuttal of non-discriminatory reasons was overruled. The email message also advises the Defense Attorney that he/she may now log onto the website and view the judicial rulings on both attorneys' non-discriminatory reasons. The email message instructs the Defense Attorney that he/she must log onto the website on the specific date and time designated by the Judge and submit additional peremptory challenges in an alternating fashion with the Plaintiff Attorney. The email message also includes the specific date and time the Plaintiff Attorney and the Defense Attorney are to log onto the website to submit their required additional peremptory challenges in an alternating fashion. Thus, the email message will notify the Defense Attorney of the exact number of additional peremptory challenges the Defense Attorney is required to exercise through the website. Also, the email message will notify the Defense Attorney of the exact number of additional peremptory challenges the Plaintiff Attorney is required to exercise through the website. The email message further advises the Defense Attorney that the number of additional peremptory challenges that the attorneys are required to exercise is equal to the number of peremptory challenges the judge overruled for each attorney. Thus, the email message advises the Defense Attorney that one attorney may be required to exercise more additional peremptory challenges than his/her counterpart. The email message further advises the Defense Attorney that the attorney who is required to exercise the most additional peremptory challenges will exercise the first additional peremptory challenge through the website to begin the alternating peremptory challenge process on the specific date and time designated by the Judge. Thus, if the Defense Attorney was required to exercise more additional peremptory challenges than the Plaintiff Attorney, the Defense Attorney would be required to exercise the first additional peremptory challenge through the website on the specific date and time designated by the Judge. The email message also advises the Defense Attorney that the Judge, the Plaintiff, and the Defendant will be allowed to log onto the website on the specific date and time the Plaintiff Attorney and the Defense Attorney are to exercise their additional peremptory challenges in an alternating fashion through the website and view all of the additional peremptory challenge submissions of the Plaintiff Attorney and the Defense Attorney as they are submitted through the website. The email message also contains an interactive link to the invention's website address. This same email message sent to the Defense Attorney also is sent to the personal email accounts of the Judge, Plaintiff Attorney, Defendant, and Plaintiff.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Plaintiff Attorney's and the Defense Attorney's respective rebuttals of non-discriminatory reasons through the website, the Judge, the Plaintiff Attorney, the Defense Attorney, the Plaintiff, and the Defendant are each sent the same email message advising them that the Plaintiff Attorney's rebuttal of non-discriminatory reasons was overruled, and the Defense Attorney's rebuttal of non-discriminatory reasons was overruled. The email message also advises them that they may now log onto the website and view the judicial rulings on both attorneys' non-discriminatory reasons. The email message also advises them that they may log onto the website on the specific date and time designated by the Judge for the Plaintiff Attorney and the Defense Attorney to submit their additional peremptory challenges in an alternating fashion through the website and view the Plaintiff Attorney's and the Defense Attorney's additional peremptory challenge submissions as the Plaintiff Attorney and the Defense Attorney submit them through the website. The email message also includes the specific date and time the Plaintiff Attorney and the Defense Attorney are to log onto the website to submit their required additional peremptory challenges in an alternating fashion. The email message also will notify the Judge, the Plaintiff, and the Defendant of the exact number of additional peremptory challenges the Plaintiff Attorney is required to exercise through the website. Also, the email message will notify them of the exact number of additional peremptory challenges the Defense Attorney is required to exercise through the website. The email message further advises them that the number of additional peremptory challenges that the attorneys are required to exercise is equal to the number of peremptory challenges the judge overruled for each attorney. Thus, the email message advises them that one attorney may be required to exercise more additional peremptory challenges than his/her counterpart. The email message further advises them that the attorney who is required to exercise the most additional peremptory challenges will exercise the first additional peremptory challenge through the website to begin the alternating peremptory challenge process on the specific date and time designated by the Judge. Thus, if the Defense Attorney was required to exercise more additional peremptory challenges than the Plaintiff Attorney, the Defense Attorney would be required to exercise the first additional peremptory challenge through the website on the specific date and time designated by the Judge. The email message also contains an interactive link to the invention's website address. This same email message sent to the Judge, the Plaintiff, and the Defendant also is sent to the personal email accounts of the Plaintiff Attorney and the Defense Attorney.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Plaintiff Attorney's rebuttal of non-discriminatory reasons through the website and if the Judge sustained the Defense Attorney's rebuttal of non-discriminatory reasons through the website or if the Defense Attorney's peremptory challenges were never contested, the Plaintiff Attorney is notified with an email message that his/her rebuttal of non-discriminatory reasons was overruled and the Defense Attorney's peremptory challenges are preserved. The email message also advises the Plaintiff Attorney that he/she may now log onto the website and view the judicial rulings on both attorneys' non-discriminatory reasons. The email message instructs the Plaintiff Attorney that he/she must log onto the website on the specific date and time designated by the Judge and submit additional peremptory challenges. The email message also includes the specific date and time the Plaintiff Attorney is to log onto the website to submit his/her required additional peremptory challenges. The email message also will notify the Plaintiff Attorney of the exact number of additional peremptory challenges the Plaintiff Attorney is required to exercise through the website. The email message further advises the Plaintiff Attorney that the number of additional peremptory challenges that he/she is required to exercise is equal to the number of Plaintiff Attorney peremptory challenges the Judge overruled through the website. The email message further advises the Plaintiff Attorney that since the Defense Attorney's peremptory challenges were preserved, the Defense Attorney is not allowed to submit any additional peremptory challenges through the website. The email message also advises the Plaintiff Attorney that he/she must log onto the website on the specific date and time designated by the Judge and submit the required number of additional peremptory challenges even if the Defense Attorney is not allowed to submit any additional peremptory challenges through the website in an alternating fashion with the Plaintiff Attorney. Thus, the email message will advise the Plaintiff Attorney that the website will allow him/her to submit his/her additional peremptory challenges on the specific date and time even if the Defense Attorney is not allowed to submit any additional peremptory challenges. The email message also contains an interactive link to the invention's website address. This same email message sent to the Plaintiff Attorney also is sent to the personal email accounts of the Judge, Defense Attorney, Defendant, and Plaintiff.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Plaintiff Attorney's rebuttal of non-discriminatory reasons through the website and if the Judge sustained the Defense Attorney's rebuttal of non-discriminatory reasons through the website or if the Defense Attorney's peremptory challenges were never contested, the Judge, the Defense Attorney, the Plaintiff, and the Defendant are each sent the same email message advising them that the Plaintiff Attorney's rebuttal of non-discriminatory reasons was overruled, and the Defense Attorney's peremptory challenges are preserved. The email message also advises them that they may now log onto the website and view the judicial rulings on both attorneys' non-discriminatory reasons. The email message also advises them that they may log onto the website on the specific date and time designated by the Judge for the Plaintiff Attorney to submit his/her additional peremptory challenges and view the Plaintiff Attorney's additional peremptory challenge submissions as the Plaintiff Attorney submits them through the website. The email message also includes the specific date and time the Plaintiff Attorney is to log onto the website to submit his/her required additional peremptory challenges in an alternating fashion. The email message also will notify the Judge, the Defense Attorney, the Plaintiff, and the Defendant of the exact number of additional peremptory challenges the Plaintiff Attorney is required to exercise through the website. The email message further advises them that the number of additional peremptory challenges that the Plaintiff Attorney is required to exercise is equal to the number of Plaintiff Attorney peremptory challenges the judge overruled. The email message further advises them that since the Defense Attorney's peremptory challenges were preserved, the Defense Attorney is not allowed to submit any additional peremptory challenges through the website. The email message also advises them that the Plaintiff Attorney must log onto the website on the specific date and time designated by the Judge and submit additional peremptory challenges even if the Defense Attorney is not allowed to submit additional peremptory challenges through the website. Thus, the email message will notify them that the Plaintiff Attorney will be advised that the website will allow him/her to submit his/her additional peremptory challenges on the specific date and time even if the Defense Attorney is not required to submit any additional peremptory challenges. The email message also contains an interactive link to the invention's website address. This same email message sent to the Judge, the Defense Attorney, the Plaintiff, and the Defendant also is sent to the personal email account of the Plaintiff Attorney.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Defense Attorney's rebuttal of non-discriminatory reasons through the website and if the Judge sustained the Plaintiff Attorney's rebuttal of non-discriminatory reasons through the website or if the Plaintiff Attorney's peremptory challenges were never contested, the Defense Attorney is notified with an email message that his/her rebuttal of non-discriminatory reasons was overruled and the Plaintiff Attorney's peremptory challenges are preserved. The email message also advises the Defense Attorney that he/she may now log onto the website and view the judicial rulings on both attorneys' non-discriminatory reasons. The email message instructs the Defense Attorney that he/she must log onto the website on the specific date and time designated by the Judge and submit additional peremptory challenges. The email message also includes the specific date and time the Defense Attorney is to log onto the website to submit his/her required additional peremptory challenges. The email message also will notify the Defense Attorney of the exact number of additional peremptory challenges the Defense Attorney is required to exercise through the website. The email message further advises the Defense Attorney that the number of additional peremptory challenges that he/she is required to exercise is equal to the number of Defense Attorney peremptory challenges the Judge overruled through the website. The email message further advises the Defense Attorney that since the Plaintiff Attorney's peremptory challenges were preserved, the Plaintiff Attorney is not allowed to submit any additional peremptory challenges through the website. The email message also advises the Defense Attorney that he/she must log onto the website on the specific date and time designated by the Judge and submit the required number of additional peremptory challenges even if the Plaintiff Attorney is not allowed to submit any additional peremptory challenges through the website in an alternating fashion with the Defense Attorney. Thus, the email message will advise the Defense Attorney that the website will allow him/her to submit his/her additional peremptory challenges on the specific date and time even if the Plaintiff Attorney is not allowed to submit any additional peremptory challenges. The email message also contains an interactive link to the invention's website address. This same email message sent to the Defense Attorney also is sent to the personal email accounts of the Judge, Plaintiff Attorney, Defendant, and Plaintiff.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Defense Attorney's rebuttal of non-discriminatory reasons through the website and if the Judge sustained the Plaintiff Attorney's rebuttal of non-discriminatory reasons through the website or if the Plaintiff Attorney's peremptory challenges were never contested, the Judge, the Plaintiff Attorney, the Plaintiff, and the Defendant are each sent the same email message advising them that the Defense Attorney's rebuttal of non-discriminatory reasons was overruled, and the Plaintiff Attorney's peremptory challenges are preserved. The email message also advises them that they may now log onto the website and view the judicial rulings on both attorneys' non-discriminatory reasons. The email message also advises them that they may log onto the website on the specific date and time designated by the Judge for the Defense Attorney to submit his/her additional peremptory challenges and view the Defense Attorney's additional peremptory challenge submissions as the Defense Attorney submits them through the website. The email message also includes the specific date and time the Defense Attorney is to log onto the website to submit his/her required additional peremptory challenges in an alternating fashion. The email message also will notify the Judge, the Plaintiff Attorney, the Plaintiff, and the Defendant of the exact number of additional peremptory challenges the Defense Attorney is required to exercise through the website. The email message further advises them that the number of additional peremptory challenges that the Defense Attorney is required to exercise is equal to the number of Defense Attorney peremptory challenges the judge overruled. The email message further advises them that since the Plaintiff Attorney's peremptory challenges were preserved, the Plaintiff Attorney is not allowed to submit any additional peremptory challenges through the website. The email message also advises them that the Defense Attorney must log onto the website on the specific date and time designated by the Judge and submit additional peremptory challenges even if the Plaintiff Attorney is not allowed to submit additional peremptory challenges through the website. Thus, the email message will notify them that the Defense Attorney will be advised that the website will allow him/her to submit his/her additional peremptory challenges on the specific date and time even if the Plaintiff Attorney is not required to submit any additional peremptory challenges. The email message also contains an interactive link to the invention's website address. This same email message sent to the Judge, the Plaintiff Attorney, the Plaintiff, and the Defendant also is sent to the personal email account of the Defense Attorney.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustains through the website both the Plaintiff Attorney's and Defense Attorney's rebuttals of non-discriminatory reasons to preserve their contested peremptory challenges or if the Judge sustains through the website one attorney's rebuttal of non-discriminatory reasons to preserve his/her contested peremptory challenges while the opposing attorney's peremptory challenges were uncontested and otherwise preserved, the Judge, Plaintiff Attorney, Defense Attorney, the Plaintiff, and the Defendant are all sent the same email message that they may now log onto the website and view the Judge's rulings sustaining either or both of the Plaintiff Attorney's and Defense Attorney's submitted rebuttals of non-discriminatory reasons and view and/or print the names and corresponding photos, videos, questionnaires, and their respective analysis and assigned numbers of the jurors who make up the jury panel and alternate juror positions and all jurors excluded with either a challenge for cause or an original peremptory challenge. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustains through the website both the Plaintiff Attorney's and Defense Attorney's rebuttals of non-discriminatory reasons to preserve their contested peremptory challenges or if the Judge sustains through the website one attorney's rebuttal of non-discriminatory reasons to preserve his/her contested peremptory challenges while the opposing attorney's peremptory challenges were uncontested and otherwise preserved, the Court Administrator is sent an email message that he/she may now log onto the website and draft a summons for jury duty for each juror making up the jury panel and the alternate jurors and is instructed to mail such jurors the summons for jury duty which will order them to appear on the date the jury trial is to begin. Additionally, the email message instructs the Court Administrator to send a letter to each juror that was excluded with a peremptory challenge through the invention's website that they are excused from jury duty. The email message includes the names and addresses of the jurors who were excluded with a peremptory challenge. The email message contains an interactive link to the invention's website address.

Also, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits a ruling through the website on either or both attorney's rebuttal of non-discriminatory reasons to preserve his/her contested peremptory challenges, the Judge, Plaintiff Attorney, Plaintiff, Defense Attorney, Defendant, Court Reporter, and the Court Administrator each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Plaintiff Attorney's rebuttal of non-discriminatory reasons through the website, the Court Reporter logs onto the website and prints the Judge's ruling on the Plaintiff Attorney's rebuttal of non-discriminatory reasons and places it in the Court's file for transcript purposes. The date the Judge issued a ruling on the Plaintiff Attorney's rebuttal of non-discriminatory reasons will appear at the top of the screen.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge submits his/her ruling on the Defense Attorney's rebuttal of non-discriminatory reasons through the website, the Court Reporter logs onto the website and prints the Judge's ruling on the Defense Attorney's rebuttal of non-discriminatory reasons and places it in the Court's file for transcript purposes. The date the Judge issued a ruling on the Defense Attorney's rebuttal of non-discriminatory reasons will appear at the top of the screen.

Also, the Court Reporter prints all email messages sent to the Judge, the Plaintiff Attorney, the Defense Attorney, the Defendant, the Plaintiff, if the case is civil, and the dates such emails were submitted to them through the website and places them in the Court's file for transcript purposes.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained both of the Plaintiff Attorney's and Defense Attorney's rebuttals of non-discriminatory reasons through the website or sustained one attorney's rebuttal of non-discriminatory reasons while the opposing attorney's peremptory challenges were not contested through the website meaning the Plaintiff Attorney and the Defense Attorney are not required to submit any additional peremptory challenges as their contested peremptory challenges have been preserved, the Court Reporter logs onto the website and prints the names and corresponding photos of the jurors who made the jury panel and made the alternate jurors positions. In the print, the jurors making up the jury panel and alternate juror positions will be numbered from 1 to the total number of jurors the Judge elected to make up the jury panel and alternate juror positions. The jurors will be numbered in alphabetical order. Next to the Juror's number will appear the juror's name, and to the right of the juror's name will appear the juror's respective photo.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules both the Plaintiff Attorney's and the Defense Attorney's respective rebuttals of non-discriminatory reasons to preserve their peremptory challenges through the website, the Plaintiff Attorney and the Defense Attorney log into their respective programs on the website on the same specified date and time set by the judge and submit their additional peremptory challenges in an alternating fashion through the website as detailed below. When both the Plaintiff Attorney and the Defense Attorney log into their respective programs on the website to exercise their additional peremptory challenges in an alternating fashion on the same specified date and time designated by the Judge, they are advised that the number of additional peremptory challenges that the attorneys are required to exercise is equal to the number of peremptory challenges the judge overruled for each attorney. They are further advised that one attorney may be required to exercise more additional peremptory challenges than his/her counterpart. They are further advised that the attorney who is required to exercise the most additional peremptory challenges will exercise the first additional peremptory challenge through the website to begin the alternating peremptory challenge process on the specific date and time designated by the Judge. They are further advised of the exact number of additional peremptory challenges the Plaintiff Attorney is required to exercise through the website, and they are advised of the exact number of additional peremptory challenges the Defense Attorney is required to exercise through the website. They are further advised of which attorney must submit the first peremptory challenge through the website to begin the alternating peremptory challenge process. For example, if the Defense Attorney is required to exercise 3 additional peremptory challenges through the website, and the Plaintiff Attorney is required to exercise 2 additional peremptory challenges through the website, both attorneys will be advised through their respective programs in the website that the Defense Attorney is required to submit the first additional peremptory challenge to begin the alternating peremptory challenge process with the Plaintiff Attorney. If both the Plaintiff Attorney's and the Defense Attorney's respective rebuttals of non-discriminatory reasons were overruled by the Judge, and both the Plaintiff Attorney and the Defense Attorney are each required to submit the same number of additional peremptory challenges through the website, they are further advised that the Plaintiff Attorney is required to exercise the first additional peremptory challenge through the website to begin the alternating peremptory challenge process on the specific date and time designated by the Judge. They are further advised that during this process of attorneys submitting their additional peremptory challenges through the website in an alternating fashion, the attorney who is not required to submit the first additional peremptory challenge to begin the alternating peremptory challenge process will not be allowed to submit an additional peremptory challenge through the website until the attorney who is required to submit the first additional peremptory challenge submits his/her first peremptory challenge through the website. They are further advised that once the attorney who is required to submit the first additional peremptory challenge to begin the alternating peremptory challenge process submits the first additional peremptory challenge to begin the alternating peremptory challenge process through the website, he/she will not be allowed to submit a subsequent additional peremptory challenge until the opposing attorney submits an additional peremptory challenge through the website first. Likewise, they further will be advised that after the attorney who was not required to submit the first additional peremptory challenge to begin the alternating peremptory challenge process submits an additional peremptory challenge through the website, he/she will not be allowed to submit a subsequent peremptory challenge through the website until the attorney who was required to submit the first additional peremptory challenge submits another additional peremptory challenge through the website. They further will be advised that if the attorney who was not required to submit the first additional peremptory challenge to begin the alternating peremptory challenge process submits his/her final additional peremptory challenge through the website and the attorney who was required to submit the first additional peremptory challenge to begin the alternating peremptory challenge process through the website has more than one peremptory challenge left to submit through the website, the attorney who was required to submit the first additional peremptory challenge to begin the alternating peremptory challenge through the website will be allowed to submit his/her remaining additional peremptory challenges through the website by submitting one at a time in the manner detailed below without the opposing attorney submitting anymore additional peremptory challenges through the website. They further will be advised that each attorney will be allowed the same limited number of minutes to submit each additional peremptory challenge as originally set by the Judge through the website in the Custom Setup of the Jury Selection Process for the attorneys to submit their original peremptory challenges.

When the Plaintiff Attorney and the Defense Attorney log into their respective programs on the website on the same specified date and time to submit their additional peremptory challenges in an alternating fashion, they each select "Submit Additional Peremptory Challenge Exercises in Alternating Fashion" from his/her respective Main Menu of Functions.

When the Plaintiff Attorney selects "Submit Additional Peremptory Challenge Exercises in Alternating Fashion" from his/her respective Main Menu of Functions at the specified date and time set by the Judge for attorneys to submit additional peremptory challenges in an alternating fashion and if the Judge overruled both the attorneys' respective rebuttals of non-discriminatory reasons, the Plaintiff Attorney is initially shown a large grey window on his/her screen that states as follows:

The Plaintiff Attorney and the Defense Attorney exercise their additional peremptory challenges through this website by alternating back and forth. The Plaintiff Attorney is required to submit (the number of additional peremptory challenges the Plaintiff Attorney is required to submit appears here) additional peremptory challenges.

The Defense Attorney is required to submit (the number of additional peremptory challenges the Defense Attorney is required to submit appears here) additional peremptory challenges.

One attorney may be required to exercise more additional peremptory challenges than his/her counterpart. The attorney who is required to exercise the most additional peremptory challenges is required to exercise the first additional peremptory challenge through the website to begin the alternating peremptory challenge process on the specific date and time designated by the Judge.

However, if both the Plaintiff Attorney and the Defense Attorney are each required to submit the same number of additional peremptory challenges through the website, the Plaintiff Attorney is required to exercise the first additional peremptory challenge through the website to begin the alternating peremptory challenge process on the specific date and time designated by the Judge.

During the alternating process of attorneys submitting their additional peremptory challenges through the website in an alternating fashion, the attorney who is not required to submit the first additional peremptory challenge to begin the alternating peremptory challenge process will not be allowed to submit an additional peremptory challenge through the website until the attorney who is required to submit the first additional peremptory challenge submits his/her first additional peremptory challenge through the website.

Once the attorney who is required to submit the first additional peremptory challenge to begin the alternating peremptory challenge process submits the first additional peremptory challenge to begin the alternating peremptory challenge process through the website, he/she will not be allowed to submit a subsequent additional peremptory challenge until the opposing attorney submits an additional peremptory challenge through the website first.

After the attorney who was not required to submit the first additional peremptory challenge to begin the alternating peremptory challenge process submits an additional peremptory challenge through the website, he/she will not be allowed to submit a subsequent peremptory challenge through the website until the attorney who was required to submit the first additional peremptory challenge submits another peremptory challenge through the website.

If the attorney who was not required to submit the first additional peremptory challenge to begin the alternating peremptory challenge process submits his/her final additional peremptory challenge through the website and the attorney who was required to submit the first additional peremptory challenge to begin the alternating peremptory challenge process through the website has more than one additional peremptory challenge left to submit through the website, the attorney who was required to submit the first additional peremptory challenge to begin the alternating peremptory challenge through the website will be allowed to submit all of his/her remaining additional peremptory challenges through the website by submitting one additional peremptory challenge at a time without the opposing attorney submitting anymore additional peremptory challenges through the website.

To successfully submit an additional peremptory challenge, you must click a check mark in one box next to the interactive name and picture of one particular juror and click "Authenticate and Submit One Peremptory Challenge" in the bottom margin of the screen.

Each attorney will be allowed (the number of minutes the Judge allotted each attorney to submit each peremptory challenge through the website in the Custom Setup of the Jury Selection Process appears here) minutes to submit each additional peremptory challenge.

If you do not submit an additional peremptory challenge within the designated time limit, you are still required to submit an additional peremptory challenge through the website regardless if the time limit expires.

The attorney who is required to submit the first additional peremptory challenge to begin the alternating peremptory challenge process will not be allowed to begin the alternating peremptory challenge process with the opposing attorney by submitting the first additional peremptory challenge until (the date and time the judge specified for attorneys to submit their additional peremptory challenges in an alternating fashion appears here).

Once you click the "OK" button at the bottom of this message on or after the specified time on the specified date, this message will disappear. Once this message disappears and if you are the attorney who is required to submit the first additional peremptory challenge, a new message in a green window will appear on the screen advising you that you are now required to submit the first additional peremptory challenge through the website to begin the alternating peremptory challenge process with the Defense Attorney. However, once this message disappears and if you are not the attorney who is required to submit the first additional peremptory challenge, a new message in a red window will appear on the screen advising you that you are not allowed to submit an additional peremptory challenge until the Defense Attorney submits his/her first additional peremptory challenge.

You may minimize this message into the bottom margin of your screen to allow you to review your professional jury consultant's notes, your notes, the Plaintiff's notes, questionnaires, and/or videos of the jurors at any time before the specified date and time both attorneys are to submit their peremptory challenges through the website in an alternating fashion. Thus, you are encouraged to review your professional jury consultant's notes, your notes, the Plaintiff's notes, questionnaires, and/or videos of the jurors as much as you desire to prepare yourself for the additional peremptory challenge submission process before the specified date and time both attorneys are to submit their additional peremptory challenges through the website in an alternating fashion.

Below the above said message in the window will appear a button that says "OK." When the Plaintiff Attorney clicks the "OK" button on or after the specified date and time, the above said message disappears. The large grey window with the above said message will not disappear by clicking the "OK" button at any time before the specified date and time both attorneys are to submit their additional peremptory challenges through the website in an alternating fashion. However, the Plaintiff Attorney will be allowed to minimize the above said grey message into the bottom margin of his/her screen to allow him/her to review his/her professional jury consultant's notes, his/her own notes, the Plaintiff's notes, questionnaires, and/or videos of the jurors at any time before the specified date and time both attorneys are to submit their additional peremptory challenges through the website in an alternating fashion. Thus, the Plaintiff Attorney is instructed to review his/her professional jury consultant's notes, his/her notes, the Plaintiff's notes, questionnaires, and/or videos of the jurors as much as he/she desires to prepare him/her for the additional peremptory challenge submission process before the specified date and time both attorneys are to submit their additional peremptory challenges through the website in an alternating fashion. The above said grey message will always appear on the Plaintiff Attorney's screen each time he/she selects "Submit Additional Peremptory Challenge Exercises in Alternating Fashion" from his/her respective Main Menu of Functions in the website.

If the Plaintiff Attorney is required to submit the first additional peremptory challenge to begin the alternating peremptory challenge process and the time has begun on the specific date for attorneys to submit their additional peremptory challenges in an alternating fashion, or if the Plaintiff Attorney has at least one additional peremptory challenge to submit through the website and the Defense Attorney has just submitted a peremptory challenge through the website or is not required to submit another peremptory challenge through the website, and if the Plaintiff Attorney makes the above said message disappear on or after the specified date and time for attorneys to exercise their additional peremptory challenges in an alternating fashion, a new light green window will appear on the screen that states as follows:

The Plaintiff Attorney is now required to submit an additional peremptory challenge through the website. Time remaining for the Plaintiff Attorney to submit an additional peremptory challenge: (The amount of time the Judge allotted for each attorney to submit a peremptory challenge through the website in the Custom Setup of the Jury Selection Process will appear here.) Below this said message in the window will appear a button that says "OK." When the Plaintiff Attorney clicks the "OK" button, this said message disappears to allow the Plaintiff Attorney to submit an additional peremptory challenge through the website as detailed below.

Once the above said message in the light green window disappears, the Plaintiff Attorney is given and shown all of the exact same features that the Plaintiff Attorney was given and shown when he/she submitted his/her original peremptory challenges through the website as detailed above. Thus, the Plaintiff Attorney submits his/her additional peremptory challenges through the website the same way he/she submitted his/her original peremptory challenges through the website. Thus, the Plaintiff Attorney is shown the following: 1) interactive names and interactive pictures of only the remaining jurors who were not excluded with a challenge for cause through the website, 2) the Plaintiff Attorney's Professional Jury Consultant's analysis and assigned number of each particular juror if the Plaintiff Attorney selected a professional jury consultant, 3) the Plaintiff Attorney's confidential analysis and assigned number of each respective juror, 4) the Plaintiff's own personal analysis and assigned number of each particular juror, 5) a scroll bar in the in the far right edge of the screen will appear to view all of the above stated features, 6) the current date and time will appear in the top margin of the screen, 7) the specified date and time for both attorneys to submit their additional peremptory challenges in an alternating fashion through the website will appear directly below the current date and time, 8) the amount of time the Judge allotted for each attorney to submit a peremptory challenge through the website in the Custom Setup of the Jury Selection Process will appear, 9) a box will appear to the left of each juror's interactive name and picture with the instruction above each box that states "Select hear to exclude this juror with a peremptory challenge," 10) a button labeled "Previous" will appear in the bottom margin of the screen, 11) a rectangular light green window that states "Authenticate and Submit One Peremptory Challenge" will appear in the bottom margin of the screen, 12) a window labeled "Plaintiff Attorney's Additional Peremptory Challenge Submissions," and 13) a window labeled "Defense Attorney's Additional Peremptory Challenge Submissions."

With regard to the interactive names and interactive pictures of only the remaining jurors who were not excluded with a challenge for cause through the website appearing on the Plaintiff Attorney's screen, the interactive names of the jurors that were struck with an uncontested peremptory challenge by either attorney when the attorneys submitted their original peremptory challenges will appear highlighted in light red and will have a strike through line through them indicating the juror is not available to be struck with an additional peremptory challenge. Thus, only the interactive names of the jurors that are not highlighted in red with a strike through line are the only interactive names that the Plaintiff Attorney may strike with an additional peremptory challenge through the website. Additionally, all of the interactive names struck by an attorney's peremptory challenges that were overruled by the Judge through the website are automatically included in the jury panel and are not eligible to be struck by an additional peremptory challenge. Thus, directly above the bottom margin of the Plaintiff Attorney's screen will be a narrow rectangular window with a label that states "Jury Panel and Alternate Jurors." The interactive names of jurors who were struck by attorney peremptory challenges which were subsequently overruled by the Judge will appear in alphabetical order under the label "Jury Panel and Alternate Jurors" in the narrow rectangular window, and they will not appear on the Plaintiff Attorney's screen as possible interactive names the Plaintiff Attorney may strike with an additional peremptory challenge.

Also, with regard to the window labeled "Plaintiff Attorney's Additional Peremptory Challenge Submissions" on the Plaintiff Attorney's screen, directly below the label "Plaintiff Attorney's Additional Peremptory Challenge Submissions" and within the said window will appear consecutive numbers from 1 to the total number of additional peremptory challenges the Plaintiff Attorney is required to submit. For example, if the judge overruled 5 of the Plaintiff Attorney's original peremptory challenges through the website, the window labeled "Plaintiff Attorney's Additional Peremptory Challenge Submissions" will appear consecutive numbers from 1-5. When the Plaintiff Attorney successfully submits his/her first additional peremptory challenge, the name of the juror the Plaintiff Attorney selected to exclude with a peremptory challenge will appear next to the number one in the window labeled "Plaintiff Attorney's Additional Peremptory Challenge Submissions." When the Plaintiff Attorney successfully submits his/her second additional peremptory challenge, the name of the juror the Plaintiff Attorney selected to exclude with a peremptory challenge immediately will appear next to the number two in the window labeled "Plaintiff Attorney's Additional Peremptory Challenge Submissions." Thus, the name of each juror excluded with a Plaintiff Attorney's additional peremptory challenge through the website will appear next to the number that corresponds with the order the juror was excluded with a peremptory challenge through the website by the Plaintiff Attorney in the window labeled "Plaintiff Attorney's Additional Peremptory Challenge Submissions." To the right of each juror's name on the list in the window labeled "Plaintiff Attorney's Additional Peremptory Challenge Submissions" will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit One Peremptory Challenge" just before the Plaintiff Attorney submitted the peremptory challenge through the website.

Also, with regard to the window labeled "Defense Attorney's Additional Peremptory Challenge Submissions" on the Plaintiff Attorney's screen, directly below the label "Defense Attorney's Additional Peremptory Challenge Submissions" and within the said window will appear consecutive numbers from 1 to the total number of additional peremptory challenges the Defense Attorney is required to submit. For example, if the judge overruled 3 of the Defense Attorney's original peremptory challenges through the website, the window labeled "Defense Attorney's Additional Peremptory Challenge Submissions" will appear consecutive numbers from 1-3. When the Defense Attorney successfully submits his/her first additional peremptory challenge, the name of the juror the Defense Attorney selected to exclude with an additional peremptory challenge will appear next to the number one in the window labeled "Defense Attorney's Additional Peremptory Challenge Submissions" on the Plaintiff Attorney's screen so the Plaintiff Attorney can monitor the Defense Attorney's additional peremptory challenge submissions through the website as detailed above. When the Defense Attorney successfully submits his/her second additional peremptory challenge, the name of the juror the Defense Attorney selected to exclude with a peremptory challenge immediately will appear next to the number two in the window labeled "Defense Attorney's Additional Peremptory Challenge Submissions" on the Plaintiff Attorney's screen. Thus, the name of each juror excluded with a Defense Attorney's additional peremptory challenge through the website will appear next to the number that corresponds with the order the juror was excluded with an additional peremptory challenge through the website by the Defense Attorney in the window labeled "Defense Attorney's Additional Peremptory Challenge Submissions" on the Plaintiff Attorney's screen. To the right of each juror's name on the list in the window labeled "Defense Attorney's Additional Peremptory Challenge Submissions" on the Plaintiff Attorney's screen will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit One Peremptory Challenge" just before the Defense Attorney submitted the peremptory challenge through the website so the Plaintiff Attorney can monitor each of the Defense Attorney's additional peremptory challenges.

When the Plaintiff Attorney clicks the "OK" button on the message in the above said light green window, and the window disappears, the time the Judge allotted for each attorney to submit a peremptory challenge immediately will begin to count down so the Plaintiff Attorney can monitor how much time he/she has to submit a peremptory challenge through the website.

Ultimately, the Plaintiff Attorney submits all of his/her additional peremptory challenges in the exact same manner through the website as he/she submitted his/her original peremptory challenges through the website. Thus, to submit an additional peremptory challenge, the Plaintiff Attorney clicks a check mark in one box next to the interactive name and picture of one particular juror who has not been struck with a previous peremptory challenge and clicks "Authenticate and Submit One Peremptory Challenge." When the Plaintiff Attorney selects the "Authenticate and Submit One Peremptory Challenge" option and takes an authenticating picture of himself/herself with a webcam and into the invention's website as detailed above, the Plaintiff Attorney's additional peremptory challenge will be made viewable and accessible to the Judge, the Defense Attorney, the Plaintiff, the Defendant, and the Court Reporter through the invention's website and the Plaintiff Attorney's authenticating picture will appear next to the Plaintiff Attorney's additional peremptory challenge on their respective screens.

Every time the Plaintiff Attorney exercises an additional peremptory challenge by clicking the "Authenticate and Submit One Peremptory Challenge" button in his/her program after clicking a check mark in the box next to one particular juror's interactive name and picture, the selected juror's name, on the screen, will become highlighted in light red and a single strike through line will appear through the juror's name.

Additionally, every time the Defense Attorney submits an additional peremptory challenge through the website, the name of the juror the Defense Attorney selected to exclude with an additional peremptory challenge will become highlighted in light red and a single strike through line will appear through the juror's name on the Plaintiff Attorney's screen. Also, every time the Defense Attorney submits an additional peremptory challenge through the website, a check mark will appear in the box next to the interactive picture and name of the juror the Defense Attorney selected to exclude with an additional peremptory challenge on the Plaintiff Attorney's screen.

Also, every time the Plaintiff Attorney successfully submits a peremptory challenge through the website in the manner detailed above and if the Plaintiff Attorney and the Defense Attorney are both required to submit at least one more additional peremptory challenge through the website, or if the Defense Attorney is required to submit the first additional peremptory challenge through the website to initiate the alternating peremptory challenge process with the Plaintiff Attorney and the Plaintiff Attorney has at least one more additional peremptory challenge to submit through the website, a light red window will then appear in the bottom right corner of the Plaintiff Attorney's screen that covers the "Authenticate and Submit One Peremptory Challenge" button. The light red window states as follows:

> The Defense Attorney is now submitting an additional peremptory challenge through the website. You are not allowed to submit an additional peremptory challenge through this website until the Defense Attorney submits a peremptory challenge through this website. After the Defense Attorney submits a peremptory challenge, you must submit another peremptory challenge through this website within the amount of time the Judge allotted for each attorney to submit a peremptory challenge. Time remaining for the Defense Attorney to submit a peremptory challenge: (The amount of time the Judge allotted for each attorney to submit a peremptory challenge through the website in the Custom Setup of the Jury Selection Process will appear here and will begin to count down immediately upon the Defense Attorney clicking on the OK button on the light green message in his/her own program to begin the process of exercising a peremptory challenge as detailed above.)

While the above said light red window with the above said message appears in the bottom corner of the screen, the Plaintiff Attorney is allowed to review all notes on the interactive jurors and review the questionnaires and videos of the jurors while the Plaintiff Attorney waits for the Defense Attorney to submit a peremptory challenge. Once the Defense Attorney submits a peremptory challenge through the website and the Plaintiff Attorney is required to submit at least one more peremptory challenge through the website, the above said light red message and window on the Plaintiff Attorney's screen will disappear and the "Authenticate and Submit One Peremptory Challenge" button will reappear in the right side of the bottom margin of the screen to allow the Plaintiff Attorney to submit another additional peremptory challenge through the website.

If the Plaintiff Attorney is required to submit the first additional peremptory challenge through the website to initiate the alternating peremptory challenge process with the Defense Attorney, or if the Plaintiff Attorney and the Defense Attorney have both exercised additional peremptory challenges in an alternating fashion through the website, and if the Defense Attorney has submitted all of his/her additional peremptory challenges through the website and is not allowed to submit anymore additional peremptory challenges through the website, and if the Plaintiff Attorney has more than one additional peremptory challenge left to exercise through the website, and if the Plaintiff Attorney just submitted an additional peremptory challenge through the website, the same light green window detailed above will appear on the Plaintiff Attorney's screen that states as follows:

> The Plaintiff Attorney is now required to submit an additional peremptory challenge through the website. The time remaining for the Plaintiff Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Plaintiff Attorney clicks the "OK" button, this said message disappears to allow the Plaintiff Attorney to submit another additional peremptory challenge through the website as detailed above.

If the Plaintiff Attorney and the Defense Attorney are both required to exercise additional peremptory challenges in an alternating fashion through the website, and if the Plaintiff Attorney has just submitted his/her only or final additional peremptory challenge through the website and is not allowed to submit anymore additional peremptory challenges through the website, and if the Defense Attorney has one or more additional peremptory challenges left to exercise through the website, a new light red window will then appear in the bottom right corner of the Plaintiff Attorney's screen that covers the "Authenticate and Submit One Peremptory Challenge" button. The light red window states as follows:

> Your additional peremptory challenges were successfully submitted. You have successfully submitted all of your required additional peremptory challenges through the website, and you are not allowed to submit anymore additional peremptory challenges through the website. The Defense Attorney is now submitting a required additional peremptory challenge through the website. You may log off the website at this time, or you may stay logged into your program to view all of the rest of the Defense Attorney's required additional peremptory challenges through your program. The Defense Attorney has (the number of additional peremptory challenges the Defense Attorney has left to exercise through the website appears here) additional peremptory challenges left to exercise through the website. The time remaining for the Defense Attorney to submit an additional peremptory challenge: (The amount of time the Judge allotted for each attorney to submit a peremptory challenge through the website in the Custom Setup of the Jury Selection Process will appear here and will begin to count down immediately upon the Defense Attorney clicking on the OK button on the light green message in his/her own program to begin the process of exercising an additional peremptory challenge as detailed above.)

If the Plaintiff Attorney and the Defense Attorney are both required to exercise additional peremptory challenges in an alternating fashion through the website, and if the Plaintiff Attorney and the Defense Attorney both have submitted his/her only or final additional peremptory challenge through the website and neither the Plaintiff Attorney or the Defense Attorney are allowed to submit anymore additional peremptory challenges through the website, any above stated light red message on the Plaintiff Attorney's screen that states that the Defense Attorney is now submitting a required additional peremptory challenge disappears, and a new light red window appears on the Plaintiff Attorney's screen that states as follows:

> Both attorneys have submitted all of their required additional peremptory challenges through the website. The alternating peremptory challenge process through the website for additional peremptory challenges is now complete. Neither attorney is allowed to submit anymore additional peremptory challenges through the website. You may now log off the website, or you may review all of the peremptory challenge exercises or review the remaining juror pictures, videos, questionnaires, and confidential notes.

Below this message will appear a button labeled "OK." By the Plaintiff Attorney clicking on the OK button, the said light red window with this message disappears. Once the said message disappears, the Plaintiff Attorney may review all of the peremptory challenge exercises or review the remaining juror pictures, videos, questionnaires, and confidential notes. The Plaintiff Attorney may also log off of the website.

Every time the Plaintiff Attorney selects "Submit Additional Peremptory Challenge Exercises in Alternating Fashion" from his/her respective Main Menu of Functions, the Plaintiff Attorney is advised to review his/her professional jury consultant's analysis and assigned number of each juror, his/her own analysis and assigned number of each juror, the Plaintiffs analysis and assigned number of each juror, questionnaires, and/or videos of each juror and then decide which jurors to keep or exclude with an additional peremptory challenge before the specified date and time the alternating additional peremptory challenge process begins to prepare him/her for the alternating additional peremptory challenge process.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules both the Plaintiff Attorney's and the Defense Attorney's respective rebuttals of non-discriminatory reasons to preserve their peremptory challenges through the website, and if the Plaintiff Attorney and the Defense Attorney log into their respective programs on the website on the same specified date and time set by the judge to submit their additional peremptory challenges in an alternating fashion through the website as detailed above, and if the Defense Attorney selects "Submit Additional Peremptory Challenge Exercises in Alternating Fashion" from his/her respective Main Menu of Functions, the Defense Attorney is initially shown a large grey window on his/her screen that states as follows:

> The Plaintiff Attorney and the Defense Attorney exercise their additional peremptory challenges through this website by alternating back and forth. The Plaintiff Attorney is required to submit (the number of additional peremptory challenges the Plaintiff Attorney is required to submit appears here) additional peremptory challenges.

The Defense Attorney is required to submit (the number of additional peremptory challenges the Defense Attorney is required to submit appears here) additional peremptory challenges.

One attorney may be required to exercise more additional peremptory challenges than his/her counterpart. The attorney who is required to exercise the most additional peremptory challenges is required to exercise the first additional peremptory challenge through the website to begin the alternating peremptory challenge process on the specific date and time designated by the Judge.

However, if both the Plaintiff Attorney and the Defense Attorney are each required to submit the same number of additional peremptory challenges through the website, the Plaintiff Attorney is required to exercise the first additional peremptory challenge through the website to begin the alternating peremptory challenge process on the specific date and time designated by the Judge.

During the alternating process of attorneys submitting their additional peremptory challenges through the website in an alternating fashion, the attorney who is not required to submit the first additional peremptory challenge to begin the alternating peremptory challenge process will not be allowed to submit an additional peremptory challenge through the website until the attorney who is required to submit the first additional peremptory challenge submits his/her first additional peremptory challenge through the website.

Once the attorney who is required to submit the first additional peremptory challenge to begin the alternating peremptory challenge process submits the first additional peremptory challenge to begin the alternating peremptory challenge process through the website, he/she will not be allowed to submit a subsequent additional peremptory challenge until the opposing attorney submits an additional peremptory challenge through the website first.

After the attorney who was not required to submit the first additional peremptory challenge to begin the alternating peremptory challenge process submits an additional peremptory challenge through the website, he/she will not be allowed to submit a subsequent peremptory challenge through the website until the attorney who was required to submit the first additional peremptory challenge submits another peremptory challenge through the website.

If the attorney who was not required to submit the first additional peremptory challenge to begin the alternating peremptory challenge process submits his/her final additional peremptory challenge through the website and the attorney who was required to submit the first additional peremptory challenge to begin the alternating peremptory challenge process through the website has more than one additional peremptory challenge left to submit through the website, the attorney who was required to submit the first additional peremptory challenge to begin the alternating peremptory challenge through the website will be allowed to submit all of his/her remaining additional peremptory challenges through the website by submitting one additional peremptory challenge at a time without the opposing attorney submitting anymore additional peremptory challenges through the website.

To successfully submit an additional peremptory challenge, you must click a check mark in one box next to the interactive name and picture of one particular juror and click "Authenticate and Submit One Peremptory Challenge" in the bottom margin of the screen. Each attorney will be allowed (the number of minutes the Judge allotted each attorney to submit each peremptory challenge through the website in the Custom Setup of the Jury Selection Process appears here) minutes to submit each additional peremptory challenge.

If you do not submit an additional peremptory challenge within the designated time limit, you are still required to submit an additional peremptory challenge through the website regardless if the time limit expires.

The attorney who is required to submit the first additional peremptory challenge to begin the alternating peremptory challenge process will not be allowed to begin the alternating peremptory challenge process with the opposing attorney by submitting the first additional peremptory challenge until (the date and time the judge specified for attorneys to submit their additional peremptory challenges in an alternating fashion appears here).

Once you click the "OK" button at the bottom of this message on or after the specified time on the specified date, this message will disappear. Once this message disappears and if you are the attorney who is required to submit the first additional peremptory challenge, a new message in a green window will appear on the screen advising you that you are now required to submit the first additional peremptory challenge through the website to begin the alternating peremptory challenge process with the Plaintiff Attorney. However, once this message disappears and if you are not the attorney who is required to submit the first additional peremptory challenge, a new message in a red window will appear on the screen advising you that you are not allowed to submit an additional peremptory challenge until the Plaintiff Attorney submits his/her first additional peremptory challenge.

You may minimize this message into the bottom margin of your screen to allow you to review your professional jury consultant's notes, your notes, the Defendant's notes, questionnaires, and/or videos of the jurors at any time before the specified date and time both attorneys are to submit their peremptory challenges through the website in an alternating fashion. Thus, you are encouraged to review your professional jury consultant's notes, your notes, the Defendant's notes, questionnaires, and/or videos of the jurors as much as you desire to prepare yourself for the additional peremptory challenge submission process before the specified date and time both attorneys are to submit their additional peremptory challenges through the website in an alternating fashion.

Below the above said message in the window will appear a button that says "OK." When the Defense Attorney clicks the "OK" button on or after the specified date and time, the above said message disappears. The large grey window with the above said message will not disappear by clicking the "OK" button at any time before the specified date and time both attorneys are to submit their additional peremptory challenges through the website in an alternating fashion. However, the Defense Attorney will be allowed to minimize the above said grey message into the bottom margin of his/her screen to allow him/her to review his/her professional jury consultant's notes, his/her own notes, the Defendant's notes, questionnaires, and/or videos of the jurors at any time before the specified date and time both attorneys are to submit their additional peremptory challenges through the website in an alternating fashion. Thus, the Defense Attorney is instructed to review his/her professional jury consultant's notes, his/her notes, the Defendant's notes, questionnaires, and/or videos of the jurors as much as he/she desires to prepare him/her for the additional peremptory challenge submission process before the specified date and time both attorneys are to submit their additional peremptory challenges through the website in an alternating fashion. The above said grey message will always appear on the Defense Attorney's screen each time he/she selects "Submit Additional Peremptory Challenge Exercises in Alternating Fashion" from his/her respective Main Menu of Functions in the website.

If the Defense Attorney is required to submit the first additional peremptory challenge to begin the alternating peremptory challenge process and the time has begun on the specific date for attorneys to submit their additional peremptory challenges in an alternating fashion, or if the Defense Attorney has at least one additional peremptory challenge to submit through the website and the Plaintiff Attorney has just submitted a peremptory challenge through the website or is not required to submit another peremptory challenge through the website, and if the Defense Attorney makes the above said message disappear on or after the specified date and time for attorneys to exercise their additional peremptory challenges in an alternating fashion, a new light green window will appear on the screen that states as follows:

The Defense Attorney is now required to submit an additional peremptory challenge through the website. Time remaining for the Defense Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Defense Attorney clicks the "OK" button, this said message disappears to allow the Defense Attorney to submit an additional peremptory challenge through the website as detailed below.

Once the above said message in the light green window disappears, the Defense and shown when he/she submitted his/her original peremptory challenges through the website as detailed above. Thus, the Defense Attorney submits his/her additional peremptory challenges through the website the same way he/she submitted his/her original peremptory challenges through the website. Thus, the Defense Attorney is shown the following: 1) interactive names and interactive pictures of only the remaining jurors who were not excluded with a challenge for cause through the website, 2) the Defense Attorney's Professional Jury Consultant's analysis and assigned number of each particular juror if the Defense Attorney selected a professional jury consultant, 3) the Defense Attorney's confidential analysis and assigned number of each respective juror, 4) the Defendant's own personal analysis and assigned number of each particular juror, 5) a scroll bar in the in the far right edge of the screen will appear to view all of the above stated features, 6) the current date and time will appear in the top margin of the screen, 7) the specified date and time for both attorneys to submit their additional peremptory challenges in an alternating fashion through the website will appear directly below the current date and time, 8) the amount of time the Judge allotted for each attorney to submit a peremptory challenge through the website in the Custom Setup of the Jury Selection Process will appear, 9) a box will appear to the left of each juror's interactive name and picture with the instruction above each box that states "Select hear to exclude this juror with a peremptory challenge," 10) a button labeled "Previous" will appear in the bottom margin of the screen, 11) a rectangular light green window that states "Authenticate and Submit One Peremptory Challenge" will appear in the bottom margin of the screen, 12) a window labeled "Plaintiff Attorney's Additional Peremptory Challenge Submissions," and 13) a window labeled "Defense Attorney's Additional Peremptory Challenge Submissions."

With regard to the interactive names and interactive pictures of only the remaining jurors who were not excluded with a challenge for cause through the website appearing on the Defense Attorney's screen, the interactive names of the jurors that were struck with an uncontested peremptory challenge by either attorney when the attorneys submitted their original peremptory challenges will appear highlighted in light red and will have a strike through line through them indicating the juror is not available to be struck with an additional peremptory challenge. Thus, only the interactive names of the jurors that are not highlighted in red with a strike through line are the only interactive names that the Defense Attorney may strike with an additional peremptory challenge through the website. Additionally, all of the interactive names struck by an attorney's peremptory challenges that were overruled by the Judge through the website are automatically included in the jury panel and are not eligible to be struck by an additional peremptory challenge. Thus, directly above the bottom margin of the Defense Attorney's screen will be a narrow rectangular window with a label that states "Jury Panel and Alternate Jurors. The interactive names of jurors who were struck by attorney peremptory challenges which were subsequently overruled by the Judge will appear in alphabetical order under the label "Jury Panel and Alternate Jurors" in the narrow rectangular window, and they will not appear on the Defense Attorney's screen as possible interactive names the Defense Attorney may strike with an additional peremptory challenge.

Also, with regard to the window labeled "Defense Attorney's Additional Peremptory Challenge Submissions" on the Defense Attorney's screen, directly below the label "Defense Attorney's Additional Peremptory Challenge Submissions" and within the said window will appear consecutive numbers from 1 to the total number of additional peremptory challenges the Defense Attorney is required to submit. For example, if the judge overruled 5 of the Defense Attorney's original peremptory challenges through the website, the window labeled "Defense Attorney's Additional Peremptory Challenge Submissions" will include consecutive numbers from 1-5 on the Defense Attorney's screen. When the Defense Attorney successfully submits his/her first additional peremptory challenge, the name of the juror the Defense Attorney selected to exclude with a peremptory challenge will appear next to the number one in the window labeled "Defense Attorney's Additional Peremptory Challenge Submissions" on the Defense Attorney's screen. When the Defense Attorney successfully submits his/her second additional peremptory challenge, the name of the juror the Defense Attorney selected to exclude with a peremptory challenge immediately will appear next to the number two in the window labeled "Defense Attorney's Additional Peremptory Challenge Submissions." Thus, the name of each juror excluded with a Defense Attorney's additional peremptory challenge through the website will appear next to the number that corresponds with the order the juror was excluded with a peremptory challenge through the website by the Defense Attorney in the window labeled "Defense Attorney's Additional Peremptory Challenge Submissions." To the right of each juror's name on the list in the window labeled "Defense Attorney's Additional Peremptory Challenge Submissions" will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with a peremptory challenge will appear the authenticating picture of the Defense Attorney that the Defense Attorney made through a webcam and into the website upon selecting "Authenticate and Submit One Peremptory Challenge" just before the Defense Attorney submitted the peremptory challenge through the website.

Also, with regard to the window labeled "Plaintiff Attorney's Additional Peremptory Challenge Submissions" on the Defense Attorney's screen, directly below the label "Plaintiff Attorney's Additional Peremptory Challenge Submissions" and within the said window will appear consecutive numbers from 1 to the total number of additional peremptory challenges the Plaintiff Attorney is required to submit. For example, if the judge overruled 3 of the Plaintiff Attorney's original peremptory challenges through the website, the window labeled "Plaintiff Attorney's Additional Peremptory Challenge Submissions" on the Defense Attorney's screen will include consecutive numbers from 1-3. When the Plaintiff Attorney successfully submits his/her first additional peremptory challenge, the name of the juror the Plaintiff Attorney selected to exclude with an additional peremptory challenge will appear next to the number one in the window labeled "Plaintiff Attorney's Additional Peremptory Challenge Submissions" on the Defense Attorney's screen so the Defense Attorney can monitor the Plaintiff Attorney's additional peremptory challenge submissions through the website as detailed above. When the Plaintiff Attorney successfully submits his/her second additional peremptory challenge, the name of the juror the Plaintiff Attorney selected to exclude with a peremptory challenge immediately will appear next to the number two in the window labeled "Plaintiff Attorney's Additional Peremptory Challenge Submissions" on the Defense Attorney's screen. Thus, the name of each juror excluded with a Plaintiff Attorney's additional peremptory challenge through the website will appear next to the number that corresponds with the order the juror was excluded with an additional peremptory challenge through the website by the Plaintiff Attorney in the window labeled "Plaintiff Attorney's Additional Peremptory Challenge Submissions" on the Defense Attorney's screen. To the right of each juror's name on the list in the window labeled "Plaintiff Attorney's Additional Peremptory Challenge Submissions" on the Defense Attorney's screen will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit One Peremptory Challenge" just before the Plaintiff Attorney submitted the peremptory challenge through the website so the Defense Attorney can monitor each of the Plaintiff Attorney's additional peremptory challenges.

When the Defense Attorney clicks the "OK" button on the message in the above said light green window, and the window disappears, the time the Judge allotted for each attorney to submit a peremptory challenge immediately will begin to count down so the Defense Attorney can monitor how much time he/she has to submit a peremptory challenge through the website.

Ultimately, the Defense Attorney submits all of his/her additional peremptory challenges in the exact same manner through the website as he/she submitted his/her original peremptory challenges through the website. Thus, to submit an additional peremptory challenge, the Defense Attorney clicks a check mark in one box next to the interactive name and picture of one particular juror who has not been struck with a previous peremptory challenge and clicks "Authenticate and Submit One Peremptory Challenge." When the Defense Attorney selects the "Authenticate and Submit One Peremptory Challenge" option and takes an authenticating picture of himself/herself with a webcam and into the invention's website as detailed above, the Defense Attorney's additional peremptory challenge will be made viewable and accessible to the Judge, the Plaintiff Attorney, the Plaintiff, the Defendant, and the Court Reporter through the invention's website and the Defense Attorney's authenticating picture will appear next to the Defense Attorney's additional peremptory challenge on their respective screens.

Every time the Defense Attorney exercises an additional peremptory challenge by clicking the "Authenticate and Submit One Peremptory Challenge" button in his/her program after clicking a check mark in the box next to one particular juror's interactive name and picture, the selected juror's name, on the screen, will become highlighted in light red and a single strike through line will appear through the juror's name.

Additionally, every time the Plaintiff Attorney submits an additional peremptory challenge through the website, the name of the juror the Plaintiff Attorney selected to exclude with an additional peremptory challenge will become highlighted in light red and a single strike through line will appear through the juror's name on the Defense Attorney's screen. Also, every time the Plaintiff Attorney submits an additional peremptory challenge through the website, a check mark will appear in the box next to the interactive picture and name of the juror the Plaintiff Attorney selected to exclude with an additional peremptory challenge on the Defense Attorney's screen.

Also, every time the Defense Attorney successfully submits a peremptory challenge through the website in the manner detailed above and if the Defense Attorney and the Plaintiff Attorney are both required to submit at least one more additional peremptory challenge through the website, or if the Plaintiff Attorney is required to submit the first additional peremptory challenge through the website to initiate the alternating peremptory challenge process with the Defense Attorney and the Defense Attorney has at least one more additional peremptory challenge to submit through the website, a light red window will then appear in the bottom right corner of the Defense Attorney's screen that covers the "Authenticate and Submit One Peremptory Challenge" button. The light red window states as follows:

The Plaintiff Attorney is now submitting an additional peremptory challenge through the website. You are not allowed to submit an additional peremptory challenge through this website until the Plaintiff Attorney submits a peremptory challenge through this website. After the Plaintiff Attorney submits a peremptory challenge, you must submit another peremptory challenge through this website within the amount of time the Judge allotted for each attorney to submit a peremptory challenge. Time remaining for the Plaintiff Attorney to submit a peremptory challenge: (The amount of time the Judge allotted for each attorney to submit a peremptory challenge through the website in the Custom Setup of the Jury Selection Process will appear here and will begin to count down immediately upon the Plaintiff Attorney clicking on the OK button on the light green message in his/her own program to begin the process of exercising a peremptory challenge as detailed above.)

While the above said light red window with the above said message appears in the bottom corner of the screen, the Defense Attorney is allowed to review all notes on the interactive jurors and review the questionnaires and videos of the jurors while the Defense Attorney waits for the Plaintiff Attorney to submit a peremptory challenge. Once the Plaintiff Attorney submits a peremptory challenge through the website and the Defense Attorney is required to submit at least one more peremptory challenge through the website, the above said light red message and window on the Defense Attorney's screen will disappear and the "Authenticate and Submit One Peremptory Challenge" button will reappear in the right side of the bottom margin of the screen to allow the Defense Attorney to submit another additional peremptory challenge through the website.

If the Defense Attorney is required to submit the first additional peremptory challenge through the website to initiate the alternating peremptory challenge process with the Plaintiff Attorney, or if the Defense Attorney and the Plaintiff Attorney have both exercised additional peremptory challenges in an alternating fashion through the website, and if the Plaintiff Attorney has submitted all of his/her additional peremptory challenges through the website and is not allowed to submit anymore additional peremptory challenges through the website, and if the Defense Attorney has more than one additional peremptory challenge left to exercise through the website, and if the Plaintiff Attorney just submitted an additional peremptory challenge through the website, the same light green window detailed above will appear on the Defense Attorney's screen that states as follows:

The Defense Attorney is now required to submit an additional peremptory challenge through the website. The time remaining for the Defense Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Defense Attorney clicks the "OK" button, this said message disappears to allow the Defense Attorney to submit another additional peremptory challenge through the website as detailed above.

If the Defense Attorney and the Plaintiff Attorney are both required to exercise additional peremptory challenges in an alternating fashion through the website, and if the Defense Attorney has just submitted his/her only or final additional peremptory challenge through the website and is not allowed to submit anymore additional peremptory challenges through the website, and if the Plaintiff Attorney has one or more additional peremptory challenges left to exercise through the website, a new light red window will then appear in the bottom right corner of the Defense Attorney's screen that covers the "Authenticate and Submit One Peremptory Challenge" button. The light red window states as follows:

Your additional peremptory challenges were successfully submitted. You have successfully submitted all of your required additional peremptory challenges through the website, and you are not allowed to submit anymore additional peremptory challenges through the website. The Plaintiff Attorney is now submitting a required additional peremptory challenge through the website. You may log off the website at this time, or you may stay logged into your program to view all of the rest of the Plaintiff Attorney's required additional peremptory challenges through your program. The Plaintiff Attorney has (the number of additional peremptory challenges the Plaintiff Attorney has left to exercise through the website appears here) additional peremptory challenges left to exercise through the website. The time remaining for the Plaintiff Attorney to submit an additional peremptory challenge: (The amount of time the Judge allotted for each attorney to submit a peremptory challenge through the website in the Custom Setup of the Jury Selection Process will appear here and will begin to count down immediately upon the Plaintiff Attorney clicking on the OK button on the light green message in his/her own program to begin the process of exercising an additional peremptory challenge as detailed above.)

If the Defense Attorney and the Plaintiff Attorney are both required to exercise additional peremptory challenges in an alternating fashion through the website, and if the Defense Attorney and the Plaintiff Attorney both have submitted his/her only or final additional peremptory challenge through the website and neither the Defense Attorney or the Plaintiff Attorney are allowed to submit anymore additional peremptory challenges through the website, any above stated light red message on the Defense Attorney's screen that states that the Plaintiff Attorney is now submitting a required additional peremptory challenge disappears, and a new light red window appears on the Defense Attorney's screen that states as follows:

Both Attorneys have Submitted all of their Required Additional Peremptory challenges through the website. The alternating peremptory challenge process through the website for additional peremptory challenges is now complete. Neither attorney is allowed to submit anymore additional peremptory challenges through the website. You may now log off the website, or you may review all of the peremptory challenge exercises or review the remaining juror pictures, videos, questionnaires, and confidential notes.

Below this message will appear a button labeled "OK." By the Defense Attorney clicking on the OK button, the said light red window with this message disappears. Once the said message disappears, the Defense Attorney may review all of the peremptory challenge exercises or review the remaining juror pictures, videos, questionnaires, and confidential notes. The Defense Attorney may also log off of the website.

Every time the Defense Attorney selects "Submit Additional Peremptory Challenge Exercises in Alternating Fashion" from his/her respective Main Menu of Functions, the Defense Attorney is advised to review his/her professional jury consultant's analysis and assigned number of each juror, his/her own analysis and assigned number of each juror, the Defendant's analysis and assigned number of each juror, questionnaires, and/or videos of each juror and then decide which jurors to keep or exclude with an additional peremptory challenge before the specified date and time the alternating additional peremptory challenge process begins to prepare him/her for the alternating additional peremptory challenge process.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules both the Plaintiff Attorney's and the Defense Attorney's respective rebuttals of non-discriminatory reasons to preserve their peremptory challenges through the website, and if the Plaintiff Attorney and the Defense Attorney are both required to log into their respective programs on the website on the same specified date and time set by the judge to submit additional peremptory challenges in an alternating fashion through the website as detailed above, the Plaintiff, if the case is civil, and the Defendant log into their respective programs on the website on the same specified date and time set by the judge in the Custom Setup of the Jury Selection Process for both attorneys to submit their additional peremptory challenges through the website in an alternating fashion, and they view the Plaintiff Attorney's and the Defense Attorney's submitted additional peremptory challenges through the website. Thus, the Plaintiff and the Defendant are allowed to view the additional peremptory challenges submitted by both attorneys at the same time both attorneys submit their additional peremptory challenges through the website.

When the Plaintiff and the Defendant log into their respective programs on the website on the same specified date and time that both attorneys are scheduled to submit their additional peremptory challenges in an alternating fashion to view the submitted additional peremptory challenges of both attorneys who submit their additional peremptory challenges in an alternating fashion, they each select "View All Additional Peremptory Challenge Exercises" from his/her respective Main Menu of Functions. When the Plaintiff selects "View All Additional Peremptory Challenge Exercises" from his/her respective Main Menu of Functions at the specified date and time set by the Judge for both attorneys to submit additional peremptory challenges in an alternating fashion, the Plaintiff is initially shown a large light green window on his/her screen that states as follows:

The Plaintiff Attorney and the Defense Attorney exercise their additional peremptory challenges through this website by alternating back and forth. The Plaintiff Attorney is required to submit (the number of additional peremptory challenges the Plaintiff Attorney is required to submit appears here) additional peremptory challenges.

The Defense Attorney is required to submit (the number of additional peremptory challenges the Defense Attorney is required to submit appears here) additional peremptory challenges.

One attorney may be required to exercise more additional peremptory challenges than his/her counterpart. The attorney who is required to exercise the most additional peremptory challenges is required to exercise the first additional peremptory challenge through the website to begin the alternating peremptory challenge process on the specific date and time designated by the Judge.

However, if both the Plaintiff Attorney and the Defense Attorney are each required to submit the same number of additional peremptory challenges through the website, the Plaintiff Attorney is required to exercise the first additional peremptory challenge through the website to begin the alternating peremptory challenge process on the specific date and time designated by the Judge.

During the alternating process of attorneys submitting their additional peremptory challenges through the website in an alternating fashion, the attorney who is not required to submit the first additional peremptory challenge to begin the alternating peremptory challenge process will not be allowed to submit an additional peremptory challenge through the website until the attorney who is required to submit the first additional peremptory challenge submits his/her first additional peremptory challenge through the website.

Once the attorney who is required to submit the first additional peremptory challenge to begin the alternating peremptory challenge process submits the first additional peremptory challenge to begin the alternating peremptory challenge process through the website, he/she will not be allowed to submit a subsequent additional peremptory challenge until the opposing attorney submits an additional peremptory challenge through the website first.

After the attorney who was not required to submit the first additional peremptory challenge to begin the alternating peremptory challenge process submits an additional peremptory challenge through the website, he/she will not be allowed to submit a subsequent peremptory challenge through the website until the attorney who was required to submit the first additional peremptory challenge submits another peremptory challenge through the website.

If the attorney who was not required to submit the first additional peremptory challenge to begin the alternating peremptory challenge process submits his/her final additional peremptory challenge through the website and the attorney who was required to submit the first additional peremptory challenge to begin the alternating peremptory challenge process through the website has more than one additional peremptory challenge left to submit through the website, the attorney who was required to submit the first additional peremptory challenge to begin the alternating peremptory challenge through the website will be allowed to submit all of his/her remaining additional peremptory challenges through the website by submitting one additional peremptory challenge at a time without the opposing attorney submitting anymore additional peremptory challenges through the website.

Each attorney will be allowed (the number of minutes the Judge allotted each attorney to submit each peremptory challenge through the website in the Custom Setup of the Jury Selection Process appears here) minutes to submit each additional peremptory challenge. If an attorney does not submit an additional peremptory challenge within the designated time limit, he/she still is required to submit an additional peremptory challenge through the website regardless if the time limit expires. You will be allowed to view a countdown of the allotted number of minutes each attorney is allowed to submit an additional peremptory challenge through the website on your screen while you wait for each attorney to submit an additional peremptory challenge.

On the (the date and time the judge specified for attorneys to submit their additional peremptory challenges in an alternating fashion in the Setup of the Custom Jury Selection Process appears here), you will be allowed to view the name of each juror the Plaintiff Attorney excludes with an additional peremptory challenge on a list on your screen immediately after the Plaintiff Attorney submits each additional peremptory challenge through the website. Likewise, you will be allowed to view the name of each juror the Defense Attorney excludes with an additional peremptory challenge on a list on your screen immediately after the Defense Attorney submits each additional peremptory challenge.

You may stay logged into this website until both attorneys have submitted all of their additional peremptory challenges through the website in an alternating fashion.

The attorney who is required to submit the first additional peremptory challenge to begin the alternating peremptory challenge process will not be allowed to begin the alternating peremptory challenge process with the opposing attorney by submitting the first additional peremptory challenge until (the date and time the judge specified for attorneys to submit their additional peremptory challenges in an alternating fashion appears here).

Once you click the "OK" button on or after the specified time on the specified date, this message will disappear. You may minimize this message into the bottom margin of your screen to allow you to review your notes, questionnaires, and/or videos of the jurors at any time before the specified date and time both attorneys are to submit their additional peremptory challenges through the website in an alternating fashion.

Below the above said message in the window will appear a button that says "OK." When the Plaintiff clicks the "OK" button on or after the specified time on the specified date, the large light green window with the above said message disappears to allow the Plaintiff to view each additional peremptory challenge submitted by the Plaintiff Attorney and the Defense Attorney through the website. Thus, the large light green window with the above said message will not disappear by clicking the "OK" button at any time before the specified time on the specified date. However, the Plaintiff will be allowed to minimize the above said light green message into the bottom margin of his/her screen to allow him/her to review his/her notes, questionnaires, and/or videos of the jurors at any time before the specified date and time both attorneys are to submit their additional peremptory challenges through the website in an alternating fashion. Thus, the Plaintiff is instructed to review his/her notes, questionnaires, and/or videos of the jurors as much as he/she desires before the specified date and time both attorneys are to submit their additional peremptory challenges through the website in an alternating fashion. The above said light green message will always appear on the Plaintiff's screen each time he/she selects "View All Additional Peremptory Challenge Exercises" from his/her respective Main Menu of Functions in the website.

Once the above said message in the light green window disappears, the Plaintiff is given and shown all of the exact same features that the Plaintiff was given and shown when he/she viewed both the Plaintiff Attorney and the Defense Attorney submit their original peremptory challenges through the website as detailed above. Thus, the Plaintiff views both attorneys submit their additional peremptory challenges through the website the same way he/she viewed both attorneys submit their original peremptory challenges through the website.

Thus, once the above said message in the light green window disappears, the Plaintiff is shown all of the above features that are detailed above. Thus, the Plaintiff is shown the following: 1) interactive names and interactive pictures of only the remaining jurors who were not excluded with a challenge for cause through the website, 2) the Plaintiffs own personal analysis and assigned number of each particular juror, 3) a scroll bar in the in the far right edge of the screen will appear to view all of the above stated features, 4) the current date and time will appear in the top margin of the screen, 5) the specified date and time for both attorneys to submit their additional peremptory challenges in an alternating fashion through the website will appear directly below the current date and time, 6) a window labeled "Plaintiff Attorney's Additional Peremptory Challenge Submissions," and 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when either attorney is taking a turn to submit an additional peremptory challenge through the website, 9) a rectangular light green window that will state which attorney is submitting an additional peremptory challenge in the bottom right corner of the screen, and 10) a button labeled "Previous" will appear in the bottom margin of the screen.

With regard to the interactive names and interactive pictures of only the remaining jurors who were not excluded with a challenge for cause through the website appearing on the Plaintiff's screen, the interactive names of the jurors that were struck with an uncontested peremptory challenge by either attorney when the attorneys submitted their original peremptory challenges will appear highlighted in light red and will have a strike through line through them on the Plaintiff's screen indicating the juror is not available to be struck with an additional peremptory challenge. Thus, only the interactive names of the jurors that are not highlighted in red with a strike through line are the only interactive names that the Plaintiff Attorney and the Defense Attorney may strike with an additional peremptory challenge through the website.

Additionally, all of the interactive names struck by an attorney's peremptory challenges that were overruled by the Judge through the website are automatically included in the jury panel and are not eligible to be struck by an additional peremptory challenge. Thus, directly above the bottom margin of the Plaintiff's screen will be a narrow rectangular window with a label that states "Jury Panel and Alternate Jurors." The interactive names of jurors who were struck by attorney peremptory challenges which were subsequently overruled by the Judge will appear in alphabetical order under the label "Jury Panel and Alternate Jurors" in the narrow rectangular window, and they will not appear on the Plaintiff's screen as possible interactive names the Plaintiff Attorney and Defense Attorney may strike with an additional peremptory challenge.

Also, with regard to the window labeled "Plaintiff Attorney's Additional Peremptory Challenge Submissions" on the Plaintiff's screen, directly below the label "Plaintiff Attorney's Additional Peremptory Challenge Submissions" and within the said window will appear consecutive numbers from 1 to the total number of additional peremptory challenges the Plaintiff Attorney is required to submit. For example, if the judge overruled 5 of the Plaintiff Attorney's original peremptory challenges through the website, the window labeled "Plaintiff Attorney's Additional Peremptory Challenge Submissions," on the Plaintiff's Screen, will include consecutive numbers from 1-5. When the Plaintiff Attorney successfully submits his/her first additional peremptory challenge, the name of the juror the Plaintiff Attorney selected to exclude with a peremptory challenge will appear next to the number one in the window labeled "Plaintiff Attorney's Additional Peremptory Challenge Submissions" on the Plaintiff's screen. When the Plaintiff Attorney successfully submits his/her second additional peremptory challenge, the name of the juror the Plaintiff Attorney selected to exclude with a peremptory challenge immediately will appear next to the number two in the window labeled "Plaintiff Attorney's Additional Peremptory Challenge Submissions" on the Plaintiff's screen. Thus, the name of each juror excluded with a Plaintiff Attorney's additional peremptory challenge through the website will appear next to the number that corresponds with the order the juror was excluded with a peremptory challenge through the website by the Plaintiff Attorney in the window labeled "Plaintiff Attorney's Additional Peremptory Challenge Submissions" on the Plaintiff's screen. To the right of each juror's name on the list in the window labeled "Plaintiff Attorney's Additional Peremptory Challenge Submissions," on the Plaintiff's screen, will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with an additional peremptory challenge will appear the authenticating picture the Plaintiff Attorney that the Plaintiff Attorney made through a webcam and into the website upon selecting "Authenticate and Submit One Peremptory Challenge" just before the Plaintiff Attorney submitted the additional peremptory challenge through the website.

Also, with regard to the window labeled "Defense Attorney's Additional Peremptory Challenge Submissions" on the Plaintiff's screen, directly below the label "Defense Attorney's Additional Peremptory Challenge Submissions" and within the said window will appear consecutive numbers from 1 to the total number of additional peremptory challenges the Defense Attorney is required to submit. For example, if the judge overruled 3 of the Defense Attorney's original peremptory challenges through the website, the window labeled "Defense Attorney's Additional Peremptory Challenge Submissions" will appear consecutive numbers from 1-3. When the Defense Attorney successfully submits his/her first additional peremptory challenge, the name of the juror the Defense Attorney selected to exclude with an additional peremptory challenge will appear next to the number one in the window labeled "Defense Attorney's Additional Peremptory Challenge Submissions" on the Plaintiff's screen so the Plaintiff can monitor the Defense Attorney's additional peremptory challenge submissions through the website as detailed above. When the Defense Attorney successfully submits his/her second additional peremptory challenge, the name of the juror the Defense Attorney selected to exclude with a peremptory challenge immediately will appear next to the number two in the window labeled "Defense Attorney's Additional Peremptory Challenge Submissions" on the Plaintiff's screen. Thus, the name of each juror excluded with a Defense Attorney's additional peremptory challenge through the website will appear next to the number that corresponds with the order the juror was excluded with an additional peremptory challenge through the website by the Defense Attorney in the window labeled "Defense Attorney's Additional Peremptory Challenge Submissions" on the Plaintiff's screen. To the right of each juror's name on the list in the window labeled "Defense Attorney's Additional Peremptory Challenge Submissions" on the Plaintiff's screen will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with an additional peremptory challenge will appear the authenticating picture of the Defense Attorney that the Defense Attorney made through a webcam and into the website upon selecting "Authenticate and Submit One Peremptory Challenge" just before the Defense Attorney submitted the additional peremptory challenge through the website so the Plaintiff can monitor each of the Defense Attorney's additional peremptory challenges.

Every time the Plaintiff Attorney submits an additional peremptory challenge through the website on or after the date and time for attorneys to submit their additional peremptory challenges through the website in an alternating fashion, the respective juror's name struck with the Plaintiff Attorney's additional peremptory challenge, will become highlighted in light red and a single strike through line will appear through the juror's name on the Plaintiff's screen.

Additionally, every time the Defense Attorney submits an additional peremptory challenge through the website, the name of the juror the Defense Attorney selected to exclude with an additional peremptory challenge will become highlighted in light red and a single strike through line will appear through the juror's name on the Plaintiff's screen.

After each attorney has submitted his/her last required additional peremptory challenge, the said light green window in the bottom right corner of the Plaintiff's screen will state the following: "Each attorney has successfully submitted all of their required additional peremptory challenges." Additionally, after each attorney has submitted his/her last required additional peremptory challenge through the website, a new light red window will then appear in the middle of the Plaintiff's screen that states as follows:

Both attorneys have successfully submitted all of their required additional peremptory challenges, and neither attorney is allowed to submit anymore additional peremptory challenges through the website. The alternating peremptory challenge process for additional peremptory challenges through the website is now complete. You may now log off the website, or you may review all of the additional peremptory challenge exercises or review the remaining juror pictures, videos, questionnaires, and confidential notes.

Below this message will appear a button labeled "OK." By the Plaintiff clicking on the OK button, the said light red window with this message disappears. Once the said message disappears, the Plaintiff may review all of the additional peremptory challenge exercises or review the remaining juror pictures, videos, questionnaires, and confidential notes. The Plaintiff may also log off of the website.

Every time the Plaintiff selects "View All Additional Peremptory Challenge Exercises" from his/her respective Main Menu of Functions, the Plaintiff is instructed to review his/her analysis and number, questionnaire, and/or video of each juror as much as he/she desires before the specified date and time both attorneys are to submit their additional peremptory challenges through the website in an alternating fashion. Thus, when the Plaintiff logs into his/her respective program on the website and selects "View All Additional Peremptory Challenge Exercises" from his/her respective Main Menu of Functions at any time before the specified date and time for attorneys to submit their additional peremptory challenges in an alternating fashion to review the said information on each juror, the Plaintiff is initially shown the above said large light green window on his/her screen. When the Plaintiff minimizes the above said light green message into the bottom margin of his/her screen, he/she is shown all of the above features that are detailed above, and he/she is allowed to review his/her analysis and number, questionnaire, and/or video of each juror.

Likewise, when the Defendant selects "View All Additional Peremptory Challenge Exercises" from his/her respective Main Menu of Functions at the specified date and time set by the Judge for both attorneys to submit additional peremptory challenges in an alternating fashion, the Defendant is initially shown a large light green window on his/her screen that states as follows:

- The Plaintiff Attorney and the Defense Attorney exercise their additional peremptory challenges through this website by alternating back and forth. The Plaintiff Attorney is required to submit (the number of additional peremptory challenges the Plaintiff Attorney is required to submit appears here) additional peremptory challenges.
- The Defense Attorney is required to submit (the number of additional peremptory challenges the Defense Attorney is required to submit appears here) additional peremptory challenges.
- One attorney may be required to exercise more additional peremptory challenges than his/her counterpart. The attorney who is required to exercise the most additional peremptory challenges is required to exercise the first additional peremptory challenge through the website to begin the alternating peremptory challenge process on the specific date and time designated by the Judge.
- However, if both the Plaintiff Attorney and the Defense Attorney are each required to submit the same number of additional peremptory challenges through the website, the Plaintiff Attorney is required to exercise the first additional peremptory challenge through the website to begin the alternating peremptory challenge process on the specific date and time designated by the Judge.
- During the alternating process of attorneys submitting their additional peremptory challenges through the website in an alternating fashion, the attorney who is not required to submit the first additional peremptory challenge to begin the alternating peremptory challenge process will not be allowed to submit an additional peremptory challenge through the website until the attorney who is required to submit the first additional peremptory challenge submits his/her first additional peremptory challenge through the website.
- Once the attorney who is required to submit the first additional peremptory challenge to begin the alternating peremptory challenge process submits the first additional peremptory challenge to begin the alternating peremptory challenge process through the website, he/she will not be allowed to submit a subsequent additional peremptory challenge until the opposing attorney submits an additional peremptory challenge through the website first.
- After the attorney who was not required to submit the first additional peremptory challenge to begin the alternating peremptory challenge process submits an additional peremptory challenge through the website, he/she will not be allowed to submit a subsequent peremptory challenge through the website until the attorney who was required to submit the first additional peremptory challenge submits another peremptory challenge through the website.
- If the attorney who was not required to submit the first additional peremptory challenge to begin the alternating peremptory challenge process submits his/her final additional peremptory challenge through the website and the attorney who was required to submit the first additional peremptory challenge to begin the alternating peremptory challenge process through the website has more than one additional peremptory challenge left to submit through the website, the attorney who was required to submit the first additional peremptory challenge to begin the alternating peremptory challenge through the website will be allowed to submit all of his/her remaining additional peremptory challenges through the website by submitting one additional peremptory challenge at a time without the opposing attorney submitting anymore additional peremptory challenges through the website.
- Each attorney will be allowed (the number of minutes the Judge allotted each attorney to submit each peremptory challenge through the website in the Custom Setup of the Jury Selection Process appears here) minutes to submit each additional peremptory challenge. If an attorney does not submit an additional peremptory challenge within the designated time limit, he/she still is required to submit an additional peremptory challenge through the website regardless if the time limit expires. You will be allowed to view a countdown of the allotted number of minutes each attorney is allowed to submit an additional peremptory challenge through the website on your screen while you wait for each attorney to submit an additional peremptory challenge.
- On the (the date and time the judge specified for attorneys to submit their additional peremptory challenges in an alternating fashion in the Setup of the Custom Jury Selection Process appears here), you will be allowed to view the name of each juror the Plaintiff Attorney excludes with an additional peremptory challenge on a list on your screen immediately after the Plaintiff Attorney submits each additional peremptory challenge through the website. Likewise, you will be allowed to view the name of each juror the Defense Attorney excludes with an additional peremptory challenge on a list on your screen immediately after the Defense Attorney submits each additional peremptory challenge.
- You may stay logged into this website until both attorneys have submitted all of their additional peremptory challenges through the website in an alternating fashion.
- The attorney who is required to submit the first additional peremptory challenge to begin the alternating peremptory challenge process will not be allowed to begin the alternating peremptory challenge process with the opposing attorney by submitting the first additional peremptory challenge until (the date and time the judge specified for attorneys to submit their additional peremptory challenges in an alternating fashion appears here).

Once you click the "OK" button on or after the specified time on the specified date, this message will disappear. You may minimize this message into the bottom margin of your screen to allow you to review your notes, questionnaires, and/or videos of the jurors at any time before the specified date and time both attorneys are to submit their additional peremptory challenges through the website in an alternating fashion.

Below the above said message in the window will appear a button that says "OK." When the Defendant clicks the "OK" button on or after the specified time on the specified date, the large light green window with the above said message disappears to allow the Defendant to view each additional peremptory challenge submitted by the Plaintiff Attorney and the Defense Attorney through the website. Thus, the large light green window with the above said message will not disappear by clicking the "OK" button at any time before the specified time on the specified date. However, the Defendant will be allowed to minimize the above said light green message into the bottom margin of his/her screen to allow him/her to review his/her notes, questionnaires, and/or videos of the jurors at any time before the specified date and time both attorneys are to submit their additional peremptory challenges through the website in an alternating fashion. Thus, the Defendant is instructed to review his/her notes, questionnaires, and/or videos of the jurors as much as he/she desires before the specified date and time both attorneys are to submit their additional peremptory challenges through the website in an alternating fashion. The above said light green message will always appear on the Defendant's screen each time he/she selects "View All Additional Peremptory Challenge Exercises" from his/her respective Main Menu of Functions in the website.

Once the above said message in the light green window disappears, the Defendant is given and shown all of the exact same features that the Defendant was given and shown when he/she viewed both the Plaintiff Attorney and the Defense Attorney submit their original peremptory challenges through the website as detailed above. Thus, the Defendant views both attorneys submit their additional peremptory challenges through the website the same way he/she viewed both attorneys submit their original peremptory challenges through the website.

Thus, once the above said message in the light green window disappears, the Defendant is shown all of the above features that are detailed above. Thus, the Defendant is shown the following: 1) interactive names and interactive pictures of only the remaining jurors who were not excluded with a challenge for cause through the website, 2) the Defendant's own personal analysis and assigned number of each particular juror, 3) a scroll bar in the in the far right edge of the screen will appear to view all of the above stated features, 4) the current date and time will appear in the top margin of the screen, 5) the specified date and time for both attorneys to submit their additional peremptory challenges in an alternating fashion through the website will appear directly below the current date and time, 6) a window labeled "Plaintiff Attorney's Additional Peremptory Challenge Submissions," and 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when either attorney is taking a turn to submit an additional peremptory challenge through the website, 9) a rectangular light green window that will state which attorney is submitting an additional peremptory challenge in the bottom right corner of the screen, and 10) a button labeled "Previous" will appear in the bottom margin of the screen.

With regard to the interactive names and interactive pictures of only the remaining jurors who were not excluded with a challenge for cause through the website appearing on the Defendant's screen, the interactive names of the jurors that were struck with an uncontested peremptory challenge by either attorney when the attorneys submitted their original peremptory challenges will appear highlighted in light red and will have a strike through line through them on the Defendant's screen indicating the juror is not available to be struck with an additional peremptory challenge. Thus, only the interactive names of the jurors that are not highlighted in red with a strike through line are the only interactive names that the Plaintiff Attorney and the Defense Attorney may strike with an additional peremptory challenge through the website.

Additionally, all of the interactive names struck by an attorney's peremptory challenges that were overruled by the Judge through the website are automatically included in the jury panel and are not eligible to be struck by an additional peremptory challenge. Thus, directly above the bottom margin of the Defendant's screen will be a narrow rectangular window with a label that states "Jury Panel and Alternate Jurors." The interactive names of jurors who were struck by attorney peremptory challenges which were subsequently overruled by the Judge will appear in alphabetical order under the label "Jury Panel and Alternate Jurors" in the narrow rectangular window, and they will not appear on the Defendant's screen as possible interactive names the Plaintiff Attorney and Defense Attorney may strike with an additional peremptory challenge.

Also, with regard to the window labeled "Plaintiff Attorney's Additional Peremptory Challenge Submissions" on the Defendant's screen, directly below the label "Plaintiff Attorney's Additional Peremptory Challenge Submissions" and within the said window will appear consecutive numbers from 1 to the total number of additional peremptory challenges the Plaintiff Attorney is required to submit. For example, if the judge overruled 5 of the Plaintiff Attorney's original peremptory challenges through the website, the window labeled "Plaintiff Attorney's Additional Peremptory Challenge Submissions," on the Defendant's Screen, will include consecutive numbers from 1-5. When the Plaintiff Attorney successfully submits his/her first additional peremptory challenge, the name of the juror the Plaintiff Attorney selected to exclude with a peremptory challenge will appear next to the number one in the window labeled "Plaintiff Attorney's Additional Peremptory Challenge Submissions" on the Defendant's screen. When the Plaintiff Attorney successfully submits his/her second additional peremptory challenge, the name of the juror the Plaintiff Attorney selected to exclude with a peremptory challenge immediately will appear next to the number two in the window labeled "Plaintiff Attorney's Additional Peremptory Challenge Submissions" on the Defendant's screen. Thus, the name of each juror excluded with a Plaintiff Attorney's additional peremptory challenge through the website will appear next to the number that corresponds with the order the juror was excluded with a peremptory challenge through the website by the Plaintiff Attorney in the window labeled "Plaintiff Attorney's Additional Peremptory Challenge Submissions" on the Defendant's screen. To the right of each juror's name on the list in the window labeled "Plaintiff Attorney's Additional Peremptory Challenge Submissions," on the Defendant's screen, will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with an additional peremptory challenge will appear the authenticating picture of the Plaintiff Attorney that the Plaintiff Attorney made through a webcam and into the website upon selecting "Authenticate and Submit One Peremptory Challenge" just before the Plaintiff Attorney submitted the additional peremptory challenge through the website.

Also, with regard to the window labeled "Defense Attorney's Additional Peremptory Challenge Submissions" on the Defendant's screen, directly below the label "Defense Attorney's Additional Peremptory Challenge Submissions" and within the said window will appear consecutive numbers from 1 to the total number of additional peremptory challenges the Defense Attorney is required to submit. For example, if the judge overruled 3 of the Defense Attorney's original peremptory challenges through the website, the window labeled "Defense Attorney's Additional Peremptory Challenge Submissions" will appear consecutive numbers from 1-3. When the Defense Attorney successfully submits his/her first additional peremptory challenge, the name of the juror the Defense Attorney selected to exclude with an additional peremptory challenge will appear next to the number one in the window labeled "Defense Attorney's Additional Peremptory Challenge Submissions" on the Defendant's screen so the Defendant can monitor the Defense Attorney's additional peremptory challenge submissions through the website as detailed above. When the Defense Attorney successfully submits his/her second additional peremptory challenge, the name of the juror the Defense Attorney selected to exclude with a peremptory challenge immediately will appear next to the number two in the window labeled "Defense Attorney's Additional Peremptory Challenge Submissions" on the Defendant's screen. Thus, the name of each juror excluded with a Defense Attorney's additional peremptory challenge through the website will appear next to the number that corresponds with the order the juror was excluded with an additional peremptory challenge through the website by the Defense Attorney in the window labeled "Defense Attorney's Additional Peremptory Challenge Submissions" on the Defendant's screen. To the right of each juror's name on the list in the window labeled "Defense Attorney's Additional Peremptory Challenge Submissions" on the Defendant's screen will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with an additional peremptory challenge will appear the authenticating picture of the Defense Attorney that the Defense Attorney made through a webcam and into the website upon selecting "Authenticate and Submit One Peremptory Challenge" just before the Defense Attorney submitted the additional peremptory challenge through the website so the Defendant can monitor each of the Defense Attorney's additional peremptory challenge.

Every time the Plaintiff Attorney submits an additional peremptory challenge through the website on or after the date and time for attorneys to submit their additional peremptory challenges through the website in an alternating fashion, the respective juror's name struck with the Plaintiff Attorney's additional peremptory challenge, will become highlighted in light red and a single strike through line will appear through the juror's name on the Defendant's screen.

Additionally, every time the Defense Attorney submits an additional peremptory challenge through the website, the name of the juror the Defense Attorney selected to exclude with an additional peremptory challenge will become highlighted in light red and a single strike through line will appear through the juror's name on the Defendant's screen.

After each attorney has submitted his/her last required additional peremptory challenge, the said light green window in the bottom right corner of the Defendant's screen will state the following: "Each attorney has successfully submitted all of their required additional peremptory challenges." Additionally, after each attorney has submitted his/her last required additional peremptory challenge through the website, a new light red window will then appear in the middle of the Defendant's screen that states as follows:

Both attorneys have successfully submitted all of their required additional peremptory challenges, and neither attorney is allowed to submit anymore additional peremptory challenges through the website. The alternating peremptory challenge process for additional peremptory challenges through the website is now complete. You may now log off the website, or you may review all of the additional peremptory challenge exercises or review the remaining juror pictures, videos, questionnaires, and confidential notes.

Below this message will appear a button labeled "OK." By the Defendant clicking on the OK button, the said light red window with this message disappears. Once the said message disappears, the Defendant may review all of the additional peremptory challenge exercises or review the remaining juror pictures, videos, questionnaires, and confidential notes. The Defendant may also log off of the website.

Every time the Defendant selects "View All Additional Peremptory Challenge Exercises" from his/her respective Main Menu of Functions, the Defendant is instructed to review his/her analysis and number, questionnaire, and/or video of each juror as much as he/she desires before the specified date and time both attorneys are to submit their additional peremptory challenges through the website in an alternating fashion. Thus, when the Defendant logs into his/her respective program on the website and selects "View All Additional Peremptory Challenge Exercises" from his/her respective Main Menu of Functions at any time before the specified date and time for attorneys to submit their additional peremptory challenges in an alternating fashion to review the said information on each juror, the Defendant is initially shown the above said large light green window on his/her screen. When the Defendant minimizes the above said light green message into the bottom margin of his/her screen, he/she is shown all of the above features that are detailed above, and he/she is allowed to review his/her analysis and number, questionnaire, and/or video of each juror.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules both the Plaintiff Attorney's and the Defense Attorney's respective rebuttals of non-discriminatory reasons to preserve their peremptory challenges through the website, and if the Plaintiff Attorney and the Defense Attorney are both required to log into their respective programs on the website on the same specified date and time set by the judge to submit additional peremptory challenges in an alternating fashion through the website as detailed above, the Judge logs into his/her respective program on the website on the same specified date and time set by the Judge in the Custom Setup of the Jury Selection Process for both attorneys to submit their additional peremptory challenges through the website in an alternating fashion, and he/she views the Plaintiff Attorney's and the Defense Attorney's submitted additional peremptory challenges through the website. Thus, the Judge is allowed to view the additional peremptory challenges submitted by both attorneys at the same time both attorneys submit their additional peremptory challenges through the website.

When the Judge logs into his/her respective program on the website on the same specified date and time that both attorneys are scheduled to submit their additional peremptory challenges in an alternating fashion through the website to view the submitted additional peremptory challenges of both attorneys who submit their additional peremptory challenges in an alternating fashion, he/she selects "View All Additional Peremptory Challenge Exercises" from his/her Main Menu of Functions. When the Judge selects "View All Additional Peremptory Challenge Exercises" from his/her Main Menu of Functions at the specified date and time set by the Judge for both attorneys to submit additional peremptory challenges in an alternating fashion, the Judge is initially shown a large light green window on his/her screen that states as follows:

The Plaintiff Attorney and the Defense Attorney exercise their additional peremptory challenges through this website by alternating back and forth. The Plaintiff Attorney is required to submit (the number of additional peremptory challenges the Plaintiff Attorney is required to submit appears here) additional peremptory challenges.

The Defense Attorney is required to submit (the number of additional peremptory challenges the Defense Attorney is required to submit appears here) additional peremptory challenges.

One attorney may be required to exercise more additional peremptory challenges than his/her counterpart. The attorney who is required to exercise the most additional peremptory challenges is required to exercise the first additional peremptory challenge through the website to begin the alternating peremptory challenge process on the specific date and time designated by the Judge.

However, if both the Plaintiff Attorney and the Defense Attorney are each required to submit the same number of additional peremptory challenges through the website, the Plaintiff Attorney is required to exercise the first additional peremptory challenge through the website to begin the alternating peremptory challenge process on the specific date and time designated by the Judge.

During the alternating process of attorneys submitting their additional peremptory challenges through the website in an alternating fashion, the attorney who is not required to submit the first additional peremptory challenge to begin the alternating peremptory challenge process will not be allowed to submit an additional peremptory challenge through the website until the attorney who is required to submit the first additional peremptory challenge submits his/her first additional peremptory challenge through the website.

Once the attorney who is required to submit the first additional peremptory challenge to begin the alternating peremptory challenge process submits the first additional peremptory challenge to begin the alternating peremptory challenge process through the website, he/she will not be allowed to submit a subsequent additional peremptory challenge until the opposing attorney submits an additional peremptory challenge through the website first.

After the attorney who was not required to submit the first additional peremptory challenge to begin the alternating peremptory challenge process submits an additional peremptory challenge through the website, he/she will not be allowed to submit a subsequent peremptory challenge through the website until the attorney who was required to submit the first additional peremptory challenge submits another peremptory challenge through the website.

If the attorney who was not required to submit the first additional peremptory challenge to begin the alternating peremptory challenge process submits his/her final additional peremptory challenge through the website and the attorney who was required to submit the first additional peremptory challenge to begin the alternating peremptory challenge process through the website has more than one additional peremptory challenge left to submit through the website, the attorney who was required to submit the first additional peremptory challenge to begin the alternating peremptory challenge through the website will be allowed to submit all of his/her remaining additional peremptory challenges through the website by submitting one additional peremptory challenge at a time without the opposing attorney submitting anymore additional peremptory challenges through the website.

Each attorney will be allowed (the number of minutes the Judge allotted each attorney to submit each peremptory challenge through the website in the Custom Setup of the Jury Selection Process appears here) minutes to submit each additional peremptory challenge. If an attorney does not submit an additional peremptory challenge within the designated time limit, he/she still is required to submit an additional peremptory challenge through the website regardless if the time limit expires. You will be allowed to view a countdown of the allotted number of minutes each attorney is allowed to submit an additional peremptory challenge through the website on your screen while you wait for each attorney to submit an additional peremptory challenge.

On the (the date and time the judge specified for attorneys to submit their additional peremptory challenges in an alternating fashion in the Setup of the Custom Jury Selection Process appears here), you will be allowed to view the name of each juror the Plaintiff Attorney excludes with an additional peremptory challenge on a list on your screen immediately after the Plaintiff Attorney submits each additional peremptory challenge through the website. Likewise, you will be allowed to view the name of each juror the Defense Attorney excludes with an additional peremptory challenge on a list on your screen immediately after the Defense Attorney submits each additional peremptory challenge.

You may stay logged into this website until both attorneys have submitted all of their additional peremptory challenges through the website in an alternating fashion.

The attorney who is required to submit the first additional peremptory challenge to begin the alternating peremptory challenge process will not be allowed to begin the alternating peremptory challenge process with the opposing attorney by submitting the first additional peremptory challenge until (the date and time the judge specified for attorneys to submit their additional peremptory challenges in an alternating fashion appears here).

Once you click the "OK" button on or after the specified time on the specified date, this message will disappear. You may minimize this message into the bottom margin of your screen to allow you to review your notes, questionnaires, and/or videos of the jurors at any time before the specified date and time both attorneys are to submit their additional peremptory challenges through the website in an alternating fashion.

Below the above said message in the window will appear a button that says "OK." When the Judge clicks the "OK" button on or after the specified time on the specified date, the large light green window with the above said message disappears to allow the Judge to view each additional peremptory challenge submitted by the Plaintiff Attorney and the Defense Attorney through the website. Thus, the large light green window with the above said message will not disappear by clicking the "OK" button at any time before the specified time on the specified date. However, the Judge will be allowed to minimize the above said light green message into the bottom margin of his/her screen to allow him/her to review his/her notes, questionnaires, and/or videos of the jurors at any time before the specified date and time both attorneys are to submit their additional peremptory challenges through the website in an alternating fashion. Thus, the Judge is instructed to review his/her notes, questionnaires, and/or videos of the jurors as much as he/she desires before the specified date and time both attorneys are to submit their additional peremptory challenges through the website in an alternating fashion. The above said light green message will always appear on the Judge's screen each time he/she selects "View All Additional Peremptory Challenge Exercises" from his/her respective Main Menu of Functions in the website.

Once the above said message in the light green window disappears, the Judge is given and shown all of the exact same features that the Judge was given and shown when he/she viewed both the Plaintiff Attorney and the Defense Attorney submit their original peremptory challenges through the website as detailed above. Thus, the Judge views both attorneys submit their additional peremptory challenges through the website the same way he/she viewed both attorneys submit their original peremptory challenges through the website.

Thus, once the above said message in the light green window disappears, the Judge is shown all of the above features that are detailed above. Thus, the Judge is shown the following: 1) interactive names and interactive pictures of only the remaining jurors who were not excluded with a challenge for cause through the website, 2) any notes the Judge may have made on any of the jurors through the website, 3) a scroll bar in the in the far right edge of the screen will appear to view all of the above stated features, 4) the current date and time will appear in the top margin of the screen, 5) the specified date and time for both attorneys to submit their additional peremptory challenges in an alternating fashion through the website will appear directly below the current date and time, 6) a window labeled "Plaintiff Attorney's Additional Peremptory Challenge Submissions," and 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when either attorney is taking a turn to submit an additional peremptory challenge through the website, 9) a rectangular light green window that will state which attorney is submitting an additional peremptory challenge in the bottom right corner of the screen, and 10) a button labeled "Previous" will appear in the bottom margin of the screen.

With regard to the interactive names and interactive pictures of only the remaining jurors who were not excluded with a challenge for cause through the website appearing on the Judge's screen, the interactive names of the jurors that were struck with an uncontested peremptory challenge by either attorney when the attorneys submitted their original peremptory challenges will appear highlighted in light red and will have a strike through line through them on the Judge's screen indicating the juror is not available to be struck with an additional peremptory challenge. Thus, only the interactive names of the jurors that are not highlighted in red with a strike through line are the only interactive names that the Plaintiff Attorney and the Defense Attorney may strike with an additional peremptory challenge through the website. Additionally, all of the interactive names struck by an attorney's peremptory challenges that were overruled by the Judge through the website are automatically included in the jury panel and are not eligible to be struck by an additional peremptory challenge. Thus, directly above the bottom margin of the Judge's screen will be a narrow rectangular window with a label that states "Jury Panel and Alternate Jurors. The interactive names of jurors who were struck by attorney peremptory challenges which were subsequently overruled by the Judge will appear in alphabetical order under the label "Jury Panel and Alternate Jurors" in the narrow rectangular window, and they will not appear on the Judge's screen as possible interactive names the Plaintiff Attorney and Defense Attorney may strike with an additional peremptory challenge.

Also, with regard to the window labeled "Plaintiff Attorney's Additional Peremptory Challenge Submissions" on the Judge's screen, directly below the label "Plaintiff Attorney's Additional Peremptory Challenge Submissions" and within the said window will appear consecutive numbers from 1 to the total number of additional peremptory challenges the Plaintiff Attorney is required to submit. For example, if the Judge overruled 5 of the Plaintiff Attorney's original peremptory challenges through the website, the window labeled "Plaintiff Attorney's Additional Peremptory Challenge Submissions," on the Judge's Screen, will include consecutive numbers from 1-5. When the Plaintiff Attorney successfully submits his/her first additional peremptory challenge, the name of the juror the Plaintiff Attorney selected to exclude with a peremptory challenge will appear next to the number one in the window labeled "Plaintiff Attorney's Additional Peremptory Challenge Submissions" on the Judge's screen. When the Plaintiff Attorney successfully submits his/her second additional peremptory challenge, the name of the juror the Plaintiff Attorney selected to exclude with a peremptory challenge immediately will appear next to the number two in the window labeled "Plaintiff Attorney's Additional Peremptory Challenge Submissions" on the Judge's screen. Thus, the name of each juror excluded with a Plaintiff Attorney's additional peremptory challenge through the website will appear next to the number that corresponds with the order the juror was excluded with an additional peremptory challenge through the website by the Plaintiff Attorney in the window labeled "Plaintiff Attorney's Additional Peremptory Challenge Submissions" on the Judge's screen. To the right of each juror's name on the list in the window labeled "Plaintiff Attorney's Additional Peremptory Challenge Submissions," on the Judge's screen, will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with an additional peremptory challenge will appear the authenticating picture of the Plaintiff Attorney that the Plaintiff Attorney made through a webcam and into the website upon selecting "Authenticate and Submit One Peremptory Challenge" just before the Plaintiff Attorney submitted the additional peremptory challenge through the website.

Also, with regard to the window labeled "Defense Attorney's Additional Peremptory Challenge Submissions" on the Judge's screen, directly below the label "Defense Attorney's Additional Peremptory Challenge Submissions" and within the said window will appear consecutive numbers from 1 to the total number of additional peremptory challenges the Defense Attorney is required to submit. For example, if the judge overruled 3 of the Defense Attorney's original peremptory challenges through the website, the window labeled "Defense Attorney's Additional Peremptory Challenge Submissions" will appear consecutive numbers from 1-3. When the Defense Attorney successfully submits his/her first additional peremptory challenge, the name of the juror the Defense Attorney selected to exclude with an additional peremptory challenge will appear next to the number one in the window labeled "Defense Attorney's Additional Peremptory Challenge Submissions" on the Judge's screen so the Judge can monitor the Defense Attorney's additional peremptory challenge submissions through the website as detailed above. When the Defense Attorney successfully submits his/her second additional peremptory challenge, the name of the juror the Defense Attorney selected to exclude with a peremptory challenge immediately will appear next to the number two in the window labeled "Defense Attorney's Additional Peremptory Challenge Submissions" on the Judge's screen. Thus, the name of each juror excluded with a Defense Attorney's additional peremptory challenge through the website will appear next to the number that corresponds with the order the juror was excluded with an additional peremptory challenge through the website by the Defense Attorney in the window labeled "Defense Attorney's Additional Peremptory Challenge Submissions" on the Judge's screen. To the right of each juror's name on the list in the window labeled "Defense Attorney's Additional Peremptory Challenge Submissions" on the Judge's screen will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with an additional peremptory challenge will appear the authenticating picture of the Defense Attorney that the Defense Attorney made through a webcam and into the website upon selecting "Authenticate and Submit One Peremptory Challenge" just before the Defense Attorney submitted the additional peremptory challenge through the website so the Judge can monitor each of the Defense Attorney's additional peremptory challenge.

Every time the Plaintiff Attorney submits an additional peremptory challenge through the website on or after the date and time for attorneys to submit their additional peremptory challenges through the website in an alternating fashion, the respective juror's name struck with the Plaintiff Attorney's additional peremptory challenge, will become highlighted in light red and a single strike through line will appear through the juror's name on the Judge's screen.

Additionally, every time the Defense Attorney submits an additional peremptory challenge through the website, the name of the juror the Defense Attorney selected to exclude with an additional peremptory challenge will become highlighted in light red and a single strike through line will appear through the juror's name on the judge's screen.

After each attorney has submitted his/her last required additional peremptory challenge, the said light green window in the bottom right corner of the Judge's screen will state the following: "Each attorney has successfully submitted all of their required additional peremptory challenges." Additionally, after each attorney has submitted his/her last required additional peremptory challenge through the website, a new light red window will then appear in the middle of the Judge's screen that states as follows:

Both attorneys have successfully submitted all of their required additional peremptory challenges, and neither attorney is allowed to submit anymore additional peremptory challenges through the website. The alternating peremptory challenge process for additional peremptory challenges through the website is now complete. You may now log off the website, or you may review all of the additional peremptory challenge exercises or review the remaining juror pictures, videos, questionnaires, and confidential notes.

Below this message will appear a button labeled "OK." By the Judge clicking on the OK button, the said light red window with this message disappears. Once the said message disappears, the Judge may review all of the additional peremptory challenge exercises or review the remaining juror pictures, videos, questionnaires, and confidential notes. The Judge may also log off of the website.

Every time the Judge selects "View All Additional Peremptory Challenge Exercises" from his/her respective Main Menu of Functions, the Judge is advised that he/she may review any notes he/she may have made through the website, questionnaires, and/or videos of any of the jurors as much as he/she desires before the specified date and time both attorneys are to submit their additional peremptory challenges through the website in an alternating fashion. Thus, when the Judge logs into his/her respective program on the website and selects "View All Additional Peremptory Challenge Exercises" from his/her Main Menu of Functions at any time before the specified date and time for attorneys to submit their additional peremptory challenges in an alternating fashion to review the said information on any of the jurors, the Judge is initially shown the above said large light green window on his/her screen. When the Judge minimizes the above said light green message into the bottom margin of his/her screen, he/she is shown all of the above features that are detailed above, and he/she is allowed to review any notes, questionnaires, and/or videos of any of the jurors.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Plaintiff Attorney's rebuttal of non-discriminatory reasons through the website and if the Judge sustained the Defense Attorney's rebuttal of non-discriminatory reasons through the website or if the Defense Attorney's peremptory challenges were never contested, the Plaintiff Attorney only logs onto the website on the specific date and time designated by the Judge and submits additional peremptory challenges in a number equal to the total number of original Plaintiff Attorney peremptory challenges the Judge overruled. Since the Defense Attorney is not required and is not allowed to submit any additional peremptory challenges through the website as his/her original peremptory challenges were preserved, the Plaintiff Attorney does not submit his/her additional peremptory challenges through the website in an alternating fashion with the Defense Attorney. Rather, the Plaintiff specific date and time designated by the Judge for the Plaintiff Attorney to submit his/her required additional peremptory challenges as detailed below.

Thus, when the Defense Attorney is not allowed to submit additional peremptory challenges through the website, and the Plaintiff Attorney is required to submit additional peremptory challenges through the website, the Plaintiff Attorney logs into his/her respective program on the website on the specified date and time designated by the Judge for the Plaintiff Attorney to submit his/her additional peremptory challenges, and the Plaintiff Attorney selects "Submit Additional Peremptory Challenge Exercises" from his/her Main Menu of Functions. When the Plaintiff Attorney selects "Submit Additional Peremptory Challenge Exercises" from his/her Main Menu of Functions at the specified date and time set by the Judge for only the Plaintiff Attorney to submit additional peremptory challenges, the Plaintiff Attorney is initially shown a large grey window on his/her screen that states as follows:

The Plaintiff Attorney is required to submit additional peremptory challenges through this website on (the date and time the judge specified for the Plaintiff Attorney to submit his/her additional peremptory challenges through the website appears here). The total number of additional peremptory challenges the Plaintiff Attorney is required to submit through the website is equal to the total number of original peremptory challenges submitted by the Plaintiff Attorney that the Judge overruled through the website. The Plaintiff Attorney is required to submit (the number of additional peremptory challenges the Plaintiff Attorney is required to submit appears here) additional peremptory challenges.

The Judge did not overrule any of the Defense Attorney's original peremptory challenges through the website. Therefore, the Defense Attorney's original peremptory challenge exercises are preserved, and the Defense Attorney is not allowed to submit any additional peremptory challenges through the website.

The Plaintiff Attorney will be allowed to submit all of his/her additional peremptory challenges through the website by submitting one additional peremptory challenge at a time without the Defense Attorney submitting any additional peremptory challenges through the website.

To successfully submit an additional peremptory challenge, you must click a check mark in one box next to the interactive name and picture of one particular juror and click "Authenticate and Submit One Peremptory Challenge" in the bottom margin of the screen. If you have more than one additional peremptory challenge to submit through the website, you will only be allowed to submit one additional peremptory challenge at a time through the website in the said manner until you have submitted all of your additional peremptory challenges through the website. You must stay logged into the website continuously until you have submitted all of your required additional peremptory challenges.

You will be allowed (the number of minutes the Judge allotted each attorney to submit each peremptory challenge through the website in the Custom Setup of the Jury Selection Process appears here) minutes to submit each additional peremptory challenge.

If you do not submit an additional peremptory challenge within the designated time limit, you are still required to submit an additional peremptory challenge through the website regardless if the time limit expires.

You will not be allowed to submit your additional peremptory challenges until (the date and time the judge specified for the Plaintiff Attorney to submit his/her additional peremptory challenges appears here).

Once you click the "OK" button at the bottom of this message on or after the specified time on the specified date for the Plaintiff Attorney to submit additional peremptory challenges through the website, this message will disappear. Once this message disappears, a new message in a green window will appear on the screen advising you that you are now required to submit an additional peremptory challenge through the website.

The Judge, the Defense Attorney, the Defendant, and the Plaintiff, if this case is civil, may log into their respective programs through the website on the specified date and time you are required to submit your additional peremptory challenges and view your additional peremptory challenge submissions immediately after you submit them.

You may minimize this message into the bottom margin of your screen to allow you to review your professional jury consultant's notes, your notes, the Plaintiff's notes, questionnaires, and/or videos of the jurors at any time before the specified date and time you are to submit your additional peremptory challenges through the website. Thus, you are encouraged to review your professional jury consultant's notes, your notes, the Plaintiff's notes, questionnaires, and/or videos of the jurors as much as you desire to prepare yourself for the additional peremptory challenge submission process before the specified date and time you are required to submit your additional peremptory challenges through the website.

Below the above said message in the window will appear a button that says "OK." When the Plaintiff Attorney clicks the "OK" button on or after the specified date and time he/she is required to submit his/her additional peremptory challenges, the above said message disappears. The large grey window with the above said message will not disappear by clicking the "OK" button at any time before the specified date and time the Plaintiff Attorney is required to submit his/her additional peremptory challenges through the website. However, the Plaintiff Attorney will be allowed to minimize the above said grey message into the bottom margin of his/her screen to allow him/her to review his/her professional jury consultant's notes, his/her own notes, the Plaintiff's notes, questionnaires, and/or videos of the jurors at any time before the specified date and time the Plaintiff Attorney is required to submit his/her additional peremptory challenges through the website. Thus, the Plaintiff Attorney is instructed to review his/her professional jury consultant's notes, his/her notes, the Plaintiff's notes, questionnaires, and/or videos of the jurors as much as he/she desires to prepare him/her for the additional peremptory challenge submission process before the specified date and time he/she is required to submit his/her additional peremptory challenges through the website. The above said grey message will always appear on the Plaintiff Attorney's screen each time he/she selects "Submit Additional Peremptory Challenge Exercises" from his/her Main Menu of Functions in the website.

If the Defense Attorney is not allowed to submit additional peremptory challenges through the website, and if the Plaintiff Attorney is required to submit additional peremptory challenges through the website, and if the Plaintiff Attorney makes the above said message disappear on or after the specified date and time for him/her to submit his/her additional peremptory challenges through the website, a new light green window will appear on the screen that states as follows:

The Plaintiff Attorney is now required to submit an additional peremptory challenge through the website. Time remaining for the Plaintiff Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Plaintiff Attorney clicks the "OK" button, this said message disappears to allow the Plaintiff Attorney to submit an additional peremptory challenge through the website as detailed below.

Once the above said message in the light green window disappears on the Plaintiff Attorney's screen, and if the Defense Attorney is not allowed to submit any additional peremptory challenges through the website, the Plaintiff Attorney is given and shown all of the exact same features that the Plaintiff Attorney was given and shown when he/she submitted his/her original peremptory challenges through the website as detailed above. Thus, the Plaintiff Attorney submits his/her additional peremptory challenges through the website the same way he/she submitted his/her original peremptory challenges through the website. Thus, the Plaintiff Attorney is shown the following: 1) interactive names and interactive pictures of only the remaining jurors who were not excluded with a challenge for cause through the website, 2) the Plaintiff Attorney's Professional Jury Consultant's analysis and assigned number of each particular juror if the Plaintiff Attorney selected a professional jury consultant, 3) the Plaintiff Attorney's confidential analysis and assigned number of each respective juror, 4) the Plaintiff's own personal analysis and assigned number of each particular juror, 5) a scroll bar in the in the far right edge of the screen will appear to view all of the above stated features, 6) the current date and time will appear in the top margin of the screen, 7) the specified date and time for both attorneys to submit their additional peremptory challenges in an alternating fashion through the website will appear directly below the current date and time, 8) the amount of time the Judge allotted for each attorney to submit a peremptory challenge through the website in the Custom Setup of the Jury Selection Process will appear, 9) a box will appear to the left of each juror's interactive name and picture with the instruction above each box that states "Select hear to exclude this juror with a peremptory challenge," 10) a button labeled "Previous" will appear in the bottom margin of the screen, 11) a rectangular light green window that states "Authenticate and Submit One Peremptory Challenge" will appear in the bottom margin of the screen, 12) a window labeled "Plaintiff Attorney's Additional Peremptory Challenge Submissions," and 13) a window labeled "Defense Attorney's Additional Peremptory Challenge Submissions."

With regard to the interactive names and interactive pictures of only the remaining jurors who were not excluded with a challenge for cause through the website appearing on the Plaintiff Attorney's screen, the interactive names of the jurors that were struck with a peremptory challenge by either attorney when the attorneys submitted their original peremptory challenges will appear highlighted in light red and will have a strike through line through them indicating the juror is not available to be struck with an additional peremptory challenge. Thus, only the interactive names of the jurors that are not highlighted in red with a strike through line are the only interactive names that the Plaintiff Attorney may strike with an additional peremptory challenge through the website. Additionally, all of the interactive names struck by the Plaintiff Attorney's peremptory challenges that were overruled by the Judge through the website are automatically included in the jury panel and are not eligible to be struck by an additional peremptory challenge of the Plaintiff Attorney. Thus, directly above the bottom margin of the Plaintiff Attorney's screen will be a narrow rectangular window with a label that states "Jury Panel and Alternate Jurors." The interactive names of jurors who were struck by the Plaintiff Attorney's peremptory challenges which were subsequently overruled by the Judge will appear in alphabetical order under the label "Jury Panel and Alternate Jurors" in the narrow rectangular window, and they will not appear on the Plaintiff Attorney's screen as possible interactive names the Plaintiff Attorney may strike with an additional peremptory challenge. Thus, the interactive names of jurors who were struck by the Plaintiff Attorney's peremptory challenges which were subsequently overruled by the Judge are automatically placed in alphabetical order within the window labeled "Jury Panel and Alternate Jurors."

If the Plaintiff Attorney is required to submit additional peremptory challenges through the website, and if the Defense Attorney is not allowed to submit additional peremptory challenges through the website, the window labeled "Plaintiff Attorney's Additional Peremptory Challenge Submissions" on the Plaintiff Attorney's screen will contain consecutive numbers from 1 to the total number of additional peremptory challenges the Plaintiff Attorney is required to submit directly below the label "Plaintiff Attorney's Additional Peremptory Challenge Submissions." For example, if the judge overruled 5 of the Plaintiff Attorney's original peremptory challenges through the website, the window labeled "Plaintiff Attorney's Additional Peremptory Challenge Submissions" will contain consecutive numbers from 1-5. When the Plaintiff Attorney successfully submits his/her first additional peremptory challenge, the name of the juror the Plaintiff Attorney selected to exclude with a peremptory challenge will appear next to the number one in the window labeled "Plaintiff Attorney's Additional Peremptory Challenge Submissions." When the Plaintiff Attorney successfully submits his/her second additional peremptory challenge, the name of the juror the Plaintiff Attorney selected to exclude with a peremptory challenge immediately will appear next to the number two in the window labeled "Plaintiff Attorney's Additional Peremptory Challenge Submissions." Thus, the name of each juror excluded with a Plaintiff Attorney's additional peremptory challenge through the website will appear next to the number that corresponds with the order the juror was excluded with a peremptory challenge through the website by the Plaintiff Attorney in the window labeled "Plaintiff Attorney's Additional Peremptory Challenge Submissions." To the right of each juror's name on the list in the window labeled "Plaintiff Attorney's Additional Peremptory Challenge Submissions" will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with a peremptory challenge will appear the authenticating picture of the Plaintiff Attorney that the Plaintiff Attorney made through a webcam and into the website upon selecting "Authenticate and Submit One Peremptory Challenge" just before the Plaintiff Attorney submitted the additional peremptory challenge through the website.

If the Plaintiff Attorney is required to submit additional peremptory challenges through the website, and if the Defense Attorney is not allowed to submit additional peremptory challenges through the website, the window labeled "Defense Attorney's Additional Peremptory Challenge Submissions" on the Plaintiff Attorney's screen will contain a message that states that the Defense Attorney's original peremptory challenges were preserved, and the Defense Attorney is not allowed to submit any additional peremptory challenges through the website. Such message will appear directly below the label "Defense Attorney's Additional Peremptory Challenge Submissions."

When the Plaintiff Attorney clicks the "OK" button on the message in the above said light green window that states that the Plaintiff Attorney is now required to submit an additional peremptory challenge through the website, and the window disappears, the time the Judge allotted for each attorney to submit a peremptory challenge immediately will begin to count down so the Plaintiff Attorney can monitor how much time he/she has to submit an additional peremptory challenge through the website.

Ultimately, the Plaintiff Attorney submits all of his/her additional peremptory challenges in the exact same manner through the website as he/she submitted his/her original peremptory challenges through the website. Thus, to submit an additional peremptory challenge, the Plaintiff Attorney clicks a check mark in one box next to the interactive name and picture of one particular juror who has not been struck with a previous peremptory challenge and clicks "Authenticate and Submit One Peremptory Challenge." When the Plaintiff Attorney selects the "Authenticate and Submit One Peremptory Challenge" option and takes an authenticating picture of himself/herself with a webcam and into the invention's website as detailed above, the Plaintiff Attorney's additional peremptory challenge will be made viewable and accessible to the Judge, the Defense Attorney, the Plaintiff, the Defendant, and the Court Reporter through the invention's website and the Plaintiff Attorney's authenticating picture will appear next to the Plaintiff Attorney's additional peremptory challenge on their respective screens.

If the Plaintiff Attorney has more than one additional peremptory challenge to submit through the website, he/she will only be allowed to submit one additional peremptory challenge at a time through the website in the said manner until he/she has submitted all of his/her additional peremptory challenges through the website. Thus, the Plaintiff Attorney will not be allowed to make a check mark appear next to more than one box next to an interactive juror's name before clicking the "Authenticate and Submit One Peremptory Challenge" button. The Plaintiff Attorney is instructed to stay logged into the website continuously until he/she has submitted all of his/her required additional peremptory challenges.

Every time the Plaintiff Attorney exercises an additional peremptory challenge by clicking the "Authenticate and Submit One Peremptory Challenge" button in his/her program after clicking a check mark in the box next to one particular juror's interactive name and picture, the selected juror's name, on the screen, will become highlighted in light red and a single strike through line will appear through the juror's name.

If the Defense Attorney is not allowed to submit any additional peremptory challenges through the website, and if the Plaintiff Attorney just submitted an additional peremptory challenge through the website, and if the Plaintiff Attorney has one or more additional peremptory challenge left to exercise through the website, the same light green window detailed above will appear again on the Plaintiff Attorney's screen that states as follows:

The Plaintiff Attorney is now required to submit an additional peremptory challenge through the website. The time remaining for the Plaintiff Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Plaintiff Attorney clicks the "OK" button, this said message disappears to allow the Plaintiff Attorney to submit another additional peremptory challenge through the website as detailed above.

When the Plaintiff Attorney clicks the "OK" button on the message in the above said light green window, and the window disappears, the time the Judge allotted for each attorney to submit a peremptory challenge immediately will again begin to count down so the Plaintiff Attorney can monitor how much time he/she has to submit an additional peremptory challenge through the website. Thus, the Plaintiff Attorney submits another additional peremptory challenge in the manner stated above. The Plaintiff Attorney will continue the above pattern of submitting one additional peremptory challenge at a time through the website until he/she has submitted all of his/her additional peremptory challenges.

If the Defense Attorney is not allowed to submit any additional peremptory challenges through the website, and if the Plaintiff Attorney has just submitted his/her only or final additional peremptory challenge through the website and is not allowed to submit anymore additional peremptory challenges through the website, a new light red window appears on the Plaintiff Attorney's screen that states as follows:

The Plaintiff Attorney has submitted all of his/her required additional peremptory challenges through the website. The Plaintiff Attorney is not allowed to submit anymore additional peremptory challenges through the website. You may now log off the website, or you may review all of the peremptory challenge exercises or review the remaining juror pictures, videos, questionnaires, and confidential notes.

Below this message will appear a button labeled "OK." By the Plaintiff Attorney clicking on the OK button, the said light red window with this message disappears. Once the said message disappears, the Plaintiff Attorney may review all of the peremptory challenge exercises or review the remaining juror pictures, videos, questionnaires, and confidential notes. The Plaintiff Attorney may also log off of the website.

Every time the Plaintiff Attorney selects "Submit Additional Peremptory Challenge Exercises" from his/her respective Main Menu of Functions, the Plaintiff Attorney is advised to review his/her professional jury consultant's analysis and assigned number of each juror, his/her own analysis and assigned number of each juror, the Plaintiff's analysis and assigned number of each juror, questionnaires, and/or videos of each juror and then decide which jurors to keep or exclude with an additional peremptory challenge before the specified date and time the Plaintiff Attorney is required to submit additional peremptory challenges through the website to prepare him/her for submitting additional peremptory challenges through the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Plaintiff Attorney's rebuttal of non-discriminatory reasons through the website and if the Judge sustained the Defense Attorney's rebuttal of non-discriminatory reasons through the website or if the Defense Attorney's peremptory challenges were never contested and otherwise preserved and the Defense Attorney is not allowed to submit any additional peremptory challenges through the website, and if the Plaintiff Attorney is required to log onto the website on a specific date and time designated by the Judge to submit additional peremptory challenges in a number equal to the total number of original Plaintiff Attorney peremptory challenges the Judge overruled, the Judge, the Defense Attorney, the Plaintiff, if the case is civil, and the Defendant log into their respective programs on the website on the same specified date and time set by the judge for the Plaintiff Attorney to submit his/her additional peremptory challenges through the website, and they view the Plaintiff Attorney's submitted additional peremptory challenges through the website. Thus, the Judge, the Defense Attorney, the Plaintiff, and the Defendant are allowed to view the additional peremptory challenges submitted by the Plaintiff Attorney at the same time the Plaintiff Attorney submits his/her additional peremptory challenges through the website.

When the Judge, the Defense Attorney, the Plaintiff and the Defendant log into their respective programs on the website on the same specified date and time that only the Plaintiff Attorney is scheduled to submit his/her additional peremptory challenges through the website to view the submitted additional peremptory challenges of the Plaintiff Attorney, they each select "View All Additional Peremptory Challenge Exercises" from his/her respective Main Menu of Functions. When they select "View All Additional Peremptory Challenge Exercises" from their respective Main Menu of Functions at the specified date and time set by the Judge for only the Plaintiff Attorney to submit additional peremptory challenges through the website, they are initially shown a large light green window on their respective screens that states as follows:

The Plaintiff Attorney is required to submit additional peremptory challenges through this website on (the date and time the judge specified for the Plaintiff Attorney to submit his/her additional peremptory challenges through the website appears here). The total number of additional peremptory challenges the Plaintiff Attorney is required to submit through the website is equal to the total number of original peremptory challenges submitted by the Plaintiff Attorney that were overruled by the Judge through the website. The Plaintiff Attorney is required to submit (the number of additional peremptory challenges the Plaintiff Attorney is required to submit appears here) additional peremptory challenges.

The Judge did not overrule any of the Defense Attorney's original peremptory challenges through the website. Therefore, the Defense Attorney's original peremptory challenge exercises are preserved, and the Defense Attorney is not allowed to submit any additional peremptory challenges through the website.

The Plaintiff Attorney will be allowed to submit all of his/her additional peremptory challenges through the website by submitting one additional peremptory challenge at a time without the Defense Attorney submitting any additional peremptory challenges through the website.

If the Plaintiff Attorney has more than one additional peremptory challenge to submit through the website, the Plaintiff Attorney will only be allowed to submit one additional peremptory challenge at a time through the website until he/she has submitted all of his/her additional peremptory challenges through the website. The Plaintiff Attorney must stay logged into the website continuously until he/she has submitted all of his/her required additional peremptory challenges.

The Plaintiff Attorney will be allowed (the number of minutes the Judge allotted each attorney to submit each peremptory challenge through the website in the Custom Setup of the Jury Selection Process appears here) minutes to submit each additional peremptory challenge.

If the Plaintiff Attorney does not submit an additional peremptory challenge within the designated time limit, the Plaintiff Attorney is still required to submit an additional peremptory challenge through the website regardless if the time limit expires.

The Plaintiff Attorney will not be allowed to submit his/her additional peremptory challenges until (the date and time the judge specified for the Plaintiff Attorney to submit his/her additional peremptory challenges appears here).

You will be allowed to view a countdown of the allotted number of minutes the Plaintiff Attorney is allowed to submit each additional peremptory challenge through the website on your screen while you wait for the Plaintiff Attorney to submit an additional peremptory challenge.

On the (the date and time the Judge designated for the Plaintiff Attorney to submit his/her additional peremptory challenges through the website appears here), you will be allowed to view the name of each juror the Plaintiff Attorney excludes with an additional peremptory challenge on a list on your screen immediately after the Plaintiff Attorney submits each additional peremptory challenge through the website.

You may stay logged into this website until the Plaintiff Attorney has submitted all of his/her additional peremptory challenges through the website.

Once you click the "OK" button on or after the specified time on the specified date, this message will disappear. You may minimize this message into the bottom margin of your screen to allow you to review your notes, questionnaires, and/or videos of the jurors at any time before the specified date and time the Plaintiff Attorney is required to submit his/her additional peremptory challenges through the website.

Below the above said message in the window will appear a button that says "OK." When the Judge, the Defense Attorney, the Plaintiff, and the Defendant click the "OK" button, in their respective programs, on or after the specified time on the specified date for only the Plaintiff Attorney to submit his/her required additional peremptory challenges through the website, the large light green window with the above said message disappears to allow them to view each additional peremptory challenge submitted by the Plaintiff Attorney through the website. Thus, the large light green window with the above said message will not disappear by clicking the "OK" button in each of their respective programs at any time before the specified time on the specified date. However, they will be allowed to minimize the above said light green message into the bottom margin of their respective screens to allow them to review their respective notes, questionnaires, and/or videos of the jurors at any time before the specified date and time for the Plaintiff Attorney only to submit his/her required additional peremptory challenges through the website. Thus, they are instructed to review their respective notes, questionnaires, and/or videos of the jurors as much as they desire before the specified date and time for the Plaintiff Attorney only to submit his/her required additional peremptory challenges through the website. The above said light green message will always appear on their respective screens each time they select "View All Additional Peremptory Challenge Exercises" from their respective Main Menu of Functions in the website.

Once the above said message in the light green window disappears on the Plaintiffs respective screen to view only the Plaintiff Attorney's additional peremptory challenge submissions through the website, the Plaintiff is given and shown all of the exact same features that the Plaintiff was given and shown when he/she viewed both the Plaintiff Attorney and the Defense Attorney submit their original peremptory challenges through the website as detailed above. Thus, the Plaintiff views the Plaintiff Attorney submit his/her additional peremptory challenges through the website the same way he/she viewed both attorneys submit their original peremptory challenges through the website.

Thus, once the above said message in the light green window disappears, the Plaintiff is shown all of the features that are detailed above. Thus, the Plaintiff is shown the following: 1) interactive names and interactive pictures of only the remaining jurors who were not excluded with a challenge for cause through the website, 2) the Plaintiff's own personal analysis and assigned number of each particular juror, 3) a scroll bar in the far right edge of the screen will appear to view all of the above stated features, 4) the current date and time will appear in the top margin of the screen, 5) the specified date and time for the Plaintiff Attorney to submit his/her additional peremptory challenges through the website will appear directly below the current date and time, 6) a window labeled "Plaintiff Attorney's Additional Peremptory Challenge Submissions," 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when the Plaintiff Attorney is submitting an additional peremptory challenge through the website, 9) a rectangular light green window that will state which attorney is submitting an additional peremptory challenge in the bottom right corner of the screen, and 10) a button labeled "Previous" will appear in the bottom margin of the screen.

Likewise, once the above said message in the light green window disappears on the Defendant's respective screen to view only the Plaintiff Attorney's additional peremptory challenge submissions through the website, the Defendant is given and shown all of the exact same features that the Defendant was given and shown when he/she viewed both the Plaintiff Attorney and the Defense Attorney submit their original peremptory challenges through the website as detailed above. Thus, the Defendant views the Plaintiff Attorney submit his/her additional peremptory challenges through the website the same way he/she viewed both attorneys submit their original peremptory challenges through the website.

Thus, once the above said message in the light green window disappears, the Defendant is shown all of the features that are detailed above. Thus, the Defendant is shown the following: 1) interactive names and interactive pictures of only the remaining jurors who were not excluded with a challenge for cause through the website, 2) the Defendant's own personal analysis and assigned number of each particular juror, 3) a scroll bar in the far right edge of the screen will appear to view all of the above stated features, 4) the current date and time will appear in the top margin of the screen, 5) the specified date and time for the Plaintiff Attorney to submit his/her additional peremptory challenges through the website will appear directly below the current date and time, 6) a window labeled "Plaintiff Attorney's Additional Peremptory Challenge Submissions," 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when the Plaintiff Attorney is submitting an additional peremptory challenge through the website, 9) a rectangular light green window that will state which attorney is submitting an additional peremptory challenge in the bottom right corner of the screen, and 10) a button labeled "Previous" will appear in the bottom margin of the screen.

Additionally, once the above said message in the light green window disappears on the Defense Attorney's respective screen to view only the Plaintiff Attorney's additional peremptory challenge submissions through the website, the Defense Attorney will be given all of the same features that the Defendant is given and shown to view the Plaintiff Attorney's additional peremptory challenge submissions through the website but also will be allowed to view his/her professional jury consultant's analysis and assigned number of each juror and will be allowed to view his/her own analysis and assigned number of each juror and will be allowed to view the Defendant's analysis and assigned number of each juror.

Thus, once the above said message in the light green window disappears, the Defense Attorney is shown all of the following features: 1) interactive names and interactive pictures of only the remaining jurors who were not excluded with a challenge for cause through the website, 2) the Defense Attorney's Professional Jury Consultant's analysis and assigned number of each juror, 3) the Defense Attorney's own analysis and assigned number of each juror, 4) the Defendant's own personal analysis and assigned number of each particular juror, 5) a scroll bar in the far right edge of the screen will appear to view all of the above stated features, 6) the current date and time will appear in the top margin of the screen, 7) the specified date and time for the Plaintiff Attorney to submit his/her additional peremptory challenges through the website will appear directly below the current date and time, 8) a window labeled "Plaintiff Attorney's Additional Peremptory Challenge Submissions," 9) a window labeled "Defense Attorney's Additional Peremptory Challenge Submissions," 10) the amount of time the Judge allotted for each attorney to submit each additional peremptory challenge through the website in the Custom Setup of the Jury Selection Process will appear and begin to count down when the Plaintiff Attorney is submitting an additional peremptory challenge through the website, 11) a rectangular light green window that will state which attorney is submitting an additional peremptory challenge in the bottom right corner of the screen, and 12) a button labeled "Previous" will appear in the bottom margin of the screen.

Also, once the above said message in the light green window disappears on the Judge's respective screen to view only the Plaintiff Attorney's additional peremptory challenge submissions through the website, the Judge is given and shown all of the exact same features that the Judge was given and shown when he/she viewed both the Plaintiff Attorney and the Defense Attorney submit their original peremptory challenges through the website as detailed above. Thus, the Judge views the Plaintiff Attorney submit his/her additional peremptory challenges through the website the same way he/she viewed both attorneys submit their original peremptory challenges through the website.

Thus, once the above said message in the light green window disappears, the Judge is shown all of the above features that are detailed above. Thus, the Judge is shown the following: 1) interactive names and interactive pictures of only the remaining jurors who were not excluded with a challenge for cause through the website, 2) any notes or analysis the Judge may have made for any of the jurors, 3) a scroll bar in the far right edge of the screen will appear to view all of the above stated features, 4) the current date and time will appear in the top margin of the screen, 5) the specified date and time for the Plaintiff Attorney to submit his/her additional peremptory challenges through the website will appear directly below the current date and time, 6) a window labeled "Plaintiff Attorney's Additional Peremptory Challenge Submissions," 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when the Plaintiff Attorney is submitting an additional peremptory challenge through the website, 9) a rectangular light green window that will state which attorney is submitting an additional peremptory challenge in the bottom right corner of the screen, and 10) a button labeled "Previous" will appear in the bottom margin of the screen.

With regard to the interactive names and interactive pictures of only the remaining jurors who were not excluded with a challenge for cause through the website appearing on the Judge's, the Defense Attorney's, the Plaintiff's, and the Defendant's respective screens if the Plaintiff Attorney only is allowed and required to submit additional peremptory challenges through the website, all the interactive names of the jurors that were struck with a peremptory challenge by both attorneys when the attorneys submitted their original peremptory challenges through the website will appear highlighted in light red and will have a strike through line through them on their respective screens indicating the juror is not available to be struck with an additional peremptory challenge of the Plaintiff Attorney. Thus, only the interactive names of the jurors that are not highlighted in red with a strike through line are the only interactive names that the Plaintiff Attorney may strike with an additional peremptory challenge through the website. Additionally, all of the interactive names struck by the Plaintiff Attorney's original peremptory challenges that were overruled by the Judge through the website are automatically included in the jury panel and are not eligible to be struck by an additional peremptory challenge. Thus, directly above the bottom margin of their respective screens will be a narrow rectangular window with a label that states "Jury Panel and Alternate Jurors." The interactive names of jurors who were struck by the Plaintiff Attorney's original peremptory challenges which were subsequently overruled by the Judge will appear in alphabetical order under the label "Jury Panel and Alternate Jurors" in the narrow rectangular window, and they will not appear on the Judge's, the Defense Attorney's, the Plaintiff's, or the Defendant's respective screens as possible interactive names the Plaintiff Attorney may strike with an additional peremptory challenge.

Also, with regard to the window labeled "Plaintiff Attorney's Additional Peremptory Challenge Submissions" on the Judge's, the Defense Attorney's, the Plaintiff's, and the Defendant's respective screens, directly below the label "Plaintiff Attorney's Additional Peremptory Challenge Submissions" and within the said window will appear consecutive numbers from 1 to the total number of additional peremptory challenges the Plaintiff Attorney is required to submit if the Plaintiff Attorney only is allowed and required to submit additional peremptory challenges through the website. For example, if the judge overruled 5 of the Plaintiff Attorney's original peremptory challenges through the website, the window labeled "Plaintiff Attorney's Additional Peremptory Challenge Submissions," on their respective screens, will include consecutive numbers from 1-5. When the Plaintiff Attorney successfully submits his/her first additional peremptory challenge through the website, the name of the juror the Plaintiff Attorney selected to exclude with a peremptory challenge will appear next to the number one in the window labeled "Plaintiff Attorney's Additional Peremptory Challenge Submissions" on their respective screens. When the Plaintiff Attorney successfully submits his/her second additional peremptory challenge through the website, the name of the juror the Plaintiff Attorney selected to exclude with a peremptory challenge immediately will appear next to the number two in the window labeled "Plaintiff Attorney's Additional Peremptory Challenge Submissions" on their respective screens. Thus, the name of each juror excluded with a Plaintiff Attorney's additional peremptory challenge through the website will appear next to the number that corresponds with the order the juror was excluded with a peremptory challenge through the website by the Plaintiff Attorney in the window labeled "Plaintiff Attorney's Additional Peremptory Challenge Submissions" on their respective screens. To the right of each juror's name on the list in the window labeled "Plaintiff Attorney's Additional Peremptory Challenge Submissions," on their respective screens, will appear the juror's respective picture, and to the right of the juror's respective picture will be the exact date and time the Plaintiff Attorney excluded the respective juror with an additional peremptory challenge and the total amount of time the Plaintiff Attorney took to exclude the juror with an additional peremptory challenge will appear next to the exact date and time the Plaintiff Attorney excluded the juror and to the right of the total amount of time the Plaintiff Attorney took to exclude the juror with an additional peremptory challenge will appear the authenticating picture of the Plaintiff Attorney that the Plaintiff Attorney made through a webcam and into the website upon selecting "Authenticate and Submit One Peremptory Challenge" just before the Plaintiff Attorney submitted an additional peremptory challenge through the website.

If the Plaintiff Attorney is required to submit additional peremptory challenges through the website, and if the Defense Attorney is not allowed to submit additional peremptory challenges through the website, the window labeled "Defense Attorney's Additional Peremptory Challenge Submissions" on the Judge's, the Defense Attorney's, the Plaintiff's, and the Defendant's respective screens will contain a message that states that the Defense Attorney's original peremptory challenges were preserved, and the Defense Attorney is not allowed to submit any additional peremptory challenges through the website. Such message will appear directly below the label "Defense Attorney's Additional Peremptory Challenge Submissions."

Every time the Plaintiff Attorney submits an additional peremptory challenge through the website on or after the date and time for only the Plaintiff Attorney to submit his/her additional peremptory challenges through the website, the respective juror's name struck with the Plaintiff Attorney's additional peremptory challenge will become highlighted in light red and a single strike through line will appear through the juror's name on the Judge's, the Defense Attorney's, the Plaintiff's, and the Defendant's respective screens.

On the Judge's, the Defense Attorney's, the Plaintiff's, and the Defendant's respective screens, in the bottom right corner of their respective screens will appear a rectangular light green window that will state which attorney is submitting a peremptory challenge. If the Plaintiff Attorney is the only attorney allowed to submit additional peremptory challenges through the website, the said rectangular light green window on the Judge's, the Defense Attorney's, the Plaintiff's, and the Defendant's respective screens will state "The Plaintiff Attorney is now submitting a peremptory challenge" each time the Plaintiff Attorney has an additional peremptory challenge left to submit through the website.

Thus, if the Plaintiff Attorney is the only attorney allowed to submit additional peremptory challenges through the website, and the Defense Attorney is not allowed to submit additional peremptory challenges through the website, the said rectangular light green window on the Judge's, the Defense Attorney's, the Plaintiff's, and the Defendant's respective screens will not state that "The Defense Attorney is now submitting a peremptory challenge" after each time the Plaintiff Attorney submits an additional peremptory challenge. It will only state that "The Plaintiff Attorney is now submitting a peremptory challenge" each time the Plaintiff Attorney has an additional peremptory challenge left to submit through the website.

After the Plaintiff Attorney has submitted his/her last or only required additional peremptory challenge, and if the Plaintiff Attorney only is allowed and required to submit additional peremptory challenges through the website, the said light green window in the bottom right corner of the Judge's, the Defense Attorney's, the Plaintiff's, and the Defendant's respective screens will state the following: "The Plaintiff Attorney has successfully submitted all of his/her required additional peremptory challenges." Additionally, after the Plaintiff Attorney has submitted his/her last or only required additional peremptory challenge through the website, and if the Plaintiff Attorney only is allowed and required to submit additional peremptory challenges through the website, a new light red window will then appear in the middle of the Judge's, the Defense Attorney's, the Plaintiff's, and the Defendant's respective screens that states as follows:

The Plaintiff Attorney has successfully submitted all of his/her required additional peremptory challenges, and the Plaintiff Attorney is not allowed to submit anymore additional peremptory challenges through the website. You may now log off the website, or you may review all of the additional peremptory challenge exercises or review the remaining juror pictures, videos, questionnaires, and confidential notes.

Below this message will appear a button labeled "OK." By the Judge, the Defense Attorney, the Plaintiff, and the Defendant clicking on the OK button on their respective screens, the said light red window with this message disappears. Once the said message disappears, the Judge, the Defense Attorney, the Plaintiff, and the Defendant may review all of the additional peremptory challenge exercises or review the remaining juror pictures, videos, questionnaires, and confidential notes. They may also log off of the website.

Every time the Judge, the Defense Attorney, the Plaintiff, and the Defendant select "View All Additional Peremptory Challenge Exercises" from their respective Main Menu of Functions on their respective screens when only the Plaintiff Attorney is allowed and required to submit additional peremptory challenges through the website on a specific date and time, they are instructed to review their respective notes, questionnaire, and/or video of each juror as much as they desire before the specified date and time the Plaintiff Attorney is required to submit his/her additional peremptory challenges through the website. Thus, when they log into their respective program on the website and select "View All Additional Peremptory Challenge Exercises" from their respective Main Menu of Functions at any time before the specified date and time for the Plaintiff Attorney to submit his/her additional peremptory challenges through the website to review the said information on each juror, they are initially shown the above said large light green window on their respective screens. When they minimize the above said light green message into the bottom margin of their respective screens, they are shown all of the above features that are detailed above in their respective programs, and they are allowed to review their respective notes, questionnaire, and/or video of each juror.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Defense Attorney's rebuttal of non-discriminatory reasons through the website and if the Judge sustained the Plaintiff Attorney's rebuttal of non-discriminatory reasons through the website or if the Plaintiff Attorney's peremptory challenges were never contested, the Defense Attorney only logs onto the website on the specific date and time designated by the Judge and submits additional peremptory challenges in a number equal to the total number of original Defense Attorney peremptory challenges the Judge overruled. Since the Plaintiff Attorney is not required and is not allowed to submit any additional peremptory challenges through the website as his/her original peremptory challenges were preserved, the Defense Attorney does not submit his/her additional peremptory challenges through the website in an alternating fashion with the Plaintiff Attorney. Rather, the Defense Attorney submits each additional peremptory challenge one at a time through the website on the specific date and time designated by the Judge for the Defense Attorney to submit his/her required additional peremptory challenges as detailed below.

Thus, when the Plaintiff Attorney is not allowed to submit additional peremptory challenges through the website, and the Defense Attorney is required to submit additional peremptory challenges through the website, the Defense Attorney logs into his/her respective program on the website on the specified date and time designated by the Judge for the Defense Attorney to submit his/her additional peremptory challenges, and the Defense Attorney selects "Submit Additional Peremptory Challenge Exercises" from his/her Main Menu of Functions. When the Defense Attorney selects "Submit Additional Peremptory Challenge Exercises" from his/her Main Menu of Functions at the specified date and time set by the Judge for only the Defense Attorney to submit additional peremptory challenges, the Defense Attorney is initially shown a large grey window on his/her screen that states as follows:

The Defense Attorney is required to submit additional peremptory challenges through this website on (the date and time the judge specified for the Defense Attorney to submit his/her additional peremptory challenges through the website appears here). The total number of additional peremptory challenges the Defense Attorney is required to submit through the website is equal to the total number of original peremptory challenges submitted by the Defense Attorney that the Judge overruled through the website. The Defense Attorney is required to submit (the number of additional peremptory challenges the Defense Attorney is required to submit appears here) additional peremptory challenges.

The Judge did not overrule any of the Plaintiff Attorney's original peremptory challenges through the website. Therefore, the Plaintiff Attorney's original peremptory challenge exercises are preserved, and the Plaintiff Attorney is not allowed to submit any additional peremptory challenges through the website.

The Defense Attorney will be allowed to submit all of his/her additional peremptory challenges through the website by submitting one additional peremptory challenge at a time without the Plaintiff Attorney submitting any additional peremptory challenges through the website.

To successfully submit an additional peremptory challenge, you must click a check mark in one box next to the interactive name and picture of one particular juror and click "Authenticate and Submit One Peremptory Challenge" in the bottom margin of the screen. If you have more than one additional peremptory challenge to submit through the website, you will only be allowed to submit one additional peremptory challenge at a time through the website in the said manner until you have submitted all of your additional peremptory challenges through the website. You must stay logged into the website continuously until you have submitted all of your required additional peremptory challenges.

You will be allowed (the number of minutes the Judge allotted each attorney to submit each peremptory challenge through the website in the Custom Setup of the Jury Selection Process appears here) minutes to submit each additional peremptory challenge.

If you do not submit an additional peremptory challenge within the designated time limit, you are still required to submit an additional peremptory challenge through the website regardless if the time limit expires.

You will not be allowed to submit your additional peremptory challenges until (the date and time the judge specified for the Defense Attorney to submit his/her additional peremptory challenges appears here).

Once you click the "OK" button at the bottom of this message on or after the specified time on the specified date for the Defense Attorney to submit additional peremptory challenges through the website, this message will disappear. Once this message disappears, a new message in a green window will appear on the screen advising you that you are now required to submit an additional peremptory challenge through the website. The Judge, the Plaintiff Attorney, the Defendant, and the Plaintiff, if this case is civil, may log into their respective programs through the website on the specified date and time you are required to submit your additional peremptory challenges and view your additional peremptory challenge submissions immediately after you submit them.

You may minimize this message into the bottom margin of your screen to allow you to review your professional jury consultant's notes, your notes, the Defendant's notes, questionnaires, and/or videos of the jurors at any time before the specified date and time you are to submit your additional peremptory challenges through the website. Thus, you are encouraged to review your professional jury consultant's notes, your notes, the Defendant's notes, questionnaires, and/or videos of the jurors as much as you desire to prepare yourself for the additional peremptory challenge submission process before the specified date and time you are required to submit your additional peremptory challenges through the website.

Below the above said message in the window will appear a button that says "OK." When the Defense Attorney clicks the "OK" button on or after the specified date and time he/she is required to submit his/her additional peremptory challenges, the above said message disappears. The large grey window with the above said message will not disappear by clicking the "OK" button at any time before the specified date and time the Defense Attorney is required to submit his/her additional peremptory challenges through the website. However, the Defense Attorney will be allowed to minimize the above said grey message into the bottom margin of his/her screen to allow him/her to review his/her professional jury consultant's notes, his/her own notes, the Defendant's notes, questionnaires, and/or videos of the jurors at any time before the specified date and time the Defense Attorney is required to submit his/her additional peremptory challenges through the website. Thus, the Defense Attorney is instructed to review his/her professional jury consultant's notes, his/her notes, the Defendant's notes, questionnaires, and/or videos of the jurors as much as he/she desires to prepare him/her for the additional peremptory challenge submission process before the specified date and time he/she is required to submit his/her additional peremptory challenges through the website. The above said grey message will always appear on the Defense Attorney's screen each time he/she selects "Submit Additional Peremptory Challenge Exercises" from his/her Main Menu of Functions in the website.

If the Plaintiff Attorney is not allowed to submit additional peremptory challenges through the website, and if the Defense Attorney is required to submit additional peremptory challenges through the website, and if the Defense Attorney makes the above said message disappear on or after the specified date and time for him/her to submit his/her additional peremptory challenges through the website, a new light green window will appear on the screen that states as follows:

> The Defense Attorney is now required to submit an additional peremptory challenge through the website. Time remaining for the Defense Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Defense Attorney clicks the "OK" button, this said message disappears to allow the Defense Attorney to submit an additional peremptory challenge through the website as detailed below.

Once the above said message in the light green window disappears on the Defense Attorney's screen, and if the Plaintiff Attorney is not allowed to submit any additional peremptory challenges through the website, the Defense Attorney is given and shown all of the exact same features that the Defense Attorney was given and shown when he/she submitted his/her original peremptory challenges through the website as detailed above. Thus, the Defense Attorney submits his/her additional peremptory challenges through the website the same way he/she submitted his/her original peremptory challenges through the website. Thus, the Defense Attorney is shown the following: 1) interactive names and interactive pictures of only the remaining jurors who were not excluded with a challenge for cause through the website, 2) the Defense Attorney's Professional Jury Consultant's analysis and assigned number of each particular juror if the Defense Attorney selected a professional jury consultant, 3) the Defense Attorney's confidential analysis and assigned number of each respective juror, 4) the Defendant's own personal analysis and assigned number of each particular juror, 5) a scroll bar in the in the far right edge of the screen will appear to view all of the above stated features, 6) the current date and time will appear in the top margin of the screen, 7) the specified date and time for both attorneys to submit their additional peremptory challenges in an alternating fashion through the website will appear directly below the current date and time, 8) the amount of time the Judge allotted for each attorney to submit a peremptory challenge through the website in the Custom Setup of the Jury Selection Process will appear, 9) a box will appear to the left of each juror's interactive name and picture with the instruction above each box that states "Select hear to exclude this juror with a peremptory challenge," 10) a button labeled "Previous" will appear in the bottom margin of the screen, 11) a rectangular light green window that states "Authenticate and Submit One Peremptory Challenge" will appear in the bottom margin of the screen, 12) a window labeled "Plaintiff Attorney's Additional Peremptory Challenge Submissions," and 13) a window labeled "Defense Attorney's Additional Peremptory Challenge Submissions."

With regard to the interactive names and interactive pictures of only the remaining jurors who were not excluded with a challenge for cause through the website appearing on the Defense Attorney's screen, the interactive names of the jurors that were struck with a peremptory challenge by either attorney when the attorneys submitted their original peremptory challenges will appear highlighted in light red and will have a strike through line through them indicating the juror is not available to be struck with an additional peremptory challenge. Thus, only the interactive names of the jurors that are not highlighted in red with a strike through line are the only interactive names that the Defense Attorney may strike with an additional peremptory challenge through the website. Additionally, all of the interactive names struck by the Defense Attorney's peremptory challenges that were overruled by the Judge through the website are automatically included in the jury panel and are not eligible to be struck by an additional peremptory challenge of the Defense Attorney. Thus, directly above the bottom margin of the Defense Attorney's screen will be a narrow rectangular window with a label that states "Jury Panel and Alternate Jurors." The interactive names of jurors who were struck by the Defense Attorney's peremptory challenges which were subsequently overruled by the Judge will appear in alphabetical order under the label "Jury Panel and Alternate Jurors" in the narrow rectangular window, and they will not appear on the Defense Attorney's screen as possible interactive names the Defense Attorney may strike with an additional peremptory challenge. Thus, the interactive names of jurors who were struck by the Defense Attorney's peremptory challenges which were subsequently overruled by the Judge are automatically placed in alphabetical order within the window labeled "Jury Panel and Alternate Jurors."

If the Defense Attorney is required to submit additional peremptory challenges through the website, and if the Plaintiff Attorney is not allowed to submit additional peremptory challenges through the website, the window labeled "Defense Attorney's Additional Peremptory Challenge Submissions" on the Defense Attorney's screen will contain consecutive numbers from 1 to the total number of additional peremptory challenges the Defense Attorney is required to submit directly below the label "Defense Attorney's Additional Peremptory Challenge Submissions." For example, if the judge overruled 5 of the Defense Attorney's original peremptory challenges through the website, the window labeled "Defense Attorney's Additional Peremptory Challenge Submissions" will contain consecutive numbers from 1-5. When the Defense Attorney successfully submits his/her first additional peremptory challenge, the name of the juror the Defense Attorney selected to exclude with a peremptory challenge will appear next to the number one in the window labeled "Defense Attorney's Additional Peremptory Challenge Submissions." When the Defense Attorney successfully submits his/her second additional peremptory challenge, the name of the juror the Defense Attorney selected to exclude with a peremptory challenge immediately will appear next to the number two in the window labeled "Defense Attorney's Additional Peremptory Challenge Submissions." Thus, the name of each juror excluded with a Defense Attorney's additional peremptory challenge through the website will appear next to the number that corresponds with the order the juror was excluded with a peremptory challenge through the website by the Defense Attorney in the window labeled "Defense Attorney's Additional Peremptory Challenge Submissions." To the right of each juror's name on the list in the window labeled "Defense Attorney's Additional Peremptory Challenge Submissions" will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with an additional peremptory challenge will appear the authenticating picture of the Defense Attorney that the Defense Attorney made through a webcam and into the website upon selecting "Authenticate and Submit One Peremptory Challenge" just before the Defense Attorney submitted the additional peremptory challenge through the website.

If the Defense Attorney is required to submit additional peremptory challenges through the website, and if the Plaintiff Attorney is not allowed to submit additional peremptory challenges through the website, the window labeled "Plaintiff Attorney's Additional Peremptory Challenge Submissions" on the Defense Attorney's screen will contain a message that states that the Plaintiff Attorney's original peremptory challenges were preserved, and the Plaintiff Attorney is not allowed to submit any additional peremptory challenges through the website. Such message will appear directly below the label "Plaintiff Attorney's Additional Peremptory Challenge Submissions."

When the Defense Attorney clicks the "OK" button on the message in the above said light green window that states that the Defense Attorney is now required to submit an additional peremptory challenge through the website, and the window disappears, the time the Judge allotted for each attorney to submit a peremptory challenge immediately will begin to count down so the Defense Attorney can monitor how much time he/she has to submit an additional peremptory challenge through the website.

Ultimately, the Defense Attorney submits all of his/her additional peremptory challenges in the exact same manner through the website as he/she submitted his/her original peremptory challenges through the website. Thus, to submit an additional peremptory challenge, the Defense Attorney clicks a check mark in one box next to the interactive name and picture of one particular juror who has not been struck with a previous peremptory challenge and clicks "Authenticate and Submit One Peremptory Challenge." When the Defense Attorney selects the "Authenticate and Submit One Peremptory Challenge" option and takes an authenticating picture of himself/herself with a webcam and into the invention's website as detailed above, the Defense Attorney's additional peremptory challenge will be made viewable and accessible to the Judge, the Plaintiff Attorney, the Plaintiff, the Defendant, and the Court Reporter through the invention's website and the Defense Attorney's authenticating picture will appear next to the Defense Attorney's additional peremptory challenge on their respective screens.

If the Defense Attorney has more than one additional peremptory challenge to submit through the website, he/she will only be allowed to submit one additional peremptory challenge at a time through the website in the said manner until he/she has submitted all of his/her additional peremptory challenges through the website. Thus, the Defense Attorney will not be allowed to make a check mark appear next to more than one box next to an interactive juror's name before clicking the "Authenticate and Submit One Peremptory Challenge" button. The Defense Attorney is instructed to stay logged into the website continuously until he/she has submitted all of his/her required additional peremptory challenges.

Every time the Defense Attorney exercises an additional peremptory challenge by clicking the "Authenticate and Submit One Peremptory Challenge" button in his/her program after clicking a check mark in the box next to one particular juror's interactive name and picture, the selected juror's name, on the screen, will become highlighted in light red and a single strike through line will appear through the juror's name.

If the Plaintiff Attorney is not allowed to submit any additional peremptory challenges through the website, and if the Defense Attorney just submitted an additional peremptory challenge through the website, and if the Defense Attorney has one or more additional peremptory challenge left to exercise through the website, the same light green window detailed above will appear again on the Defense Attorney's screen that states as follows:

> The Defense Attorney is now required to submit an additional peremptory challenge through the website. The time remaining for the Defense Attorney to submit an additional peremptory challenge: (The amount of time the Judge allotted for each attorney to submit a peremptory challenge through the website in the Custom Setup of the Jury Selection Process will appear here.)

Below this said message in the window will appear a button that says "OK." When the Defense Attorney clicks the "OK" button, this said message disappears to allow the Defense Attorney to submit another additional peremptory challenge through the website as detailed above.

When the Defense Attorney clicks the "OK" button on the message in the above said light green window, and the window disappears, the time the Judge allotted for each attorney to submit a peremptory challenge immediately will again begin to count down so the Defense Attorney can monitor how much time he/she has to submit an additional peremptory challenge through the website. Thus, the Defense Attorney submits another additional peremptory challenge in the manner stated above. The Defense Attorney will continue the above pattern of submitting one additional peremptory challenge at a time through the website until he/she has submitted all of his/her additional peremptory challenges.

If the Plaintiff Attorney is not allowed to submit any additional peremptory challenges through the website, and if the Defense Attorney has just submitted his/her only or final additional peremptory challenge through the website and is not allowed to submit anymore additional peremptory challenges through the website, a new light red window appears on the Defense Attorney's screen that states as follows:

The Defense Attorney has submitted all of his/her required additional peremptory challenges through the website. The Defense Attorney is not allowed to submit anymore additional peremptory challenges through the website. You may now log off the website, or you may review all of the peremptory challenge exercises or review the remaining juror pictures, videos, questionnaires, and confidential notes.

Below this message will appear a button labeled "OK." By the Defense Attorney clicking on the OK button, the said light red window with this message disappears. Once the said message disappears, the Defense Attorney may review all of the peremptory challenge exercises or review the remaining juror pictures, videos, questionnaires, and confidential notes. The Defense Attorney may also log off of the website.

Every time the Defense Attorney selects "Submit Additional Peremptory Challenge Exercises" from his/her respective Main Menu of Functions, the Defense Attorney is advised to review his/her professional jury consultant's analysis and assigned number of each juror, his/her own analysis and assigned number of each juror, the Defendant's analysis and assigned number of each juror, questionnaires, and/or videos of each juror and then decide which jurors to keep or exclude with an additional peremptory challenge before the specified date and time the Defense Attorney is required to submit additional peremptory challenges through the website to prepare him/her for submitting additional peremptory challenges through the website.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules the Defense Attorney's rebuttal of non-discriminatory reasons through the website and if the Judge sustained the Plaintiff Attorney's rebuttal of non-discriminatory reasons through the website or if the Plaintiff Attorney's peremptory challenges were never contested and otherwise preserved and the Plaintiff Attorney is not allowed to submit any additional peremptory challenges through the website, and if the Defense Attorney is required to log onto the website on a specific date and time designated by the Judge to submit additional peremptory challenges in a number equal to the total number of original Defense Attorney peremptory challenges the Judge overruled, the Judge, the Plaintiff Attorney, the Plaintiff, if the case is civil, and the Defendant log into their respective programs on the website on the same specified date and time set by the judge for the Defense Attorney to submit his/her additional peremptory challenges through the website, and they view the Defense Attorney's submitted additional peremptory challenges through the website. Thus, the Judge, the Plaintiff Attorney, the Plaintiff, and the Defendant are allowed to view the additional peremptory challenges submitted by the Defense Attorney at the same time the Defense Attorney submits his/her additional peremptory challenges through the website.

When the Judge, the Plaintiff Attorney, the Plaintiff and the Defendant log into their respective programs on the website on the same specified date and time that only the Defense Attorney is scheduled to submit his/her additional peremptory challenges through the website to view the submitted additional peremptory challenges of the Defense Attorney, they each select "View All Additional Peremptory Challenge Exercises" from his/her respective Main Menu of Functions. When they select "View All Additional Peremptory Challenge Exercises" from their respective Main Menu of Functions at the specified date and time set by the Judge for only the Defense Attorney to submit additional peremptory challenges through the website, they are initially shown a large light green window on their respective screens that states as follows:

The Defense Attorney is required to submit additional peremptory challenges through this website on (the date and time the judge specified for the Defense Attorney to submit his/her additional peremptory challenges through the website appears here). The total number of additional peremptory challenges the Defense Attorney is required to submit through the website is equal to the total number of original peremptory challenges submitted by the Defense Attorney that were overruled by the Judge through the website. The Defense Attorney is required to submit (the number of additional peremptory challenges the Defense Attorney is required to submit appears here) additional peremptory challenges.

The Judge did not overrule any of the Plaintiff Attorney's original peremptory challenges through the website. Therefore, the Plaintiff Attorney's original peremptory challenge exercises are preserved, and the Plaintiff Attorney is not allowed to submit any additional peremptory challenges through the website.

The Defense Attorney will be allowed to submit all of his/her additional peremptory challenges through the website by submitting one additional peremptory challenge at a time without the Plaintiff Attorney submitting any additional peremptory challenges through the website.

If the Defense Attorney has more than one additional peremptory challenge to submit through the website, the Defense Attorney will only be allowed to submit one additional peremptory challenge at a time through the website until he/she has submitted all of his/her additional peremptory challenges through the website. The Defense Attorney must stay logged into the website continuously until he/she has submitted all of his/her required additional peremptory challenges.

The Defense Attorney will be allowed (the number of minutes the Judge allotted each attorney to submit each peremptory challenge through the website in the Custom Setup of the Jury Selection Process appears here) minutes to submit each additional peremptory challenge.

If the Defense Attorney does not submit an additional peremptory challenge within the designated time limit, the Defense Attorney is still required to submit an additional peremptory challenge through the website regardless if the time limit expires.

The Defense Attorney will not be allowed to submit his/her additional peremptory challenges until (the date and time the judge specified for the Defense Attorney to submit his/her additional peremptory challenges appears here).

You will be allowed to view a countdown of the allotted number of minutes the Defense Attorney is allowed to submit each additional peremptory challenge through the website on your screen while you wait for the Defense Attorney to submit an additional peremptory challenge.

On the (the date and time the Judge designated for the Defense Attorney to submit his/her additional peremptory challenges through the website appears here), you will be allowed to view the name of each juror the Defense Attorney excludes with an additional peremptory challenge on a list on your screen immediately after the Defense Attorney submits each additional peremptory challenge through the website.

You may stay logged into this website until the Defense Attorney has submitted all of his/her additional peremptory challenges through the website.

Once you click the "OK" button on or after the specified time on the specified date, this message will disappear. You may minimize this message into the bottom margin of your screen to allow you to review your notes, questionnaires, and/or videos of the jurors at any time before the specified date and time the Defense Attorney is required to submit his/her additional peremptory challenges through the website.

Below the above said message in the window will appear a button that says "OK." When the Judge, the Plaintiff Attorney, the Plaintiff, and the Defendant click the "OK" button, in their respective programs, on or after the specified time on the specified date for only the Defense Attorney to submit his/her required additional peremptory challenges through the website, the large light green window with the above said message disappears to allow them to view each additional peremptory challenge submitted by the Defense Attorney through the website. Thus, the large light green window with the above said message will not disappear by clicking the "OK" button in each of their respective programs at any time before the specified time on the specified date. However, they will be allowed to minimize the above said light green message into the bottom margin of their respective screens to allow them to review their respective notes, questionnaires, and/or videos of the jurors at any time before the specified date and time for the Defense Attorney only to submit his/her required additional peremptory challenges through the website. Thus, they are instructed to review their respective notes, questionnaires, and/or videos of the jurors as much as they desire before the specified date and time for the Defense Attorney only to submit his/her required additional peremptory challenges through the website. The above said light green message will always appear on their respective screens each time they select "View All Additional Peremptory Challenge Exercises" from their respective Main Menu of Functions in the website.

Once the above said message in the light green window disappears on the Plaintiff's respective screen to view only the Defense Attorney's additional peremptory challenge submissions through the website, the Plaintiff is given and shown all of the exact same features that the Plaintiff was given and shown when he/she viewed both the Plaintiff Attorney and the Defense Attorney submit their original peremptory challenges through the website as detailed above. Thus, the Plaintiff views the Defense Attorney submit his/her additional peremptory challenges through the website the same way he/she viewed both attorneys submit their original peremptory challenges through the website.

Thus, once the above said message in the light green window disappears, the Plaintiff is shown all of the features that are detailed above. Thus, the Plaintiff is shown the following: 1) interactive names and interactive pictures of only the remaining jurors who were not excluded with a challenge for cause through the website, 2) the Plaintiff's own personal analysis and assigned number of each particular juror, 3) a scroll bar in the far right edge of the screen will appear to view all of the above stated features, 4) the current date and time will appear in the top margin of the screen, 5) the specified date and time for the Defense Attorney to submit his/her additional peremptory challenges through the website will appear directly below the current date and time, 6) a window labeled "Plaintiff Attorney's Additional Peremptory Challenge Submissions," 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when the Defense Attorney is submitting an additional peremptory challenge through the website, 9) a rectangular light green window that will state which attorney is submitting an additional peremptory challenge in the bottom right corner of the screen, and 10) a button labeled "Previous" will appear in the bottom margin of the screen.

Likewise, once the above said message in the light green window disappears on the Defendant's respective screen to view only the Defense Attorney's additional peremptory challenge submissions through the website, the Defendant is given and shown all of the exact same features that the Defendant was given and shown when he/she viewed both the Plaintiff Attorney and the Defense Attorney submit their original peremptory challenges through the website as detailed above. Thus, the Defendant views the Defense Attorney submit his/her additional peremptory challenges through the website the same way he/she viewed both attorneys submit their original peremptory challenges through the website.

Thus, once the above said message in the light green window disappears, the Defendant is shown all of the features that are detailed above. Thus, the Defendant is shown the following: 1) interactive names and interactive pictures of only the remaining jurors who were not excluded with a challenge for cause through the website, 2) the Defendant's own personal analysis and assigned number of each particular juror, 3) a scroll bar in the far right edge of the screen will appear to view all of the above stated features, 4) the current date and time will appear in the top margin of the screen, 5) the specified date and time for the Defense Attorney to submit his/her additional peremptory challenges through the website will appear directly below the current date and time, 6) a window labeled "Plaintiff Attorney's Additional Peremptory Challenge Submissions," 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when the Defense Attorney is submitting an additional peremptory challenge through the website, 9) a rectangular light green window that will state which attorney is submitting an additional peremptory challenge in the bottom right corner of the screen, and 10) a button labeled "Previous" will appear in the bottom margin of the screen.

Additionally, once the above said message in the light green window disappears on the Plaintiff Attorney's respective screen to view only the Defense Attorney's additional peremptory challenge submissions through the website, the Plaintiff Attorney will be given all of the same features that the Plaintiff is given and shown to view the Defense Attorney's additional peremptory challenge submissions through the website but also will be allowed to view his/her professional jury consultant's analysis and assigned number of each juror and will be allowed to view his/her own analysis and assigned number of each juror and will be allowed to view the Plaintiff's analysis and assigned number of each juror.

Thus, once the above said message in the light green window disappears, the Plaintiff Attorney is shown all of the following features: 1) interactive names and interactive pictures of only the remaining jurors who were not excluded with a challenge for cause through the website, 2) the Plaintiff Attorney's Professional Jury Consultant's analysis and assigned number of each juror, 3) the Plaintiff Attorney's own analysis and assigned number of each juror, 4) the Plaintiff's own personal analysis and assigned number of each particular juror, 5) a scroll bar in the far right edge of the screen will appear to view all of the above stated features, 6) the current date and time will appear in the top margin of the screen, 7) the specified date and time for the Defense Attorney to submit his/her additional peremptory challenges through the website will appear directly below the current date and time, 8) a window labeled "Plaintiff Attorney's Additional Peremptory Challenge Submissions," 9) a window labeled "Defense Attorney's Additional Peremptory Challenge Submissions," 10) the amount of time the Judge allotted for each attorney to submit each additional peremptory challenge through the website in the Custom Setup of the Jury Selection Process will appear and begin to count down when the Defense Attorney is submitting an additional peremptory challenge through the website, 11) a rectangular light green window that will state which attorney is submitting an additional peremptory challenge in the bottom right corner of the screen, and 12) a button labeled "Previous" will appear in the bottom margin of the screen.

Also, once the above said message in the light green window disappears on the Judge's respective screen to view only the Defense Attorney's additional peremptory challenge submissions through the website, the Judge is given and shown all of the exact same features that the Judge was given and shown when he/she viewed both the Plaintiff Attorney and the Defense Attorney submit their original peremptory challenges through the website as detailed above. Thus, the Judge views the Defense Attorney submit his/her additional peremptory challenges through the website the same way he/she viewed both attorneys submit their original peremptory challenges through the website.

Thus, once the above said message in the light green window disappears, the Judge is shown all of the above features that are detailed above. Thus, the Judge is shown the following: 1) interactive names and interactive pictures of only the remaining jurors who were not excluded with a challenge for cause through the website, 2) any notes or analysis the Judge may have made for any of the jurors, 3) a scroll bar in the far right edge of the screen will appear to view all of the above stated features, 4) the current date and time will appear in the top margin of the screen, 5) the specified date and time for the Defense Attorney to submit his/her additional peremptory challenges through the website will appear directly below the current date and time, 6) a window labeled "Plaintiff Attorney's Additional Peremptory Challenge Submissions," 7) a window labeled "Defense Attorney's Additional Peremptory Challenge Submissions," 8) the amount of time the Judge allotted for each attorney to submit each additional peremptory challenge through the website in the Custom Setup of the Jury Selection Process will appear and begin to count down when the Defense Attorney is submitting an additional peremptory challenge through the website, 9) a rectangular light green window that will state which attorney is submitting an additional peremptory challenge in the bottom right corner of the screen, and 10) a button labeled "Previous" will appear in the bottom margin of the screen.

With regard to the interactive names and interactive pictures of only the remaining jurors who were not excluded with a challenge for cause through the website appearing on the Judge's, the Plaintiff Attorney's, the Plaintiff's, and the Defendant's respective screens if the Defense Attorney only is allowed and required to submit additional peremptory challenges through the website, all the interactive names of the jurors that were struck with a peremptory challenge by both attorneys when the attorneys submitted their original peremptory challenges through the website will appear highlighted in light red and will have a strike through line through them on their respective screens indicating the juror is not available to be struck with an additional peremptory challenge of the Defense Attorney. Thus, only the interactive names of the jurors that are not highlighted in red with a strike through line are the only interactive names that the Defense Attorney may strike with an additional peremptory challenge through the website. Additionally, all of the interactive names struck by the Defense Attorney's original peremptory challenges that were overruled by the Judge through the website are automatically included in the jury panel and are not eligible to be struck by an additional peremptory challenge. Thus, directly above the bottom margin of their respective screens will be a narrow rectangular window with a label that states "Jury Panel and Alternate Jurors." The interactive names of jurors who were struck by the Defense Attorney's original peremptory challenges which were subsequently overruled by the Judge will appear in alphabetical order under the label "Jury Panel and Alternate Jurors" in the narrow rectangular window, and they will not appear on the Judge's, the Plaintiff Attorney's, the Plaintiff's, or the Defendant's respective screens as possible interactive names the Defense Attorney may strike with an additional peremptory challenge.

Also, with regard to the window labeled "Defense Attorney's Additional Peremptory Challenge Submissions" on the Judge's, the Plaintiff Attorney's, the Plaintiff's, and the Defendant's respective screens, directly below the label "Defense Attorney's Additional Peremptory Challenge Submissions" and within the said window will appear consecutive numbers from 1 to the total number of additional peremptory challenges the Defense Attorney is required to submit if the Defense Attorney only is allowed and required to submit additional peremptory challenges through the website. For example, if the judge overruled 5 of the Defense Attorney's original peremptory challenges through the website, the window "Defense Attorney's Additional Peremptory Challenge Submissions," on their respective screens, will include consecutive numbers from 1-5. When the Defense Attorney successfully submits his/her first additional peremptory challenge through the website, the name of the juror the Defense Attorney selected to exclude with a peremptory challenge will appear next to the number one in the window labeled "Defense Attorney's Additional Peremptory Challenge Submissions" on their respective screens. When the Defense Attorney successfully submits his/her second additional peremptory challenge through the website, the name of the juror the Defense Attorney selected to exclude with a peremptory challenge immediately will appear next to the number two in the window labeled "Defense Attorney's Additional Peremptory Challenge Submissions" on their respective screens. Thus, the name of each juror excluded with a Defense Attorney's additional peremptory challenge through the website will appear next to the number that corresponds with the order the juror was excluded with a peremptory challenge through the website by the Defense Attorney in the window labeled "Defense Attorney's Additional Peremptory Challenge Submissions" on their respective screens. To the right of each juror's name on the list in the window labeled "Defense Attorney's Additional Peremptory Challenge Submissions," on their respective screens, will appear the juror's respective picture, and to the right of the juror's respective picture will be the exact date and time the Defense Attorney excluded the respective juror with an additional peremptory challenge and the total amount of time the Defense Attorney took to exclude the juror with an additional peremptory challenge will appear next to the exact date and time the Defense Attorney excluded the juror and to the right of the total amount of time the Defense Attorney took to exclude the juror with an additional peremptory challenge will appear the authenticating picture of the Defense Attorney that the Defense Attorney made through a webcam and into the website upon selecting "Authenticate and Submit One Peremptory Challenge" just before the Defense Attorney submitted the additional peremptory challenge through the website.

If the Defense Attorney is required to submit additional peremptory challenges through the website, and if the Plaintiff Attorney is not allowed to submit additional peremptory challenges through the website, the window labeled "Plaintiff Attorney's Additional Peremptory Challenge Submissions" on the Judge's, the Plaintiff Attorney's, the Plaintiff's, and the Defendant's respective screens will contain a message that states that the Plaintiff Attorney's original peremptory challenges were preserved, and the Plaintiff Attorney is not allowed to submit any additional peremptory challenges through the website. Such message will appear directly below the label "Plaintiff Attorney's Additional Peremptory Challenge Submissions."

Every time the Defense Attorney submits an additional peremptory challenge through the website on or after the date and time for only the Defense Attorney to submit his/her additional peremptory challenges through the website, the respective juror's name struck with the Defense Attorney's additional peremptory challenge will become highlighted in light red and a single strike through line will appear through the juror's name on the Judge's, the Plaintiff Attorney's, the Plaintiff's, and the Defendant's respective screens.

On the Judge's, the Plaintiff Attorney's, the Plaintiff's, and the Defendant's respective screens, in the bottom right corner of their respective screens will appear a rectangular light green window that will state which attorney is submitting a peremptory challenge. If the Defense Attorney is the only attorney allowed to submit additional peremptory challenges through the website, the said rectangular light green window on the Judge's, the Plaintiff Attorney's, the Plaintiff's, and the Defendant's respective screens will state "The Defense Attorney is now submitting a peremptory challenge" each time the Defense Attorney has an additional peremptory challenge left to submit through the website. Thus, if the Defense Attorney is the only attorney allowed to submit additional peremptory challenges through the website, and the Plaintiff Attorney is not allowed to submit additional peremptory challenges through the website, the said rectangular light green window on the Judge's, the Plaintiff Attorney's, the Plaintiff's, and the Defendant's respective screens will not state that "The Plaintiff Attorney is now submitting a peremptory challenge" after each time the Defense Attorney submits an additional peremptory challenge. It will only state that "The Defense Attorney is now submitting a peremptory challenge" each time the Defense Attorney has an additional peremptory challenge left to submit through the website.

After the Defense Attorney has submitted his/her last or only required additional peremptory challenge, and if the Defense Attorney only is allowed and required to submit additional peremptory challenges through the website, the said light green window in the bottom right corner of the Judge's, the Plaintiff Attorney's, the Plaintiff's, and the Defendant's respective screens will state the following: "The Defense Attorney has successfully submitted all of his/her required additional peremptory challenges." Additionally, after the Defense Attorney has submitted his/her last or only required additional peremptory challenge through the website, and if the Defense Attorney only is allowed and required to submit additional peremptory challenges through the website, a new light red window will then appear in the middle of the Judge's, the Plaintiff Attorney's, the Plaintiff's, and the Defendant's respective screens that states as follows:

The Defense Attorney has successfully submitted all of his/her required additional peremptory challenges, and the Defense Attorney is not allowed to submit anymore additional peremptory challenges through the website. You may now log off the website, or you may review all of the additional peremptory challenge exercises or review the remaining juror pictures, videos, questionnaires, and confidential notes.

Below this message will appear a button labeled "OK." By the Judge, the Plaintiff Attorney, the Plaintiff, and the Defendant clicking on the OK button on their respective screens, the said light red window with this message disappears. Once the said message disappears, the Judge, the Plaintiff Attorney, the Plaintiff, and the Defendant may review all of the additional peremptory challenge exercises or review the remaining juror pictures, videos, questionnaires, and confidential notes. They may also log off of the website.

Every time the Judge, the Plaintiff Attorney, the Plaintiff, and the Defendant select "View All Additional Peremptory Challenge Exercises" from their respective Main Menu of Functions on their respective screens when only the Defense Attorney is allowed and required to submit additional peremptory challenges through the website on a specific date and time, they are instructed to review their respective notes, questionnaire, and/or video of each juror as much as they desire before the specified date and time the Defense Attorney is required to submit his/her additional peremptory challenges through the website. Thus, when they log into their respective program on the website and selects "View All Additional Peremptory Challenge Exercises" from their respective Main Menu of Functions at any time before the specified date and time for the Defense Attorney to submit his/her additional peremptory challenges through the website to review the said information on each juror, they are initially shown the above said large light green window on their respective screens. When they minimize the above said light green message into the bottom margin of their respective screens, they are shown all of the above features that are detailed above in their respective programs, and they are allowed to review their respective notes, questionnaire, and/or video of each juror.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Plaintiff Attorney submitted a rebuttal of non-discriminatory reasons through the website, and if the Judge submits his/her ruling on the Plaintiff Attorney's rebuttal of non-discriminatory reasons through the website, the Judge, the Plaintiff, Defendant, the Plaintiff Attorney, and the Defense Attorney may log in to their respective programs on the website to view the Judge's ruling on the Plaintiff Attorney's rebuttal of non-discriminatory reasons. They are also shown the date the Judge submitted the ruling on the Plaintiff Attorney's rebuttal of non-discriminatory reasons through the website. If the Judge overruled the Plaintiff Attorney's rebuttal of non-discriminatory reasons through the website, the deadline the Judge set for either or both attorneys to submit additional peremptory challenges through the website is also shown.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Defense Attorney submitted a rebuttal of non-discriminatory reasons through the website, and if the Judge submits his/her ruling on the Defense Attorney's rebuttal of non-discriminatory reasons through the website, the Judge, the Plaintiff, Defendant, the Plaintiff Attorney, and the Defense Attorney may log in to their respective programs on the website to view the Judge's ruling on the Defense Attorney's rebuttal of non-discriminatory reasons. They are also shown the date the Judge submitted the ruling on the Defense Attorney's rebuttal of non-discriminatory reasons through the website. If the Judge overruled the Defense Attorney's rebuttal of non-discriminatory reasons through the website, the deadline the Judge set for either or both attorneys to submit additional peremptory challenges through the website is also shown.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained both the Plaintiff Attorney's and the Defense Attorney's respective rebuttals of non-discriminatory reasons to preserve their peremptory challenges through the website, or if the Judge sustained one attorney's rebuttal of non-discriminatory reasons and the opposing attorney's peremptory challenges were uncontested and otherwise preserved and neither attorney was ordered to submit additional peremptory challenges through the website, the Judge, the Plaintiff Attorney, the Defense Attorney, the Defendant, and the Plaintiff may log into their respective programs in the website and view/print the names, corresponding photos, videos, questionnaires, and their respective confidential analysis and assigned numbers of the jurors who made the jury panel and made the alternate juror positions and all jurors excluded with either a challenge for cause or an original peremptory challenge. On the screen in each respective program in the website, the jurors making up the jury panel and alternate juror positions will be numbered from 1 to the total number of jurors the Judge elected to make up the jury panel and alternate juror positions. The jurors will be numbered in alphabetical order. Next to the juror's number will appear the juror's name, and to the right of the juror's name will appear the juror's respective photo. All juror and alternate juror names and respective photos will be interactive. Thus, when a juror or alternate juror's name or photo is clicked on, the respective juror's questionnaire and video will appear on the screen as detailed above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge sustained both the Plaintiff Attorney's and the Defense Attorney's respective rebuttals of non-discriminatory reasons to preserve their peremptory challenges through the website, or if the Judge sustained one attorney's rebuttal of non-discriminatory reasons and the opposing attorney's peremptory challenges were uncontested and otherwise preserved and neither attorney was ordered to submit additional peremptory challenges through the website, the Court Administrator logs into the his/her respective program in the website and drafts a summons for each juror who made the jury panel and who made an alternate juror position.

When the Court Administrator logs in to his/her program in the website, he/she selects the Draft Summons for Jurors function in the Court Administrator's Main Menu of Functions. Upon making such a selection, a template of the summons to be sent to the jurors appears. The summons template advises the juror that he/she has been selected to either sit on the jury panel or sit as an alternate juror. The summons template will also advise the juror of the case caption and case number of the case they are to sit as a juror or alternate juror. The summons template will also advise the juror of the address of the courthouse where the jurors are to report for jury duty. The summons template will include blanks for the date and time the juror is to appear in Court. The summons template also will contain an instruction for jurors to report to the given courthouse address on the given date and time for jury duty. The summons template will also advise the jurors to bring a photo identification with them when they appear in court.

The summons template is also addressed to the name and address of the juror who is first in alphabetical order among all jurors making up the jury panel and alternate juror positions. In the bottom margin of the screen will appear a "Next Juror" option. When the Court Administrator selects "Next Juror," the summons template then shows the name and address of the juror who is second in alphabetical order among all jurors making up the jury panel and alternate juror positions. Thus, each time the Court Administrator selects "Next Juror" the name and address of the next juror in alphabetical order among all jurors making up the jury panel and alternate juror positions appears on the summons template. Thus, the invention automatically generates a summons template for the name and address for each juror in the jury panel and each alternate juror once the jury panel and alternate jurors are selected. The Court Administrator is instructed to fill in the blanks on the summons template for the date and time the jurors are to appear for the jury trial. The Court Administrator is also instructed to make any additional edits to the summons template. Any information typed into the blanks and/or any edits made by the Court Administrator on any given juror's summons template will appear on every juror's summons template to prevent the Court Administrator from having to reproduce the same summons for each juror.

In the bottom margin of the screen will appear a spell check option, save option, back option, next juror option, and print option. If the Court Administrator selects the back option, the letter of the juror previously shown on the screen will reappear. When the Court Administrator is satisfied with the letters to each juror, the Court Administrator is instructed to print all of the letters and mail them to their respective jurors.

If the Judge elected to allow attorneys to exercise challenges for cause through the website and elected to allow attorneys to exercise peremptory challenges through the website in an alternating fashion on a specified date and time and elected to allow attorneys to contest their counterpart's peremptory challenges through the website in the Custom Setup of the Jury Selection Process, and if the judge overruled the Plaintiff Attorney's rebuttal of non-discriminatory reasons through the website, and if the Plaintiff Attorney submits additional peremptory challenges through the website, the Court Reporter is then notified with an email message that he/she must print through the website the Plaintiff Attorney's additional peremptory challenge submissions and place the copy in the Court's file for transcript purposes. The email message further instructs the Court Reporter to print through the website the names and corresponding photos of the jurors who made the list of the jury panel and alternate juror positions and place the copy in the Court's file for transcript purposes. The email message further instructs the Court Reporter to print through the website all email messages sent to the Judge, the Plaintiff Attorney, the Defense Attorney, the Defendant, the Plaintiff, if the case is civil, and the Court Administrator and the dates such emails were submitted to them through the website. The email message contains an interactive link to the invention's website address.

Likewise, if the Judge elected to allow attorneys to exercise challenges for cause through the website and elected to allow attorneys to exercise peremptory challenges through the website in an alternating fashion on a specified date and time and elected to allow attorneys to contest their counterpart's peremptory challenges through the website in the Custom Setup of the Jury Selection Process, and if the judge overruled the Defense Attorney's rebuttal of non-discriminatory reasons through the website, and if the Defense Attorney submits additional peremptory challenges through the website, the Court Reporter is then notified with an email message that he/she must print through the website the Defense Attorney's additional peremptory challenge submissions and place the copy in the Court's file for transcript purposes. The email message further instructs the Court Reporter to print through the website the names and corresponding photos of the jurors who made the list of the jury panel and alternate juror positions and place the copy in the Court's file for transcript purposes. The email message further instructs the Court Reporter to print through the website all email messages sent to the Judge, the Plaintiff Attorney, the Defense Attorney, the Defendant, the Plaintiff, if the case is civil, and the Court Administrator and the dates such emails were submitted to them through the website. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules at least one attorney's rebuttal of non-discriminatory reasons through the website and such attorney whose non-discriminatory reasons were overruled submitted additional peremptory challenges through the website on the date and time specified by the Judge, the Judge, Plaintiff Attorney, Defense Attorney, the Plaintiff, and the Defendant are all sent the same email message that instructs them that they may now log onto the website and view and/or print the names and corresponding photos, videos, questionnaires, and their respective analysis and assigned numbers of the jurors who make up the jury panel and the alternate juror positions and all jurors excluded with either a challenge for cause or an original peremptory challenge or an additional peremptory challenge. The email message contains an interactive link to the invention's website address.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules at least one attorney's rebuttal of non-discriminatory reasons through the website and such attorney whose non-discriminatory reasons were overruled submitted additional peremptory challenges through the website on the date and time specified by the Judge, the Court Administrator is sent an email message that he/she may now log onto the website and draft a summons for jury duty for each juror making up the jury panel and the alternate juror positions and is instructed to mail such jurors the summons for jury duty which will order them to appear on the date the jury trial is to begin. The email message contains an interactive link to the invention's website address.

Additionally, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules at least one attorney's rebuttal of non-discriminatory reasons through the website and such attorney whose non-discriminatory reasons were overruled submitted additional peremptory challenges through the website on the date and time specified by the Judge, the Judge, Plaintiff Attorney, Plaintiff, Defense Attorney, Defendant, Court Reporter, and Court Administrator each will be sent a text message to his/her cellular phone alerting him/her that his/her participation is required and that he/she is advised to check his/her email for an instructive message of the task he/she is to complete. Such text message is the same as the quoted text message stated above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overruled the Plaintiff Attorney's rebuttal of non-discriminatory reasons through the website, and if the Plaintiff Attorney submitted additional peremptory challenges through the website, the Court Reporter logs onto the website and prints the names of the jurors excluded by the Plaintiff Attorney's additional peremptory challenges submitted through the website. The specified date and time the Plaintiff Attorney was required to submit his/her additional peremptory challenges through the website will appear in the top left margin of the print. Also, in the print, next to the specific date and time the Plaintiff Attorney was required to exercise his/her additional peremptory challenges will appear the amount of time the attorneys were allotted to submit each peremptory challenge through the website. Also, in the print, the juror names excluded with Plaintiff Attorney additional peremptory challenges will appear in the order the Plaintiff Attorney excluded each juror with an additional peremptory challenge. For example, the first juror name excluded with a Plaintiff Attorney additional peremptory challenge will appear with the number one to the left of his/her name. The second juror excluded with a Plaintiff Attorney additional peremptory challenge will appear with the number two to the left of his/her name etc. Also, in the print, next to each juror's name that was excluded with a Plaintiff Attorney additional peremptory challenge through the website will appear the juror's respective photo, the date and time the Plaintiff Attorney submitted his/her additional peremptory challenge on the respective juror through the website, the amount of time the Plaintiff Attorney took to submit his/her additional peremptory challenge on the respective juror through the website, and the authenticating picture of the Plaintiff Attorney that the Plaintiff Attorney made through a webcam and into the website upon selecting "Authenticate and Submit One Peremptory Challenge" just before the Plaintiff Attorney submitted the additional peremptory challenge through the website. The website instructs the Court Reporter to place the print in the Court's file for transcript purposes.

Likewise, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overruled the Defense Attorney's rebuttal of non-discriminatory reasons through the website, and if the Defense Attorney submitted additional peremptory challenges through the website, the Court Reporter logs onto the website and prints the names of the jurors excluded by the Defense Attorney's additional peremptory challenges submitted through the website. The specified date and time the Defense Attorney was required to submit his/her additional peremptory challenges through the website will appear in the top left margin of the print. Also, in the print, next to the specific date and time the Defense Attorney was required to exercise his/her additional peremptory challenges will appear the amount of time the attorneys were allotted to submit each peremptory challenge through the website. Also, in the print, the juror names excluded with Defense Attorney additional peremptory challenges will appear in the order the Defense Attorney excluded each juror with an additional peremptory challenge. For example, the first juror name excluded with a Defense Attorney additional peremptory challenge will appear with the number one to the left of his/her name. The second juror excluded with a Defense Attorney additional peremptory challenge will appear with the number two to the left of his/her name etc. Also, in the print, next to each juror's name that was excluded with a Defense Attorney additional peremptory challenge through the website will appear the juror's respective photo, the date and time the Defense Attorney submitted his/her additional peremptory challenge on the respective juror through the website, the amount of time the Defense Attorney took to submit his/her additional peremptory challenge on the respective juror through the website, and the authenticating picture of the Defense Attorney that the Defense Attorney made through a webcam and into the website upon selecting "Authenticate and Submit One Peremptory Challenge" just before the Defense Attorney submitted the additional peremptory challenge through the website. The website instructs the Court Reporter to place the print in the Court's file for transcript purposes.

Additionally, if the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules at least one attorney's rebuttal of non-discriminatory reasons through the website and such attorney whose non-discriminatory reasons were overruled submitted additional peremptory challenges through the website on the date and time specified by the Judge, the Court Reporter logs onto the website and prints the names of the remaining jurors who made the jury panel and alternate juror positions. Next to each jurors name appearing in the print will appear the juror's respective photo. The website instructs the Court Reporter to place the print in the Court's file for transcript purposes.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules at least one attorney's rebuttal of non-discriminatory reasons through the website and such attorney whose non-discriminatory reasons were overruled submitted additional peremptory challenges through the website on the date and time specified by the Judge, the Judge, the Plaintiff Attorney, the Defense Attorney, the Defendant, and the Plaintiff may log into their respective programs in the website and view/print the names, corresponding photos, videos, questionnaires, and their respective confidential analysis and assigned numbers of the jurors who made the jury panel and made the alternate juror positions and all jurors excluded with either a challenge for cause or an original peremptory challenge or an additional peremptory challenge. On the screen in each respective program in the website, the jurors making up the jury panel and alternate juror positions will be numbered from 1 to the total number of jurors the Judge elected to make up the jury panel and alternate juror positions. The jurors will be numbered in alphabetical order. Next to the juror's number will appear the juror's name, and to the right of the juror's name will appear the juror's respective photo. All juror and alternate juror names and respective photos will be interactive. Thus, when a juror or alternate juror's name or photo is clicked on, the respective juror's questionnaire and video will appear on the screen as detailed above.

If the Judge elected to allow attorneys to exercise challenges for cause through the website and elected to allow attorneys to exercise peremptory challenges in an alternating fashion on a specified date and time through the website and elected to allow attorneys to contest their counterpart's peremptory challenges through the website in the Custom Setup of the Jury Selection Process, and if the Judge overrules at least one attorney's rebuttal of non-discriminatory reasons through the website and such attorney whose non-discriminatory reasons were overruled submitted additional peremptory challenges through the website on the date and time specified by the Judge, the Court Administrator logs into the his/her respective program in the website and drafts a summons for each juror who made the jury panel and who made an alternate juror position in the same manner as detailed above. The website instructs the Court Administrator to mail each summons to its respective juror.

The invention's above described website where all of the above described uses and functions that the Judge, Plaintiff Attorney, Defense Attorney, Plaintiff, Defendant, Court Reporter, Court Administrator, Jurors, and Professional Jury Consultants perform in their own respective programs is accessed through the internet. Thus, all of the above described uses and functions that the Judge, Plaintiff Attorney, Defense Attorney, Plaintiff, Defendant, Court Reporter, Court Administrator, Jurors, and Professional Jury Consultants perform in their own respective programs through the invention's website are performed through the internet. Also, all of the above described email messages that the invention sends to the personal email accounts of the Judge, Plaintiff Attorney, Defense Attorney, Plaintiff, Defendant, Court Reporter, Court Administrator, Jurors, and Professional Jury Consultants are sent through the internet.

The invention's website is made accessible by a host internet server. The Judge, Plaintiff Attorney, Defense Attorney, Plaintiff, Defendant, Court Reporter, Court Administrator, Jurors, and Professional Jury Consultants access all of their respective functions through a personal computer capable of accessing the internet and equipped with a webcam or a cellular phone capable of accessing the internet and equipped with a webcam. All of the above described email messages and text messages that are sent from the invention to the respective email accounts and cellular phones of the Judge, Plaintiff Attorney, Defense Attorney, Plaintiff, Defendant, Court Reporter, Court Administrator, Jurors, and Professional Jury Consultants are sent from a host internet server.

Also, in the "Setup of Custom Jury Selection Process" in the Judge's program in the website as detailed above, the Judge also has the option of having a computer automated voice audibly read all of the typed jury selection questions on the jury selection questionnaire to the jurors when they respond to the jury selection questionnaire through a webcam in the manner as detailed above. Thus, if the Judge selects having a computer automated voice audibly read the questions to the jurors through the website when the jurors respond, the Judge and the attorneys would not make individual video recordings of each of their respective jury selection questions through a webcam. Thus, the Judge and the attorneys would merely type their jury selection questions in the same manner as detailed above and submit them through the website without making individual video recordings of each of the questions through the website. Then, the invention converts the typed questions into audible files that are presented to the jurors when they respond to the questionnaire as detailed above. Thus, when the jurors respond to the questionnaire in front of a webcam as detailed above, the invention will show each of the typed formatted questions on the screen to the jurors in the same manner as detailed above except no video recordings will appear to read the questions to the jurors, and the invention will audibly read each typed jury selection question in a computer automated voice to the jurors. If the Judge selects having a computer automated voice audibly read each typed jury selection question instead of the Judge and the attorneys making video recordings of each question as detailed above, every other feature, function, and option of the invention that is detailed above will still be available in the same manner as described above except for features related to individual video recordings of the Judge and the attorneys reading jury selection questions.

Features and Advantages of Inventive Jury Selection Software

The invention has many features and advantages. It can be used to merely question jurors before the in-court jury selection process begins. Basically, the Plaintiff Attorney, Defense Attorney, and Judge type their jury selection questions through the website and video record themselves reading their typed questions in front of a webcam in their own respective programs as detailed above, and the jurors respond to each video recorded question through the website in front of a webcam. The Plaintiff Attorney, Defense Attorney, Plaintiff, Defendant, and Judge then view each potential juror's video recorded responses through the website before the in-court jury selection process begins.

Using the invention to merely question jurors before the in-court jury selection process begins provides many unprecedented advantages for lawyers, jurors, the court, and criminal defendants. It provides lawyers with an opportunity to make more confident juror selections and thus have more confidence in a jury's verdict for the following reasons: 1) It provides lawyers with an opportunity to ask jurors better questions; 2) It provides significantly more quality information on each juror than can be provided in traditional in-court jury selection; 3) It provides more accurate information on each juror than can be provided in traditional in-court jury selection; 4) It provides lawyers with more time to make juror selections; 5) It provides lawyers with an opportunity to obtain a professional analysis of each juror from a professional jury consultant before making juror selections; 6) It provides lawyers with more of an opportunity to see how jurors will react to their presence and the presence of their clients; and 7) It provides lawyers with all of the advantages of traditional jury selection.

The invention provides lawyers with an opportunity to ask jurors better questions as it allows lawyers to easily obtain recommended jury selection questions from a professional jury consultant. Thus, with the invention's internet capabilities, lawyers can obtain the services from any participating professional jury consultant in the world. The lawyer can confidentially inform their selected consultant of all necessary details about the parties and the facts of the case through the internet website, and the selected consultant can send the lawyer professionally recommended jury selection questions through the internet website. Thus, the lawyer can review, edit, and submit professionally recommended jury selection questions to the jury selection questionnaire that is to be answered by the jurors through a webcam.

The invention provides significantly more quality information on each juror than can be provided in typical in-court jury selection. In traditional jury selection, lawyers typically do not have the time to ask each juror every question due to limited time. With the invention website, jurors can respond to jury selection questions through a website, outside of court, on any computer equipped with a webcam, at anytime day or night at their own convenience. As a result, the lawyers and the judge can ask as many questions as they desire resulting in substantially more responses from each juror. Also, since the jurors respond to the jury selection questionnaire in front of a webcam which produces a digital video file of them responding, the lawyers, through the website, easily can view the juror's non-verbal responses when they respond to the questions to detect the genuineness of their responses. Thus, the lawyers can get a better feel for how each juror thinks and reasons, and how jurors will respond to certain evidence. With unlimited questioning of the jurors, the lawyers will be able to better assess what each juror values and will be able to better detect any bias or preconceived notions of the jurors.

Additionally, the invention also provides more accurate information on each juror. In traditional in-court jury selection, each juror is questioned in the presence of every other juror. While being questioned in the presence of all other jurors, jurors may have the tendency to conform their responses to other jurors' responses or to adopt the views of other jurors. With the invention's website, each juror is questioned individually and out of the presence of the other jurors before the jurors appear in court for jury selection which prevents the jurors from conforming their responses providing more accurate information. Also, as stated above, since the jurors respond to the jury selection questionnaire in front of a webcam which produces a digital video file of them responding, the lawyers, through the website, easily can view the juror's non-verbal responses when they respond to the questions to detect the genuineness of their responses.

The invention provides lawyers with more time to make juror selections. Traditional jury selection with its limited time constraints also forces lawyers to rush making their juror selections. Because the invention provides lawyers with more significant high quality and accurate information on each juror before the in-court jury selection process takes place, the lawyers can take their time and predetermine their juror selections.

The invention provides lawyers with an opportunity to obtain a professional analysis of each juror from a professional jury consultant before making juror selections in court. As stated above, with the invention's internet capabilities, lawyers can obtain the services from any participating professional jury consultant in the world. The lawyers can send the digital video files and the respective transcribed responses of each juror to their selected professional jury consultants through the invention's website, and the selected consultants can send their respective lawyers a professional analysis of each juror through the invention's website. Thus, the lawyer can review the professional analysis of each juror and base their in-court juror selections on each analysis.

The invention provides lawyers with more of an opportunity to see how jurors will react to their presence and the presence of their clients. In traditional jury selection, lawyers cannot see how every juror reacts to their presence and their client's presence. With the invention playing the video recordings of the Judge, Plaintiff Attorney, Defense Attorney, Plaintiff, and Defendant separately and individually on the website to the Jurors when the Jurors respond to the questionnaires in front of a webcam, the Judge, the Plaintiff Attorney, the Defense Attorney, the Plaintiff, the Defendant, the Plaintiff Attorney's Professional Jury Consultant, and the Defense Attorney's Professional Jury Consultant can see how each juror responds to the individual video profiles of the Judge, the Plaintiff Attorney, the Defense Attorney, the Plaintiff, and the Defendant, and they can look for nonverbal clues in each juror's video recorded response.

The invention provides lawyers with all of the advantages of traditional jury selection. Thus, the Judge has the option of allowing the lawyers to object to their counterpart's jury selection questions through the website, and the judge can rule on such objections through the website before the jurors respond to the jury selection questionnaire. Additionally, since the invention takes place before the in-court jury selection process takes place, the lawyers, in the in-court jury selection portion, will still have the opportunity to question jurors personally in court and see how the jurors react to them and their clients. Also, since the invention thoroughly questions jurors before the in-court jury selection process takes place, the lawyers can predetermine exactly what if any follow up questions they will ask jurors in the in-court jury selection process.

Furthermore, a video from the judge will be played to the jurors before the jurors respond to the questionnaire in front of a webcam that will impress upon the jurors an in-court presence and tone and will communicate the seriousness of the online questioning to ensure the juror's participate sincerely. Also, since the jurors are required to take a picture of their driver's licenses or their photo identification cards with a webcam, and since such picture is paired with their digital video responses, the invention prevents fraud and ensures the authenticity of the jurors responding to the questionnaire. Additionally, with the judge, attorneys, plaintiff, defendant, and professional jury consultants taking authenticating photos of themselves before submitting anything through the invention's website further prevents fraud and ensures the authenticity of all submissions through the invention's website.

The invention also has unprecedented advantages for the jurors and the court for the following reasons: 1) It may prevent jurors from being excluded from the jury panel based on unconstitutional race and/or gender discrimination; 2) It is more convenient for jurors; and 3) It enhances judicial economy.

The invention's website may also substantially reduce the risk of jurors being excluded from the venire due to race and/or gender discrimination. Due to the limited time constraints and lack of information obtained from the jurors in traditional in-court jury selection, lawyers sometimes base their juror selections on unreliable stereotypes such as race or gender, which is unconstitutional and unfair to the jurors. Because the invention provides lawyers with significantly more quality and accurate information on each juror, the lawyers will get a better feel for how the jurors think and reason and how they will respond to certain issues and evidence, and they will no longer need to rely on stereotypes such as race and/or gender and likely will not base their peremptory challenges on the race and/or gender of the jurors.

The invention is more convenient for jurors. In traditional in-court jury selection, jurors typically have to sit through long jury selection examinations which keep them away from their jobs and their families. By using invention's website, most of the jury selection questions are asked on the jury selection questionnaire which jurors can answer at anytime 24 hours a day and at their own conveniences. For example, the jurors can work a full day, have dinner with their families, and then answer jury selection questions through the invention's website in the comfort of their own homes. Also, jurors are not required to answer all of the questions in one sitting. If they desire, they could answer a few questions each day or every other day as long as they answer all of the questions through the invention's website before the deadline expires.

Additionally, the invention substantially reduces the time it takes to complete the in-court jury selection process which saves the court and the jurors' time and money. Because the invention provides significant quality and accurate information on each juror before the in-court jury selection process begins, the lawyers can study the information before the in-court jury selection takes place and predetermine which jurors they desire to exclude. Therefore, the lawyers will not need to question the jurors nearly as much thereby drastically reducing the time it takes to complete the in-court jury selection process. This reduction in time will enhance judicial economy and will allow excluded jurors to get back to their personal lives much quicker. Also, due to this reduction of time to conduct the jury selection process, a court may not have to pay a juror as much for his/her participation in the jury selection process. Additionally, if the judge elected to allow attorneys to exercise challenges for cause and peremptory challenges through the invention's website and basically allow the entire jury selection process to be conducted through the invention's website, judicial economy would be further enhanced as the in-court jury selection process would be eliminated, and potential jurors who did not make the jury panel or alternate juror positions would not have to take time off from work and appear in-court for jury duty.

The invention also has unprecedented advantages for criminal defendants for the following reasons: 1) It substantially enhances a criminal defendant's ability to participate in the jury selection process; and 2) It provides criminal defendants with more confidence in a jury's verdict.

The invention substantially enhances a criminal defendant's ability to participate in the jury selection process. In the invention, a criminal defendant has his/her own program in the invention's website. In the criminal defendant's program, the criminal defendant may submit jury selection questions to his/her respective lawyer through the invention's website to be considered as recommended questions. The lawyer is advised not to submit his/her jury selection questions through the invention's website until the criminal defendant submits such recommended questions to him/her. The lawyer then may edit and place any of the defendant's questions on the questionnaire through the invention's website. Additionally, in the criminal defendant's program, the criminal defendant may view each juror's digital video responses and transcribed questionnaire and submit an analysis of each juror to his/her respective lawyer through the website to be considered as recommendations for either striking or keeping a juror. The defendant's lawyer may then use his/her client's analysis to keep or strike a juror. Additionally, the criminal defendant may view every action his/her lawyer and his/her opposing lawyer submits through the website at anytime 24 hours a day. Furthermore, the invention immediately notifies a criminal defendant with a text message to his/her cellular phone and an email message to his/her personal email account each time he/she may participate through the invention's website and every time a lawyer and/or the judge submits an action through the invention's website.

The invention provides criminal defendants with more confidence in a jury's verdict. As stated above, the invention may prevent jurors from being excluded from the jury panel based on unconstitutional race and/or gender discrimination. As a result, a criminal defendant of a racial minority, for example, may feel more confident in a jury's verdict if members of his/her same race are on the jury panel. Additionally, since the invention ultimately provides attorneys an opportunity to make more confident juror selections as stated above, criminal defendants further will have more confidence in a jury's verdict.

DESCRIPTION OF THE PREFERRED EMBODIMENTS

Figure 1A:
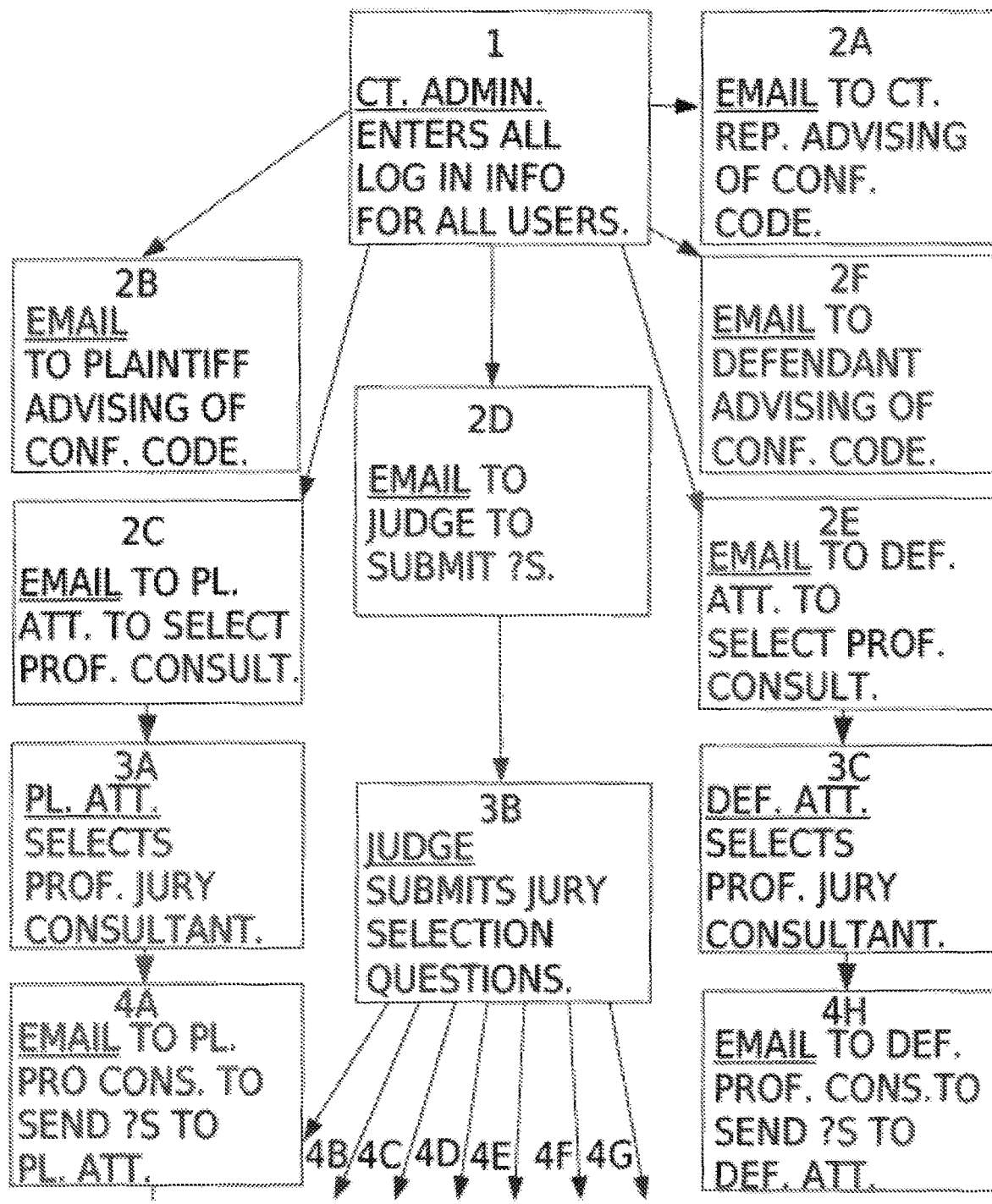
FIG. 1 is a flowchart detailing the initial basic steps of the unique method and computer program for questioning jurors through the invention's website, according to the principles of the invention.
Figure 1B:
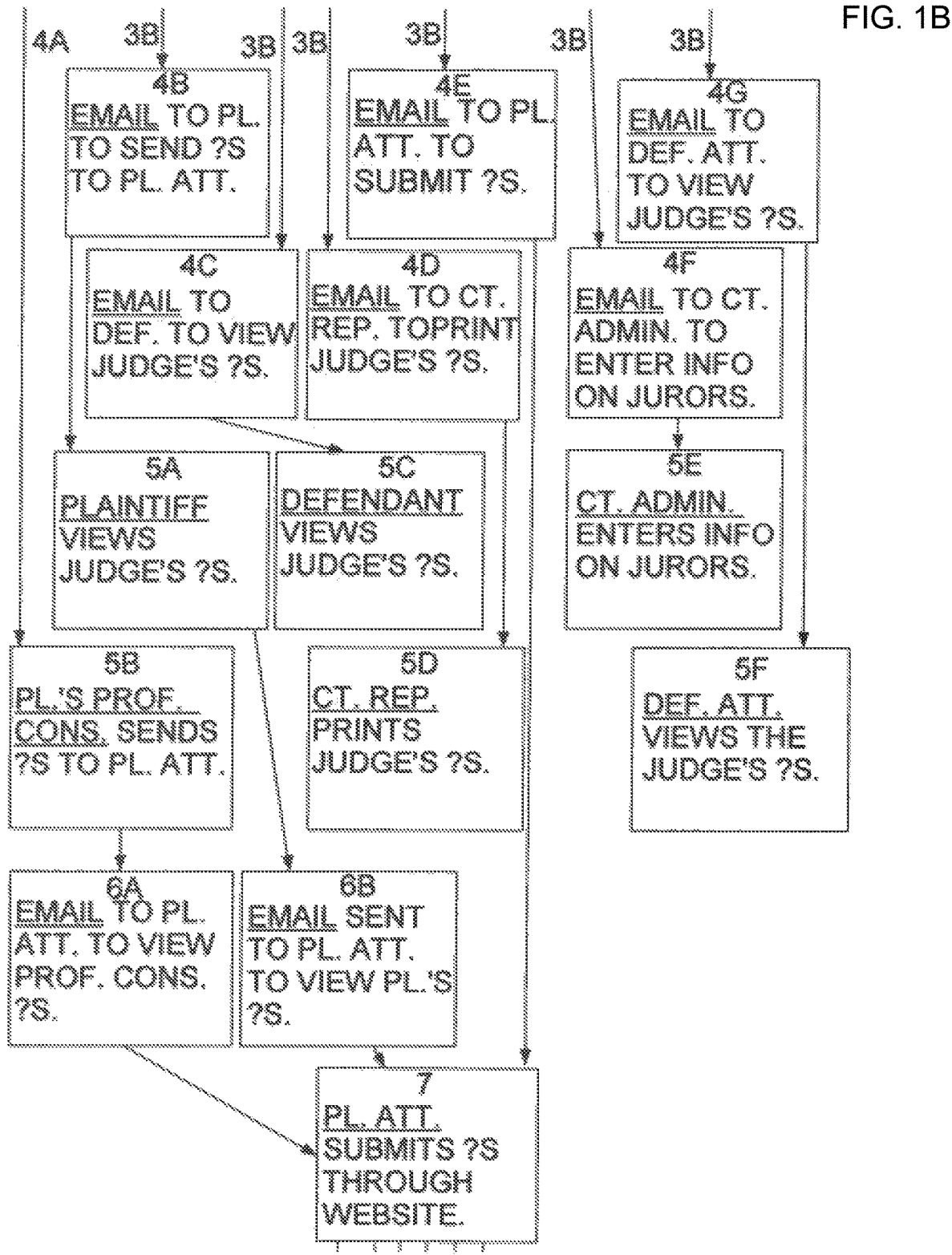
Figure 1C:
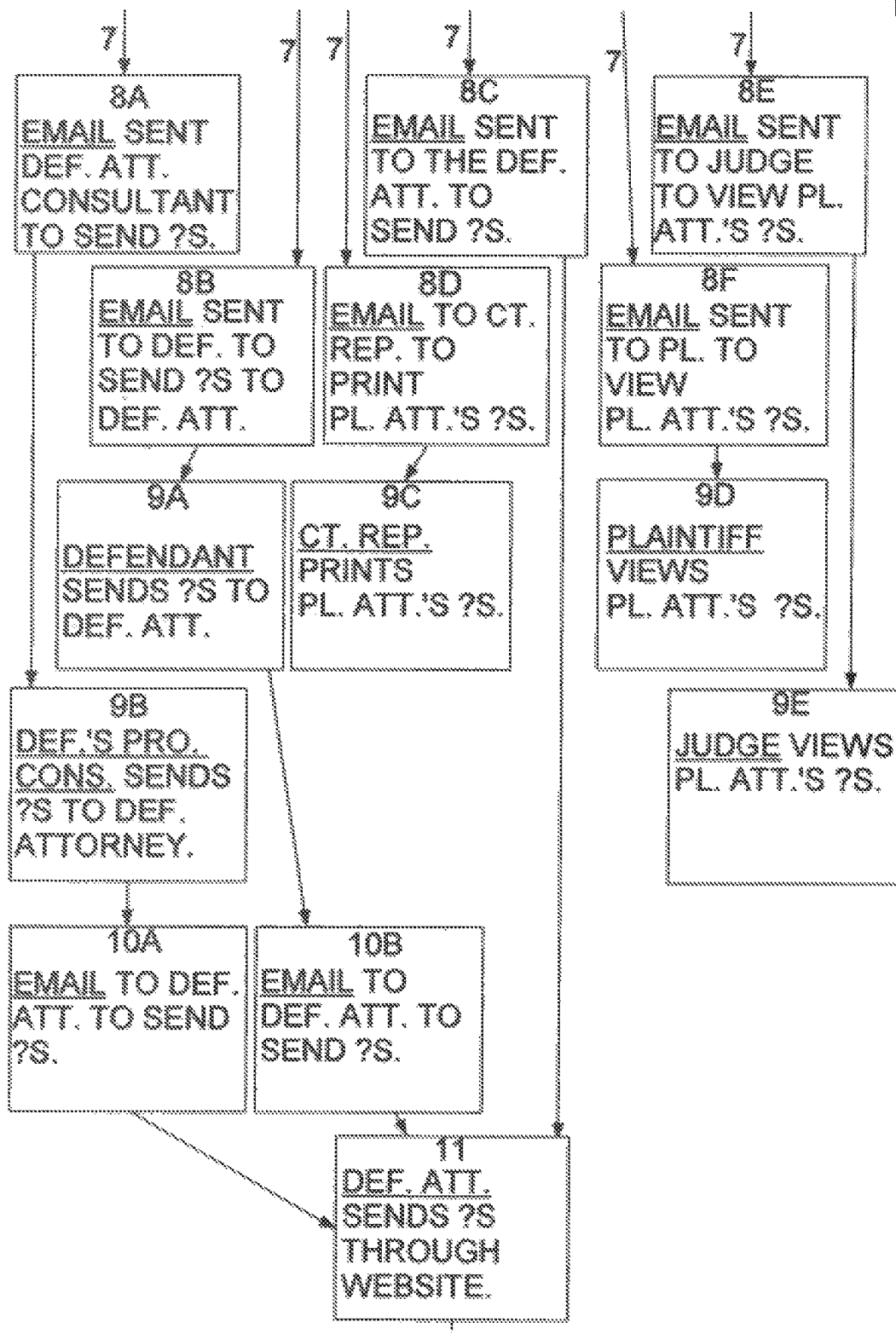
Figure 1D:
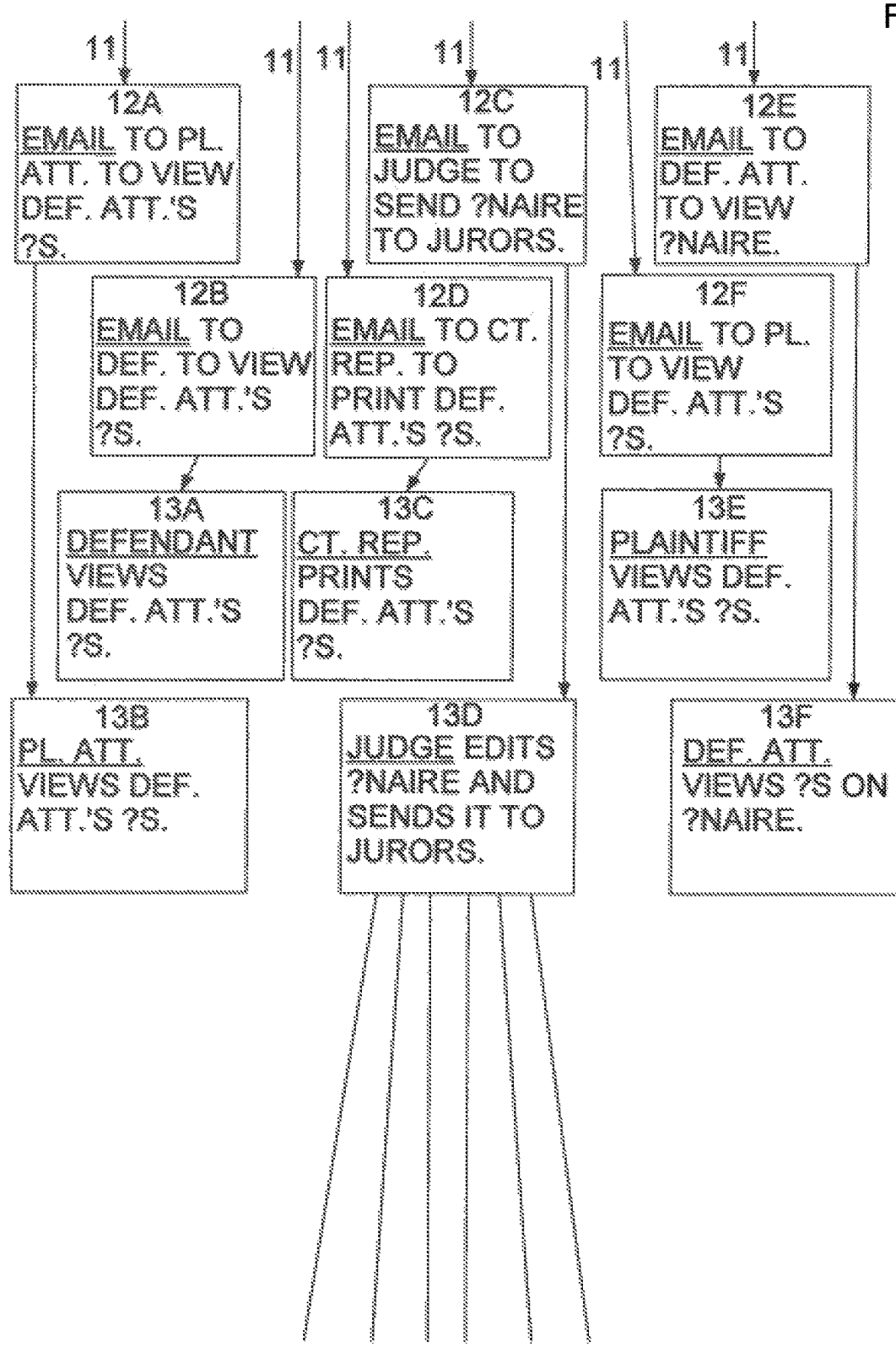
Figure 1E:
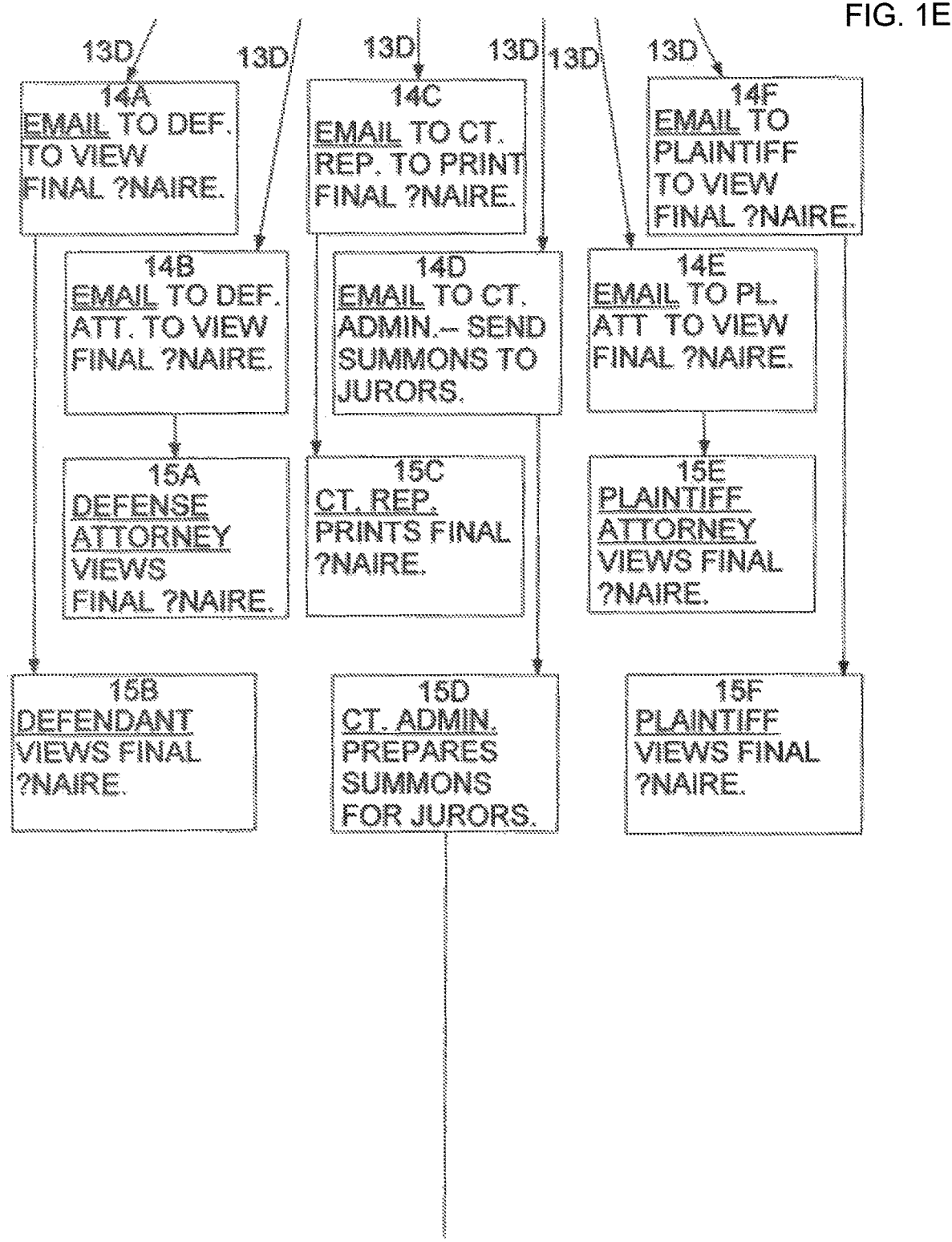
Figure 1F:
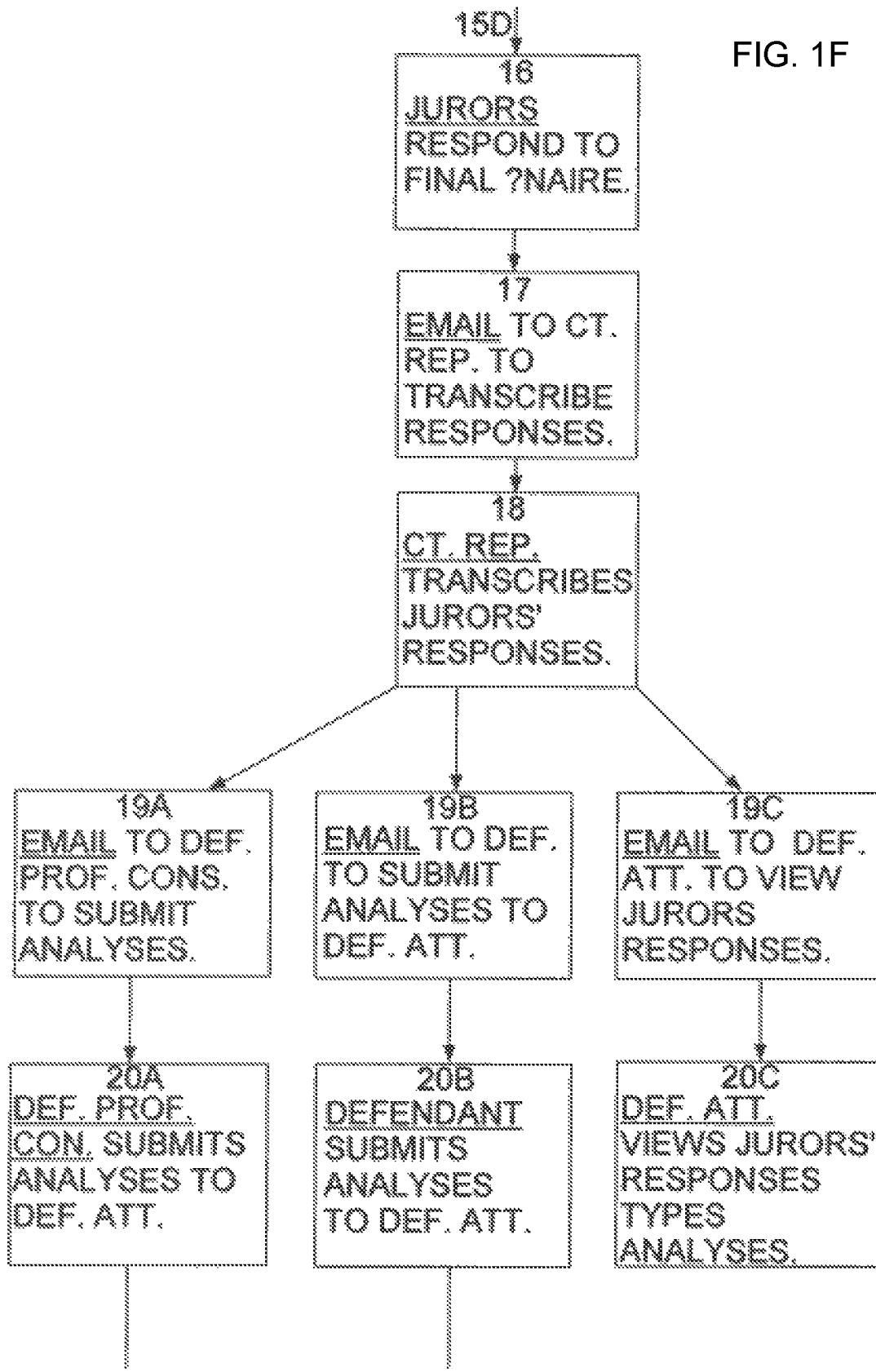
Figure 1G:
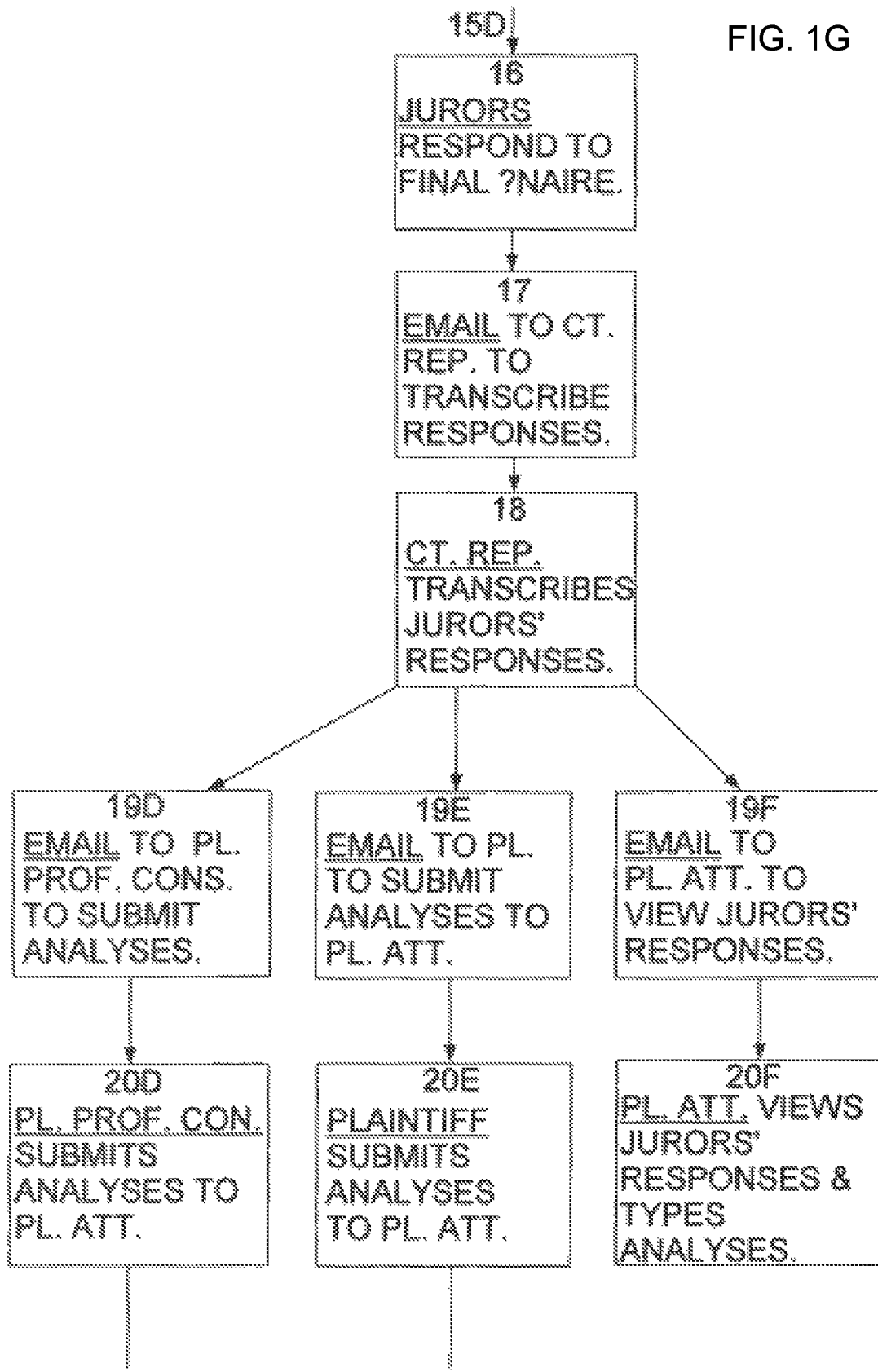
Figure 1H:
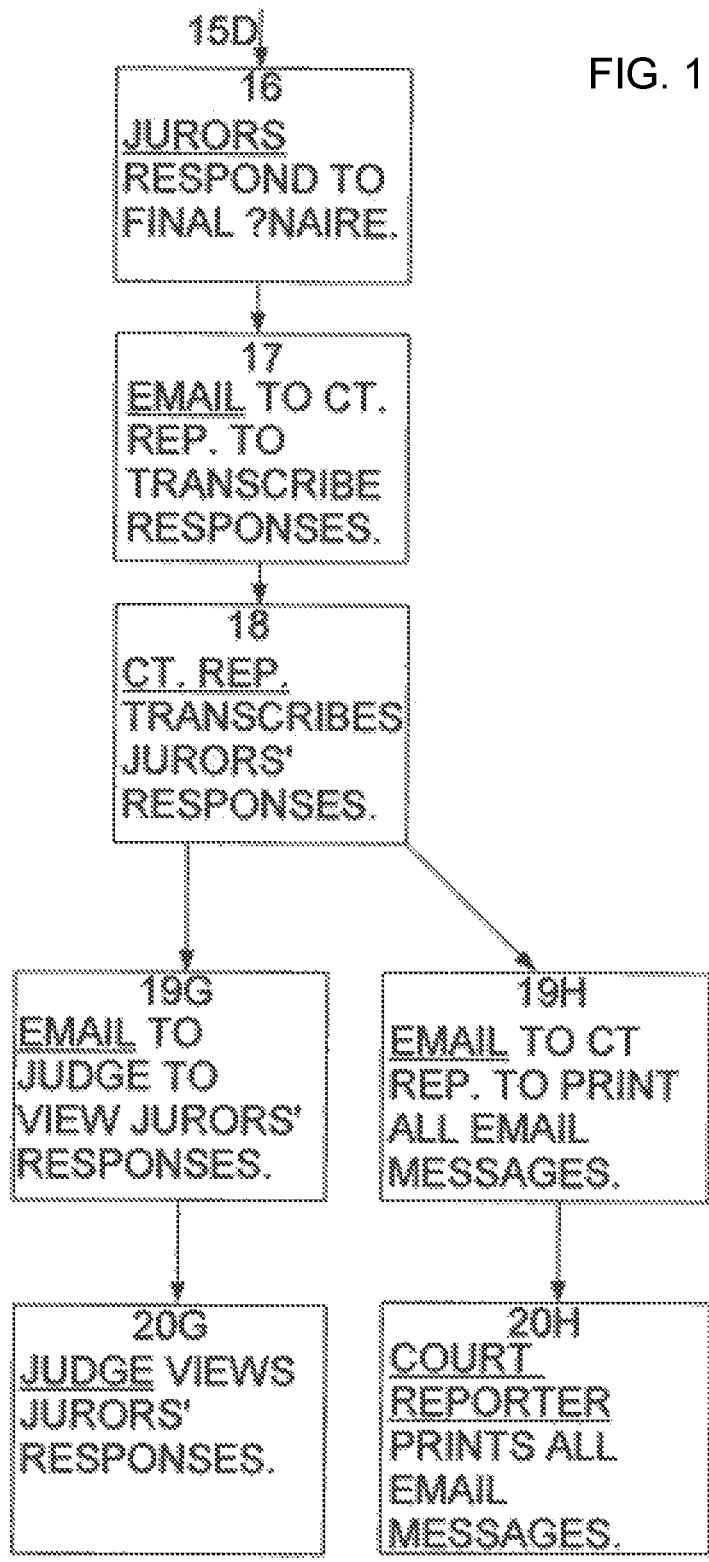
Figure 1I:
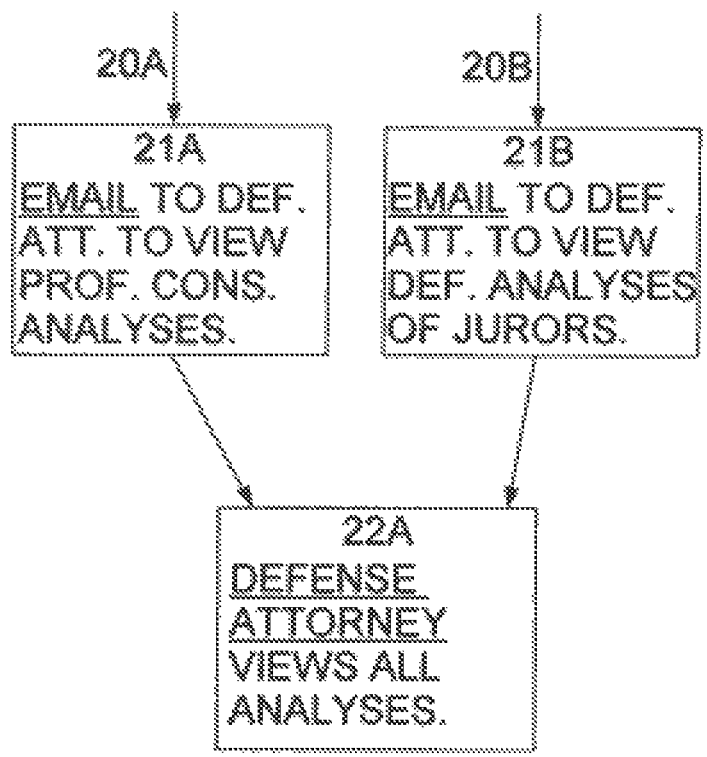
Figure 1J:
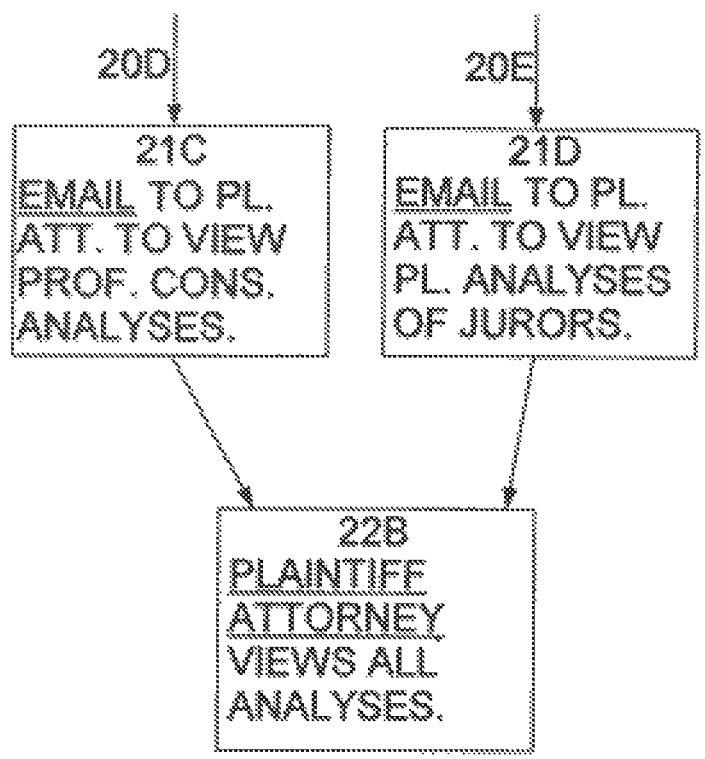

FIG. 1 is a flowchart detailing the initial basic steps of the unique method and computer program for questioning jurors through a website, according to the principles of the invention as detailed above. In step 1 of FIG. 1, the Court Administrator enters the name, case caption, and case number for the particular case in the invention's website. The Court Administrator then enters identification information and confidential codes for the judge, attorneys, plaintiff, defendant, professional jury consultants and court reporter. In step 2 of FIG. 1, once such information is entered, the invention sends email messages and text messages to the attorneys, plaintiff, defendant, and court reporter advising them of their log in information and confidential codes. The invention sends the Judge an email message and a text message advising him/her of his/her log in information and confidential codes and to setup the custom juror questioning process, to submit a webcam video addressing the jurors, and to type jury selection questions and make video recordings orally reading the typed jury selection questions.

In step 3 of FIG. 1, the Judge sets up the custom juror questioning process, submits a video recording addressing the jurors, and submits typed and video recorded jury selection questions all through the invention's website. Also, the Plaintiff Attorney and Defense Attorney select a professional jury consultant through the inventions website. Also, the Plaintiff Attorney and the Defense Attorney make video recordings with webcams of their respective clients sitting and blinking his/her eyes through the invention's website.

In step 4 of FIG. 1, the invention sends an email message and a text message to the Plaintiff Attorney's professional jury consultant advising him/her of his/her log in information and confidential code and advising him/her that he/she may now review the Judge's typed and video recorded jury selection questions and submit typed jury selection questions to the Plaintiff Attorney's program to be used as recommendations. Also, the invention sends an email message and a text message to the Plaintiff advising him/her that he/she may now review the Judge's typed and video jury selection questions and submit typed jury selection questions through the invention's website to the Plaintiff Attorney's program to be used as recommendations. Also, the invention sends an email message and a text message to the Defense Attorney's professional jury consultant advising him/her of his/her log in information and confidential code and advising him/her that he/she may view the Judge's typed and video recorded jury selection questions through the invention's website. The invention sends an email message and a text message to the Plaintiff Attorney and the Defense Attorney advising them that they may log into the invention's website and view the Judge' typed and video recorded jury selection questions. The invention sends an email message and a text message to the Court Reporter advising him/her to log into the invention's website and transcribe and print the Judge's video recording addressing the jurors and transcribe and print the Judge's video recordings orally reading his/her typed jury selection questions and print the Judge's typed jury selection questions. The invention sends an email message to the Court Administrator advising him/her to enter the names and addresses and assign a confidential code to each juror making up the jury pool in the invention's website to allow each juror to access the invention's website to answer the jury selection questionnaire.

In step 5 of FIG. 1, the Plaintiff Attorney's professional jury consultant reviews the Judge's typed and video recorded jury selection questions and submits typed jury selection questions to the Plaintiff Attorney's program all through the invention's website. The Plaintiff reviews the Judge's typed and video recorded jury selection questions and submits typed jury selection questions to the Plaintiff Attorney's program all through the invention's website. The Plaintiff Attorney, the Defense Attorney, the Defense Attorney's professional jury consultant, and the Defendant all log into their respective programs in the invention's website and review the Judge's typed and video recorded jury selection questions. The Court Reporter logs into the invention's website and transcribes and prints the Judge's video recording addressing the jurors and transcribes and prints the Judge's typed and video recorded jury selection questions. The Court Administrator logs into the invention's website and enters the names and addresses and assigns a confidential code for each juror in the jury pool.

In step 6 of FIG. 1, the invention sends an email message and a text message to the Plaintiff Attorney advising him/her that his/her professional jury consultant has submitted typed jury selection questions to the Plaintiff Attorney's program for the Plaintiff Attorney's review and the Plaintiff Attorney may now submit typed and video recorded jury selection questions through the invention's website. Also, the invention sends an email message and a text message to the Plaintiff Attorney advising him/her that the Plaintiff has submitted typed jury selection questions to the Plaintiff Attorney's program for the Plaintiff Attorney's review and the Plaintiff Attorney may now submit typed and video recorded jury selection questions through the invention's website.

In step 7 of FIG. 1, the Plaintiff Attorney reviews the Judge's typed and video recorded jury selection questions and reviews the Plaintiff Attorney's professional jury consultant's typed jury selection questions and reviews the Plaintiff's typed jury selection questions and makes any edits necessary and submits typed and video recorded jury selection questions all through the invention's website.

In step 8 of FIG. 1, the invention sends an email message and a text message to the Defense Attorney's professional jury consultant advising him/her that he/she may now review the Judge's typed and video recorded jury selection questions and the Plaintiff Attorney's typed and video recorded jury selection questions and submit typed jury selection questions to the Defense Attorney's program to be used as recommendations. Also, the invention sends an email message and a text message to the Defendant advising him/her that he/she may now review the Judge's typed and video jury selection questions and the Plaintiff Attorney's typed and video recorded jury selection questions and submit typed jury selection questions through the invention's website to the Defense Attorney's program to be used as recommendations. The invention sends an email message and a text message to the Judge, the Defense Attorney, and the Plaintiff advising them that they may log into the invention's website and view the Plaintiff Attorney's typed and video recorded jury selection questions. The invention sends an email message and a text message to the Court Reporter advising him/her to log into the invention's website and transcribe and print the Plaintiff Attorney's video recordings orally reading his/her typed jury selection questions and print the Plaintiff Attorney's typed jury selection questions.

In step 9 of FIG. 1, the Defense Attorney's professional jury consultant reviews the Judge's typed and video recorded jury selection questions and reviews the Plaintiff Attorney's typed and video recorded jury selection questions and submits typed jury selection questions to the Defense Attorney's program all through the invention's website. The Defendant reviews the Judge's typed and video recorded jury selection questions and reviews the Plaintiff Attorney's typed and video recorded jury selection questions and submits typed jury selection questions to the Defense Attorney's program all through the invention's website. The Plaintiff and the Judge log into their respective programs in the invention's website and review the Plaintiff Attorney's typed and video recorded jury selection questions. The Court Reporter logs into the invention's website and transcribes and prints the Plaintiff Attorney's typed and video recorded jury selection questions.

In step 10 of FIG. 1, the invention sends an email message and a text message to the Defense Attorney advising him/her that his/her professional jury consultant has submitted typed jury selection questions to the Defense Attorney's program for the Defense Attorney's review and the Defense Attorney may now submit typed and video recorded jury selection questions through the invention's website. Also, the invention sends an email message and a text message to the Defense Attorney advising him/her that the Defendant has submitted typed jury selection questions to the Defense Attorney's program for the Defense Attorney's review and the Defense Attorney may now submit typed and video recorded jury selection questions through the invention's website.

In step 11 of FIG. 1, the Defense Attorney reviews the Judge's and the Plaintiff Attorney's typed and video recorded jury selection questions and reviews the Defense Attorney's professional jury consultant's typed jury selection questions and reviews the Defendant's typed jury selection questions and makes any edits necessary and submits typed and video recorded jury selection questions all through the invention's website.

In step 12 of FIG. 1, the invention sends an email message and a text message to the Plaintiff Attorney, the Defense Attorney, the Plaintiff, and the Defendant advising them that they may log into the invention's website and view the Defense Attorney's typed and video recorded jury selection questions. The invention sends an email message and a text message to the Court Reporter advising him/her to log into the invention's website and transcribe and print the Defense Attorney's video recordings orally reading his/her typed jury selection questions and print the Defense Attorney's typed jury selection questions. Also, the invention sends an email message and a text message to the Judge advising him/her to review the Defense Attorney's typed and video recorded jury selection questions and advising him/her to delete any of the typed and video recorded jury selection questions on the jury selection questions and advising him/her to make the jury selection questionnaire accessible to the jurors for their responses.

In step 13 of FIG. 1, the Plaintiff Attorney, the Defense Attorney, the Plaintiff, and the Defendant log into their respective programs in the invention's website and review the Defense Attorney's and all typed and video recorded jury selection questions. The Court Reporter logs into the invention's website and transcribes and prints the Defense Attorney's typed and video recorded jury selection questions. The Judge reviews the Defense Attorney's and all typed and video recorded jury selection questions and deletes any of the typed and video recorded jury selection questions on the jury selection questionnaire and makes the jury selection questionnaire accessible to the jurors for their responses all through the invention's website.

In step 14 of FIG. 1, the invention sends an email message and a text message to the Plaintiff Attorney, the Defense Attorney, the Plaintiff, and the Defendant advising them that they may log into the invention's website and view and print the final questionnaire the Judge made accessible to the Jurors. The invention sends an email message and a text message to the Court Reporter advising him/her to log into the invention's website and print the final questionnaire the Judge made accessible to the jurors. The invention sends an email message and a text message to the Court Administrator advising him/her to log into the invention's website and prepare a summons for each juror in the jury pool instructing them to answer the jury selection questionnaire through the website using a webcam.

In step 15 of FIG. 1, the Plaintiff Attorney, the Defense Attorney, the Plaintiff, and the Defendant log into their respective programs in the invention's website and view and print the final questionnaire the Judge made accessible to the Jurors. The Court Reporter logs into the invention's website and prints the final questionnaire the Judge made accessible to the jurors. The Court Administrator logs into the invention's website and prepares a summons for each juror in the jury pool instructing them to answer the jury selection questionnaire through the website using a webcam.

In step 16 of FIG. 1, the jurors log into the invention's website, and they view and listen to the Judge's video. They then take a picture of their driver's license or photo identification card with a webcam. They then respond to the typed and video recorded jury selection questionnaire in front of a webcam.

In step 17 of FIG. 1, the invention sends an email message and a text message to the Court Reporter instructing him/her to log into the invention's website and transcribe and print all of the juror's responses to the jury selection questionnaire.

In step 18 of FIG. 1, the Court Reporter logs into the invention's website and transcribes and prints all of the juror's responses to the jury selection questionnaire.

In step 19 of FIG. 1, the invention sends an email message and a text message to the Defense Attorney's professional jury consultant advising that he/she may now log onto the invention's website and view each juror's video and transcribed responses and submit an analysis of each juror to the Defense Attorney through the website. Also, the invention sends an email message and a text message to the Defendant advising that he/she may now log onto the invention's website and view each juror's video and transcribed responses and submit an analysis of each juror to the Defense Attorney through the website. Also, the invention sends an email message and a text message to the Defense Attorney advising that he/she may now log onto the invention's website and view each juror's video and transcribed responses and type an analysis of each juror. Additionally, the invention sends an email message and a text message to the Plaintiff Attorney's professional jury consultant advising that he/she may now log onto the invention's website and view each juror's video and transcribed responses and submit an analysis of each juror to the Plaintiff Attorney through the website. Also, the invention sends an email message and a text message to the Plaintiff advising that he/she may now log onto the invention's website and view each juror's video and transcribed responses and submit an analysis of each juror to the Plaintiff Attorney through the website. Also, the invention sends an email message and a text message to the Plaintiff Attorney advising that he/she may now log onto the invention's website and view each juror's video and transcribed responses and type an analysis of each juror. Also, the invention sends an email message and a text message to the Judge advising that he/she may now log onto the invention's website and view each juror's video and transcribed responses and may type any notes on the jurors. Also, the invention sends an email message and a text message to the Court Reporter advising that he/she must now log onto the invention's website and print all email messages to all of the parties.

In step 20 of FIG. 1, the Defense Attorney's professional jury consultant logs onto the invention's website and views each juror's video and transcribed responses and submits an analysis of each juror to the Defense Attorney through the website. Also, the Defendant logs onto the invention's website and views each juror's video and transcribed responses and submits an analysis of each juror to the Defense Attorney through the website. Also, the Defense Attorney logs onto the invention's website and views each juror's video and transcribed responses and types an analysis of each juror. Additionally, the Plaintiff Attorney's professional jury consultant logs onto the invention's website and views each juror's video and transcribed responses and submits an analysis of each juror to the Plaintiff Attorney through the website. Also, the Plaintiff logs onto the invention's website and views each juror's video and transcribed responses and submits an analysis of each juror to the Plaintiff Attorney through the website. Also, the Plaintiff Attorney logs onto the invention's website and views each juror's video and transcribed responses and types an analysis of each juror. Also, the Judge logs onto the invention's website and views each juror's video and transcribed responses and may type any notes on the jurors. Also, the Court Reporter logs onto the invention's website and prints all email messages to all of the parties.

In step 21 of FIG. 1, the invention sends an email message and a text message to the Defense Attorney advising him/her that his/her professional jury consultant has submitted an analysis of each juror to the Defense Attorney's program through the invention's website. Also, the email message informs the Defense Attorney that he/she may now log onto the invention's website and view his/her professional jury consultant's analysis of each juror. Also, the invention sends an email message and a text message to the Defense Attorney advising him/her that the Defendant has submitted an analysis of each juror to the Defense Attorney's program through the website. Also, the email message informs the Defense Attorney that he/she may now log onto the invention's website and view the Defendant's analysis of each juror. Additionally, the invention sends an email message and a text message to the Plaintiff Attorney advising him/her that his/her professional jury consultant has submitted an analysis of each juror to the Plaintiff Attorney's program through the invention's website. Also, the email message informs the Plaintiff Attorney that he/she may now log onto the invention's website and view his/her professional jury consultant's analysis of each juror. Also, the invention sends an email message and a text message to the Plaintiff Attorney advising him/her that the Plaintiff has submitted an analysis of each juror to the Plaintiff Attorney's program through the invention's website. Also, the email message informs the Plaintiff Attorney that he/she may now log onto the website and view the Plaintiff's analysis of each juror.

In step 22 of FIG. 1, the Defense Attorney logs onto the invention's website and views and prints his/her professional jury consultant's analysis of each juror and views and prints the Defendant's analysis of each juror and compares his/her analysis of each juror with his/her professional jury consultant's analysis of each juror and the Defendant's analysis of each juror. The Plaintiff Attorney logs onto the invention's website and views and prints his/her professional jury consultant's analysis of each juror and views and prints the Plaintiff's analysis of each juror and compares his/her analysis of each juror with his/her professional jury consultant's analysis of each juror and the Plaintiff's analysis of each juror.

Figure 2A:
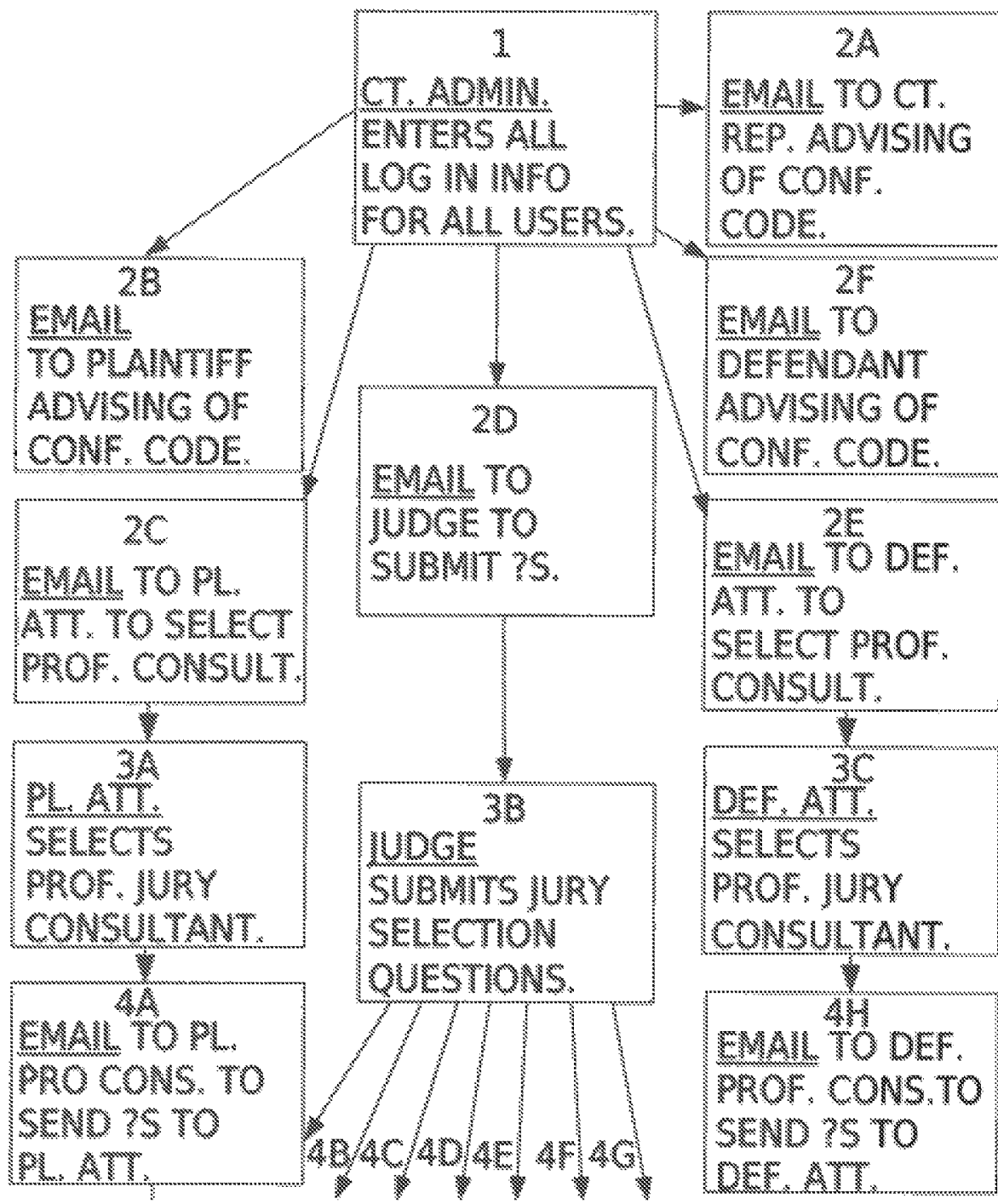
FIG. 2 is a flowchart encompassing all of the first 11 steps in FIG. 1 and steps 14 through 22 of FIG. 1 and also showing optional subsequent steps of the unique method and computer program that allow attorneys to object to their counterpart's jury selection questions and allow the Judge to rule on such objections all through the invention's website.
Figure 2B:
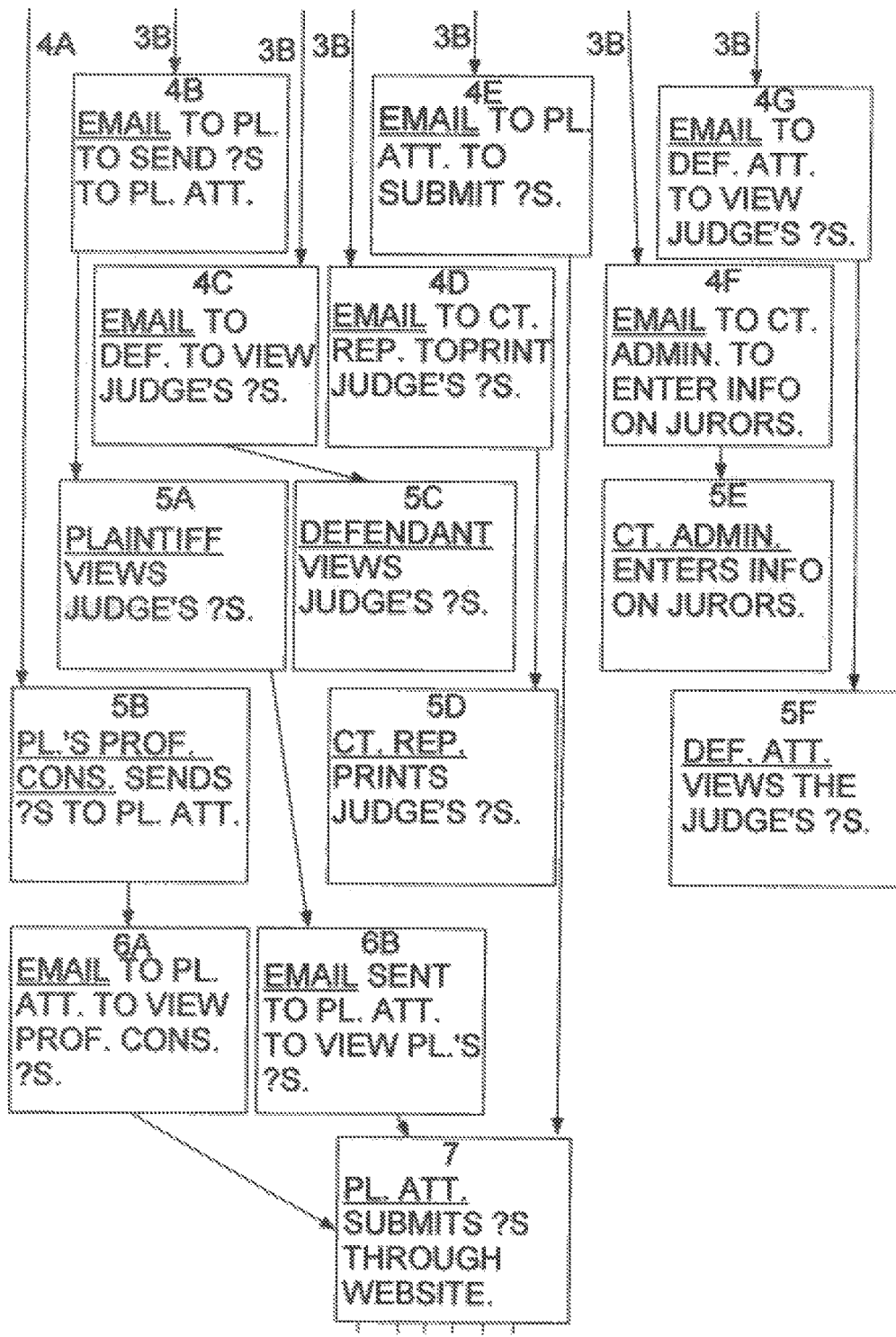
Figure 2C:
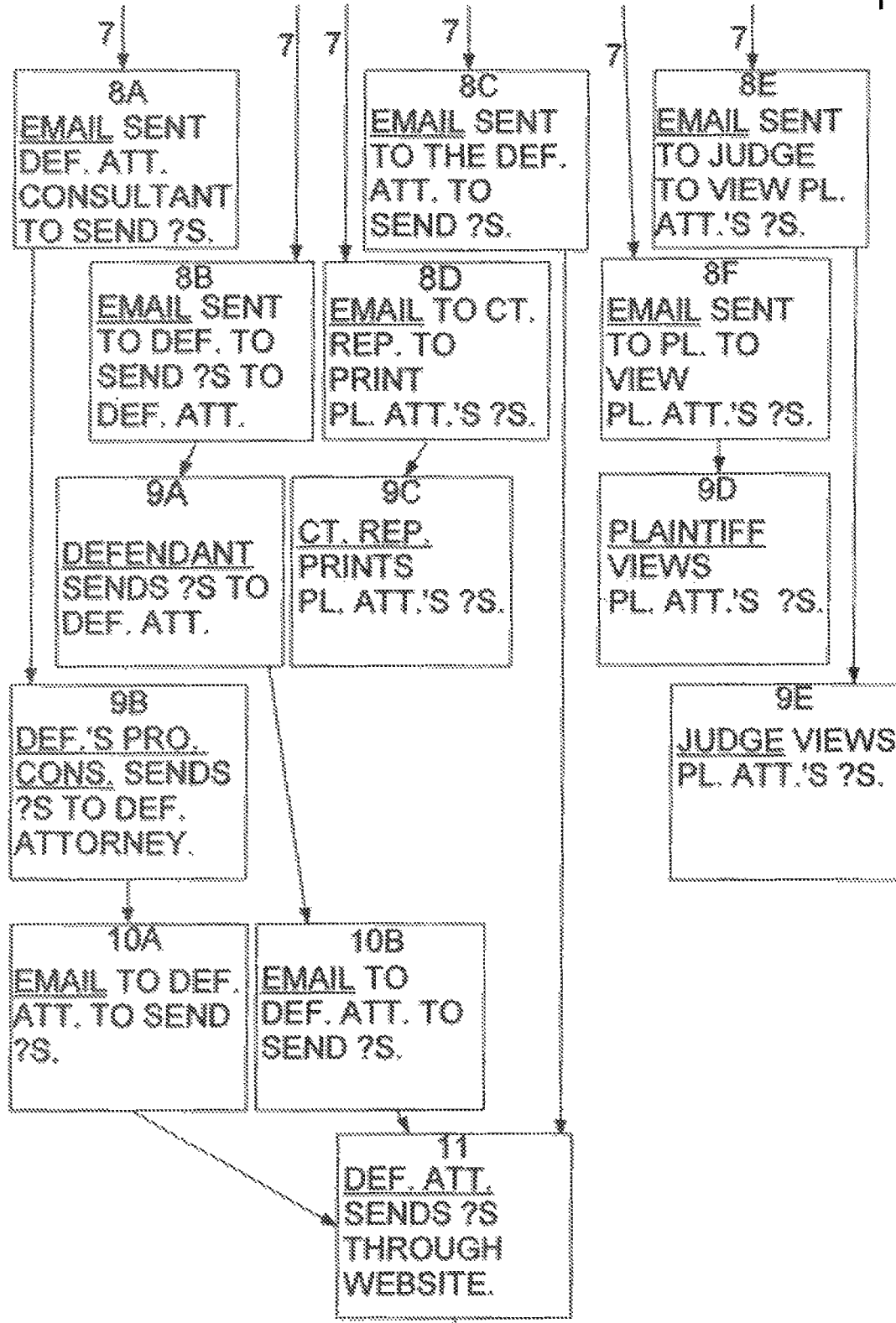
Figure 2D:
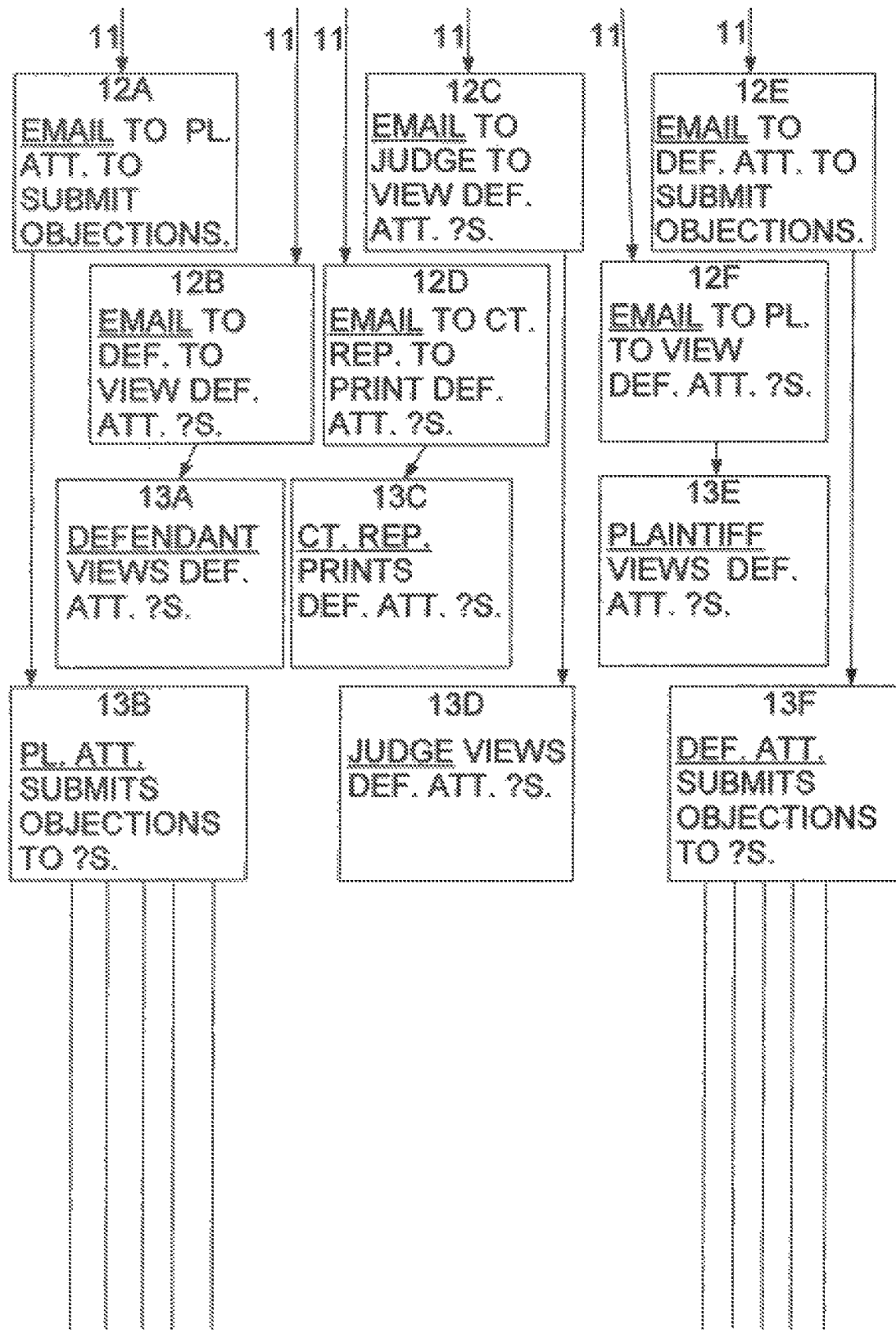
Figure 2E:
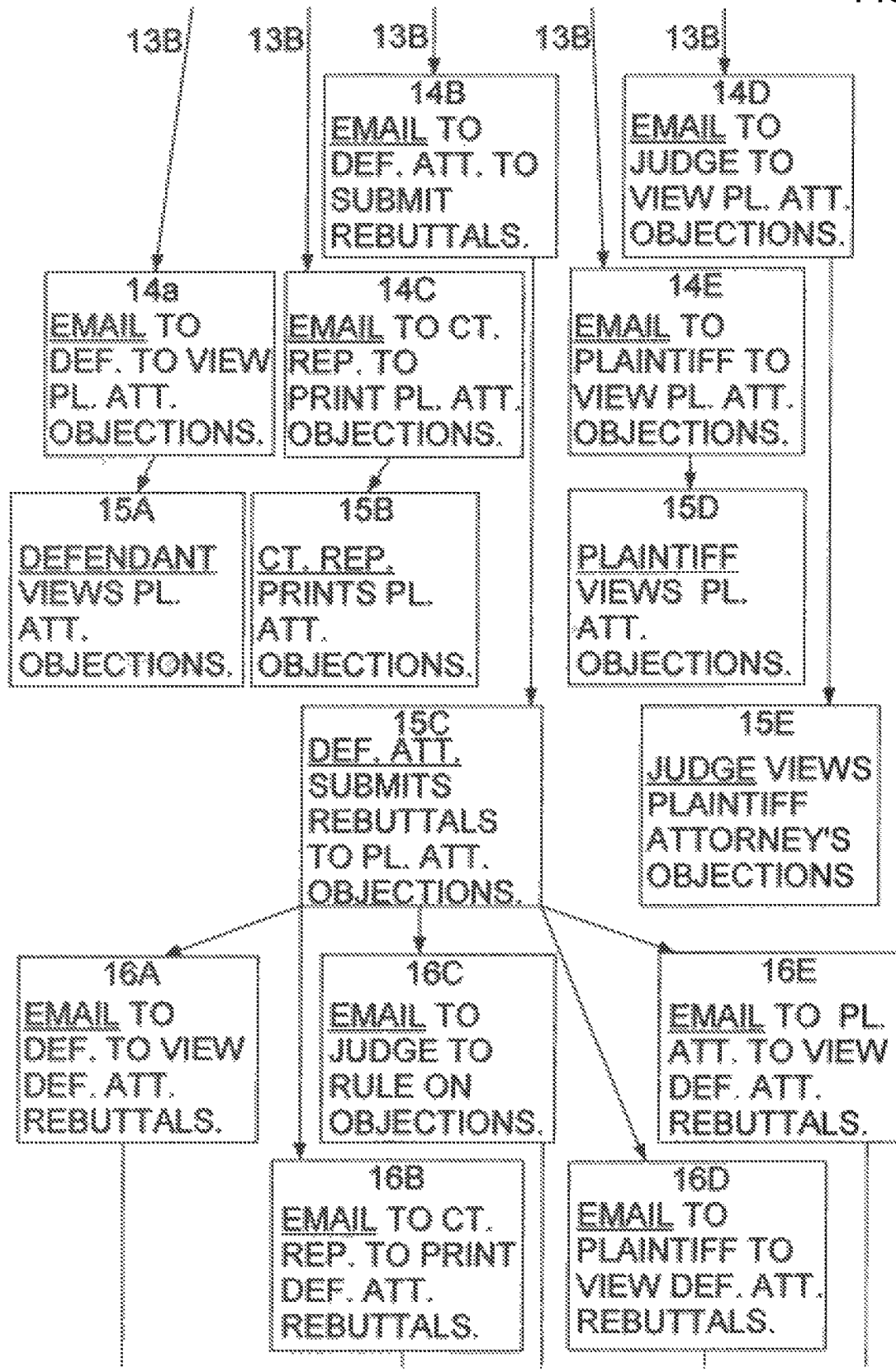
Figure 2F:
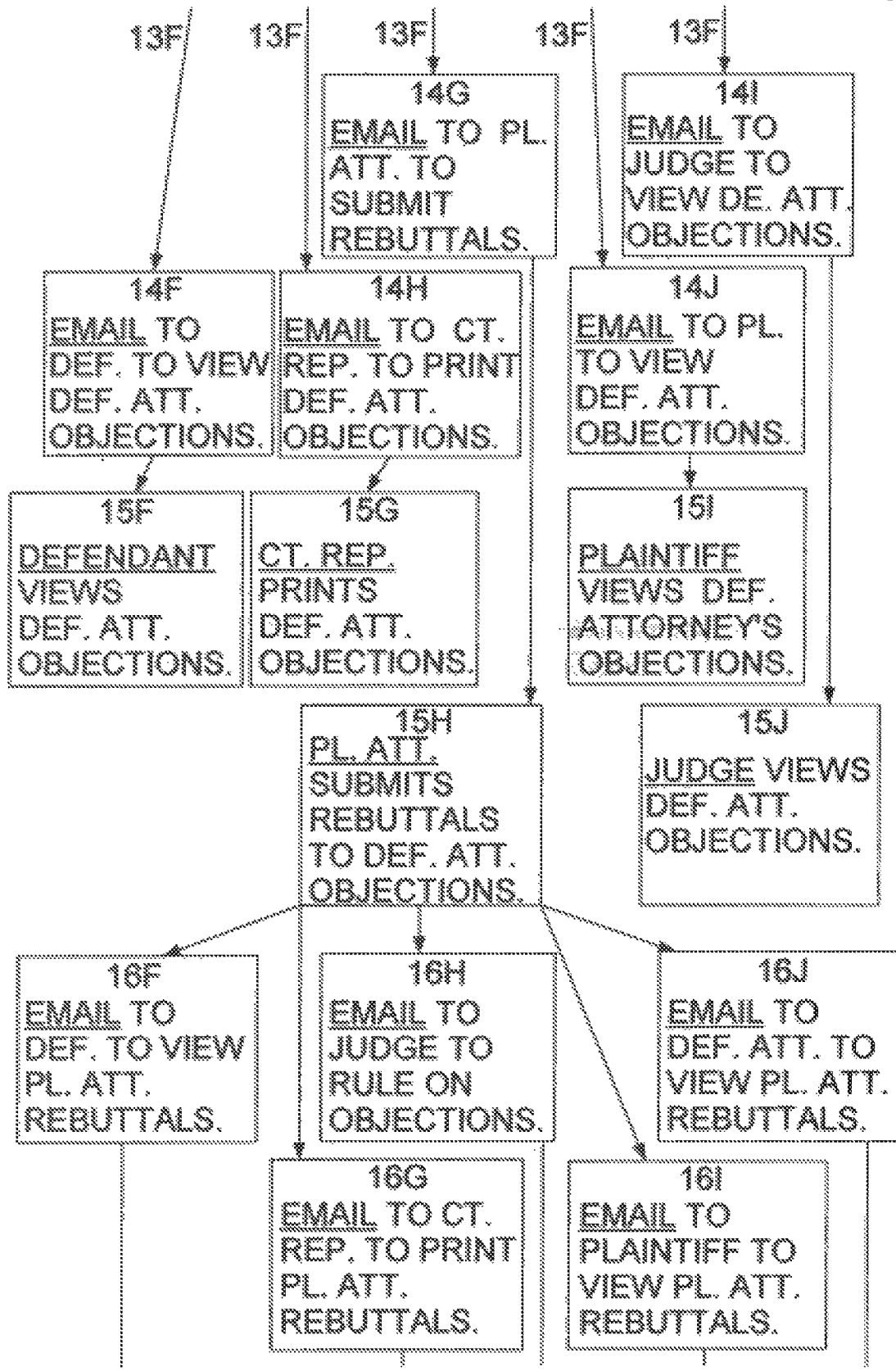
Figure 2G:
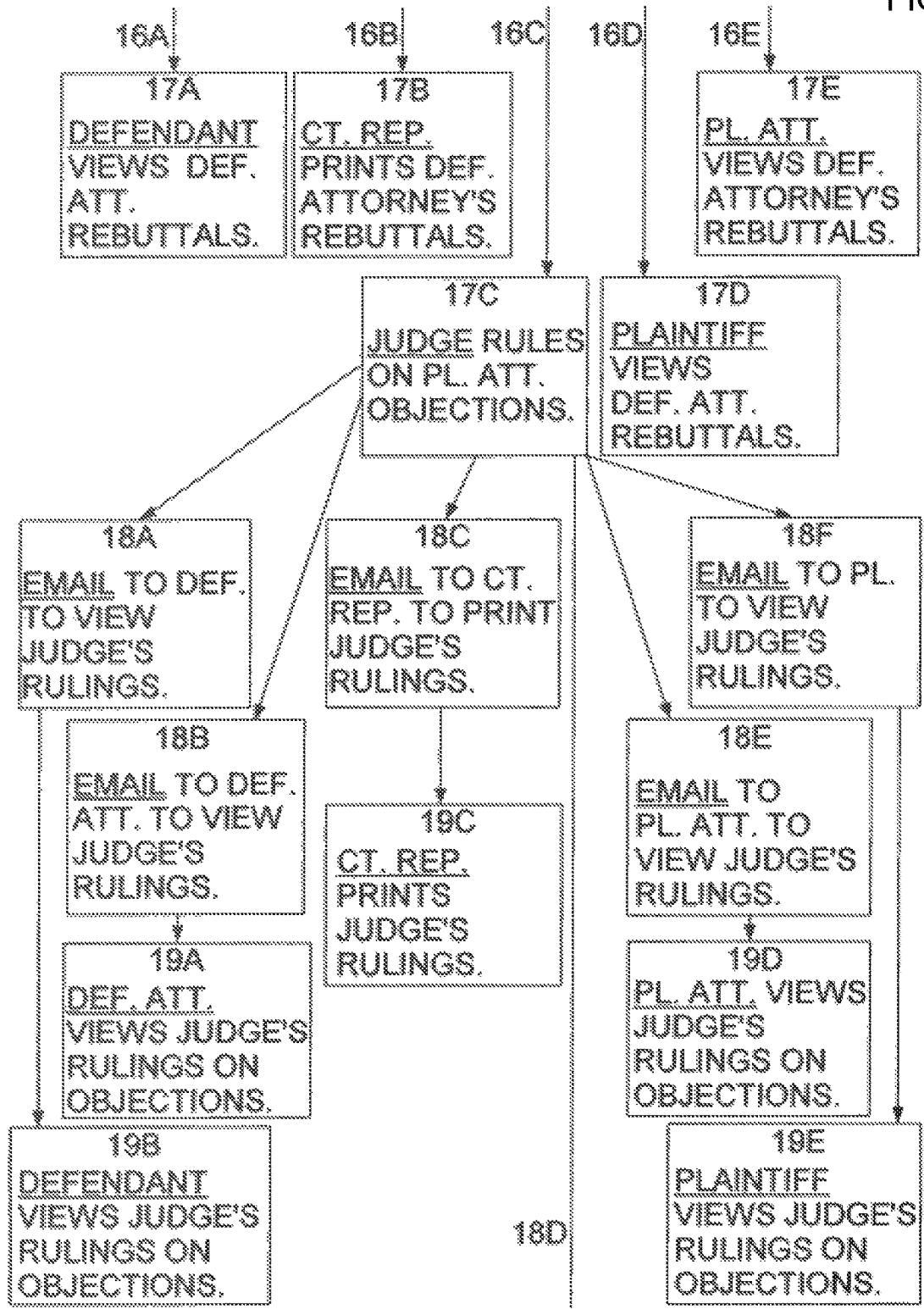
Figure 2H:
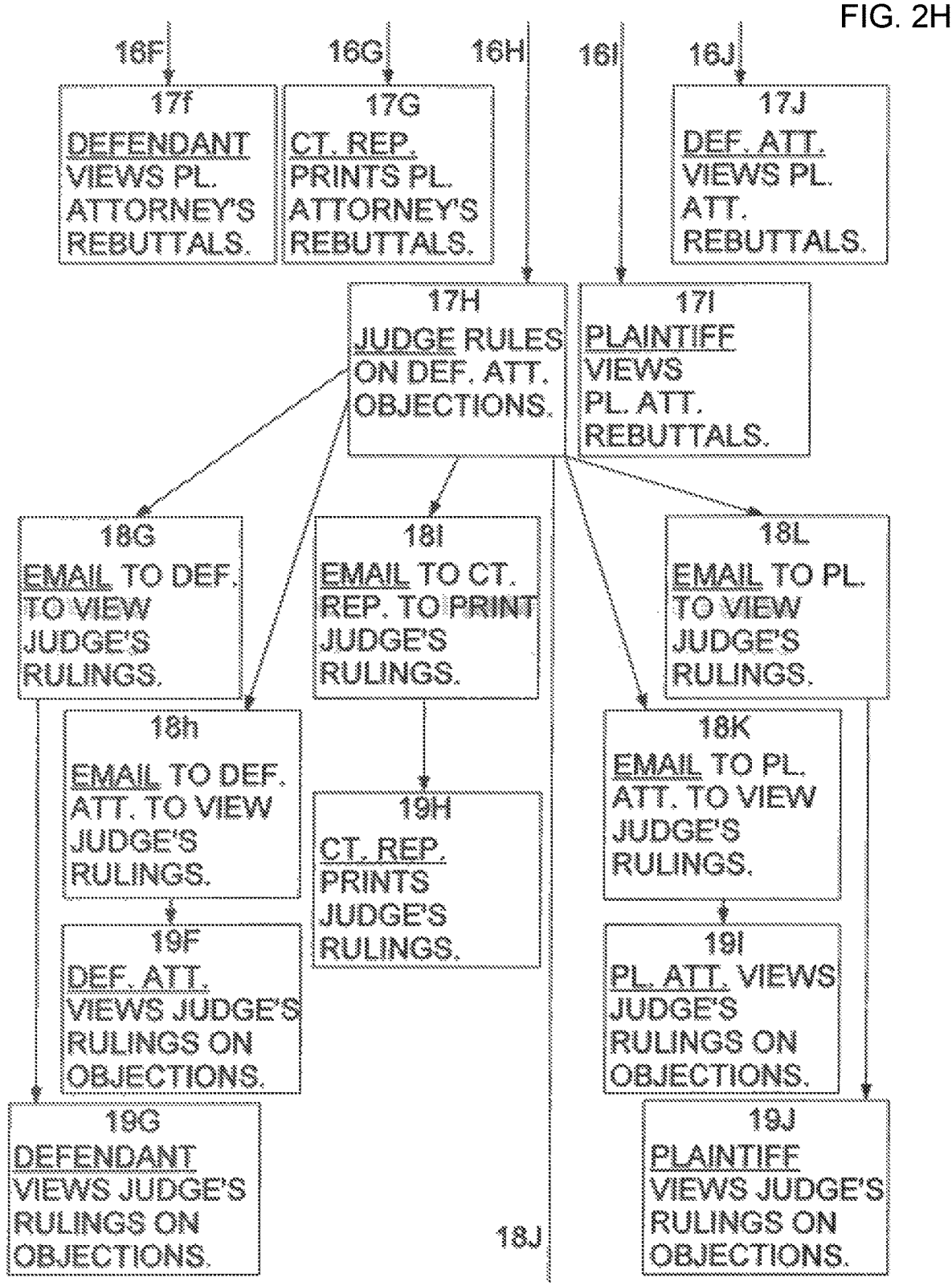
Figure 2I:
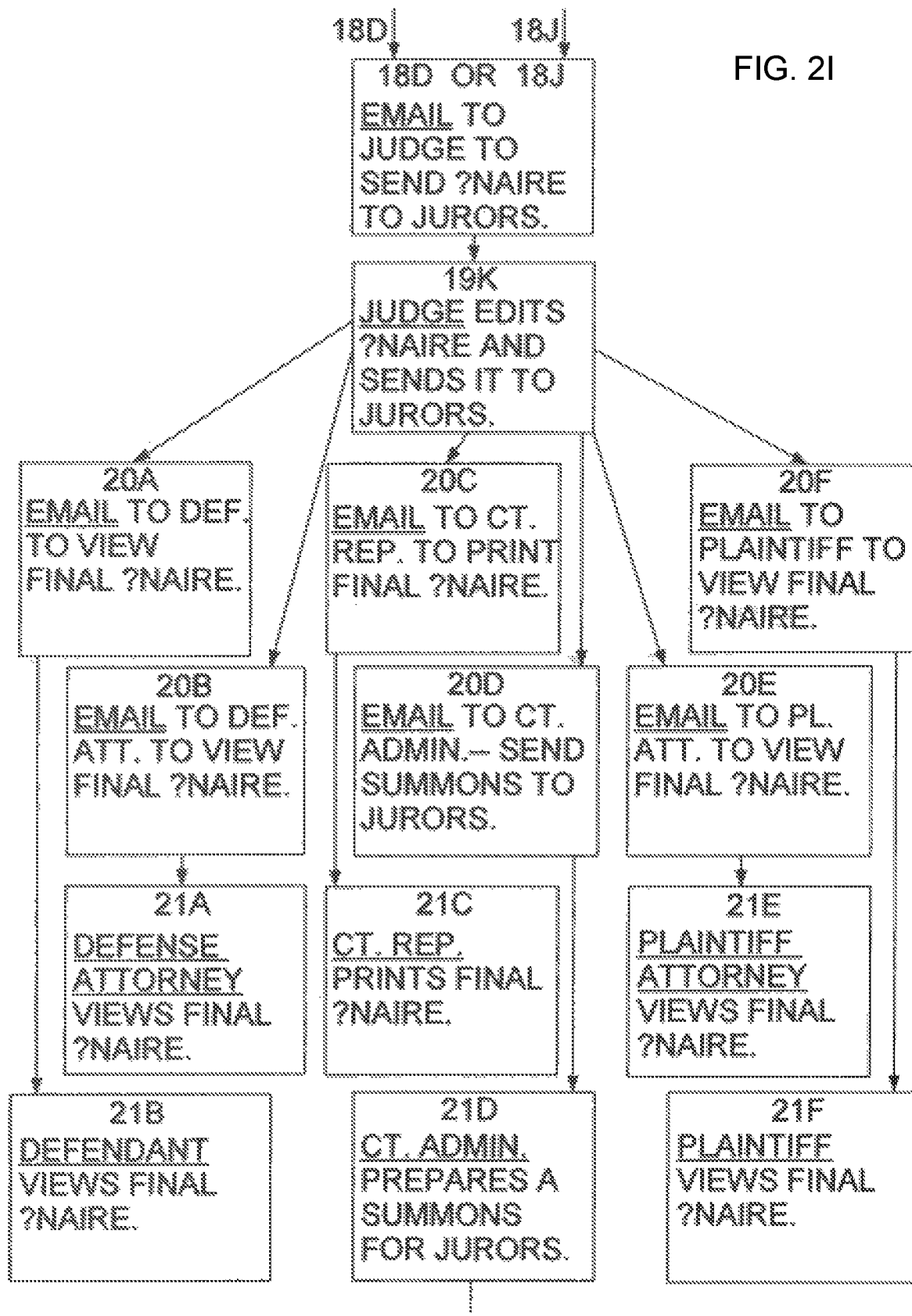
Figure 2J:
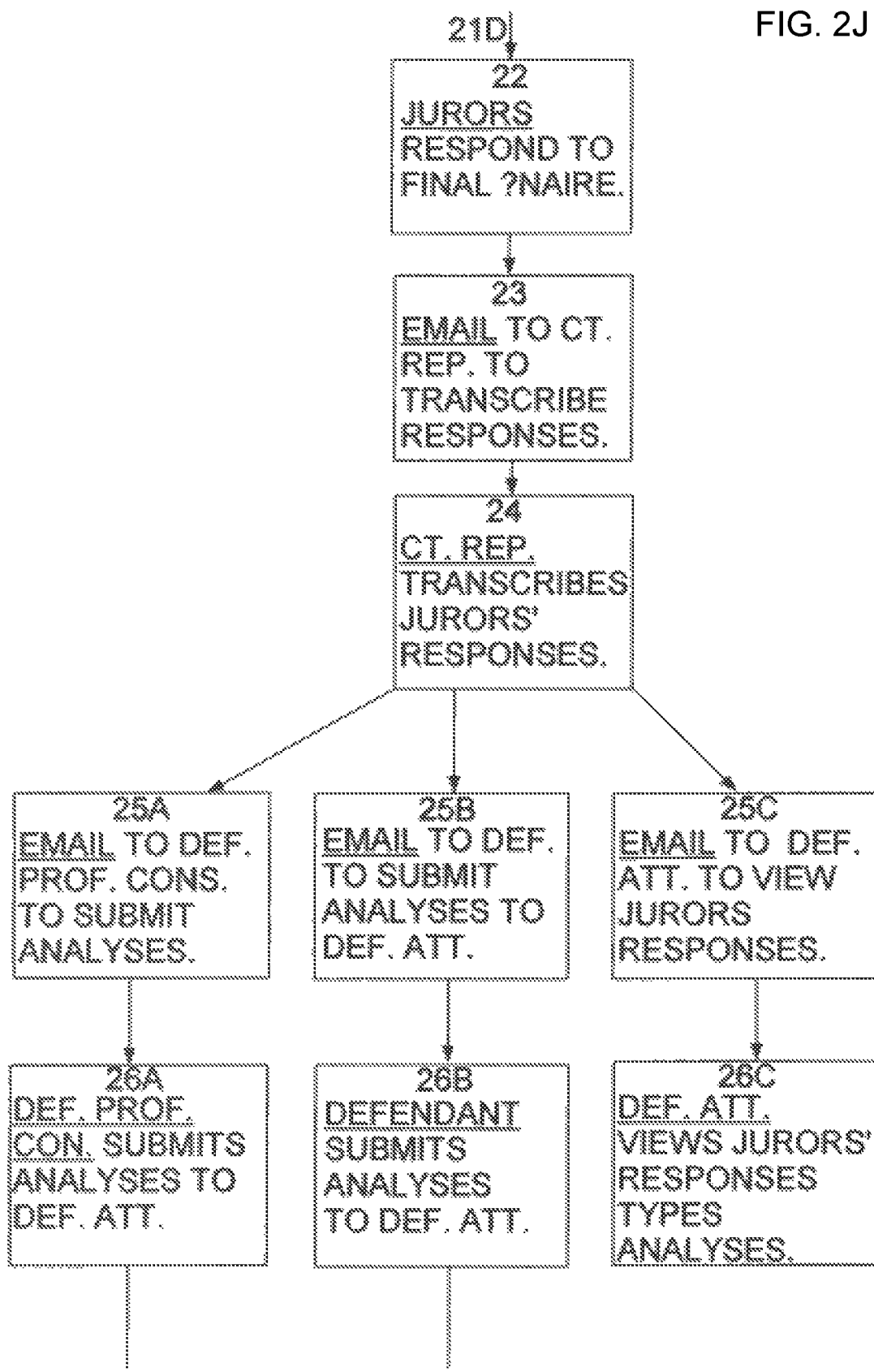
Figure 2K:
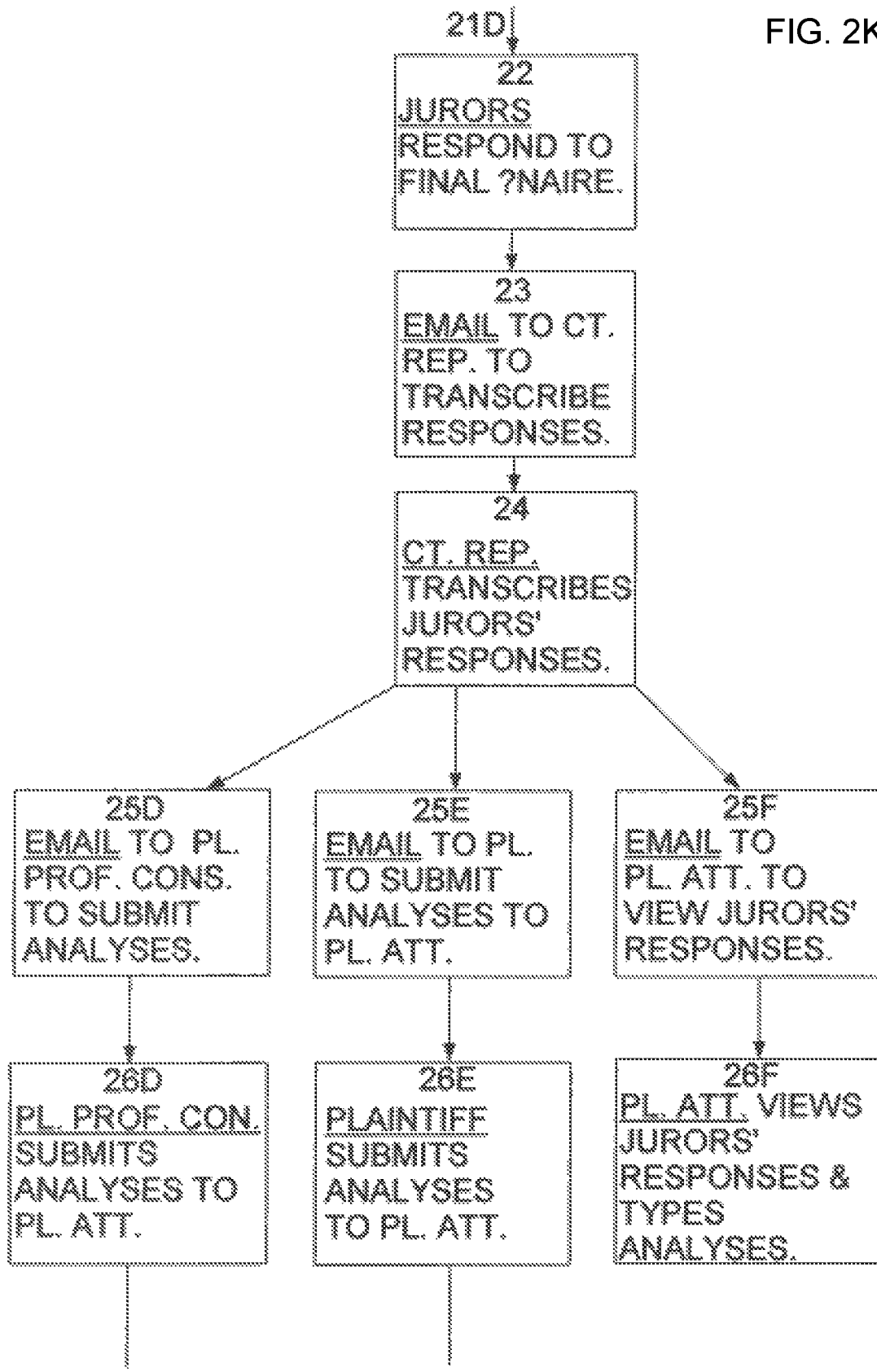
Figure 2L:
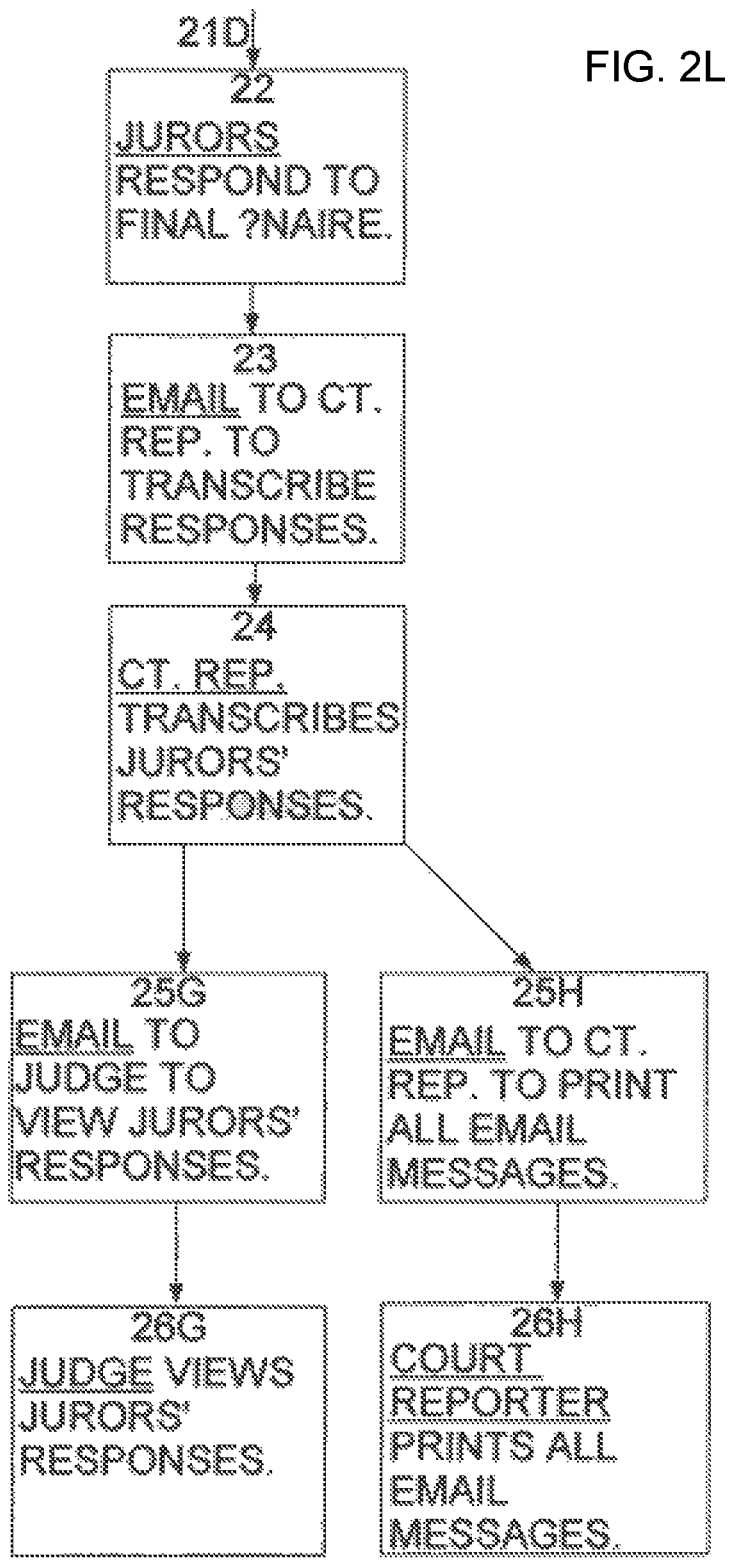
Figure 2M:
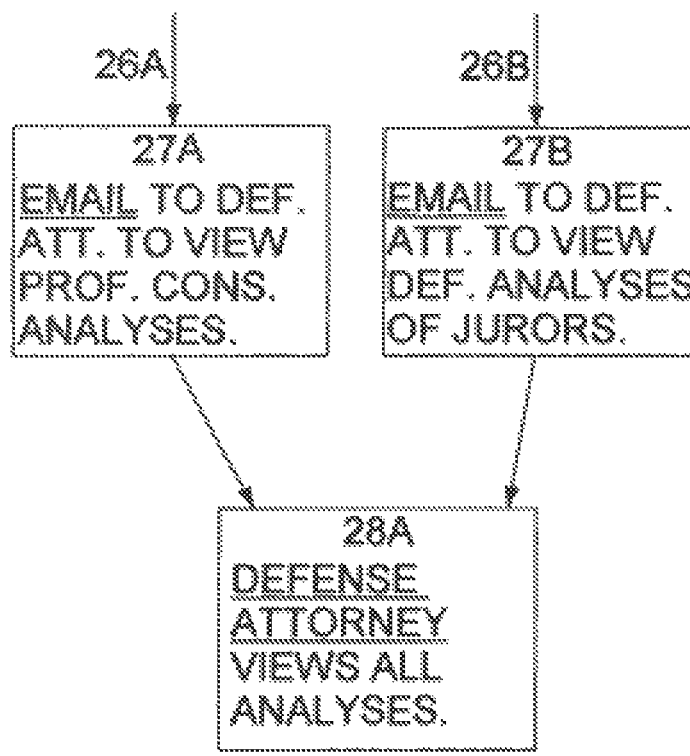
Figure 2N:
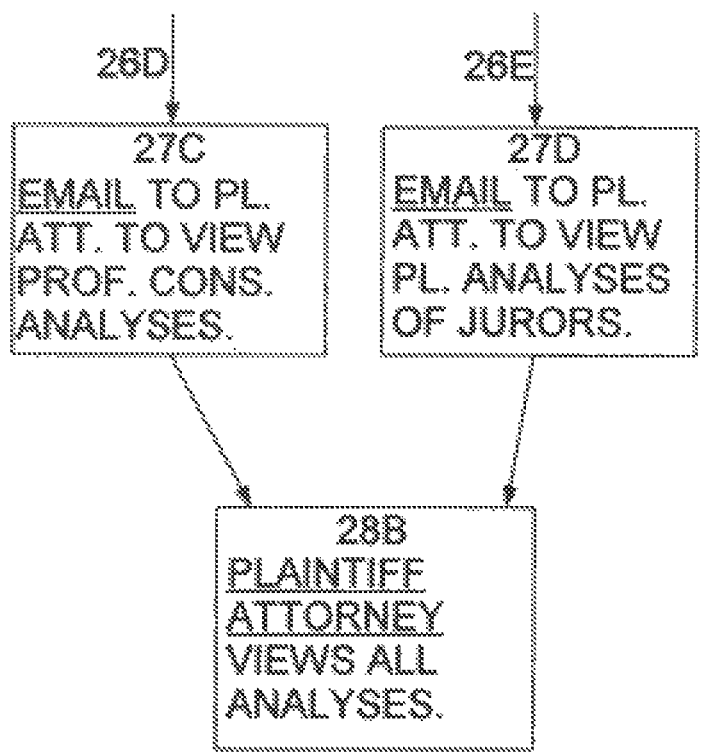

FIG. 2 is a flowchart encompassing the first 11 steps in FIG. 1 and steps 14 through 22 in FIG. 1 also showing optional subsequent steps of the unique method and computer program that allow attorneys to object to their counterpart's jury selection questions and allow the Judge to rule on such objections all through the invention's website. Thus, the first 11 steps in FIG. 1 are the same first 11 steps in FIG. 2. Also, steps 20 through 28 in FIG. 2 are identical to steps 14 through 22 in FIG. 1.

In step 12 of FIG. 2, the invention sends an email message and a text message to the Plaintiff Attorney advising that he/she may now log onto the invention's website and view the Defense Attorney's typed and video recorded jury selection questions and submit objections to any of the typed and video recorded jury selection questions on the questionnaire through the invention's website. Also, the invention sends an email message and a text message to the Defense Attorney advising that he/she may now log onto the invention's website and submit objections to any of the typed and video recorded jury selection questions on the questionnaire through the invention's website. Additionally, the invention sends an email message and a text message to the Judge, the Plaintiff, and the Defendant advising them that they may now log onto the invention's website and view the Defense Attorney's typed and video recorded jury selection questions and the attorneys may now submit objections to any of the typed and video recorded jury selection questions on the questionnaire through the invention's website. Also, the invention sends an email message and a text message to the Court Reporter advising him/her to log onto the invention's website and transcribe and print the Defense Attorney's video recordings orally reading the typed jury selection questions and print the Defense Attorney's typed jury selection questions.

In step 13 of FIG. 2, the Plaintiff Attorney logs into the invention's website and submits objections to any of the typed and video recorded jury selection questions on the questionnaire through the invention's website. Also, the Defense Attorney logs into the invention's website and submits objections to any of the typed and video recorded jury selection questions on the questionnaire through the invention's website. Additionally, the Judge, the Plaintiff, and the Defendant log onto the invention's website and view the Defense Attorney's typed and video recorded jury selection questions. Also, the Court Reporter logs onto the invention's website and transcribes and prints the Defense Attorney's video recordings orally reading the typed jury selection questions and prints the Defense Attorney's typed jury selection questions.

In step 14 of FIG. 2, the invention sends an email message and a text message to the Plaintiff Attorney advising that he/she may now log onto the invention's website and view the Defense Attorney's objections to typed and video recorded jury selection questions and submit rebuttals to the Defense Attorney's objections through the invention's website. Also, the invention sends an email message and a text message to the Defense Attorney advising that he/she may now log onto the invention's website and view the Plaintiff Attorney's objections to typed and video recorded jury selection questions and submit rebuttals to the Plaintiff Attorney's objections through the invention's website. Additionally, the invention sends email messages and text messages to the Judge, the Plaintiff, and the Defendant advising them that they may now log onto the invention's website and view the Plaintiff Attorney's and the Defense Attorney's objections to typed and video recorded jury selection questions and advising them that the attorneys may now submit rebuttals to their counterpart's objections through the invention's website. Also, the invention sends email messages and text messages to the Court Reporter advising him/her to log onto the invention's website and print the Plaintiff Attorney's and the Defense Attorney's objections to typed and video recorded jury selection questions.

In step 15 of FIG. 2, the Plaintiff Attorney logs onto the invention's website and views the Defense Attorney's objections to typed and video recorded jury selection questions and submits rebuttals to the Defense Attorney's objections through the invention's website. Also, the Defense Attorney logs onto the invention's website and views the Plaintiff Attorney's objections to typed and video recorded jury selection questions and submits rebuttals to the Plaintiff Attorney's objections through the invention's website. Additionally, the Judge, the Plaintiff, and the Defendant log onto the invention's website and view the Plaintiff Attorney's and the Defense Attorney's objections to typed and video recorded jury selection questions. Also, the Court Reporter logs onto the invention's website and prints the Plaintiff Attorney's and the Defense Attorney's objections to typed and video recorded jury selection questions.

In step 16 of FIG. 2, the invention sends email messages and text messages to the Plaintiff Attorney, Defense Attorney, Plaintiff, and Defendant advising them that they may now log onto the invention's website and view the Plaintiff Attorney's and the Defense Attorney's rebuttals to their counterpart's objections to typed and video recorded jury selection questions. Also, the invention sends email messages and text messages to the Judge advising him/her to log onto the invention's website and view the Plaintiff Attorney's and the Defense Attorney's rebuttals to their counterpart's objections to typed and video recorded jury selection questions and submit rulings through the invention's website on the Plaintiff Attorney's objections and the Defense Attorney's objections. Also, the invention sends email messages and text messages to the Court Reporter advising him/her to log onto the invention's website and print the Plaintiff Attorney's and the Defense Attorney's rebuttals to their counterpart's objections to typed and video recorded jury selection questions.

In step 17 of FIG. 2, the Plaintiff Attorney, Defense Attorney, Plaintiff, and Defendant log onto the invention's website and view the Plaintiff Attorney's and the Defense Attorney's rebuttals to their counterpart's objections to typed and video recorded jury selection questions. Also, the Judge logs onto the invention's website and views the Plaintiff Attorney's and the Defense Attorney's rebuttals to their counterpart's objections to typed and video recorded jury selection questions and submits rulings through the invention's website on the Plaintiff Attorney's objections and the Defense Attorney's objections. Also, the Court Reporter logs onto the invention's website and prints the Plaintiff Attorney's and the Defense Attorney's rebuttals to their counterpart's objections to typed and video recorded jury selection questions.

In step 18 of FIG. 2, the invention sends email messages and text messages to the Plaintiff Attorney, Defense Attorney, Plaintiff, and Defendant advising them that they may now log onto the invention's website and view the Judge's rulings on the Plaintiff Attorney's and the Defense Attorney's objections to typed and video recorded jury selection questions. Also, the invention sends email messages and text messages to the Court Reporter advising him/her to log onto the invention's website and print the Judge's rulings on the Plaintiff Attorney's and the Defense Attorney's objections to typed and video recorded jury selection questions. Also, the invention sends email messages and text messages to the Judge advising him/her to log onto the invention's website, and he/she may delete any typed and video recorded jury selection questions on the questionnaire that he/she desires through the invention's website and make the jury selection questionnaire accessible to the jurors for their responses through the invention's website.

In step 19 of FIG. 2, the Plaintiff Attorney, Defense Attorney, Plaintiff, and Defendant log onto the invention's website and view the Judge's rulings on the Plaintiff Attorney's and the Defense Attorney's objections to typed and video recorded jury selection questions. Also, the Court Reporter logs onto the invention's website and prints the Judge's rulings on the Plaintiff Attorney's and the Defense Attorney's objections to typed and video recorded jury selection questions. Also, the Judge logs onto the invention's website any deletes any typed and video recorded jury selection questions on the questionnaire that he/she desires through the invention's website and makes the jury selection questionnaire accessible to the jurors for their responses through the invention's website.

Steps 20 through 28 in FIG. 2 are identical to steps 14 through 22 in FIG. 1.

Figure 3A:
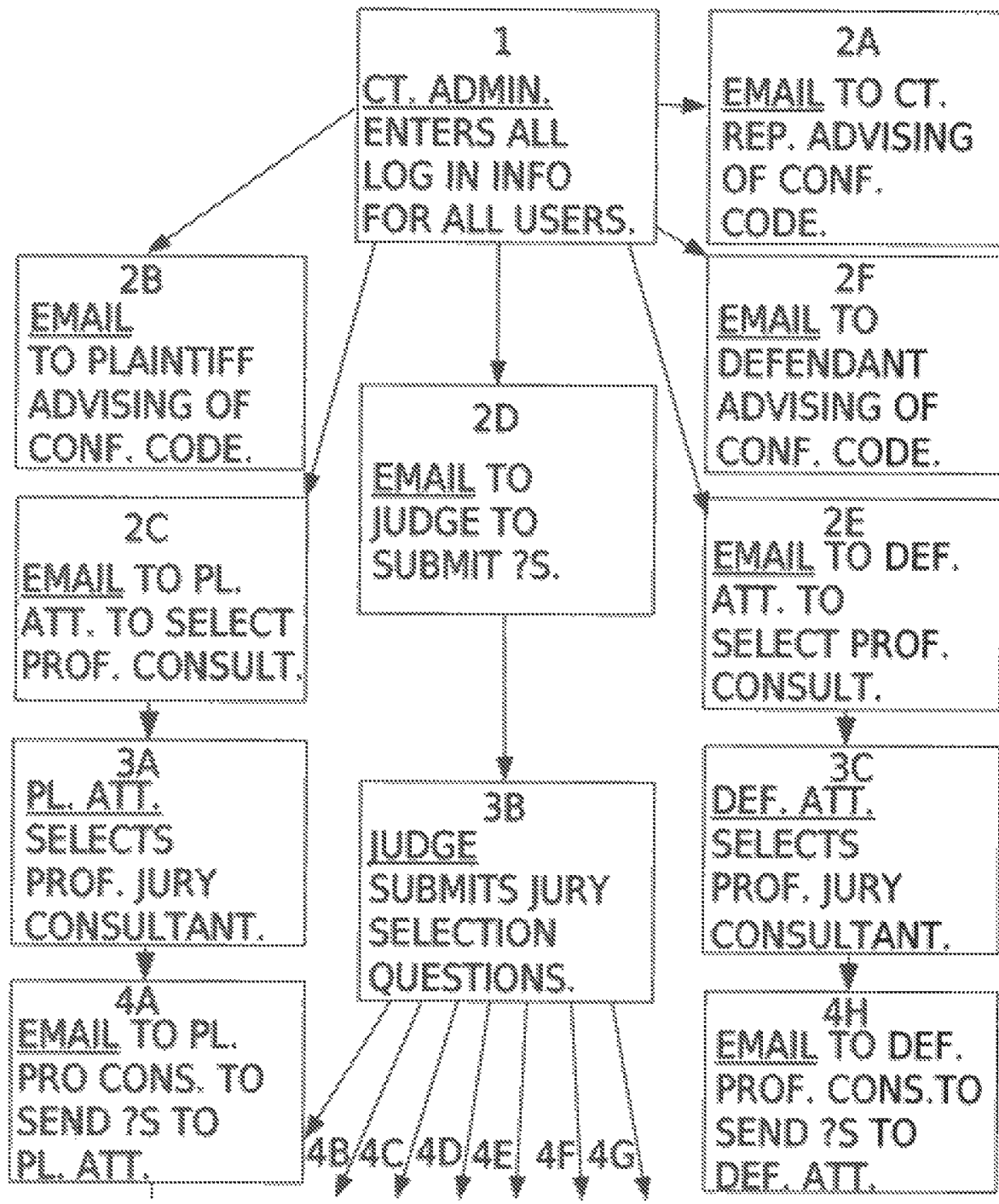
FIG. 3 is a flowchart encompassing steps 1 through 24 in FIG. 2 and also showing optional subsequent steps of the unique method and computer program that allow attorneys to submit challenges for cause and peremptory challenges and allow attorneys to object to their counterpart's challenges for cause and peremptory challenges and allow the Judge to rule on such objections all through the invention's website.
Figure 3B:
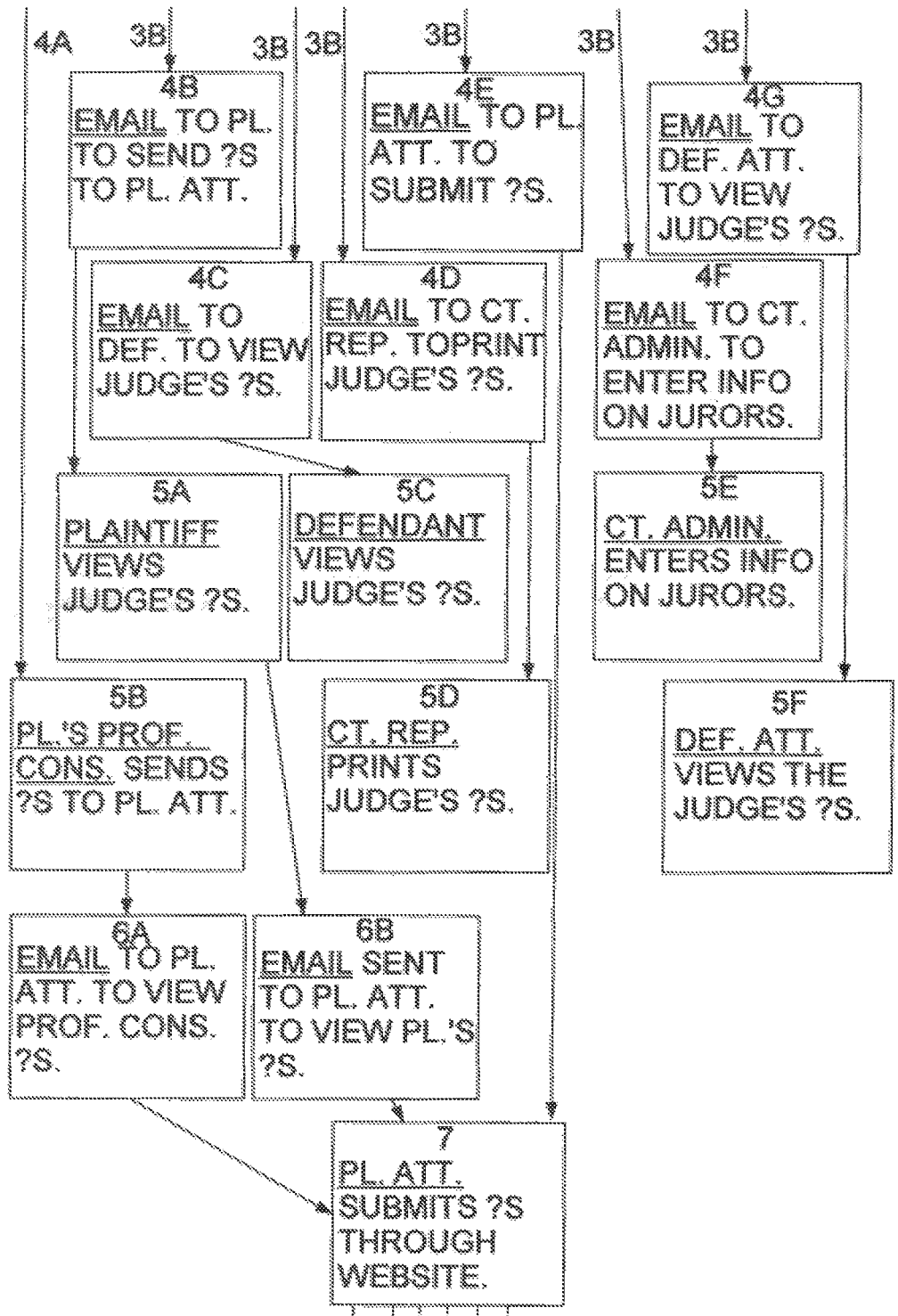
Figure 3C:
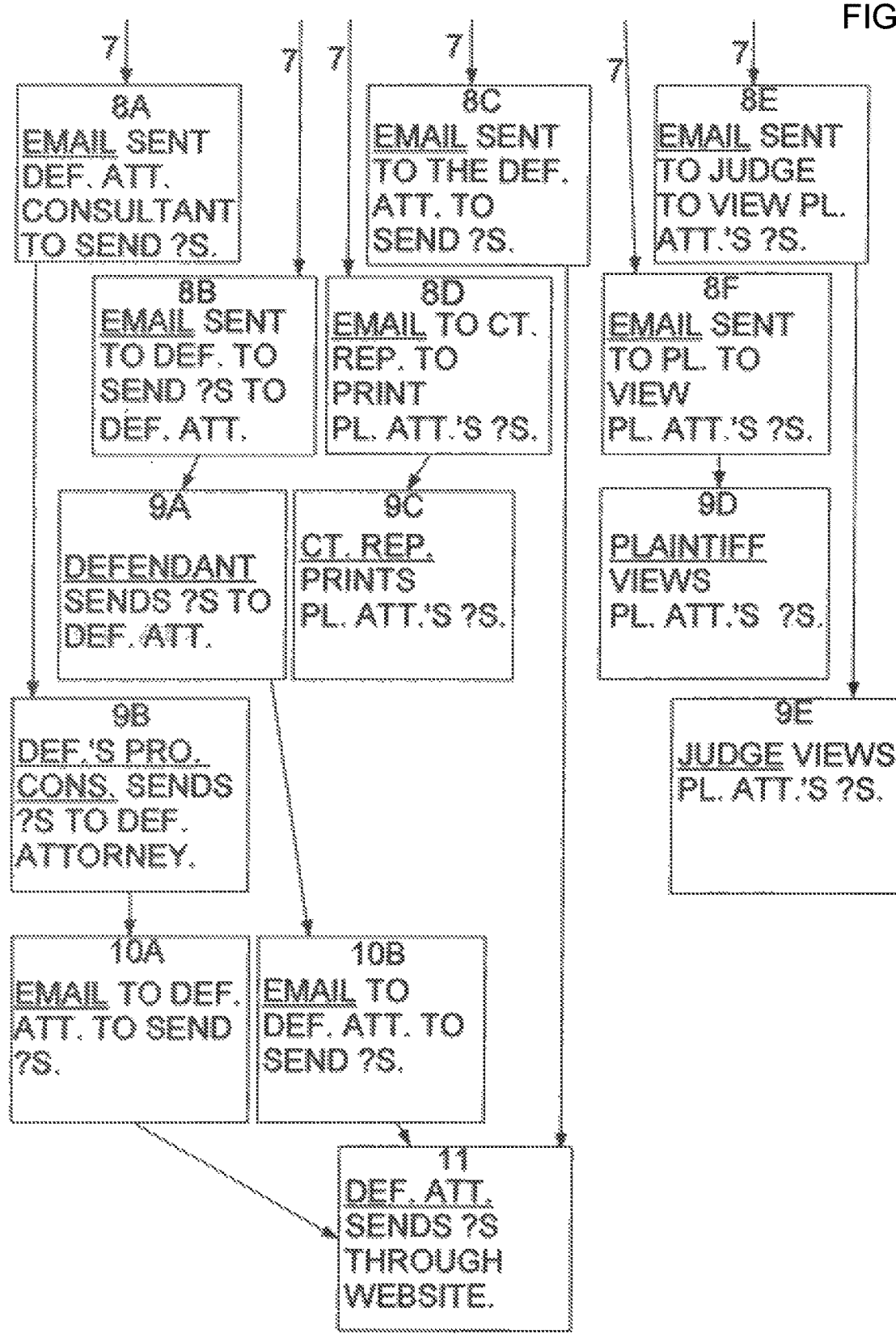
Figure 3D:
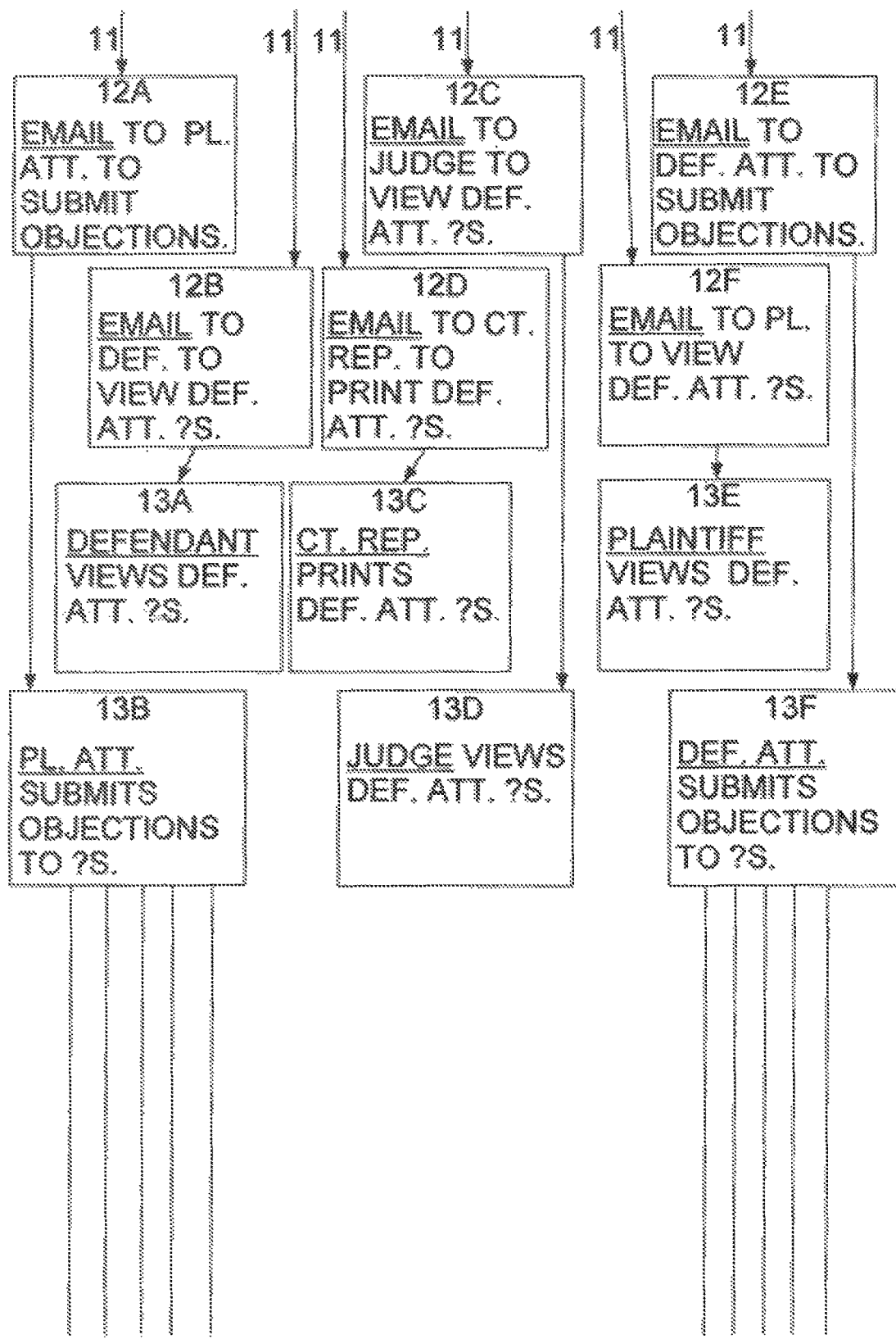
Figure 3E:
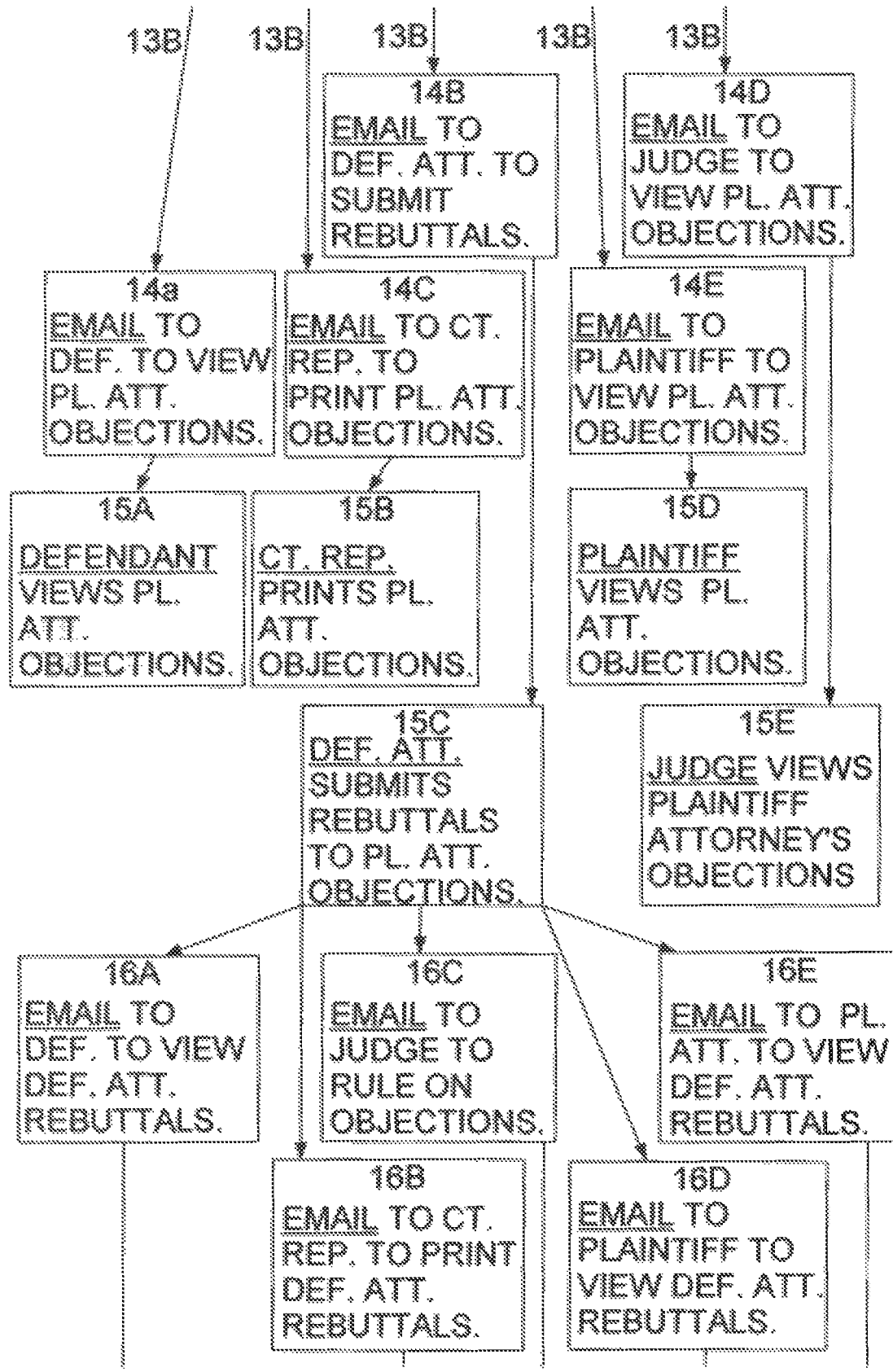
Figure 3F:
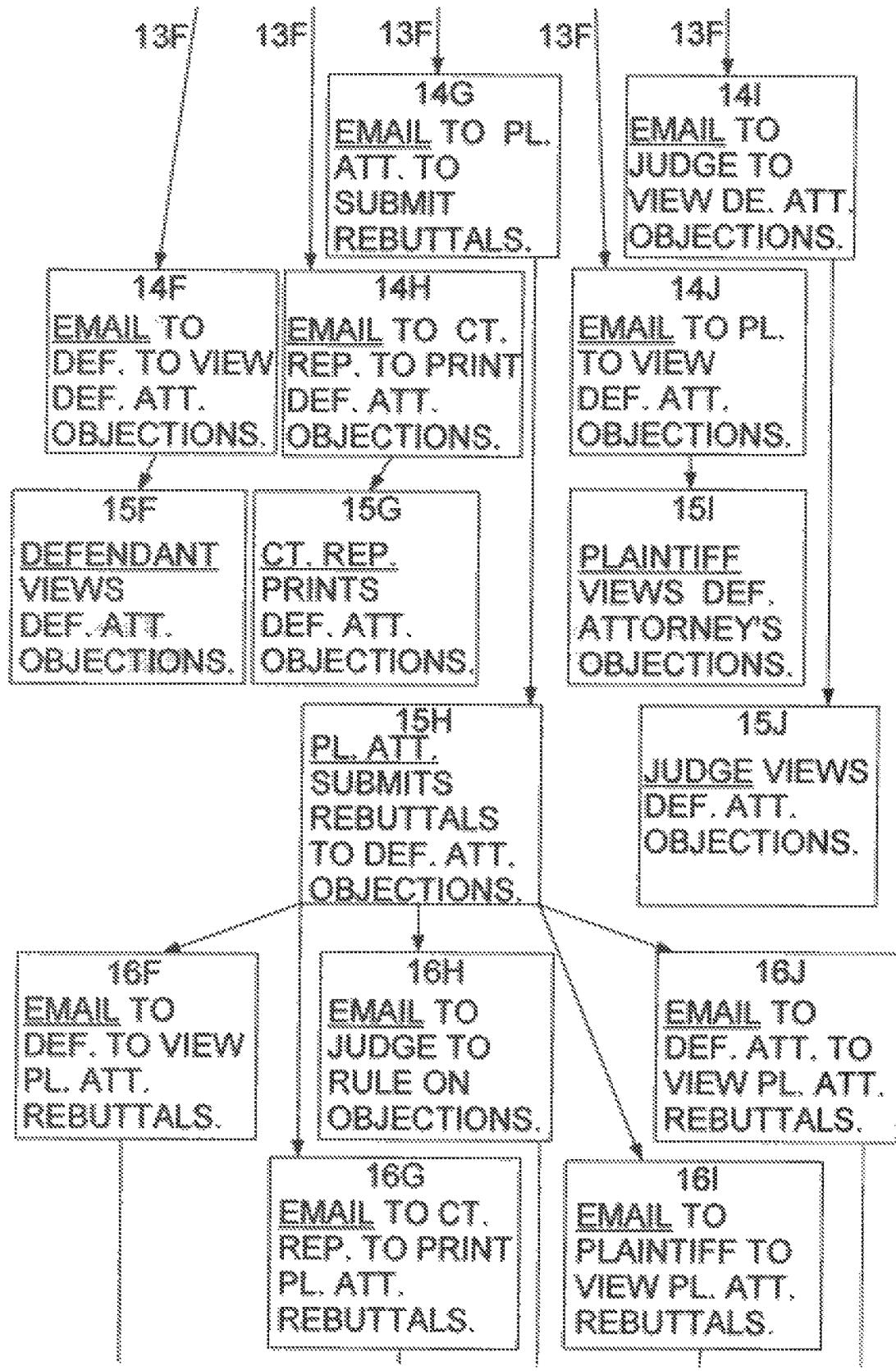
Figure 3G:
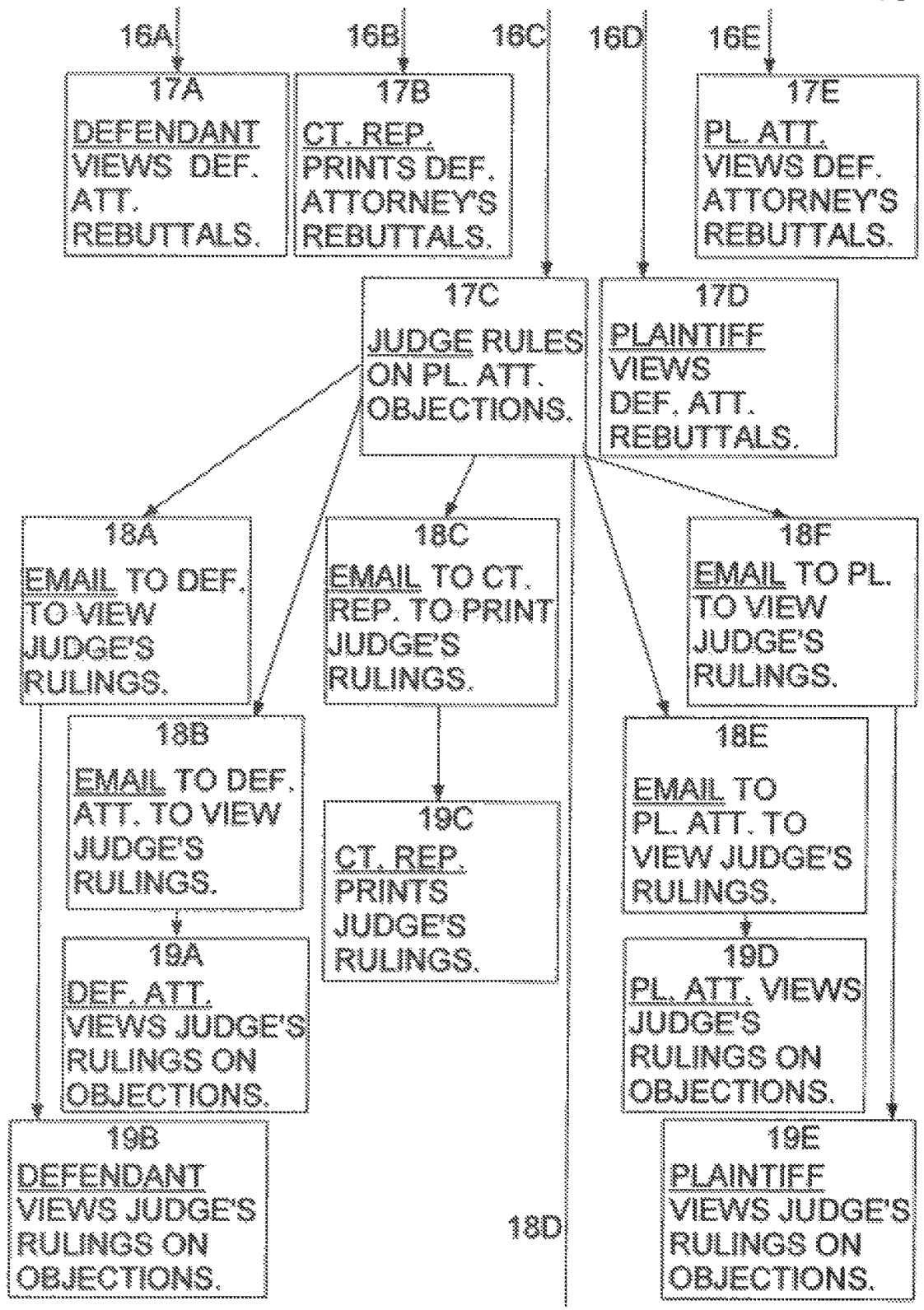
Figure 3H:
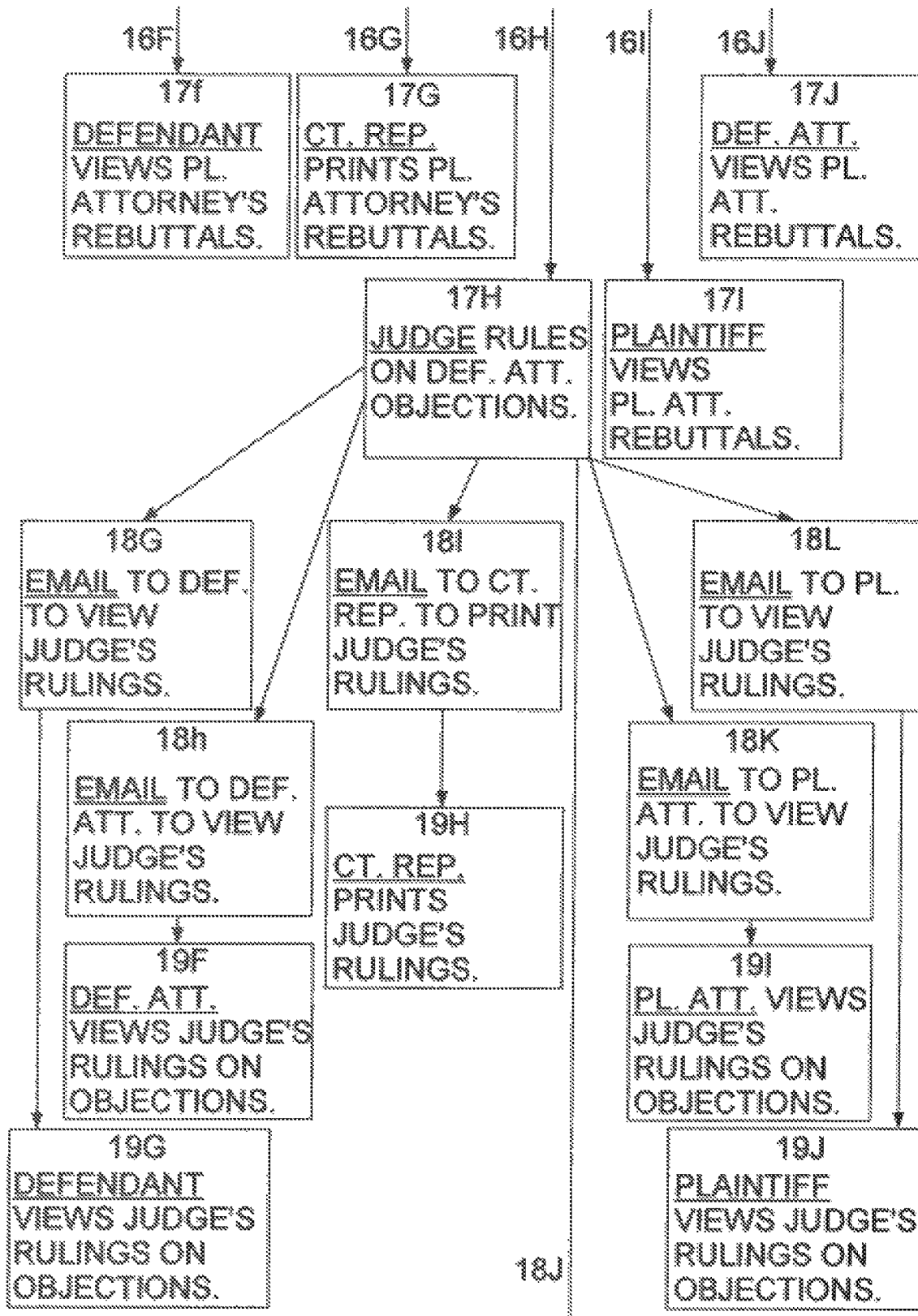
Figure 3I:
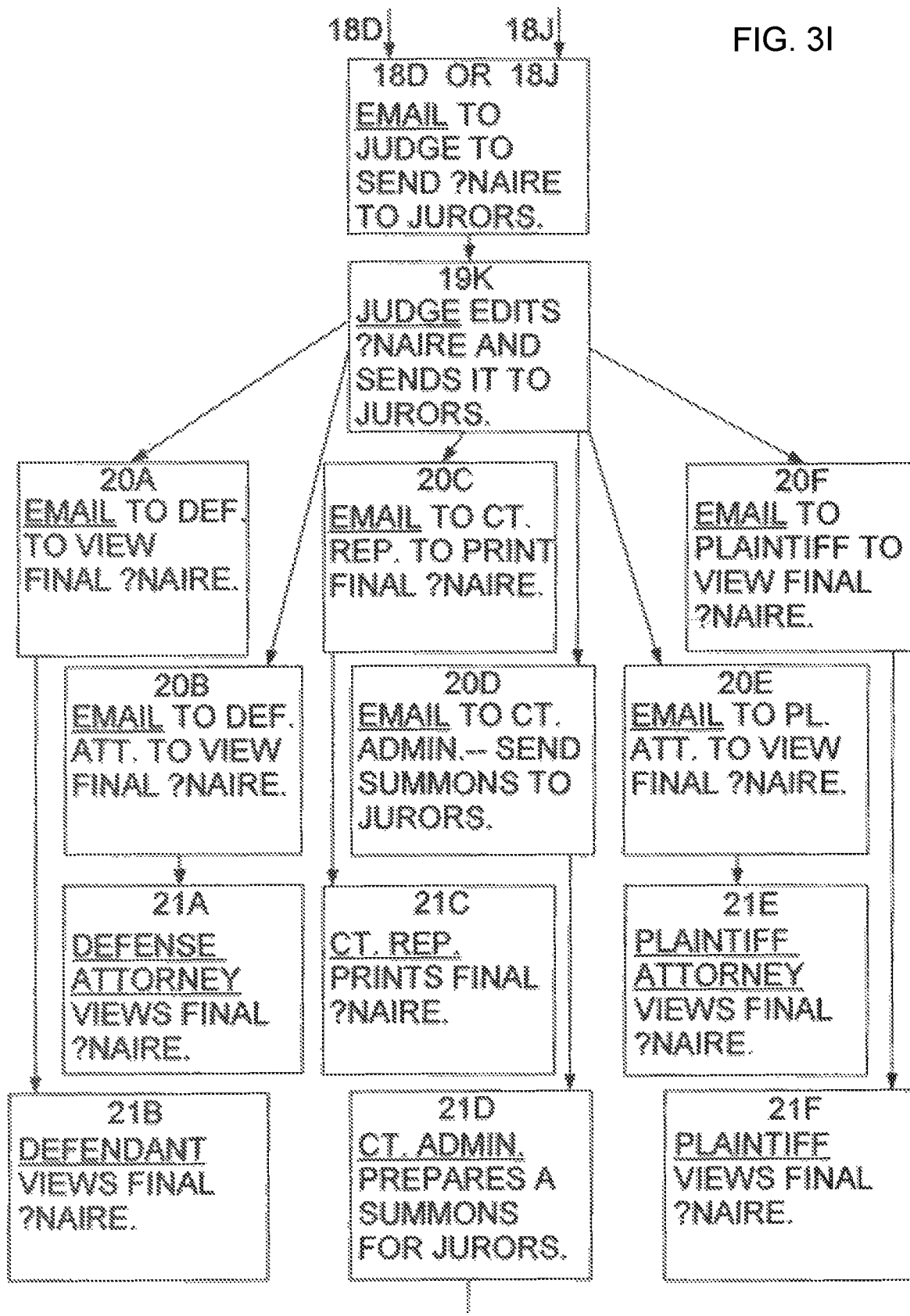
Figure 3J:
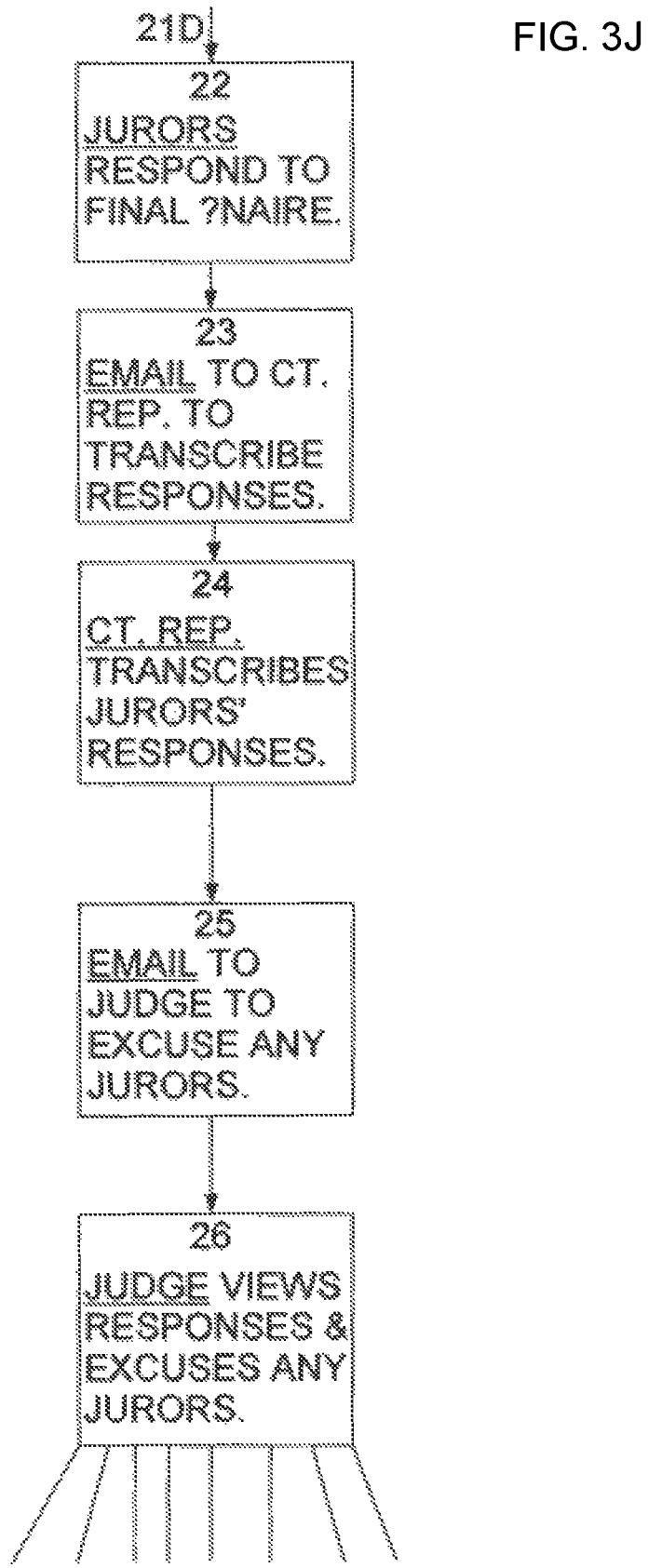
Figure 3K:
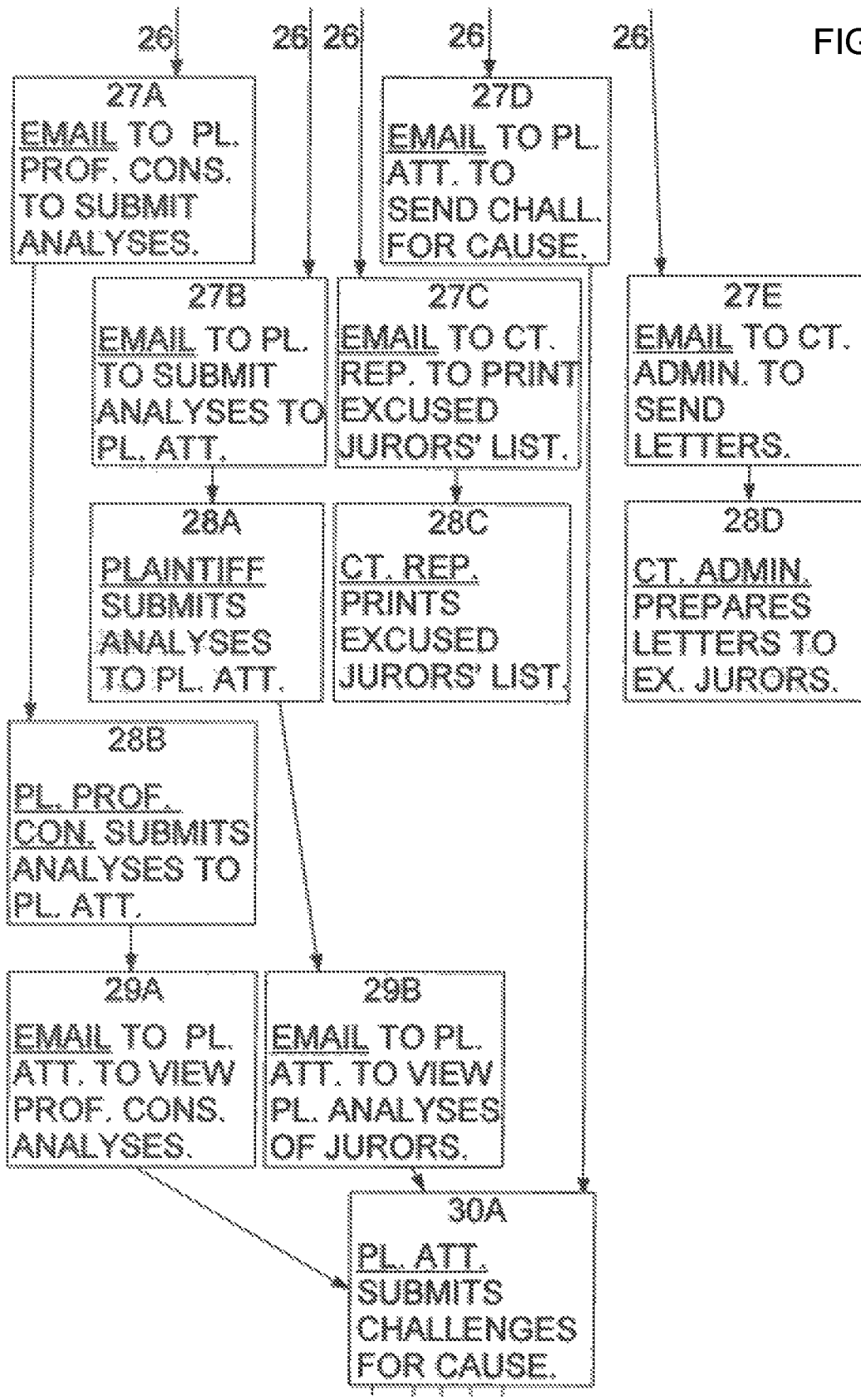
Figure 3L:
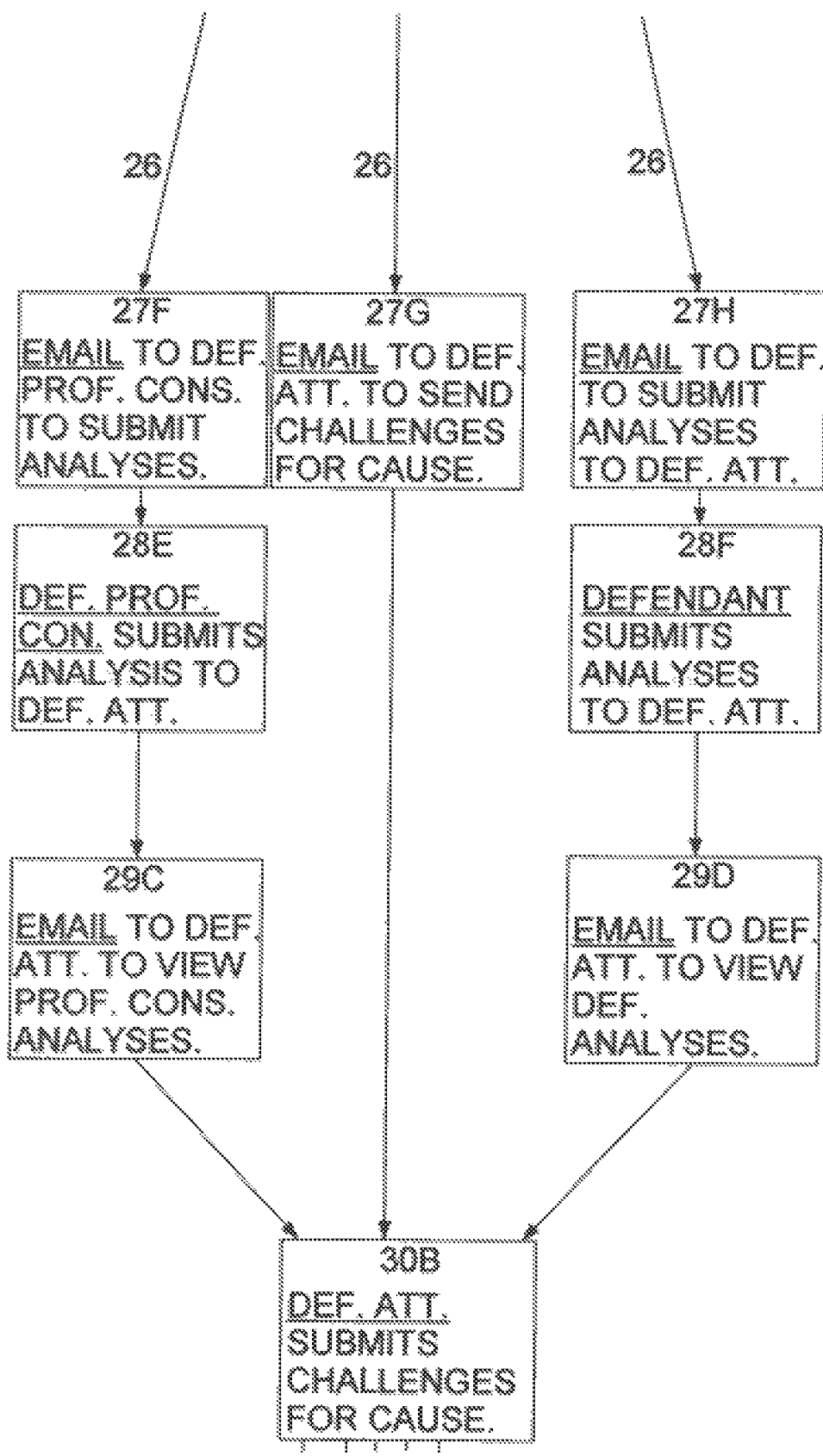
Figure 3M:
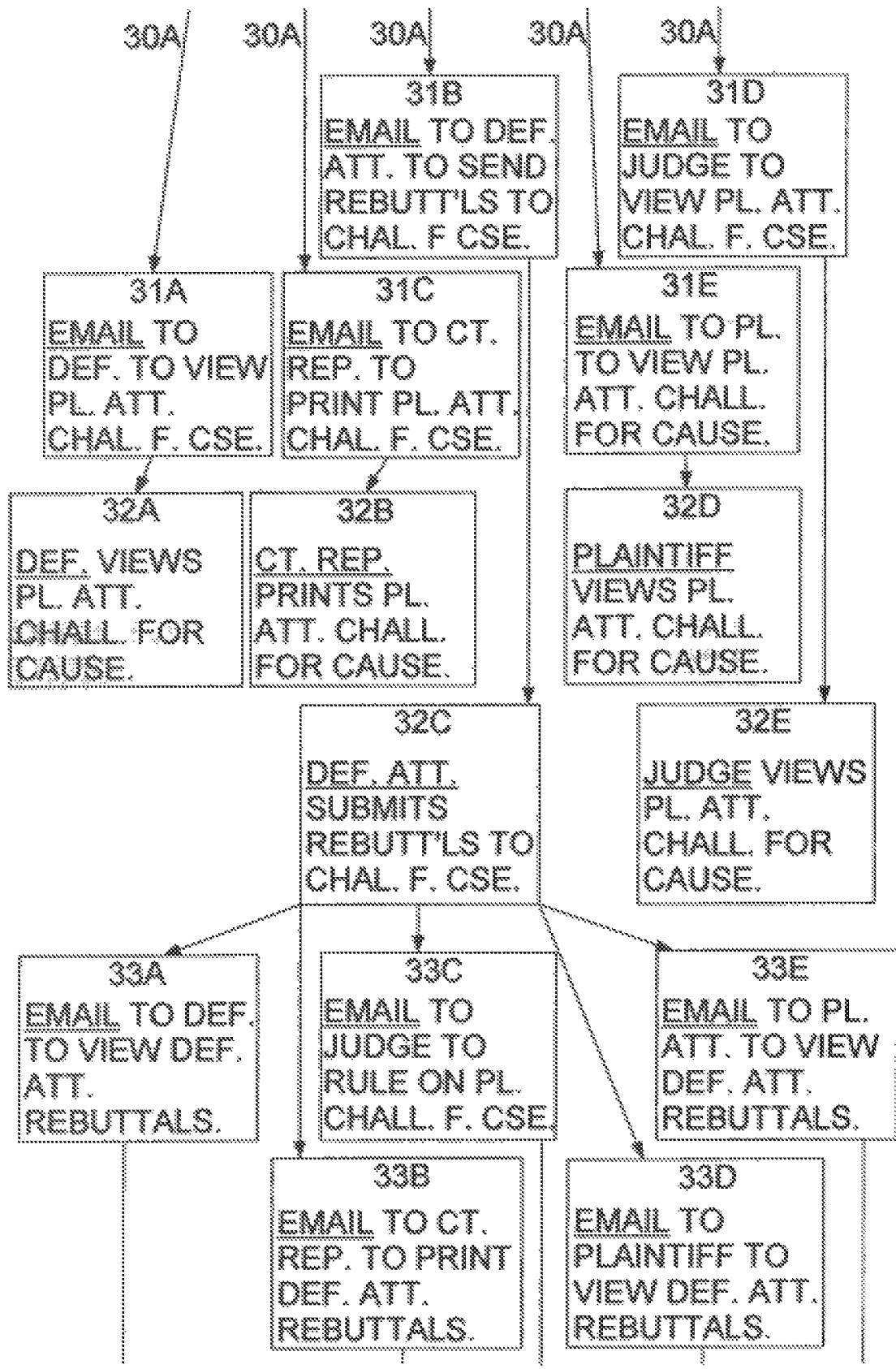
Figure 3N:
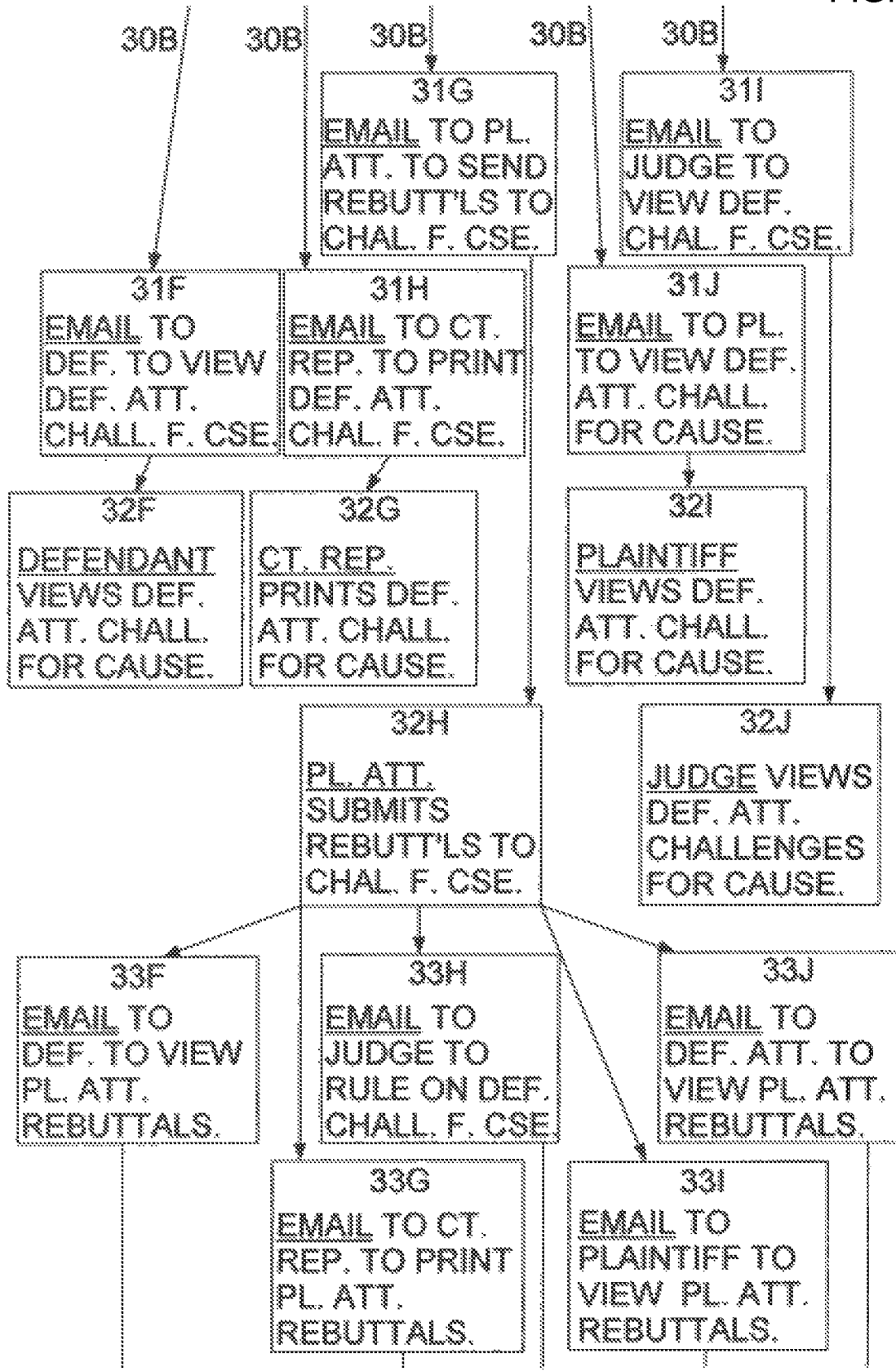
Figure 3O:
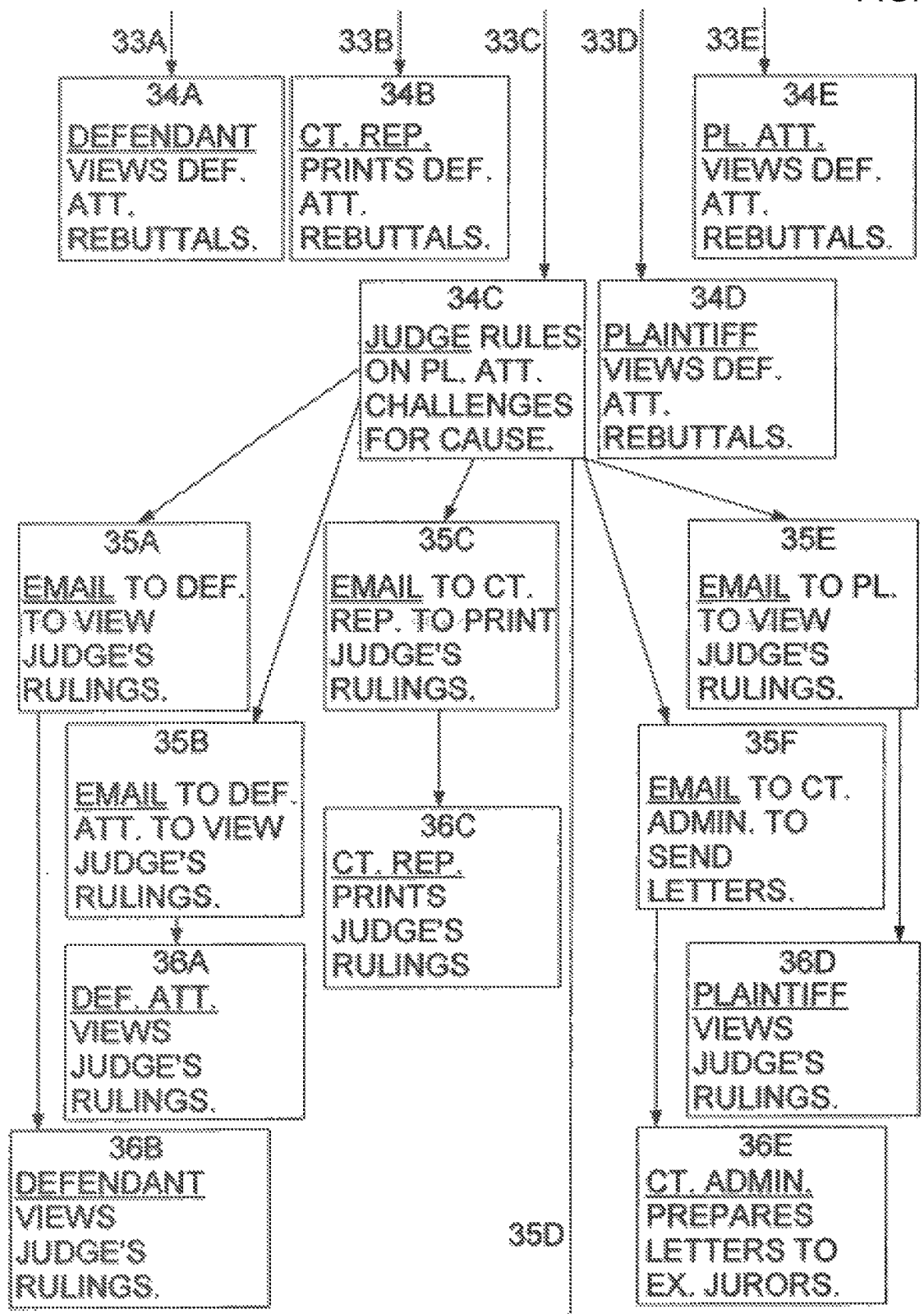
Figure 3P:
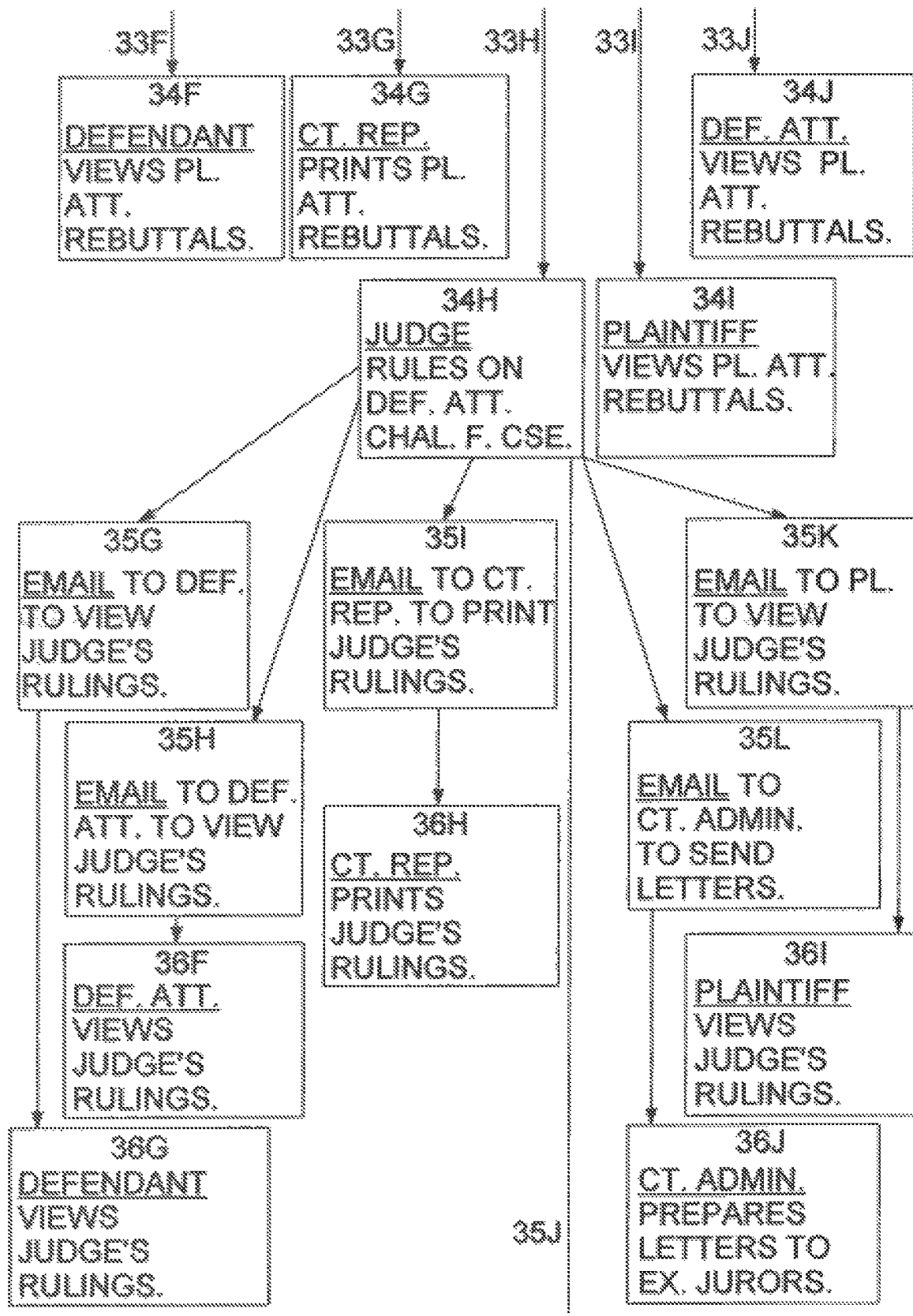
Figure 3Q:
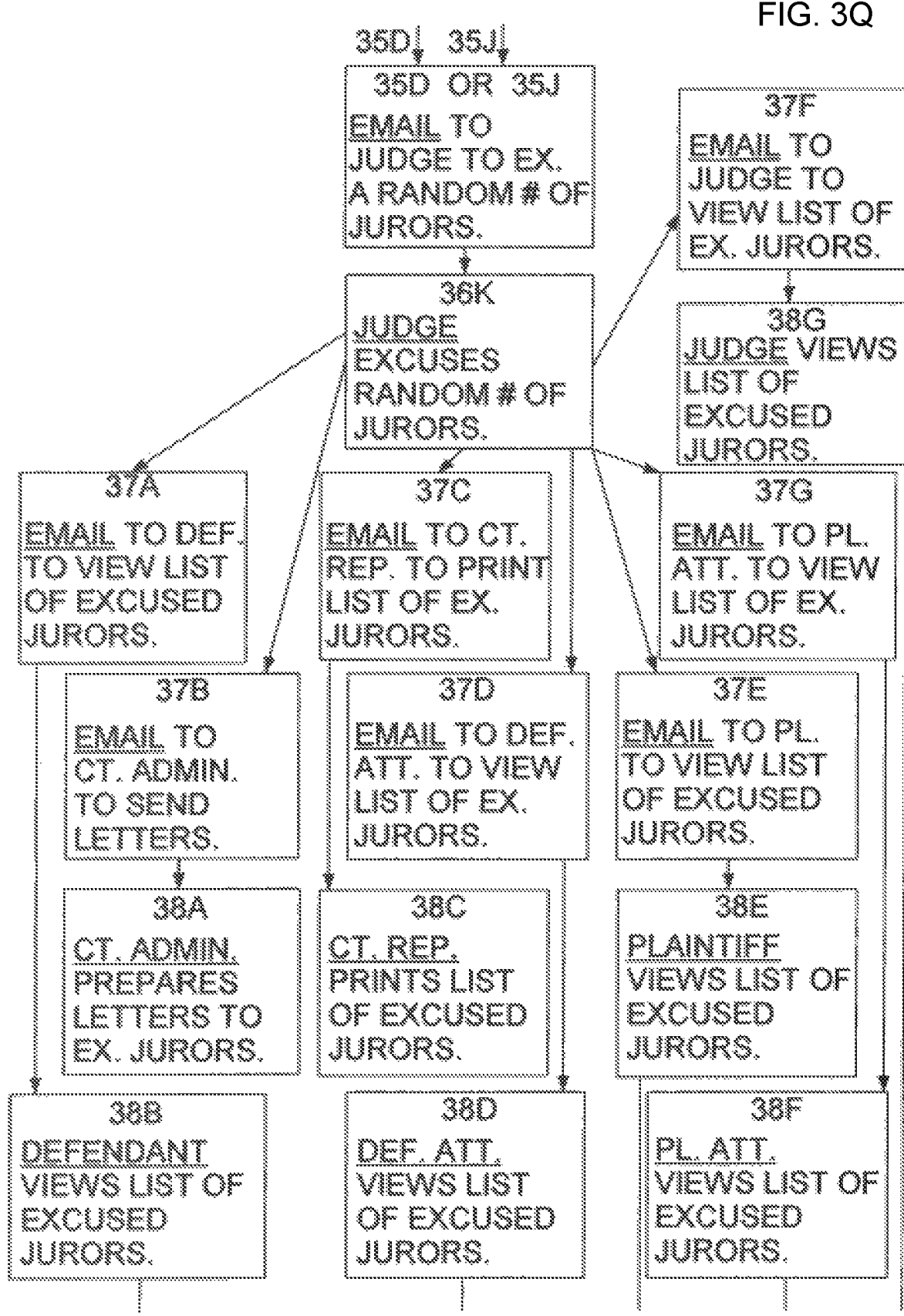
Figure 3R:
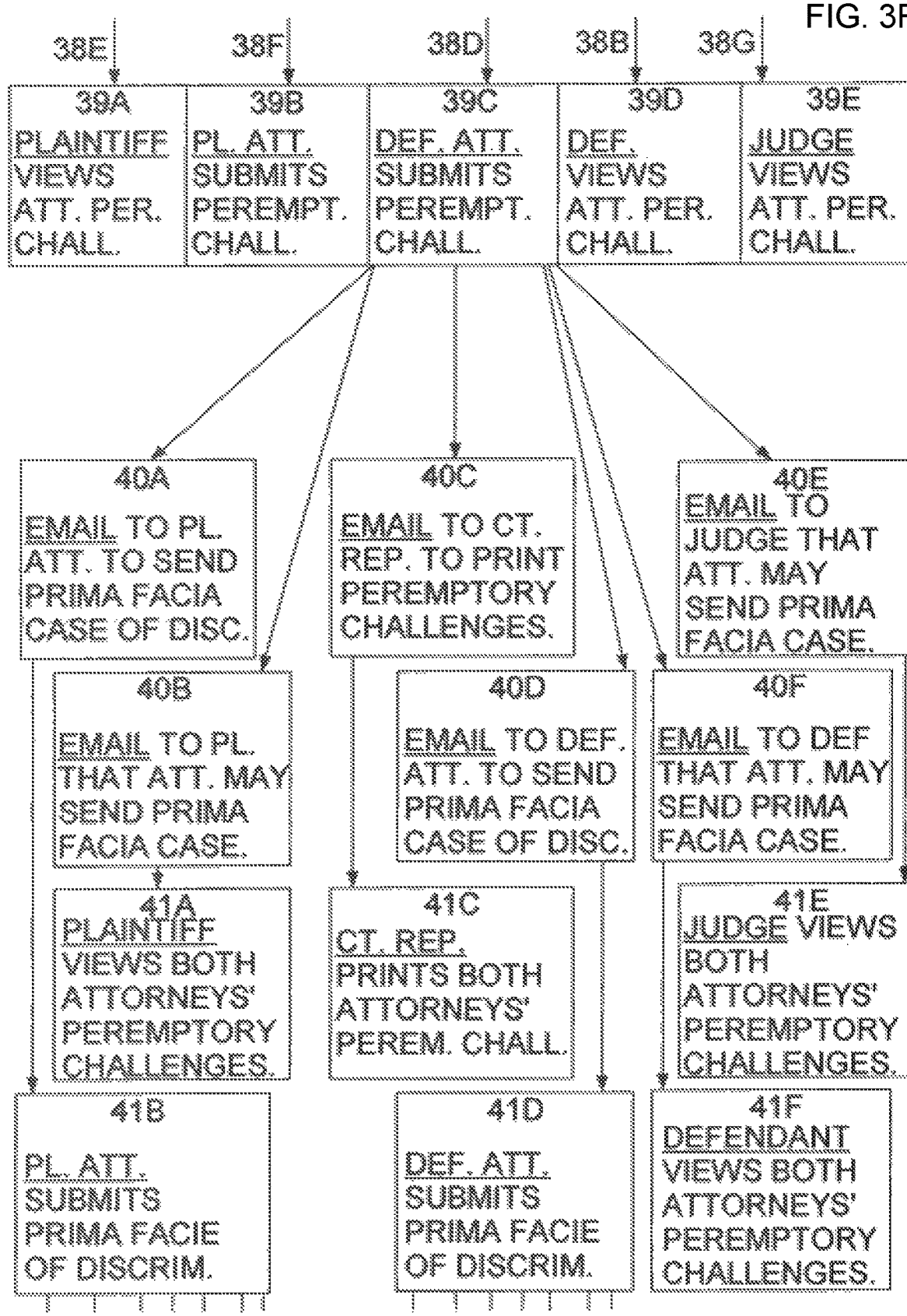
Figure 3S:
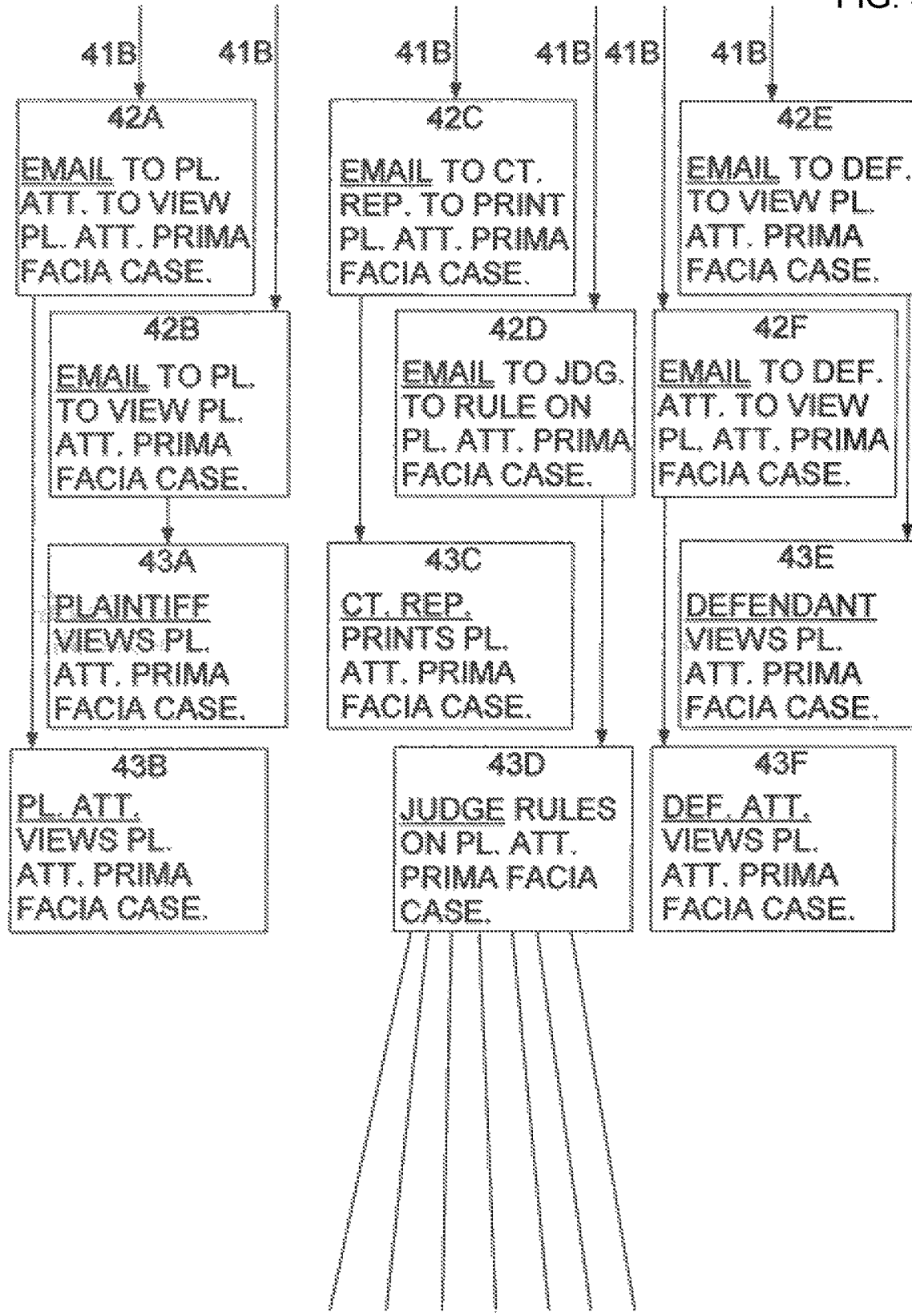
Figure 3T:
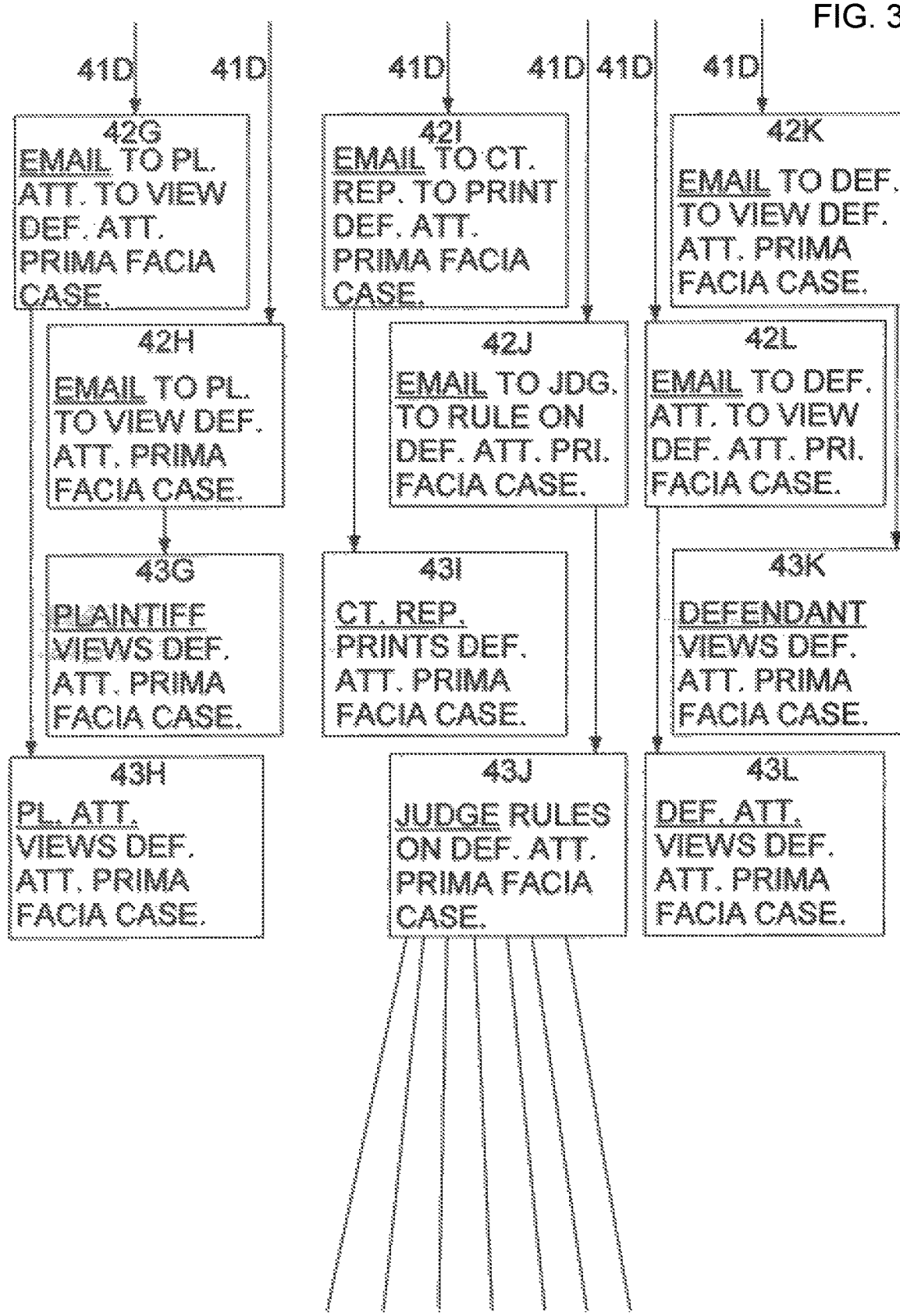
Figure 3U:
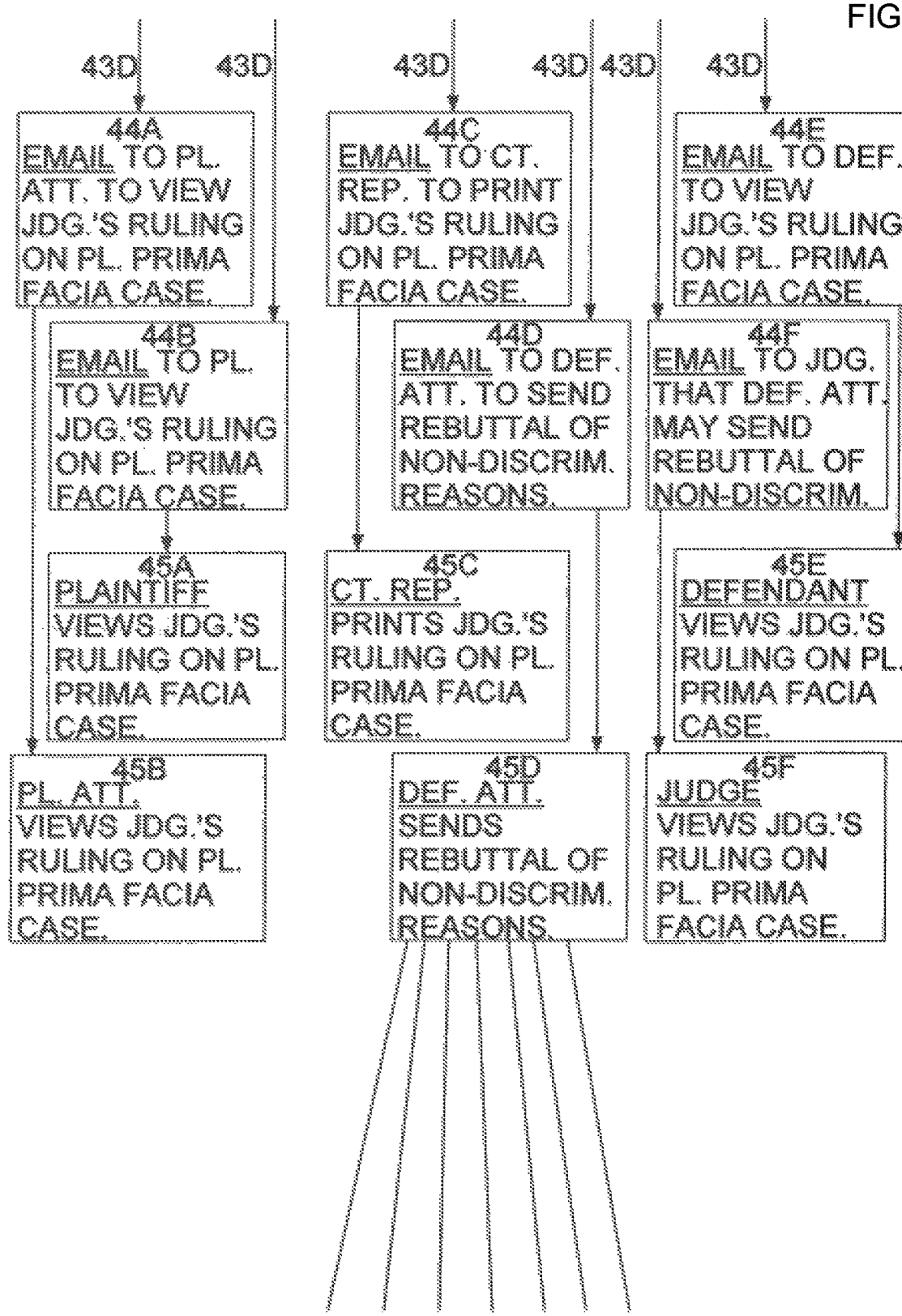
Figure 3V:
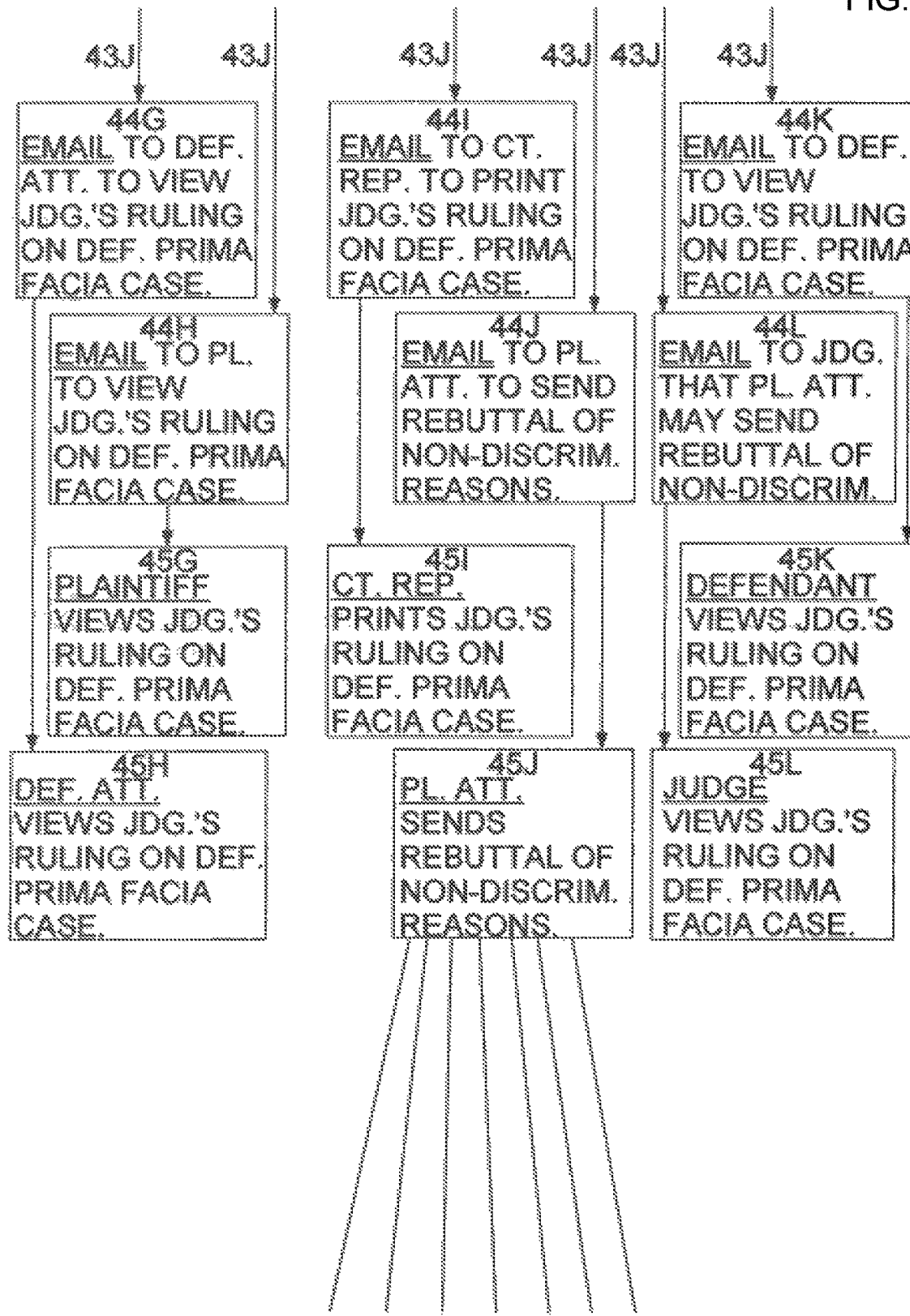
Figure 3W:
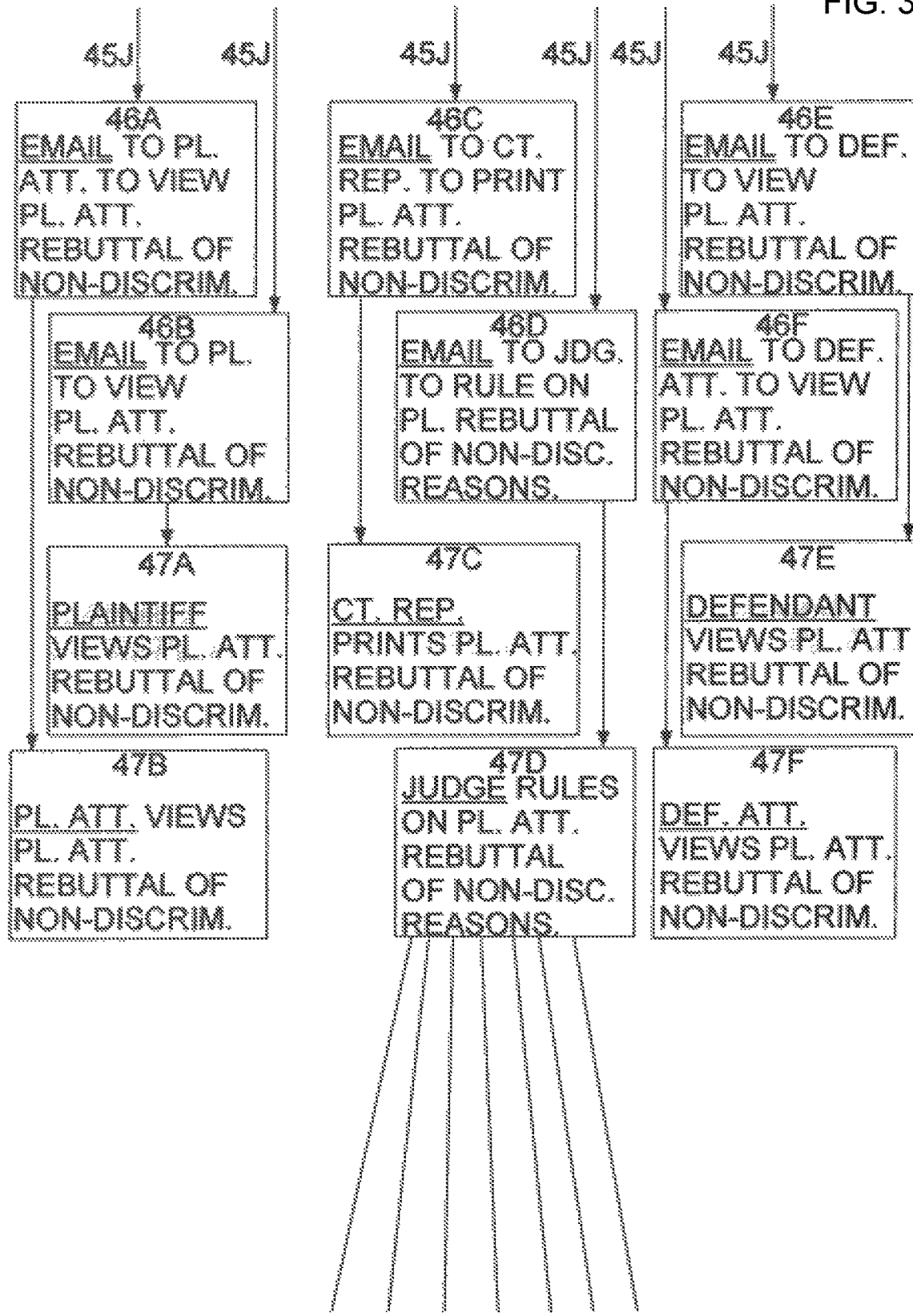
Figure 3X:
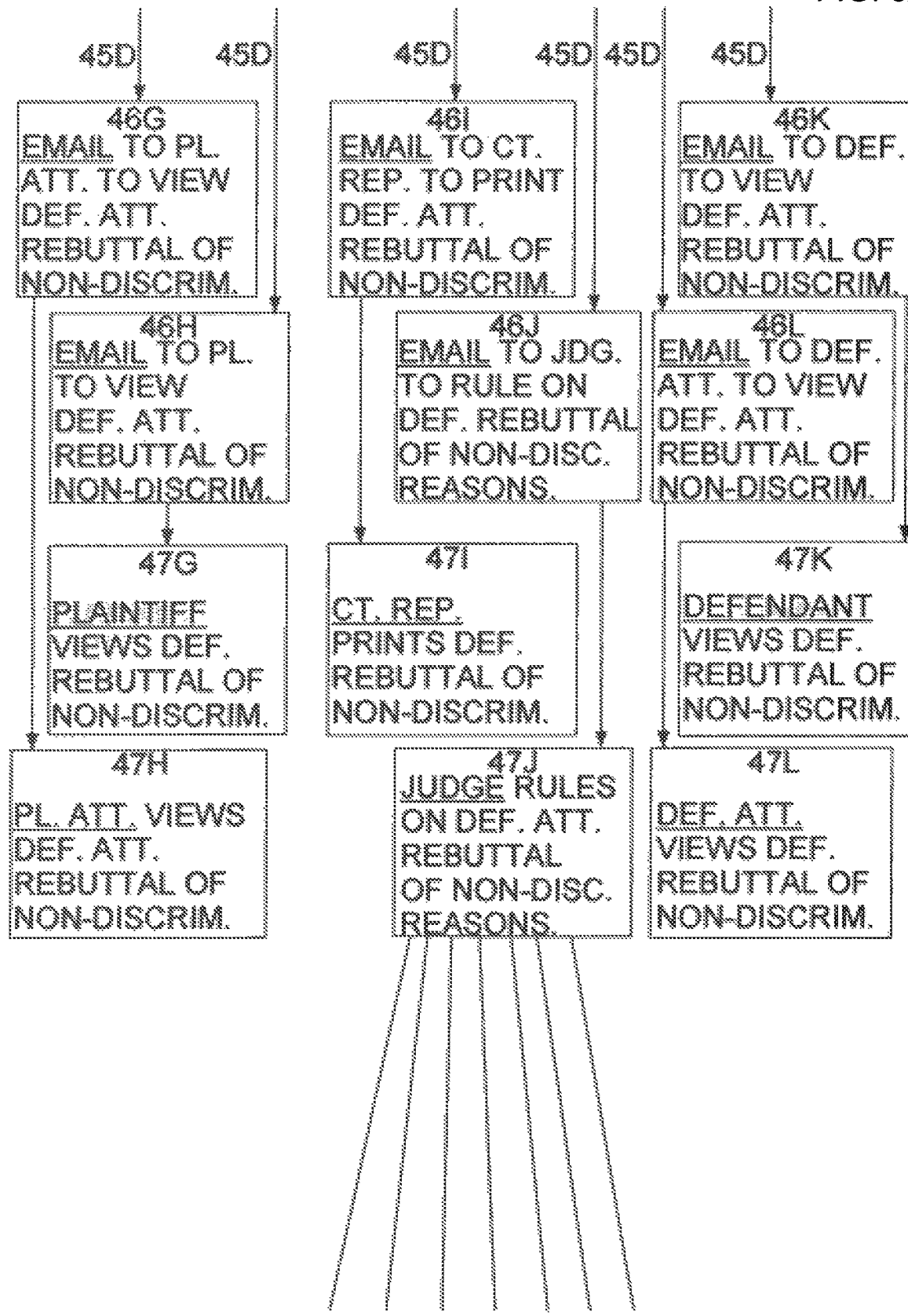
Figure 3Y:
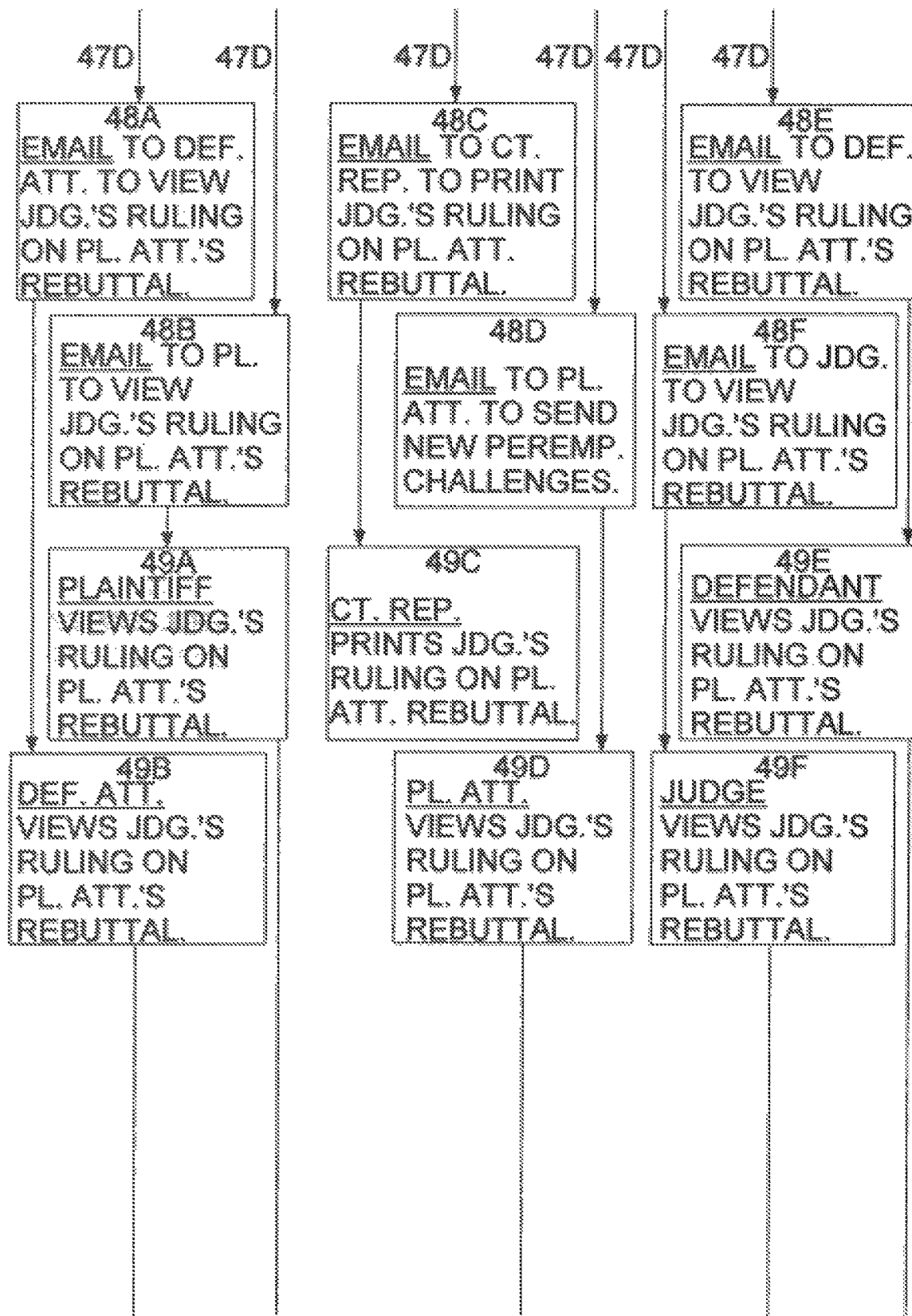
Figure 3Z:
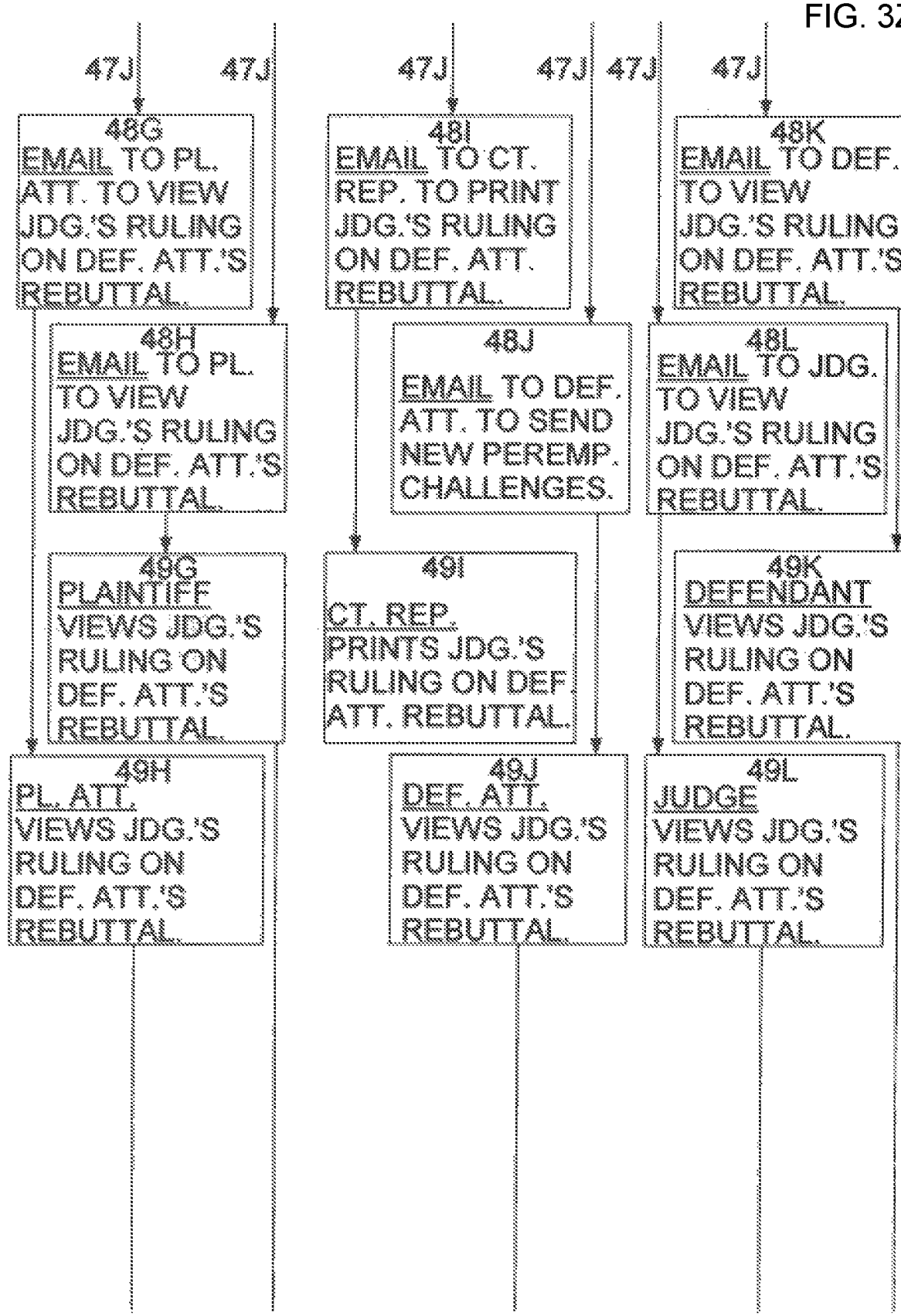
Figure 3A:
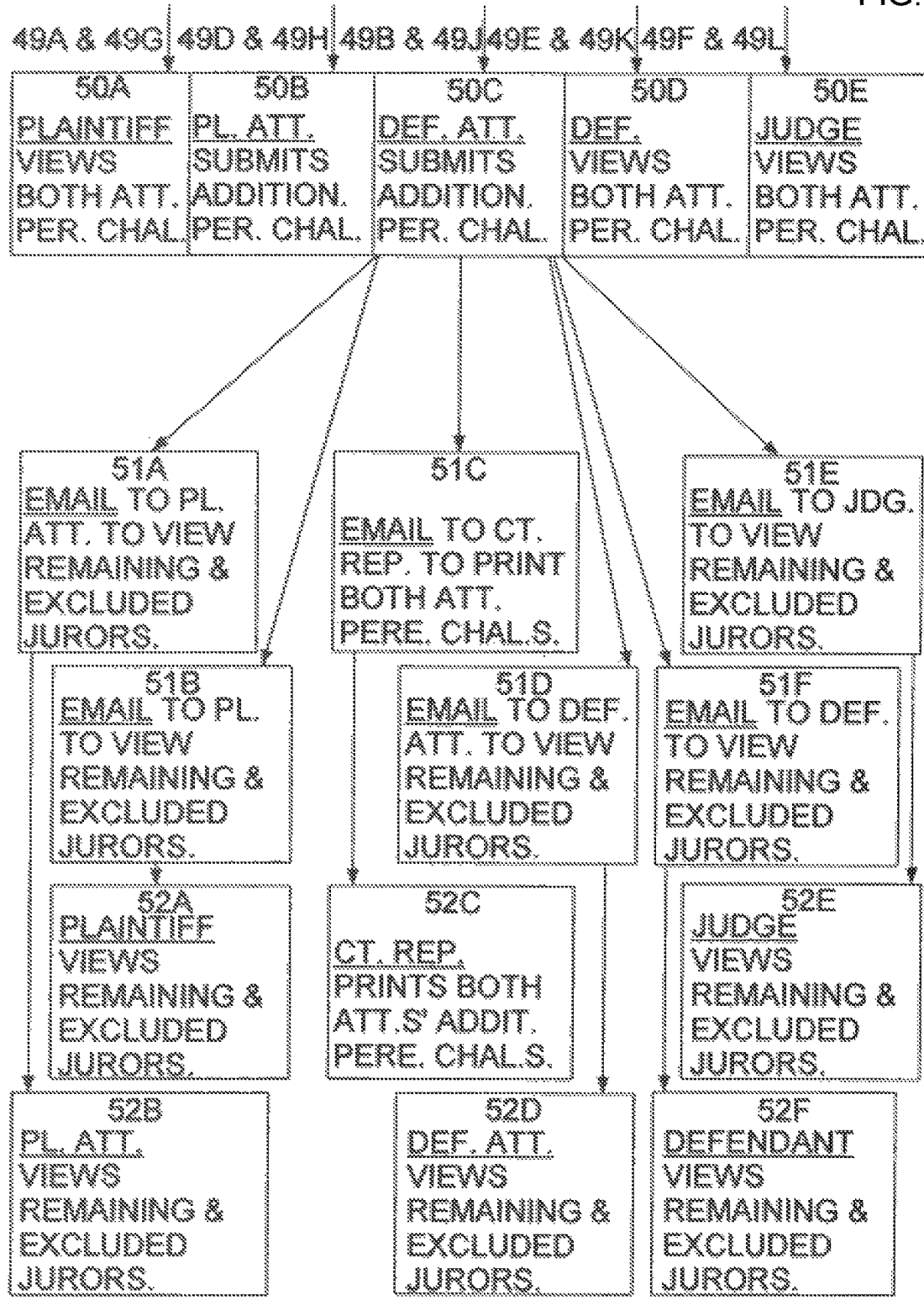
Figure 3B:
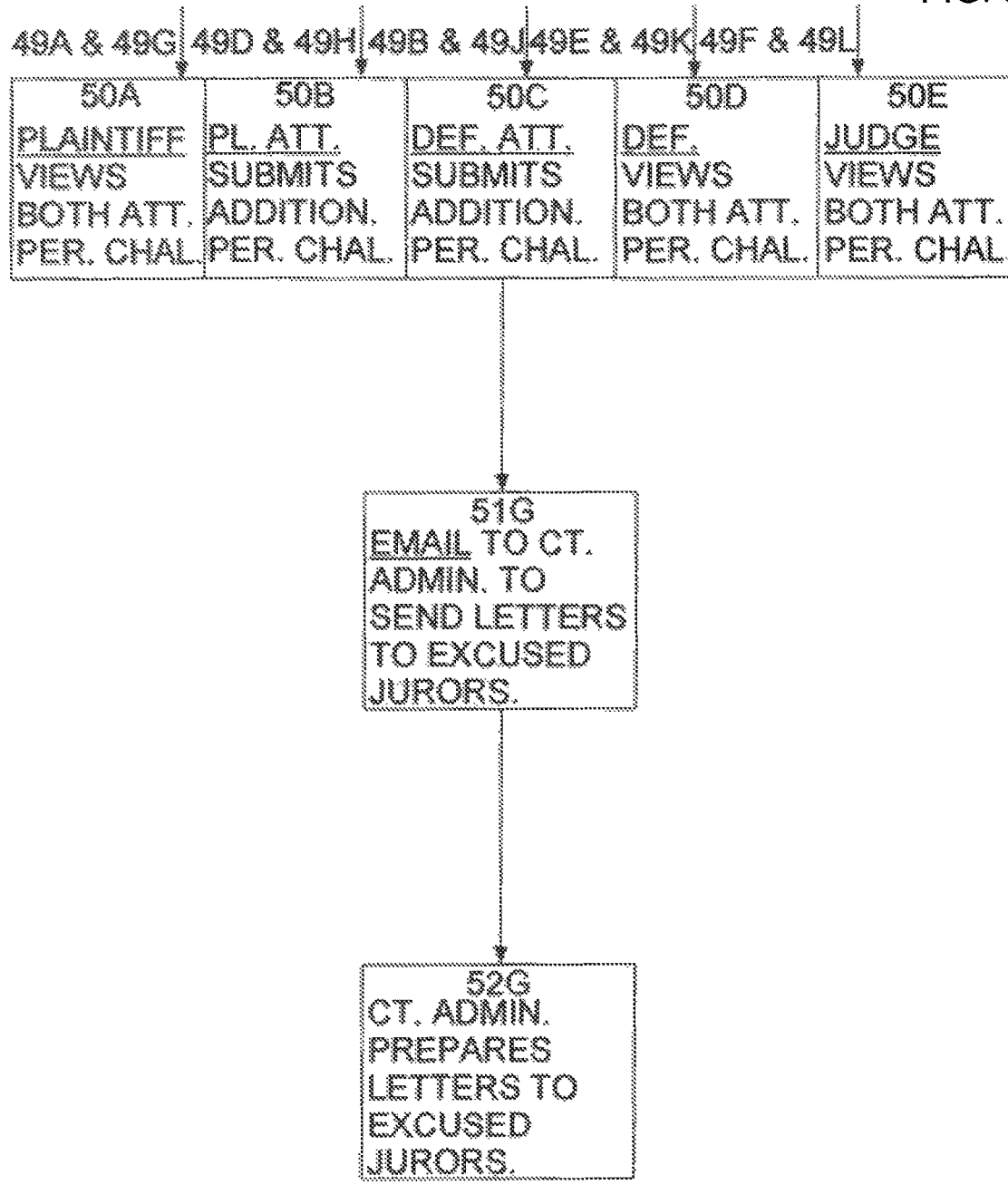

FIG. 3 is a flowchart encompassing steps 1 through 24 in FIG. 2 and also showing optional subsequent steps of the unique method and computer program that allow attorneys to submit challenges for cause and peremptory challenges and allow attorneys to object to their counterpart's challenges for cause and peremptory challenges and allow the Judge to rule on such objections all through the invention's website. Thus, steps 1 through 24 in FIG. 2 are the same steps 1 through 24 in FIG. 3.

In step 25 of FIG. 3, the invention sends an email message and a text message to the Judge advising him/her to log onto the invention's website and view each juror's video and transcribed responses and excuse any jurors from jury duty the Judge desires through the invention's website.

In step 26 of FIG. 3, the Judge logs onto the invention's website and views each juror's video and transcribed responses and excuses any jurors from jury duty that he/she desires through the invention's website.

In step 27 of FIG. 3, the invention sends an email message and a text message to the Defense Attorney's professional jury consultant advising that he/she may now log onto the invention's website and view each juror's video and transcribed responses and submit an analysis of each juror to the Defense Attorney through the website. Also, the invention sends an email message and a text message to the Defendant advising that he/she may now log onto the invention's website and view each juror's video and transcribed responses and submit an analysis of each juror to the Defense Attorney through the website. Also, the invention sends an email message and a text message to the Defense Attorney advising that he/she may now log onto the invention's website and view each juror's video and transcribed responses and type an analysis of each juror. Additionally, the invention sends an email message and a text message to the Plaintiff Attorney's professional jury consultant advising that he/she may now log onto the invention's website and view each juror's video and transcribed responses and submit an analysis of each juror to the Plaintiff Attorney through the website. Also, the invention sends an email message and a text message to the Plaintiff advising that he/she may now log onto the invention's website and view each juror's video and transcribed responses and submit an analysis of each juror to the Plaintiff Attorney through the website. Also, the invention sends an email message and a text message to the Plaintiff Attorney advising that he/she may now log onto the invention's website and view each juror's video and transcribed responses and type an analysis of each juror. Also, the invention sends an email message and a text message to the Court Reporter advising that he/she must now log onto the invention's website and print the names, addresses, and transcribed jury selection questionnaires of all of the jurors the Judge excused from jury duty through the invention's website. Also, the invention sends an email message and a text message to the Court Administrator advising that he/she must now log onto the invention's website and prepare a letter for each juror excused from jury duty by the Judge through the invention's website and mail them to the jurors.

In step 28 of FIG. 3, the Defense Attorney's professional jury consultant logs onto the invention's website and views each juror's video and transcribed responses and submits an analysis of each juror to the Defense Attorney through the website. Also, the Defendant logs onto the invention's website and views each juror's video and transcribed responses and submits an analysis of each juror to the Defense Attorney through the website. Additionally, the Plaintiff Attorney's professional jury consultant logs onto the invention's website and views each juror's video and transcribed responses and submits an analysis of each juror to the Plaintiff Attorney through the website. Also, the Plaintiff logs onto the invention's website and views each juror's video and transcribed responses and submits an analysis of each juror to the Plaintiff Attorney through the website. Also, the Court Reporter logs onto the invention's website and prints the names, addresses, and transcribed jury selection questionnaires of all of the jurors the Judge excused from jury duty through the invention's website. Also, the Court Administrator logs onto the invention's website and prepares a letter for each juror excused from jury duty by the Judge through the invention's website and mails them to the jurors.

In step 29 of FIG. 3, the invention sends an email message and a text message to the Defense Attorney advising him/her that his/her professional jury consultant has submitted an analysis of each juror to the Defense Attorney's program through the invention's website. Also, the email message informs the Defense Attorney that he/she may now log onto the invention's website and view his/her professional jury consultant's analysis of each juror and submit challenges for cause through the invention's website. Also, the invention sends an email message and a text message to the Defense Attorney advising him/her that the Defendant has submitted an analysis of each juror to the Defense Attorney's program through the website. Also, the email message informs the Defense Attorney that he/she may now log onto the invention's website and view the Defendant's analysis of each juror and submit challenges for cause through the invention's website. Additionally, the invention sends an email message and a text message to the Plaintiff Attorney advising him/her that his/her professional jury consultant has submitted an analysis of each juror to the Plaintiff Attorney's program through the invention's website. Also, the email message informs the Plaintiff Attorney that he/she may now log onto the invention's website and view his/her professional jury consultant's analysis of each juror and submit challenges for cause through the invention's website. Also, the invention sends an email message and a text message to the Plaintiff Attorney advising him/her that the Plaintiff has submitted an analysis of each juror to the Plaintiff Attorney's program through the invention's website. Also, the email message informs the Plaintiff Attorney that he/she may now log onto the website and view the Plaintiff's analysis of each juror and submit challenges for cause through the invention's website.

In step 30 of FIG. 3, the Defense Attorney logs onto the invention's website and views his/her professional jury consultant's analysis of each juror and views the Defendant's analysis of each juror and compares his/her analysis of each juror with his/her professional jury consultant's analysis of each juror and the Defendant's analysis of each juror and submits challenges for cause to strike jurors through the invention's website. The Plaintiff Attorney logs onto the invention's website and views his/her professional jury consultant's analysis of each juror and views the Plaintiff's analysis of each juror and compares his/her analysis of each juror with his/her professional jury consultant's analysis of each juror and the Plaintiff's analysis of each juror and submits challenges for cause to strike jurors through the invention's website.

In step 31 of FIG. 3, the invention sends an email message and a text message to the Plaintiff Attorney advising that he/she may now log onto the invention's website and view the Defense Attorney's challenges for cause and submit rebuttals to the Defense Attorney's challenges for cause through the invention's website. Also, the invention sends an email message and a text message to the Defense Attorney advising that he/she may now log onto the invention's website and view the Plaintiff Attorney's challenges for cause and submit rebuttals to the Plaintiff Attorney's challenges for cause through the invention's website. Additionally, the invention sends email messages and text messages to the Judge, the Plaintiff, and the Defendant advising them that they may now log onto the invention's website and view the Plaintiff Attorney's and the Defense Attorney's challenges for cause and advising them that the attorneys may now submit rebuttals to their counterpart's challenges for cause through the invention's website. Also, the invention sends email messages and text messages to the Court Reporter advising him/her to log onto the invention's website and print the Plaintiff Attorney's and the Defense Attorney's challenges for cause.

In step 32 of FIG. 3, the Plaintiff Attorney logs onto the invention's website and views the Defense Attorney's challenges for cause and submits rebuttals to the Defense Attorney's challenges for cause through the invention's website. Also, the Defense Attorney logs onto the invention's website and views the Plaintiff Attorney's challenges for cause and submits rebuttals to the Plaintiff Attorney's challenges for cause through the invention's website. Additionally, the Judge, the Plaintiff, and the Defendant log onto the invention's website and view the Plaintiff Attorney's and the Defense Attorney's challenges for cause. Also, the Court Reporter logs onto the invention's website and prints the Plaintiff Attorney's and the Defense Attorney's challenges for cause.

In step 33 of FIG. 3, the invention sends email messages and text messages to the Plaintiff Attorney, Defense Attorney, Plaintiff, and Defendant advising them that they may now log onto the invention's website and view the Plaintiff Attorney's and the Defense Attorney's rebuttals to their counterpart's challenges for cause. Also, the invention sends email messages and text messages to the Judge advising him/her to log onto the invention's website and view the Plaintiff Attorney's and the Defense Attorney's rebuttals to their counterpart's challenges for cause and submit rulings through the invention's website on the Plaintiff Attorney's challenges for cause and the Defense Attorney's challenges for cause. Also, the invention sends email messages and text messages to the Court Reporter advising him/her to log onto the invention's website and print the Plaintiff Attorney's and the Defense Attorney's rebuttals to their counterpart's challenges for cause.

In step 34 of FIG. 3, the Plaintiff Attorney, Defense Attorney, Plaintiff, and Defendant log onto the invention's website and view the Plaintiff Attorney's and the Defense Attorney's rebuttals to their counterpart's challenges for cause. Also, the Judge logs onto the invention's website and views the Plaintiff Attorney's and the Defense Attorney's rebuttals to their counterpart's challenges for cause and submits rulings through the invention's website on the Plaintiff Attorney's challenges for cause and the Defense Attorney's challenges for cause. Also, the Court Reporter logs onto the invention's website and prints the Plaintiff Attorney's and the Defense Attorney's rebuttals to their counterpart's challenges for cause.

In step 35 of FIG. 3, the invention sends email messages and text messages to the Plaintiff Attorney, Defense Attorney, Plaintiff, and Defendant advising them that they may now log onto the invention's website and view the Judge's rulings on the Plaintiff Attorney's and the Defense Attorney's challenges for cause. Also, the invention sends email messages and text messages to the Court Reporter advising him/her to log onto the invention's website and print the Judge's rulings on the Plaintiff Attorney's and the Defense Attorney's challenges for cause. Also, the invention sends email messages and text messages to the Court Administrator advising that he/she must now log onto the invention's website and prepare a letter for each juror excused from jury duty by the Plaintiff Attorney's challenges for cause and the Defense Attorney's challenges for cause through the invention's website and mail them to the jurors. Also, the invention sends email messages and text messages to the Judge advising him/her to log onto the invention's website and excuse randomly a number of jurors to where the remaining jurors in the jury pool equal the total sum of the Plaintiff Attorney's total allotted peremptory challenges plus the Defense Attorney's total allotted peremptory challenges plus the total number of jurors to be impaneled plus the total number of alternate jurors.

In step 36 of FIG. 3, the Plaintiff Attorney, Defense Attorney, Plaintiff, and Defendant log onto the invention's website and view the Judge's rulings on the Plaintiff Attorney's and the Defense Attorney's challenges for cause. Also, the Court Reporter logs onto the invention's website and prints the Judge's rulings on the Plaintiff Attorney's and the Defense Attorney's challenges for cause. Also, the Court Administrator logs onto the invention's website and prepares a letter for each juror excused from jury duty by the Plaintiff Attorney's challenges for cause and the Defense Attorney's challenges for cause through the invention's website. Also, the Judge logs onto the invention's website and excuses randomly a number of jurors to where the remaining jurors in the jury pool equal the total sum of the Plaintiff Attorney's total allotted peremptory challenges plus the Defense Attorney's total allotted peremptory challenges plus the total number of jurors to be impaneled plus the total number of alternate jurors.

In step 37 of FIG. 3, the invention sends email messages and text messages to the Plaintiff Attorney and the Defense Attorney advising them to log onto the invention's website to view the list of jurors excused by the Judge through the website and advising them of the date and time they are to log onto the invention's website and submit their peremptory challenges in an alternating fashion and advising them to review each analysis of each juror through the invention's website and predetermine which jurors they intend to exclude with peremptory challenges. Also, the invention sends email messages and text messages to the Plaintiff and the Defendant advising them to log onto the invention's website and view the list of jurors excused by the Judge through the invention's website and advising them of the date and time the Plaintiff Attorney and the Defense Attorney are to log onto the invention's website and submit their peremptory challenges in an alternating fashion and advising them that they may log onto the invention's website at the same date and time as both attorneys and view their peremptory challenge submissions through the invention's website. Additionally, the invention sends an email message and a text message to the Court Reporter advising him/her to log onto the invention's website to print the list of jurors excused by the Judge through the invention's website. Also, the invention sends an email message and a text message to the Court Administrator advising that he/she must now log onto the invention's website and view the list of jurors excused by the Judge and prepare a letter for each juror excused from jury duty by the Judge through the invention's website and mail them to the jurors.

In step 38 of FIG. 3, the Plaintiff Attorney and the Defense Attorney log onto the invention's website to view the list of jurors excused by the Judge through the website, and they review each analysis of each juror through the invention's website and predetermine which jurors they intend to exclude with peremptory challenges. Also, the Plaintiff and the Defendant log onto the invention's website and view the list of jurors excused by the Judge through the invention's website. Additionally, the Court Reporter logs onto the invention's website to print the list of jurors excused by the Judge through the invention's website. Also, the Court Administrator logs onto the invention's website and views the list of jurors excused by the Judge and prepares a letter for each juror excused from jury duty by the Judge through the invention's website and mails them to the jurors.

In step 39 of FIG. 3, the Plaintiff Attorney and the Defense Attorney log onto the invention's website at the same date and time, and they submit their peremptory challenges through the invention's website in an alternating fashion. Also, the Judge, Plaintiff, and Defendant log onto the invention's website at the same date and time as the Plaintiff Attorney and the Defense Attorney, and they view the peremptory challenges submitted by both the Plaintiff Attorney and the Defense Attorney in an alternating fashion.

In step 40 of FIG. 3, the invention sends an email message and a text message to the Plaintiff Attorney advising him/her that he/she may now log onto the invention's website and submit a prima facie case that the Defense Attorney's peremptory challenges were based on unconstitutional race and/or gender discrimination. Also, the invention sends an email message and a text message to the Defense Attorney advising him/her that he/she may now log onto the invention's website and submit a prima facie case that the Plaintiff Attorney's peremptory challenges were based on unconstitutional race and/or gender discrimination. Also, the invention sends email messages and text messages to the Judge, Plaintiff, and Defendant advising them that the Plaintiff Attorney and the Defense Attorney may now submit, through the invention's website, a prima facie case that their counterpart's peremptory challenges were based on unconstitutional race and/or gender discrimination. Additionally, the invention sends an email message and a text message to the Court Reporter advising him/her to log onto the invention's website and print the Plaintiff Attorney's and the Defense Attorney's peremptory challenges.

In step 41 of FIG. 3, the Plaintiff Attorney logs onto the invention's website and submits a prima facie case that the Defense Attorney's peremptory challenges were based on unconstitutional race and/or gender discrimination. Also, the Defense Attorney logs onto the invention's website and submits a prima facie case that the Plaintiff Attorney's peremptory challenges were based on unconstitutional race and/or gender discrimination. Also, the Judge, Plaintiff, and Defendant log onto the invention's website and view the peremptory challenges of the Plaintiff Attorney and the Defense Attorney. Additionally, the Court Reporter logs onto the invention's website and prints the Plaintiff Attorney's and the Defense Attorney's peremptory challenges.

In step 42 of FIG. 3, the invention sends email messages and text messages to the Plaintiff Attorney, Defense Attorney, Plaintiff, and Defendant advising them that they may now log onto the invention's website and view the Plaintiff Attorney's and the Defense Attorney's prima facie cases of unconstitutional race and/or gender discrimination and advising them that the Judge will now submit, through the invention's website, rulings on the Plaintiff Attorney's and the Defense Attorney's prima facie cases. Also, the invention sends email messages and text messages to the Judge advising him/her to log onto the invention's website and view the Plaintiff Attorney's and the Defense Attorney's prima facie cases of unconstitutional race and/or gender discrimination and submit, through the invention's website, rulings on the Plaintiff Attorney's and the Defense Attorney's prima facie cases. Additionally, the invention sends email messages and text messages to the Court Reporter advising him/her to log onto the invention's website and print the Plaintiff Attorney's and the Defense Attorney's prima facie case of unconstitutional race and/or gender discrimination.

In step 43 of FIG. 3, the Plaintiff Attorney, Defense Attorney, Plaintiff, and Defendant log onto the invention's website and view the Plaintiff Attorney's and the Defense Attorney's prima facie cases of unconstitutional race and/or gender discrimination. Also, the Judge logs onto the invention's website and views the Plaintiff Attorney's and the Defense Attorney's prima facie cases of unconstitutional race and/or gender discrimination and submits, through the invention's website, rulings on the Plaintiff Attorney's and the Defense Attorney's prima facie cases. Additionally, the Court Reporter logs onto the invention's website and prints the Plaintiff Attorney's and the Defense Attorney's prima facie case of unconstitutional race and/or gender discrimination.

In step 44 of FIG. 3, the invention sends email messages and text messages to the Judge, Plaintiff Attorney, Defense Attorney, Plaintiff, and Defendant advising them to log onto the invention's website and view the Judge's ruling on the Plaintiff Attorney's prima facie case and advising them that if the Plaintiff Attorney's prima facie case was sustained, the Defense Attorney may now submit a rebuttal of nondiscriminatory reasons to the Plaintiff Attorney's prima facie case to preserve his/her peremptory challenges through the invention's website. Also, the invention sends email messages and text messages to the Judge, Plaintiff Attorney, Defense Attorney, Plaintiff, and Defendant advising them to log onto the invention's website and view the Judge's ruling on the Defense Attorney's prima facie case and advising them that if the Defense Attorney's prima facie case was sustained, the Plaintiff Attorney may now submit a rebuttal of nondiscriminatory reasons to the Defense Attorney's prima facie case to preserve his/her peremptory challenges through the invention's website. Additionally, the invention sends email messages and text messages to the Court Reporter advising him/her to log onto the invention's website and print the Judge's rulings on the Plaintiff Attorney's and the Defense Attorney's prima facie cases of unconstitutional race and/or gender discrimination.

In step 45 of FIG. 3, the Judge, Plaintiff Attorney, Defense Attorney, Plaintiff, and Defendant log onto the invention's website and view the Judge's ruling on the Plaintiff Attorney's prima facie case, and if the Plaintiff Attorney's prima facie case was sustained, the Defense Attorney submits a rebuttal of nondiscriminatory reasons to the Plaintiff Attorney's prima facie case to preserve his/her peremptory challenges through the invention's website. Also, the Judge, Plaintiff Attorney, Defense Attorney, Plaintiff, and Defendant log onto the invention's website and view the Judge's ruling on the Defense Attorney's prima facie case, and if the Defense Attorney's prima facie case was sustained, the Plaintiff Attorney submits a rebuttal of nondiscriminatory reasons to the Defense Attorney's prima facie case to preserve his/her peremptory challenges through the invention's website. Additionally, the Court Reporter logs onto the invention's website and prints the Judge's rulings on the Plaintiff Attorney's and the Defense Attorney's prima facie cases of unconstitutional race and/or gender discrimination.

In step 46 of FIG. 3, the invention sends email messages and text messages to the Plaintiff Attorney, Defense Attorney, Plaintiff, and Defendant advising them that they may now log onto the invention's website and view the Plaintiff Attorney's and the Defense Attorney's rebuttals of nondiscriminatory reasons and advising them that the Judge will now submit, through the invention's website, rulings on the Plaintiff Attorney's and the Defense Attorney's rebuttals of nondiscriminatory reasons. Also, the invention sends email messages and text messages to the Judge advising him/her to log onto the invention's website and view the Plaintiff Attorney's and the Defense Attorney's rebuttals of nondiscriminatory reasons and submit, through the invention's website, rulings on the Plaintiff Attorney's and the Defense Attorney's rebuttals of nondiscriminatory reasons. Additionally, the invention sends email messages and text messages to the Court Reporter advising him/her to log onto the invention's website and print the Plaintiff Attorney's and the Defense Attorney's rebuttals of nondiscriminatory reasons.

In step 47 of FIG. 3, the Plaintiff Attorney, Defense Attorney, Plaintiff, and Defendant log onto the invention's website and view the Plaintiff Attorney's and the Defense Attorney's rebuttals of nondiscriminatory reasons. Also, the Judge logs onto the invention's website and views the Plaintiff Attorney's and the Defense Attorney's rebuttals of nondiscriminatory reasons and submits, through the invention's website, rulings on the Plaintiff Attorney's and the Defense Attorney's rebuttals of nondiscriminatory reasons. Additionally, the Court Reporter logs onto the invention's website and prints the Plaintiff Attorney's and the Defense Attorney's rebuttals of nondiscriminatory reasons.

In step 48 of FIG. 3, the invention sends email messages and text messages to the Judge, Plaintiff Attorney, Defense Attorney, Plaintiff, and Defendant advising them to log onto the invention's website and view the Judge's ruling on the Plaintiff Attorney's rebuttal of nondiscriminatory reasons and advising them that if the Plaintiff Attorney's rebuttal of nondiscriminatory reasons was overruled, the Plaintiff Attorney must log onto the invention's website at a specified date and time and submit additional peremptory challenges through the invention's website and advising them that the Judge, Defense Attorney, Plaintiff, and Defendant may also log onto the invention's website at the same date and time that the Plaintiff Attorney is required to submit additional peremptory challenges and view the Plaintiff Attorney's additional peremptory challenges. Also, the invention sends email messages and text messages to the Judge, Plaintiff Attorney, Defense Attorney, Plaintiff, and Defendant advising them to log onto the invention's website and view the Judge's ruling on the Defense Attorney's rebuttal of nondiscriminatory reasons and advising them that if the Defense Attorney's rebuttal of nondiscriminatory reasons was overruled, the Defense Attorney must log onto the invention's website at a specified date and time and submit additional peremptory challenges through the invention's website and advising them that the Judge, Plaintiff Attorney, Plaintiff, and Defendant may also log onto the invention's website at the same date and time that the Defense Attorney is required to submit additional peremptory challenges and view the Defense Attorney's additional peremptory challenges. Additionally, the invention sends email messages and text messages to the Court Reporter advising him/her to log onto the invention's website and print the Judge's rulings on the Plaintiff Attorney's and the Defense Attorney's rebuttals of nondiscriminatory reasons.

In step 49 of FIG. 3, the Judge, Plaintiff Attorney, Defense Attorney, Plaintiff, and Defendant log onto the invention's website and view the Judge's ruling on the Plaintiff Attorney's rebuttal of nondiscriminatory reasons. Also, the Judge, Plaintiff Attorney, Defense Attorney, Plaintiff, and Defendant log onto the invention's website and view the Judge's ruling on the Defense Attorney's rebuttal of nondiscriminatory reasons. Additionally, the Court Reporter logs onto the invention's website and prints the Judge's rulings on the Plaintiff Attorney's and the Defense Attorney's rebuttals of nondiscriminatory reasons.

In Step 50 of FIG. 3, the Plaintiff Attorney and the Defense Attorney log onto the invention's website on the same date and time and submit additional peremptory challenges in an alternating fashion if their rebuttals of nondiscriminatory reasons were overruled by the Judge. Also, the Judge, Plaintiff, and Defendant log onto the invention's website on the same date and time that the Plaintiff Attorney and the Defense Attorney are required to submit additional peremptory challenges in an alternating fashion and view the Plaintiff Attorney and the Defense Attorney submit their additional peremptory challenges in an alternating fashion through the invention's website.

In step 51 of FIG. 3, the invention sends email messages and text messages to the Judge, Plaintiff Attorney, Defense Attorney, Plaintiff, and Defendant advising them that the jury selection process through the invention's website is now complete, and they may now log onto the invention's website and view all of the final remaining jurors and all excluded jurors. Additionally, the invention sends email messages and text messages to the Court Reporter advising him/her to log onto the invention's website and print the Plaintiff Attorney's and the Defense Attorney's additional peremptory challenges and all of the names of the remaining jurors. Also, the invention sends an email message and a text message to the Court Administrator advising him/her that the jury selection process through the invention's website is now complete, and he/she must now log onto the invention's website and prepare letters for the jurors who were excused from jury duty through the invention's website informing them that they have been excused from jury duty and mail the letters to them.

Finally, in step 52 of FIG. 3, the Judge, Plaintiff Attorney, Defense Attorney, Plaintiff, and Defendant log onto the invention's website and view all of the final remaining jurors and all excluded jurors. Additionally, the Court Reporter logs onto the invention's website and prints the Plaintiff Attorney's and the Defense Attorney's additional peremptory challenges and all of the names of the remaining jurors. Also, the Court Administrator logs onto the invention's website and prepares letters for the jurors who were excused from jury duty through the invention's website informing them that they have been excused from jury duty and mails the letters to them Although the present invention has been described and illustrated in detail, it is to be clearly understood that the same is by way of illustration and example only and is not to be taken by way of limitation. The spirit and scope of the present invention are to be limited only by the terms of the appended claims.

I claim the following:

1. A process comprising steps embodied in an executable computer program consisting of a code sequence stored in a non-transitory computer readable storage medium for capturing video and audio recordings depicting interviewees responding to questions and providing to an interviewer typed formatted interviewee names arranged in an order that prioritizes which interviewees should be excluded from a plurality of interviewees, the process comprising the steps of:

storing an initial proposed questionnaire in the code sequence;

generating automatically with the code sequence a different password for each of functions A, B, and C contained in a website produced by the code sequence, the different password for each function allows access to the function wherein the function A comprises the steps of 1) capturing at least one video and audio recording depicting the interviewer orally stating at least one question, 2) capturing at least one supplemental type formatted question to the initial proposed questionnaire, 3) transmitting and presenting through the function B the video and audio recordings and supplemental typed formatted questions, and/or 4) presenting through the function A each typed formatted interviewee name arranged in an order that prioritizes which interviewees should be excluded from a plurality of interviewees wherein the function B comprises the steps of 1) deleting and removing a supplemental type formatted question and a video and audible recording that was transmitted and presented into the function B upon activation of a delete function in the function B, and/or 2) transmitting and presenting through a function D the initial proposed questionnaire that was stored in the code sequence, the supplemental type formatted questions, and the video and audio recordings of the interviewer wherein the function C comprises the steps of 1) capturing analyses of video and audio recordings depicting interviewees responding to questions and assigned strike indicators to the names of the interviewees and/or 2) transferring each analysis and assigned strike indicator of a video and audio recording depicting an interviewee to the function A;

pairing a different email address with each of the functions A, B, and C in the code sequence;

capturing said typed formatted interviewee names into the website in communication with a computer server;

posting and presenting automatically through the function A in the website with the code sequence the stored initial proposed questionnaire;

enabling the function A to transmit supplemental questions to the initial proposed questionnaire to the function B in the website to create an updated questionnaire;

emailing automatically with the code sequence a respective notice to each email address, each respective notice indicates the one different password that accesses the function of which the email address is paired;

emailing automatically with the code sequence a notice to the email address paired with the function A;

capturing with the code sequence at least one video and audio recording depicting the interviewer orally stating at least one question into the function A located in the web site;

capturing with the code sequence at least one supplemental typed formatted question to the initial proposed questionnaire into the function A located in the website;

pairing automatically with the code sequence the at least one video and audio recording depicting the interviewer orally stating at least one question that was captured into the function A with at least one typed question that was captured into the function A;

transmitting and presenting with the code sequence through the function B located in the website the video and audio recordings depicting the interviewer orally stating at least one question paired with their respective type formatted questions;

emailing automatically with the code sequence a notice to the email address paired with the function B;

playing with the code sequence through the function B located in the web site the video and audio recordings depicting the interviewer orally stating at least one question that were captured into the function A;

transcribing and converting all audible words of each captured audible and video file of the interviewer into a tangible typed format automatically using the code sequence in communication with the server;

providing with the code sequence the function B in the website with a function capable of deleting and removing any supplemental type formatted question, and its respective paired video and audible recording that was transmitted and presented into the function B for the purpose of deleting and removing any supplemental question and it's respective paired video and audible recording;

deleting and removing with the code sequence a supplemental type formatted question and its respective paired video and audible recording that was transmitted and presented into the function B upon activation of the delete function in the function B in the web site;

transmitting and presenting through the function D in the website with the code sequence each question of the initial proposed questionnaire that was stored in the code sequence and each remaining supplemental type formatted question paired with its respective video and audio recording of the interviewer separately and without any other type formatted question paired with a video and audio recording appearing until an interviewee has completely finished responding to the presented question wherein the function D comprises the steps of 1) presenting the initial proposed questionnaire and supplemental type formatted questions, 2) playing the video and audio recordings of the interviewer, and/or 3) capturing video and audio recordings depicting interviewees orally responding to the questions and the video and audio recordings of the interviewer;

playing through the function D in the website with the code sequence only the one video and audio recording of the interviewer that is being presented;

preventing with the code sequence a webcam or video recording device that is paired with the function D and that is recording audio and video footage from pausing or stopping audio and video recordation until the presented audio and video recording paired with its typed question is no longer presented in the function D;

capturing video and audio recordings depicting interviewees orally responding to each question of the initial proposed questionnaire that was stored in the code sequence and each remaining supplemental type formatted question paired with its respective video and audio recording of the interviewer into the function D located in the web site with the code sequence;

pairing the video recordings that depict interviewees responding to the video and audio recordings with the respective typed formatted interviewee names depicted in the video recordings automatically with the code sequence;

transcribing and converting all audible words of each captured video and audio recording depicting an interviewee responding to the video and audio recordings paired with their respective questions on the updated questionnaire into a tangible typed format automatically using the code sequence in communication with the server;

pairing each interviewee's transcribed typed formatted responses of his/her video and audio recording specifically depicting him/her orally responding to questions with their respective typed formatted questions automatically with the code sequence;

correlating automatically with the code sequence each video and audio recording depicting an interviewee responding to the video and audio recordings paired with the respective typed formatted interviewee name depicted in the video and audio recording with the respective transcribed typed formatted responses of the interviewee depicted in the video and audio recording paired with their respective typed formatted questions;

assigning automatically with the code sequence at least one indicator to the at least one question that was transmitted and presented; the at least one assigned indicator represents which of the video recordings of the interviewer person was transmitted and played through the website at the same time a respective typed question was transmitted and presented through the website;

transmitting and presenting automatically with the code sequence each video and audio recording depicting an interviewee orally responding to the questions and video and audio recordings that were presented through the function D paired with the respective typed formatted interviewee name depicted in the video and audio recording with the respective transcribed typed formatted responses of the interviewee depicted in the video and audio recording paired with their respective typed formatted questions;

playing with the code sequence through the website at least one video and audio recording specifically depicting an interviewee;

transmitting and presenting through the website with the code sequence the at least one indicator assigned to the at least one question that was transmitted and presented automatically with the code sequence;

assigning automatically with the code sequence a different interactive video location retriever symbol to each respective typed formatted question that was presented to an interviewee;

pairing automatically with the code sequence each different interactive video location retriever symbol of each respective typed formatted question that was transmitted and presented in the function D in the website with each respective exact location in each interviewee's video and audio recording where the respective typed formatted question first appeared to each interviewee through the website in each interviewee's video and audio recording with the code sequence;

transmitting and presenting automatically through the website with the code sequence each different interactive video location retriever symbol assigned to each respective typed formatted question that was presented to an interviewee;

playing with the code sequence an interviewee's video and audio recording at the exact location that was paired with the at least one video location retriever symbol through the website immediately upon activating the at least one video location retriever symbol;

capturing a picture from each video and audio recording depicting an interviewee responding to questions automatically with the code sequence;

pairing each picture from each video and audio recording depicting an interviewee responding to questions with its respective typed formatted interviewee name automatically with the code sequence;

presenting through the website automatically with the code sequence each picture from each video and audio recording depicting an interviewee responding to questions in an interactive format paired with its respective typed formatted interviewee name;

playing at least one interviewee's video and audio recording through the website immediately upon activating the at least one interactive picture with the code sequence;

providing with the code sequence the function C in the website with a function capable of transferring analyses of video and audio recordings depicting interviewees responding to questions and assigning strike indicators to the names of the interviewees depicted in the video and audio recordings into the function A located in the web site with each assigned strike indicator representing when an interviewer should strike the interviewee from the plurality of interviewees;

emailing automatically with the code sequence a notice to the email address paired with the function C;

capturing with the code sequence analyses of video and audio recordings depicting interviewees responding to questions and assigned strike indicators to the names of the interviewees depicted in the video and audio recordings into the function C located in the web site;

transferring with the code sequence each analysis and assigned strike indicator of a video and audio recording depicting an interviewee responding to a question from the function C to the function A;

grouping automatically with the code sequence in the function A in the website each transferred analysis and assigned strike indicator of a video and audio recording depicting an interviewee responding to questions from the function C with their respective type formatted interviewee name paired with its respective interactive picture;

arranging automatically with the code sequence in the function A in the website each interviewee's typed formatted name paired with its respective interactive picture grouped with its respective analysis and its respective assigned strike indicator that was transferred from the function C into an order based on its respective assigned strike indicator; the order of the assigned strike indicators paired with their respective typed formatted interviewee names with their respective interactive pictures from the function C prioritizes which interviewees should be excluded from the plurality of interviewees;

presenting automatically with the code sequence through the function A located in the website each typed formatted interviewee name paired with its respective interactive picture grouped with its respective analysis and respective assigned strike indicator that was transferred from the function C in the automatically arranged order based on its respective assigned strike indicator;

emailing automatically with the code sequence a notice to the email address paired with the function A;

excluding from the plurality of interviewees by the interviewer an interviewee based on the interviewee's respective assigned strike indicator in the automatically arranged order.

\* \* \* \* \*